US012787970B2

(12) United States Patent
Guo et al.

(10) Patent No.: US 12,787,970 B2
(45) Date of Patent: Nov. 10, 2026

(54) CARRIER, LOCKING BASE ASSEMBLY, SUPPORTING FRAME AND WHEELED CARRYING APPARATUS

(71) Applicant: JANI INTERNATIONAL PTE. LTD., Singapore (SG)

(72) Inventors: Zhengwen Guo, WanChai (HK); Yingzhong Chen, WanChai (HK); Jialiang Yuan, WanChai (HK); Ziqiang He, WanChai (HK)

(73) Assignee: JANI INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 18/844,015

(22) PCT Filed: Sep. 8, 2023

(86) PCT No.: PCT/SG2023/050609
§ 371 (c)(1),
(2) Date: Sep. 4, 2024

(87) PCT Pub. No.: WO2024/054158
PCT Pub. Date: Mar. 14, 2024

(65) Prior Publication Data

US 2025/0194557 A1 Jun. 19, 2025

(30) Foreign Application Priority Data

Sep. 8, 2022 (CN) ........................ 202211105958.8
Nov. 8, 2022 (CN) ........................ 202211393615.6
(Continued)

(51) Int. Cl.
*A01K 1/02* (2006.01)
*B60N 2/28* (2006.01)
(Continued)

(52) U.S. Cl.
CPC .......... *A01K 1/0254* (2013.01); *A01K 1/0236* (2013.01); *B60N 2/2848* (2013.01);
(Continued)

(58) Field of Classification Search
CPC .. A01K 1/0254; A01K 1/0236; B60N 2/2848; B62B 7/10; B62B 7/142;
(Continued)

(56) References Cited

U.S. PATENT DOCUMENTS 972,740 A 10/1910 Weber
1,011,776 A 12/1911 Hamilton
(Continued)

FOREIGN PATENT DOCUMENTS

CN 2832620 Y 11/2006
CN 201018820 Y 2/2008
(Continued)

OTHER PUBLICATIONS

International Search Report with English translation for International Application No. PCT/SG2023/050398; International Filing Date: Jun. 1, 2023; Date of Mailing: Nov. 23, 2023; 11 pages.
(Continued)

*Primary Examiner* — Jose V Chen
(74) *Attorney, Agent, or Firm* — CANTOR COLBURN LLP

(57) ABSTRACT

The present disclosure relates to a carrier. The carrier includes a carrying portion and a bracket device. The carrying portion includes a bottom portion, and a carrying space is formed on the bottom portion. The bracket device includes a first bracket, a second bracket and a third bracket. The first bracket is combined to the carrying portion and disposed around a periphery of the carrying portion. The second bracket is connected to the first bracket and combined to the carrying portion. The second bracket extends
(Continued)

11 from a side of the periphery of the carrying portion to the other side of the periphery of the carrying portion through the bottom portion of the carrying portion. The third bracket is located at a side of the bottom portion of the carrying portion, for fixing the carrier to a carrying apparatus. The third bracket has an annular structural element.

20 Claims, 177 Drawing Sheets

(30) Foreign Application Priority Data

| | | |
|---|---|---|
| Dec. 23, 2022 | (CN) | 202211667675.2 |
| Jan. 18, 2023 | (CN) | 202310085067.9 |
| Feb. 14, 2023 | (CN) | 202310115845.4 |
| Mar. 2, 2023 | (CN) | 202310193406.5 |

(51) Int. Cl.

| | |
|---|---|
| ***B62B 7/10*** | (2006.01) |
| ***B62B 7/14*** | (2006.01) |
| *B62B 9/14* | (2006.01) |
| *B62B 9/18* | (2006.01) |

(52) U.S. Cl.
CPC ................ *B62B 7/10* (2013.01); *B62B 7/142* (2013.01); *B62B 7/145* (2013.01); *B62B 9/14* (2013.01); *B62B 9/142* (2013.01); *B62B 9/18* (2013.01)

(58) Field of Classification Search
CPC .......... B62B 7/145; B62B 9/14; B62B 9/142; B62B 9/18
USPC ..................................................... 297/256.16
See application file for complete search history.

(56) References Cited

U.S. PATENT DOCUMENTS

| | | | | |
|---|---|---|---|---|
| 1,075,372 | A | 10/1913 | Overshiner | |
| 1,091,025 | A | 3/1914 | Spofford et al. | |
| 2,177,833 | A | 10/1939 | Kroll et al. | |
| 2,226,000 | A | 12/1940 | Samuel et al. | |
| 2,244,155 | A | 6/1941 | Severine et al. | |
| 2,257,943 | A | 10/1941 | Feldman | |
| 2,285,700 | A | 6/1942 | Feldman | |
| 2,399,359 | A | 4/1946 | Samuel et al. | |
| 2,457,935 | A | 1/1949 | Stackhouse | |
| 2,489,593 | A | 11/1949 | Shaw | |
| 4,597,359 | A | 7/1986 | Moorman | |
| 4,634,177 | A | 1/1987 | Meeker | |
| 5,134,733 | A | 8/1992 | Wetter et al. | |
| 5,277,148 | A | 1/1994 | Rossignol et al. | |
| 5,478,135 | A | 12/1995 | Kain | |
| 5,487,588 | A | 1/1996 | Burleigh et al. | |
| 5,540,365 | A | 7/1996 | Lamair | |
| 5,961,180 | A | 10/1999 | Greger et al. | |
| 5,971,479 | A | 10/1999 | Jacquemot et al. | |
| 6,058,529 | A | 5/2000 | Goysich | |
| 6,209,957 | B1 | 4/2001 | Baloga et al. | |
| 6,375,260 | B1 | 4/2002 | Hiramatsu et al. | |
| 6,425,632 | B1 | 7/2002 | Anthony et al. | |
| 6,478,376 | B2 | 11/2002 | Hayashi et al. | |
| 6,543,846 | B2 | 4/2003 | Cone | |
| 6,592,183 | B2 | 7/2003 | Kain | |
| 6,616,242 | B1 | 9/2003 | Stoll | |
| 6,779,842 | B2 | 8/2004 | McNeff | |
| 6,899,057 | B1 | 5/2005 | Chrisco et al. | |
| 7,083,228 | B1 | 8/2006 | Al Sawan | |
| 7,159,948 | B1 | 1/2007 | Wolf | |
| 7,168,762 | B2 | 1/2007 | Maciejczyk | |
| 7,322,648 | B2 | 1/2008 | Nakagawa et al. | |
| 7,488,034 | B2 | 2/2009 | Ohren et al. | |
| 8,123,295 | B2 | 2/2012 | Hutchinson et al. | |
| 8,141,950 | B2 | 3/2012 | Boyer | |
| 8,186,368 | B2 | 5/2012 | Troutman et al. | |
| 8,282,165 | B2 | 10/2012 | Kespohl | |
| 8,444,222 | B2 | 5/2013 | Buckingham et al. | |
| 8,596,718 | B2 | 12/2013 | Gaudreau, Jr. et al. | |
| 8,926,014 | B2 | 1/2015 | Su | |
| 9,004,593 | B2 | 4/2015 | Banghart et al. | |
| 9,102,249 | B2 | 8/2015 | Mo | |
| 9,221,368 | B2 | 12/2015 | Hou et al. | |
| 9,452,695 | B2 | 9/2016 | Sedlack | |
| 9,616,782 | B2 | 4/2017 | Cohen et al. | |
| 9,688,167 | B2 | 6/2017 | Hutchinson et al. | |
| 10,266,078 | B2 | 4/2019 | Mason et al. | |
| 10,299,609 | B2 | 5/2019 | Taylor et al. | |
| 10,589,644 | B2 | 3/2020 | Henseler et al. | |
| 10,772,288 | B1 | 9/2020 | Sandiford | |
| 11,173,812 | B2 | 11/2021 | Maciejczyk | |
| 11,230,210 | B1 | 1/2022 | Nageshkar et al. | |
| 11,472,462 | B1 * | 10/2022 | Choi | B62B 7/105 |
| 11,590,865 | B2 | 2/2023 | Maciejczyk | |
| 11,618,353 | B2 | 4/2023 | Mason et al. | |
| 11,912,171 | B2 | 2/2024 | Maciejczyk | |
| 12,194,897 | B2 | 1/2025 | Maciejczyk | |
| 12,565,255 | B2 | 3/2026 | Liu | |
| 12,600,270 | B2 | 4/2026 | Chen | |
| 2003/0151282 | A1 | 8/2003 | Williams et al. | |
| 2004/0104616 | A1 | 6/2004 | Stoll | |
| 2005/0062321 | A1 | 3/2005 | Maier et al. | |
| 2005/0284415 | A1 | 12/2005 | O'Donnell | |
| 2006/0213452 | A1 | 9/2006 | King | |
| 2007/0246976 | A1 | 10/2007 | Jane | |
| 2008/0290708 | A1 | 11/2008 | Pos | |
| 2009/0127827 | A1 | 5/2009 | Pike et al. | |
| 2009/0273215 | A1 | 11/2009 | Barker et al. | |
| 2009/0295128 | A1 | 12/2009 | Nagelski et al. | |
| 2010/0033001 | A1 | 2/2010 | Boyer | |
| 2010/0086236 | A1 | 4/2010 | Lapstun | |
| 2010/0126427 | A1 | 5/2010 | Mcgrade | |
| 2010/0156069 | A1 * | 6/2010 | Chen | B62B 9/142 280/639 |
| 2010/0288204 | A1 | 11/2010 | Costello et al. | |
| 2011/0163519 | A1 * | 7/2011 | Van Gelderen | B62B 7/142 280/642 |
| 2011/0197823 | A1 | 8/2011 | Pietra | |
| 2011/0278810 | A1 * | 11/2011 | Winterhalter | B60N 2/2848 224/567 |
| 2012/0261958 | A1 | 10/2012 | Hutchinson et al. | |
| 2013/0099535 | A1 | 4/2013 | Su | |
| 2013/0106078 | A1 * | 5/2013 | Li | B62B 7/10 280/650 |
| 2013/0200672 | A1 | 8/2013 | Mo | |
| 2013/0328369 | A1 | 12/2013 | Mo | |
| 2014/0062151 | A1 | 3/2014 | Banghart et al. | |
| 2014/0159358 | A1 | 6/2014 | Chen et al. | |
| 2014/0300155 | A1 | 10/2014 | Lehman et al. | |
| 2014/0307310 | A1 | 10/2014 | Steiner et al. | |
| 2015/0115677 | A1 | 4/2015 | Pos | |
| 2016/0057968 | A1 | 3/2016 | Chandler | |
| 2016/0059744 | A1 | 3/2016 | Cohen et al. | |
| 2016/0229439 | A1 * | 8/2016 | Zhong | B62B 9/26 |
| 2017/0113577 | A1 | 4/2017 | Pos | |
| 2018/0022371 | A1 | 1/2018 | Jakubowski et al. | |
| 2018/0029625 | A1 | 2/2018 | Ruggiero et al. | |
| 2018/0086236 | A1 | 3/2018 | Henseler et al. | |
| 2018/0236900 | A1 | 8/2018 | Nieto et al. | |
| 2018/0251051 | A1 | 9/2018 | Anderson et al. | |
| 2019/0084449 | A1 | 3/2019 | Cohen et al. | |
| 2019/0092193 | A1 | 3/2019 | Houin | |
| 2019/0275949 | A1 | 9/2019 | Kubota | |
| 2019/0320613 | A1 | 10/2019 | Björnetun | |
| 2019/0343068 | A1 | 11/2019 | Depaulis | |
| 2020/0023755 | A1 | 1/2020 | Chiesa | |
| 2020/0269733 | A1 | 8/2020 | Heisey et al. | |
| 2020/0296919 | A1 | 9/2020 | Jakubowski et al. | |
| 2020/0331510 | A1 | 10/2020 | Kim | |
| 2021/0022314 | A1 | 1/2021 | Xiang | |
| 2021/0084864 | A1 | 3/2021 | Torres et al. | |
| 2021/0101634 | A1 | 4/2021 | Yoo | |

(56) References Cited

U.S. PATENT DOCUMENTS

| | | | |
|---|---|---|---|
| 2021/0127627 | A1 | 5/2021 | Jakubowski et al. |
| 2021/0179158 | A1* | 6/2021 | Yun .......................... B62B 9/14 |
| 2021/0259199 | A1 | 8/2021 | Lin et al. |
| 2021/0291886 | A1* | 9/2021 | Zehfuss .................. B62B 3/007 |
| 2021/0362765 | A1 | 11/2021 | Fan et al. |
| 2021/0380155 | A1 | 12/2021 | Ma et al. |
| 2022/0072979 | A1 | 3/2022 | Maciejczyk |
| 2022/0194271 | A1 | 6/2022 | Mason et al. |
| 2022/0227330 | A1 | 7/2022 | Klugo |
| 2022/0250513 | A1 | 8/2022 | Mason et al. |
| 2022/0295739 | A1 | 9/2022 | Yoskowitz |
| 2023/0078130 | A1 | 3/2023 | Longenecker et al. |
| 2023/0150402 | A1 | 5/2023 | Xiao |
| 2023/0182625 | A1 | 6/2023 | Chen |
| 2023/0182626 | A1 | 6/2023 | Chen |
| 2023/0191961 | A1 | 6/2023 | Maciejczyk |
| 2023/0242017 | A1 | 8/2023 | Mason et al. |
| 2023/0311723 | A1 | 10/2023 | Mason et al. |
| 2023/0382446 | A1 | 11/2023 | Crossgrove et al. |
| 2024/0075976 | A1 | 3/2024 | Jablonski |
| 2024/0092236 | A1 | 3/2024 | Williams |
| 2024/0181942 | A1 | 6/2024 | Maciejczyk |
| 2024/0317122 | A1 | 9/2024 | Mason et al. |
| 2025/0031662 | A1* | 1/2025 | Guo ..................... A01K 1/0254 |
| 2025/0089674 | A1 | 3/2025 | Guo et al. |
| 2025/0313251 | A1* | 10/2025 | Liu ........................... B62B 7/06 |
| 2025/0331493 | A1 | 10/2025 | Cheng et al. |

FOREIGN PATENT DOCUMENTS

| | | | |
|---|---|---|---|
| CN | 201022544 | Y | 2/2008 |
| CN | 101386275 | A | 3/2009 |
| CN | 201573566 | U | 9/2010 |
| CN | 201587342 | U | 9/2010 |
| CN | 102336154 | A | 2/2012 |
| CN | 202127690 | U | 2/2012 |
| CN | 102427965 | A | 4/2012 |
| CN | 102848940 | A | 1/2013 |
| CN | 102343842 | B | 4/2013 |
| CN | 103568891 | A | 2/2014 |
| CN | 103770828 | B | 1/2016 |
| CN | 106135022 | A | 11/2016 |
| CN | 106218459 | A | 12/2016 |
| CN | 106240525 | A | 12/2016 |
| CN | 106394337 | A | 2/2017 |
| CN | 107089172 | A | 8/2017 |
| CN | 107410083 | A | 12/2017 |
| CN | 107637531 | A | 1/2018 |
| CN | 108045425 | A | 5/2018 |
| CN | 108099704 | A | 6/2018 |
| CN | 108433443 | A | 8/2018 |
| CN | 108688527 | A | 10/2018 |
| CN | 108790973 | A | 11/2018 |
| CN | 109305074 | A | 2/2019 |
| CN | 107662633 | B | 6/2019 |
| CN | 110091774 | A | 8/2019 |
| CN | 209284725 | U | 8/2019 |
| CN | 209498187 | U | 10/2019 |
| CN | 209861910 | U | 12/2019 |
| CN | 110775133 | A | 2/2020 |
| CN | 110979441 | A | 4/2020 |
| CN | 212212287 | U | 12/2020 |
| CN | 212685696 | U | 3/2021 |
| CN | 212890543 | | 4/2021 |
| CN | 213138903 | | 5/2021 |
| CN | 109843643 | B | 6/2021 |
| CN | 213974155 | U | 8/2021 |
| CN | 113665659 | A | 11/2021 |
| CN | 113665660 | A | 11/2021 |
| CN | 214593477 | U | 11/2021 |
| CN | 113734265 | A | 12/2021 |
| CN | 215012471 | U | 12/2021 |
| CN | 114364571 | A | 4/2022 |
| CN | 216533131 | U | 5/2022 |
| CN | 114641409 | A | 6/2022 |
| CN | 218851568 | U | 4/2023 |
| CN | 108739438 | B | 9/2023 |
| CN | 117207866 | A | 12/2023 |
| DE | 202013103192 | U1 | 10/2013 |
| EP | 3453563 | A1 | 3/2019 |
| FR | 2736609 | A1 | 1/1997 |
| FR | 2789642 | A1 | 8/2000 |
| FR | 2914602 | A1 | 10/2008 |
| GB | 753337 | A | 7/1956 |
| GB | 2326101 | A | 12/1998 |
| GB | 2501178 | A | 10/2013 |
| GB | 2549526 | A | 10/2017 |
| GB | 2597331 | A | 1/2022 |
| JP | H01152559 | U | 10/1989 |
| JP | 2505602 | Y | 5/1996 |
| JP | H08301124 | A | 11/1996 |
| JP | H1111193 | A | 1/1999 |
| JP | 2000127815 | A | 5/2000 |
| JP | 2001105941 | A | 4/2001 |
| JP | 2001354143 | A | 12/2001 |
| JP | 2003274781 | A | 9/2003 |
| JP | 2005245388 | A | 9/2005 |
| JP | 2006151299 | A | 6/2006 |
| JP | 3127413 | | 11/2006 |
| JP | 3130171 | | 2/2007 |
| JP | 2007022128 | A | 2/2007 |
| JP | 2007097796 | A | 4/2007 |
| JP | 2007168581 | A | 7/2007 |
| JP | 2010519094 | A | 6/2010 |
| JP | 2010263890 | A | 11/2010 |
| JP | 2012148641 | A | 8/2012 |
| JP | 2013516352 | A | 5/2013 |
| JP | 2013106557 | A | 6/2013 |
| JP | 2015112935 | A | 6/2015 |
| JP | 2016512482 | A | 4/2016 |
| JP | 2017074849 | A | 4/2017 |
| JP | 2017205081 | A | 11/2017 |
| JP | 2018043710 | A | 3/2018 |
| JP | 3218427 | | 9/2018 |
| JP | 2018144805 | A | 9/2018 |
| JP | 2019181069 | A | 10/2019 |
| JP | 3237650 | | 5/2022 |
| JP | 3239477 | | 10/2022 |
| JP | 2023522684 | A | 5/2023 |
| JP | 2024052885 | A | 4/2024 |
| KR | 20060010115 | A | 2/2006 |
| KR | 20140052277 | A | 5/2014 |
| KR | 102297091 | B1 | 8/2021 |
| KR | 20210096845 | A | 8/2021 |
| KR | 20220049822 | A | 4/2022 |
| KR | 20220087355 | A | 6/2022 |
| KR | 102436990 | B1 | 8/2022 |
| TW | 200916350 | A | 4/2009 |
| TW | I645776 | B | 1/2019 |
| TW | I728113 | B | 5/2021 |
| TW | 202229047 | A | 8/2022 |
| TW | 202233101 | A | 9/2022 |
| WO | 2014071987 | A1 | 5/2014 |
| WO | 2016183156 | A1 | 11/2016 |
| WO | 2019054652 | A1 | 3/2019 |
| WO | 2021030243 | A1 | 2/2021 |
| WO | 2021229051 | A1 | 11/2021 |
| WO | 2022159797 | A1 | 7/2022 |
| WO | 2022160403 | A1 | 8/2022 |
| WO | 2023234870 | A2 | 12/2023 |
| WO | 2024010527 | A2 | 1/2024 |
| WO | 2024054160 | A1 | 3/2024 |
| WO | 2024155240 | A1 | 7/2024 |
| WO | 2024172762 | A1 | 8/2024 |

OTHER PUBLICATIONS

International Search Report with English translation for International Application No. PCT/SG2023/050474; International Filing Date: Jul. 6, 2023; Date of Mailing: Dec. 7, 2023; 11 pages.

International Search Report with English translation for International Application No. PCT/SG2023/050611; International Filing Date: Sep. 8, 2023; Date of Mailing: Jan. 26, 2024; 11 pages.

(56) References Cited

OTHER PUBLICATIONS

International Search Report with English translation for International Application No. PCT/SG2024/050040; International Filing Date: Jan. 18, 2024; Date of Mailing: Apr. 24, 2024; 11 pages.
International Search Report with English translation for International Application No. PCT/SG2024/050065; International Filing Date: Feb. 7, 2024; Date of Mailing: May 24, 2024; 7 pages.
International Search Report with English translation for International Application No. PCT/SG2023/050609; International Filing Date: Sep. 8, 2023; Date of Mailing: Jan. 22, 2024; 13 pages.
Taiwanese Application No. 112120774; First Office Action dated Jan. 10, 2024; 7 pages.
Taiwanese Application No. 112125296; First Office Action dated May 28, 2024; 6 pages.
Taiwanese Application No. 112134349; First Office Action dated Aug. 23, 2024; 12 pages.
Written Opinion for International Application No. PCT/SG2023/050398; International Filing Date: Jun. 1, 2023; Date of Mailing: Nov. 23, 2023; 7 pages.
Written Opinion for International Application No. PCT/SG2023/050474; International Filing Date: Jul. 6, 2023; Date of Mailing: Dec. 7, 2023; 8 pages.
Written Opinion for International Application No. PCT/SG2023/050611; International Filing Date: Sep. 8, 2023; Date of Mailing: Jan. 26, 2024; 11 pages.
Written Opinion for International Application No. PCT/SG2024/050040; International Filing Date: Jan. 18, 2024; Date of Mailing: Apr. 24, 2024; 8 pages.
Written Opinion for International Application No. PCT/SG2024/050065; International Filing Date: Feb. 7, 2024; Date of Mailing: May 24, 2024; 6 pages.
Written Opinion for International Application No. PCT/SG2023/050609; International Filing Date: Sep. 8, 2023; Date of Mailing: Jan. 22, 2024; 10 pages.
Advisory Action; U.S. Appl. No. 17/609,590; Filed Nov. 8, 2021; Kyle S. Mason; Date Mailed: Apr. 2, 2024; pp. 1-5.
Chinese Application No. 202021649884.0 filed Aug. 10, 2020; Notice of Allowance dated Nov. 3, 2021; 2 pages.
Chinese Application No. 202220219392.0 filed Jan. 25, 2022; Notice of Allowance dated Jun. 30, 2022; 4 pages.
Coroflot.com [online]; retrieved on Oct. 4, 2021; retrieved from the internet Product Design by Paul Morgado at Coroflot.com, "Simplicity Infant Car Seat," Coroflot.com, 11/12, Oct. 4, 21; pp. 1-1https://www.coroflot.com/pmorgado/Product-Design.
European Application No. 20852328.2 filed Aug. 10, 2020; EPO Communication pursuant to Rules 161 and 162 EPC dated Mar. 16, 2022; 3 pages.
European Application No. 20852328.2 filed Mar. 3, 2022; European Search Report dated Aug. 3, 2023; 8 pages.
European Application No. 22743312.5-1009; Extended European Search Report dated Jul. 3, 2024; 8 pages.
European Application No. 24202026.1; European Search Report dated Dec. 19, 2024; 9 pages.
European Application No. 24202026.1; Extended European Search Report dated Dec. 19, 2024; 9 pages.
European Application No. 24203319.9; Extended European Search Report dated Jan. 9, 2025; 9 pages.
Extended European Search Report Communication; Application No. 23191952.3-1012/4253141; Date Mailed: Dec. 7, 2023; pp. 1-7.
Final Office Action for U.S. Appl. No. 17/669,838; Application Filing Date: Feb. 11, 2022; Date of Notification: Nov. 8, 2022, 09 pages.
German Application No. 212020000696 filed Aug. 10, 2020; German Office Action dated Mar. 14, 2022; 2 pages.
German Application No. 212020000696 filed Aug. 10, 2020; German Office Action dated May 18, 2022; 1 page.
German Application No. 212020000696 filed Aug. 10, 2020; German Office Action dated Jul. 4, 2022; 1 page.
International Preliminary Report on Patentability; International Application No. PCT/US2022/013472; International Filing Date: Jan. 24, 2022; Date of Mailing: Aug. 3, 2023; 10 pages.
International Search Report & Written Opinion for International Application No. PCT/SG2024/050617; International Filing Date: Sep. 24, 2024; Date of Mailing: Dec. 20, 2024; 39 pages.
International Search Report for International Application No. PCT/US2024/012746; International Filing Date: Jan. 24, 2024; Date of Mailing: Jun. 27, 2024; 5 pages.
International Search Report for International Application No. PCT/US2024/014768; International Filing Date: Feb. 7, 2024; Date of Mailing: Jul. 18, 2024; 4 pages.
Invitation to Pay Additional Fees; International Application No. PCT/US2024/012746; International Filing Date: Jan. 24, 2024; Date of Mailing: Apr. 23, 2024; 3 pages.
Invitation to Pay Additional Fees; International Application No. PCT/US2024/014768; International Filing Date: Feb. 7, 2024; Date of Mailing: Apr. 23, 2024; 2 pages.
ISOFIX—Wikipedia, retrieved Dec. 7, 2022 from: https://en.wikipedia.org/w/index.php?title+isofix&oldid +884783492, 3 pages.
Japanese Patent Application No. 2022-506432; Notice of Reasons for Refusal with English translation dated Jul. 30, 2024; 10 pages.
Japanese Patent Application No. 2022-506432; Office Action dated Mar. 11, 2025; 3 pages.
Japanese Patent Application No. 2023-129410; Office Action dated Apr. 1, 2025; 5 pages.
Japanese Patent Application No. 2023-129410; Office Action with English translation dated Sep. 3, 2024; 14 pages.
Korean Application No. 10-2022-7000641; Office Action dated Feb. 24, 2025; 83 pages.
Korean Patent Application No. 10-2023-7027324; Office Action dated Mar. 28, 2025; 92 pages.
Non-Final Office Action for U.S. Appl. No. 17/609,590; Application Filing Date: Nov. 8, 2021; Date of Notification: May 6, 2024, pp. 1-14.
Non-Final Office Action for U.S. Appl. No. 17/609,590; Application Filing Date: Nov. 8, 2021; Date of Notification: Oct. 4, 2023, pp. 1-33.
Non-Final Office Action for U.S. Appl. No. 17/669,838; Application Filing Date: Feb. 11, 2022; Date of Notification: Jul. 28, 2022, 19 pages.
Non-Final Office Action for U.S. Appl. No. 18/332,217; Application Filing Date: Jun. 9, 2023; Date of Notification: Oct. 25, 2023, 25 pages.
Written Opinion for International Application No. PCT/US2024/014768; International Filing Date: Feb. 7, 2024; Date of Mailing: Jul. 18, 2024; 8 pages.
PCT ISR—Written Opinion of the International Searching Authority; International Application No. PCT/US2020/045576; International Filing Date: Aug. 10, 2020; Date of Mailing: Oct. 22, 2020; pp. 1-26.
PCT Notification of Transmittal of the International Search Report and The Written Opinion of the International Searching Authority, or the Declaration; International Application No. PCT/US2022/013472; International Filing Date: Jan. 24, 2022; Date of Mailing: Apr. 5, 2022; pp. 1-20.
Taiwanese Application No. 112134349; Office Action with English translation dated Aug. 23, 2024; 34 pages.
Taiwanese Application No. 112134409; Office Action dated Dec. 9, 2024; 25 pages.
Taiwanese Application No. 113102129; Office Action dated Oct. 9, 2024; 28 pages.
Taiwanese Application No. 113120902; Office Action dated Jan. 13, 2025; 22 pages.
Taiwanese Application No. 113121067; Office Action with English translation dated Feb. 25, 2025; 9 pages.
Taiwanese Patent Application No. 109127112 filed Aug. 10, 2020; Taiwanese Office Action dated Sep. 27, 2022; 7 pages.
Taiwanese Patent Application No. 109127112 filed Aug. 10, 2020; Taiwanese Search Report dated Nov. 30, 2021; 3 pages.
Third Party Observation for European Application No. 20852328.2; Date of Communication: Dec. 15, 2022; Date of Search: Dec. 8, 2022; 5 pages.

(56) References Cited

OTHER PUBLICATIONS

U.S. Appl. No. 18/295,529; Non-Final Office Action dated Feb. 20, 2025; 60 pages.
US Final Office Action; U.S. Appl. No. 18/332,217; Filed: Jun. 9, 2023; Kyle S. Mason; Date Mailed: Jan. 26, 2024; pp. 1-15.
Written Opinion for International Application No. PCT/US2024/012746; International Filing Date: Jan. 24, 2024; Date of Mailing: Jun. 27, 2024; 29 pages.
Chinese Application No. 2024202872653; 1st Office Action with English translation dated Oct. 12, 2024; 3 pages.
International Search Report with English translation for International Application No. PCT/SG2024/050385; International Filing Date: Jun. 7, 2024; Date of Mailing: Sep. 12, 2024; 28 pages.
Taiwanese Application No. 113104670; 1st Office Action dated Sep. 23, 2024; 37 pages.
JP 1st Office Action with English Translation; JP Appl No. 2024-548482; Date Mailed Jul. 29, 2025; pp. 1-8.
JP Search Report with English Translation; JP Appl No. 2024-548482; Date Mailed Jun. 30, 2025; pp. 1-47.
EP Communication; Extended European Search Report; Application No. 23863590.8; Date Mailed: Apr. 22, 2025; pp. 1-9.
AU Examination Report No. 1; Appl No. 2023280730; Date Mailed: Sep. 18, 2025; pp. 1-8.
JP Notice of Allowance with English Translation; Appl No. 2024-161628; Date Mailed: Nov. 4, 2025; pp. 1-5.
JP Office Action with English Translation; JP Appl No. 2024-570596; Date Mailed: Oct. 14, 2025; pp. 1-8.
JP Office Action with English Translation; Jp Appl No. 2024-171996; Mail Date: Oct. 21, 2025; pp. 1-8.
JP Search Report with English Translation; Appl No. 2024-171996; Date Mailed:Sep. 12, 2025; pp. 1-58.
JP Search Report with English Translation; JP Appl No. 2024-570596; Date Mailed: Oct. 10, 2025; pp. 1-42.
SureLoc Pet Carriers Using The Same Technology As Children's Safety Seats [viewed on internet on Sep. 17, 2025]<URL: https://www.youtube.com/watch?v=PpHBCcHrNDM >, published on Jun. 9, 2020; pp. 1-4.
JP Search Report with English Translation; Application No. 2025-514641; Date Mailed: Jan. 30, 2026; pp. 1-26.
US Non-Final Office Action, U.S. Appl. No. 18/887,132, mailed May 12, 2026, 91 pages.
US Non-Final Office Action, U.S. Appl. No. 18/904,659, mailed Jun. 10, 2026, 98 pages.
U.S. Non-Final Office Action; U.S. Appl. No. 19/110,316; Filing Date: Mar. 10, 2025; Zhengwen Guo, Date Mailed: Sept 9, 2026; pp. 1-78.
JP 2nd Office Action with English Translation; App No. 2025-514641; Date Mailed: Sep. 1, 2026; pp. 1-8.

* cited by examiner

1240'

120'

3200

CARRIER, LOCKING BASE ASSEMBLY, SUPPORTING FRAME AND WHEELED CARRYING APPARATUS

CROSS REFERENCE TO RELATED APPLICATIONS

This application is a National Stage application of PCT/SG2023/050609, filed on Sep. 8, 2023, which claims the benefit of Chinese Application No. 202211105958.8, filed on Sep. 8, 2022, and Chinese Patent Application No. 202211393615.6, filed on Nov. 8, 2022, and Chinese Patent Application No. 202211667675.2, filed on Dec. 23, 2022, and Chinese Patent Application No. 202310085067.9, filed on Jan. 18, 2023, and Chinese Patent Application No. 202310115845.4, filed on Feb. 14, 2023, and Chinese Patent Application No. 202310193406.5, filed on Mar. 2, 2023, the contents of which are incorporated in their entirety herein.

FIELD

The present disclosure relates to a carrier and a wheeled carrying apparatus mounted with the carrier, and more particularly, to a carrier for carrying animals, a wheeled carrying apparatus mounted with the carrier, and a locking base assembly for mounting the carrier on the wheeled carrying apparatus.

BACKGROUND

When traveling with an animal, the user can use a hand-held carrier to carry and move the animal. For convenient and effortless movement of the carrier, the carrier may be mounted on a carrying apparatus, so that it may move together with a carrying apparatus.

SUMMARY

The present disclosure relates to a carrier. The carrier includes a carrying portion and a bracket device. The carrying portion includes a bottom portion, and a carrying space is formed on the bottom portion. The bracket device includes a first bracket combined to the carrying portion and disposed around a periphery of the carrying portion; and a second bracket connected to the first bracket and combined to the carrying portion. The second bracket extends from one side of the periphery of the carrying portion to the other side of the periphery of the carrying portion through the bottom portion of the carrying portion.

In an embodiment, the bracket device further includes a third bracket located at a side of the bottom portion of the carrying portion for fixing the carrier to a carrying apparatus; and a fixing assembly connecting the carrying portion with the third bracket. A lower surface of the bottom portion constitutes a bottom surface of the carrying portion, and the third bracket is disposed to be spaced apart from the bottom surface of the carrying portion through the fixing assembly.

The present disclosure provides a carrier. The carrier includes a loading part and a bracket device. The loading part includes a bottom portion, and a loading space is formed on the bottom portion. The bracket device includes a first bracket, a second bracket and a third bracket. The first bracket is combined to the loading part and disposed around a periphery of the loading part. The second bracket is connected to the first bracket and is combined to the loading part. The second bracket extends from one side of the periphery of the loading part to the other side of the periphery of the loading part through the bottom portion of the loading part. The third bracket is located at a side of the bottom portion of the loading part, for fixing the carrier to a carrying apparatus. The third bracket has an annular structural element.

In an embodiment, the bracket device further includes a fixing assembly connecting the loading part with the third bracket. A lower surface of the bottom portion constitutes a bottom surface of the loading part, and the third bracket is disposed to be spaced apart from the bottom surface of the loading part through the fixing assembly.

In an embodiment, the second bracket is a U-shaped structural element, and the second bracket has two vertical parts and a transverse part. The two vertical parts are substantially vertically connected to the first bracket, and the transverse part is substantially vertically connected to the fixing assembly.

In an embodiment, the carrying portion is a main body. The main body further includes a peripheral wall connected with the bottom portion, and the bottom portion and the peripheral wall form the carrying space.

In an embodiment, the fixing assembly includes a first connecting bracket connecting the second bracket and the third bracket.

In an embodiment, the fixing assembly further includes a bracket connecting element. The bottom portion of the main body is provided with a through slot, which is located at a position corresponding to the first connecting bracket, and the bracket connecting element is at least partially located within the through slot and abuts against the second bracket.

In an embodiment, the fixing assembly further includes a securing combination including a securing element and a matching element. The matching element is disposed to the bracket connecting element. The securing element passes through the third bracket, the first connecting bracket, the second bracket and the bracket connecting element and is mutually locked with the matching element.

In an embodiment, the fixing assembly further includes a guide connected to the third bracket and located at a position corresponding to the first connecting bracket for guiding the third bracket to cooperate with an engaging structure of the carrying apparatus.

In an embodiment, the fixing assembly further includes a securing combination including a securing element and a matching element, wherein the matching element is disposed to the bracket connecting element, and the securing element passes through the guide, the third bracket, the first connecting bracket, the second bracket and the bracket connecting element and is mutually locked with the matching element.

In an embodiment, the fixing assembly further includes a second connecting bracket connecting the main body with the third bracket.

In an embodiment, the fixing assembly further includes a bracket connecting element. The bottom portion of the main body is provided with a through slot. The second connecting bracket is connected to the third bracket and at least partially located within the through slot. The bracket connecting element is at least partially located within the second connecting bracket, and abuts against the second connecting bracket.

In an embodiment, the fixing assembly further includes a securing combination including a securing element and a matching element. The matching element is disposed to the bracket connecting element, and the securing element passes through the third bracket, the second connecting bracket and the bracket connecting element and is mutually locked and fixed with the matching element.

In an embodiment, the bracket connecting element includes a recess, and the matching element is accommodated in the recess and does not protrude from the bracket connecting element.

In an embodiment, the bottom portion of the main body is provided with a groove, and the bracket connecting element is partially accommodated in the groove and does not protrude from the bottom portion of the main body.

In an embodiment, the third bracket includes an engaging element cooperated with an engaging structure correspondingly disposed on the carrying apparatus; and a structural reinforcement element, two ends of which are respectively connected to the engaging element, and which is located at an approximate middle position of the engaging element in a longitudinal direction.

In an embodiment, the third bracket further includes other structural reinforcement element extending in a transverse direction of the main body and connected to the engaging element, and disposed on at least one side of the engaging element.

In an embodiment, the engaging element is an annular structural element, and a center of the engaging element is approximately coincident with a center of the first bracket.

In an embodiment, the third bracket includes two other structural reinforcement elements. The two other structural reinforcement elements are respectively disposed on both sides of the engaging element.

In an embodiment, a central portion of the structural reinforcement element is bent towards the bottom portion of the carrying portion and configured to abut against the bottom portion of the carrying portion.

In an embodiment, a carrier belt having a T-shaped structure is disposed on the bottom portion of the main body. The carrier belt has a longitudinal section and a transverse section. The transverse section forms a first end and a second end of the carrier belt, each of which passes through and is fixed to a corresponding through slot on the bottom portion of the main body. One end of the longitudinal section is connected to the transverse section, and the other end of the longitudinal section is a free end and forms a third end of the carrier belt.

In an embodiment, the main body is further provided with an impact protection device, and the impact protection device is disposed on at least one side of the main body and located at an inner side of the peripheral wall of the main body.

In an embodiment, the peripheral wall of the main body is provided with a plurality of air holes.

In an embodiment, the carrying portion is provided with a cushion, and the cushion comprises a supporting layer, a soft layer and a coating layer. The supporting layer and the soft layer are laminated and encapsulated in the coating layer.

BRIEF DESCRIPTION OF THE DRAWINGS

The accompanying drawings are included in the present disclosure to provide a further understanding of the present disclosure and are incorporated in and constitute a part of this specification. The accompanying drawings illustrate embodiments of the present disclosure and together with the description below serve to explain a concept of the present disclosure.

FIGS. 90A and 90B show perspective views of a carrier according to another embodiment of the present disclosure.

FIGS. 91A to 91C show views of a cushion shown in FIG. 90B.

DETAILED DESCRIPTION

Hereinafter, exemplary embodiments of the present disclosure will be described in detail with reference to the accompanying drawings, while the present disclosure is susceptible to various modifications and alternative forms, specific embodiments thereof are shown by way of example in the accompanying drawings. However, the present disclosure should not be construed as limiting to the embodiments set forth herein. Rather, the present disclosure will cover all modifications, equivalents and alternatives falling within the spirit and scope of the present disclosure.

The present disclosure will be described in detail with reference to the accompanying drawings.

When traveling with an animal, the user can use a hand-held carrier to carry and move the animal. For convenient and effortless movement of the hand-held carrier, the carrier may be mounted on a carrying apparatus, so that it can move together with the carrying apparatus.

In a first aspect of the present disclosure, a wheeled carrying apparatus 11 having a locking function is provided.

Figure 1A:
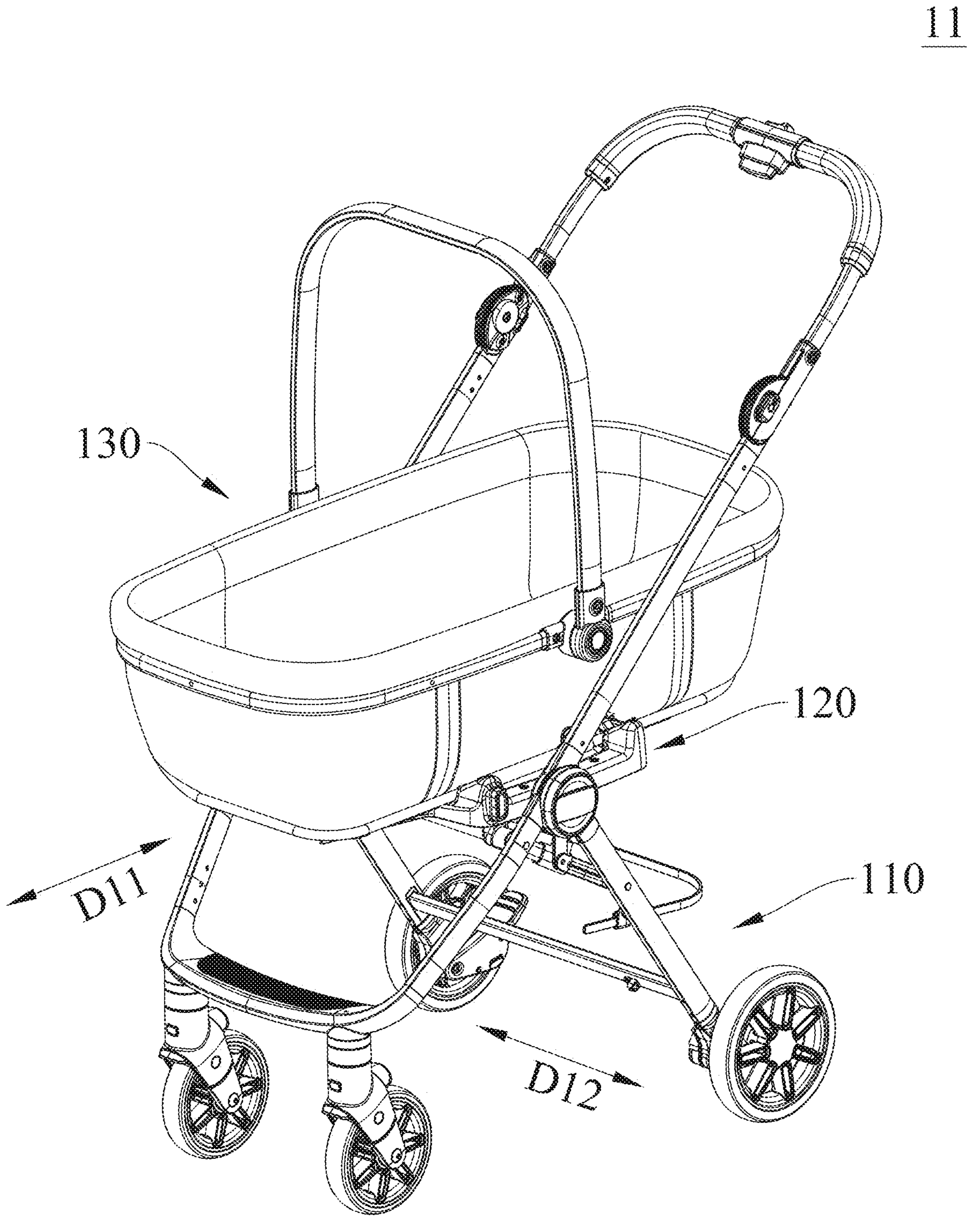
FIGS. 1A to 1D schematically show a wheeled carrying apparatus according to an embodiment of a first aspect of the present disclosure, in which a main body of a carrier is removed in FIGS. 1C and 1D to show the connection of a bracket device of the carrier with a locking mechanism.
Figure 1B:
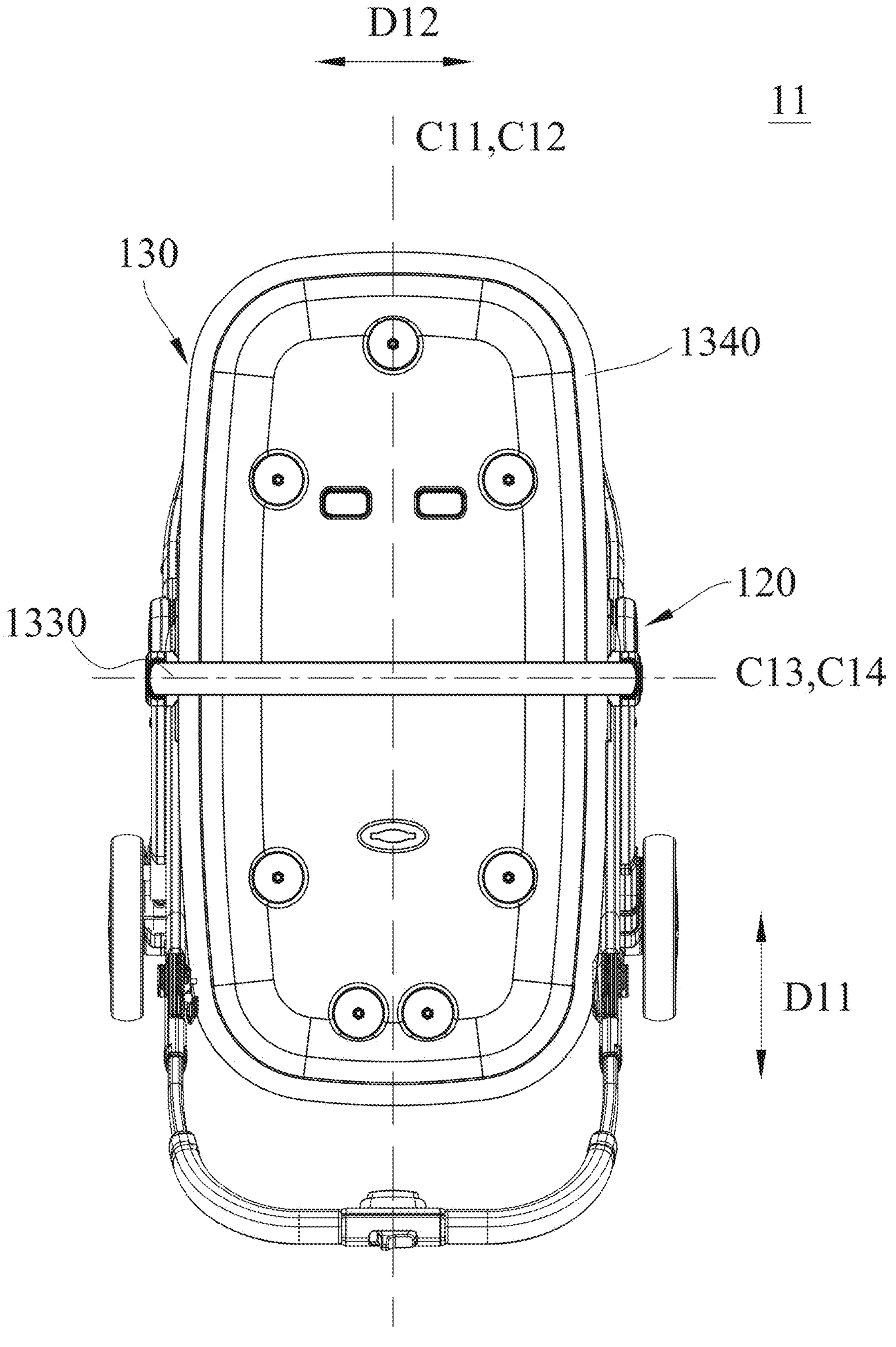

Referring to FIGS. 1A and 1B, the wheeled carrying apparatus 11 according to an embodiment of the first aspect of the present disclosure is schematically shown. FIG. 1A is a perspective view of the wheeled carrying apparatus 11 of this embodiment, and FIG. 1B is a top perspective view of the wheeled carrying apparatus 11.

As shown in FIG. 1A, the wheeled carrying apparatus 11 of this embodiment includes a carrying frame 110, a locking base assembly 120 and a carrier 130. The carrying frame 110 has a structure similar to trolley, and its specific structure will be described below. The locking base assembly 120 is mounted on the carrying frame 110, and may lock and unlock (i.e., release) the object to be locked (also referred to as "object to be engaged", hereinafter uniformly referred to as "object"), so that the object can be firmly placed thereon, thereby improving the safety of the object during the movement. Furthermore, by operating the locking base assembly 120, the user can conveniently mount the object onto the carrying frame 110 or detach the object from the carrying frame 110.

In this embodiment, as shown in FIG. 1A, the object may be the carrier 130. The carrier 130 has a box-shaped structure for carrying the animal (such as a pet) and may be mounted on the carrying frame 110 through the locking base assembly 120.

Referring to FIG. 1B, the carrier 130 includes a grip 1330 for lifting the carrier 130 and a main body 1340 (also referred to "box body") for carrying the animal. When the carrier 130 is mounted on the locking base assembly 120, a longitudinal centerline C11 of the carrier 130 and a longitudinal centerline C12 of the locking base assembly 120 are substantially on the same vertical plane, that is, the carrier 130 is substantially symmetrically disposed with respect to the longitudinal centerline C12 of the locking base assembly 120. It should be noted that a term "longitudinal centerline" refers to a centerline perpendicular to a connecting line between two ends of the grip 1330 on the carrier 130, and a direction indicated by "D11" in FIG. 1B (i.e., the longitudinal direction D11) is a longitudinal extension direction parallel to the longitudinal centerlines C11 and C12.

In an embodiment, as shown in FIG. 1B, a transverse centerline C13 of the carrier 130 and a transverse centerline C14 of the locking base assembly 120 are substantially on the same vertical plane. At this time, the carrier 130 is substantially centered with respect to the locking base assembly 120. It should be noted that a term "transverse centerline" refers to a centerline parallel to the connecting line between the two ends of the grip 1330, and a direction indicated by "D12" in FIG. 1B (i.e., the transverse direction D12) is a transverse extension direction parallel to the transverse centerlines C13 and C14. In an example, the connecting line between the two ends of the grip 1330 and the transverse centerline C13 of the carrier 130 are parallel to each other and located on the same vertical plane, so that the user can keep the carrier 130 balanced when holding it by the grip 1330.

Figure 1C:
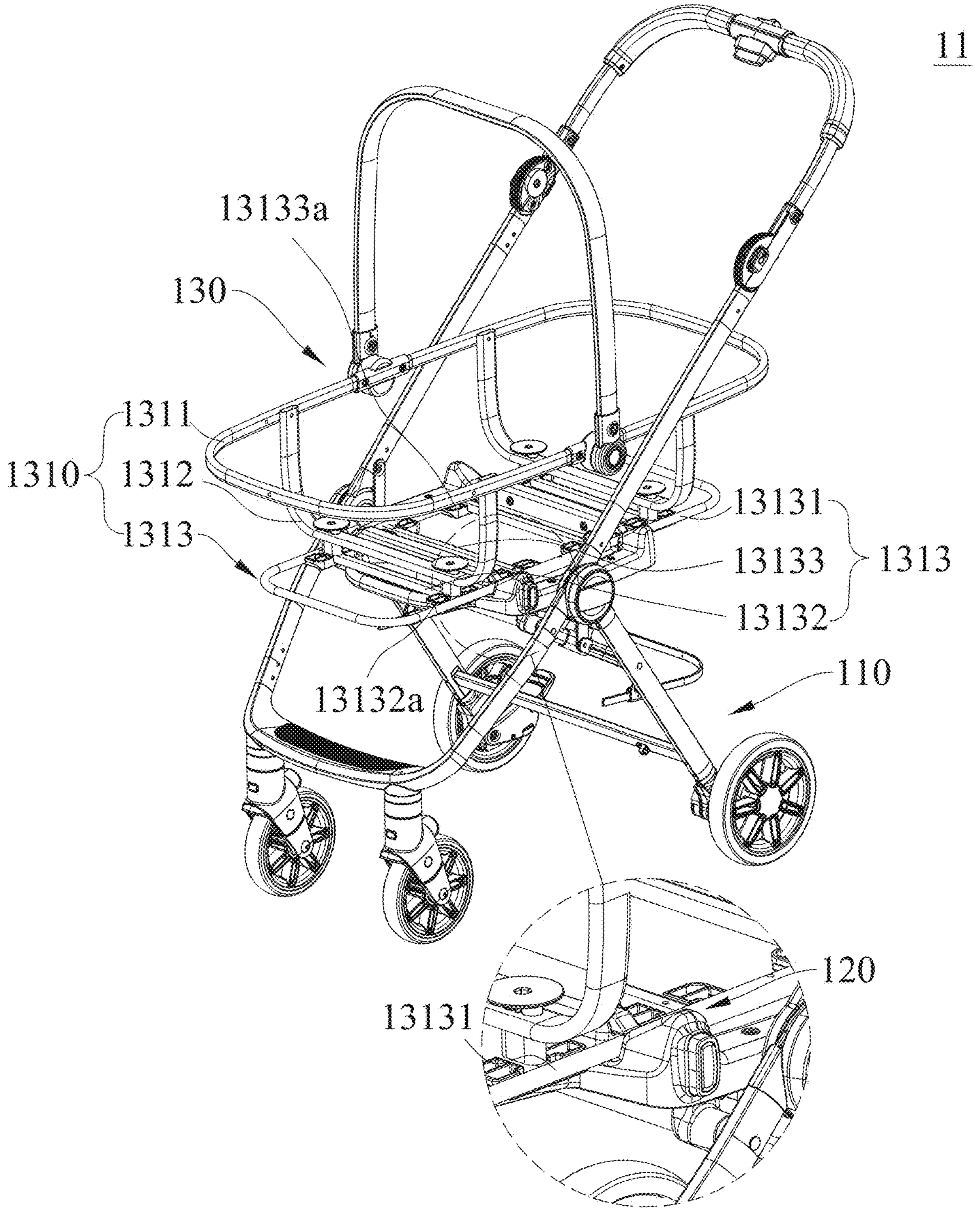
Figure 1D:
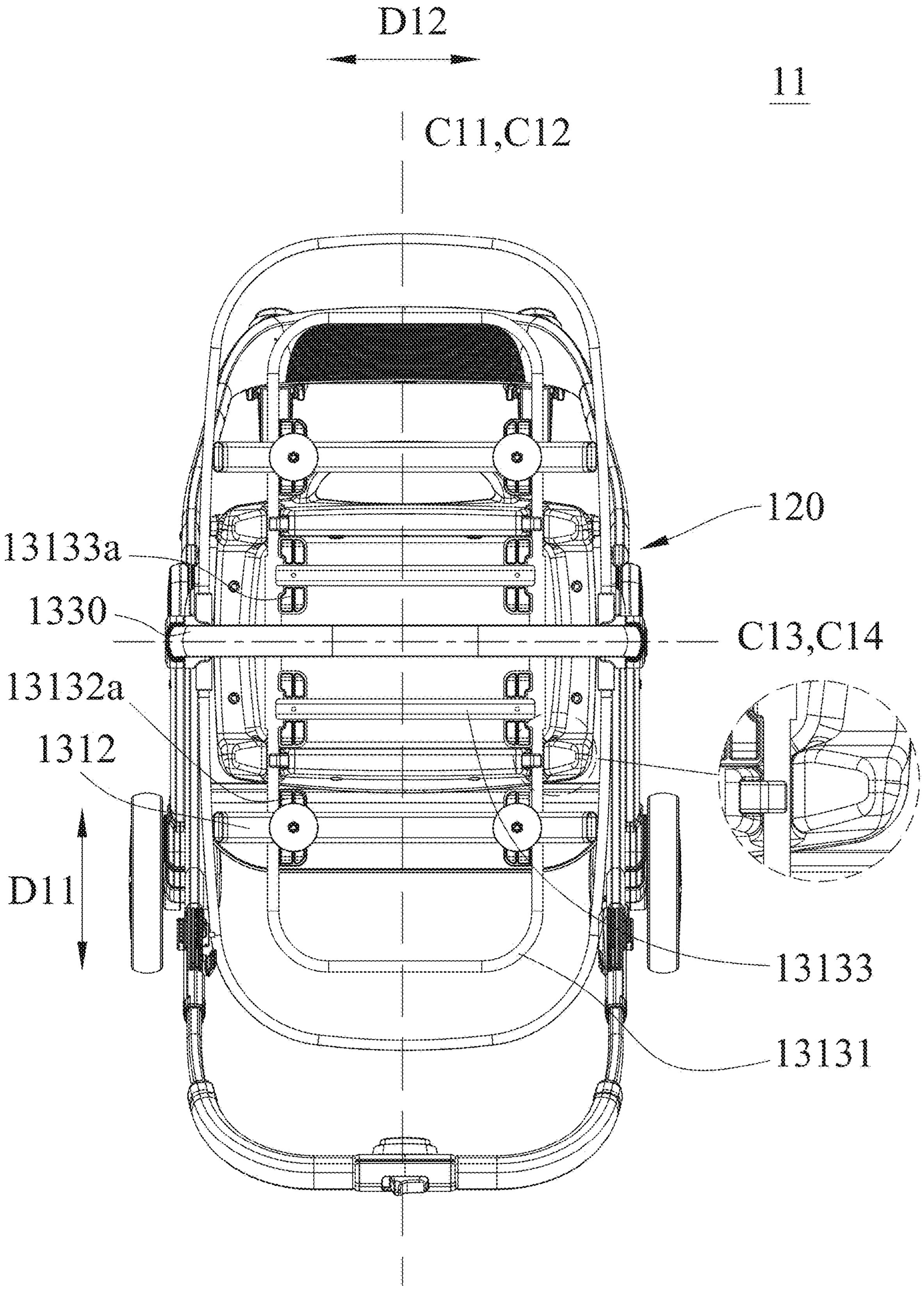

Referring to FIGS. 1C and 1D, FIG. 1C is a perspective view of the wheeled carrying apparatus 11 after the main body of the carrier 130 is removed, and FIG. 1D is a top perspective view of the wheeled carrying apparatus 11 after the main body is removed.

As shown in FIGS. 1C and 1D, the carrier 130 further includes a bracket device 1310 including a first bracket 1311, a second bracket 1312 and a third bracket 1313. When the carrier 130 is mounted on the locking base assembly 120, the bracket device 1310 (for example, the third bracket 1313) of the carrier 130 is engaged with the locking base assembly 120, so that the carrier 130 may be stably mounted on the carrying frame 110 through the locking base assembly 120. In the bracket device 1310, the first bracket 1311 has a substantially rectangular structure, which is generally horizontally disposed at an upper end of the bracket device 1310 and is configured as an upper frame of the bracket device 1310, and is used for connecting with the grip 1330. The third bracket 1313 is generally horizontally disposed at a lower end of the bracket device 1310 for engaging with the locking base assembly 120 (as shown in the partial enlarged view in FIG. 1C). The second bracket 1312 is connected between the first bracket 1311 and the third bracket 1313. In an embodiment, the second bracket 1312 includes a plurality of U-shaped structures disposed in parallel and forms a side frame and a bottom frame of the bracket device 1310, so as to contact and support a side surface and a bottom surface of the main body 1340 of the carrier 130 (for the sake of clearly describing the bracket device 1310, the main body 1340 is not shown in FIG. 1C, and FIG. 1B may be further referred to). That is, it can be seen from FIGS. 1B and 1C that the second bracket 1312 extends from one side of a periphery of the main body 1340 (i.e., the carrying portion) to the other side of the periphery of the main body 1340 through the bottom surface of the main body 1340.

In an embodiment, as shown in FIGS. 1C and 1D, the third bracket 1313 includes an engaging element 13131, two first structural reinforcement elements 13132, and a second structural reinforcement element 13133. The engaging element 13131 has an annular structural element (for example, a substantially rectangular annular structure). The two first structural reinforcement elements 13132 are respectively connected with the engaging element 13132 (for example, two ends thereof are respectively connected to two opposite long sides of the annular structural element of the engaging element 13131), and are disposed separately from each other and substantially extend in the transverse direction D12 of the carrier 130. In an example, as shown in FIG. 1C, the two first structural reinforcement elements 13132 are respectively disposed at a lower end of the second bracket 1312 (for example, a lower side of the U-shaped structure of the second bracket 1312), and are fixedly connected with the second bracket 1312 to play a supporting and fixing role. For example, two first structural reinforcement elements 13132 may be symmetrically disposed with respect to the transverse centerline C13 of the carrier 130. The second structural reinforcement element 13133 is substantially vertically connected between two opposite sides (e.g., two long sides of the rectangular structure) of the annular structural element of the engaging element 13131, to enhance the impact resistance of an overall structure of the third bracket 1313. In this embodiment, the third bracket 1313 may include at least one second structural reinforcement element 13133. Optionally, as shown in FIG. 1D, the third bracket 1313 includes two second structural reinforcement elements 13133 symmetrically disposed with respect to the transverse centerline C13 of the carrier 130, providing positioning guidance to assist the carrier 130 to be locked in a substantially central position, thereby improving the stability of the carrier 130 when being mounted in the wheeled carrying apparatus 11. By providing at least one second structural reinforcement element 13133, the impact resistance of the overall structure of the third bracket 1313 can be further enhanced. In an example, as shown in FIGS. 1C and 1D, the second structural reinforcement element 13133 is spaced apart from the first structural reinforcement element 13132.

In an example, the at least one second structural reinforcement element 13133 may be configured as a separate component connected with the engaging element 13131. In an alternative example, the at least one second structural reinforcement element 13133 may also be configured to be integrally formed with the engaging element 13131.

In an example, each of the first structural reinforcement element 13132 and the second structural reinforcement element 13133 has two ends, and a plurality of guides 13132*a* and 13133*a* may be disposed on both sides of each of the two ends, so as to further limit the engaging position of the carrier 130 on the locking base assembly 120 and reduce movement range of the carrier 130 in the longitudinal direction D11 when it is mounted on the locking base assembly 120.

According to an embodiment of the present disclosure, as shown in FIG. 1D (in which one engagement point is shown in a partial enlarged view), when the carrier 130 is mounted on the locking base assembly 120, there are a plurality of engagement points, for example, four engagement points. These four engaging points are generally symmetrically distributed with respect to the longitudinal centerline C11 of the carrier 130 (and the longitudinal centerline C12 of the locking base assembly 120), and symmetrically distributed with respect to the transverse centerline C13 of the carrier 130 (and the transverse centerline C14 of the locking base assembly 120). For example, these four engaging points are disposed on the locking base assembly 120 in a central symmetry. In an embodiment, a plurality of engaging points are located between two first structural reinforcement elements 13132 (as shown in FIG. 1C, the first structural reinforcement element in FIG. 1D is shielded by the second bracket 1312), and further, located between the first structural reinforcement element 13132 and the second structural reinforcement element 13133. For example, in the embodiment where two second structural reinforcement elements 13133 are provided, the two second structural reinforcement elements 13133 may be provided between the structural reinforcement elements 13132, and all of the plurality of engagement points are located between the two first structural reinforcement elements 13132 and their adjacent second structural reinforcement elements 13133.

According to the embodiment of the present disclosure, the carrier 130 can be stably mounted on the locking base assembly 120 and the carrying frame 110 by positioning a bottom center of the carrier 130 substantially symmetrically on the locking base assembly 120, and in combination with the distribution of the plurality of engaging points of the engaging assembly 120, the user can easily place the carrier 130 symmetrically on the carrying frame 110, and optionally, can also easily place the carrier 130 to be centered, in this way, the overall stability of the wheeled carrying apparatus 11 can be improved, so that the carrying apparatus can keep balanced during driving, and also perform better impact resistance and safety. In another embodiment, according to actual application requirements, the carrier 130 may also be placed on the locking base assembly 120 without being centered, and the present disclosure does not limit various possible engaging positions of the carrier 130 with respect to the locking base assembly 120.

Figure 2:
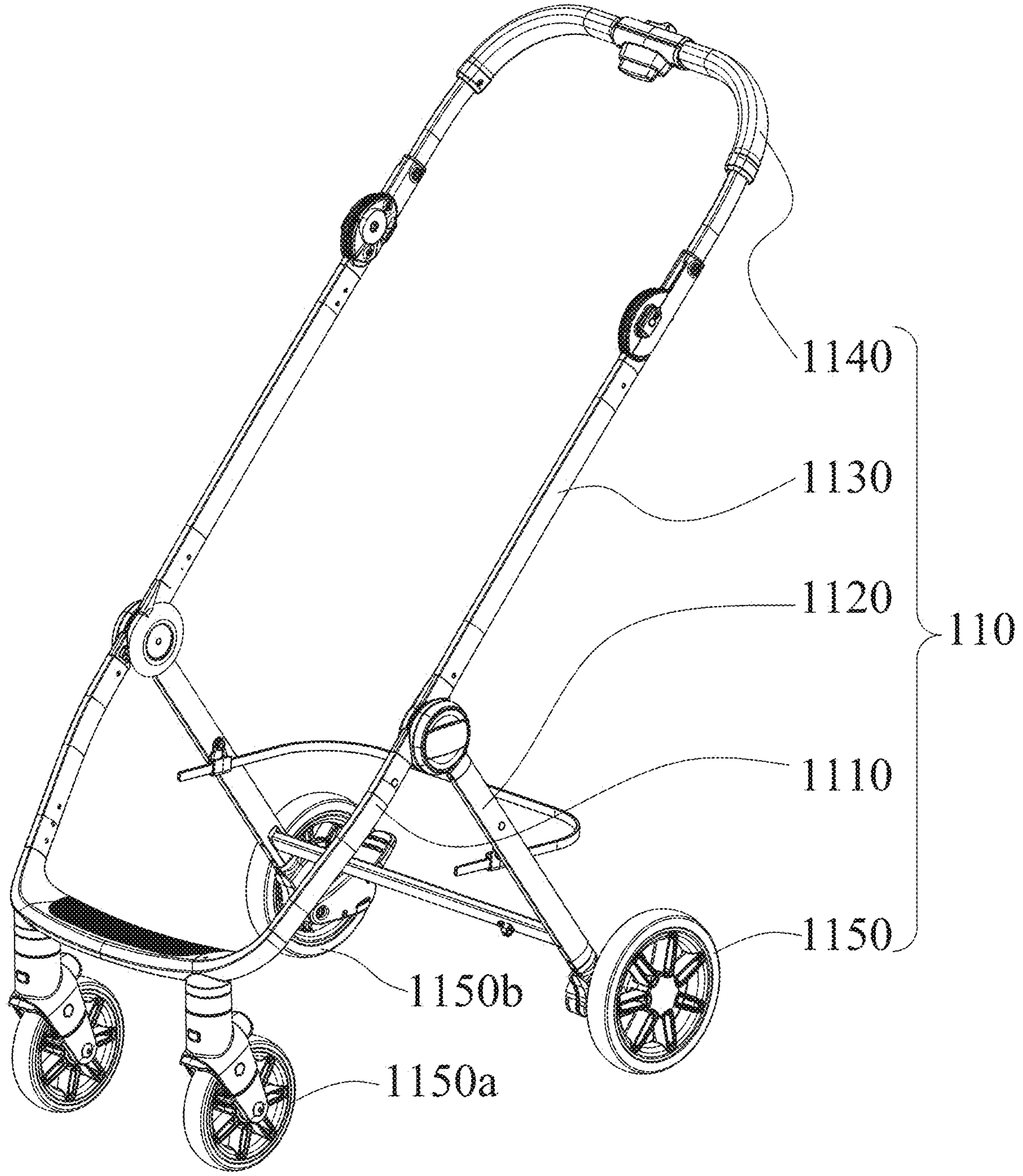
FIG. 2 schematically shows a carrying frame according to an embodiment of the first aspect of the present disclosure.

Referring to FIG. 2, it schematically shows a carrying frame 110 according to an embodiment of the first aspect of the present disclosure.

As shown in FIG. 2, the carrying frame 110 of this embodiment includes a front supporting rod 1110, a rear supporting rod 1120, an upper supporting rod 1130, a handrail 1140 and a wheel set 1150. The wheel set 1150 includes a front wheel 1150*a* and a rear wheel 1150*b*, which are respectively connected with the front supporting rod 1110 and the rear supporting rod 1120.

In an embodiment, the front supporting rod 1110 may have a U-shaped structure, and the rear supporting rod 1120 may be formed by two parallel rod elements fixedly connected through a cross rod, and two ends of the front supporting rod 1110 are pivotally connected with one ends of the two rod elements of the rear supporting rod 1120, respectively. At least one front wheel 1150*a* is connected to a lower side of the front supporting rod 1110 (i.e., a lower side of the U-shaped structure), and each of the other ends of the two rod elements of the rear supporting rod 1120 are respectively connected to a corresponding rear wheel 1150*b*. As shown in FIG. 2, in this embodiment, two front wheels 1150*a* are provided, and these two front wheels 1150*a* are centrally symmetrically disposed and are pivotably disposed at the lower side of the front supporting rod 1110. As an example, the two front wheels 1150*a* are universal wheels, and the two rear wheels 1150*b* are rotatably connected to the two rod elements of the rear supporting rod 1120 and may rotate in a front-rear direction of the carrying frame 110.

Although some embodiments of the present disclosure have been described above, the present disclosure is not limited to the structure and number of the above-mentioned components. For example, in other embodiments, the rear supporting rod 1120 may have a U-shaped structure and then may be connected to the two rear wheels 1150*b*. Optionally, the front supporting rod 1110 may also have a V-shaped or I-shaped structure, or only one front wheel 1150*a* may be provided. In addition, the front wheel 1150*a* may be a one-way wheel, or the rear wheel 1150*b* may be a universal wheel.

In this embodiment, a distance between the two front wheels 1150*a* is smaller than a distance between the two rear wheels 1150*b*, so as to improve the stability of the carrying frame 110 and make it easy to be rotated.

Figure 3A:
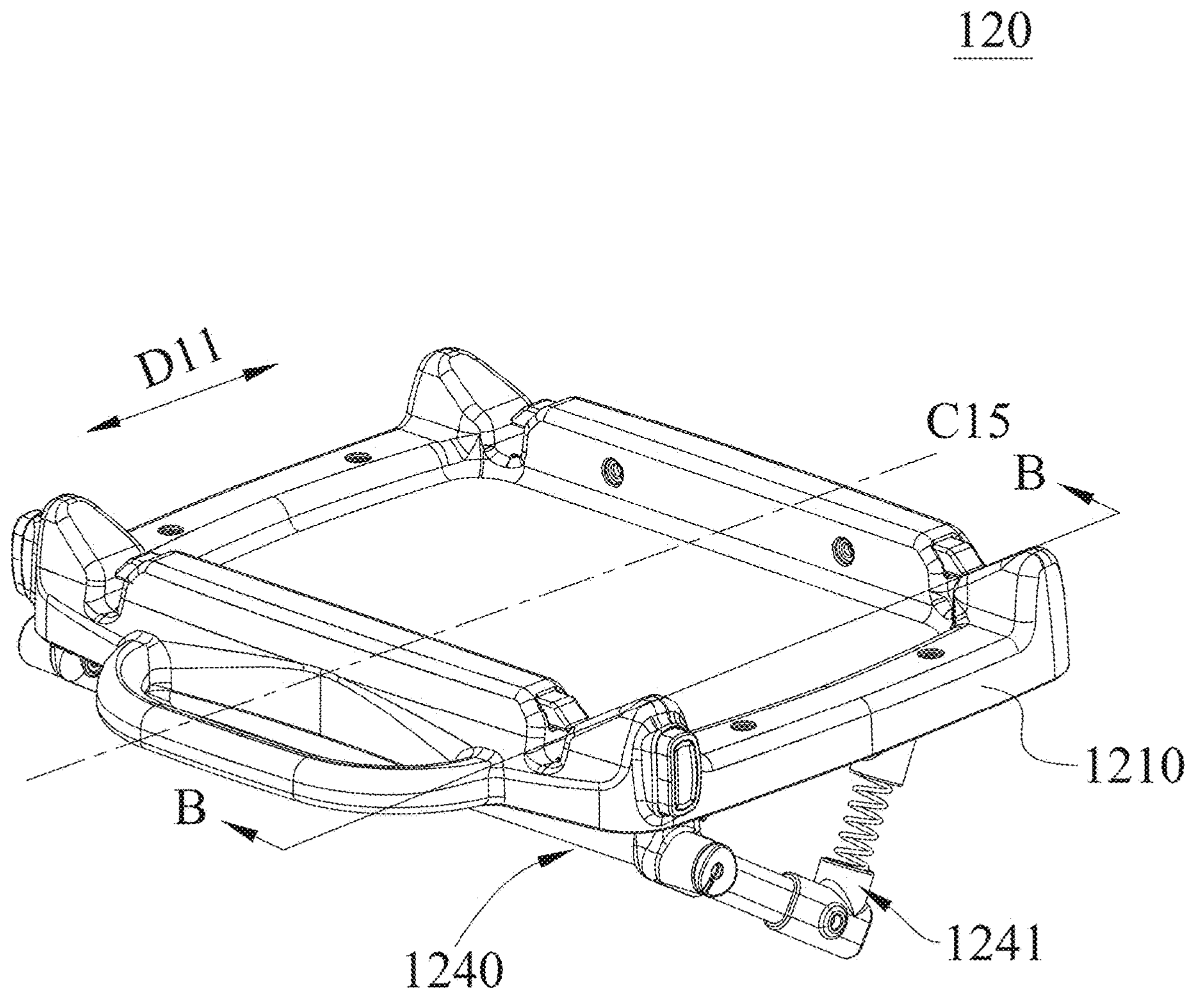
FIGS. 3A to 3C schematically show a locking base assembly according to an embodiment of the first aspect of the present disclosure.
Figure 3B:
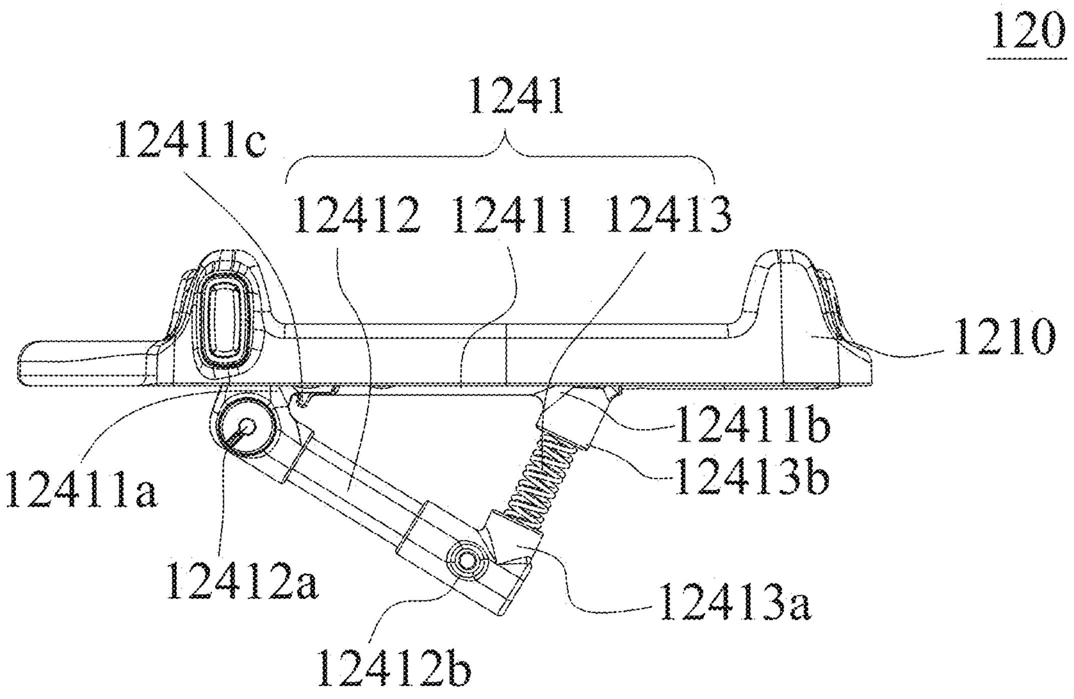
Figure 3C:
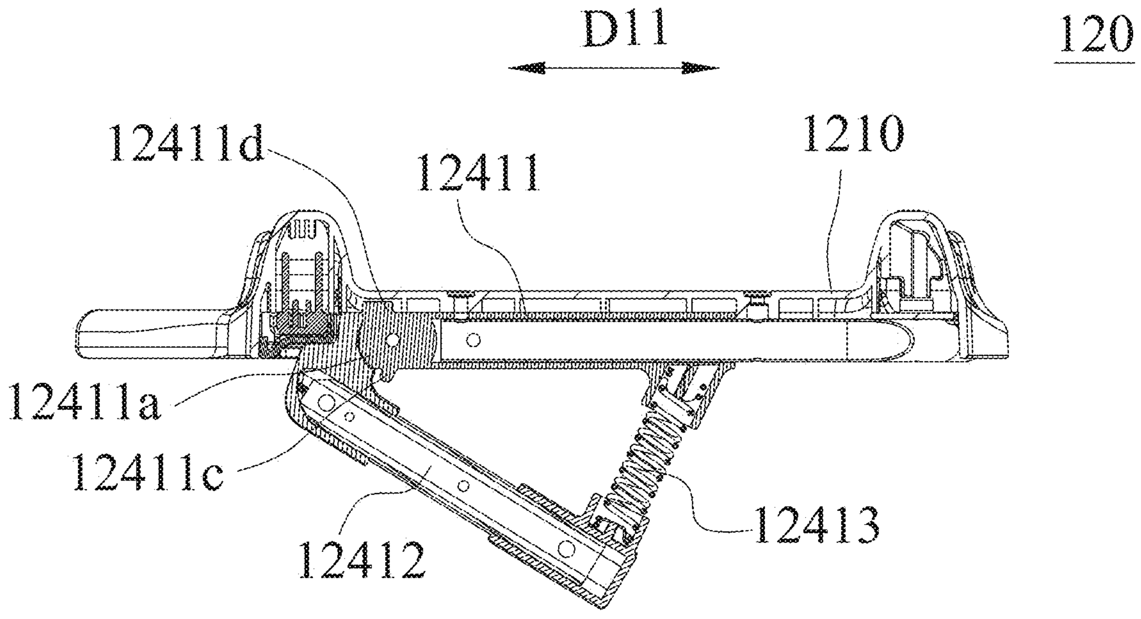

Referring to FIGS. 3A to 3C, the locking base assembly 120 according to an embodiment of the present disclosure is schematically shown. Specifically, FIG. 3A is a perspective view of the locking base assembly 120, FIG. 3B is a side view of the locking base assembly 120, and FIG. 3C is a cross-sectional view taken along a line B-B in FIG. 3A.

As shown in FIG. 3A, the locking base assembly 120 includes a base plate 1210, a locking mechanism and a supporting structure 1240. The base plate 1210 includes an upper housing and a lower housing. As the locking mechanism is disposed within the base plate 1210, it is shielded by the upper housing of the base plate 1210 in FIG. 3A, and its specific structure will be described in the following description of FIGS. 10A and 10B.

In an embodiment of the present disclosure, the supporting structure 1240 may include two supporting frames 1241, which are respectively disposed at two transverse sides of the base plate 1210 (only one supporting frame 1241 is shown in FIG. 3A due to being shielded by the base plate 1210). For example, the two supporting frames 1241 are symmetrically disposed at two sides of the base plate 1210 with respect to a longitudinal centerline C15 of the base plate 1210. It should be noted that the longitudinal centerline C15 extends in the longitudinal direction D11 as shown in FIG. 3A.

Referring further to FIGS. 3B and 3C, each of the supporting frames 1241 includes a longitudinal rod 12411, a connecting rod 12412 and a shock absorbing rod 12413 connected with each other in a triangular structure. The longitudinal rod 12411 is disposed below the base plate 1210 and fixedly connected with the base plate 1210 (for example, its lower housing). A first end 12412*a* of the connecting rod 12412 may be pivotally connected with a first end 12411*a* of the longitudinal rod 12411 within a certain range (as shown in FIG. 3C), a second end 12412*b* of the connecting rod 12412 is fixedly connected with a first end 12413*a* of the shock absorbing rod 12413, and a second end 12413*b* of the shock absorbing rod 12413 is fixedly connected to a second end 12411*b* of the longitudinal rod 12411, for example, disposed at a middle rear section of the base plate 1210 in a longitudinal direction D11. In an embodiment, the shock absorbing rod 12413 has elasticity to provide damping support for the base plate 1210. For example, the shock absorbing rod 12413 is a compression spring, a hydraulic rod, a pneumatic rod or other elastic structure.

Through the triangular structure of the supporting frame 1241, the locking base assembly 120 may be stably disposed on the carrying frame (not shown in FIGS. 3A to 3C, and the specific arrangement thereof will be described in the following description of FIGS. 5A to 5B), and through the shock absorbing rod 12413, the object mounted on the base plate 1210 can be buffered to a certain extent when the carrying frame is bumped.

In this embodiment, the upper end of the shock absorbing rod 12413 is disposed at the second end 12411*b* of the longitudinal rod 12411 (corresponding to the middle rear section of the base plate 1210), which has a better shock absorbing stroke, thereby achieving a better shock absorbing effect. However, the present disclosure is not limited thereto. In another embodiment, the buffering capacity of the supporting frame 1241 can be adjusted by adjusting a length of the longitudinal rod 12411 to adjust the connection position of the shock absorbing rod 12413 and the longitudinal rod 12411 with respect to the base plate 1210, for example, by providing the connection position at a central position or a furthest end with respect to the base plate 1210. In another embodiment, the buffering capacity of the supporting frame 1241 can be adjusted by adjusting a length of the connecting rod 12412 within a preset range, and setting an angle between the connecting rod 12412 and the longitudinal rod 12411, an angle between the connecting rod 12412 and the shock absorbing rod 12413, and/or an angle between the shock absorbing rod 12413 and the longitudinal rod 12411. Further, the elastic coefficient of the shock absorbing rod 12413, such as a spring pitch, a diameter and a material of the compression spring, a degree of pressure of the pneumatic or hydraulic rod, etc., can be adjusted to achieve better shock absorbing effect.

In addition, as shown in FIGS. 3B and 3C, the longitudinal rod 12411 further includes a limiting finger 12411*c*, which is disposed at the first end 12411*a* of the longitudinal rod 12411 and close to the connecting rod 12412, and is configured to limit an angle at which the longitudinal rod 12411 pivot downwards with respect to the connecting rod 12412. When traveling on a bumpy road, the shock absorbing rod 12413 is deformed (for example, shortened or bent) to provide buffering effect, so that the longitudinal rod 12411 pivots downwards with respect to the connecting rod 12412. When the limiting finger 12411*c* disposed below the longitudinal rod 12411 abuts against the connecting rod 12412, the longitudinal rod 12411 does not continue to pivot downwards (i.e., the angle between the longitudinal rod 12411 and the connecting rod 12412 does not continue to decrease), thereby avoiding too large inclination of the longitudinal rod 12411 with respect to the horizontal plane, and thus avoiding the too large inclination of the base plate 1210 and the objects disposed thereon, further improving the safety and driving stability.

As shown in FIG. 3C, in an embodiment, the longitudinal rod 12411 may further include a limiting projection 12411*d*, which is disposed at the first end 12411*a* of the longitudinal rod 12411 on a side opposite to the limiting finger 12411*c*, and the limiting projection 12411*d* is located between the longitudinal rod 12411 and the upper housing of the base plate 1210 for limiting an upward pivoting of the longitudinal rod 12411 with respect to the connecting rod 12412. For example, as described above, when traveling on a bumpy road, the longitudinal rod 12411 may pivot downwards or upwards with respect to the connecting rod 12412 along with the deformation or the deformation recovery of the shock absorbing rod 12413, specifically, when the deformation of the shock absorbing rod 12413 is recovered, a force may be applied to the longitudinal rod 12411 to pivot it upwards, and the limiting projection 12411*d* prevents the longitudinal rod 12411 and the base plate 1210 thereon from pivoting upwards by a large angle, which may cause the connection between the longitudinal rod 12411 and the connecting rod 12412 to be broken. In addition, after the base plate 1210 and the carrying frame (not shown) are folded together (for the specific folding process, referring to the following description of FIGS. 7 to 8B), the user can lift the entire carrying frame structure by pulling the two ends of the base plate 1210 in the longitudinal direction D11, while the limiting projection 12411*d* may also prevent the base plate 1210 from being everted by a large force applied to a tail end (i.e., a right end as shown in FIG. 3C) of the base plate 1210, thereby further improving the use safety and structural stability.

Figure 4:
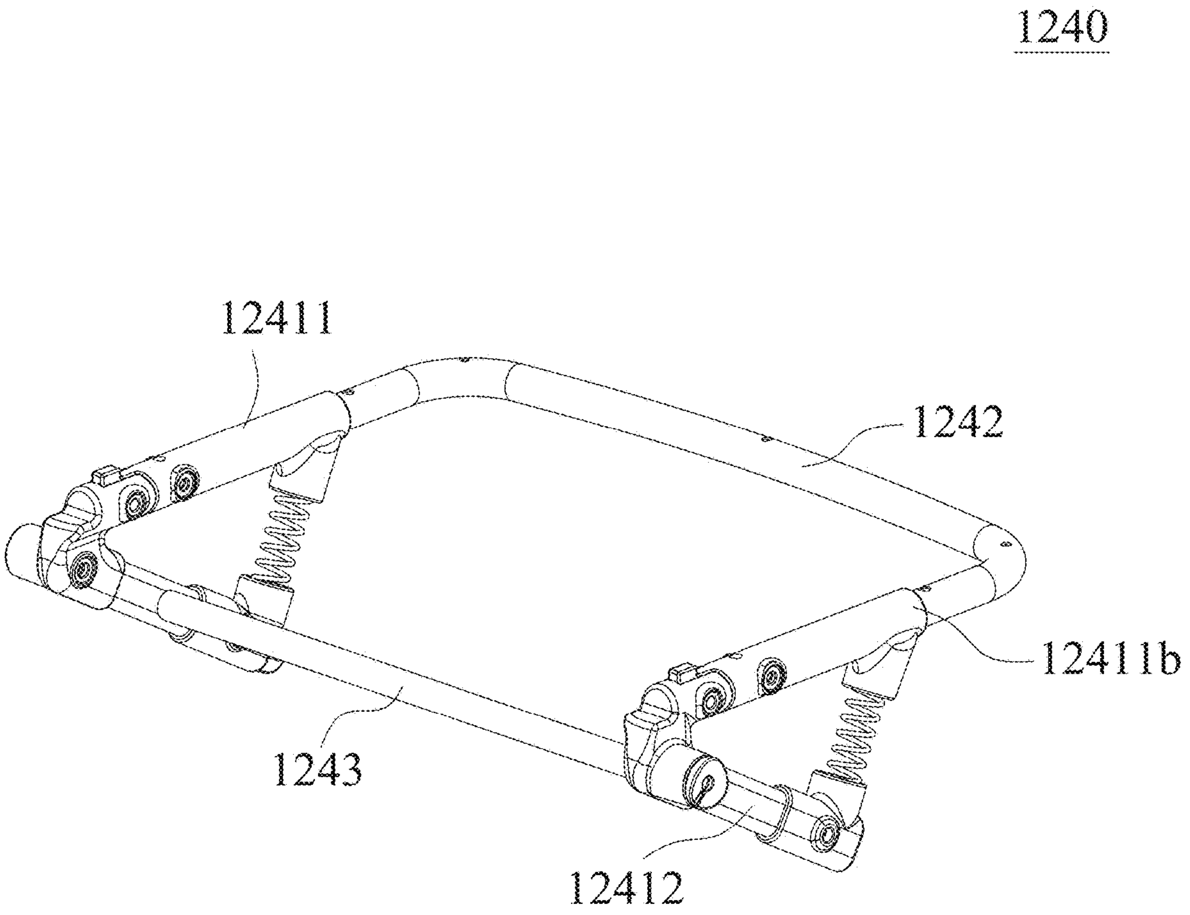
FIG. 4 schematically shows a supporting structure according to an embodiment of the first aspect of the present disclosure.

Referring to FIG. 4, the supporting structure 1240 according to an embodiment of the first aspect of the present disclosure is schematically shown.

In an embodiment, the supporting structure 1240 further includes a cross rod or a first connecting rod 1242 having a U-shaped structure, and is connected between the longitudinal rods 12411 of the two supporting frames 1241 so as to fixedly connect the longitudinal rods 1242. For example, as shown in FIG. 4, the first connecting rod 1242 connects the second ends 12411*b* of the longitudinal rods 12411 of the two supporting frames 1241 together. Optionally, the second ends 12411*b* of the longitudinal rods 12411 of the two supporting frames 1241 are respectively sleeved on the two ends of the first connecting rod 1242. In another embodiment, the supporting structure 1240 further includes a second connecting rod 1243 connected between the connecting rods 12412 of the two supporting frames 1241. Optionally, the first connecting rod 1242 and the second connecting rod 1243 are respectively connected with two ends of the two longitudinal rods 12411, or integrally formed with the two longitudinal rods 12411 into a rectangular frame structure.

Figure 5A:
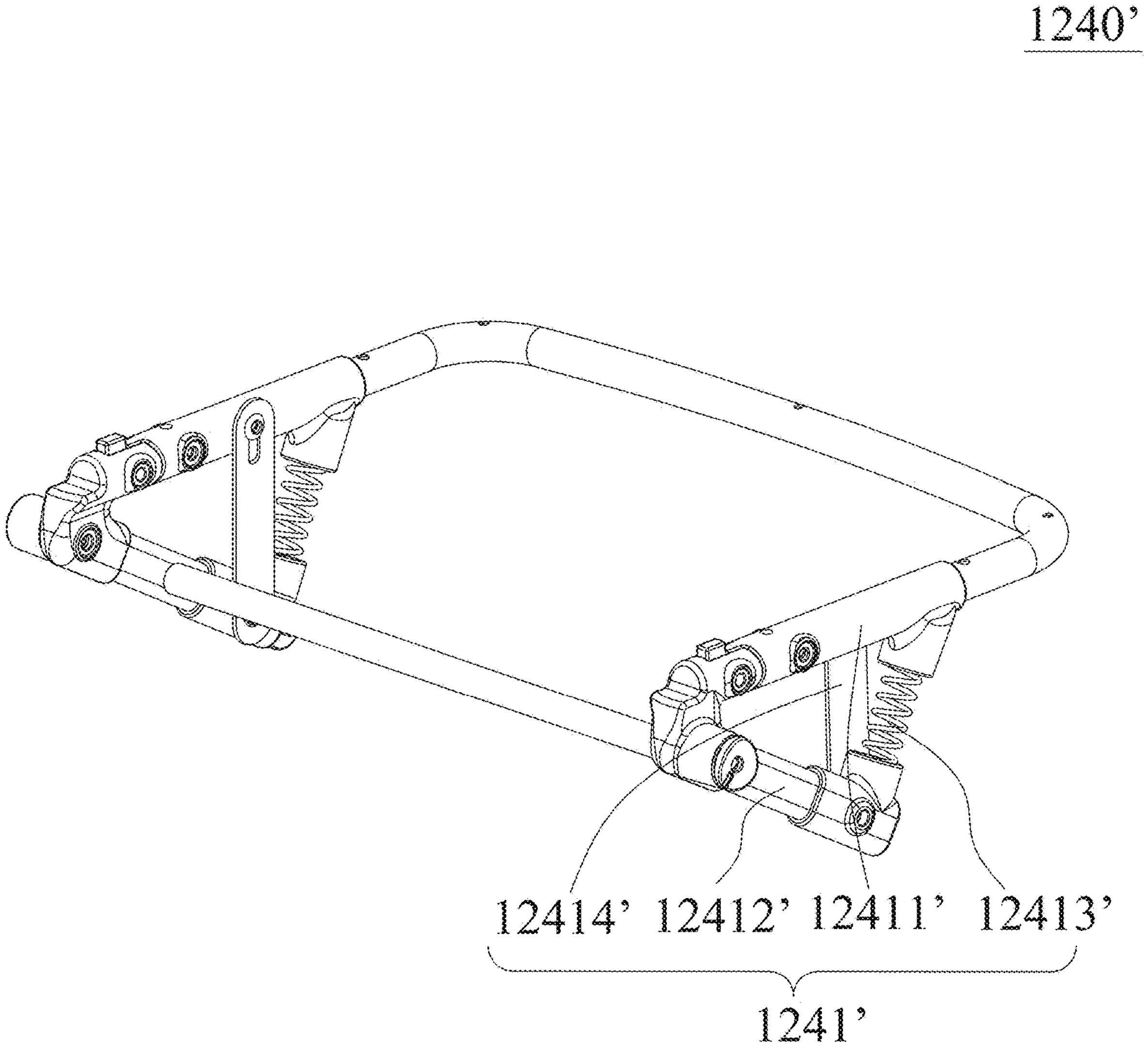
FIGS. 5A and 5B schematically show a supporting structure according to another embodiment of the first aspect of the present disclosure.
Figure 5B:
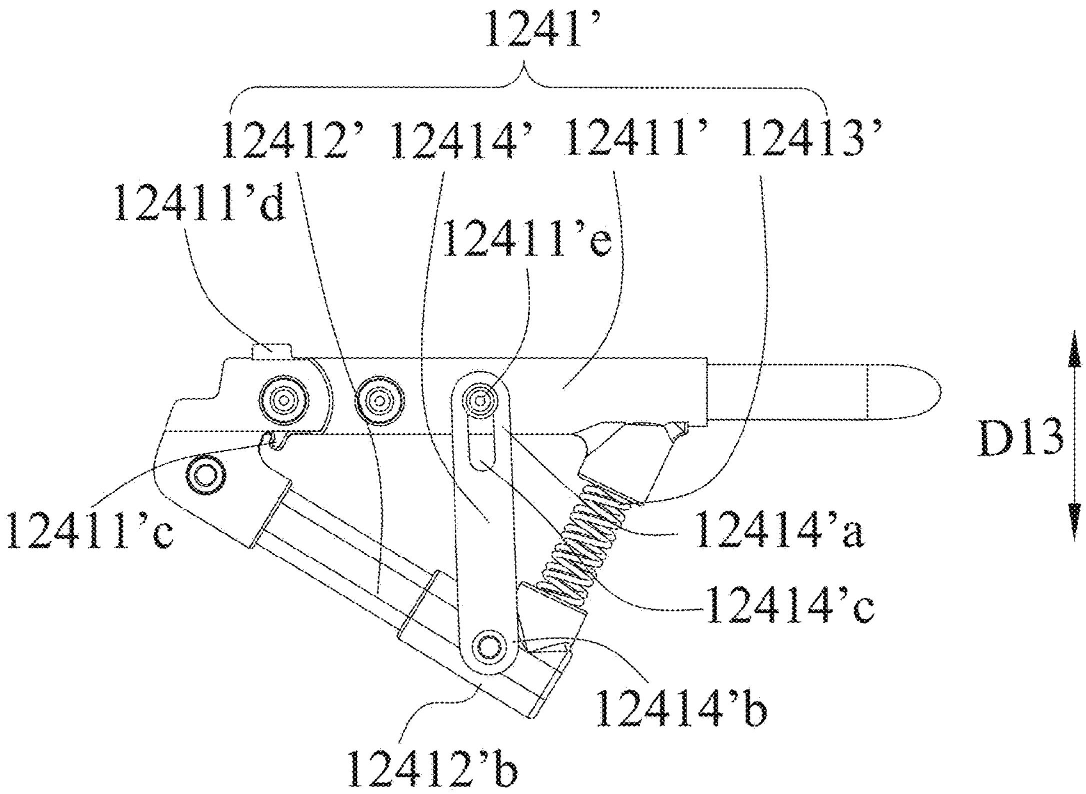

FIGS. 5A and 5B schematically show a supporting structure 1240' according to another embodiment of the first aspect of the present disclosure. FIG. 5A shows a perspective view of the supporting structure 1240', and FIG. 5B shows a plan view of the supporting structure 1240' as viewed from the inside.

As shown in FIG. 5A, the supporting structure 1240' has a structure similar to the supporting structure 1240, and also includes two supporting frames 1241', and each of the supporting frames 1241' includes a longitudinal rod 12411', a connecting rod 12412' and a shock absorbing rod 12413'. The difference therebetween is that the supporting frames 1241' may also include a limiting element 12414'.

As shown in FIG. 5B, a first end 12414'*a* of the limiting element 12414' is slidably connected to the longitudinal rod 12411', and a second end 12414'*b* of the limiting element 12414' is connected to the second end 12412'*b* of the connecting rod 12412'. In an embodiment, the first end 12414'*a* of the limiting element 12414' is provided with a limiting slot 12414'*c* extending a certain distance along a length direction of the limiting element 12414', and a pin 12411'*e* is provided at a position of the middle section of the longitudinal rod 12411'. By the cooperation of the limiting slot 12414'*c* and the pin 12411'*e*, the limiting element 12414' may slide in a substantially vertical direction (e.g., vertically or substantially vertically) with respect to the longitudinal rod 12411'. Optionally, when there is no relative displacement between the limiting element 12414' and the longitudinal rod 12411', the pin 12411'*e* is disposed on the longitudinal rod 12411' at a position corresponding to the second end 12412' b of the connecting rod 12412' in the vertical direction (i.e., the direction D13 as shown in FIG. 5B). In other words, when the limiting element 12414' and the longitudinal rod 12411' do not slide relatively (i.e., in an initial state), the pin 12411'*e* is located at the uppermost end of the limiting slot 12414'*c*, and the limiting element 12414' is substantially perpendicular to the longitudinal rod 12411'. When traveling on a bumpy road, the shock absorbing rod 12413' is deformed (for example, shortened or bent) to provide buffering effect, so that the longitudinal rod 12411' pivots downwards with respect to the connecting rod 12412', while the limiting slot 12414'*c* of the limiting element 12414' limits a sliding stroke of the pin 12411'*e* of the longitudinal rod 12411' (i.e., corresponding the length of the limiting slot 12414'*c*), so as to limit the pivoting of the longitudinal rod 12411' with respect to the connecting rod 12412' within a certain range. Thus, it is possible to prevent the longitudinal rod 12411' and the base plate fixed thereon (not shown in FIG. 5B, referring to the base plate 1210 in FIGS. 3A to 3C) from inclining downwards too much with respect to the connecting rod 12412' during the buffering action, and also, it is also possible to prevent the possibility that the longitudinal rod 12411' and the base plate thereon are everted (i.e., the longitudinal rod 12411' pivots upwards with respect to the connecting rod 12412') when the user lifts the base plate to move the base plate and the carrying frame in a folded state (shown in FIG. 9A, the folding mechanism of the carrying frame 110 will be described in detail below). In other words, compared with the limiting finger 12411'*c* and the limiting projection 12411'*d*, the limiting element 12414' can further limit the pivoting of the longitudinal rod 12411', and even achieve functions of both the limiting finger 12411'*c* and the limiting projection 12411'*d* simultaneously. However, the present disclosure is not limited thereto. In other embodiments, only the limiting element 12414' may be provided, and the limiting finger 12411'*c* and the limiting projection 12411'*d* are not provided.

Figure 6A:
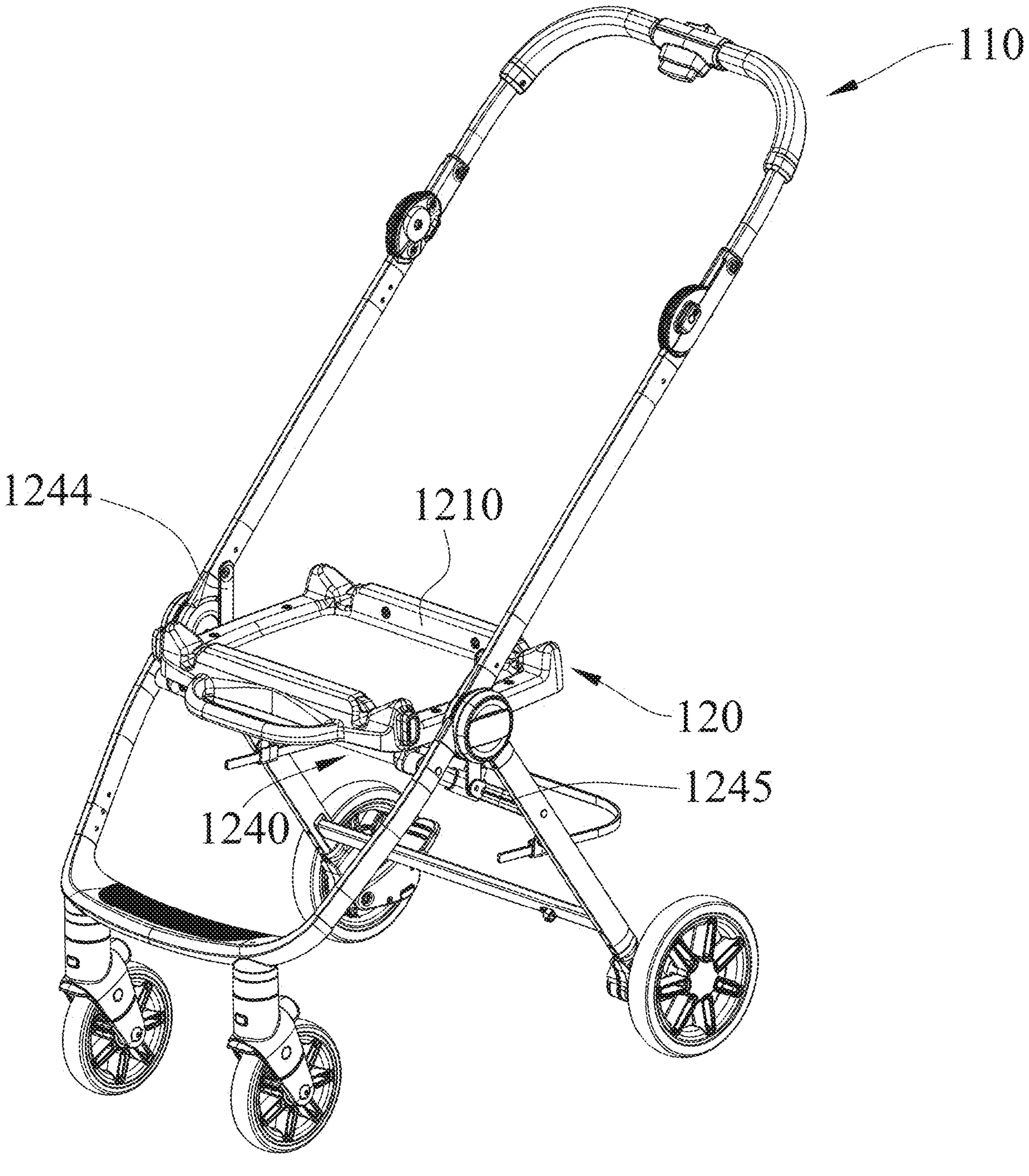
FIGS. 6A to 6C schematically show the carrying frame mounted with the locking base assembly according to an embodiment of the first aspect of the present disclosure.
Figure 6B:
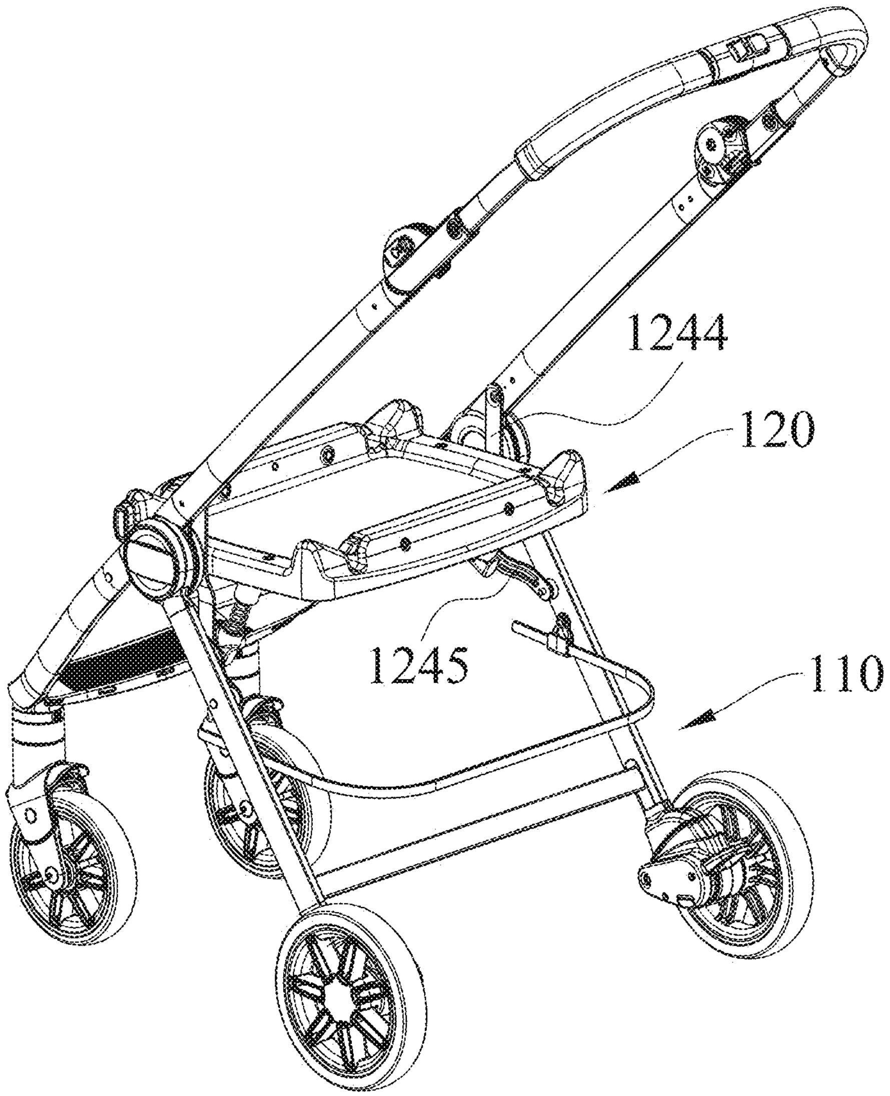
Figure 6C:
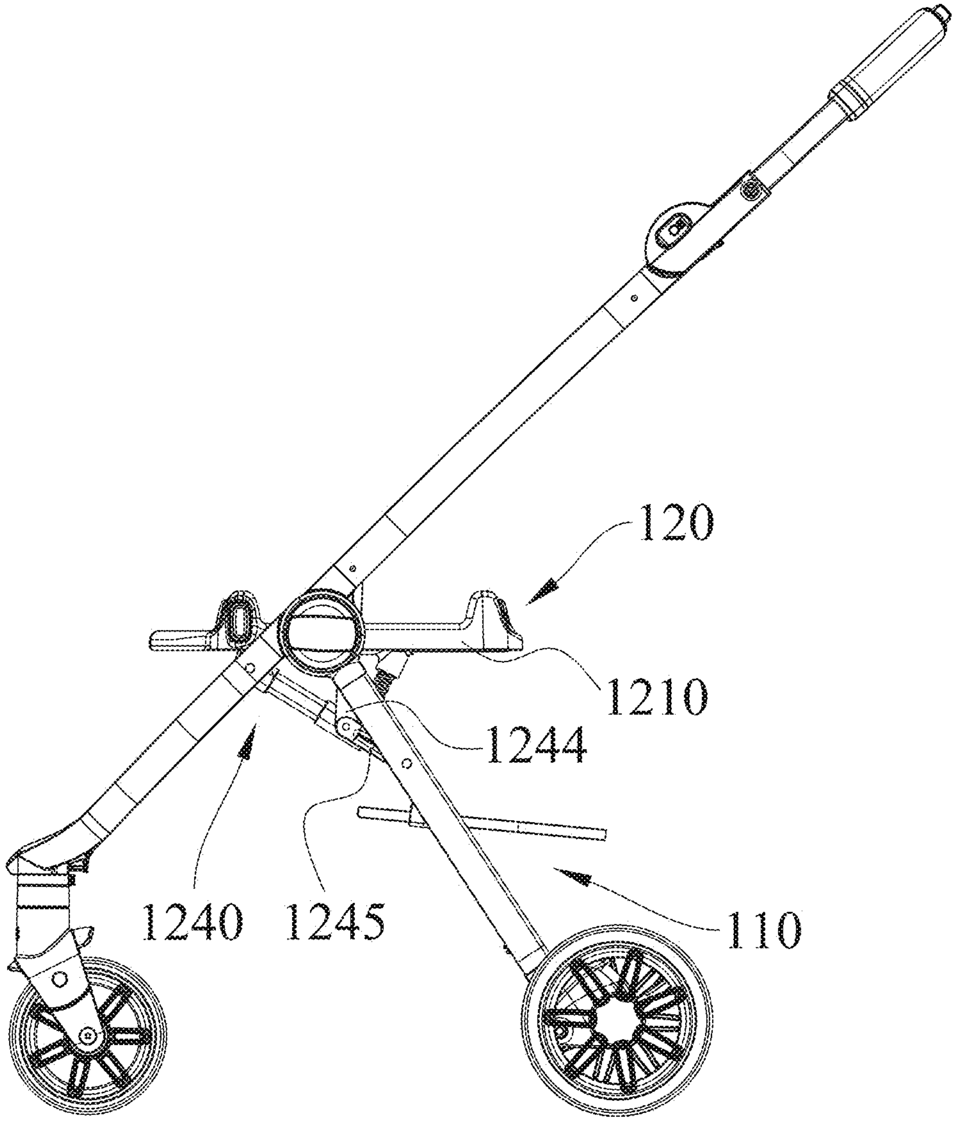

Referring to FIGS. 6A to 6C, the carrying frame 110 mounted with the locking base assembly 120 according to an embodiment of the first aspect of the present disclosure is schematically shown. FIGS. 6A and 6B are perspective views of the carrying frame 110 and the locking base assembly 120 mounted thereon from different views, and FIG. 6C is a side view of the carrying frame 110 and the locking base assembly 120.

As shown in FIGS. 6A to 6C, the locking base assembly 120 is pivotally connected and mounted on the carrying frame 110 through a supporting structure 1240, wherein the base plate 1210 of the locking base assembly 120 and the locking mechanism (in the figures, the locking mechanism is blocked, and the specific structure will be described below) are fixedly mounted on the supporting structure 1240, and the base plate 1210 provides a substantially horizontal plane to place the objects (such as the carrier in this embodiment). The supporting structure 1240 further includes a first connecting component 1244 and a second connecting component 1245, which are pivotably connected to the carrying frame 110, respectively. By the arrangement of the first connecting component 1244 and the second connecting component 1245, the locking base assembly 120 may be folded together with the folding of the carrying frame 110. The specific connection mode of the supporting structure 1240 and the carrying frame 110, as well as the folding mechanism of the locking base assembly 120 and the carrying frame 110 will be described below.

Figure 7:
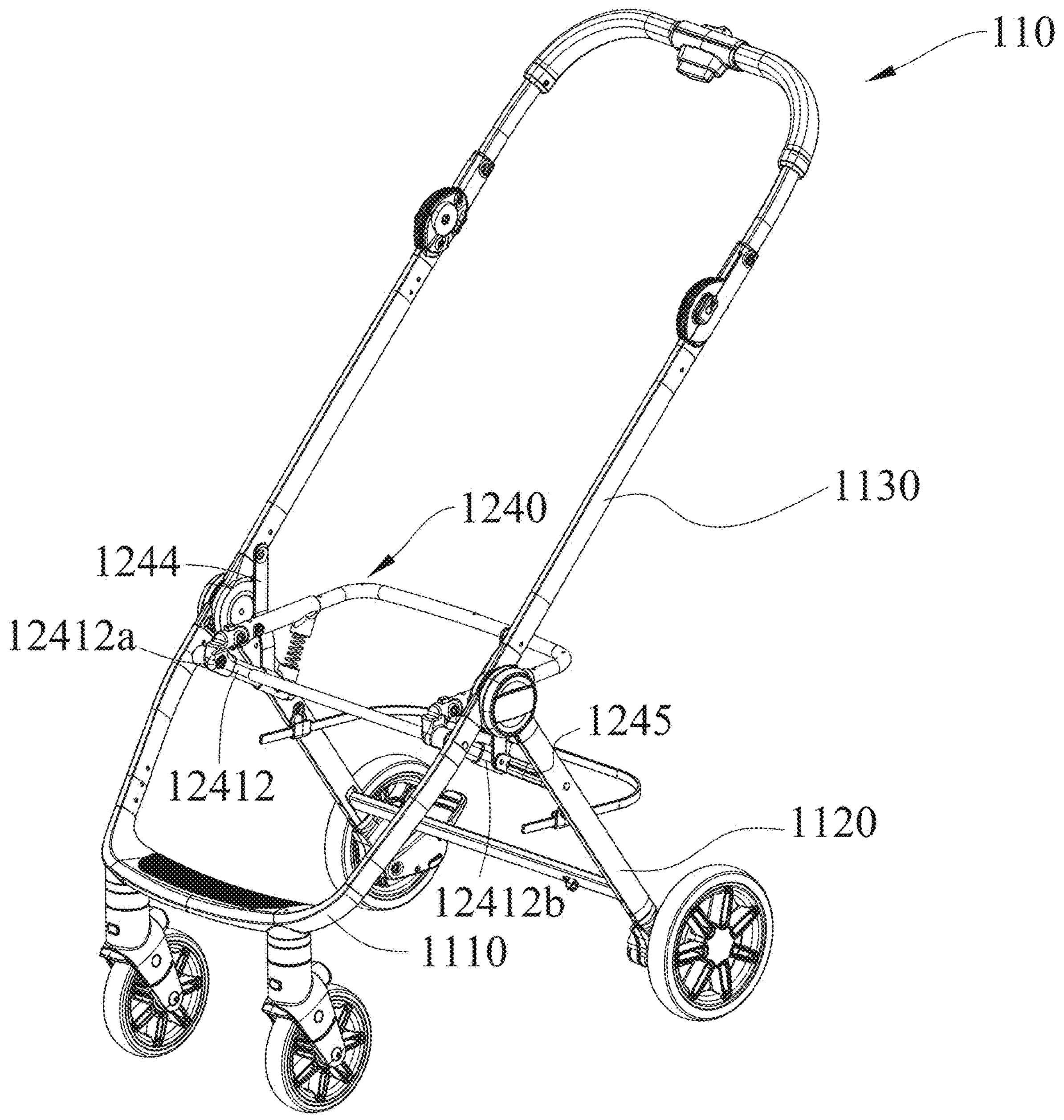
FIG. 7 schematically shows the carrying frame mounted with the supporting structure according to an embodiment of the first aspect of the present disclosure.

Referring to FIG. 7, the carrying frame 110 mounted with the supporting structure 1240 according to an embodiment of the first aspect of the present disclosure is schematically shown.

As shown in FIG. 7, one ends of the first connecting component 1244 and the second connecting component 1245 are respectively pivotably connected with the second end 12412*b* of the connecting rod 12412, and the other ends of the first connecting component 1244 and the second connecting component 1245 and the first end 12412*a* of the connecting rod 12412 are respectively pivotably connected to different positions on the carrying frame 110 that may pivot with respect to each other. Through the connection mode of the first connecting component 1244 and the second connecting component 1245, the supporting structure 1240 may be pivotably mounted on the carrying frame 110 to provide support for the locking base assembly (for the sake of clarity, the structure of the locking base assembly after the supporting structure 1240 is removed) and may be folded together with the carrying frame 110.

Specifically, as shown in FIG. 7, one end of the first connecting component 1244 is pivotably connected with the second end 12412*b* of the connecting rod 12412, and the other end of the first connecting component 1244 is pivotably connected with the upper supporting rod 1130 of the carrying frame 110. One end of the second connecting component 1245 is pivotally connected with the second end 12412*b* of the connecting rod 12412, and the other end of the second connecting component 1245 is pivotally connected with the rear supporting rod 1120. The first end 12412*a* of the connecting rod 12412 is pivotally connected with the front supporting rod 1110. In this way, the supporting frame 1241 and the entire locking base assembly 120 can pivot along with the pivoting of the carrying frame 110, thereby realizing the folding of the entire carrying apparatus.

Figure 8A:
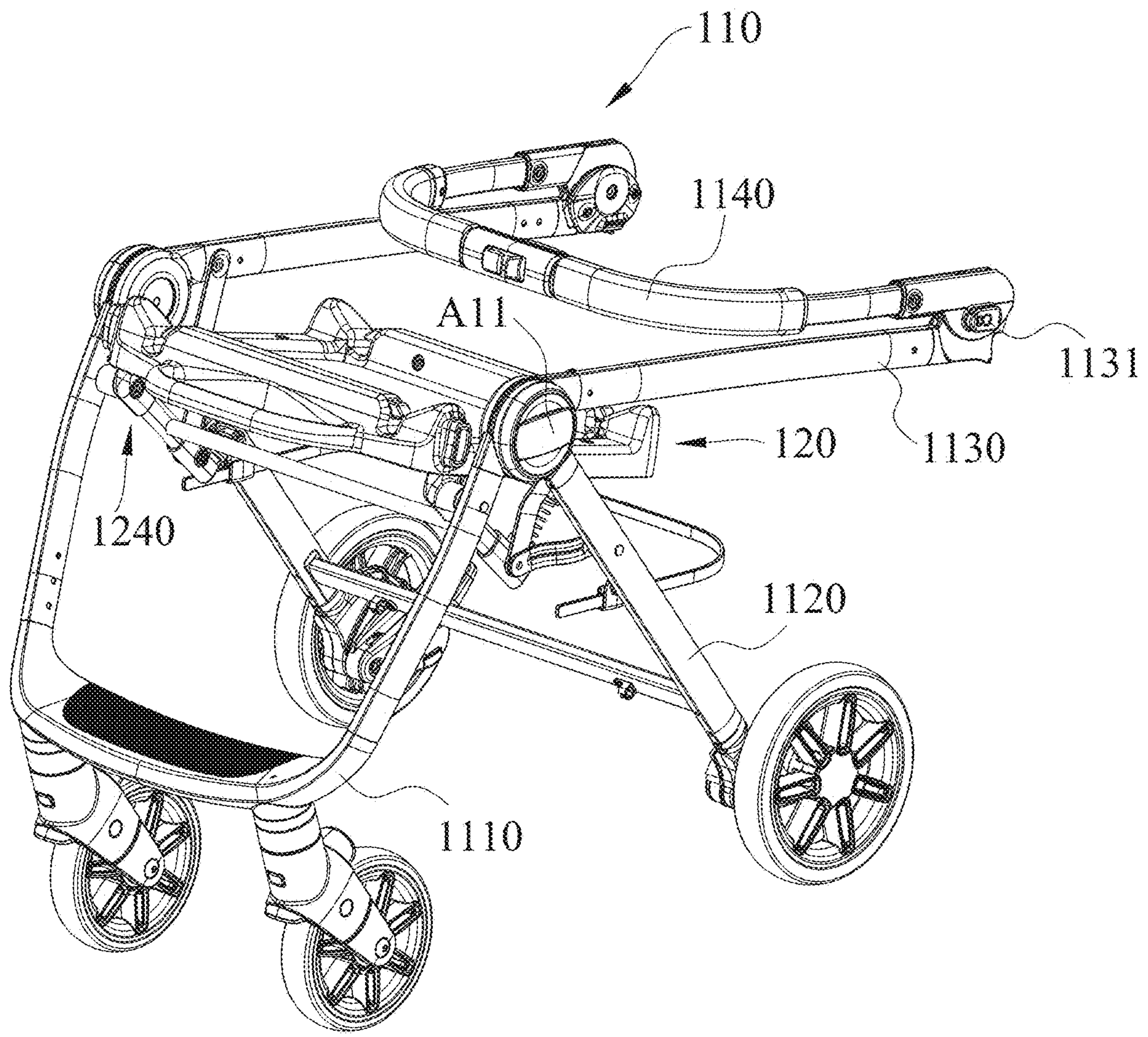
FIGS. 8A and 8B schematically show the carrying frame mounted with the locking base assembly according to an embodiment of the first aspect of the present disclosure, in which the carrying frame is in a process of folding.
Figure 8B:
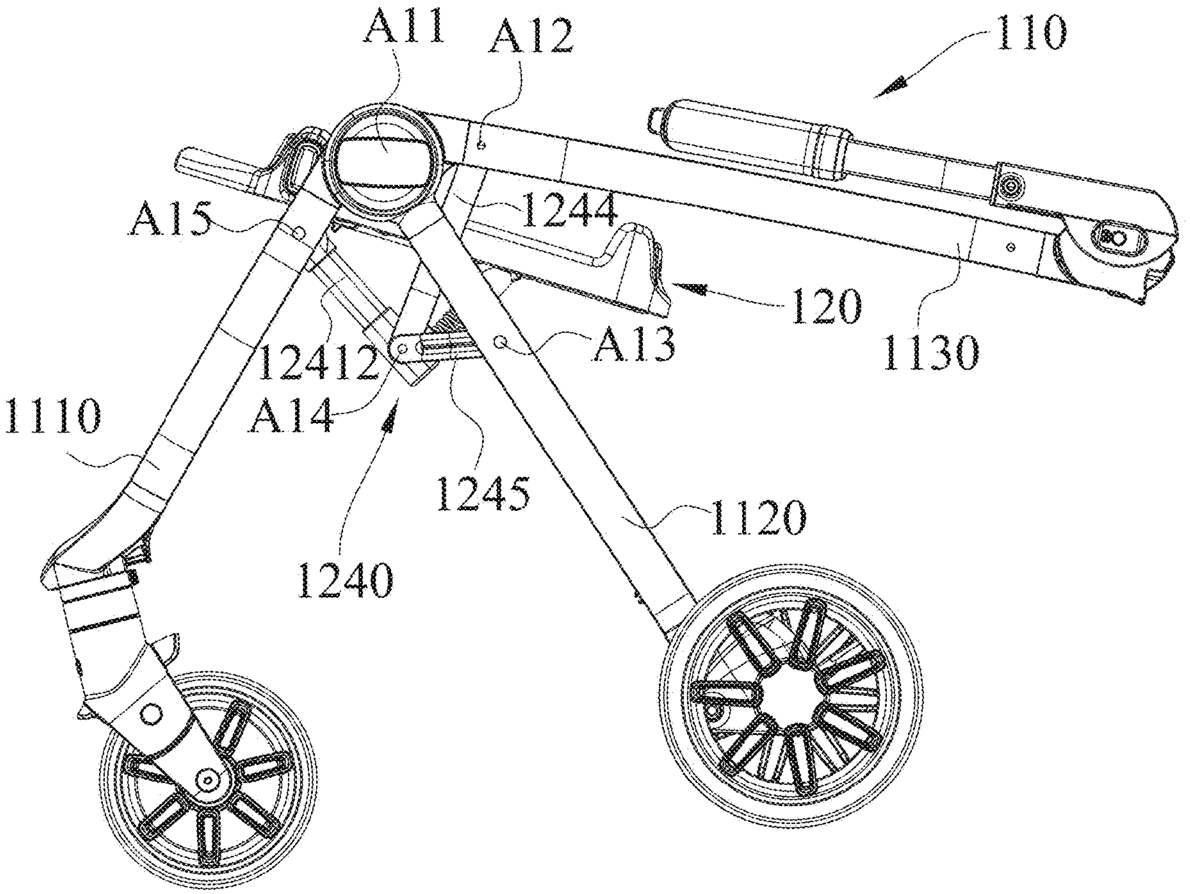
Figure 9A:
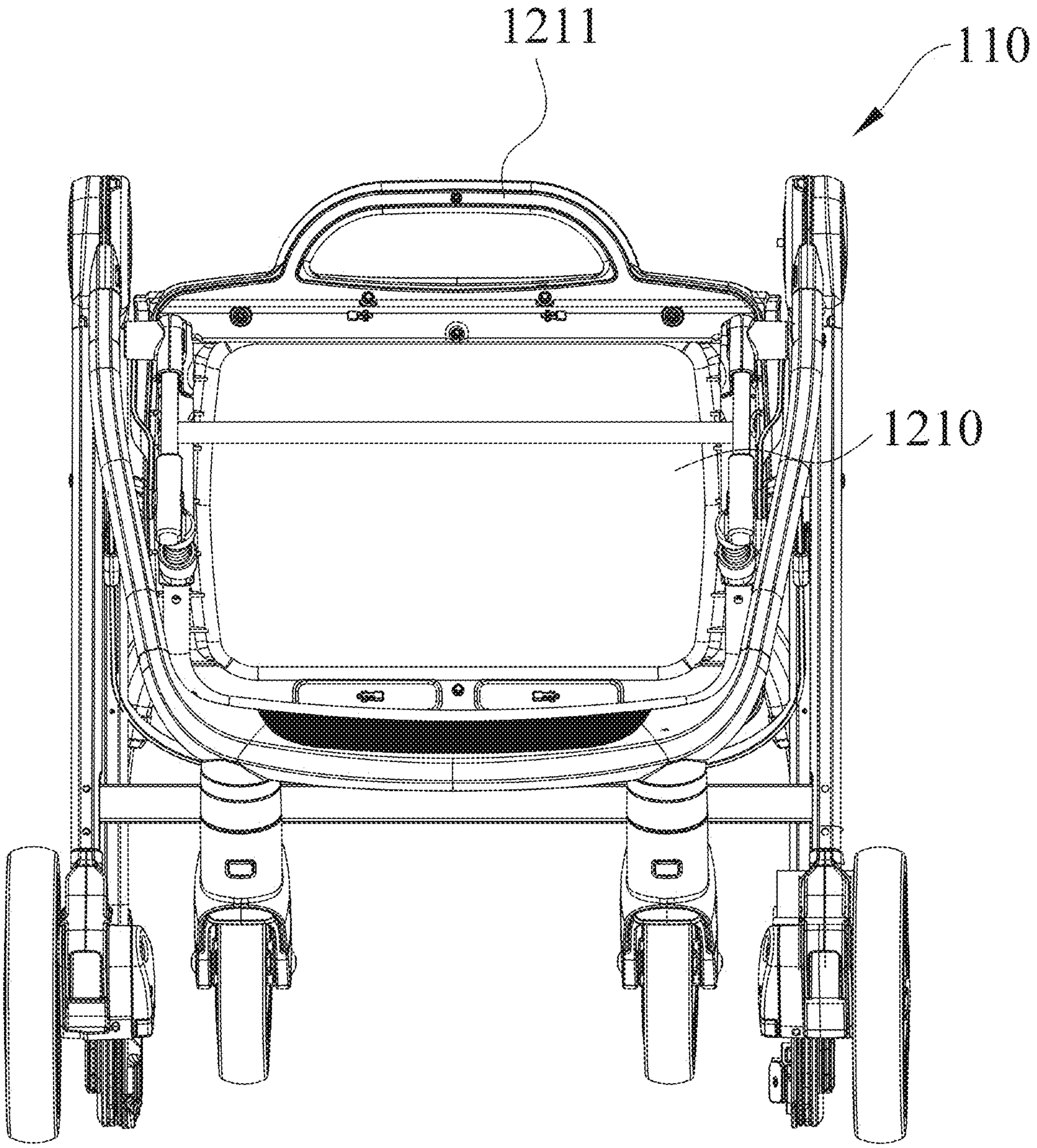
FIGS. 9A and 9B schematically show the carrying frame mounted with the locking base assembly according to an embodiment of the first aspect of the present disclosure, in which the carrying frame is in a completely folded state.
Figure 9B:
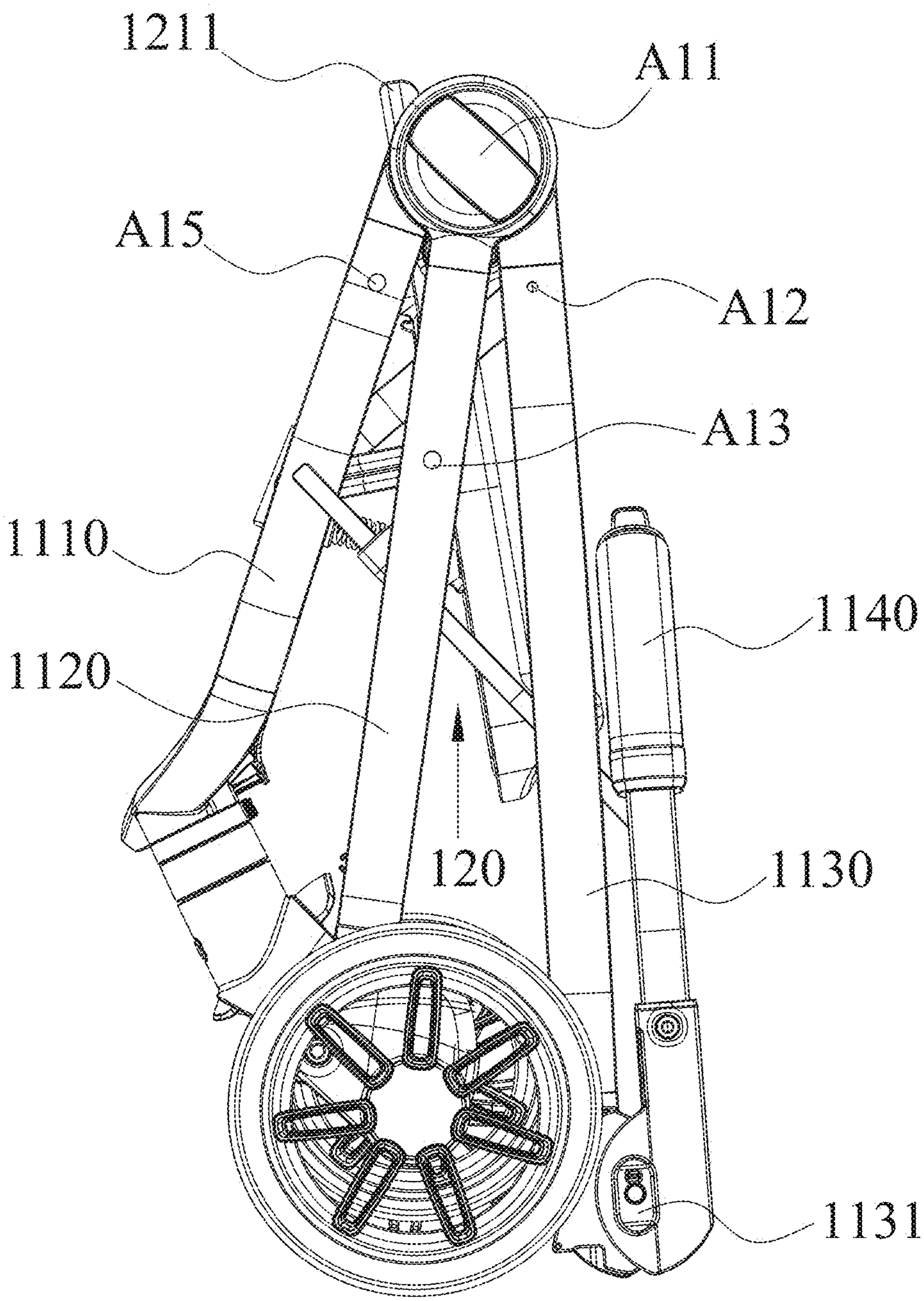

Referring to FIGS. 8A to 9B, a folding process of the carrying frame 110 mounted with the locking base assembly 120 according to an embodiment of the first aspect of the present disclosure is schematically shown. FIGS. 8A and 8B show a perspective view and a side view of the carrying frame 110 and the locking base assembly 120 mounted thereon which are in the folding process, and FIGS. 9A and 9B show a front view and a side view of the carrying frame 110 and the locking base assembly 120 mounted thereon which are completely folded.

As shown in FIG. 8A, the carrying frame 110 of this embodiment may be folded to facilitate being carried and stored. Specifically, the handrail 1140 of the carrying frame 110 is pivotally connected with the upper supporting rod 1130 through a pivoting part 1131 and may be folded with respect to the upper supporting rod 1130. The front supporting rod 1110, the rear supporting rod 1120 and the upper supporting rod 1130 are pivotally connected at the first pivot point A11 and may be folded with respect to each other. In addition, the carrying frame 110 is folded, while it may also drive the supporting structure 1240 to be pivoted, so that the locking base assembly 120 mounted on the supporting structure 1240 may also be pivoted with the folding of the carrying frame 110.

In addition, as shown in FIG. 8B, the supporting structure 1240 is pivotably connected with the upper supporting rod 1130 of the carrying frame 110 at the second pivot point A12 through the first connecting component 1244, pivotably connected with the rear supporting rod 1120 at the third pivot point A13 through the second connecting component 1245, and pivotably connected with the front supporting rod 1110 at the fifth pivot point A15 through the connecting rod 12412. The first connecting component 1244 and the second connecting component 1245 are connected with the connecting rod 12412 at the fourth pivot point A14.

Through the connection relationship as described above, the first connecting component 1244, the second connecting component 1245, the upper supporting rod 1130 and the rear supporting rod 1120 form a four-bar linkage mechanism through the first, second, third and fourth pivot points A11, A12, A13 and A14. The front supporting rod 1110, the rear supporting rod 1120, the second connecting component 1245 and the connecting rod 12412 form a four-bar linkage mechanism through the first, third, fourth and fifth pivot points A11, A13, A14 and A15. The front supporting rod 1110, the upper supporting rod 1130, the first connecting component 1244 and the connecting rod 12412 form a four-bar linkage mechanism through the first, second, fourth and fifth pivot points A11, A12, A14 and A15. In this way, the locking base assembly 120 can be pivoted with the folding of the carrying frame 110, and thus be accommodated in the overall structure of the carrying frame 110 (a final completed folding state is shown in FIG. 9B).

Referring to FIGS. 9A and 9B, when the carrying frame 110 is completely folded, that is, the front supporting rod 1110, the rear supporting rod 1120, the upper supporting rod 1130 and the handrail 1140 are folded to a position where they are closest to each other, the locking base assembly 120 is accommodated between the upper supporting rod 1130, the front supporting rod 1110 and the rear supporting rod 1120 as being pivoted.

In addition, as shown in FIG. 9A, the base plate 1210 may include a handle 1211. When the carrying frame 110 and the locking base assembly 120 are completely folded, the handle 1211 is located above the folded entire structure, so that the user can easily grasp the handle 1211 to move the carrying frame 110 (together with the locking base assembly 120).

Figure 10A:
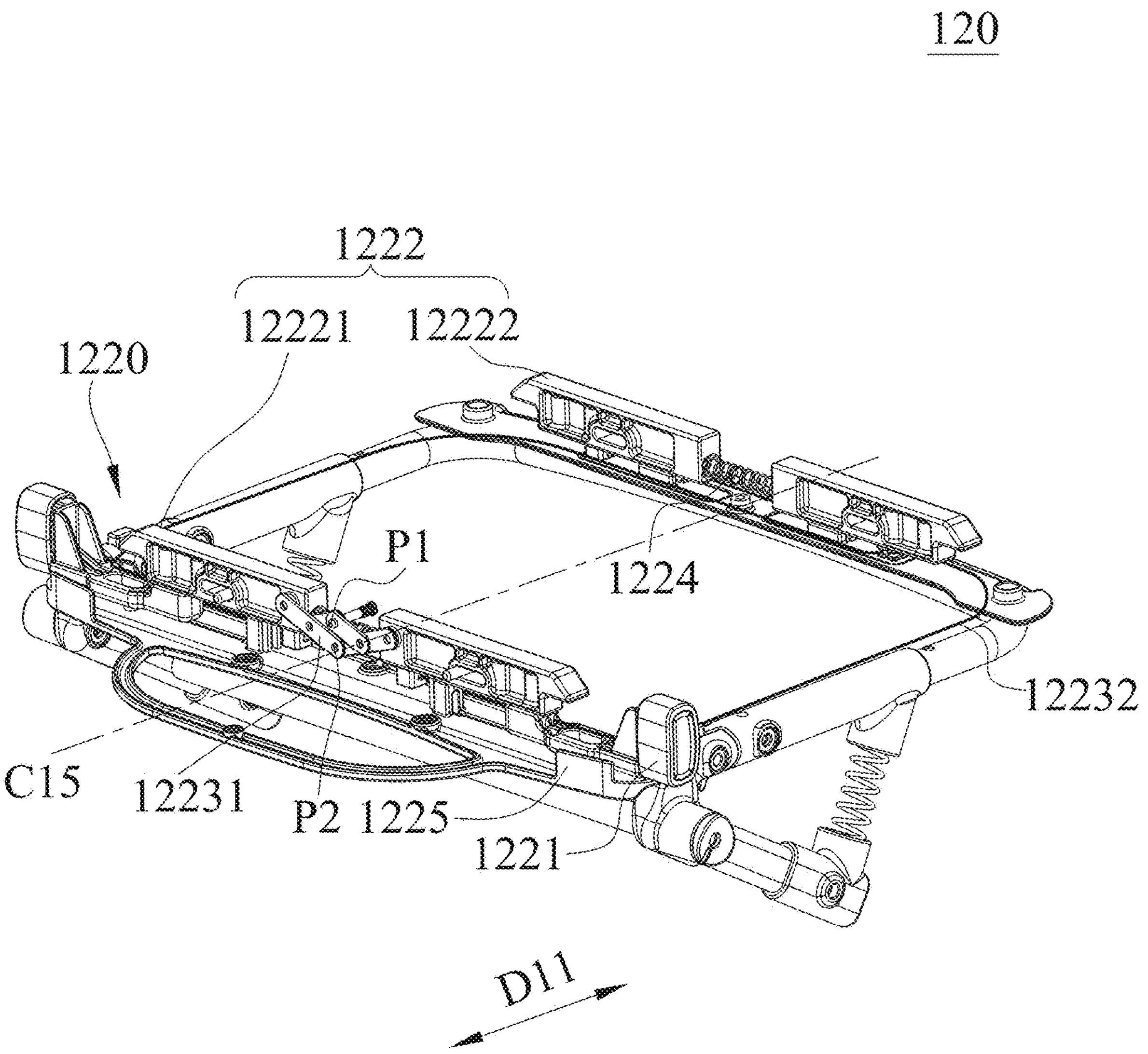
FIGS. 10A and 10B schematically show the locking base assembly according to an embodiment of the first aspect of the present disclosure, wherein an upper housing of a base plate is removed in FIG. 10A to show a locking mechanism.
Figure 10B:
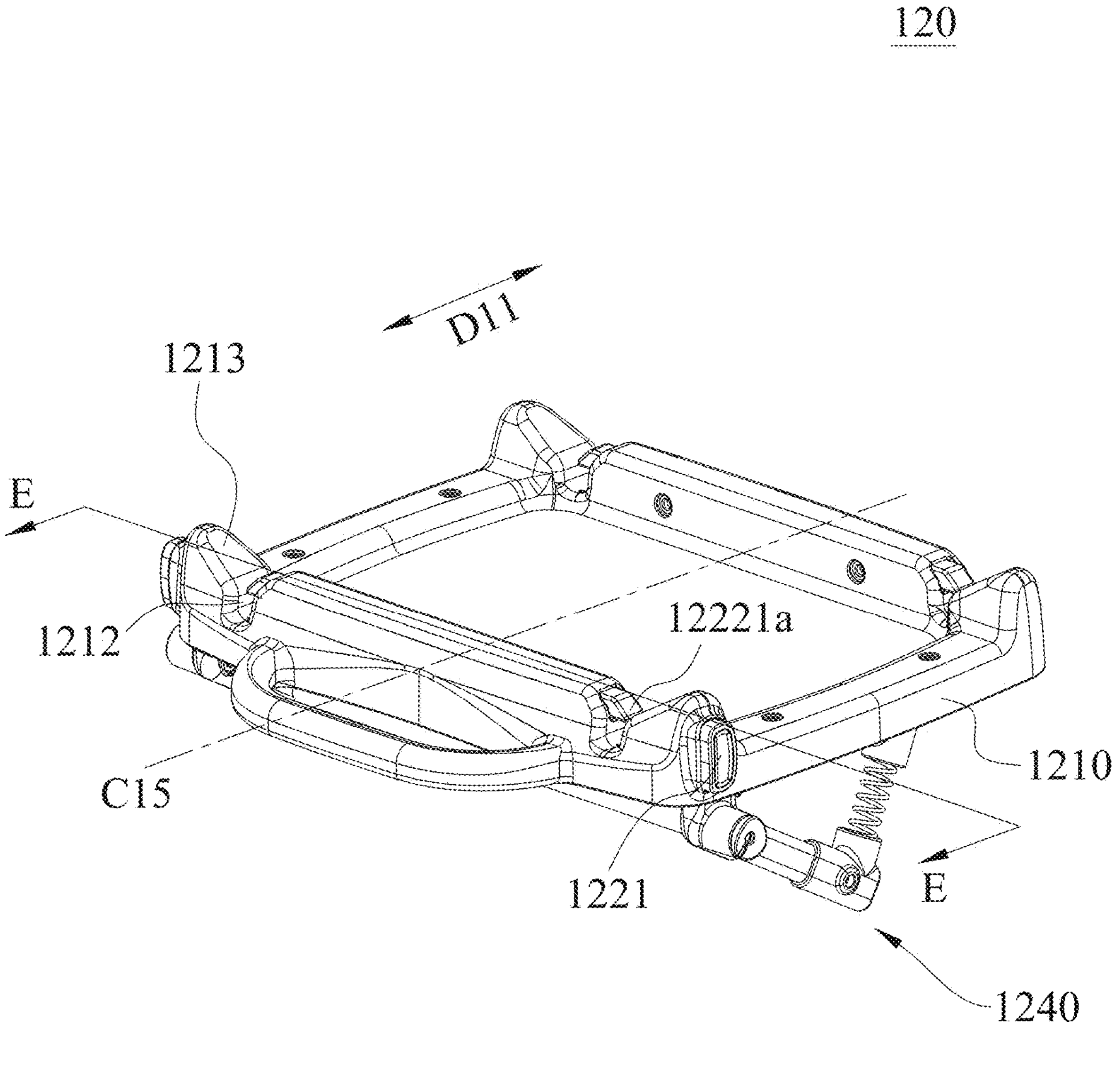

Referring to FIGS. 10A and 10B, the locking base assembly 120 according to an embodiment of the first aspect of the present disclosure is schematically shown. FIGS. 10A and 10B are perspective views of the locking base assembly 120, in which the upper housing of the base plate 1210 is removed in FIG. 10A so as to facilitate to observe the locking mechanism 1220 located in the base plate 1210.

As can be seen from FIGS. 10A and 10B, the locking mechanism 1220 is mounted in the base plate 1210 for locking and unlocking objects (such as sleeping boxes, other carriers for animals) located on the base plate 1210.

As shown in FIG. 10A, the locking mechanism 1220 includes at least one releasing operation element 1221 and at least one locking element 1222. The releasing operation element 1221 is disposed in the base plate 1210 and may move between a locking position and an unlocking position with respect to the base plate 1210. The locking element 1222 may move correspondingly with the movement of the releasing operation element 1221. When the releasing operation element 1221 is in the locking position as shown in FIG. 10B, at least a part of the releasing operation element 1221 protrudes from the base plate 1210, so that the object placed on the base plate 1210 is locked. When the releasing operation element 1221 is pressed and moves inwards from the locking position to the unlocking position, the locking element 1222 moves along with the movement of the releasing operation element 1221, thereby unlocking the object located on the base plate 1210. In this embodiment, as shown in FIG. 10B, at least a part of the releasing operation element 1221 protrudes outwards from a side of the base plate 1210.

As shown in FIG. 10A, in an embodiment, at least one locking element 1222 may include a plurality of front locking elements 12221, and the plurality of front locking elements 12221 may be connected with each other through a linkage assembly 12231, so that the locking elements 1222 located at the same side of the base plate 1210 can move synchronously. For example, the plurality of front locking elements 12221 may be rigidly connected (i.e., fixedly connected) with each other to move in the same direction, or the plurality of front locking elements 12221 may be connected with each other through the linkage assembly 12231 shown in FIG. 10A to move in opposite directions. Similarly, the at least one locking element 1222 may also include a plurality of rear locking elements 12222, which may be connected with each other through other linkage assembly 12231, so that the locking elements 1222 located at the other side of the base plate 1210 can move synchronously.

In another embodiment, the at least one locking element 1222 may include at least one front locking element 12221 and at least one rear locking element 12222. The front locking element 12221 is disposed on a side of the base plate 1210 and fixedly connected with the corresponding releasing operation element 1221, and the rear locking element 12222 is disposed on the other side of the base plate 1210 opposite to the side where the front locking element 12221 is located, and the front locking element 12221 and the rear locking element 12222 are connected through a linkage (for example, "12232" in FIG. 10A and "12232" in FIG. 14A, which will be described later), so that the locking elements 1222 located at different sides of the base plate 1210 can move synchronously.

Here, the linkage assembly 12231 and the linkage are uniformly referred to as "linkage device", which are used to connect between the locking elements 1222, so that the locking elements 1222 can move correspondingly along with the movement of the releasing operation element 1221, thereby realizing the synchronous unlocking or synchronous locking of objects by the plurality of locking elements 1222.

For example, as shown in FIG. 10A, two releasing operation elements 1221 are provided in an embodiment of the first aspect of the present disclosure. The two releasing operation elements 1221 are located on two sides of the base plate 1210 in a transverse direction (i.e., in the transverse direction D12), and each of the two releasing operation elements 1221 may move between its locking position and its unlocking position with respect to the base plate 1210. Correspondingly, two front locking elements 12221 and two rear locking elements 12222 are also provided in this embodiment. The two front locking elements 12221 are movably disposed on one side of the base plate 1210 and are fixedly connected with the corresponding releasing operation elements 1221 (for example, the releasing operation element 1221 that is adjacent to the corresponding front locking element 12221). The two rear locking elements 12222 are movably disposed on the other side of the base plate 1210 (i.e., a side opposite to the side where the two front locking elements 12221 are located), and each of the two rear locking elements 12222 is connected with the corresponding front locking element 12221 through a linkage.

For example, the two front locking elements 12221 may be disposed at a front side of the base plate 1210 (a lower left side is the front side of the base plate 1210 as shown in FIG. 10A) and fixedly connected with the adjacent releasing operation elements 1221 respectively, while the two rear locking elements 12222 may be disposed at a rear side of the base plate 1210 (an upper right side is the rear side of the base plate 1210 as shown in FIG. 10A) and respectively connected to the two front locking elements 12221 through their respective linkages, so as to move synchronously with the two front locking elements 12221. More specifically, as shown in FIG. 10B, the two releasing operation elements 1221 are symmetrically disposed on both sides of the base plate 1210 with respect to the centerline C15 of the base plate 1210, and the two front locking elements 1221 are symmetrically disposed between the two releasing operation elements 1221 with respect to the centerline C15 and are respectively fixedly connected to the adjacent releasing operation elements 1221. The centerline C15 of the base plate 1210 extends in the longitudinal direction D11 of the base plate 1210.

In an embodiment, as shown in FIG. 10A, the linkage may be a traction element 12232. Specifically, the traction element 12232 may be disposed to extend along a periphery of the locking mechanism 1220 in the base plate 1210, and the front locking element 12221 and the corresponding rear locking element 12222 that are disposed diagonally with respect to the centerline C15 of the base plate 1210 may be connected with each other through the traction element 12232, so that moving directions of the front locking element 12221 and the rear locking element 12222 connected by the same traction element 12232 are opposite to each other. For example, the two front locking elements 12221 located at the front side are respectively connected with the diagonally disposed rear locking elements 12222 through corresponding traction elements 12232, so that when the releasing operation element 1221 is operated, the front locking elements 12221 are driven to move in a direction towards the centerline C15, and then the rear locking elements 12222 connected with the front locking elements 12221 (diagonally disposed with the front locking elements 12221) are driven to move in a opposite direction, i.e., a direction opposite to that of the front locking element, such that the rear locking elements 12222 also move towards the centerline C15. When the releasing operation element 1221 is released, both the front locking elements 12221 and the rear locking elements 12222 move in a direction away from the centerline C15. In addition, in other embodiments, the front locking element 12221 and the rear locking element 12222 located on the same side of the centerline C15 of the base plate 1210 may be connected by the traction element 12232, so that when the releasing operation element 1221 is operated, the moving directions of the front locking element 12221 and the rear locking element 12222 are still opposite to each other, and however, the front locking element 12221 moves in a direction close to the centerline C15, and then the rear locking element 12222 moves in a direction away from the centerline C15.

In this embodiment, the traction element 12232 may be a steel wire, which is enclosed by a steel wire sleeve and hidden in the base plate 1210. In other embodiments, the traction element 12232 may also be a flexible member such as a composite material wire.

As shown in FIG. 10A, in this embodiment, a linkage assembly 12231 is further provided between the two front locking elements 12221 and/or between the two rear locking elements 12222, so that the two front locking elements 12221 (and the two rear locking elements 12222) synchronously move in opposite directions with respect to the centerline C15. For example, the linkage assembly 12231 is a four-bar linkage mechanism, which is formed by connecting four strips in pairs (specifically, hinged in pairs), wherein the mechanism has a pivot point fixed to the base plate (referring to the base plate 1220 in FIG. 10B, and the upper housing of the base plate is removed in FIG. 10A to show the structure of the locking mechanism 1220), and may extend to both sides with a line passing through the pivot point as a centerline (corresponding to the locking position of the releasing operation element 1221) or retract (corresponding to the unlocking position of the releasing operation element 1221. Specifically, the four-bar linkage mechanism includes a first bar, a second bar, a third bar and a fourth bar. The first bar, the second bar, the third bar and the fourth bar are connected in pairs to form four connection points. One of the four connection points is a fixed connection point P1, which is fixed to a fixed structure (such as the base plate 1220) of the locking base assembly 120, and the connection point opposite to the fixed connection point P1 is a central connection point P2. The bars of the four-bar linkage mechanism connected by the central connection point P2 are respectively connected to the two front locking elements and/or the two rear locking elements.

Through the linkage assembly 12231 as described above, when the at least one releasing operation element 1221 moves from the locking position to the unlocking position, the locking element 1222 correspondingly connected to the releasing operation element 1221 moves with the releasing operation element 1221 in the same moving direction as that of the releasing operation element 1221, while a moving direction of the central connection point P2 of the linkage assembly 12231 is perpendicular to the moving direction of the locking element 1222 and/or the releasing operation element 1221.

Through the cooperation of the linkage assembly 12231 and the linkage (for example, the traction element 12232), when the releasing operation element 1221 is in the locking position, the user can operate and move any releasing operation element 1221 from the locking position to the unlocking position, so as to move the front locking element 12221 connected therewith. Further, under the action of the linkage assembly 12231, the two front locking elements 12221 synchronously move in opposite directions (for example, moving close to each other), and under the action of the linkage, the rear locking elements 12222 are driven to move in opposite directions (for example, moving close to each other). At this time, the front locking elements 12221 and the rear locking elements 12222 simultaneously release the object. When the releasing operation element 1221 moves from the unlocking position to the locking position, the two front locking elements 12221 synchronously move away from each other, and the two rear locking elements 12222 also synchronously move away from each other.

In other embodiments, the two front locking elements 12221 and/or the two rear locking elements 12222 may move synchronously in the same direction through the linkage assembly 12231.

In addition, as shown in FIG. 10A, the locking base assembly 120 further includes an elastic device 1224, which provides a force to drive the releasing operation element to be in or restored to the locking position. In an embodiment, the elastic device 1224 is disposed between the two front locking elements 12221, and constantly provides a force to drive the two front locking elements 12221 away from each other. Optionally, the elastic device 1224 may also be disposed between the two rear locking elements 12222 and constantly provides a force to drive the two rear locking elements 12222 away from each other. For example, the elastic device 1224 may be a compression spring. In other embodiments, when the locking elements disposed on the same side (for example, two locking elements on the front side, two locking elements on the rear side, two locking elements on the right side, or two locking elements on the left side) move in the same direction, the locking elements may be fixedly connected with each other, and an elastic device is disposed between at least one of the locking elements and a fixed structure of the locking base assembly 120 (for example, the base plate 1210 as shown in FIG. 10B), so that the releasing operation element 1221 tends to be in the locking position. It should be noted that "front side", "rear side", "right side" and "left side herein refer to directions shown in FIG. 10A, for example, a lower left side in FIG. 10A refers to the front side of the locking base assembly 120, and an upper right side refers to the rear side of the locking base assembly 120.

In addition, the elastic device 1224 may also be disposed between one of the locking elements and the base plate (for example, in the case that the front locking element and the rear locking element are fixedly connected with each other) to provide a force to drive the releasing operation element to be in or be restored to the locking position.

As shown in FIG. 10A, in an embodiment, each of the two front locking elements 12221 is fixedly connected with the corresponding releasing operation element 1221 through a corresponding sliding element 1225, and the sliding element 1225 may slide in a sliding slot of the locking mechanism 1220, so that when a user operates the releasing operation element 1221, the front locking element 12221 and the releasing operation element 1221 that are connected together through the sliding element 1225 may slide synchronously, and thus the two front locking elements 12221 slide relative to each other. In addition, the front locking element 12221 and the releasing operation element 1221 may also be connected by other means, such as bolt connection, bonding, etc.

Optionally, the sliding element 1225 may be integrally formed with the releasing operation element 1221.

In addition, in an embodiment, referring to FIGS. 10A and 10B, one end of the front locking element 12221 is provided with a locking part **12221*a* (shown in FIG. 10B), and the base plate 1210 is provided with an opening at a position corresponding to the locking part 12221*a*, so that when the upper housing of the base plate 1210 is mounted above the locking mechanism 1220, the locking part 12221*a* may protrude from the opening of the base plate 1210. For example, the base plate 1210 has an upper housing structure with a raised front side, that is, a front part of the upper housing of the base plate 1210 may form a housing structure with a larger height (compared with a middle part thereof). Hereinafter, the part with a larger height may be referred to as a "raised structure". A recess 1212 is provided on the raised structure of the housing structure at an end of the front locking element 12221, and the recess 1212 penetrates through the raised structure in the longitudinal direction D1*a* for accommodating at least a part of the object. An opening is provided in the recess 1212 for the locking part 12221*a* of the front locking element 12221 to protrude from the base plate 1210, and the locking part 12221*a* protruding from the opening is located in the recess 1212 (i.e., the space formed therethrough). The rear side of the base plate 1210 (i.e., a position corresponding to the rear locking element 12222) may also have the same structure (i.e., the raised structure, the recess and its opening, etc.), which will not be described in detail herein. When an object is placed on the base plate 1210, the recess 1212 accommodates at least a part of the object (for example, a bracket device structure of the sleeping box), and the locking part 12221*a* protrudes from the opening and locks the part of the object in the recess 1212. In an embodiment, as shown in FIG. 10B, an upper surface of the part of the locking part 12221*a* protruding from the opening is a downward inclined surface, which facilitate a part of the object for being locked to move along the inclined surface into the recess 1212. It should be noted herein that the "front side" or "rear side" of the base plate 1210 may be understood as, when the base plate 1210 is provided on the wheeled carrying apparatus 11 as shown in FIG. 6A, a side of the base plate 1210 facing a forward direction of the wheeled carrying apparatus 11 refers to the front side, and a side of the base plate 1210 facing a backward direction of the wheeled carrying apparatus 11 refers to the rear side. In addition, the longitudinal direction D11 may be considered as a front-rear direction of the wheeled carrying apparatus 11 (and the base plate 1210**).

In addition, as shown in FIG. 10B, the raised upper housing structure (specifically, the raised structure) of the base plate 1210 is also provided with an inclined surface 1213, which is located above the recess 1212 and at a side opposite to the opening of the recess 1212 (i.e., where the locking part **12221*a* is located) to guide the locking of the object (such as a carrier, not shown) with the locking base assembly 120**.

Figure 11A:
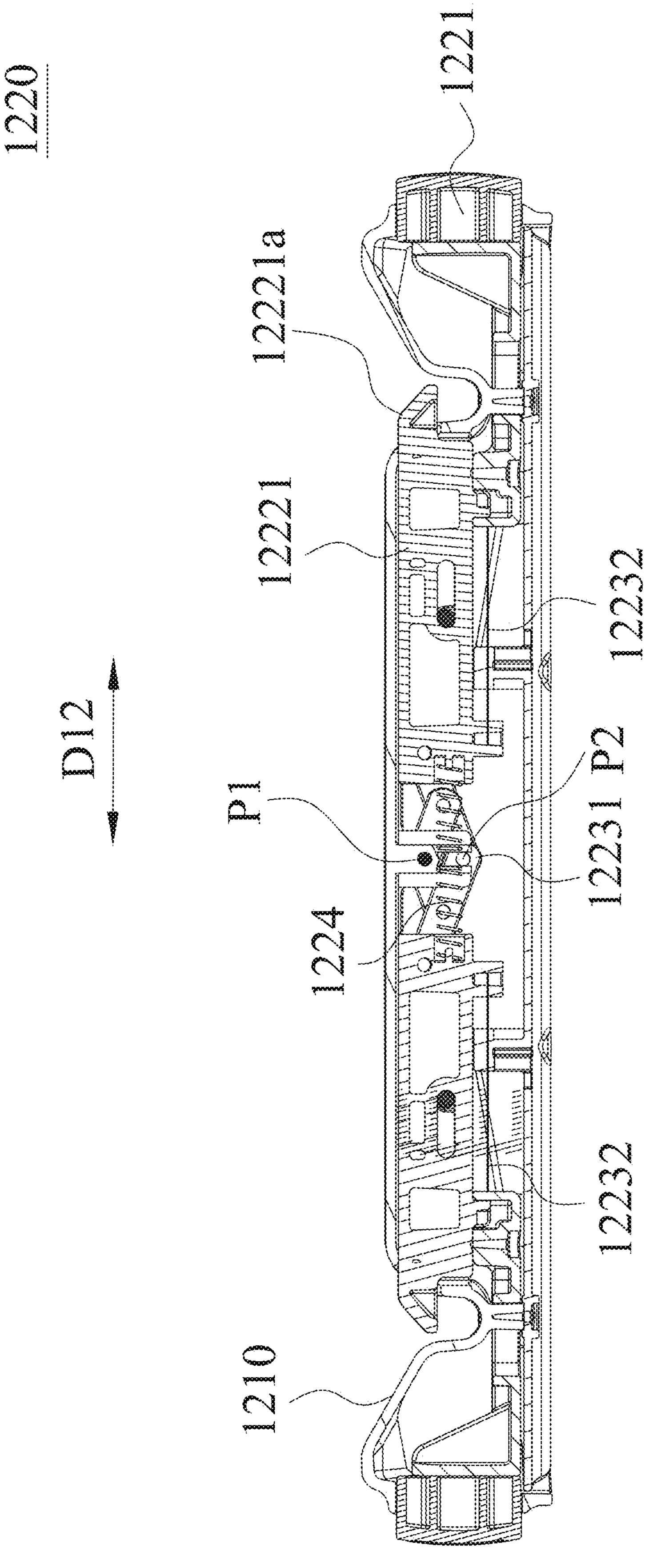
FIGS. 11A and 11B schematically show the locking mechanism according to an embodiment of the first aspect of the present disclosure.
Figure 11B:
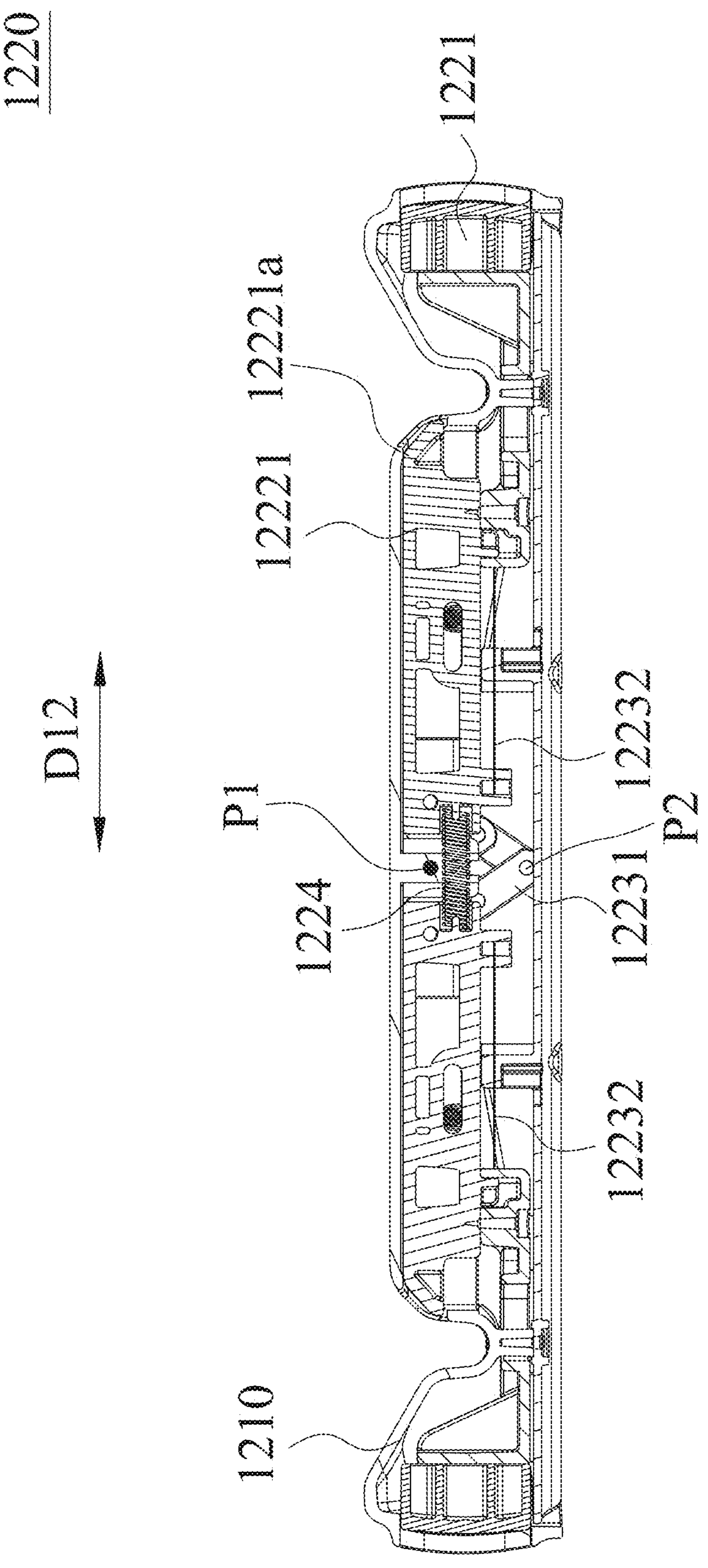

Referring to FIGS. 11A to 11B, a locked state and an unlocked state of the locking mechanism 1220 according to an embodiment of the first aspect of the present disclosure are shown. Specifically, FIG. 11A shows a cross-sectional view taken along a line E-E in FIG. 10B, in which the locking mechanism 1220 is in the locked state; and FIG. 11B shows the locking mechanism 1220 switched from the locked state shown in FIG. 11A to the unlocked state.

As shown in FIG. 11A, when the locking mechanism 1220 is in the locked state, the releasing operation element 1221 is in the locking position (i.e., an initial position), and the front locking elements 12221 fixedly connected with the releasing operation elements 1221 at two ends are in their respective locking positions, i.e., the locking part 12221*a* of each of the front locking elements 12221 protrudes from the base plate 1210. Also, the rear locking elements 12232 also remain in their locking positions. At this time, the front locking element 12221 and the rear locking element (not shown due to being blocked) lock the object at both sides of the base plate 1210 in the transverse direction D12, respectively. At this time, the elastic device 1224 located between the front locking elements 12221 is in an initial state (for example, in a stretched state), and optionally, the elastic device (not shown) located between the rear locking elements (not shown) is also in an initial state (for example, in a stretched state). In an embodiment, the central connection point P2 of the four-bar linkage mechanism of the linkage assembly 12231 is located at a position higher up as shown in FIG. 11A, that is, close to the fixed connection point P1.

As shown in FIG. 11B, when one of the releasing operation elements 1221 is operated to move from the locking position to the unlocking position, the front locking element 12221 fixedly connected with the releasing operation element 1221 moves along with the movement of the releasing operation element 1221, and at the same time, the other releasing operation element 1221 synchronously moves in opposite directions through the linkage assembly 12231, and the corresponding rear locking elements (not shown) are driven to move synchronously by the linkage element (i.e., "the traction element 12232" in this embodiment), so that the locking parts 12221*a* of the two front locking elements 12221 and the locking parts (not shown) of the two rear locking elements are retracted into the base plate 1210, thereby unlocking the object. At this time, the elastic device 1224 between the front locking elements 12221 is in a state that the releasing operation element 1221 tends to be restored to the locking position (for example, a compressed state), and optionally, the elastic device (not shown) between the rear locking elements (not shown) is also in a compressed state. In an embodiment, the central connection point P2 of the four-bar linkage mechanism of the linkage assembly 12231 is located at a lower position as shown in FIG. 11B, that is, a position far away from the fixed connection point P1. That is, when the releasing operation element 1221 moves from the locking position to the unlocking position, the central connection point P2 of the linkage assembly 12231 moves substantially vertically downward with respect to the fixed connection point P1.

When the releasing operation element(s) 1221 are (is) released, the two releasing operation elements 1221 are synchronously restored to their respective locking positions from their respective unlocking positions, and the two front locking elements 12221 are relatively far away from each other (for example, under the action of the elastic device 1224 therebetween), and at the same time, the two rear locking elements (not shown) are driven to be relatively far away from each other, so that the locking mechanism 1220 is restored to the locked state as shown in FIG. 11A. In another embodiment, when the releasing operation element (s) 1221 are (is) released, the two rear locking elements (not shown) are relatively far away from each other under the action of the elastic device (not shown) therebetween, and at the same time, the two front locking elements 12221 are driven to be relatively far away from each other, so that the locking mechanism 1220 is restored to the locked state as shown in FIG. 11A.

Figure 12:
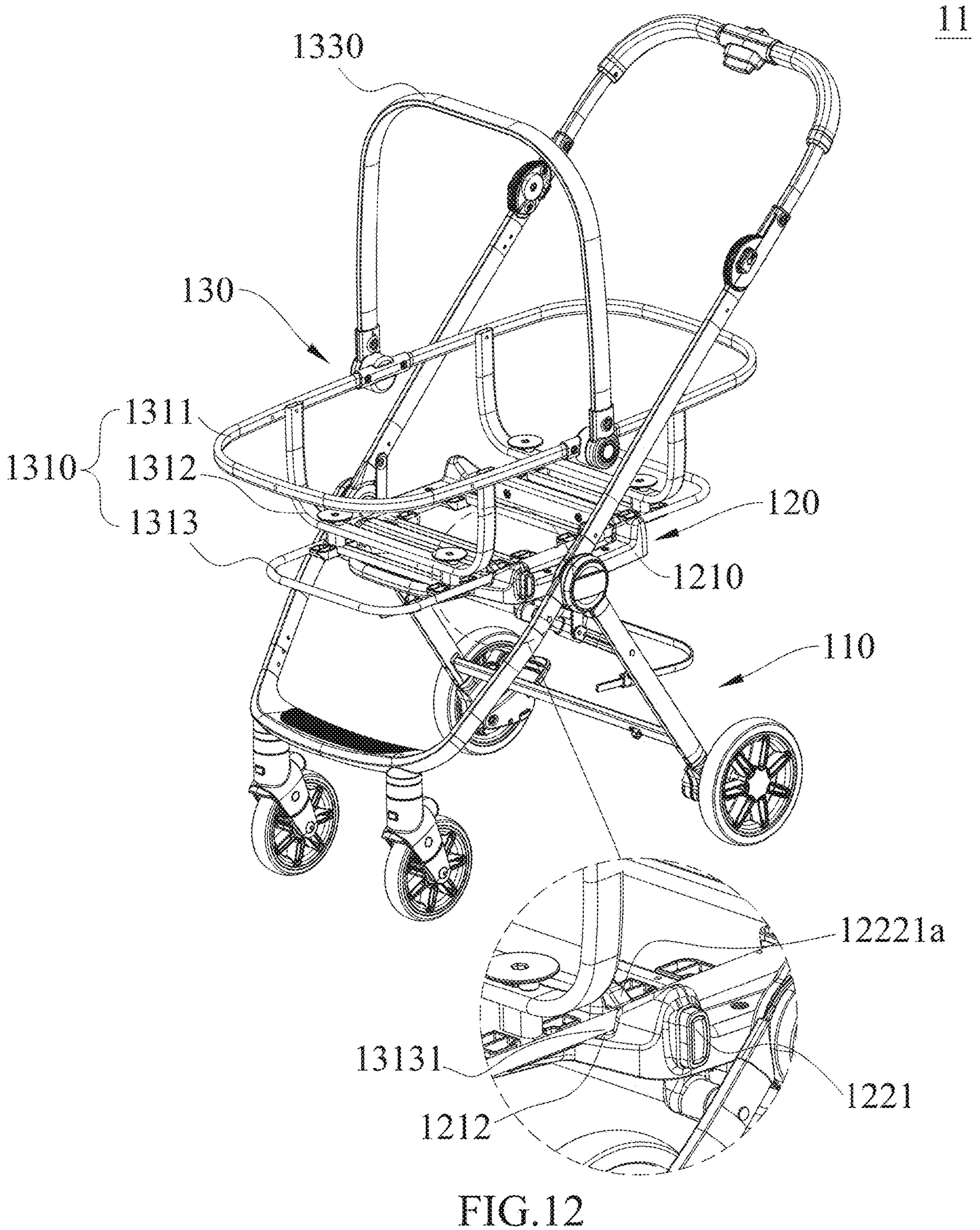
FIG. 12 schematically shows the wheeled carrying apparatus according to an embodiment of the first aspect of the present disclosure, in which the main body of the carrier is removed to show the connection of the bracket device of the carrier with the locking mechanism.

Referring to FIG. 12, the wheeled carrying apparatus 11 according to an embodiment of the present disclosure is shown, in which the main body of the carrier 130 is removed to show the connection relationship between the bracket device 1310 of the carrier 130 and the locking mechanism 120.

As shown in FIG. 12, when the carrier 130 (i.e., as an example of the above-mentioned "object") is mounted on the base plate 1210 through the locking mechanism 120 (the releasing operation element 1221 is in the locking position), the engaging element 13131 (e.g., the annular structural element shown in FIG. 12) of the third bracket 1313 is partially locked in a space defined by the recess 1212 and the locking part 12221*a*, thereby locking the carrier 130 onto the base plate 1210.

Figure 13A:
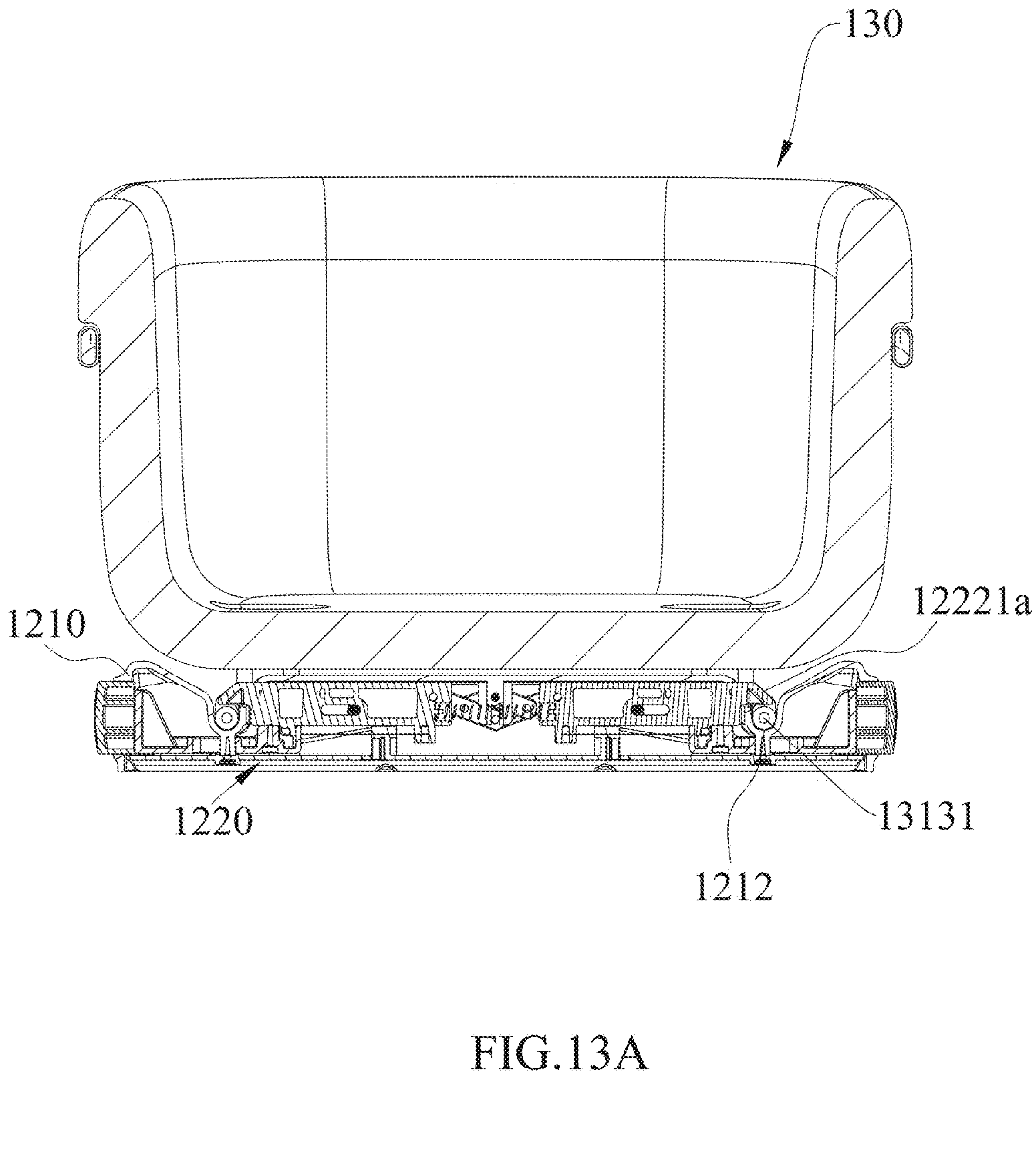
FIGS. 13A and 13B schematically show the locking mechanism and the carrier placed thereon according to an embodiment of the first aspect of the present disclosure.
Figure 13B:
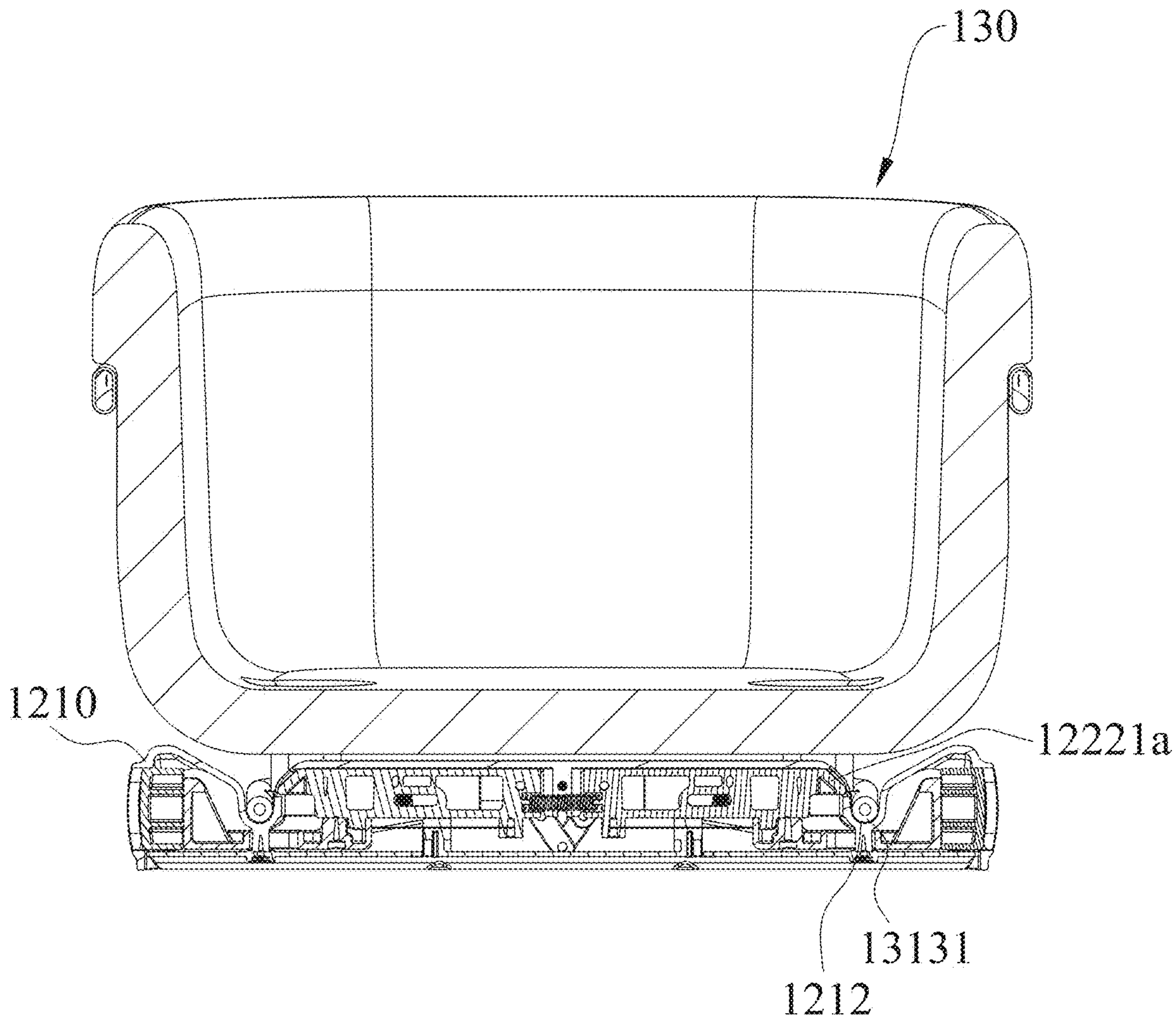

Further referring to FIGS. 13A to 13B, the locking mechanism 1220 and the carrier 130 placed thereon according to an embodiment of the first aspect of the present disclosure are schematically shown. FIG. 13A shows a view that the carrier 130 is locked to the locking mechanism 1220 on the base plate 1210, and FIG. 13B shows a view that the carrier 130 is placed on the base plate 1210 but the locking mechanism 1220 is in the unlocked state.

As shown in FIG. 13A, when the locking mechanism 1220 is in the locked state, the locking part 12221*a* of the front locking part 12221 protrudes from the opening at the recess 1212 of the base plate 1210, so as to lock the engaging part 13131 of the carrier 130 into the recess 1212.

As shown in FIG. 13B, when the locking mechanism 1220 is restored from the locked state to the unlocked state, the locking part 12221*a* retracts into the base plate 1210 (for example, the opening at the recess 1212), while the engaging element 13131 of the carrier 130 may move out of the recess 1212, that is, the carrier 130 may be taken down.

Figure 14A:
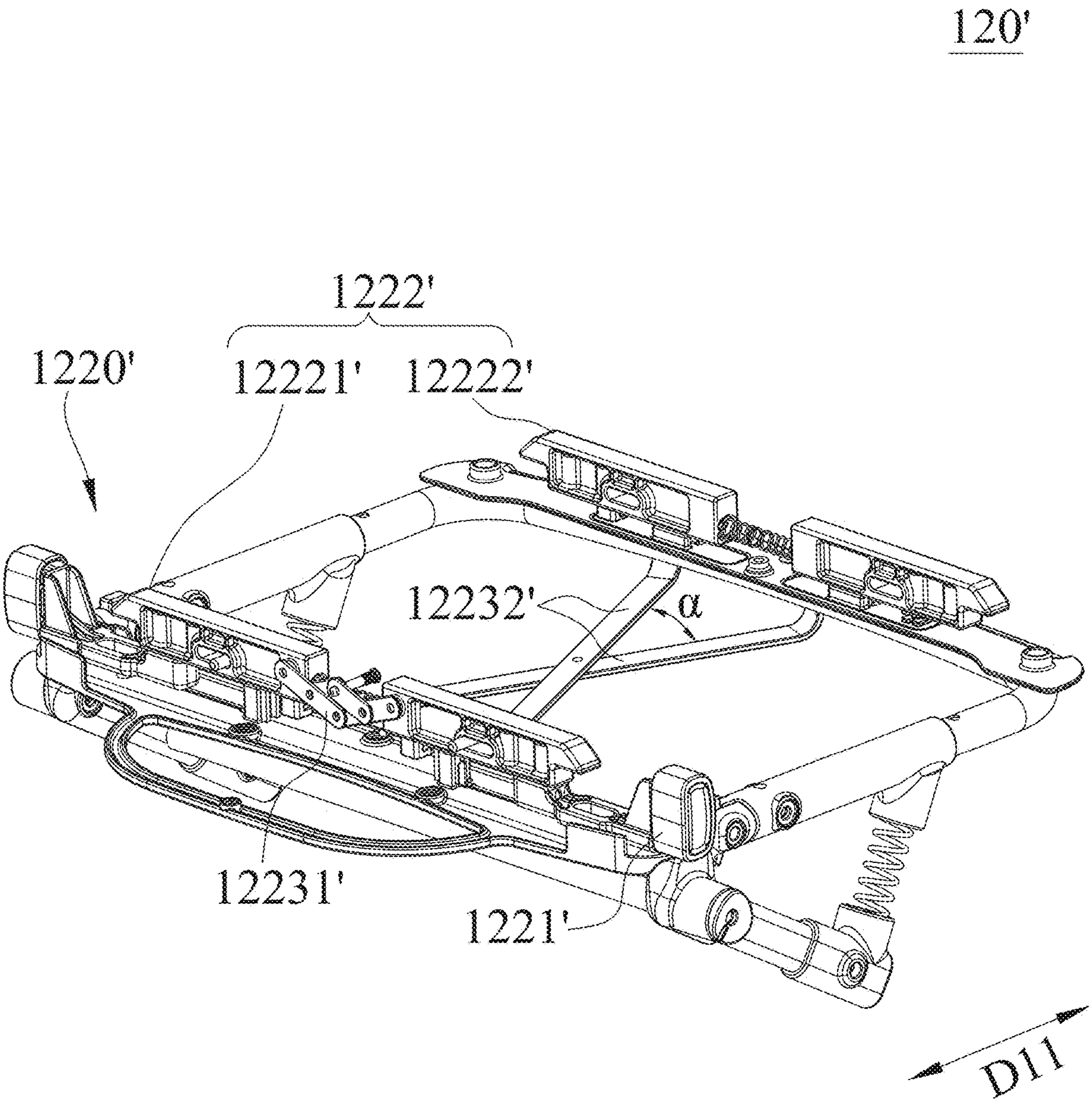
FIGS. 14A and 14B schematically show a locking base assembly according to another embodiment of the first aspect of the present disclosure, in which an upper housing of a base plate is removed in FIG. 14A to show a locking mechanism.
Figure 14B:
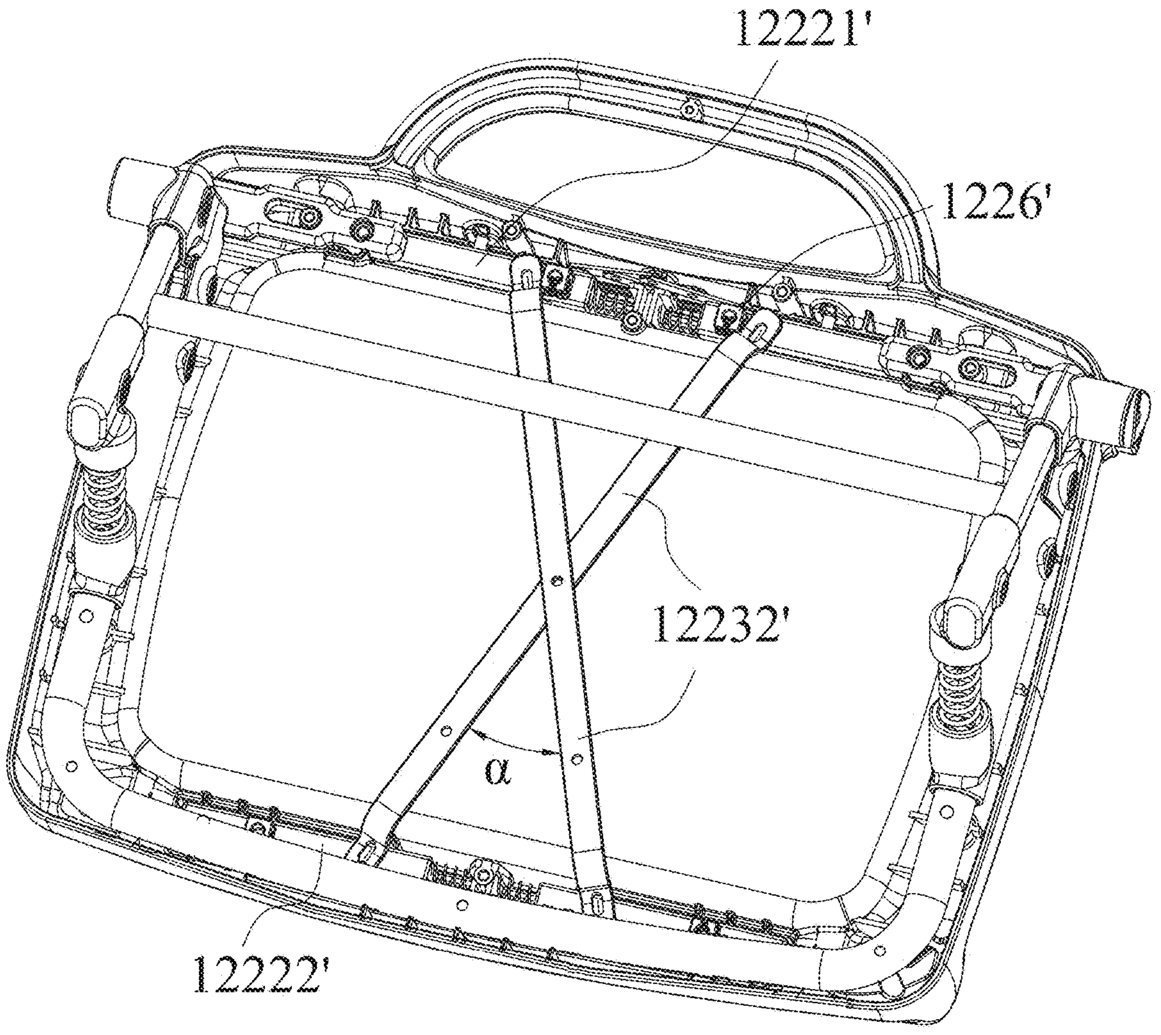

Referring to FIGS. 14A to 14B, a locking base assembly 120' according to another embodiment of the first aspect of the present disclosure is shown, in which an upper housing of a base plate is removed to show a locking mechanism 1220'.

In another embodiment of the first aspect of the present disclosure, as shown in FIG. 14A, the linkage may be a linking rod 12232'. Specifically, the linking rod 12232' may connect locking elements 1222' located at two sides of the locking base assembly 120' in the longitudinal direction D11 (the front side and the rear side as shown in FIG. 14A), especially a front locking element 12221' and a corresponding rear locking element 12222' that are diagonally disposed. In an example, two ends of each of two linking rods 12232' are pivotally connected to the front locking element 12221' and the rear locking element 12222' that are diagonally disposed, respectively, and the two linking rods 12232' are connected (articulated) at an intersection thereof.

When one of the releasing operation elements 1221' is operated, the two front locking elements 12221' synchronously move in opposite directions in order to close to each other under the action of the linkage assembly 12231', so that an angle $\alpha$ between the two cross-connected linking rods 12232' gradually decreases, and then the two rear locking elements 12222' respectively connected with the two front locking elements 12221' move in opposite directions to close to each other. When the releasing operation element 1221' is released, the two front locking elements 12221' move away from each other synchronously, and the angle between the two cross-connected linking rods 12232' gradually increases, so that the two rear locking elements 12222' also move away from each other.

In combination with FIG. 14B, in an embodiment, two ends of the linking rod 12232' are respectively pivotally connected between the corresponding front locking element 12221' and the corresponding rear locking element 12222' from the bottom. A stopper 1226' may also be provided at the bottom of the front locking element 12221' and/or the rear locking element 12222' to limit a minimum value of the angle α between the two linking rods 12232', that is, to prevent the two linking rods 12232' from being stuck because the angle therebetween is too small, and to prevent the linking rod 12232' from being disengaged from an inner bottom of the front locking element 1221' and/or the rear locking element 12222'.

Figure 15:
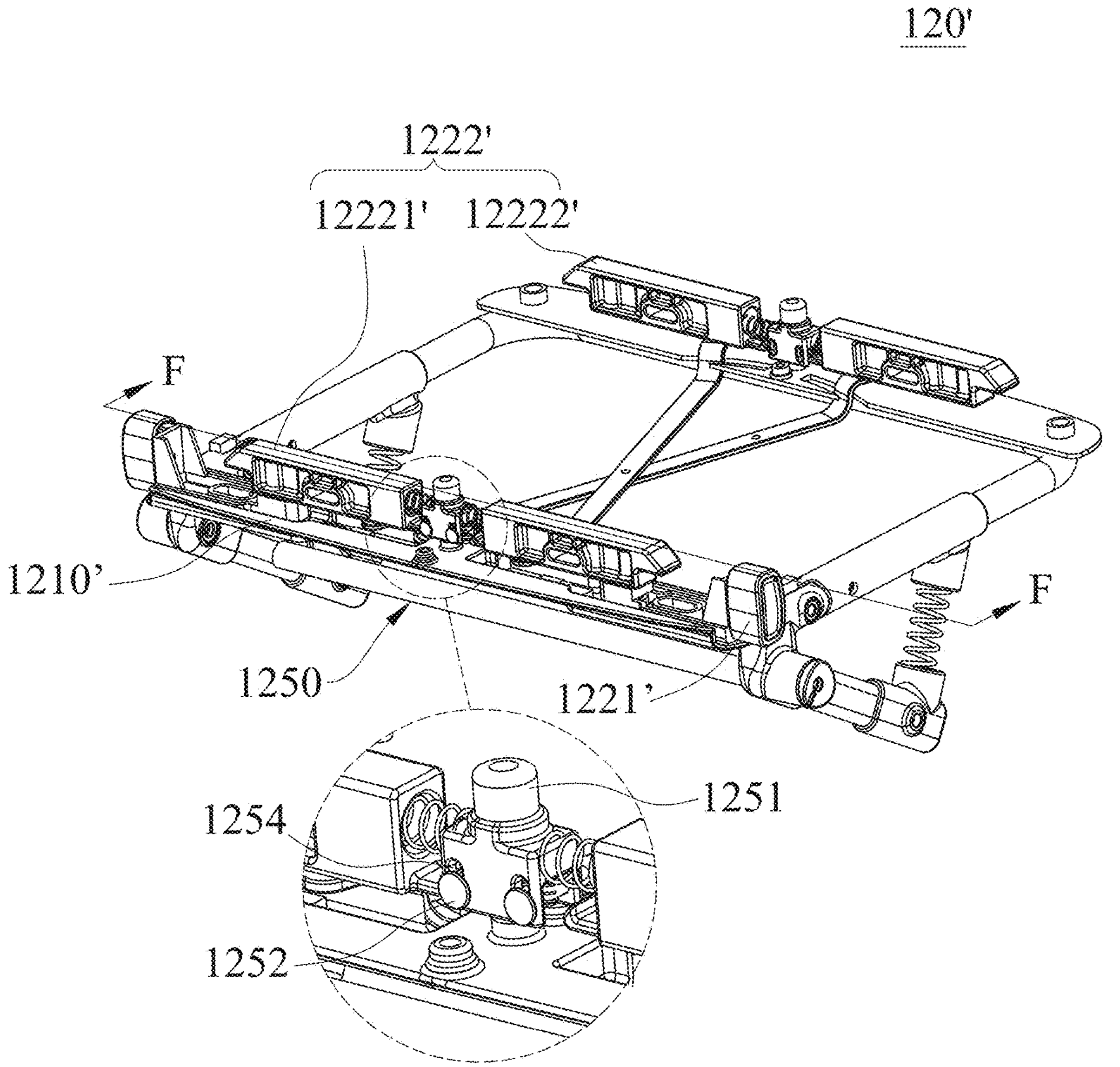
FIG. 15 schematically shows the locking base assembly provided with a holding mechanism according to the first aspect of the present disclosure, in which the upper housing of the base plate is removed to show the holding mechanism.

Referring to FIG. 15, the locking base assembly 120' provided with a holding mechanism 1250 according to an embodiment of the present disclosure is schematically shown, in which the upper housing of the base plate is removed to show the holding mechanism 1250. As shown in FIG. 15, the locking base assembly 120' of the present disclosure further includes a holding mechanism 1250, which is disposed between two front locking elements 12221' and/or between two rear locking elements 12222' for holding the releasing operation element 1221' in the unlocking position, that is, holding the locking base assembly 120' in the unlocked state. In this way, the user can keep the locking base assembly 120' in the unlocked state without continuously operating the releasing operation element 1221' (for example, pressing the releasing operation element 1221'), so that the locking base assembly 120' is kept in the unlocked state for the user to remove the object above the locking base assembly 120' at any time.

It should be noted that, although only the embodiment in which the front locking element 12221' and the rear locking element 12222' are connected by using two linking rods (such as the linking rod 12232' as shown in FIG. 14B) is shown in FIG. 15, it should be understood that the holding mechanism 1250 is also applicable to a case that the front locking element 12221 and the rear locking element 12222 are connected through a traction element (such as the embodiment as shown in FIG. 10A).

Figure 16A:
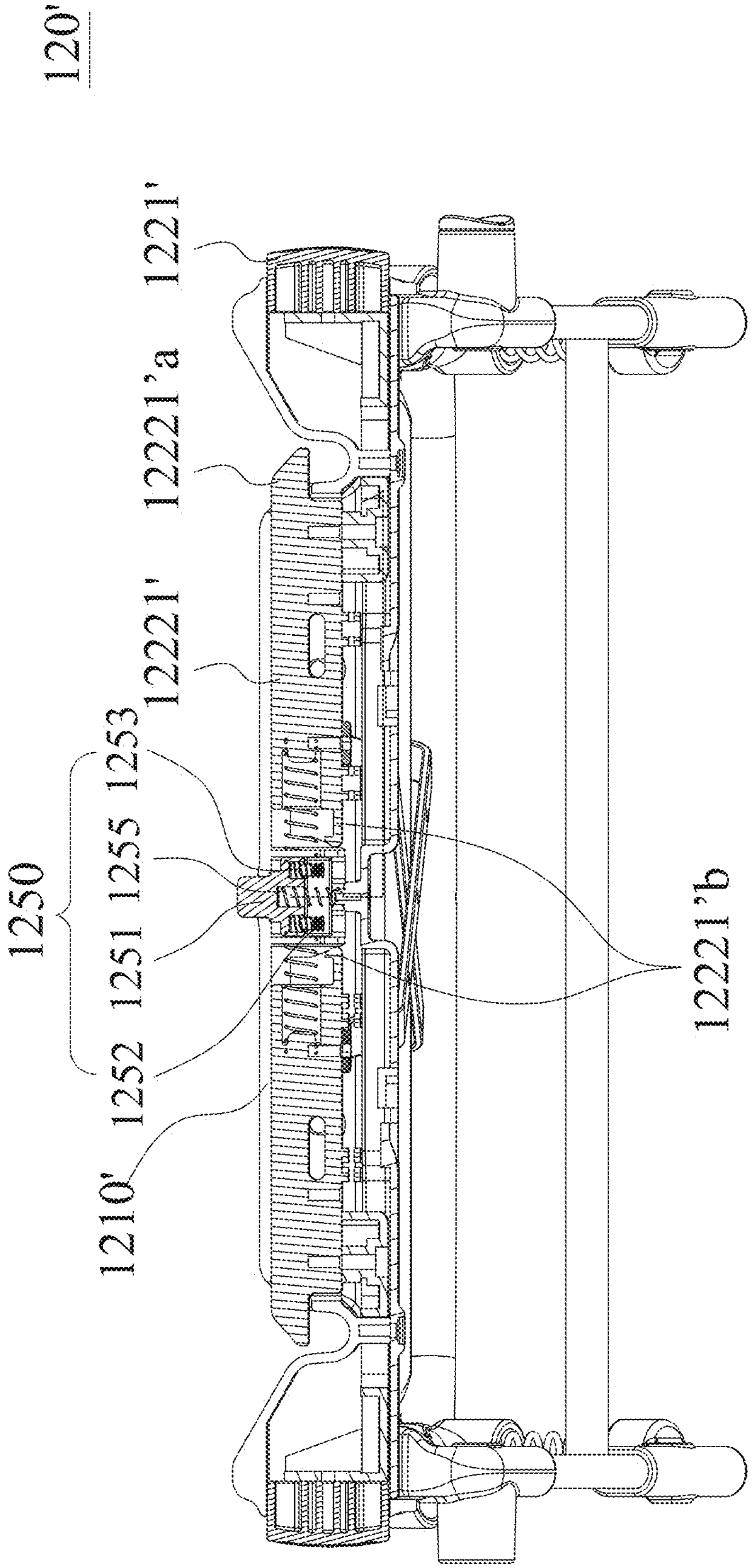
FIG. 16A schematically shows a cross-sectional view of the holding mechanism taken along a line F-F shown in FIG. 15, in which a cross-section of the base plate is correspondingly shown to show a structural relationship between the holding mechanism and the base plate.

Referring to FIG. 15 and FIG. 16A together, FIG. 16A schematically shows a cross-sectional view of the holding mechanism 1250 taken along the line F-F of FIG. 15, showing the structural relationship between the holding mechanism 1250 and the base plate 1210'. As shown in FIG. 15, the holding mechanism 1250 includes a touch button 1251, a buckling part 1252, and a restoring element 1255 (not shown in FIG. 15 since it is blocked, but shown in FIG. 16A). The touch button 1251 is disposed in the base plate 1210' (only the lower housing of the base plate 1210' is shown in FIG. 15, and the upper housing of the base plate 1210' is shown in FIG. 16A), and is capable of moving with respect to the base plate 1210' in the vertical direction and at least partially protruding above the base plate 1210' (specifically, the upper housing thereof is shown in FIG. 16A). The buckling part 1252 is movably disposed below the touch button 1251 and moves in the vertical direction along a sliding rail 1254 on the touch button 1251. For example, the buckling part 1252 may be an engaging pin. As shown in FIG. 16A, the restoring element 1255 is disposed between the touch button 1251 and a fixed structure of the locking base assembly 120' (for example, the lower housing of the base plate 1210'), and constantly provides a force to drive the touch button 1251 to protrude upward from the base plate 1210', that is, under the action of the restoring element 1255, the touch button 1251 may be restored from a pressed state to an initial released state.

Referring to FIG. 16A, in an embodiment, the holding mechanism 1250 further includes an elastic element 1253, which is disposed between the touch button 1251 and the buckling part 1252 to cooperate with the movement of the buckling part 1252 with respect to the touch button 1251. In addition, a holding hook 12221'*b* is provided at a lower part of one end of the front locking element 12221' far away from the locking part 12221'*a*, so as to be able to correspondingly hook the buckling part 1252 of the holding mechanism 1250. A front end of the holding hook 12221'*b* may also be provided with a chamfer to more firmly engage with the buckling part 1252.

In addition, as shown in FIG. 16A, when the carrier is not placed on the base plate 1210' and the releasing operation element 1221' has not been operated, the releasing operation element 1221' is in the locking position (i.e., the initial position) and the holding mechanism 1250 is also in its initial position. At this time, the touch button 1251 of the holding structure 1250 protrudes from the top of the base plate 1210', the buckling part 1252 and the holding hook 12221'*b* of the front locking element 12221' are separated from each other, and both the restoring element 1255 and the elastic element 1253 are in the released state, that is, they are not compressed.

Figure 16B:
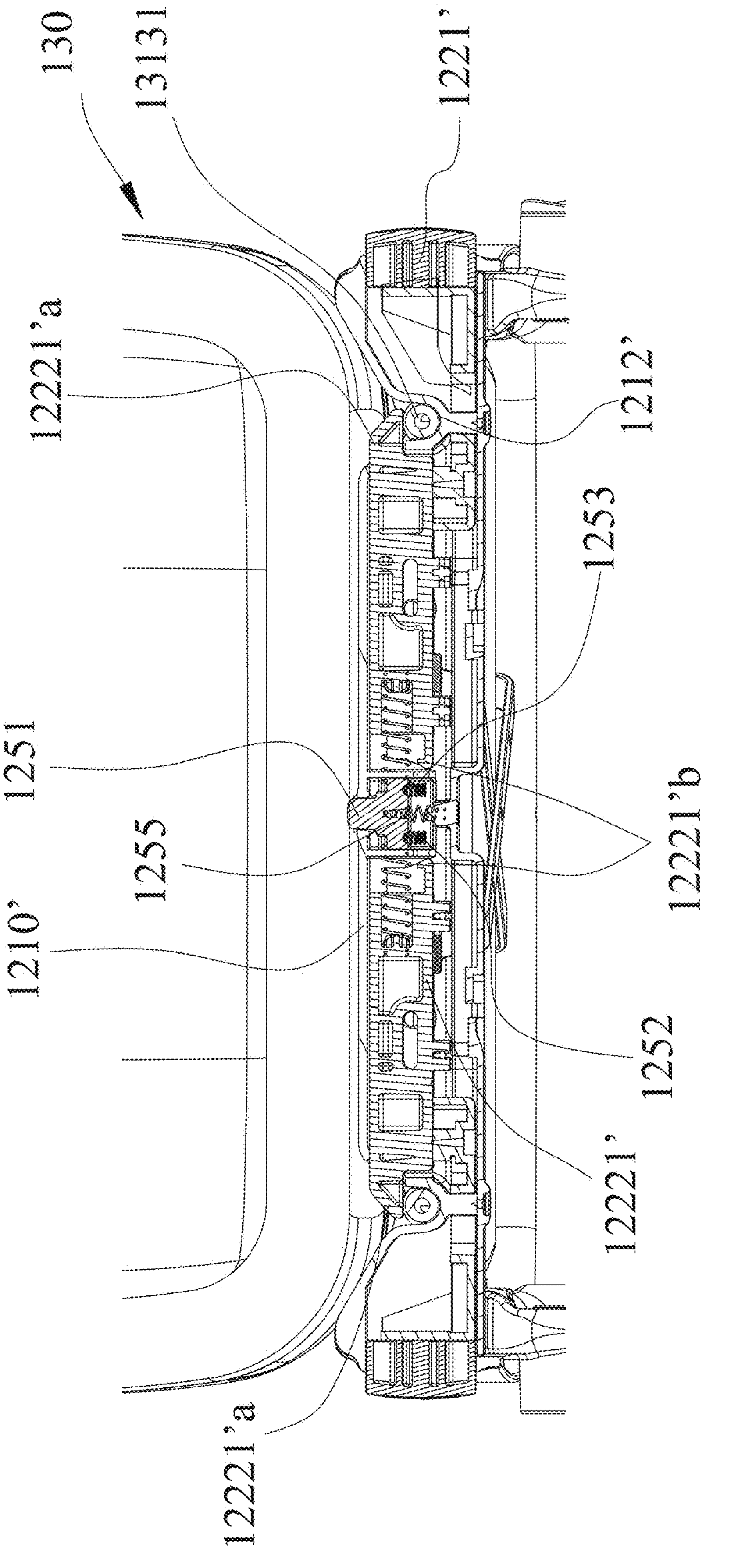
FIGS. 16B and 16C schematically show cross-sectional views of the holding mechanism according to the first aspect of the present disclosure, in which a carrier is placed above the base plate.
Figure 16C:
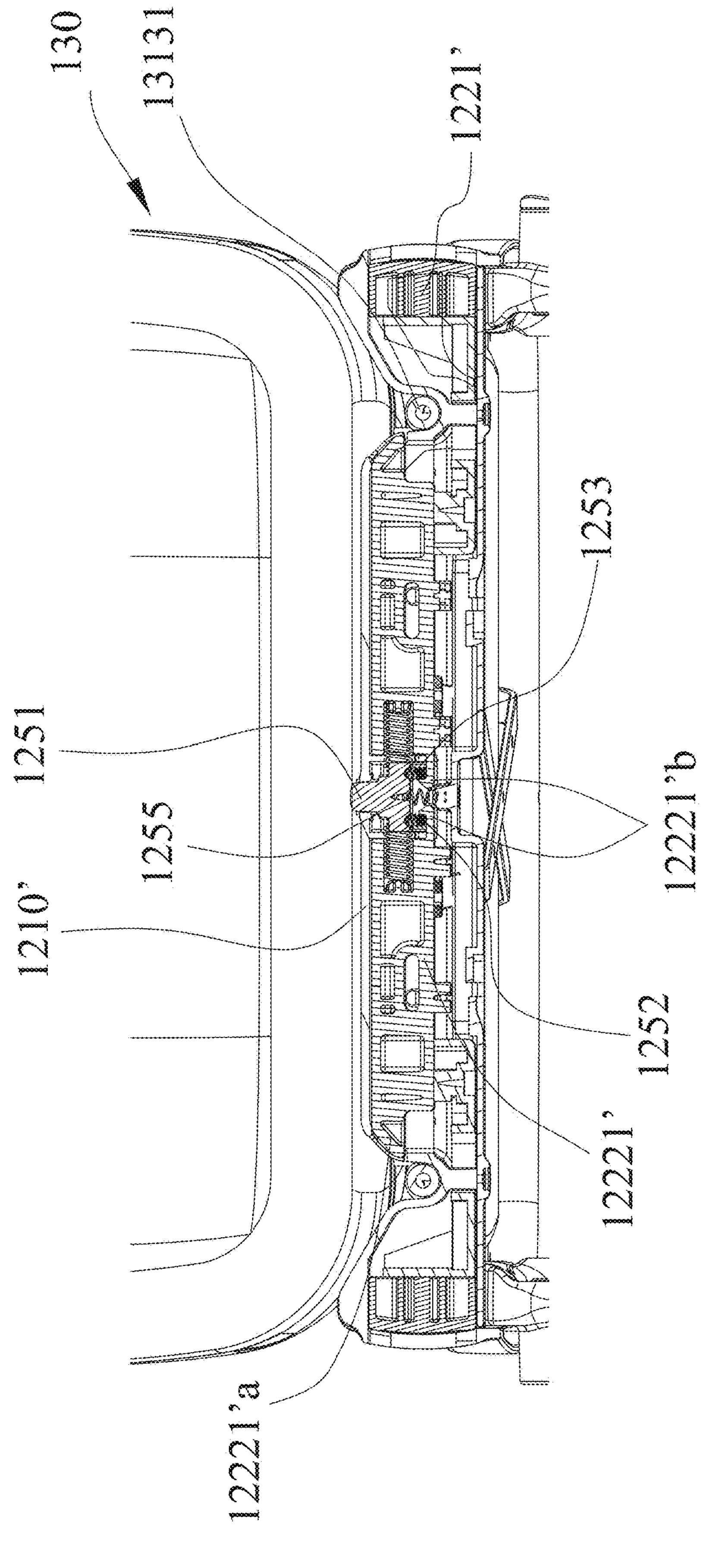

In combination with FIGS. 16B and 16C, an operation process of the holding structure 1250 when the carrier 130 is placed on the base plate 1210' and needs to be removed is schematically shown.

As shown in FIG. 16B, when the carrier 130 is placed on the base plate 1210', the engaging element 13131 of the carrier 130 moves downward and is engaged in the recess 1212' by the locking part 12221'*a* of the front locking element 12221', and at the same time, the bottom surface of the carrier 130 presses down the touch button 1251 and compresses the restoring element 1255. The buckling part 1252 and the elastic element 1253 connected between the touch button 1251 and the buckling part 1252 move downward as the touch button 1251 is pressed down. At this time, the holding mechanism is in a ready state.

When the carrier 130 needs to be moved away from the base plate 1210', as shown in FIG. 16C, the user may operate (for example, press) the releasing operation element 1221', and the front locking element 12221' connected with the releasing operation element 1221' moves along with the movement of the releasing operation element 1221', so that the holding hook 12221'*b* of the front locking element 12221' moves towards the holding mechanism 1221 to hook the buckling part 1252. More specifically, as the holding hook 12221'*b* moves towards the holding mechanism 1250, a front end (e.g., through the chamfer) of the holding hook 12221'*b* urges the buckling part 1252 to move upward against the force of the elastic element 1253 (i.e., the buckling part 1252 compresses the elastic element 1253 and approaches the touch button 1251) until a hook-shaped part of the holding hook 12221' passes over the buckling part 1252, the buckling part 1252 moves downward under the action of the elastic element 1253 and is hooked by the holding hook 12221'*b*. At this time, the holding mechanism 1250 is in a holding state, and the buckling part 1252 is kept in a state of being engaged by the holding hook 12221'*b* under the action of a downward force applied by the carrier 130 and the elastic element 1253, so that the releasing operation element 1221' is kept in the unlocking position, and the engaging element 13131 of the carrier 130 is not blocked by the locking part 12221'*a* (i.e., the carrier 130 continues to be a state that it can be moved away).

Then, when the carrier 130 is removed, the touch button 1251 protrudes from the top of the base plate 1210' again under the action of the restoring element 1255, the buckling part 1252 moves upward with the touch button 1251 and is separated from the holding hook 12221'*b* of the front locking element 12221', and the locking operation element 1221' returns to the locking position as shown in FIG. 16A.

Figure 16D:
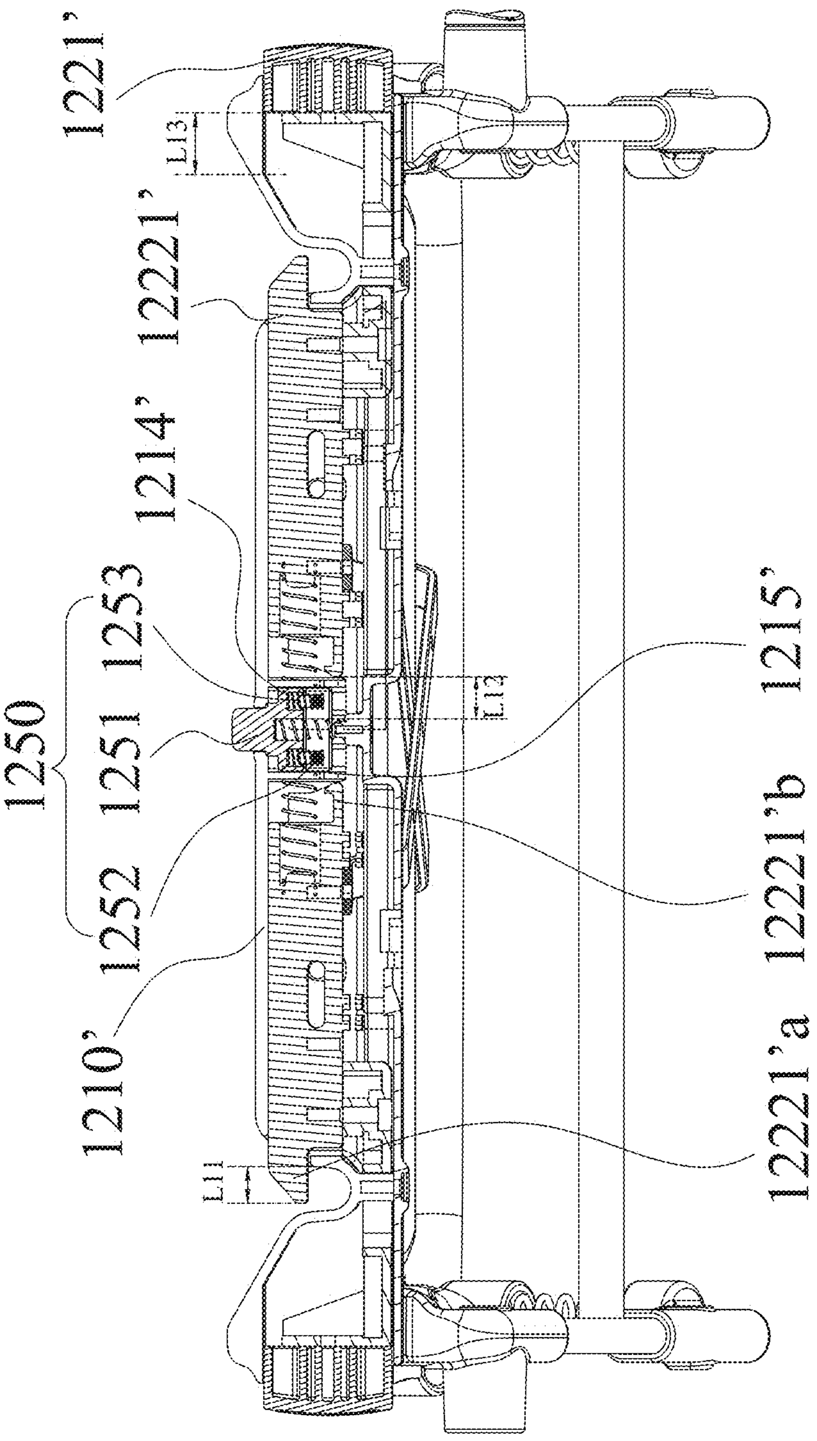
FIG. 16D schematically shows a cross-sectional view of the holding mechanism according to the first aspect of the present disclosure.

Referring to FIG. 16D, a structure of the holding mechanism 1250 according to the present disclosure is shown.

As shown in FIG. 16D, the touch button 1251 is disposed in a slideway 1214' disposed inside the base plate 1210', so that it can move up and down along the slideway 1214'. Notches 1215' are symmetrically provided on a wall of the slideway 1214', so that the holding hook 12221'*b* may extend into the notch 1215' when it moves towards the holding mechanism 1250 to realize the engagement.

In addition, as shown in FIG. 16D, when the carrier 130 (shown in combination with FIGS. 16B and 16C) is mounted on the base plate 1210', a distance that the locking part 12221'*a* moves inward is L11; a distance that the holding hook 12221'*b* moves to be engaged with the buckling part 1252 (i.e., a distance from the holding hook 12221'*b* to the farthest end of the buckling part 1252) is L12; and a distance that the releasing operation element 1221' is pressed to be unlocked is L13. In an embodiment, L11<L12<L13, so as to ensure that when the carrier 130 (not shown in FIG. 16D, referring to FIG. 16B) is locked on the base plate 1210', the holding hook 12221'*b* does not hook the buckling part 1252, but only when the releasing operation element 1221' is pressed, the holding hook 12221'*b* is hooked by the buckling part 1252.

According to the locking base assembly of the present disclosure, the linkage assembly is disposed between the releasing operation elements, the linkage is disposed between the front locking element and the rear locking element, and the holding mechanism is further disposed, so that the user can unlock the front locking element and the rear locking element simultaneously in a case that only one of the releasing operation elements is operated, thereby providing a wheeled carrying apparatus with convenient operation and simple structure, enabling the user to conveniently move the carrier away from the carrying frame (for example, operating with one hand), and providing a better service for the user.

Optionally, by providing the supporting frame with shock absorption function on the locking base assembly, when the carrying frame moves, it can provide buffer support for the carrier mounted on the frame and animals or the like therein, thereby providing a more comfortable and safer wheeled carrying apparatus. In addition, by cooperating with the limiting structure such as a limiting finger, a limiting projection and/or a limiting element, a buffering displacement of the supporting frame can be limited within a certain range, so that the carrier disposed on the carrying frame through the locking base assembly can move more smoothly. The present disclosure is not limited to the above-mentioned mounting structure. For example, FIGS. 17A to 17D also show a wheeled carrying apparatus 11A with another mounting structure and a locking base assembly 120A mounted thereon.

Figure 17A:
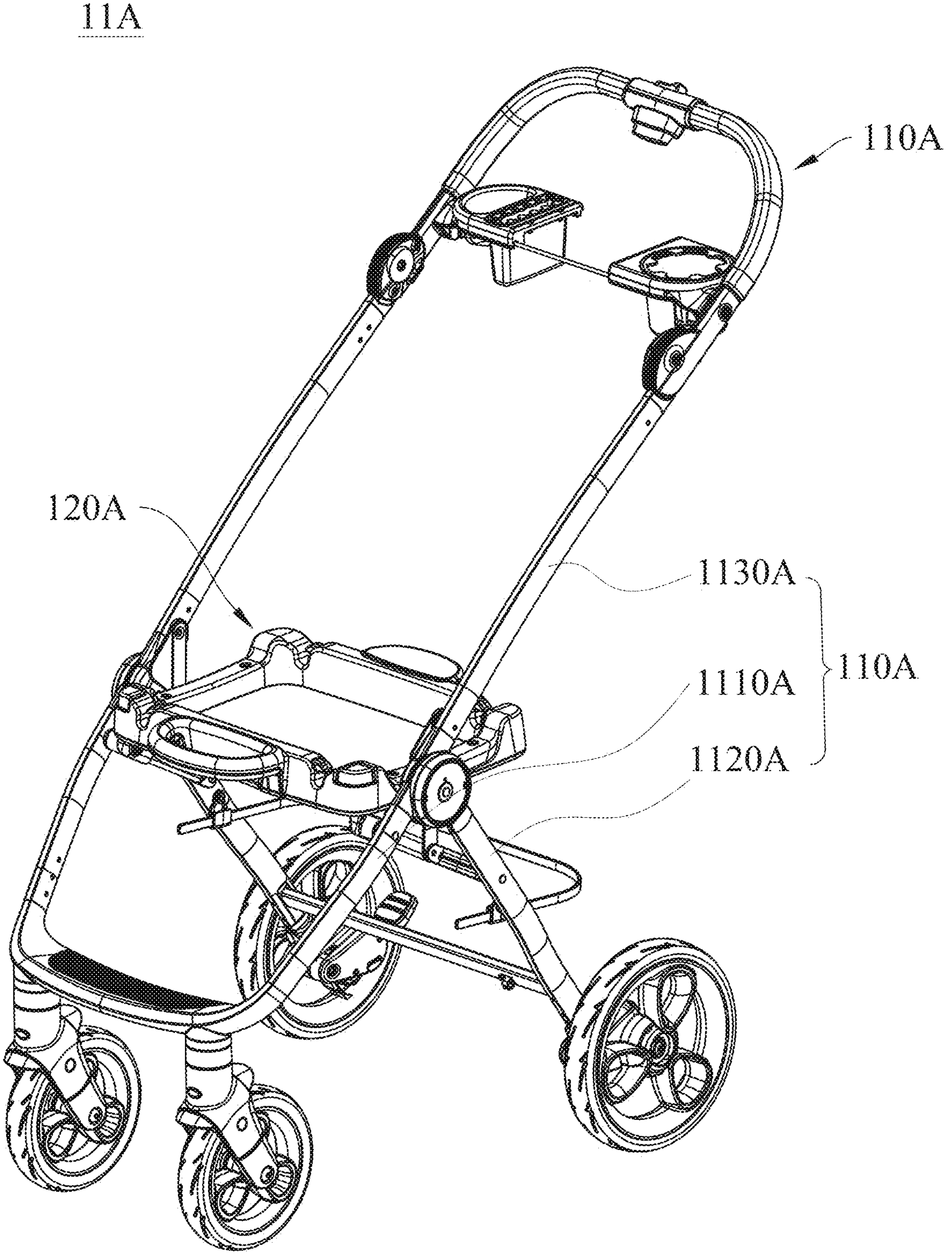
FIGS. 17A to 17D schematically show a wheeled carrying apparatus according to an embodiment of the present disclosure.
Figure 17B:
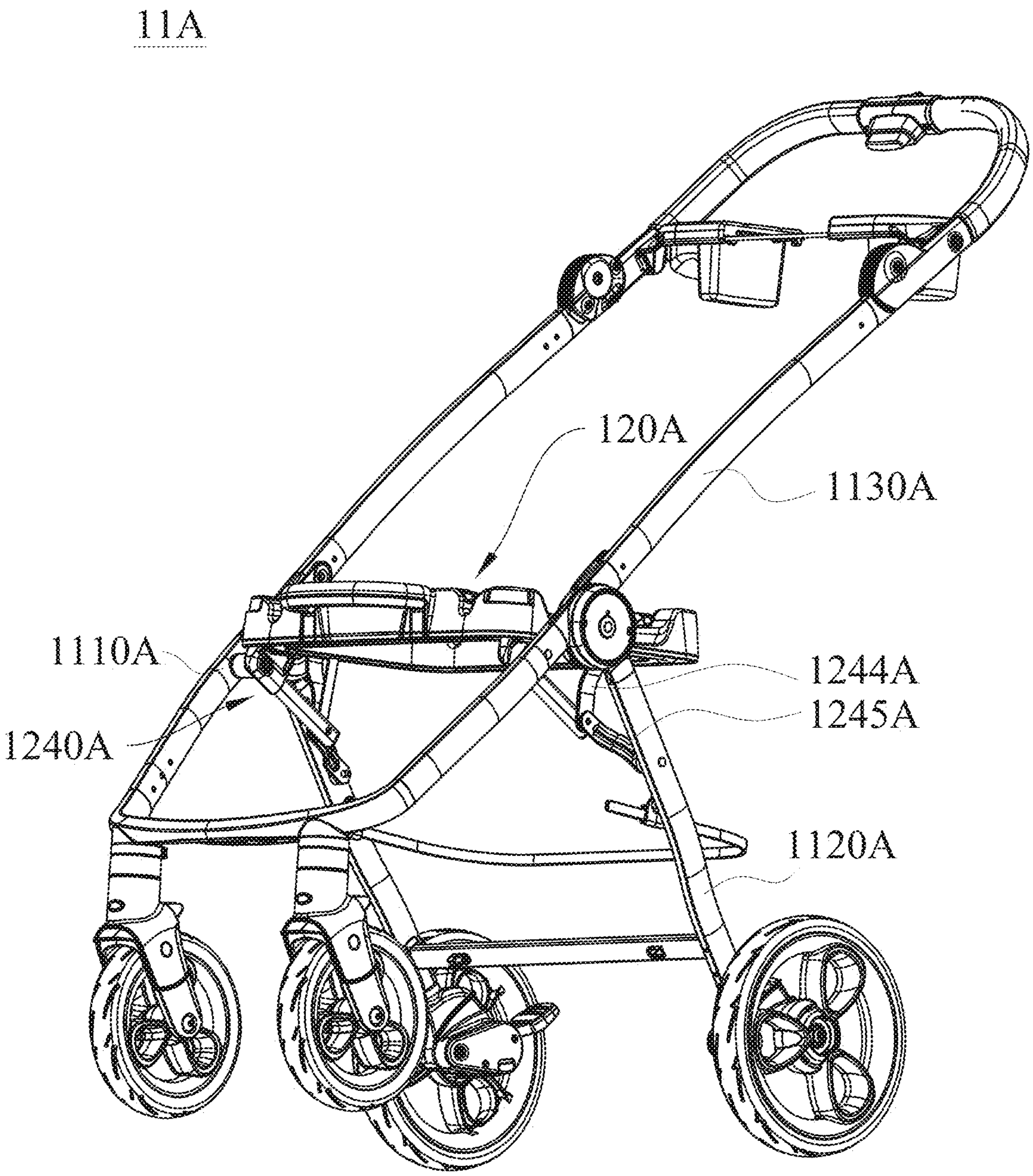
Figure 17C:
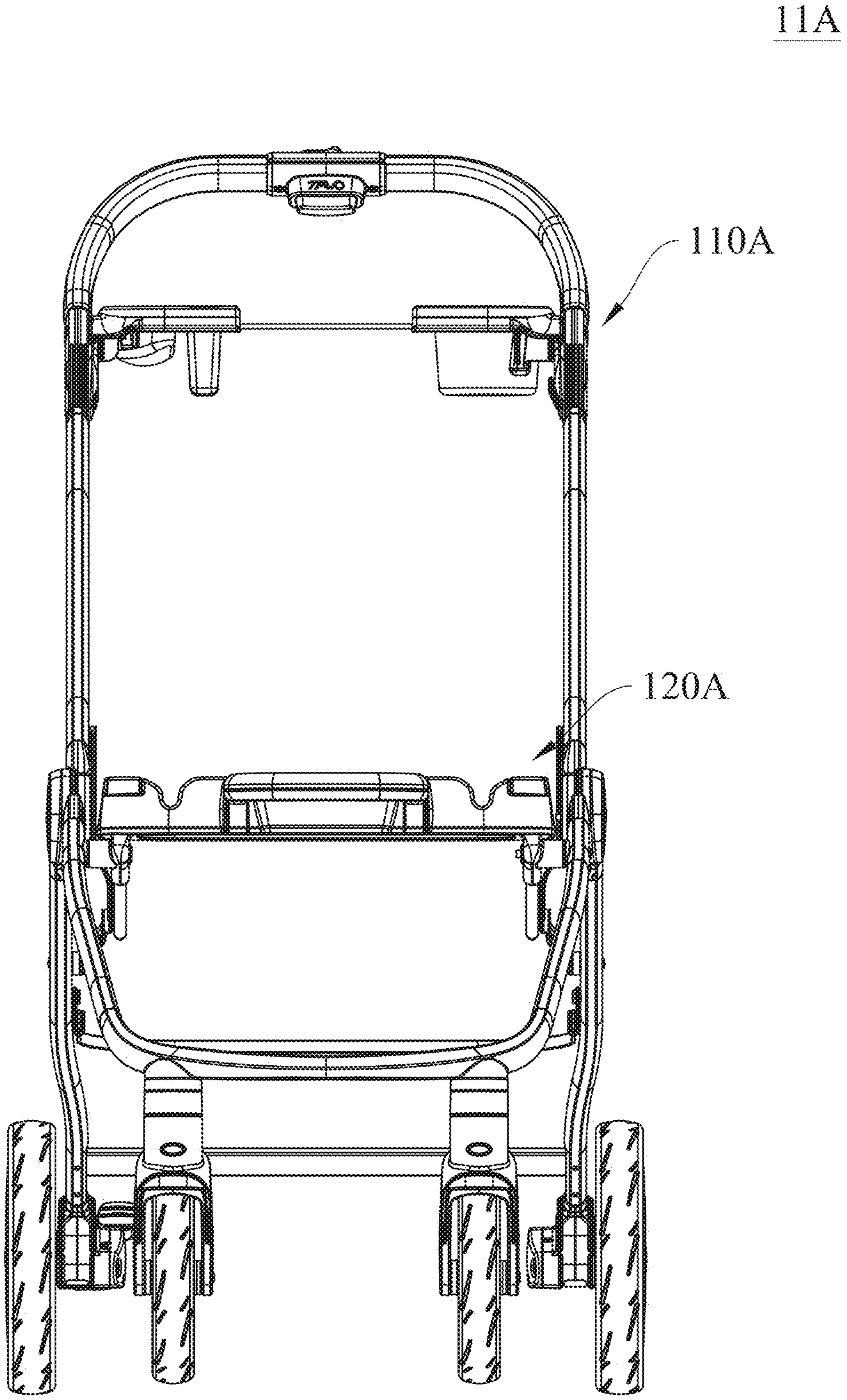
Figure 17D:
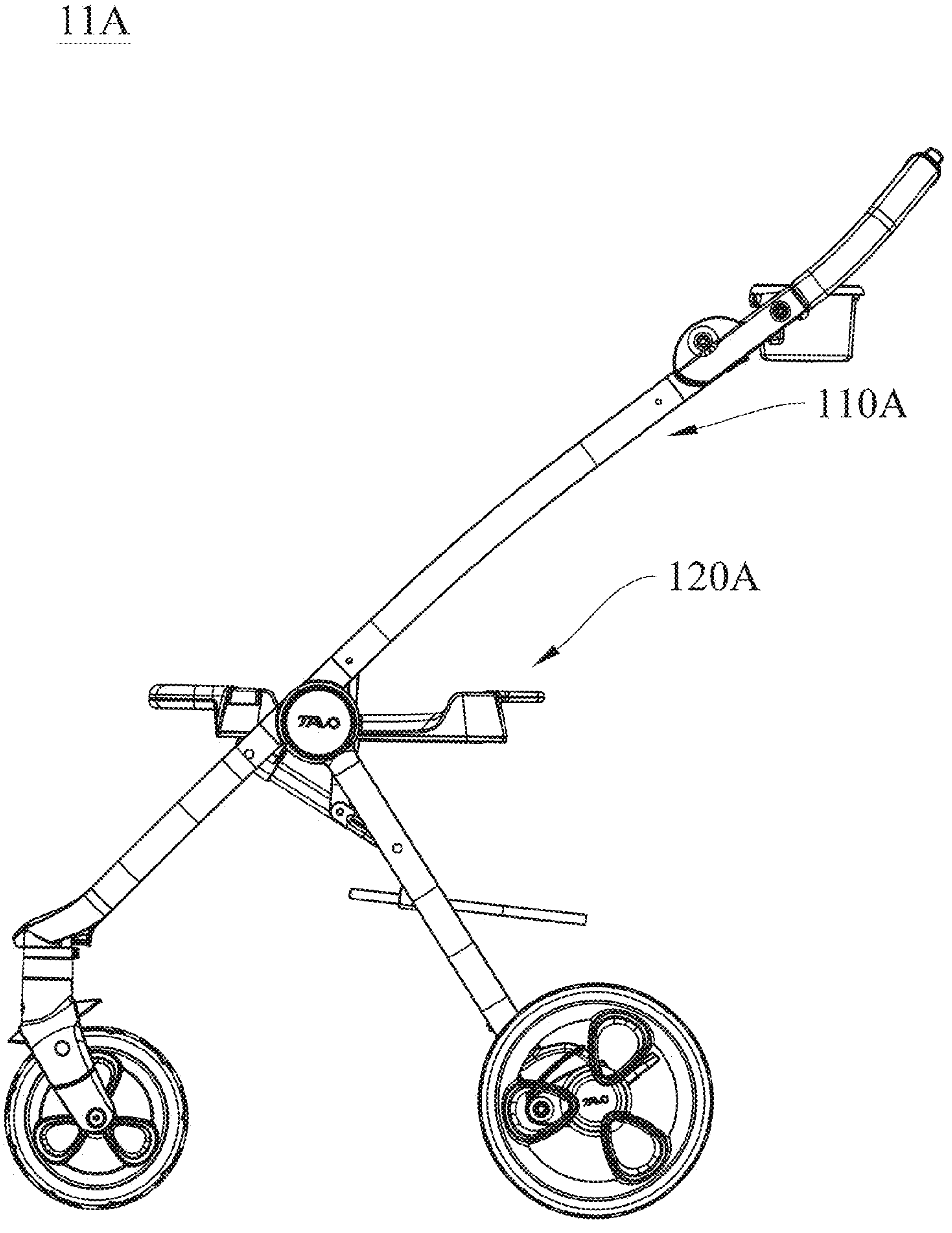

Referring to FIGS. 17A to 17D, FIGS. 17A and 17B show perspective views of the wheeled carrying apparatus 11A according to an embodiment of the present disclosure from different views, FIG. 17C shows a front view of the wheeled carrying apparatus 11A, and FIG. 17D shows a side view of the wheeled carrying apparatus 11A.

As shown in FIGS. 17A to 17D, the wheeled carrying apparatus 11A includes a carrying frame 110A, a locking base assembly 120A, and a carrier (not shown) disposed on the locking base assembly 120A. The carrying frame 110A includes a front supporting rod 1110A, a rear supporting rod 1120A, and an upper supporting rod 1130A, and the front supporting rod 1110A, the rear supporting rod 1120A, and the upper supporting rod 1130A are pivotably connected to each other, so as to be foldable with respect to each other. Specifically, the carrying frame 110A has a structure that is similar to that of the previous embodiment (as shown in FIG. 2), and thus it will not be described in detail. The locking base assembly 120A is mounted on the carrying frame 110A, and can lock or unlock an object, so that the object (such as a carrier, not shown) is firmly placed on the locking base assembly 120A, thereby improving the safety of the object in the moving process. Through the operation of the locking base assembly 120A, the user can conveniently mount or detach the object onto and from the carrying frame 110A. Hereinafter, the locking base assembly 120A will be described in detail with reference to FIGS. 18A to 18D.

Figure 18A:
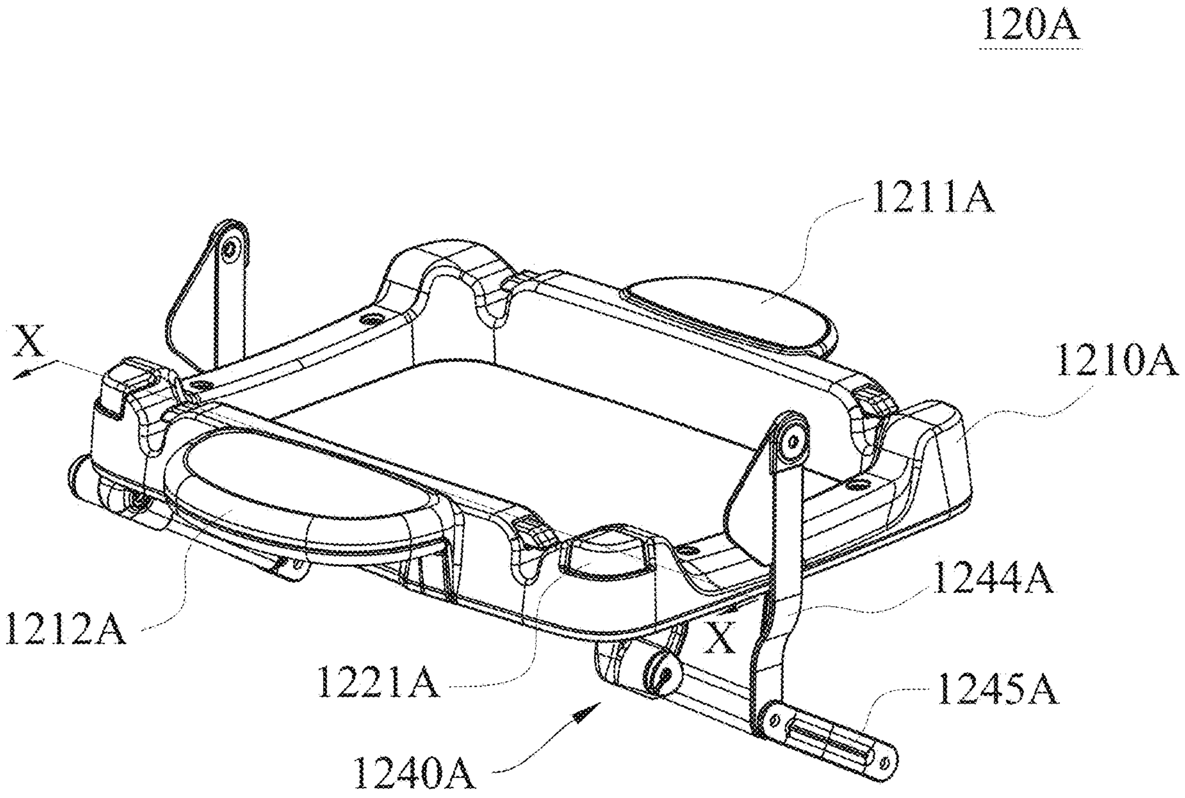
FIGS. 18A to 18D schematically show a locking base assembly of the wheeled carrying apparatus shown in FIG. 17A.
Figure 18B:
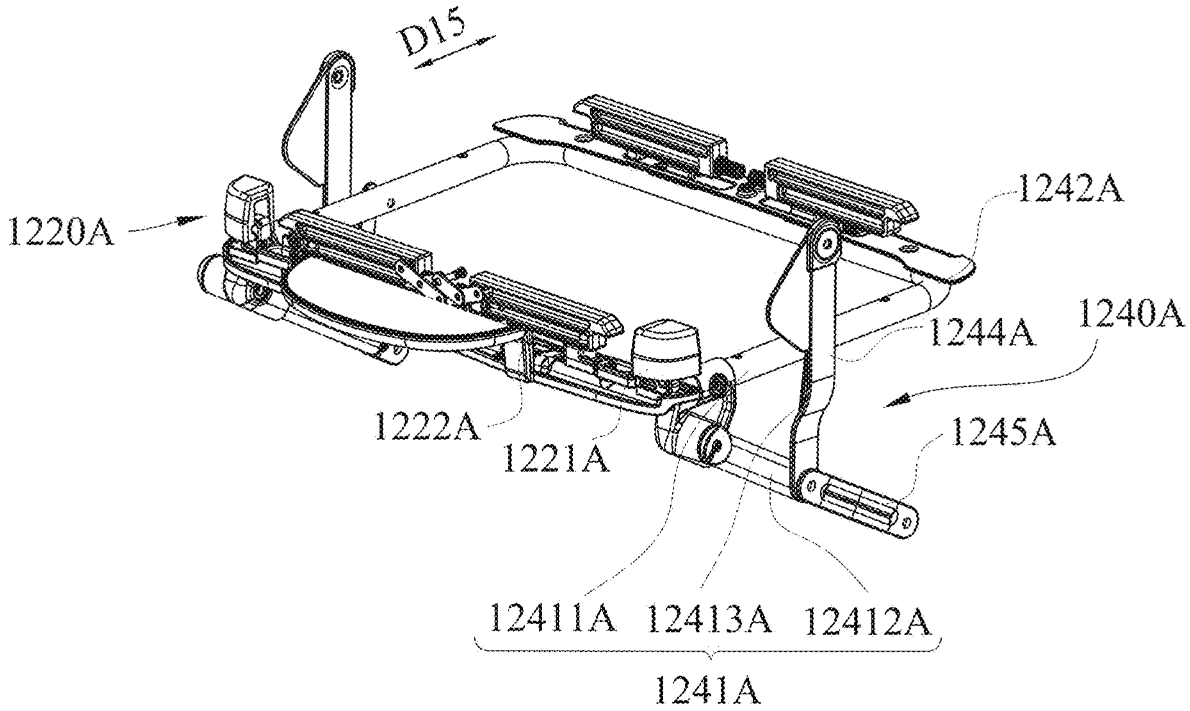
Figure 18C:
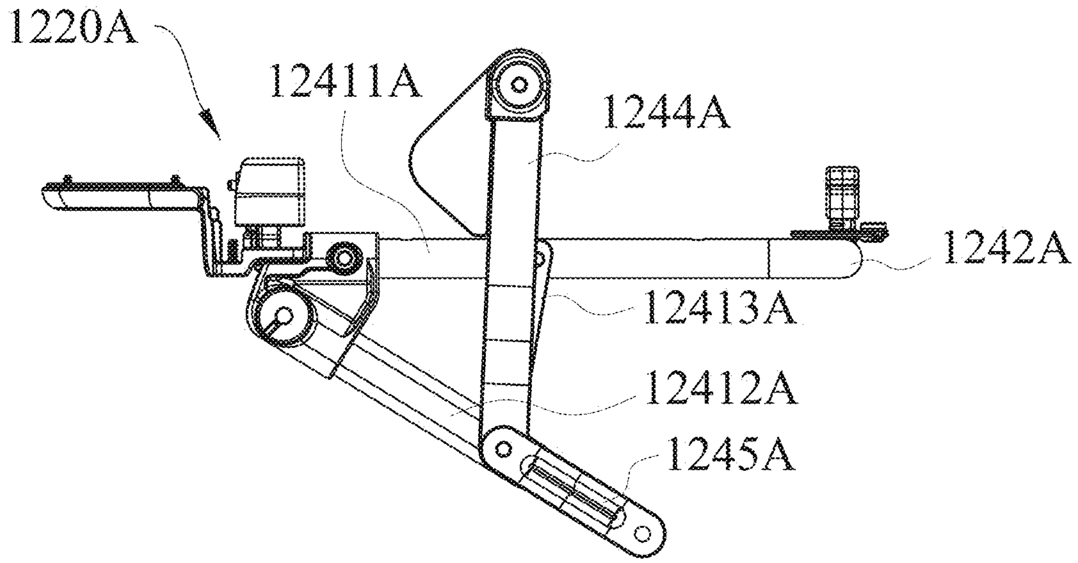
Figure 18D:
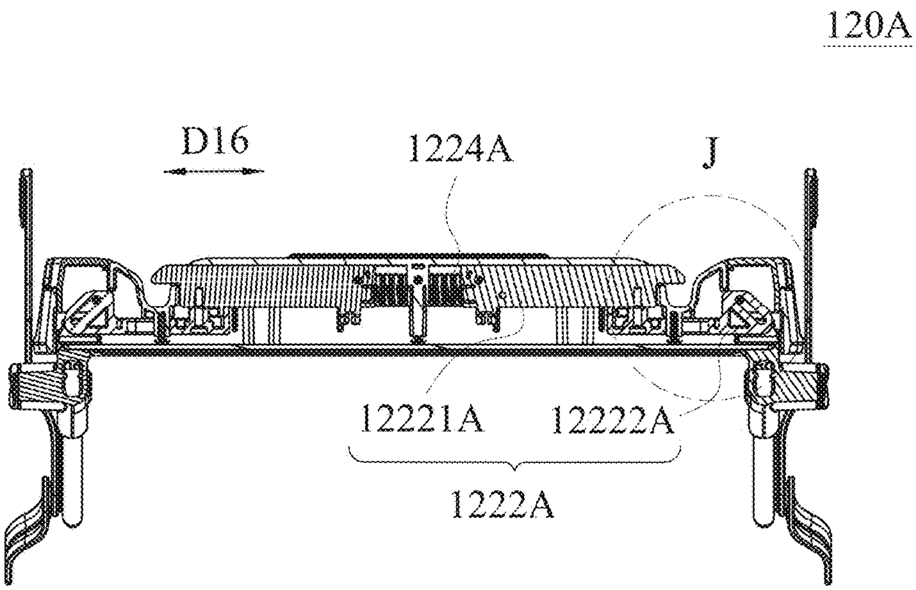
Figure 18E:
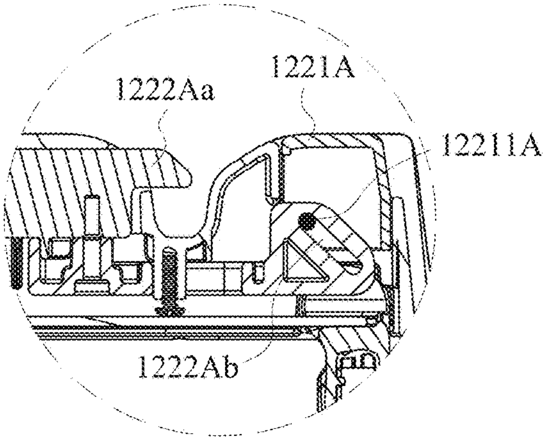
FIGS. 18E and 18F schematically show partial enlarged views of the releasing operation element shown in FIG. 18D in different positions.
Figure 18F:
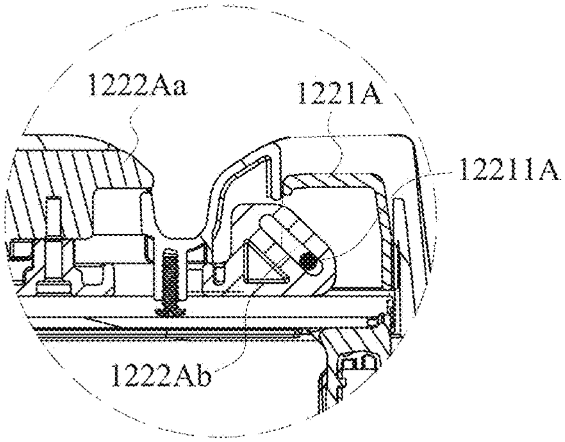

Referring to FIGS. 18A to 18F, FIG. 18A shows a perspective view of the locking base assembly 120A; FIGS. 18B and 18C show the locking base assembly 120A with the base plate 1210A removed to show the supporting structure 1240A and the locking mechanism 1220A located in the base plate 1210A; FIG. 18D shows a cross-sectional view of the locking base assembly 120A taken along the line X-X shown in FIG. 18A; FIG. 18E shows a partial enlarged view of part J shown in FIG. 18D, in which the releasing operation element 1221A is in the locking position; and FIG. 18F shows a view in which the releasing operation element 1221A shown in FIG. 18E is in the unlocking position.

As shown in FIGS. 18A and 18B, the locking base assembly 120A includes a base plate 1210A, a locking mechanism 1220A (only the releasing operation element 1221A is shown in FIG. 18A, and the locking mechanism 1220A is hidden by the base plate 1210A) and a supporting structure 1240A.

In an example, the base plate 1210A may have a hollow structure (i.e. different from the base plate 1210 of the embodiment shown in FIG. 10B). Specifically, as shown in FIG. 18A, the base plate 1210A may have an annular structure (i.e., a middle area of the base plate 1210A is in a hollowed shape). When the carrying frame 110A is folded together with the locking base assembly 120A, the user may lift or move the whole frame structure by grasping the hollow structure of the base plate 1210A. In other words, the base plate 110A in this example may conveniently move the whole folded carrying frame 110*a* without the handle 1211 as shown in FIG. 9A.

In addition, as shown in FIG. 18A, the base plate 1210A may have a first extension part 1211A, for example, the first extension part 1211A may extend outward from one end (e.g., a middle part of the rear end) of the base plate 1210A by a certain distance to provide a larger supporting surface (i.e., a first abutting surface), so as to more stably support the carrier (not shown) disposed thereabove. The base plate 1210A may also have a second extension part 1212A, which extends from the other end (e.g., the front end) of the base plate 1210A to provide an additional supporting surface (i.e., a second abutting surface), thereby facilitating to improve the stability of the carrier on the carrying frame 110A and facilitating to keep balance after the carrier is engaged to the whole carrying frame 110A. Optionally, the first abutting surface and the second abutting surface may be disposed at opposite ends of the base plate 1210A. In an example, the first extension part 1211A and/or the second extension part 1212A may also be provided as a handle to more conveniently move the carrying frame 110A in an unfolded state or a folded state.

As shown in FIGS. 18A to 18C, the supporting structure 1240A may include two supporting frames 1241A, which are respectively disposed on two sides of the base plate 1210A in the transverse, for example, symmetrically disposed on two sides of the base plate 1210A. Different from the embodiment of FIGS. 3A to 3C, the supporting frame 1241A of this embodiment is not provided with a shock absorbing structure. Specifically, each supporting frame 1241A may include a longitudinal rod 12411A, a first sub-rod 12412A and a second sub-rod 12413A. The longitudinal rod 12411A is disposed below the base plate 1210A and fixedly connected with the base plate 1210A. One end of the first sub-rod 12412A and one end of the second sub-rod 12413A are respectively connected to the longitudinal rod 12411A, and the other end of the first sub-rod 12412A and the other end of the second sub-rod 12413A are connected to each other, so that the first sub-rod 12412A and the second sub-rod 12413A form a triangular structure with the longitudinal rod 12411A, so as to stably support the base plate 1210A and the object thereabove. Optionally, the connection point between the second sub-rod 12413A and the longitudinal rod 12411A is located at a middle section of the base plate 1210A in its longitudinal direction D15.

In an example, the supporting structure 1240A further includes a first connecting rod 1242A. The first connecting rod 1242A is a cross rod or a U-shaped rod that is symmetrically disposed. Specifically, the first connecting rod 1242A may be connected between the longitudinal rods 12411A on both sides. Optionally or alternatively, as shown in FIG. 18C, the first connecting rod 1242A is integrally formed with the longitudinal rods 12411A at both sides, that is, the first connecting rod 1242A and the longitudinal rods 12411A are the same rod.

It can be seen in combination with FIG. 17B, and FIGS. 18A to 18C that the locking base assembly 120A is pivotably connected and mounted on the carrying frame 110A through its supporting structure 1240A, in which the base plate 120A and the locking mechanism 1220A of the locking base assembly 120A are fixedly mounted on the supporting structure 1240A, and the base plate 120A provides a substantially horizontal supporting surface for placing an object (in this embodiment, the carrier). The supporting structure 1240A further includes a first connecting component 1244A and a second connecting component 1245A, which are pivotably connected to the carrying frame 110, respectively, so that the locking base assembly 120A may be folded together with the folding of the carrying frame 110A.

Specifically, as shown in FIGS. 17B and 18B, one end of each of the first connecting component 1244A and the second connecting component 1245A is pivotally connected to one end of the first sub-rod 12412A (i.e., an end connected with the second sub-rod 12413A), and the other end of the first connecting component 1244A, the other end of the second connecting component 1245A and the other end of the first sub-rod 12412A are pivotably connected to the carrying frame 110A at different positions and are pivotable with respect to each other. For example, the other end of the first connecting component 1244A is pivotably connected to the upper supporting rod 1130A of the carrying frame 110A, the other end of the second connecting component 1245A is pivotably connected to the rear supporting rod 120A of the carrying frame 110A, and the other end of the first sub-rod 12412A is pivotably connected to the front supporting rod 110A of the carrying frame 110A, so that the supporting structure 1240A, together with the whole locking base assembly 120A, can pivot along with the pivoting of the frame 110A, thereby realizing the folding of the whole structure.

Referring to FIGS. 18A, 18B and 18D, the locking mechanism 1220A is mounted in the base plate 1210A for locking and unlocking the object located on the base plate 1210A. The locking mechanism 1220A includes at least one releasing operation element 1221A and at least one locking element 1222A. The releasing operation element 1221A is disposed in the base plate 1210A and is movable between a locking position and an unlocking position with respect to the base plate 1210A. The difference between the releasing operation element 1221A and the releasing operation element 1221 of the previous embodiment is that, as shown in FIGS. 10A and 10B, the releasing operation element 1221 protrudes from a side of the base plate 1210, and may be unlocked by pressing the releasing operation element 1221 from the side of the base plate 1210. In this embodiment, as shown in FIGS. 18A and 18D, the releasing operation element 1221A protrudes from above the base plate 1210A, and may be unlocked by pressing the releasing operation element 1221A downward.

As shown in FIG. 18D, the releasing operation element 1221A is slidably connected to the locking element 1222A, so that the locking element 1222A may move correspondingly with the movement of the releasing operation element 1221A. Specifically, when the releasing operation element 1221A is in the locking position as shown in FIG. 18D, at least a part of the releasing operation element 1221A protrudes from the base plate 1210A, so that the object placed on the base plate 1210A is locked; while when the releasing operation element 1221A is pressed to move from the locking position to the unlocking position, the locking element 1222A moves with the movement of the releasing operation element 1221A, thereby releasing the object located on the base plate 1210A. In an example, with the movement of the releasing operation element 1221A in the vertical direction, the locking element 1222A may move in the substantially horizontal direction to realize the unlocking. That is, a moving direction of the releasing operation element 1221A and a moving direction of the locking element 1222A may be substantially perpendicular to each other.

In addition, the at least one locking element 1222A may be a plurality of locking elements 1222A, and the connection relationship between the locking elements 1222A (e.g., linkage assembly, linkage, etc.) is similar to the previous embodiment, which will not be described in detail herein. The specific structure of the locking element 1222A and its specific linkage mode with the releasing operation element 1221A, especially the difference from the locking element 1222 in the previous embodiment, will be described in detail below.

As shown in FIGS. 18A and 18D, the locking element 1222A is provided with a locking part 1222Aa, and an opening is provided on the base plate 1210A at a position corresponding to the locking part 1222Aa, so that the locking part 1222Aa may extend from the opening of the base plate 1210A to lock an object placed on the base plate 1210A. Similar to the previous embodiment, the base plate 1210A may be correspondingly provided with a recess, an inclined surface, etc., which will not be described in detail herein.

In this embodiment, as shown in FIGS. 18D to 18F, the locking element 1222A may have a first portion 12221A and a second portion 12222A that are fixedly connected to each other. The second portion 12222A is connected below the first portion 12221A and extends from one end of the first portion 12221A to the releasing operation element 1221A. The end of the first portion 12221A is spaced apart from the releasing operation element 1221A by a certain distance. The locking part 1222Aa is provided at the end of the first portion 12221A (i.e., one end close to the releasing operation element 1221A), while one end of the second portion 12222A extending close to the releasing operation element 1221A is slidably connected with the releasing operation element 1221A. In an example, the first portion 12221A and the second portion 12222A may be separate parts and fixedly connected together by bolts or the like. Optionally or alternatively, the first portion 12221A and the second portion 12222A may be integrally formed.

Accordingly, as shown in FIGS. 18E and 18F, a driving pin 12211A may also be fixedly disposed on the releasing operation element 1221A. An inclined hole 1222Ab is disposed at one end of the second part 1222*a* of the locking element 1222*a* close to the releasing operation element 1221A, and the driving pin 12211A of the releasing operation element 1221A may slide in the inclined hole 1222Ab, that is, the driving pin 12211A may slide with respect to the inclined hole 1222Ab with the operation of the releasing operation element 1221A. In an example, as shown in FIGS. 18E and 18F, the inclined hole 1222Ab may be provided to be inclined downward from the inside to the outside.

Further referring to FIGS. 18E and 18F, FIG. 18E shows a state in which the releasing operation element 1221A is in the locking position, and FIG. 18F shows a state in which the releasing operation element 1221A is in the unlocking position. When the releasing operation element 1221A is operated, the driving pin 12211A may slide with respect to the inclined hole 1222Ab with the movement of the releasing operation element 1221A, so as to drive the locking element 1222A to move from the locking position to the unlocking position. For example, referring to FIGS. 18E and 18F, when it is necessary to be unlocked, the releasing operation element 1221A may be pressed down by the user, and the releasing operation element 1221A moves from the locking position (see FIG. 18E) to the unlocking position (see FIG. 18F), so that the driving pin 12211A fixed to the releasing operation element 1221A moves downward, that is, the driving pin 12211A of the releasing operation element 1221A moves downward to slide with respect to the inclined hole 1222Ab of the locking element 1222A, forcing the locking element 1222A to move in a direction perpendicular or substantially perpendicular to the moving direction of the driving pin 12211A (for example, the transverse direction D16 of the locking base assembly 120A), so that the locking element 1222*a* moves to its unlocking position (for example, in this embodiment, the locking elements 1122*a* on the same side move towards each other), and the locking parts 1222Aa of the locking elements 1222*a* protruding from the base plate 1210A may retract into the base plate 1210A to unlock the object provided on the base plate 1210A.

In addition, the locking mechanism 1220 of this embodiment may also be provided with an elastic device 1224A to provide a force for enabling the releasing operation element 1221A to be in or restored to the locking position. In an example, as shown in FIG. 18D, an elastic device 1224A may be disposed between two locking elements 1222A on the same side, tending to keep the two locking elements 1222A away from each other. Referring to FIGS. 18D to 18F, when the releasing operation element 1221A is released, the locking element 1222A may move to its locking position under the action of the elastic device 1224A, while the releasing operation element 1221A moves upward to its locking position under the force of the inclined hole 1222*a* with respect to the driving pin 12211A.

A second aspect of the present disclosure also provides a wheeled carrying apparatus 21.

Figure 19A:
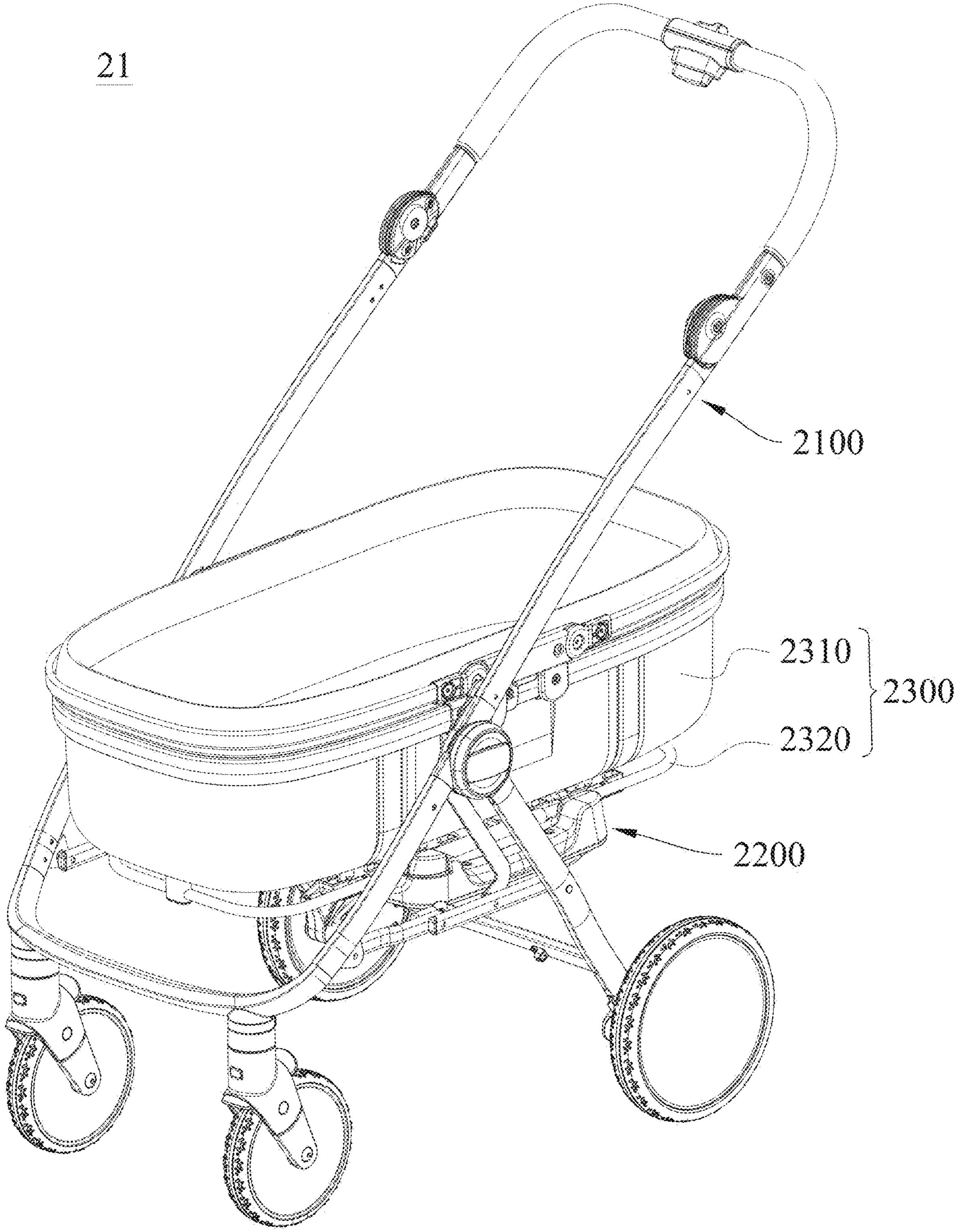
FIG. 19A shows a perspective schematic view of a wheeled carrying apparatus according to a second aspect of the present disclosure.

Referring to FIG. 19A, FIG. 19A shows a perspective schematic view of the wheeled carrying apparatus 21 according to the second aspect of the present disclosure.

As shown in FIG. 19A, the wheeled carrying apparatus 21 may include a carrying frame 2100, a locking base assembly 2200 and a carrier 2300. The locking base assembly 2200 may be mounted on the carrying frame 2100, and the carrier 2300 may be fixed on the carrying frame 2100 through the locking base assembly 2200 so as to move together with the carrying frame 2100. In an embodiment, the carrier 2300 may include a main body 2310 and a bracket device 2320, wherein the main body 2310 (which may also act as a "carrying portion") provides an accommodation space (i.e., a carrying space) for carrying (i.e., loading) pets. The bracket device 2320 is mounted on the main body 2310 to support the main body 2310, and may be engaged with the locking base assembly 2200, so that the carrier 2300 is detachably mounted on the carrying frame 2100 through the bracket device 2320.

Hereinafter, the carrying frame 2100 and the locking base assembly 2200 of the wheeled carrying apparatus 21 and the connection relationship therebetween will be described in detail.

Figure 19B:
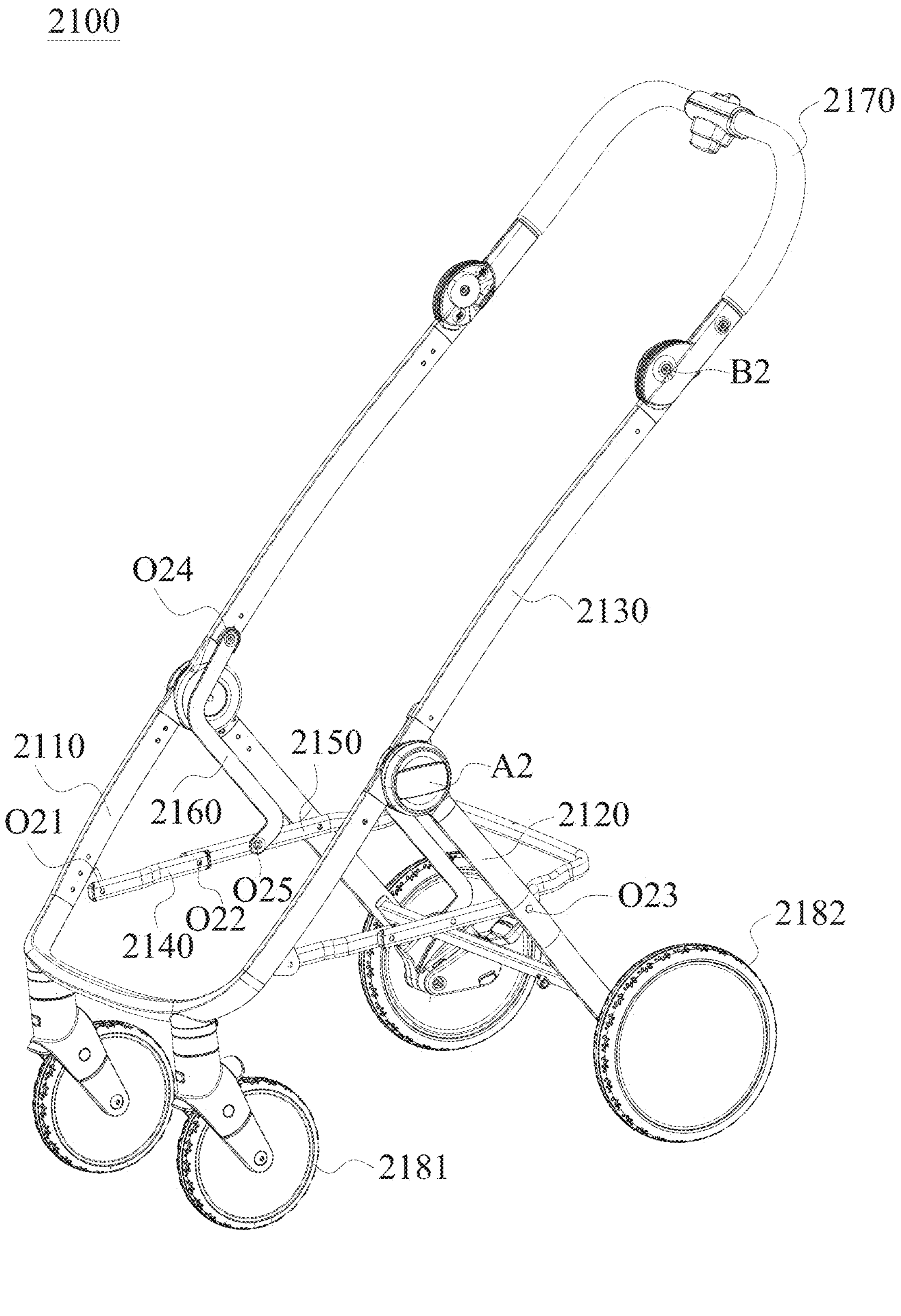
FIG. 19B shows a schematic perspective view of a carrying frame according to the present disclosure.
Figure 19C:
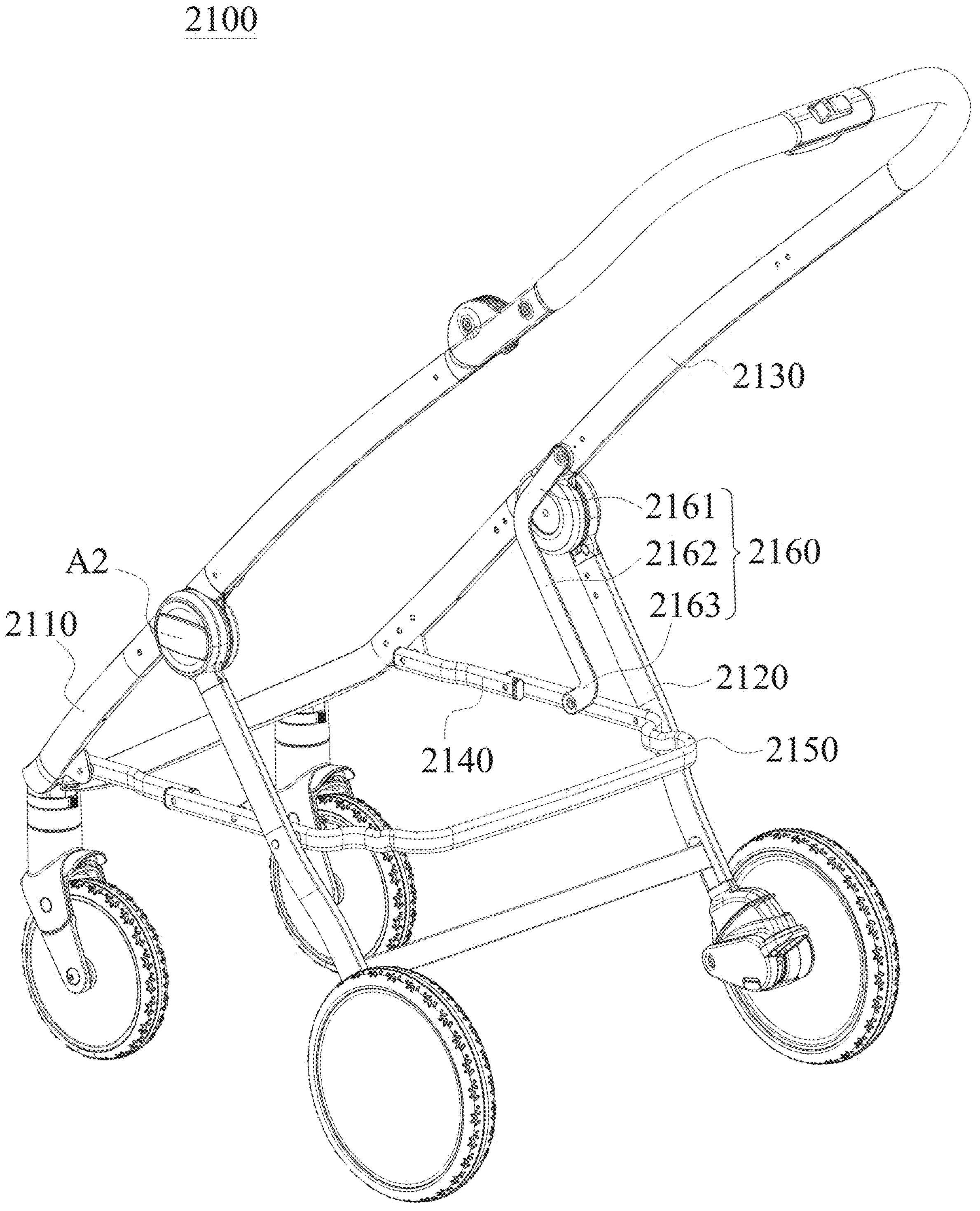
FIG. 19C shows another perspective view of the carrying frame shown in FIG. 19B.

First, referring to FIGS. 19B and 19C, FIG. 19B shows a perspective view of a carrying frame 2100 according to the second aspect of the present disclosure, and FIG. 19C shows a perspective view of the carrying frame 2100 shown in FIG. 19B from another view.

The carrying frame 2100 of the present disclosure may include a front supporting rod 2110, a rear supporting rod 2120 and an upper supporting rod 2130. The front supporting rod 2110 is connected with a front wheel 2181, the rear supporting rod 2120 is connected with a rear wheel 2182, and the upper supporting rod 2130 is connected with a handrail 2170.

In an embodiment, as shown in FIGS. 19B and 19C, one end of the front supporting rod 2110, one end of the rear supporting rod 2120 and one end of the upper supporting rod 2130 are pivotally connected to each other at a first pivoting part A2, so that the front supporting rod 2110, the rear supporting rod 2120 and the upper supporting rod 2130 may be folded with respect to each other through the first pivoting part A2. Specifically, the front supporting rod 2110 may have a U-shaped structure, and the rear supporting rod 2120 may be formed by two parallel rod elements fixedly connected through a cross rod, and both ends of the front supporting rod 2110 are pivotally connected to one ends of the two rod elements of the rear supporting rod 2120 at the first pivoting part A2. At least one front wheel 2181 is connected to a lower side of the front supporting rod 2110, and the other ends of the two rod elements of the rear supporting rod 2120 are respectively connected to the corresponding rear wheels 2182. The handrail 2170 is located at the other end (i.e., an upper end) of the upper supporting rod 2130, and is pivotably connected with the upper supporting rod 2130 through a second pivoting part B2. The present disclosure is not limited to the above structure, and the front supporting rod 2110 may also have a V-shaped or I-shaped structure, and the rear supporting rod 2120 may also be provided in an integrally formed U-shaped structure.

In an example, as shown in FIG. 19B, a size of the rear wheel 2182 may be larger than that of the front wheel 2181 to make the overall structure of the wheeled carrying apparatus 21 more stable.

In addition, it can be seen in combination with FIG. 19A and FIG. 19B that the carrying frame 2100 is also provided with a connecting assembly (which will be described in detail below) for mounting the locking base assembly 2200 on the carrying frame 2100, and the connecting assembly is pivotably connected to the carrying frame 2100, so that the locking base assembly 2200 may pivot through the connecting assembly with the folding of the carrying frame 2100. The connecting assembly may also serve as a supporting structure for the locking base assembly 2200, for example, act as "supporting structure 1240" and/or "supporting structure 1240A" as described in the first aspect of the present disclosure.

In an embodiment, as shown in FIGS. 19B and 19C, the connecting assembly may include a first coupling element 2140, an auxiliary support 2150 and a linking element 2160.

As shown in FIG. 19B, one end of the first coupling element 2140 is pivotably connected to the front supporting rod 2110 at a first pivot point O21. The auxiliary support 2150 is pivotably connected to the other end of the first coupling element 2140 at a second pivot point O22, and is pivotably connected to the rear supporting rod 2120 at a third pivot point O23. One end of the linking element 2160 is pivotably connected to the upper supporting rod 2130 at a fourth pivot point O24, and the other end of the linking element 2160 is pivotably connected to the auxiliary support 2150 at a fifth pivot point O25. Through the connections at the pivot points as described above, the auxiliary support 2150 may be driven to pivot when the carrying frame 2100 is folded. The fifth pivot point O25 is between the second pivot point O22 and the third pivot point O23, that is, the second pivot point O22 is between the first pivot point O21 and the fifth pivot point O25. Optionally, the fifth pivot point O25 may coincide with the second pivot point O22.

Further referring to FIGS. 19A to 19C, the linking element 2160 may have an approximately S-shaped structure, so as to avoid interference with the rear supporting rod 2120, the base plate 2200 or other components when the carrying frame 2100 is folded, that is, to form an avoidance structure. Specifically, the approximately S-shaped structure has a first section 2161, a second section 2162 and a third section 2163 sequentially. The second section 2162 is substantially perpendicular to the first section 2161, and the third section 2163 is substantially perpendicular to the second section 2162. When the carrying frame 2100 is unfolded, the first section 2161 substantially overlaps with the upper supporting rod 2130. The present disclosure is not limited thereto, and the linking element 2160 may also be designed into other shapes or structures that can avoid other components when being folded. In addition, the linking element 2160 may also be provided in the form of a straight bar by adjusting other components so that a plurality of rod elements or components may not interfere with each other during folding.

In a specific example, two first coupling elements 2140 may be provided. One ends of the two first coupling elements 2140 are respectively connected to the front supporting rods 2110 on both sides, and the auxiliary support 2150 may have a generally U-shaped structure, and both ends of the auxiliary support 2150 are respectively connected to the other ends of the corresponding first coupling elements 2140. In addition, the auxiliary support 2150 may also be provided with two separate linear rod elements, each of which is connected between the first coupling element 2140 and the rear supporting rod 2120 at one side of the carrying frame 2100, but the present disclosure is not limited thereto.

In an embodiment, as shown in FIG. 19B, when the carrying frame 2100 is unfolded, the first coupling element 2140 and the auxiliary support 2150 are horizontally disposed, and the first pivot point O21, the second pivot point O22, the third pivot point O23 and the fifth pivot point O25 are on the same horizontal plane, and optionally, these pivot points are substantially in a straight line.

Figure 20:
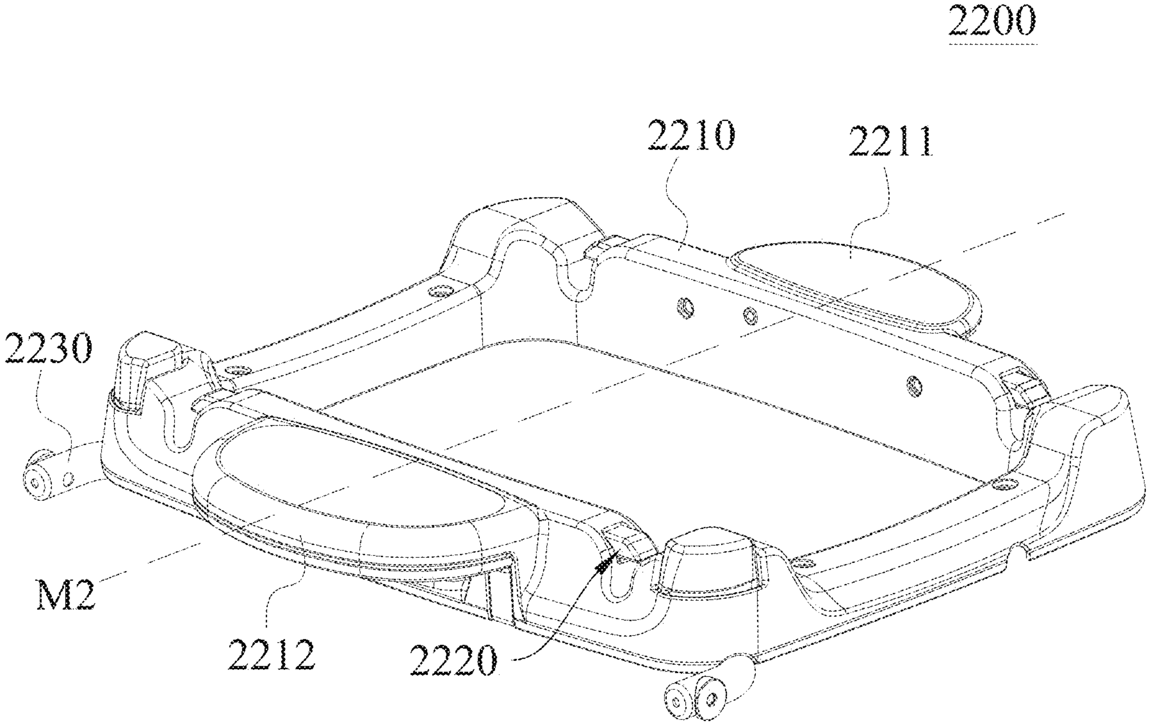
FIG. 20 shows a schematic perspective view of a locking base assembly according to the present disclosure.
Figure 21:
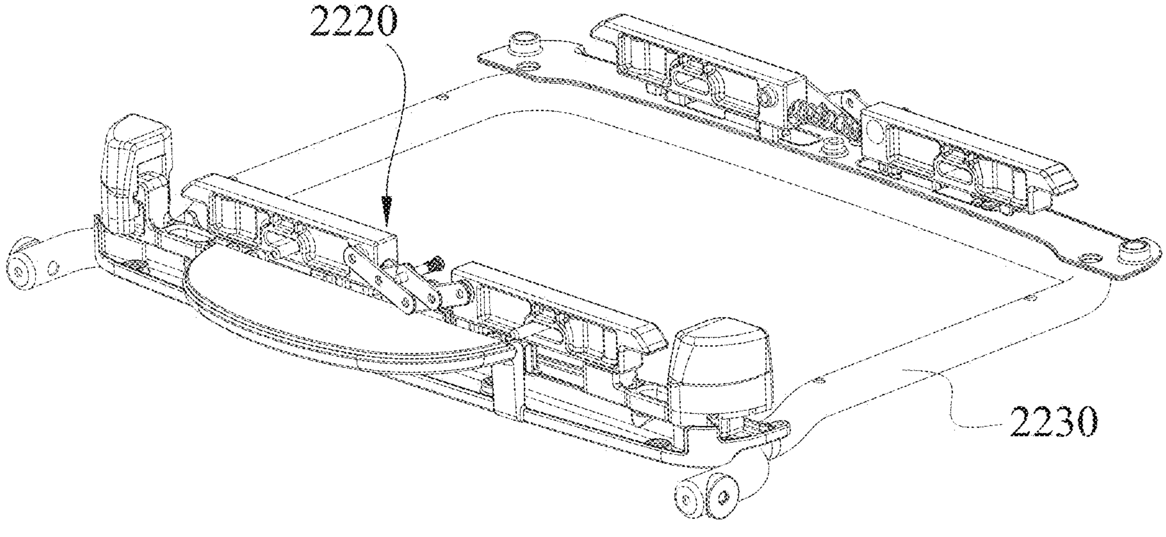
FIG. 21 shows a schematic perspective view of the locking base assembly shown in FIG. 20 after the base plate is removed.

In addition, referring to FIGS. 20 and 21, FIG. 20 shows a schematic perspective view of the locking base assembly 2200 according to the present disclosure, and FIG. 21 shows a schematic perspective view of the locking base assembly 2200 shown in FIG. 20 after the base plate 2210 is removed.

As shown in FIGS. 20 and 21, the locking base assembly 2200 includes a base plate 2210 and a locking mechanism 2220 for locking a carrier 2300 (not shown in FIGS. 20 and 21, see FIG. 19A) on the base plate 2210. The locking base assembly 2200 may have a plurality of engagement points for supporting and positioning the carrier 2300, thereby improving the connection stability between the carrier 2300 and the locking base assembly 2200. For example, as shown in FIG. 20, the plurality of engaging points may be symmetrically disposed on the locking base assembly 2200 about a longitudinal centerline M2 of the locking base assembly 2200, so that the carrier can be more stably locked on the base plate 2210 of the locking base assembly 2200. Optionally, four engagement points may be provided, and are centrally symmetrically disposed on the locking base assembly 2200.

In addition, as shown in FIG. 20, the base plate 2210 may have a first extension part 2211. The first extension part 2211 extends from one end of the base plate 2210 (for example, the rear end, that is, an end close to the rear wheel 2182 as shown in FIGS. 19A and 19B). More specifically, the first extension part 2211 may extend backward from the middle of the rear end of the base plate 2210 by a certain distance to provide a larger supporting surface, thereby more stably supporting the carrier 2300 (not shown in FIG. 20) disposed thereabove. It should be noted that the "rear end" described herein is a rear side with respect to the carrying frame 2100 (for example, the rear wheel 2182 is located at the rear side of the carrying frame 2100), that is, a left side as shown in FIG. 19B is the front side of the carrying frame 2100 and a right side as shown in FIG. 19B is the rear side of the carrying frame 2100, and correspondingly, a left side as shown in FIG. 20 is the front end of the base plate 2210 and a right side as shown in FIG. 20 is the rear end of the base plate 2210. In addition, the first extension part 2211 may also be disposed in the form of a handle, which is convenient for lifting and moving after folding. In an embodiment, the base plate 2210 may also be disposed in a hollow form, such as the annular structure shown in FIG. 20 (i.e., a middle area of the base plate 2210 is in a hollowed shape), so that when the carrying frame 2100 is folded together with the locking base assembly 2200, the whole frame structure can be grasped, lifted or moved through the hollowed design of the base plate 2210 (for example, see FIG. 31).

Alternatively or additionally, the base plate 2210 may also have a second extension part 2212, which extends from the front end of the base plate 2210 (i.e., an end close to the front wheel 2181) to provide an additional supporting surface, thereby facilitating to improve the stability of the carrier on the carrying frame 2100 and to maintain the balance after the carrier is engaged to the whole carrying frame 2100.

In an embodiment, as shown in FIGS. 20 and 21, the locking base assembly 2200 may be disposed on the base plate support 2230 and connected to the carrying frame 2100 through the base plate support 2230 (see FIG. 19A). In an embodiment, as shown in FIG. 21, the base plate support 2230 may have a U-shaped structure, in which the locking structure 2220 of the locking base assembly 2200 is disposed between two ends of the U-shaped structure and/or on a transverse section (i.e., between two longitudinal sections) of the U-shaped structure, but the present disclosure is not limited thereto. The connection between the base plate support 2230 and the carrying frame 2100 will be described in detail with reference to FIGS. 22 and 23.

Figure 22:
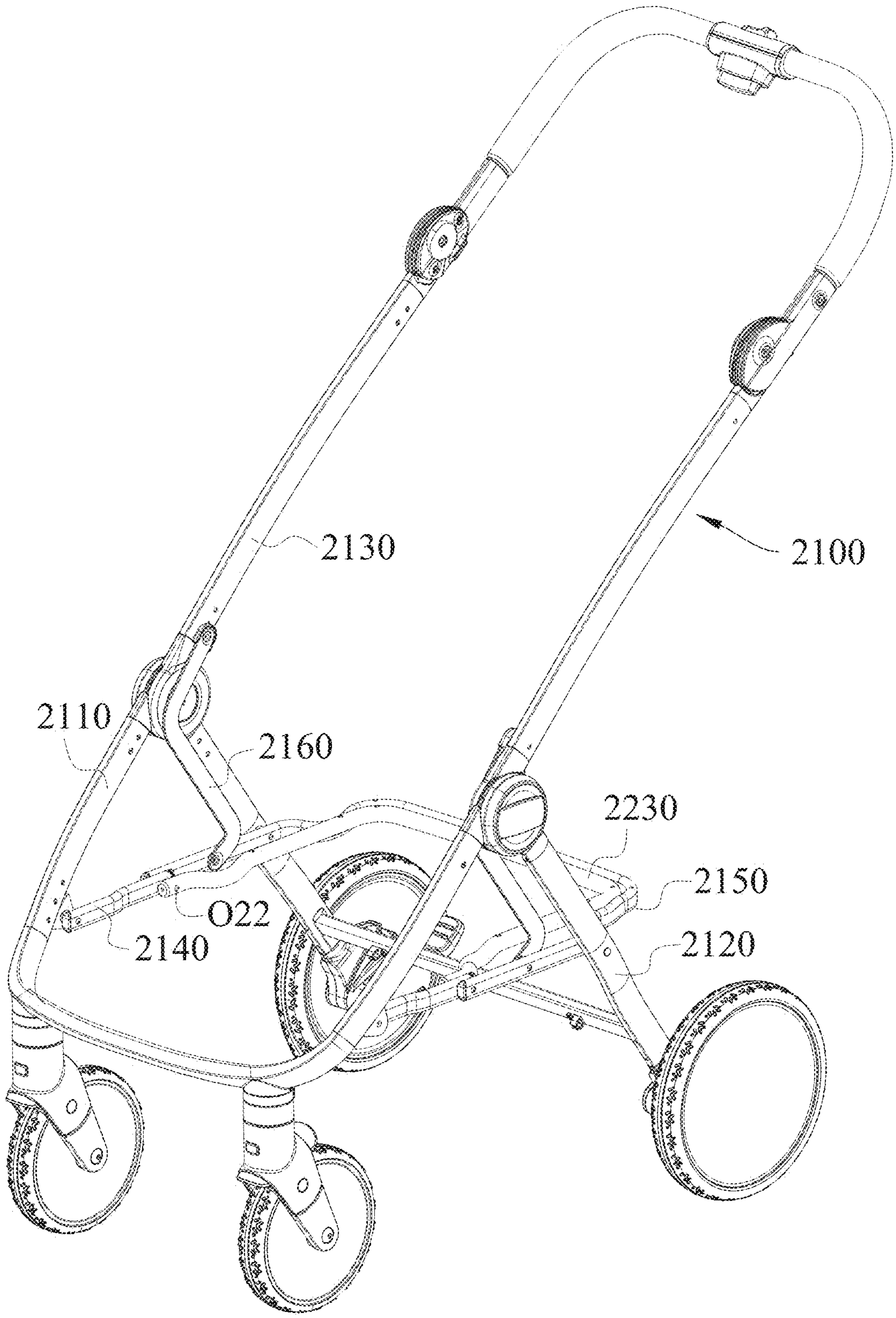
FIG. 22 is a schematic perspective view of the carrying frame shown in FIG. 19B and a base plate support mounted on the carrying frame.
Figure 23:
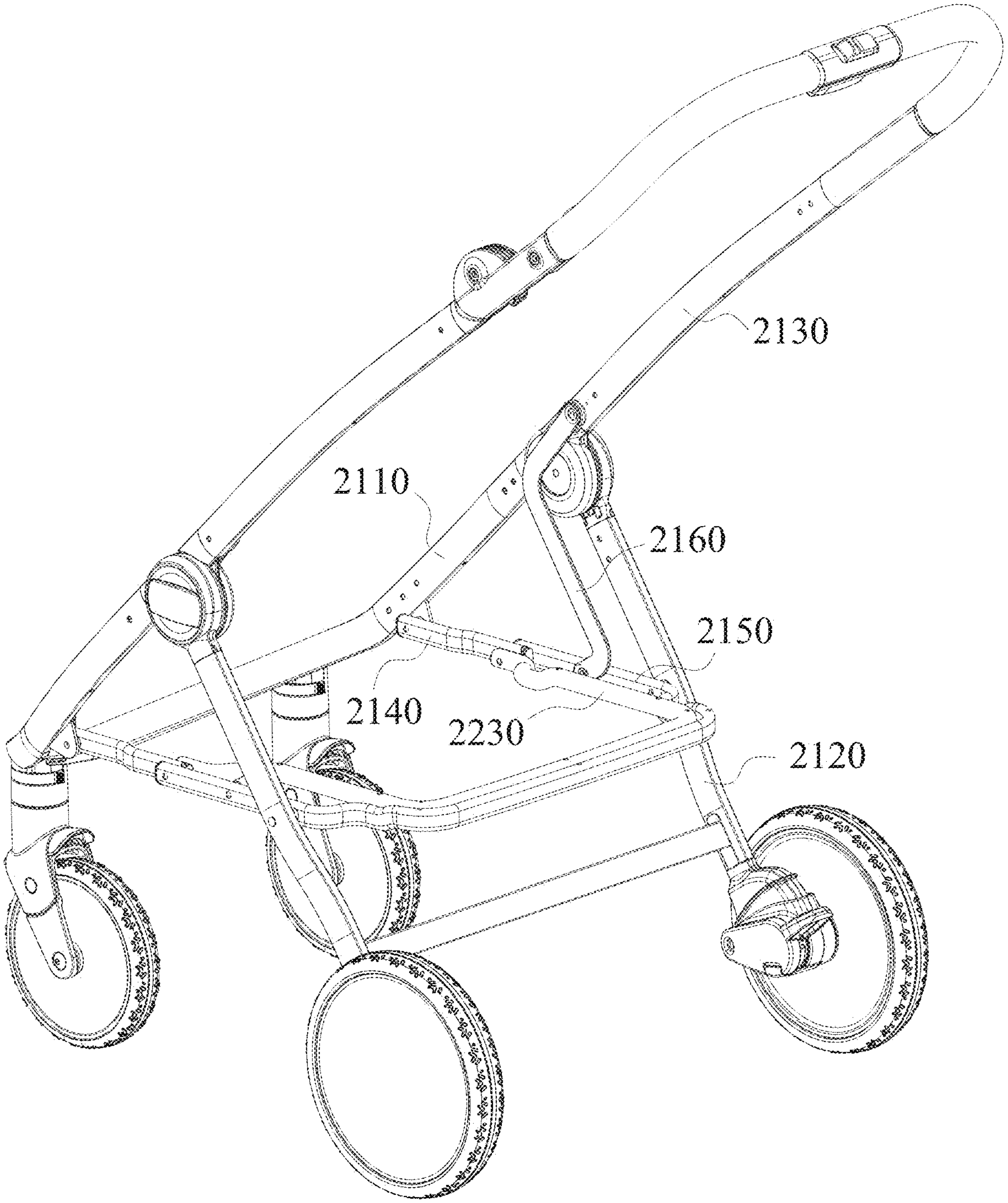
FIG. 23 is a perspective view of the carrying frame and base plate support shown in FIG. 22 from another view.

Referring to FIGS. 22 and 23, FIG. 22 shows a perspective view of the carrying frame 2100 shown in FIG. 19B and the base plate support 2230 mounted on the carrying frame 2100, and FIG. 23 shows another perspective view of the carrying frame 2100 and the base plate support 2230 shown in FIG. 22 from another view.

In an embodiment of the present disclosure, as shown in FIGS. 22 and 23, the auxiliary support 2150 is disposed outside the base plate support 2230 and connected with the base plate support 2230, so that the base plate support 2230 may move synchronously with the auxiliary support 2150, thereby driving the locking base assembly 2200 (not shown in FIGS. 22 and 23, but see FIG. 24) mounted on the base plate support 2230 to synchronously move, so as to realize the synchronous folding of the locking base assembly 2200 and the carrying frame 2100. The other end of the first coupling element 2140 is interposed between the base plate support 2230 and the auxiliary support 2150. For example, the auxiliary support 2150 and the base plate support 2230 are connected with each other at the second pivot point O22 by a rod element penetrating through the first coupling element 2140 and are disposed at both sides of the first coupling element 2140, so that the auxiliary support 2150 and the base plate support 2230 can synchronously pivot with respect to the first coupling element. In addition, the other end of the linking element 2160 (i.e., an end connected with the auxiliary support 2150) is interposed between the base plate support 2230 and the auxiliary support 2150. Optionally, the auxiliary support 2150 may be fixedly connected with the base plate support 2230, or both the auxiliary support 2150 and the base plate support 2230 may be integrally formed. In another embodiment, both the auxiliary support 2150 and the base plate support 2230 may be connected with the locking base assembly 2200.

It should be noted that in the above embodiment, the auxiliary support 2150 and the base plate support 2230 which are fixedly connected can be regarded as the second coupling element of the connecting assembly in a combined form. However, it should be understood that the second coupling element may only include a base plate support (not shown). For example, in the embodiment where the second coupling element only includes the base plate support, the base plate support may have a U-shaped structure, and be pivotally connected with the first coupling element 2140, the linking element 2160 and the rear supporting rod 2120, so as to pivot with the folding of the carrying frame 2100, so that the locking base assembly 2200 fixed on the base plate support can accordingly pivot.

Figure 24:
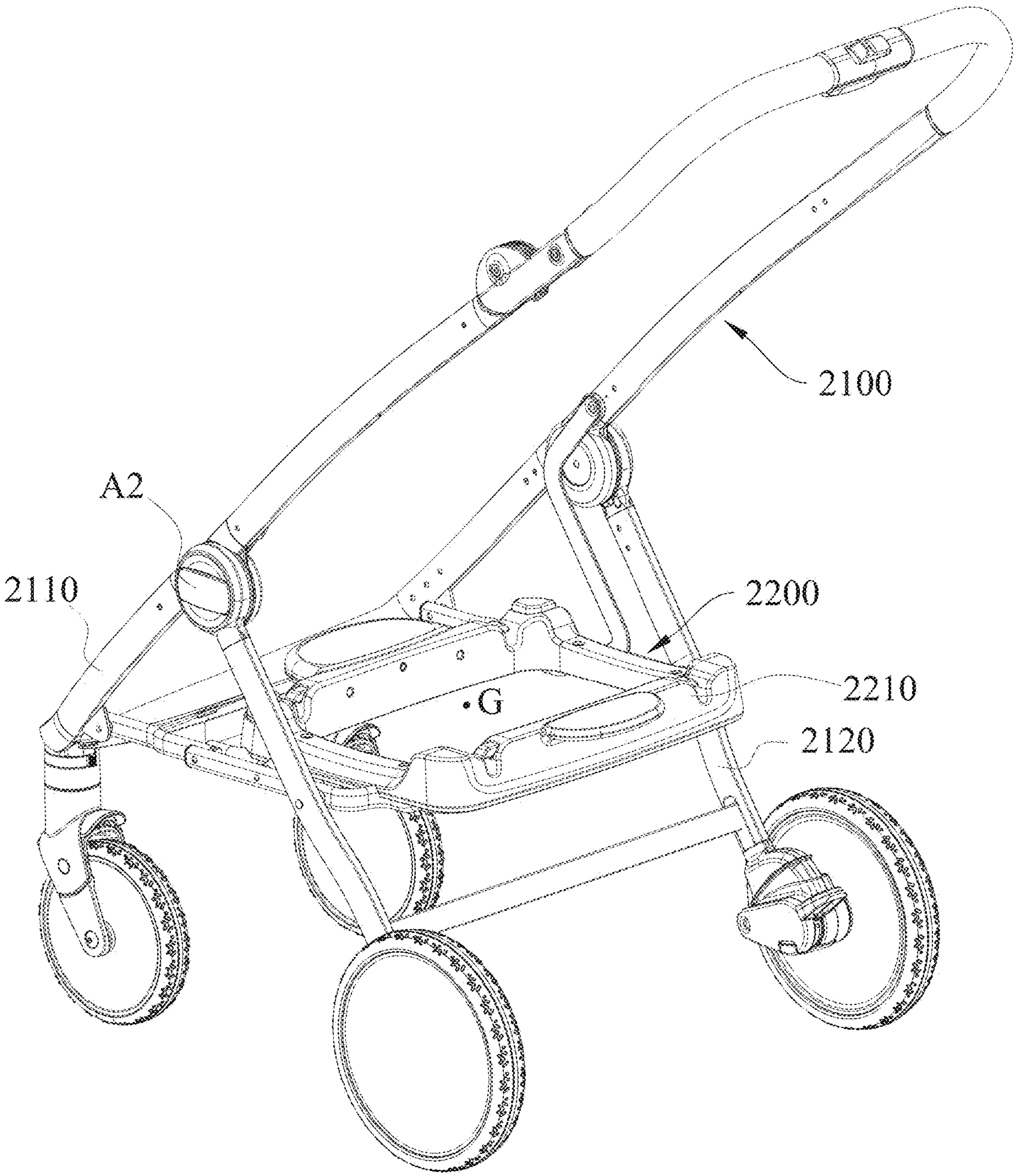
FIG. 24 is a perspective schematic view of the carrying frame and the locking base assembly mounted on the carrying frame of the present disclosure.
Figure 25:
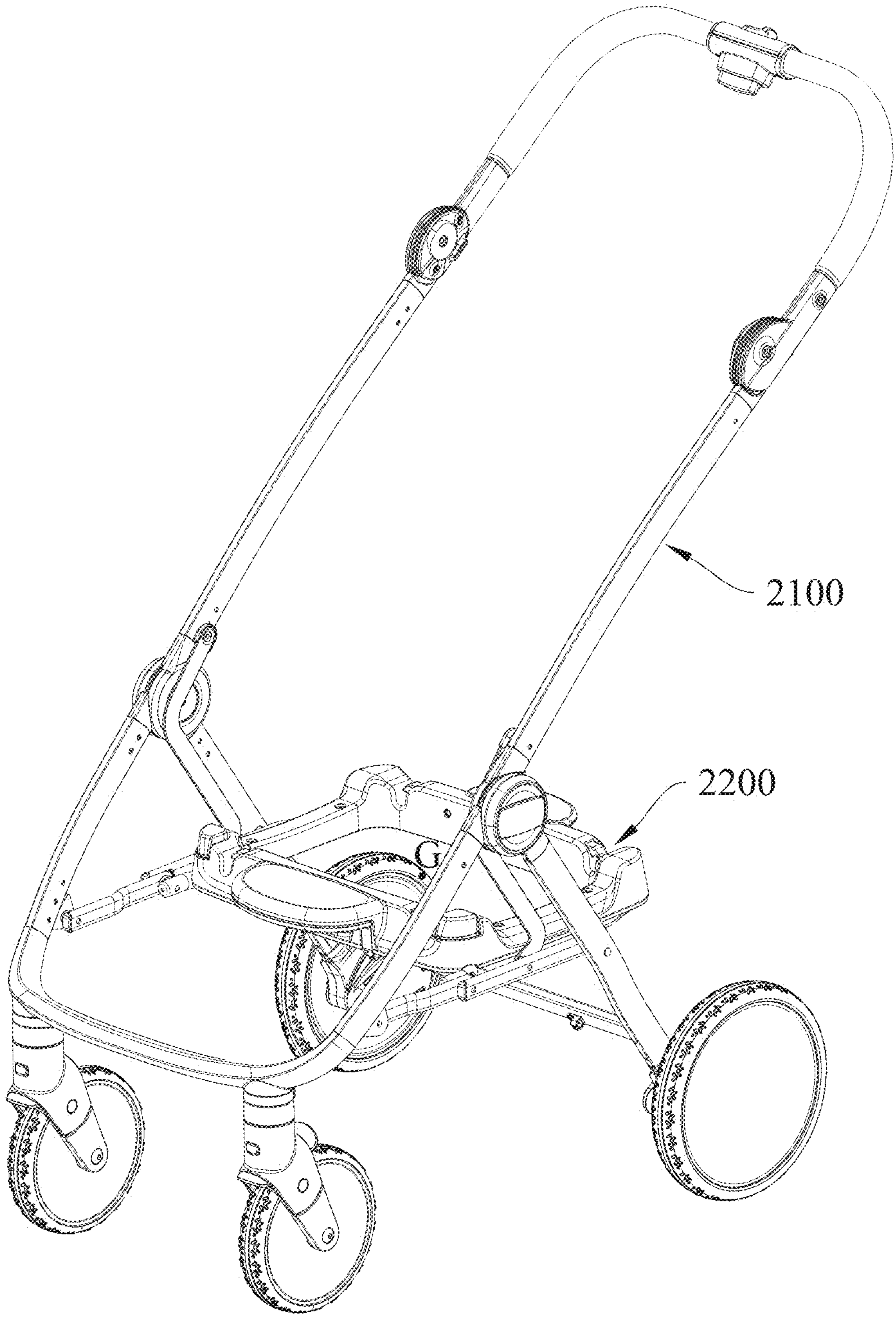
FIG. 25 shows another perspective view of the carrying frame and the locking base assembly shown in FIG. 24.
Figure 26:
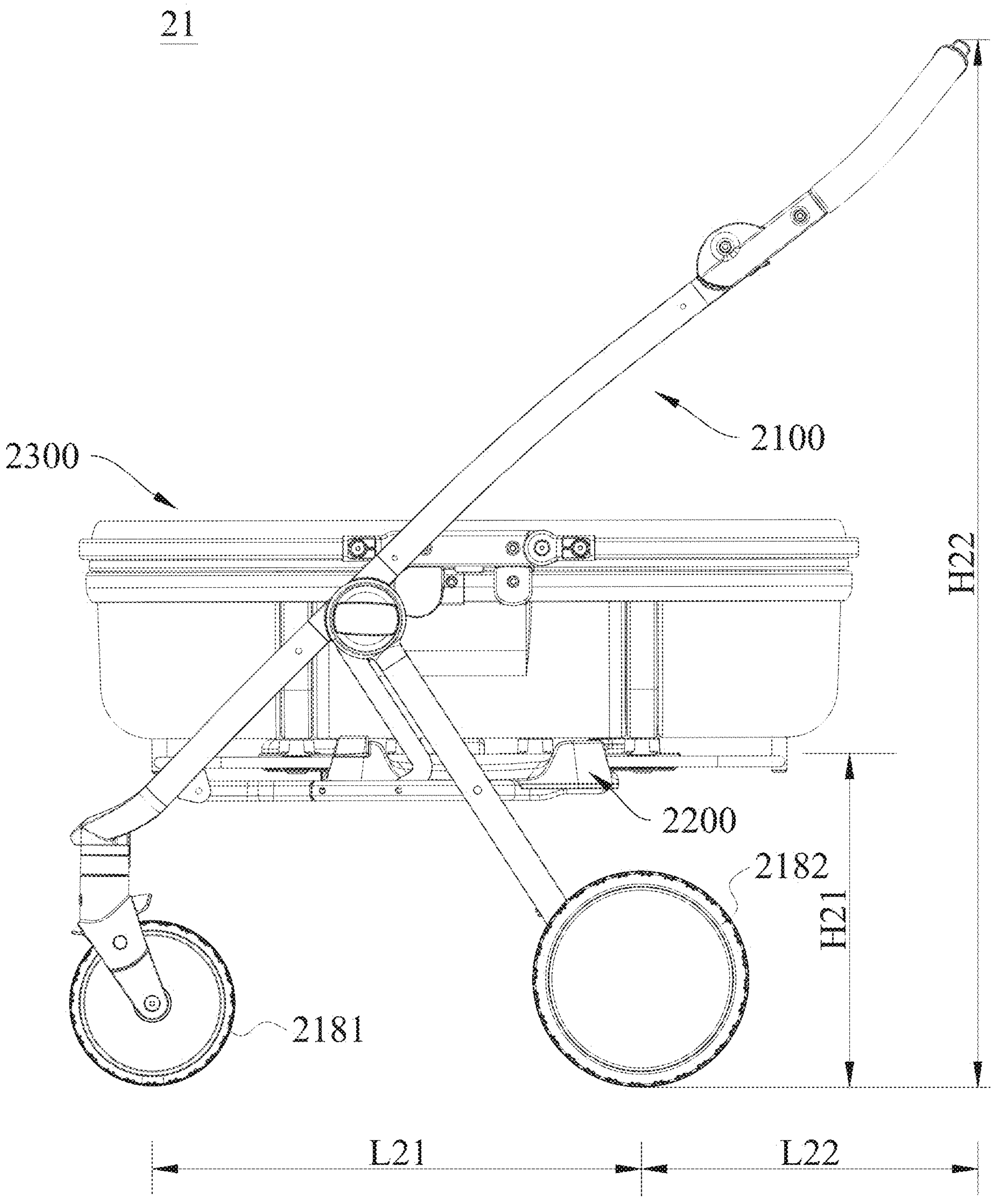
FIG. 26 shows a side view of the wheeled carrying apparatus shown in FIG. 19A.
Figure 27:
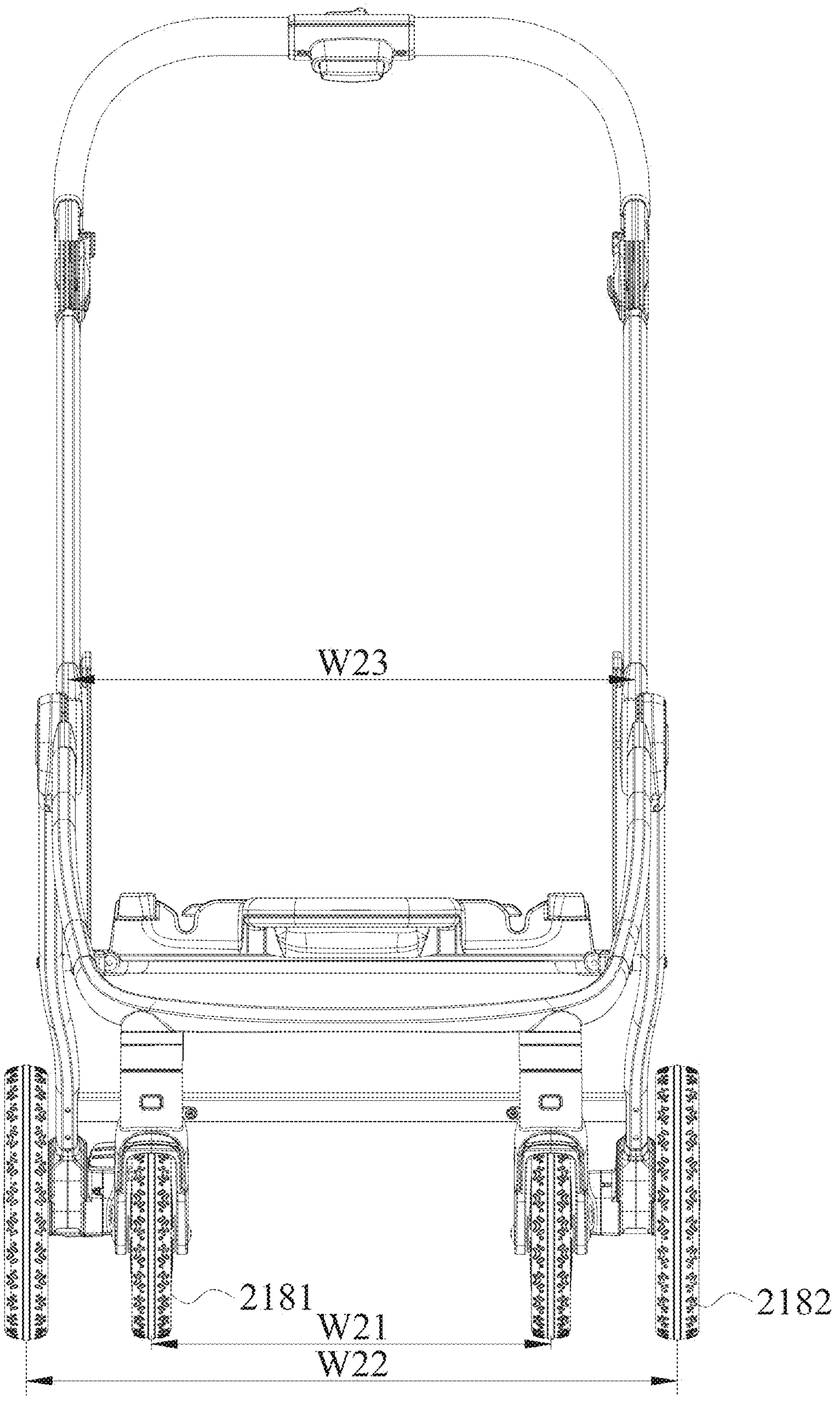
FIG. 27 shows a front view of the wheeled carrying apparatus shown in FIG. 26 after a carrier is removed.

Further referring to FIGS. 24 to 27, FIG. 24 shows a perspective schematic view of the carrying frame 2100 and the locking base assembly 2200 mounted on the carrying frame 2100, FIG. 25 shows another perspective schematic view of the carrying frame 2100 and the locking base assembly 2200 shown in FIG. 24 from another view, FIG. 26 shows a side view of the wheeled carrying apparatus 21 shown in FIG. 19A, and FIG. 27 shows a front view of the wheeled carrying apparatus 21 shown in FIG. 26 after the carrier 2300 is removed.

As shown in FIGS. 24 and 25, when the carrying frame 2100 is unfolded, the locking base assembly 2200 of the present disclosure may be positioned at a lower position of the carrying frame 2100. For example, the locking base assembly 2200 may be at a lower position than that of the locking base assembly 120 and the locking base assembly 120A according to the first aspect of the present disclosure.

Specifically, in an embodiment, the locking base assembly 2200 is positioned at a height lower than the first pivoting part A2, and for example, may be disposed close to or at approximately the same height as the lower end of the front supporting rod 2110. More specifically, further in combination with FIG. 26, a height H1 of the position where the locking base assembly 2200 is located may be less than a median of a height H2 of the whole carrying frame 2100, and in an example, the height H1 may be approximate to or even less than one third of the height H2 of the whole carrying frame 2100. Through such an arrangement, i.e., the locking base assembly 2200 is disposed at the lower position of the carrying frame 2100, the user can place and position the carrier 2300 (see FIG. 19A) on the locking base assembly 2200 more conveniently and laborsaving, thereby improving the usage convenience and the user experience. Furthermore, the carrying frame 2100 may be applied to other carriers 2300 with different sizes (for example, having different heights), thereby improving the use adaptability. It should be noted that the locking base assembly 2200 may also be disposed on the carrying frame 2100 with the supporting structure 1240A described in the first aspect of the present disclosure, and positioned at a height lower than the first pivoting part A2, and the present disclosure is not limited thereto.

In addition, as shown in FIGS. 24 and 25, a center of gravity G of the locking base assembly 2200 disposed at the lower position may be offset to the rear wheel 2182 with respect to the first pivoting part A2, which facilitates to improve the stability of the carrying frame 2100. In detail, after the carrier 2300 (see FIG. 26) is mounted on the carrying frame 2100, since the center of gravity G of the locking base assembly 2200 has offset backward, it is less likely to cause a platform of the carrying apparatus to be overturned due to a pet in the carrier 2300 approaching the front end of the carrier 2300 (at this time, a weight of the pet is concentrated on the front end of the carrier 2300), which facilitates to improve the stability of the overall structure of the wheeled carrying apparatus 21. For example, in an embodiment, the center of gravity of the locking base assembly 2200 may be close to or located in a plane formed by the rear supporting rods 2120 as a pair.

As shown in FIGS. 26 and 27, when the carrying frame 2100 is unfolded, a horizontal distance L22 between the rear wheel 2182 and an extreme end of the carrying frame 2100 (for example, at the handrail 2170) is smaller than a horizontal distance L21 between the front wheel 2181 and the rear wheel 2182. In addition, a width W23 between the supporting rods on both sides may be between a distance W21 between the two front wheels 2181 and a distance W22 between the two rear wheels 2182.

Figure 28:
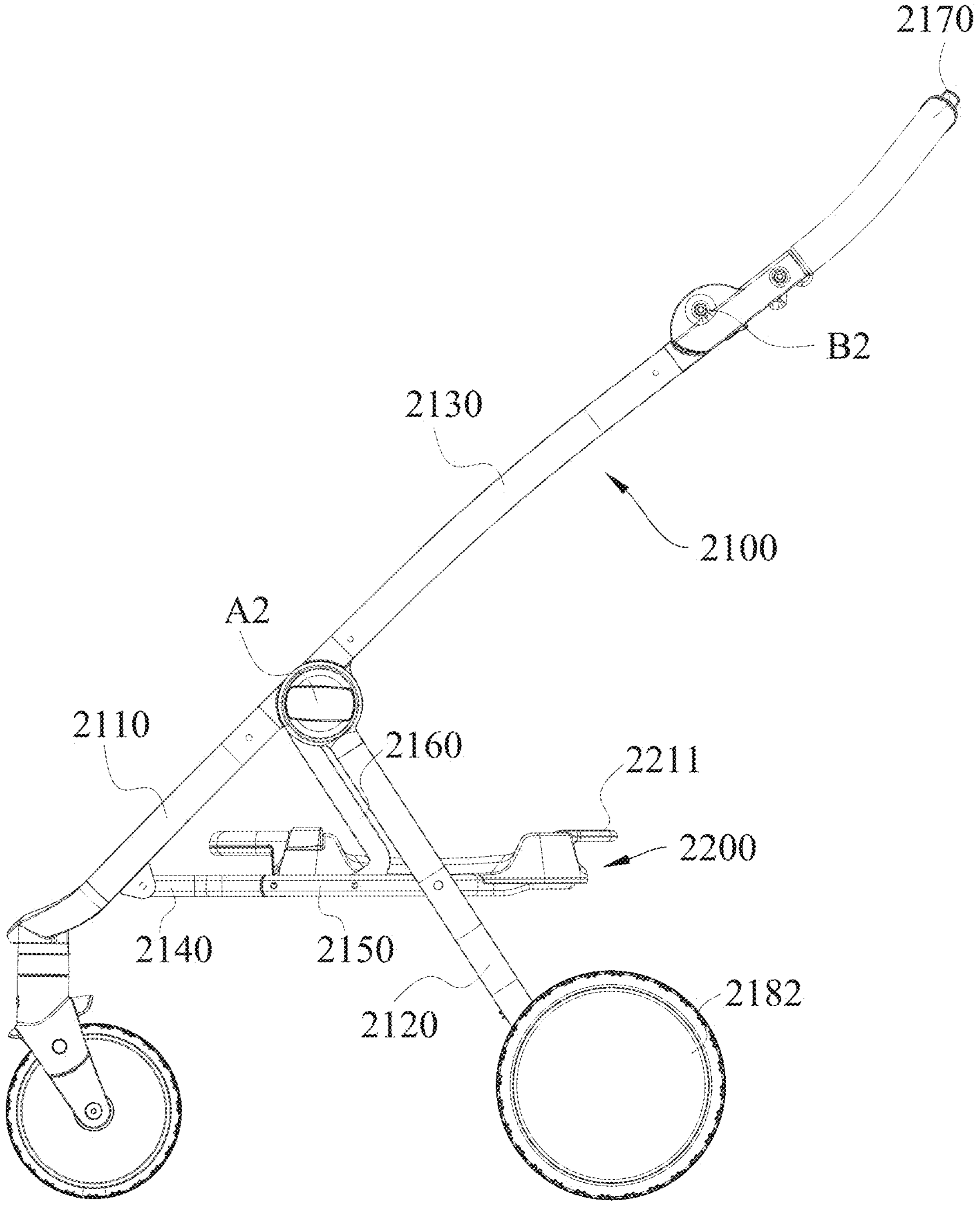
FIG. 28 shows a side view of the carrying frame and the locking base assembly shown in FIG. 24.
Figure 29:
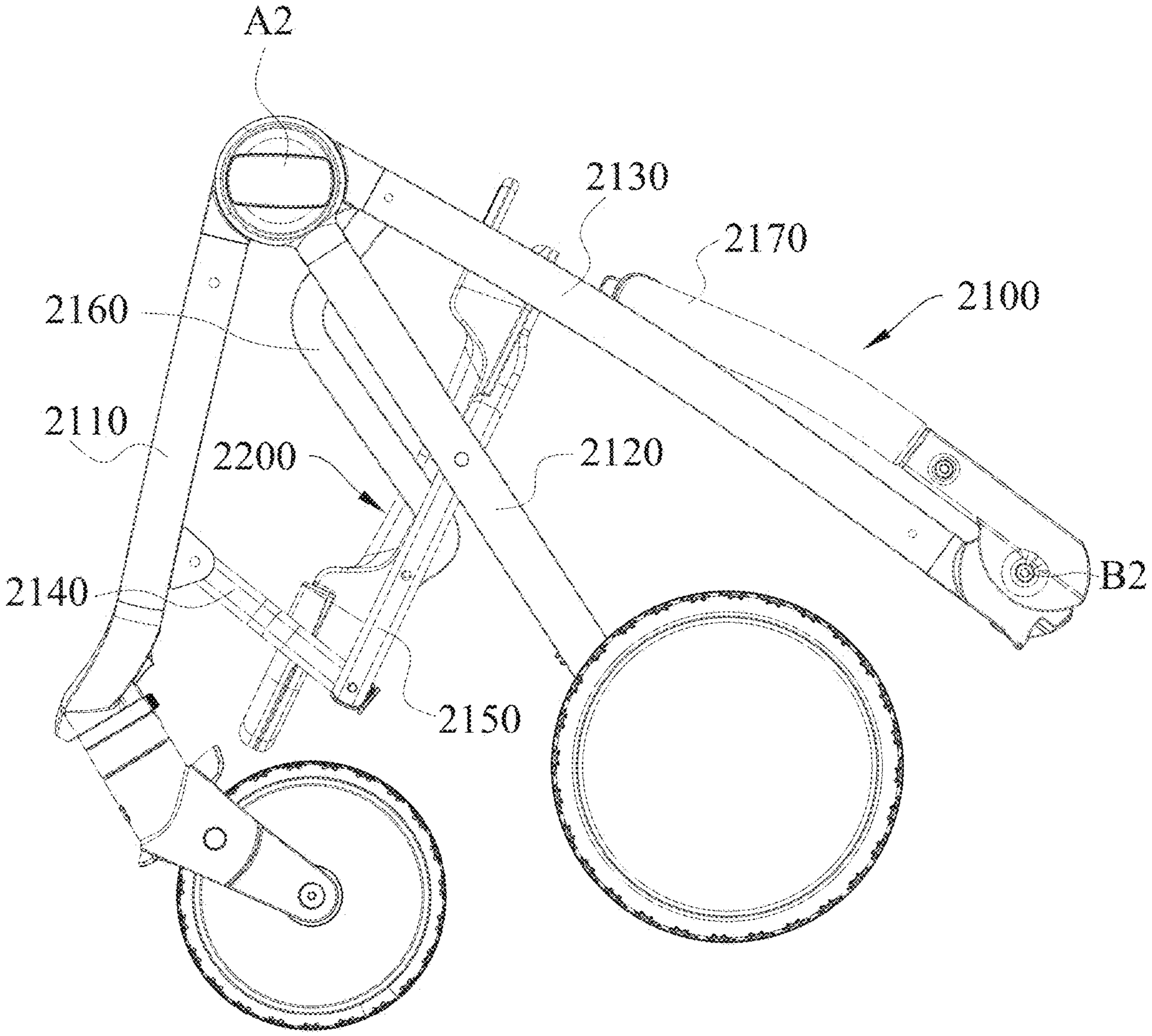
FIG. 29 shows a side view of the carrying frame and the locking base assembly shown in FIG. 28 being in a folding process.
Figure 30:
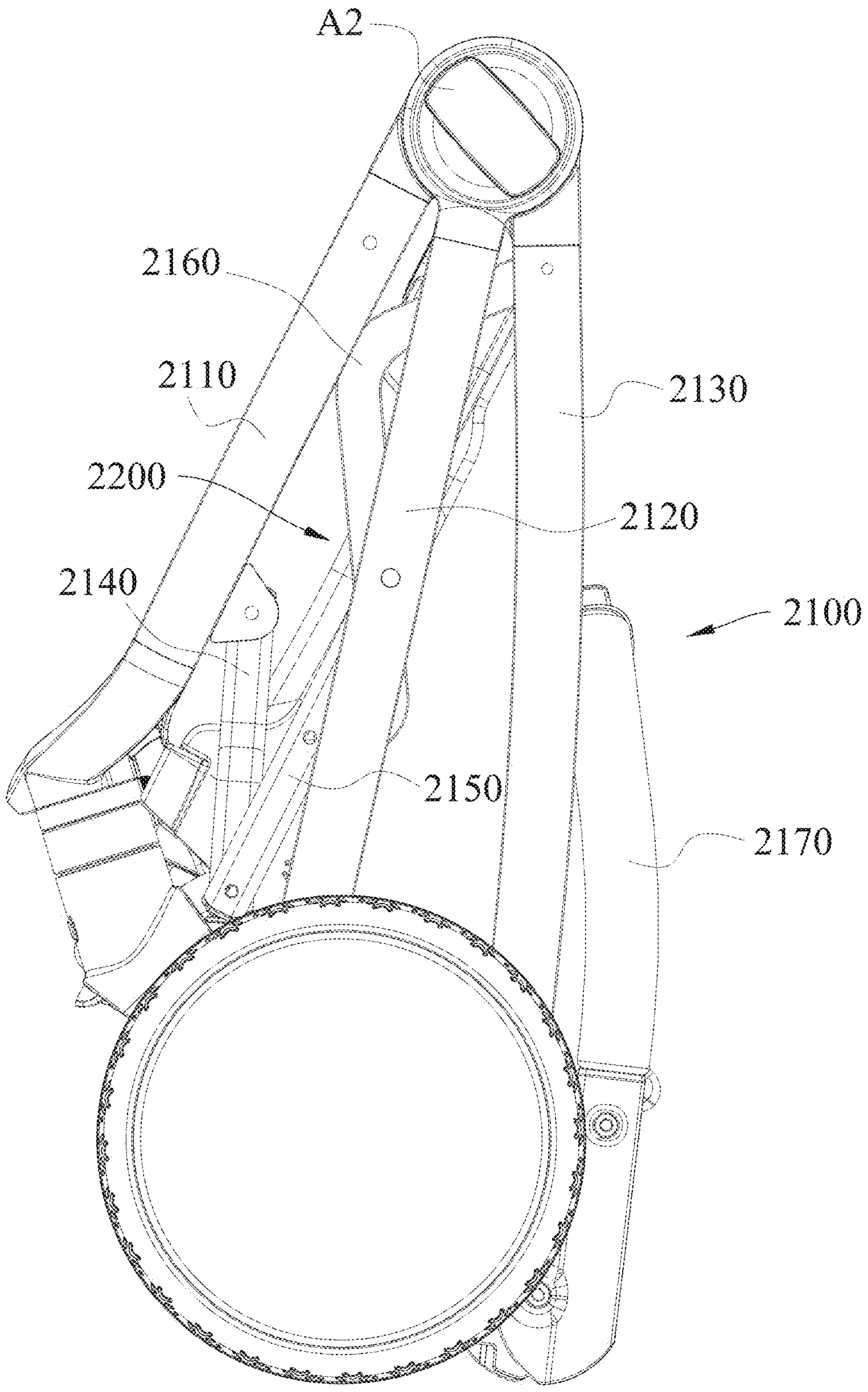
FIG. 30 shows a side view of the carrying frame and locking base assembly shown in FIG. 28 after being completely folded.
Figure 31:
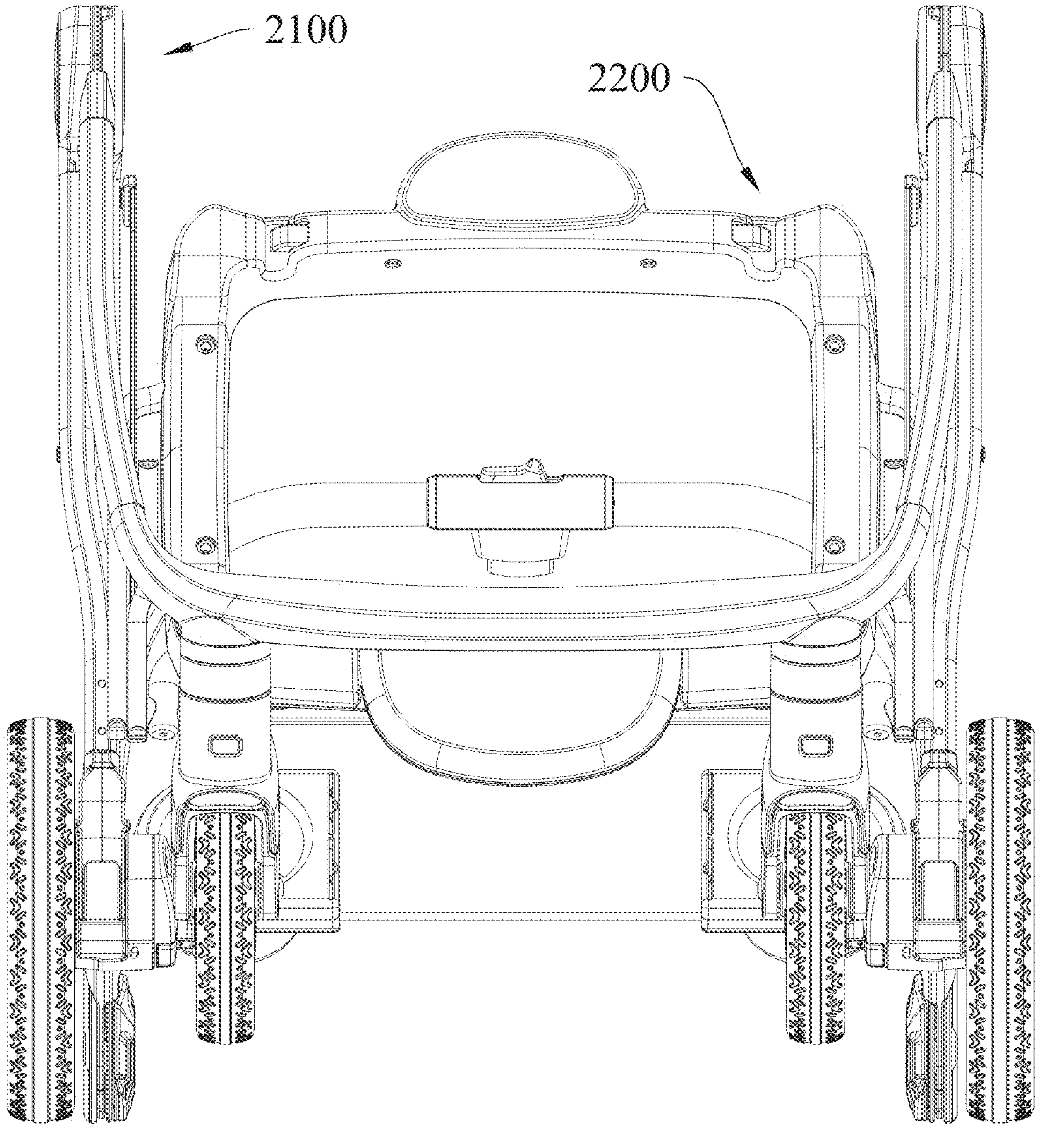
FIG. 31 shows a front view of the carrying frame and the locking base assembly shown in FIG. 30.

Referring to FIGS. 28 to 31, the folding process of the carrying frame 2100 and the locking base assembly 2200 is schematically shown. FIG. 28 shows a side view of the carrying frame 2100 and the locking base assembly 2200 shown in FIG. 24 when being fully unfolded, FIG. 29 shows a side view of the carrying frame 2100 and the locking base assembly 2200 shown in FIG. 28 during the folding process, FIG. 30 shows the carrying frame 2100 and the locking base assembly shown in FIG. 28 after being completely folded, and FIG. 31 shows a front view of the carrying frame and the locking base assembly shown in FIG. 30.

As shown in FIGS. 28 to 30, the carrying frame 2100 of the present disclosure may be folded to facilitate carrying and storage. Specifically, the handrail 2170 of the carrying frame 2100 is pivotably connected to the upper supporting rod 2130 through the second pivoting part B2, and can be folded with respect to the upper supporting rod 2130. The front supporting rod 2110, the rear supporting rod 2120 and the upper supporting rod 2130 are pivotally connected to the first pivoting part A2 and can be folded with respect to each other. In addition, when the carrying frame 2100 is being folded, the locking base assembly 2200 may be driven to pivot by the connecting assembly. Specifically, in an embodiment, when the front supporting rod 2110, the rear supporting rod 2120 and the upper supporting rod 2130 are folded, the linking element 2160 and then the auxiliary support 2150 are driven to pivot, so that the base plate support 2230 fixedly connected with the auxiliary support 2150 and the locking base assembly 2200 mounted on the base plate support 2230 can also pivot with the folding of the carrying frame 2100.

In a specific embodiment, when the carrying frame 2100 is folded, the front supporting rod 2110, the rear supporting rod 2120 and the upper supporting rod 2130 are close to each other, and the rear end of the locking base assembly 2200 (for example, an end thereof provided with the first extension part 2211, i.e., an end of the locking base assembly 2200 close to the rear wheel 2182 or the rear supporting rod 2120) is driven by the connecting assembly to pivot towards the first pivoting part A2. More specifically, as shown in FIGS. 29 and 30, as the front supporting rod 2110, the rear supporting rod 2120 and the upper supporting rod 2130 are folded with respect to each other, the linking element 2160 is driven by the upper supporting rod 2130 to pivot, and at the same time, the first coupling element 2140 is driven by the front supporting rod 2110 to pivot, and the auxiliary support 2150 pivots towards the first pivoting part A2 under the action of the first coupling element 2140 and the linking element 2160, and thus the base plate support 2230 connected with the auxiliary support 2150 is driven, so that the base plate support 2230 and the longitudinal rear end of the locking base assembly 2200 disposed on the base plate support 2230 pivot towards the first pivoting part A2 (it can be seen from FIG. 29 that the locking base assembly 2200 is folded in such a way that its upper surface pivots towards the front side of the carrying frame 2100), and are accommodated in the overall structure of the carrying frame 2100 with the folding of the carrying frame 2100, as shown in the completely folded state of FIG. 30.

Further referring to FIG. 30, when the carrying frame 2100 is completely folded, that is, the front supporting rod 2110, the rear supporting rod 2120, the upper supporting rod 2130 and the handrail 2170 are folded to a position in which they are closest to each other, the locking base assembly 2200 is accommodated between the upper supporting rod 2130 and the front supporting rod 2110 and the rear supporting rod 2120 as it pivots.

It should be noted that part or all structures of the locking base assembly 2200 in the second aspect of the present disclosure can be combined with or replaced by those of the locking base assembly 120, 120' and 120A in the first aspect of the present disclosure without affecting the structural integrity.

A third aspect of the present disclosure provides a carrier, in particular to a carrier with light weight and high structural strength. For the convenience of understanding, similar structures in the following different embodiments have similar reference numbers. For example, the reference numbers of the carriers in first to seventh embodiments are "3100" to "3700", respectively.

Figure 32A:
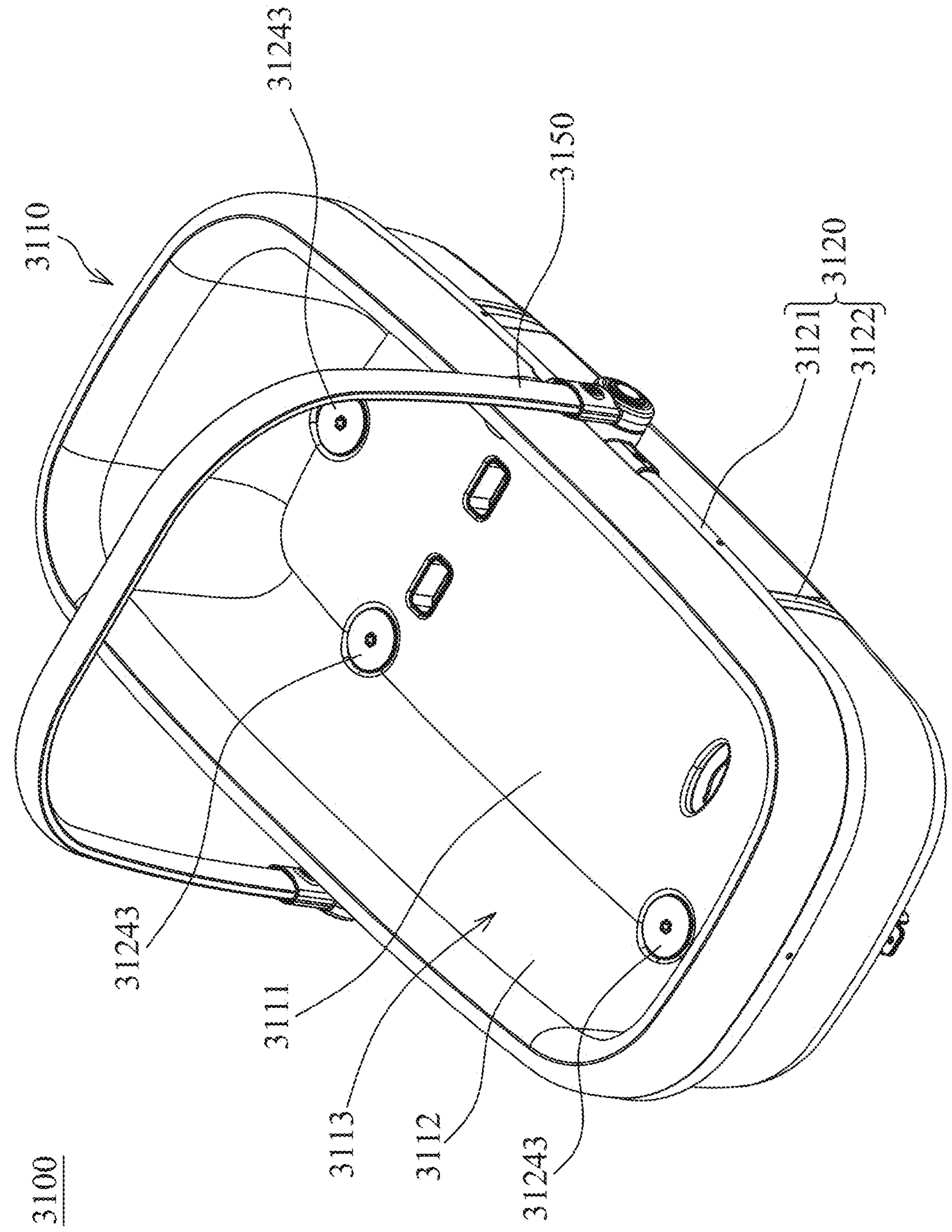
FIGS. 32A and 32B are schematic appearance views of a carrier according to a first embodiment of a third aspect of the present disclosure from different views.
Figure 32B:
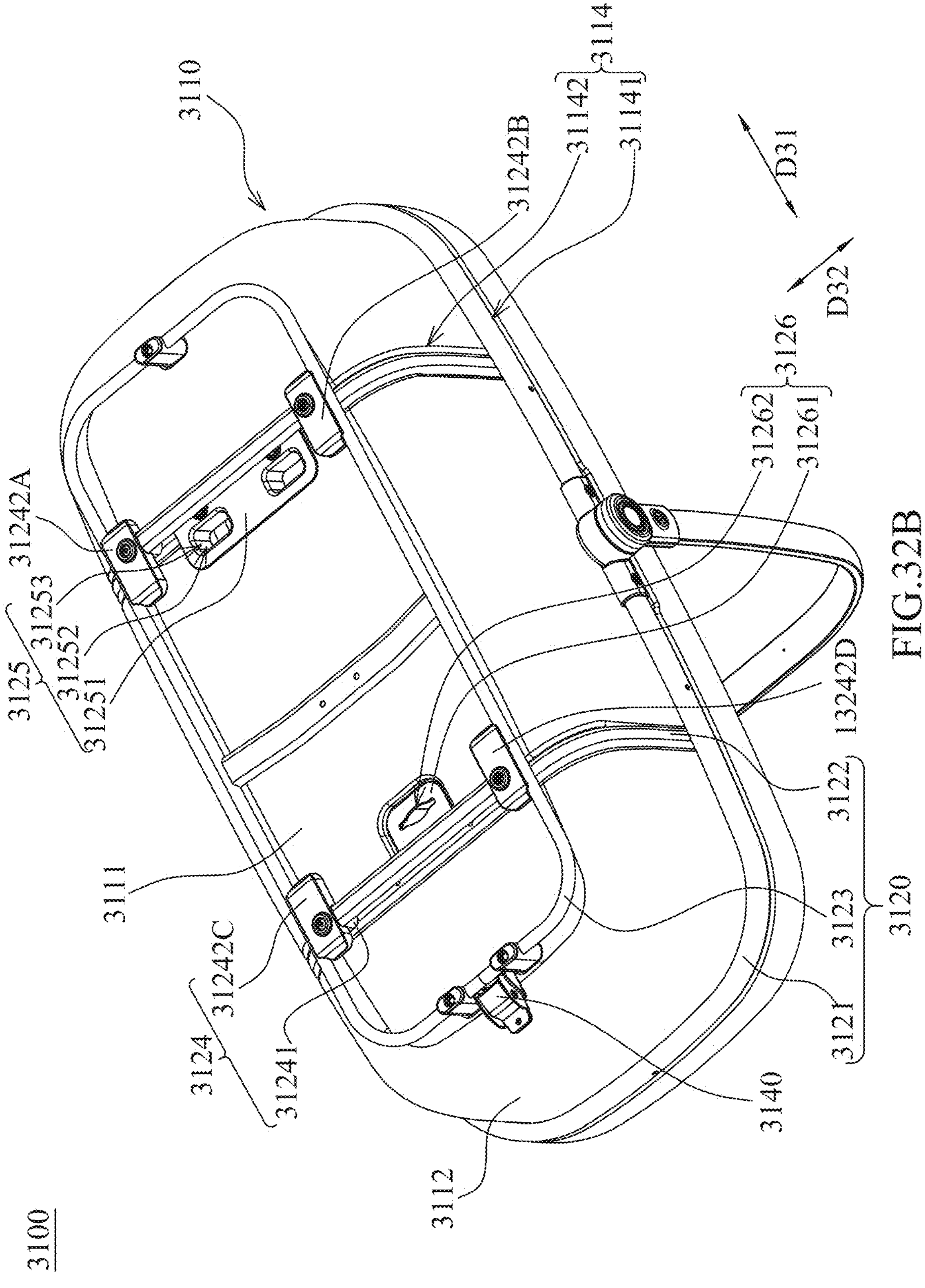

Referring to FIGS. 32A and 32B. FIGS. 32A and 32B are schematic appearance views of the carrier 3100 according to the first embodiment of the third aspect of the present disclosure from different views. As shown in FIGS. 32A and 32B, the carrier 3100 includes a main body 3110 and a bracket device 3120. The main body 3110 (which may also be used as a "carrying portion") includes a bottom portion 3111 (i.e., a main body base) and a peripheral wall 3112 connecting the bottom portion 3111. An accommodation space 3113 (i.e., a carrying space for carrying children or animals) is surrounded and defined by the bottom portion 3111 and the peripheral wall 3112, wherein an upper surface of the bottom portion 3111 is located in the accommodation space 3113, and a lower surface of the bottom portion 3111 constitutes a bottom surface of the main body 3110. In this embodiment, the accommodation space 3113 may be used to accommodate children, that is, the carrier of this embodiment is a child carrier, but the present disclosure is not limited to this embodiment. For example, in another embodiment, the accommodation space may be used to accommodate pets. In addition, in this embodiment, the main body 3110 may be made of a foam material such as foamed polypropylene (EPP), foamed polyethylene (EPE) and foamed ethylene (EPO), and the bracket device may be made of metal or other materials with high rigidity, but the present disclosure is not limited to this embodiment.

Figure 32C:
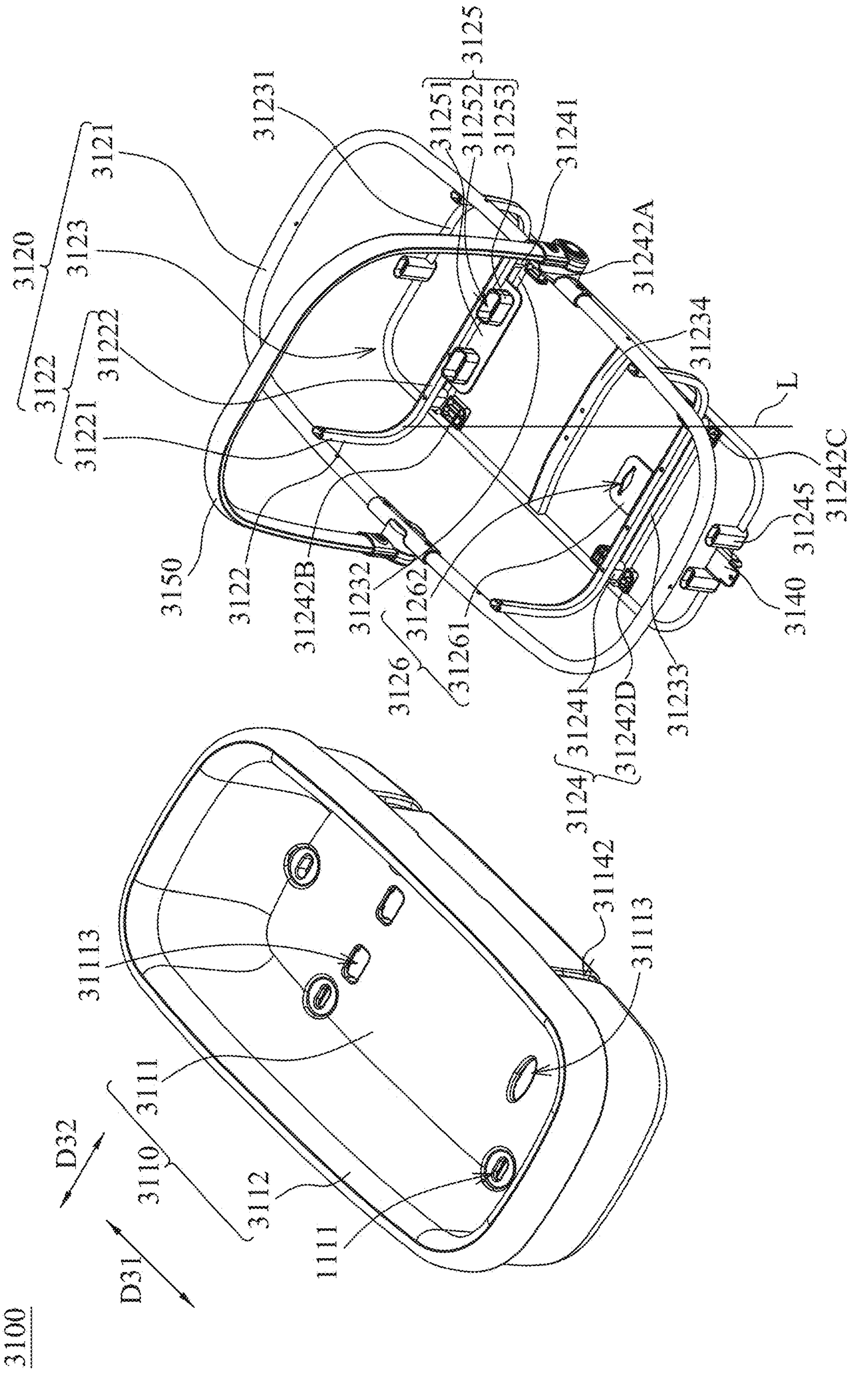
FIG. 32C is a schematic exploded view of some of elements of the carrier according to the first embodiment of the third aspect of the present disclosure.

Referring to FIGS. 32B and 32C, in which FIG. 32C is a schematic exploded view of some of elements of the carrier 3100 according to the first embodiment of the third aspect of the present disclosure. As shown in FIGS. 32B and 32C, the bracket device 3120 includes a first bracket 3121, two second brackets 3122, a third bracket 3123 and a fixing assembly 3124 connecting the main body 3110 and the third bracket 3123. The first bracket 3121 is combined to the main body 3110 and is disposed around the peripheral wall 3112 of the main body 3110. Two second brackets 3122 are connected to the first bracket 3121 and are disposed separately from each other in a longitudinal direction D31 of the main body 3110 (i.e., located on both sides of a centerline of a long side of the main body 3110, respectively). Each of the second brackets 3122 is combined to the main body 3110 and extends from one side of the peripheral wall 3112 of the main body 3110 to the other side of the peripheral wall 3112 of the main body 3110 via the bottom portion 3111 of the main body 3110 in a transverse direction D32 of the main body 3110. In this way, by providing the two second brackets 3122 at intervals to extend along the peripheral wall 3112, the main body 3110 can be stably supported, and the impact resistance of the main body 3110 can be improved. The third bracket 3123 is located at a side of the bottom portion 3111 of the main body 3110 and is spaced apart from the bottom portion 3111 of the main body 3110 (especially the lower surface of the bottom portion 3111 of the main body 3110, that is, the bottom surface of the main body 3110) through the fixing assembly 3124. The first bracket 3121 and the third bracket 3123 are disposed substantially horizontally, and are disposed at both sides of the bottom portion 3111 of the main body 3110 in a vertical direction. In this embodiment, the third bracket 3123 may be in contact with the bottom portion 3111 of the main body 3110, but the present disclosure is not limited to this embodiment.

Figure 32D:
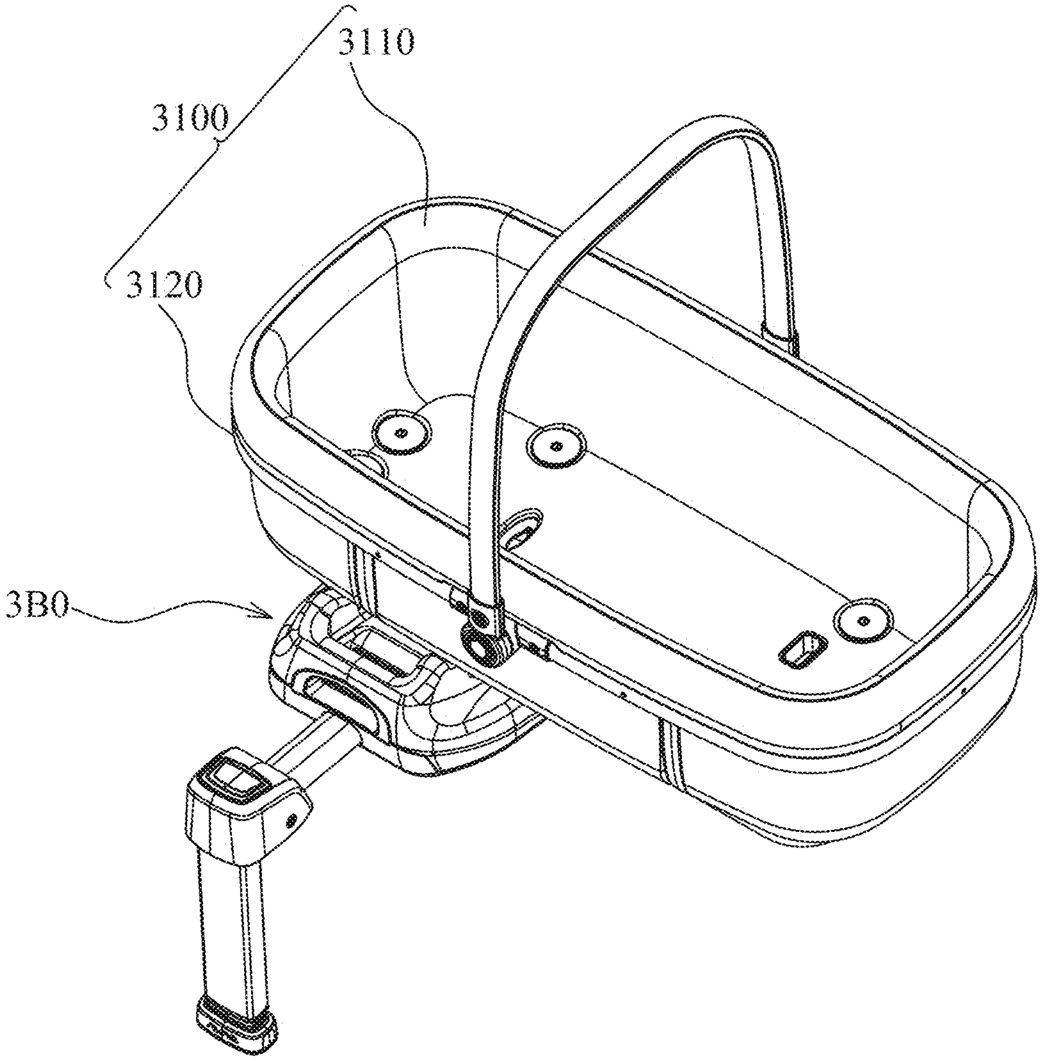
FIG. 32D is a schematic view of the carrier according to the first embodiment of the third aspect of the present disclosure when it is mounted on a base.
Figure 32E:
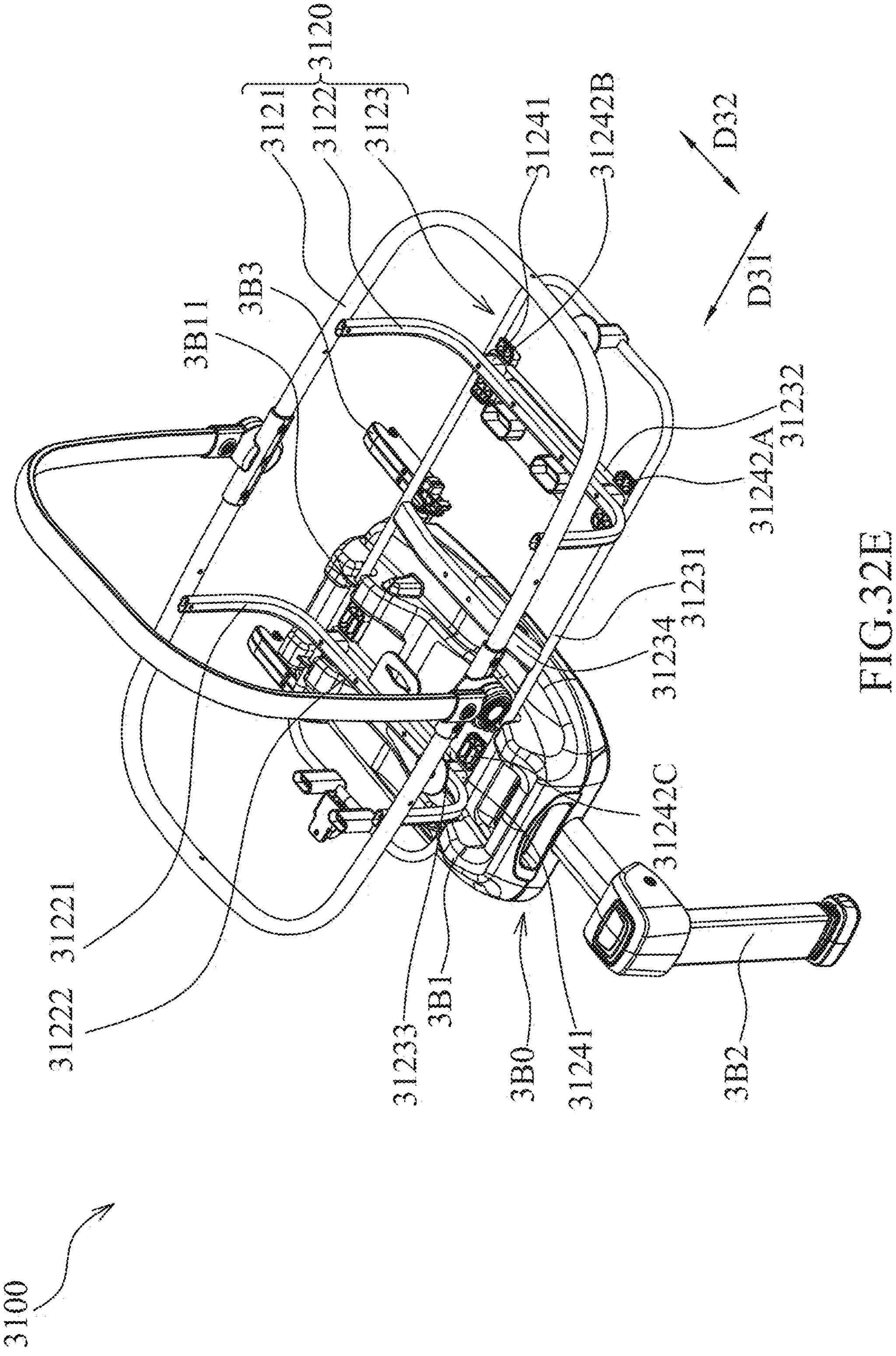
FIG. 32E is a partial structural schematic view of the carrier according to the first embodiment of the third aspect of the present disclosure when it is mounted on the base.

Referring to FIGS. 32D and 32E, FIG. 32D is a schematic view of the carrier 3100 according to the first embodiment of the third aspect of the present disclosure when it is mounted on a base 3B0, and FIG. 32E is a partial structural schematic view of the carrier 3100 according to the first embodiment of the third aspect of the present disclosure when it is mounted on the base 3B0. As shown in FIGS. 32D and 32E, the third bracket 3123 is configured to cooperate with an engaging structure 3B1 of the base 3B0, so that the carrier 3100 may be mounted on the base 3B0 through the cooperation between the third bracket 3123 and the engaging structure 3B1, wherein the cooperation between the third bracket 3123 and the engaging structure 3B1 may be realized through the engagement between the third bracket 3123 and a plurality of engaging parts 3B11 of the engaging structure 3B1. Specifically, as shown in FIG. 32E, in this embodiment, the base 3B0 may be provided with four engaging parts 3B11 to form four engaging points with the engaging element 31231. The four engaging parts 3B11 are disposed in pairs, that is, they are disposed on opposite sides of the base 3B0 along the transverse direction D32, so that the four engaging points are also disposed in pairs and located on two long sides of the engaging element 31231 respectively. In another embodiment, in addition to the ring-shaped structural element, the engaging element 31231 may also be a single engaging rod or may include two mutually parallel engaging rods, and the base 3B0 has at least one pair of engaging parts to unilaterally or bilaterally engage to the engaging element 31231 through the at least one pair of engaging parts.

In addition, when the carrier 3100 is mounted on the base 3B0, a center of gravity of the carrier 3100 is located at a side above the base 3B0 with respect to the base 3B0 since the carrier 3100 has an elongated structure. Thus, when the user wishes to release the mounting between the carrier 3100 and the base 3B0, the carrier 3100 needs to be lifted in addition that the releasing button is operated, so as to prevent the hook from being pressed which negatively affects the smooth unlocking. In this way, it can be ensured that the carrier 3100 is unloaded when the grip is held by the user, avoiding the instantaneous inclination caused by the deviation of the center of gravity of the carrier 3100 with respect to the base 3B0.

However, the structure of the carrier of the present disclosure is not limited to this embodiment. For example, in another embodiment, the bracket device may include one second bracket that is centrally disposed. Alternatively, the bracket device may include more than two second brackets, providing a better supporting for the main body. Alternatively, in another embodiment, the third bracket and the fixing assembly may be omitted, that is, the main body may not be used with the base.

In this embodiment, the base 3B0 may be mounted on a vehicle seat through supporting feet 3B2 and a plurality of fixing devices 3B3 (such as International Standards Organization FIX), so that the carrier 3100 may be mounted on the vehicle seat (not shown) through the base 3B0. In another embodiment, the base may also be mounted on the vehicle seat through a vehicle safety belt.

Specifically, as shown in FIG. 32E, the third bracket 3123 includes an engaging element 31231, two first structural reinforcement elements 31232, 31233 and a second structural reinforcement element 31234. The engaging element 31231 may be an annular structural element, and the two first structural reinforcement elements 31232, 31233 are disposed separately from each other along the longitudinal direction D31 of the main body 3110. Each of the two first structural reinforcement elements 31232 and 31233 substantially extends in the transverse direction D32 of the main body 3110 and is connected to the engaging element 31231. The two first structural reinforcement elements 31232 and 31233 are respectively disposed on both sides of the engaging element 31231 to define two engaging areas for limiting the movement range of the base 3B0 (in the case that the corresponding engaging element 31231 is engaged with the engaging structure 3B1) along the longitudinal direction D31. In combination with FIG. 32C together, the second bracket 3122 may be a U-shaped structural element. The second bracket 3122 includes two vertical parts 31221 and a transverse part 31222. The two vertical parts 31221 are substantially vertically connected to the first bracket 3121, and the transverse part 31222 is substantially vertically connected to the fixing assembly 3124.

Figure 32F:
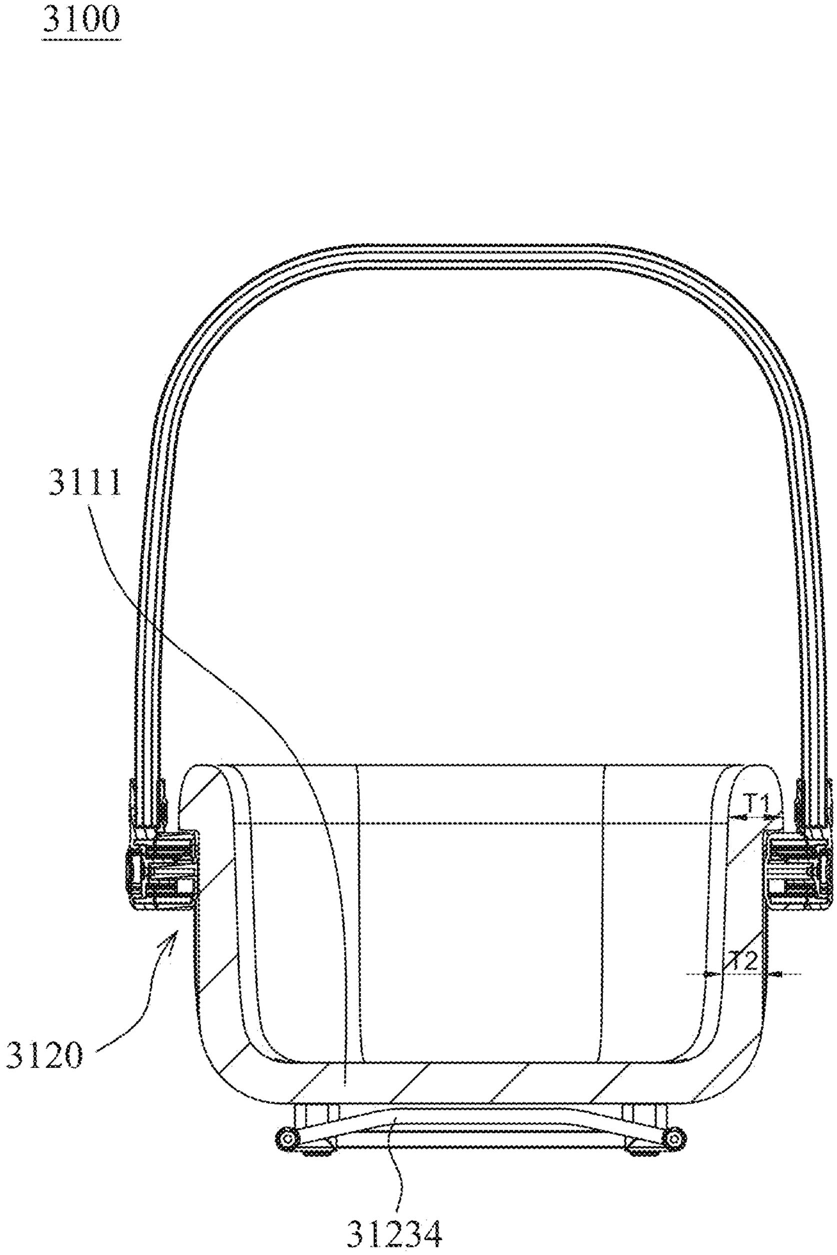
FIG. 32F is a schematic sectional view of the carrier according to the first embodiment of the third aspect of the present disclosure.
Figure 32G:
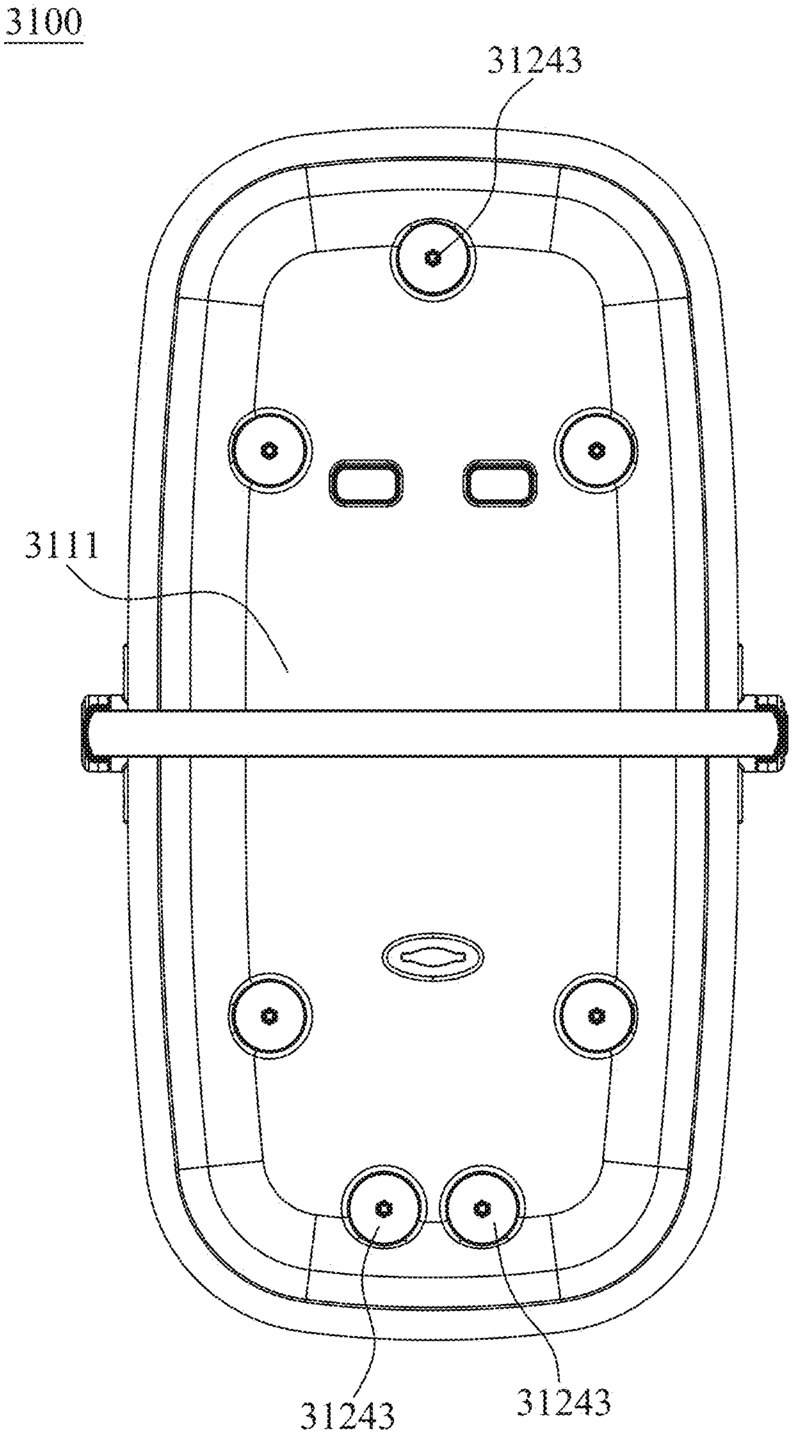
FIG. 32G is a top view of the carrier according to the first embodiment of the third aspect of the present disclosure.

In addition, referring to FIGS. 32E and 32F, FIG. 32F is a schematic cross-sectional view of the carrier 3100 according to the first embodiment of the third aspect of the present disclosure. As shown in FIG. 32F, a central part of the second structural reinforcement element 31234 faces towards the bottom portion 3111 of the main body 3110, and a height of the central part is higher than a height of two extreme ends of the second structural reinforcement element 31234, presenting in a curved shape. In another embodiment, the central part may also selectively abut against the bottom portion 3111 (especially the bottom surface) of the main body 3110. As shown in FIG. 32E, the second structural reinforcement element 31234 is located between the two first structural reinforcement elements 31232 and 31233. A distance between the second structural reinforcement element 31234 and the first structural reinforcement element 31232 is approximately equal to a distance between the second structural reinforcement element 31234 and the first structural reinforcement element 31233, and a cross-sectional area of a pipe of the second structural reinforcement element 31234 may be equal to or greater than that of a pipe of each of the two first structural reinforcement elements 31233. Through the above-mentioned structural configuration, when a baby sits on the carrier 3100 or other articles are placed on the carrier 3100, a middle part of the bottom portion 3111 of the main body 3110 may have a stress supporting part supported by the second structural reinforcement element 31234. Furthermore, when the third bracket 3123 is subjected to an external force, it can stably resist a large impact, so that the bracket device 3120 has a high impact resistance and is not easily deformed by force. However, the structure of the bracket device of the present disclosure is not limited to this embodiment, depending on the actual design requirements. For example, in another embodiment, if the carrier 3100 is not in an elongated box structure, but in a box structure with four sides of approximately equal lengths, the second structural reinforcement element may be omitted, or if the carrier 3100 is in a box structure having a longer length in the longitudinal direction D31, a plurality of second structural reinforcement elements may be further provided, so that the main body 3110 has higher impact resistance. Alternatively, in another embodiment, the third bracket may only include one first structural reinforcement element located on one of the sides of the engaging element. In another embodiment, the carrier 3100 is further provided with at least one second bracket along the transverse direction D32, but in this embodiment, the at least one second bracket has a longer vertical part, and the at least one second bracket extends from one side of the peripheral wall 3112 to the other side of the peripheral wall 3112 along the longitudinal direction D31 via the bottom portion 3111, thereby further strengthening the supporting force for the main body 3110, and improving the impact resistance of the main body 3110. In another embodiment, the carrier 3100 may not be provided with the first structural reinforcement elements 31232, 31233 and the second structural reinforcement elements 31234. However, by further providing a plurality of second brackets 3122 which are directly connecting with the third bracket 3123, the arrangement positions of the plurality of second brackets 3122 may correspond to different cross-sectional areas of the main body 3110 in the longitudinal direction D31, so as to improve the impact resistance of the main body 3110.

In addition, as shown in FIG. 32C, in an embodiment, the first bracket 3121 may also be an annular structural element. The first bracket 3121 surrounds and defines a first plane, and the engaging element 31231 surrounds and defines a second plane. An area of the second plane may not be larger than that of the first plane, and is approximately close to that of the bottom portion 3111 of the main body 3110. In addition, the first plane and the second plane correspond to the same central axis L (i.e., the central axis L passes through centers of the first plane and the second plane), and the second structural reinforcement element 31234 may be disposed in a way of passing through or approaching the central axis.

In addition, as shown in FIG. 32B, the main body 3110 also includes an accommodation structure 3114, which may be a concave structure, and includes an annular groove 31141 and a U-shaped groove 31142 for partially accommodating the first bracket 3121 and the second bracket 3122, respectively, so as to firmly combine the main body 3110 with the bracket device 3120. In another embodiment, the first bracket and the second bracket may be completely accommodated in the accommodation structure and substantially flush with a surface of the main body. It should be understood that, in another embodiment, the accommodation structure may be omitted. Alternatively, in another embodiment, the accommodation structure may only include an annular groove for partially accommodating the first bracket or a U-shaped groove for partially accommodating the second bracket.

Further, as shown in FIGS. 32D to 32F, the main body 3110 (for example, a foam material) may have a first portion and a second portion. The first portion is disposed above the bracket device 3120 (specifically, above the first bracket 3121), and the second portion is connected below the first portion. A sidewall thickness T1 of the first portion close to the second portion is greater than a sidewall thickness T2 of the second portion, and the sidewall thickness of the first portion may be gradually reduced upward and outward, forming a smooth upper edge bent upward and outward, thereby increasing the comfort during contact and reducing the discomfort during collision. In an example, the first portion and the second portion may be integrally formed, or may be separately manufactured and then combined with each other. Referring to FIGS. 32B and 32F, the surface of the main body 3110 is substantially flush with the surface of the bracket device 3120, and an outer wall of the first portion is also substantially flush with an outer surface of the first bracket 3121 of the bracket device 3120. Of course, in other embodiments, without considering the overall flatness of the outer surface of the carrier, the bracket device 3120 may be slightly recessed from the outer surface of the main body 3110, or the sidewall thickness T1 of the first portion close to the second portion may be equal to the sidewall thickness T2 of the second portion, and the bracket device 3120 at least partially protrudes from the outer surface of the main body 3110.

Figure 55:
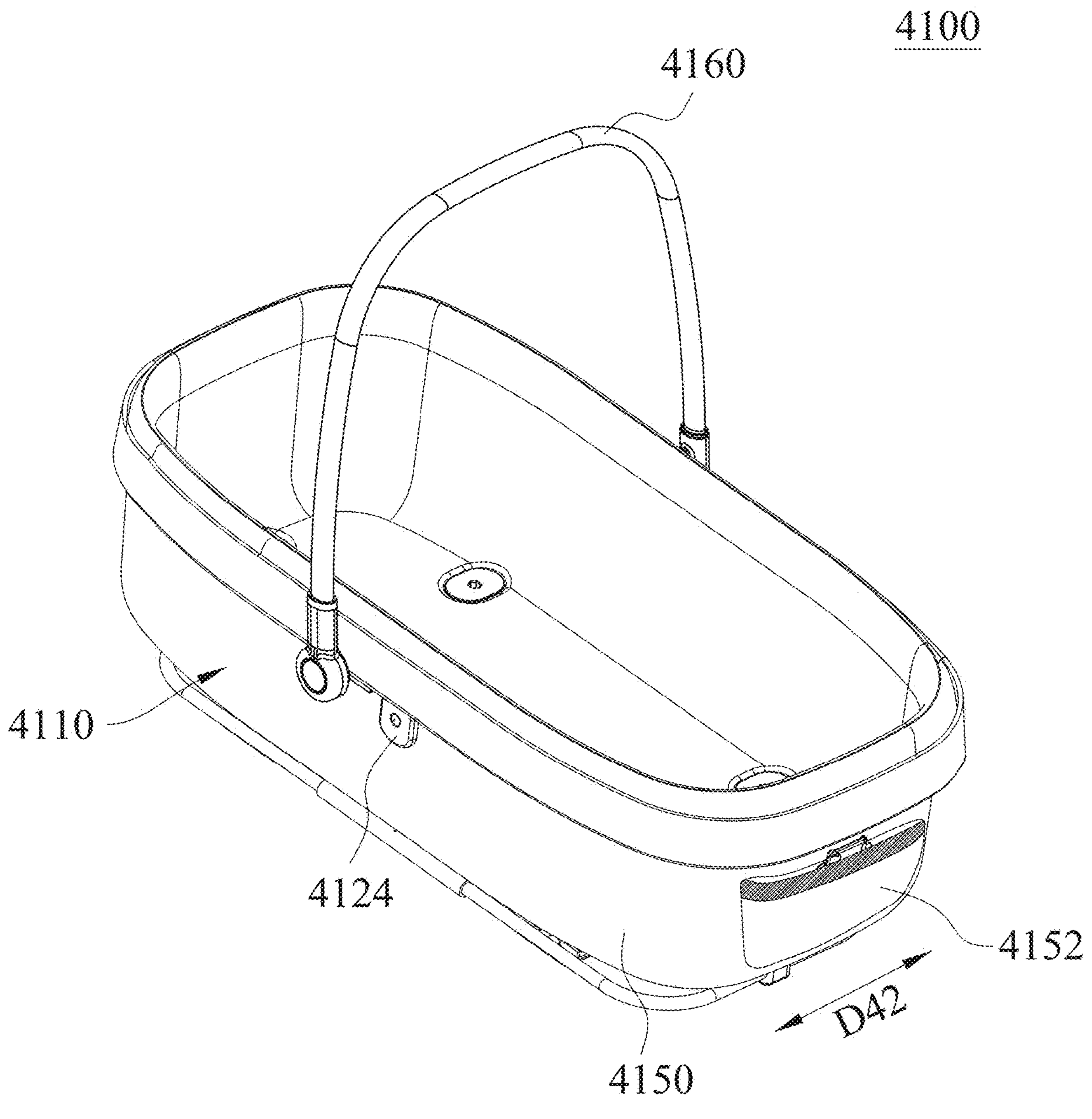
FIG. 55 shows a perspective view of a carrier according to an embodiment of the fourth aspect of the present disclosure, in which a grip and a storage bag are provided.
Figure 62A:
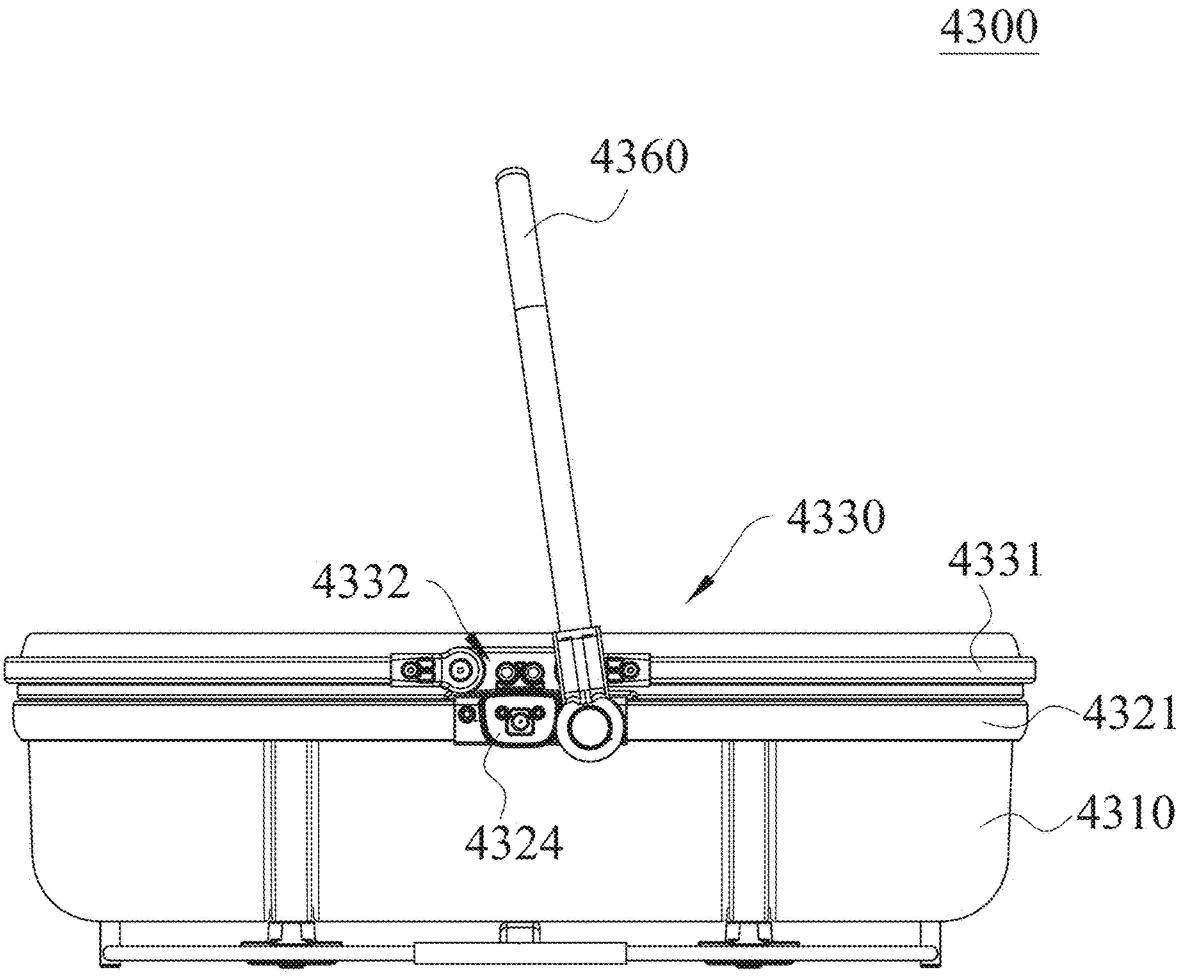
FIGS. 62A to 63D respectively show structural views of carriers with different sizes according to the present disclosure.

By providing the bracket device (and devices disposed on the bracket device, such as canopy locking parts 4124, 4224 and 4324 as shown in FIGS. 40, 55, 62A and 62D and/or pivoting parts of grips 4160 and 4360 as shown in FIGS. 55 and 62A) on the outer surface of the main body and lower than the first portion of the main body, and a canopy frame (see FIGS. 59A and 62A) for supporting the canopy surrounds the outer surface of the first portion of the main body and is lower than an upper edge of the first portion, so that animals in the carrier may be protected from directly hitting hard pipes (such as the bracket device, the canopy locking part, the canopy frame or a U-shaped pipe of the grip, etc.), thereby further improving the safety.

Furthermore, as shown in FIG. 32C, the fixing assembly 3124 includes four first connecting brackets 31241, and each of the first connecting brackets 31241 connects the corresponding second bracket 3122 with the corresponding third bracket 3123. Specifically, each of the first connecting brackets 31241 connects the corresponding second bracket 3122 with the corresponding first structural reinforcement element 31232 or 31233. In an embodiment, the fixing assembly 3124 further includes a guide assembly, which includes four guides 31242A, 31242B, 31242C and 31242D. The guide 31242A and the guide 31242B are substantially perpendicularly connected to the first structural reinforcement element 31232, and the guide 31242C and the guide 31242D are substantially perpendicularly connected to the first structural reinforcement element 31233. The four guides 31242A, 31242B, 31242C and 31242D may be disposed in the second plane surrounded by the engaging element 31231, and are respectively located at the corresponding four first connecting brackets 31241. The third bracket 3123 may be guided to cooperate with the engaging structure 3B1 through two guides 31242A and 31242B located in the engaging area on one side of the engaging element 31231 or other two guides 31242C and 31242D located in the engaging area on the other side of the engaging element 31231, so that the base 3B0 may be positioned at different positions with respect to the carrier 3100, for example, the base 3B0 may be positioned on two opposite sides of the bottom portion 3111 of the carrier 3100 in the longitudinal direction D31.

However, the number and arrangement position of the guide in the present disclosure are not limited to this embodiment. For example, in another embodiment, the fixing assembly may include one guide that is centrally disposed. It should be understood that, in another embodiment, the guide may be omitted.

In addition, in this embodiment, the guide 31242 may be a sheet-like structural element made of plastic, metal or other materials with certain rigidity, but the present disclosure is not limited to this embodiment.

Figure 32H:
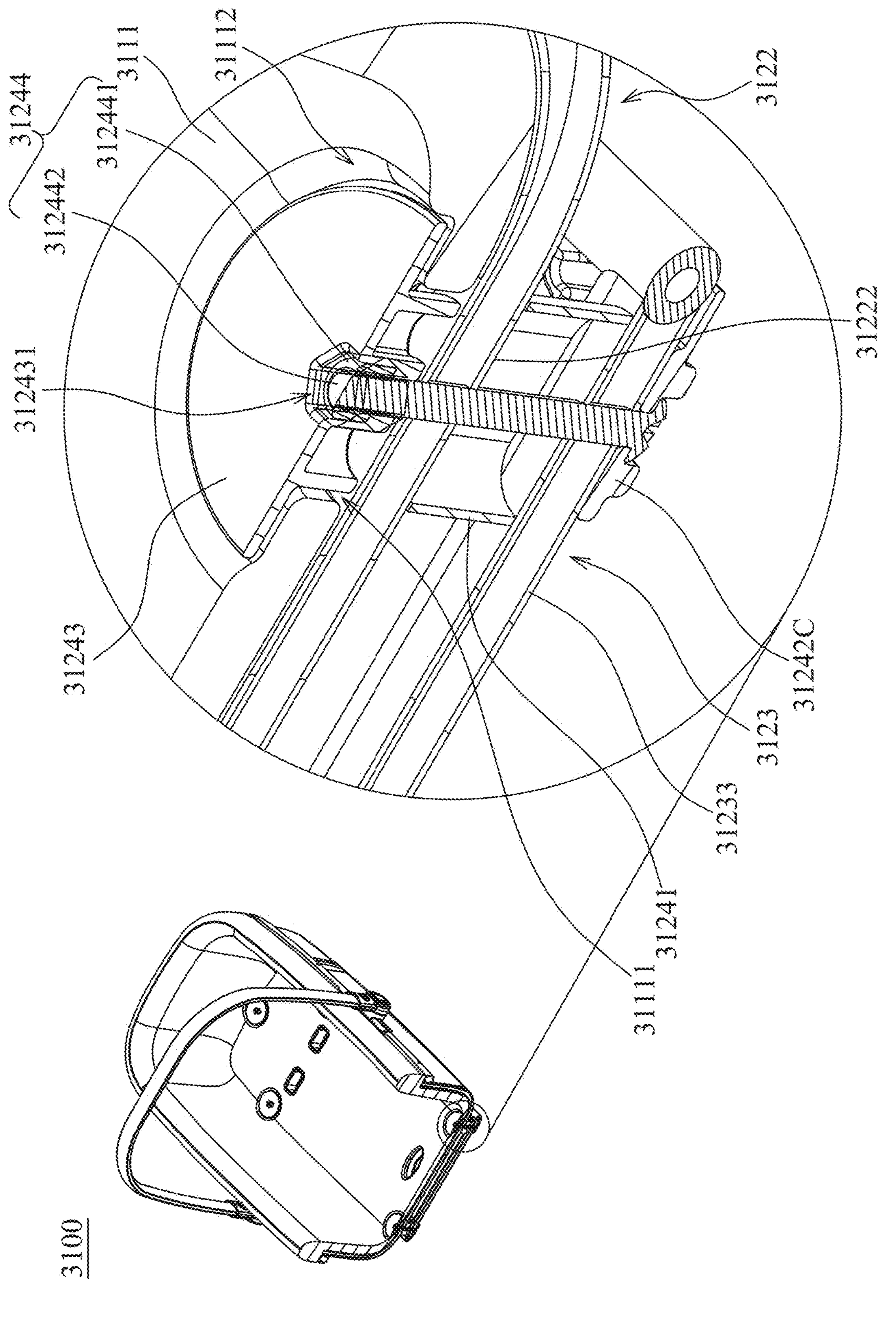
FIG. 32H is a schematic partial cross-sectional view of the carrier according to the first embodiment of the third aspect of the present disclosure.
Figure 32I:
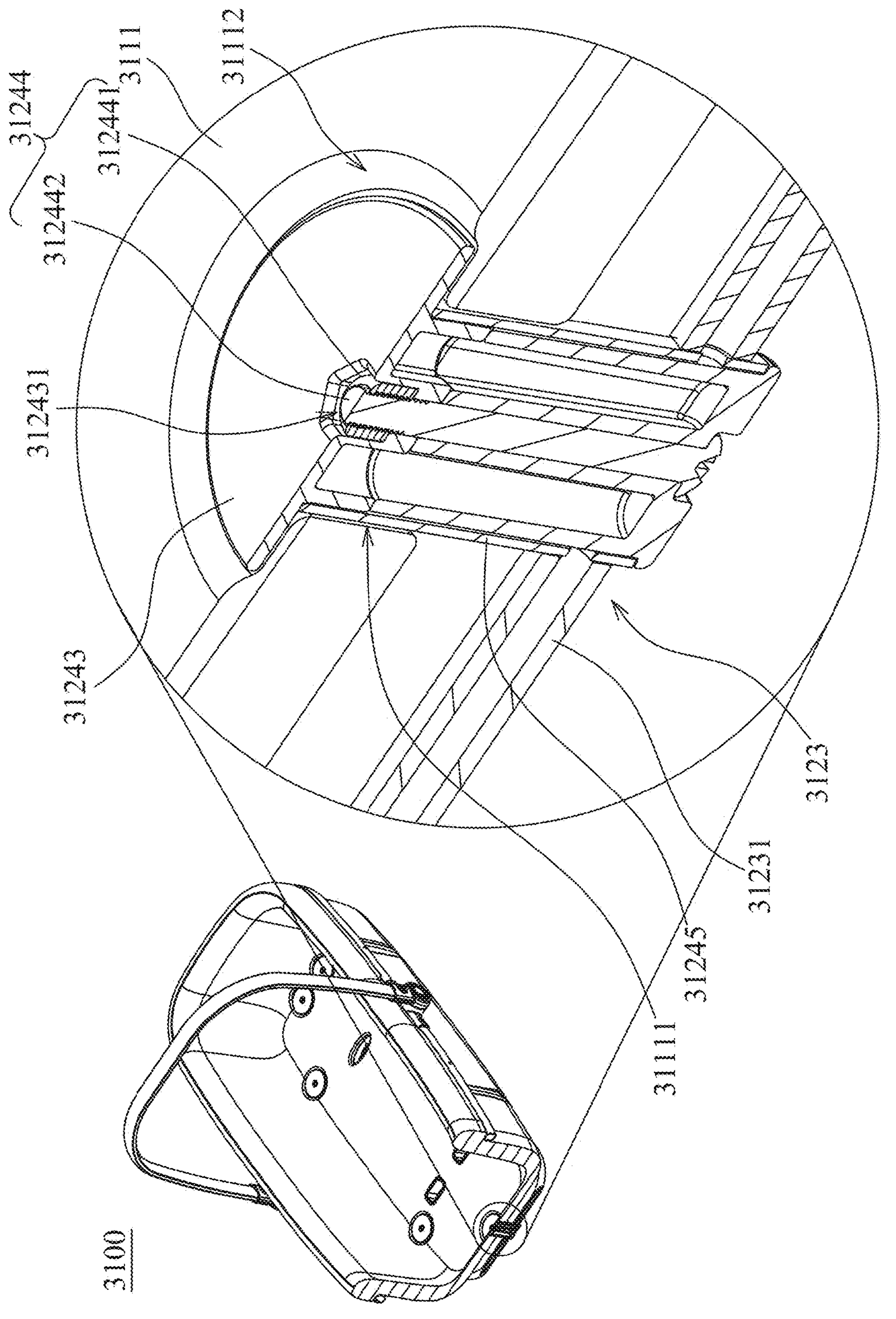
FIG. 32I is another schematic partial cross-structural sectional view of the carrier according to the first embodiment of the third aspect of the present disclosure.

Referring to FIGS. 32C, 32G, 32H and 32I, FIG. 32G is a top view of the carrier 3100 according to the first embodiment of the third aspect of the present disclosure, FIG. 32H is a partial structural cross-sectional view of the carrier 3100 according to the first embodiment of the third aspect of the present disclosure, and FIG. 32I is another partial structural cross-sectional view of the carrier 3100 according to the first embodiment of the third aspect of the present disclosure. As shown in FIGS. 32C, 32G, 32H and 32I, the fixing assembly 3124 further includes a plurality of bracket connecting elements 31243 (shown in FIG. 32G), a plurality of securing combinations 31244 (shown in FIGS. 32H and 32I) and a plurality of second connecting brackets 31245 (shown in FIG. 32C) connecting the third bracket 3123. In this embodiment, as shown in FIG. 32C, the plurality of second connecting brackets 31245 may be mounted on two opposite sides of the engaging element 31231 in the longitudinal direction D31, so that the main body 3110 and the bracket device 3120 can be combined more stably, wherein a length of the second connecting bracket 31245 needs to be larger than that of the first connecting bracket 31241 since there is no corresponding second bracket 3122 above the second connecting bracket 31245. Further, the two second connecting brackets 31245 on one side of the engaging element 31231 may be spaced apart from each other, which not only enables the engaging element 31231 to be more evenly stressed on this side, but also allows another element (such as an adjuster 3140) to be disposed between the two second connecting brackets 31245, thereby making the structure more compact.

Further, as shown in FIGS. 32C and 32I, the bottom portion 3111 of the main body 3110 is provided with a plurality of through slots 31111, which are respectively located at the corresponding first connecting bracket 31241 or second connecting bracket 31245, and the second connecting brackets 31245 are located at least partially within the corresponding through slots 31111 respectively. Each of the securing combinations 31244 may include a matching element 312441 disposed on the corresponding bracket connecting element 31243 and a securing element 312442 for locking with the matching element 312441, so as to combine the main body 3110 with the bracket device 3120 more stably.

As shown in FIG. 32H, the bracket connecting element 31243 located at the corresponding first connecting bracket 31241 may at least partially be located within the through slot 31111 and abut against the transverse part 31222 of the second bracket 3122, and the securing element 312442 located at the corresponding first connecting bracket 31241 may pass through the corresponding guide (such as the guide 31242C), the first structural reinforcement element 31233 of the third bracket 3123, the corresponding first connecting bracket 31241 and the transverse part 31222 of the corresponding second bracket 3122 and the corresponding bracket connecting element 31243 and be locked with the corresponding matching element 312441. As shown in FIG. 32I, the bracket connecting element 31243 located at the corresponding second connecting bracket 31245 may be at least partially located within and abut against the corresponding second connecting bracket 31245, and the securing element 312442 located at the corresponding second connecting bracket 31245 may pass through the engaging element 31231 of the third bracket 3123, the corresponding second connecting bracket 31245 and the corresponding bracket connecting element 31243 and be locked with the corresponding matching element 312441.

However, the number and arrangement position of the bracket connecting element, the securing combination, the second connecting bracket and the through slot in the present disclosure are not limited to this embodiment. For example, in another embodiment, the fixing assembly may include one bracket connecting element, one securing combination and one second connecting bracket, which are centrally disposed respectively, and the bottom portion of the main body is provided with one through slot, which is centrally disposed and located at the corresponding second connecting bracket. Alternatively, in another embodiment, the fixing assembly may include one first connecting bracket, one bracket connecting element and one securing combination, which are centrally disposed respectively, but does not include a second connecting bracket, and the bottom portion of the main body is provided with one through slot, which is centrally disposed and located at the corresponding first connecting bracket.

It should be understood that, in another embodiment, the securing combination may be omitted, and the bracket connecting element may be connected to the second bracket or the second connecting bracket through the cooperation of an engaging protrusion and an engaging notch.

In addition, in order to increase the riding comfort and improve the riding safety, as shown in FIGS. 32H and 32I, each of the bracket connecting elements 31243 includes a recess 312431, and the matching element 312441 is accommodated in the recess 312431 without protruding from the bracket connecting element 31243. Furthermore, the bottom portion 3111 of the main body 3110 is provided with seven grooves 31112, and each of the bracket connecting elements 31243 is partially accommodated in the corresponding groove 31112 without protruding from the bottom portion 3111 of the main body 3110.

However, the number and arrangement position of the groove in the present disclosure are not limited to this embodiment. For example, in another embodiment, the bottom of the main body is provided with one groove, which is centrally disposed. It should be understood that, in another embodiment, the groove and the recess may be omitted.

Figure 32J:
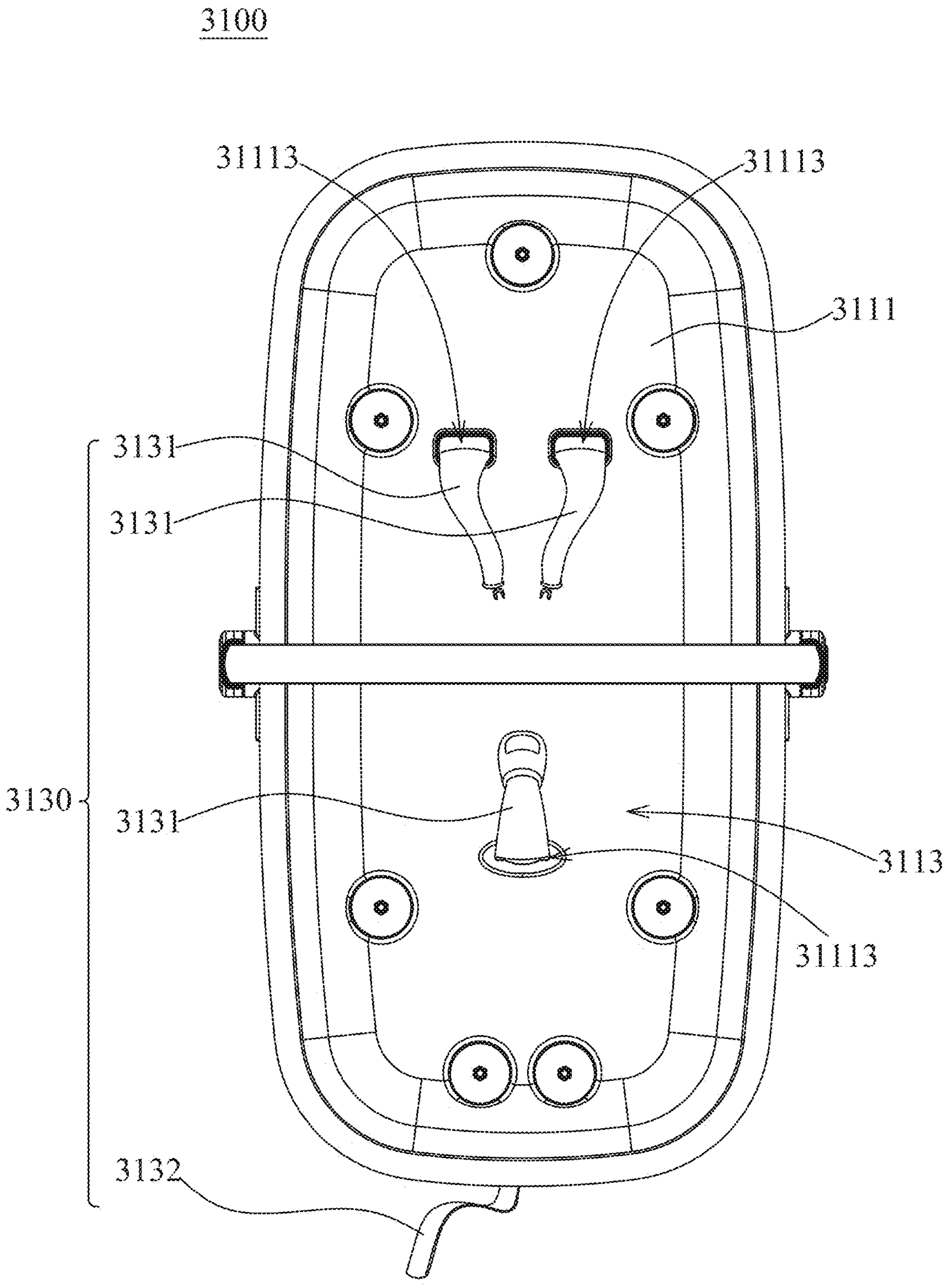
FIG. 32J and FIG. 32K are schematic views showing the arrangement of a binding webbing of the carrier according to the first embodiment of the third aspect of the present disclosure from different views.
Figure 32K:
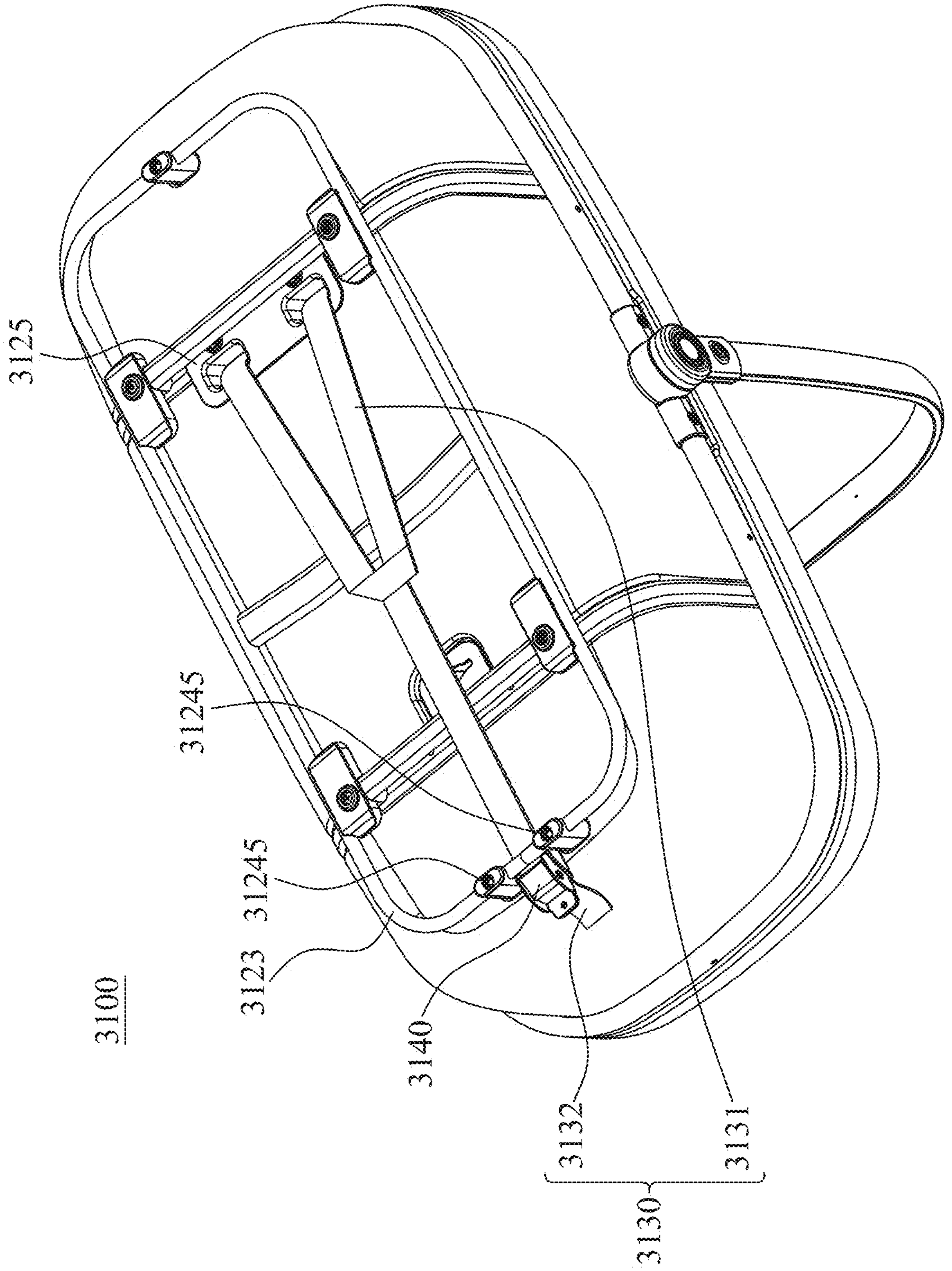

Referring to FIGS. 32J and 32K, FIGS. 32J and 32K are schematic views showing the arrangement of a binding webbing of the carrier 3100 according to the first embodiment of the third aspect of the present disclosure from different views. As shown in FIGS. 32J and 32K, the carrier 3100 further includes a binding webbing 3130 and an adjuster 3140. The binding webbing 3130 includes three limiting sections 3131 and an adjustment section 3132 that may cooperate with each other, so that a child can be limited in the accommodation space 3113. As shown in FIGS. 32B and 32C, the bottom portion 3111 of the main body 3110 also includes three bottom openings 31113 (shown in FIG. 32C). The bracket device 3120 also includes two positioning brackets, i.e., a first positioning bracket 3125 and a second positioning bracket 3126, which are respectively connected with two second brackets 3122. The first positioning bracket 3125 includes a first bracket body 31251, two first bracket openings 31252 formed in the first bracket body 31251 and located at two of the corresponding three bottom openings 31113 respectively, and two protruding structures 31253 protruding from the first bracket body 31251. The second positioning bracket 3126 includes a second bracket body 31261 and a second bracket opening 31262 formed in the second bracket body 31261 and located at the other of the three corresponding bottom openings 31113. As shown in FIGS. 32I and 32J, each of the limiting sections 3131 may pass through the corresponding bottom opening 31113 via the corresponding first bracket opening 31252 or the corresponding second bracket opening 31262. The adjuster 3140 is disposed on the third bracket 3123, the adjustment section 3132 of the binding webbing 3130 passes through the adjuster 3140, and the adjuster 3140 is configured to adjust and lock the binding webbing 3130. Each of the protruding structures 31253 is at least partially inserted in the corresponding bottom opening 31113 to avoid the binding webbing 3130 from rubbing against the main body 3110 during adjustment and to increase the structural strength of the corresponding bottom opening 31113.

However, the number and arrangement position of the bottom opening, the positioning bracket, the bracket opening and the protruding structure in the present disclosure are not limited to this embodiment. For example, in another embodiment, the bottom portion of the main body is provided with one bottom opening which is centrally disposed, and the bracket device includes one positioning bracket, which is centrally disposed and includes one bracket opening and one protruding structure. It should be understood that, in another embodiment, the binding webbing or the adjuster may be omitted.

Figure 32L:
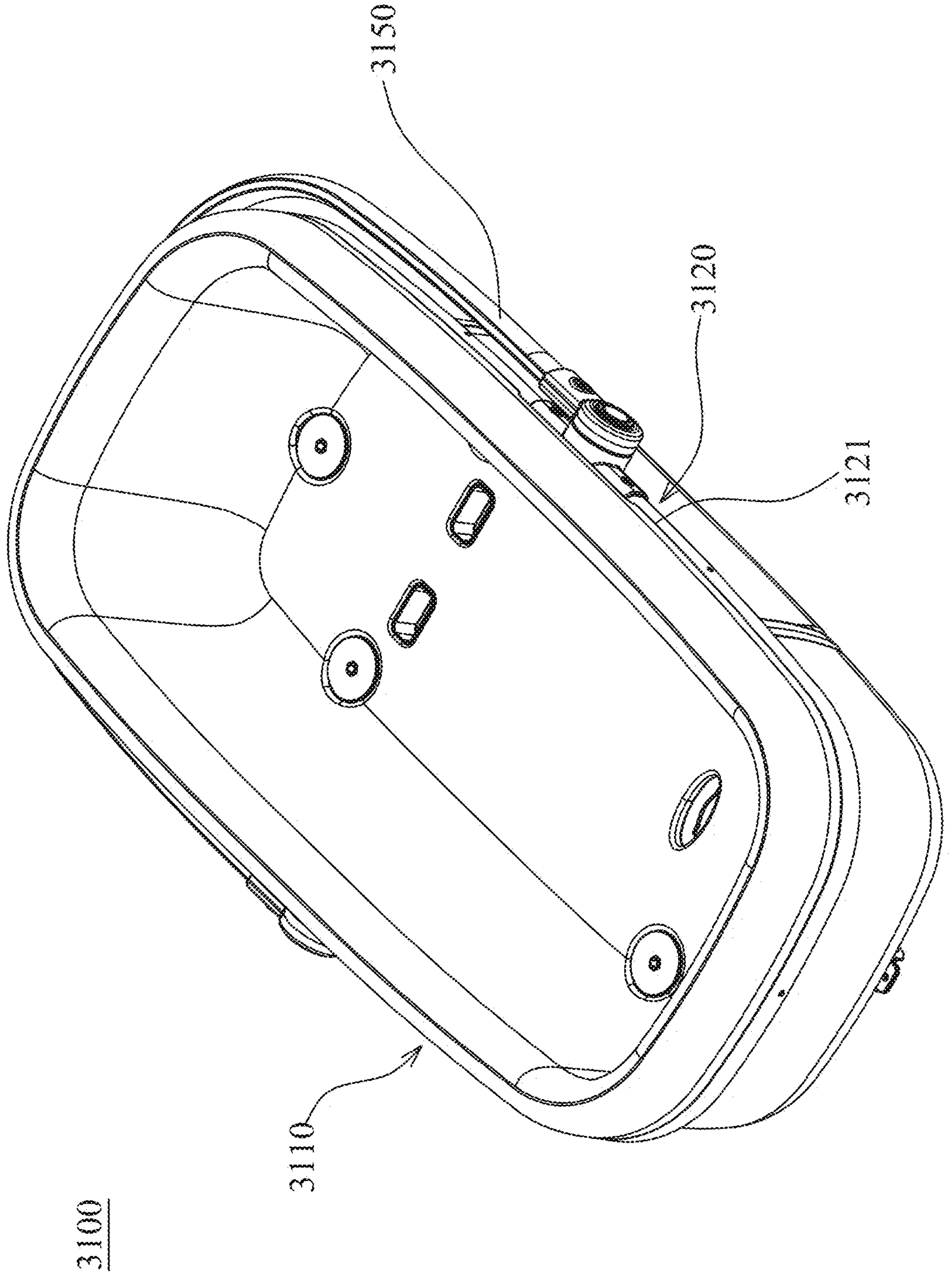
FIG. 32L is a schematic view of the carrier according to the first embodiment of the third aspect of the present disclosure when a grip is in a folded state.

Referring to FIGS. 32A, 32C and 32L, FIG. 32L is a schematic view of the carrier 3100 according to the first embodiment of the third aspect of the present disclosure when the grip 3150 is in a folded state. As shown in FIGS. 32A, 32C and 32L, the carrier 3100 further includes a grip 3150, which is pivotally connected to the first bracket 3121. By pivoting the grip 3150, the carrier may be switched between a usage state as shown in FIG. 32A and a folded state as shown in FIG. 32L, thereby achieving the purpose of convenient carrying and storage. Further, in this embodiment, the grip 3150 is substantially centrally disposed on the main body 3110 at upper edges of two sidewalls thereof, so that the grip 3150 can be smoothly folded to two sides of the main body 3110.

Figure 33A:
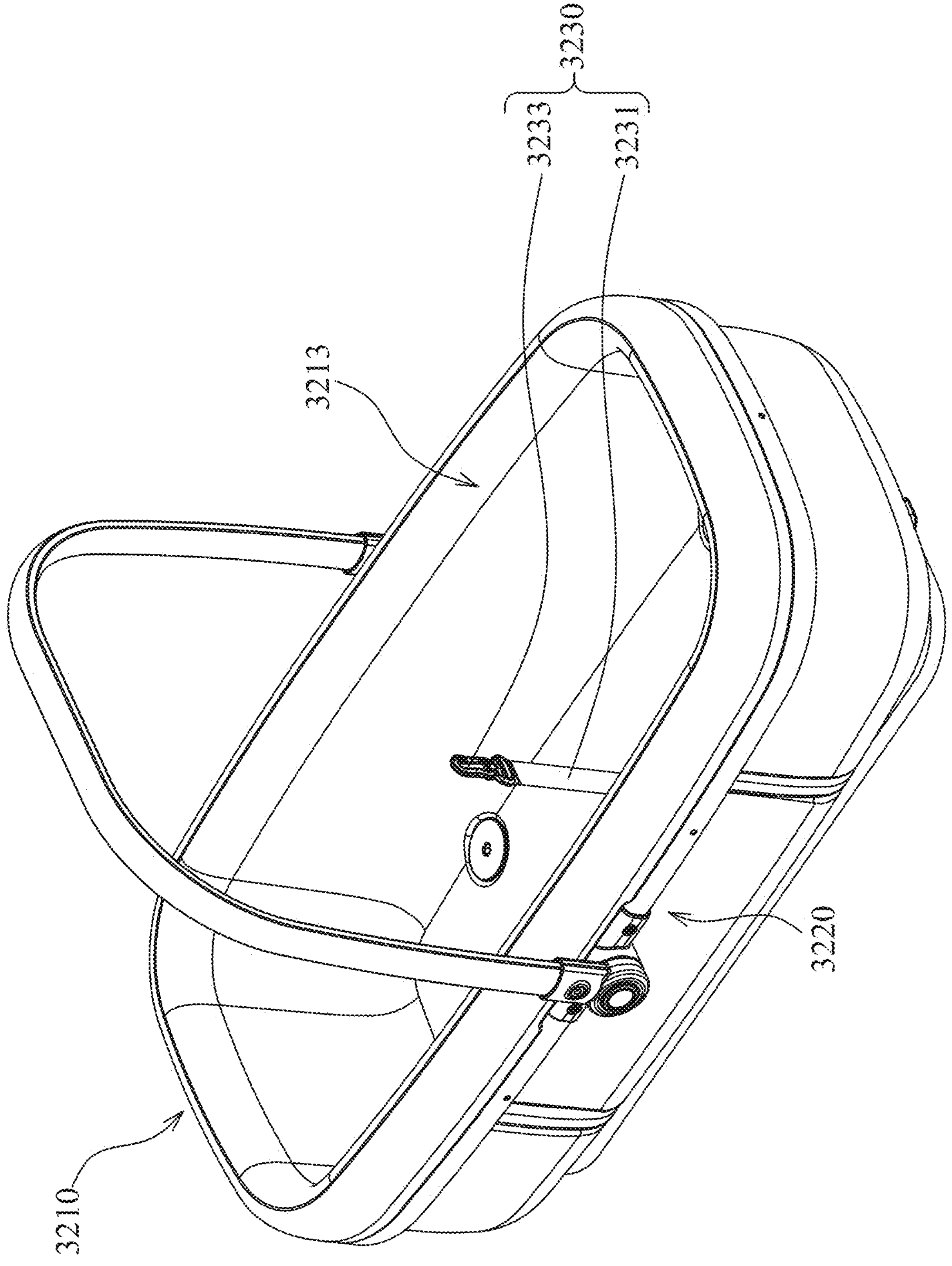
FIGS. 33A and 33B are schematic appearance views of a carrier according to a second embodiment of the third aspect of the present disclosure from different views.
Figure 33B:
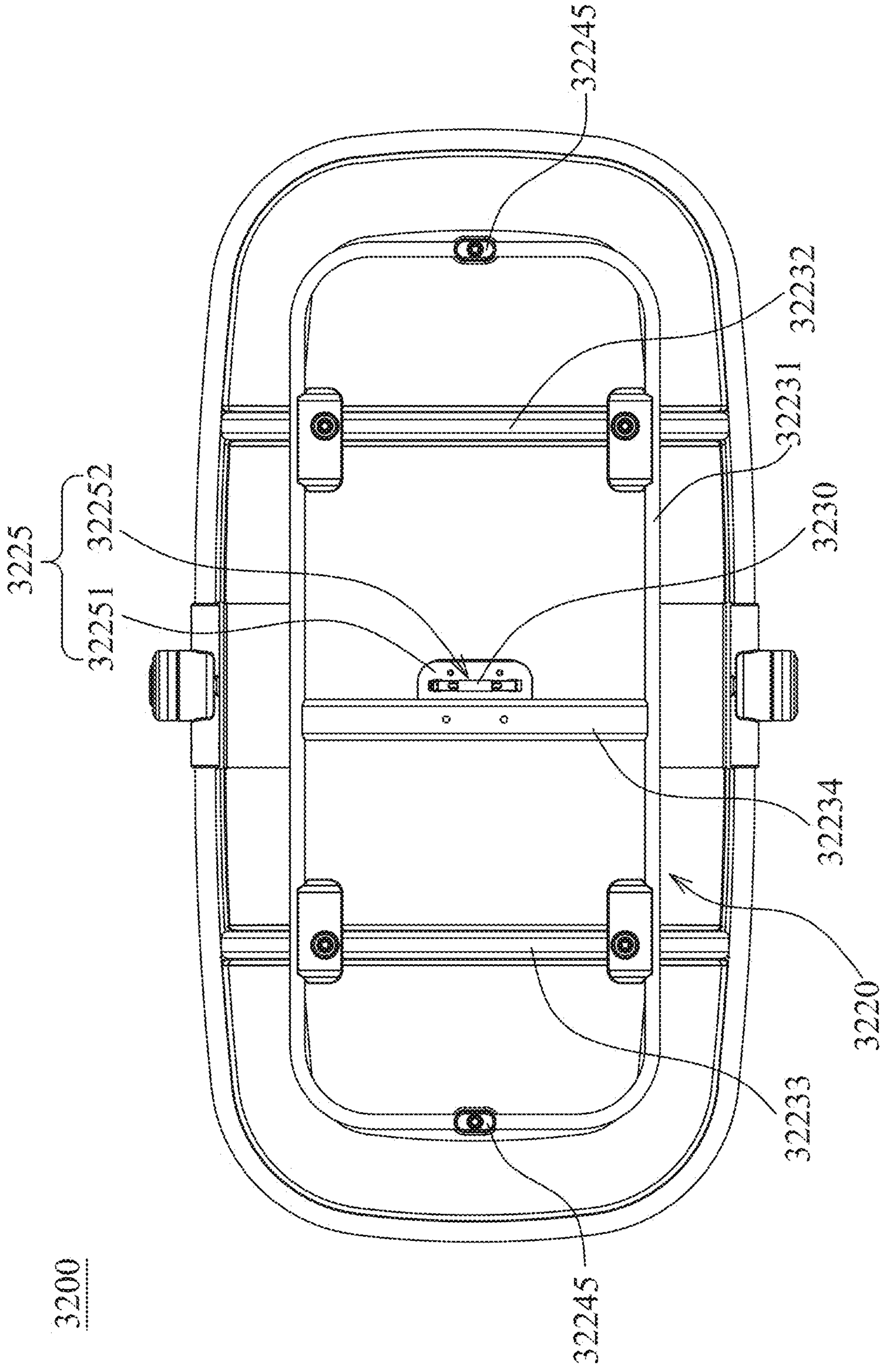
Figure 33C:
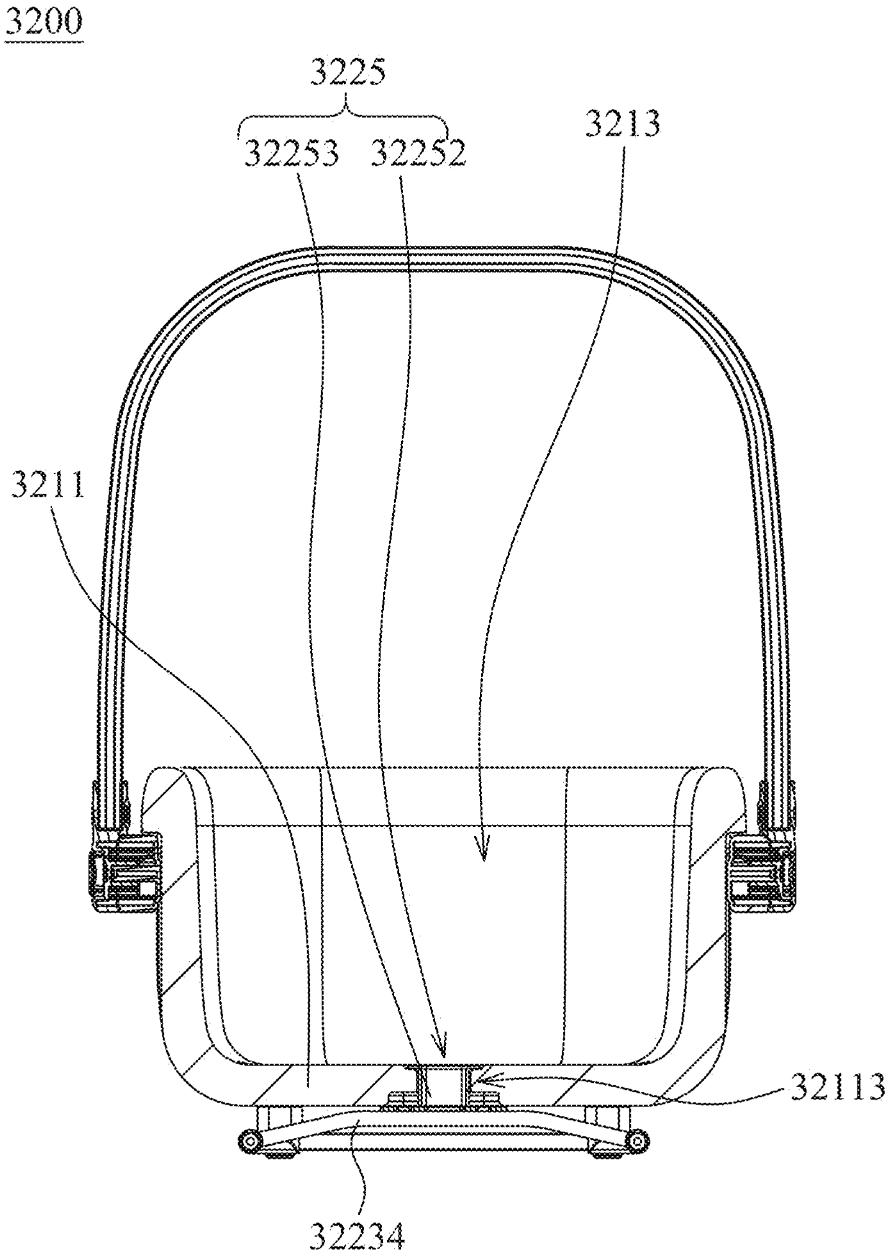
FIG. 33C is a schematic cross-sectional view of the carrier according to the second embodiment of the third aspect of the present disclosure.
Figure 33D:
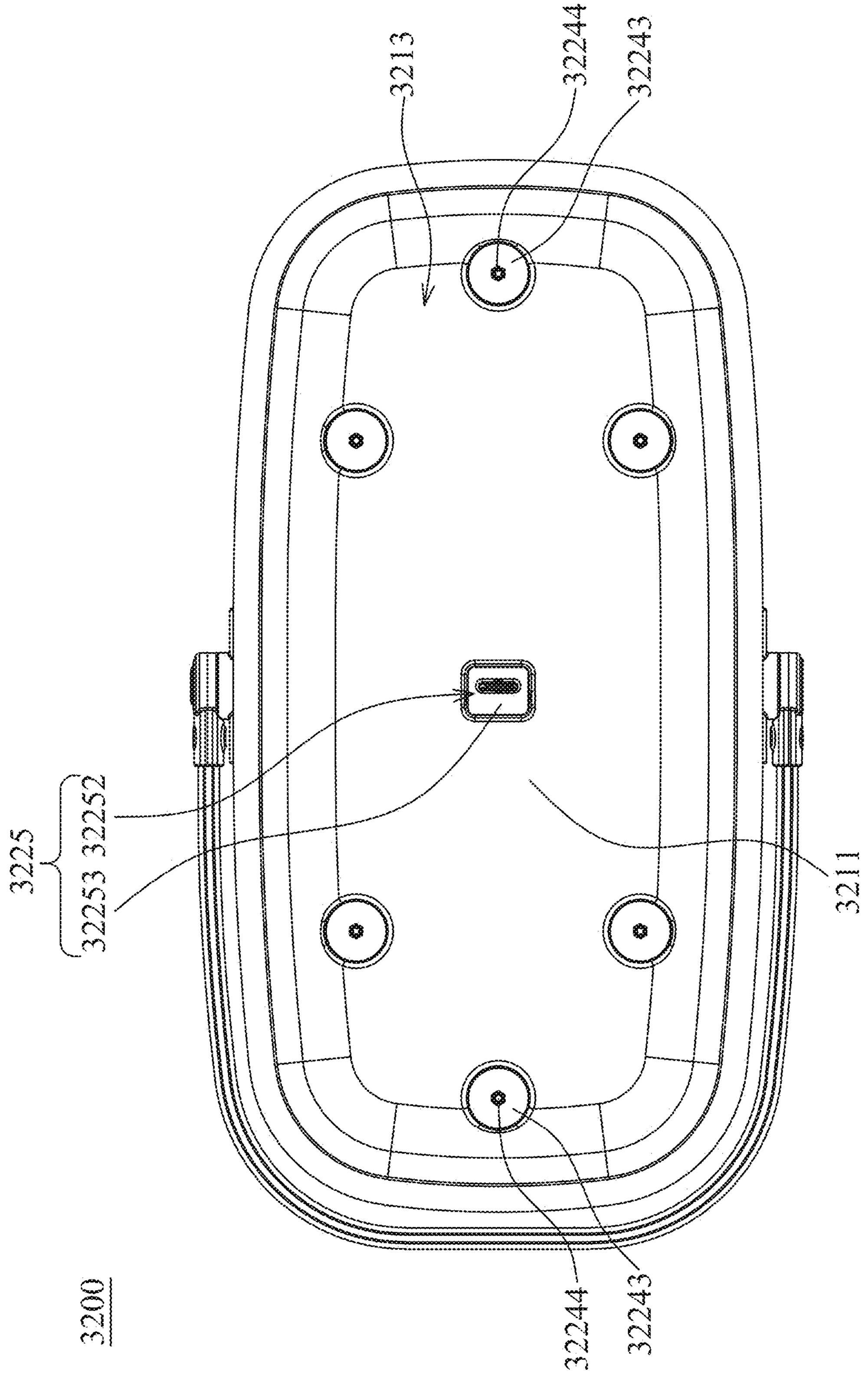
FIG. 33D is a top view of the carrier according to the second embodiment of the third aspect of the present disclosure when the grip is in a folded state.
Figure 33E:
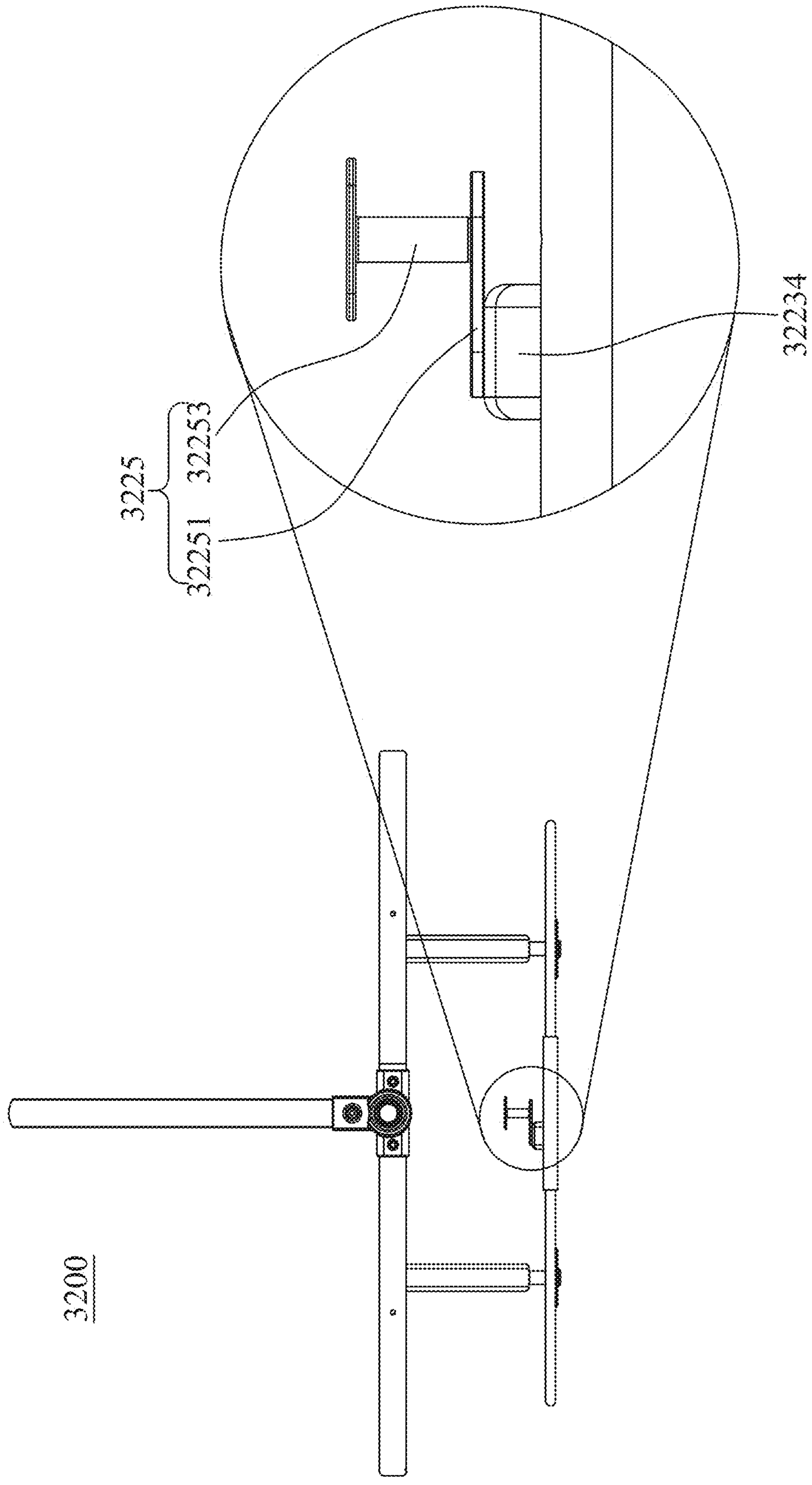
FIG. 33E is an enlarged partial structural schematic view of the carrier according to the second embodiment of the third aspect of the present disclosure.

Referring to FIGS. 33A and 33B, FIGS. 33A and 33B are schematic appearance views of a carrier 3200 according to a second embodiment of the third aspect of the present disclosure from different views. As shown in FIGS. 33A to 33B, similarly, the carrier 3200 includes a main body 3210 and a bracket device 3220. Different from the first embodiment, the accommodation space 3213 of the main body 3210 is configured to accommodate pets, that is, the carrier 3200 is a pet carrier. The fixing assembly may only include two second connecting brackets 32245, which are located on two sides of the engaging element 32231 in the longitudinal direction D31, respectively, and each of which is located at an approximately center position of the corresponding one of the two sides. Further, referring to FIGS. 33B to 33E, FIG. 33C is a schematic cross-sectional view of the carrier 3200 according to the second embodiment of the third aspect of the present disclosure, FIG. 33D is a top view of the carrier 3200 according to the second embodiment of the third aspect of the present disclosure when the grip is in the folded state, and FIG. 33E is an enlarged partial structural schematic view of the carrier 3200 according to the second embodiment of the third aspect of the present disclosure. As shown in FIGS. 33B and 33D, the bracket connecting elements 32243, the securing combinations 32244 and the through slots (not shown) located at both sides of the main body 3210 may be disposed corresponding to the two second connecting brackets 32245. As shown in FIGS. 33C to 33E, the bottom portion 3211 of the main body 3210 is only provided with one bottom opening 32113, which is located at an approximately center position of the main body 3210. In this embodiment, as shown in FIG. 33B, a distance between the second structural reinforcement element 32234 and the first structural reinforcement element 32232 is slightly larger than a distance between the second structural reinforcement element 31234 and the first structural reinforcement element 32233 so as to be adapted to the arrangement position of the bottom opening 32113. Furthermore, as shown in FIGS. 33C and 33E, a central part of the second structural reinforcement element 32234 located between the two first structural reinforcement elements 32232 and 32233 is bent towards the bottom portion 3211 of the main body 3210 and configured to abut against the bottom portion 3211 of the main body 3210, so as to enhance the impact resistance of the bracket device 3220. In addition, the bracket device 3220 only includes one positioning bracket 3225, which is connected to the central part of the second structural reinforcement element 32234 and located at the approximately center portion of the corresponding main body 3210. The positioning bracket 3225 includes a bracket body 32251, one bracket opening 32252 formed on the bracket body 32251 and located at the corresponding bottom opening 32113, and one protruding structure 32253 protruding from the bracket body 32251 and at least partially inserted in the bottom opening 32113. The binding webbing 3230 only includes one limiting section 3231, but does not include an adjustment section. The carrier 3200 does not include an adjuster. The limiting section 3231 is provided with a clamping element 3233, which may be buckled with a buckle ring on a pet vest, thereby limiting the pet in the accommodation space 3213. Other structures of this embodiment are similar to those of the first embodiment and also have similar diverse changes as those of the first embodiment, which will not be repeated herein for the sake of brevity.

Figure 34A:
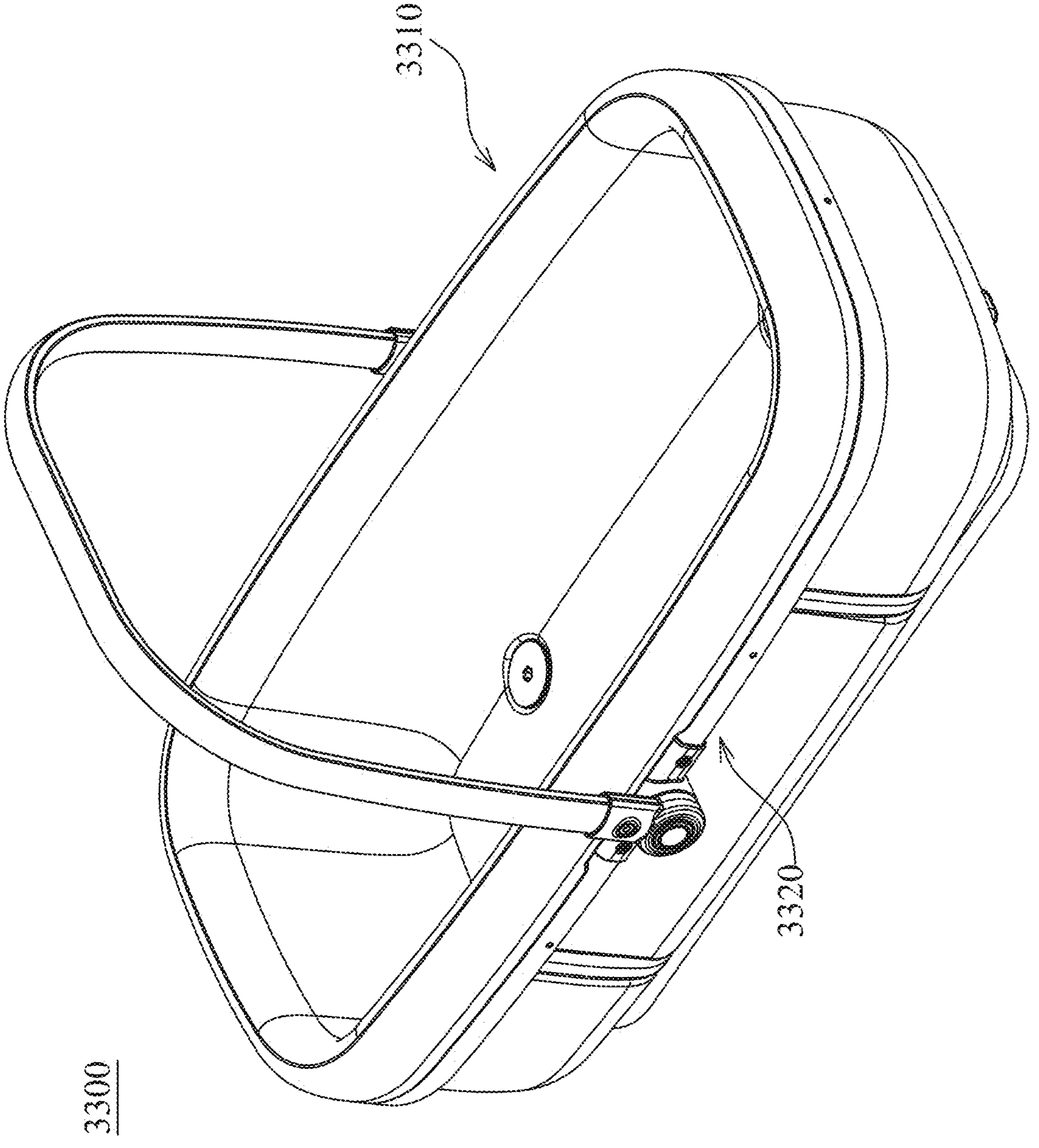
FIGS. 34A to 34C are schematic appearance views of the carrier according to a third embodiment of the third aspect of the present disclosure from different views.
Figure 34B:
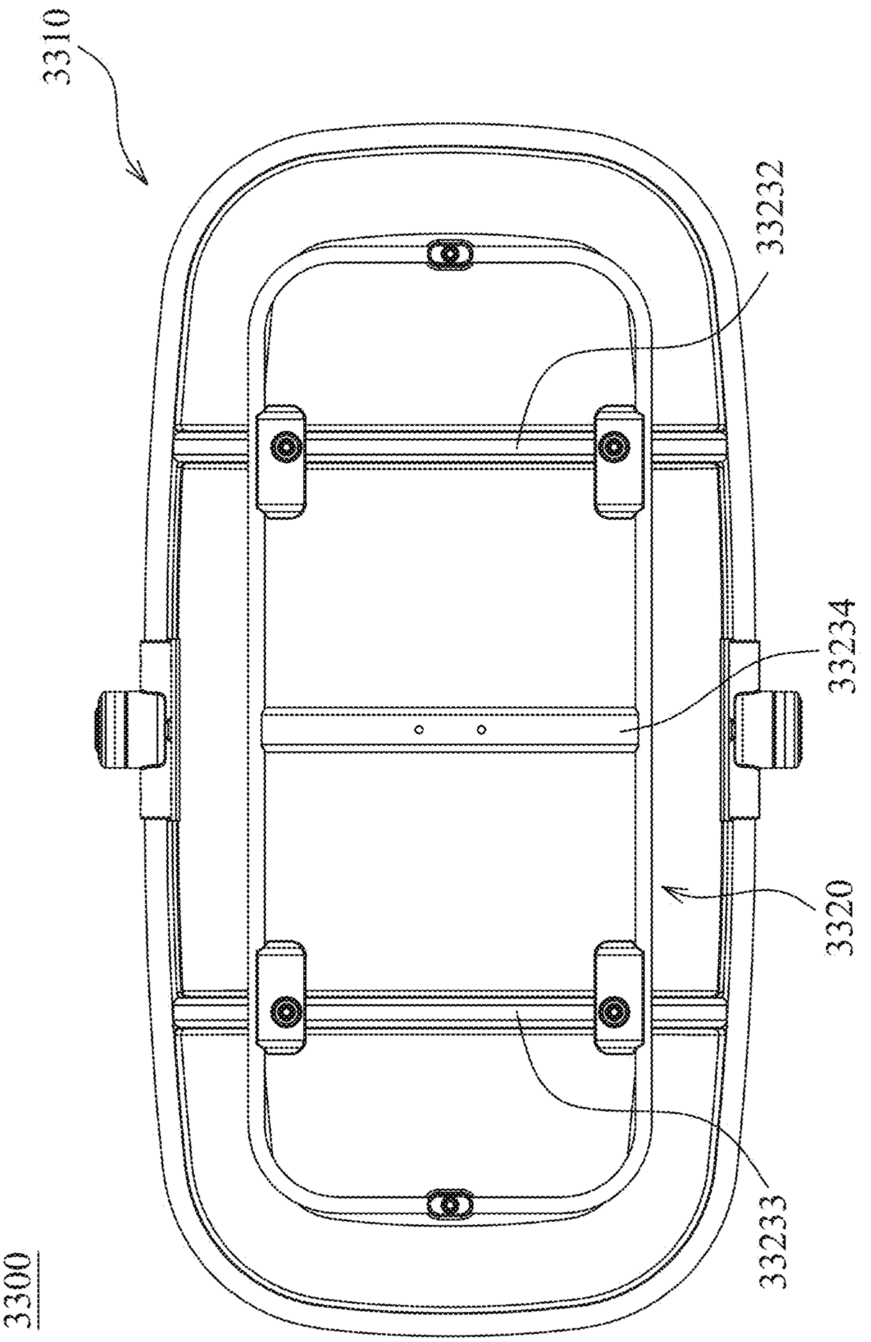
Figure 34C:
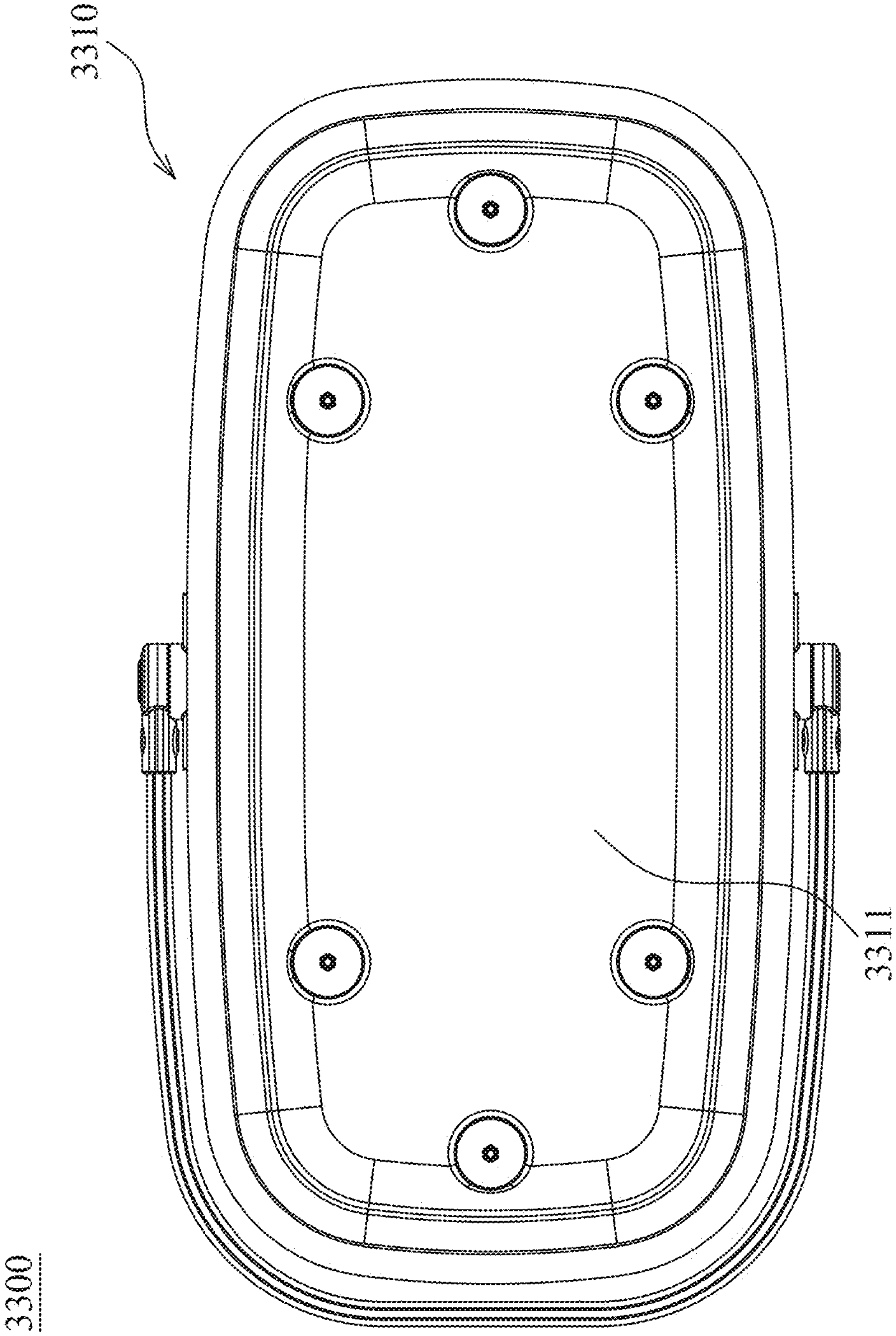

Referring to FIGS. 34A to 34C, FIGS. 34A to 34C are schematic appearance views of the carrier 3300 according to a third embodiment of the third aspect of the present disclosure from different views. As shown in FIGS. 34A to 34C, it is different from the second embodiment that, the carrier 3300 does not include a binding webbing and an adjuster, the bottom portion 3311 of the main body 3310 is not provided with a bottom opening, the bracket device 3320 does not include a positioning bracket, and the second structural reinforcement element 33234 is at approximately equal distances from each of the two first structural reinforcement elements 33232 and 33233. Other structures of this embodiment are similar to those of the second embodiment, and also have similar diverse changes as those of the second embodiment, which will not be repeated herein for the sake of brevity.

In addition, some of the current carriers are provided with a canopy. However, such a canopy is usually connected with the carrier body in a complicated way, which makes it difficult for the user to detach the canopy from the carrier body when the canopy is not necessary, and which is not conducive to carrying and using. Thus, the present disclosure also provides a carrier having a detachable canopy.

Figure 35A:
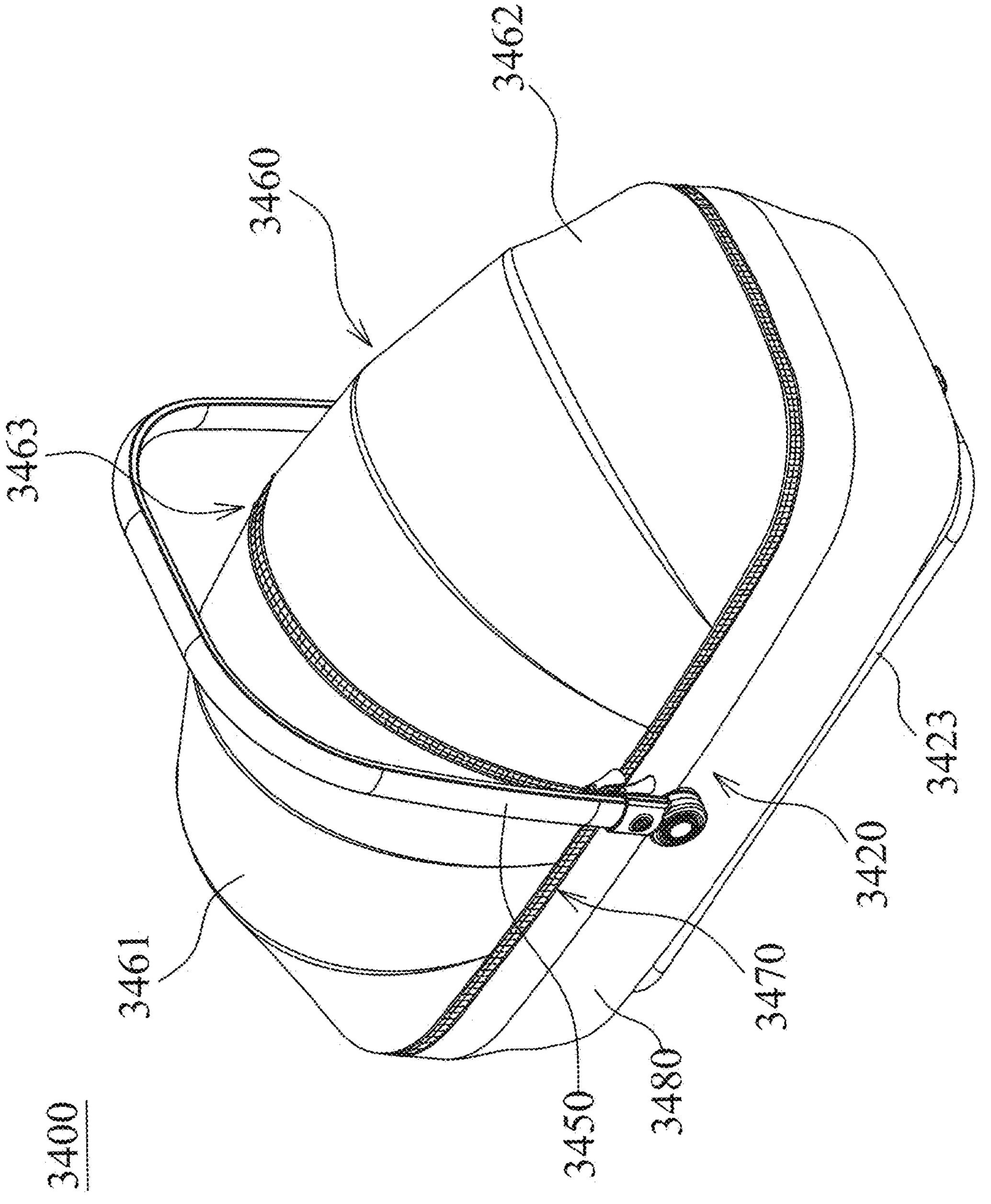
FIGS. 35A and 35B are schematic appearance views of the carrier according to a fourth embodiment of the third aspect of the present disclosure in different states.
Figure 35B:
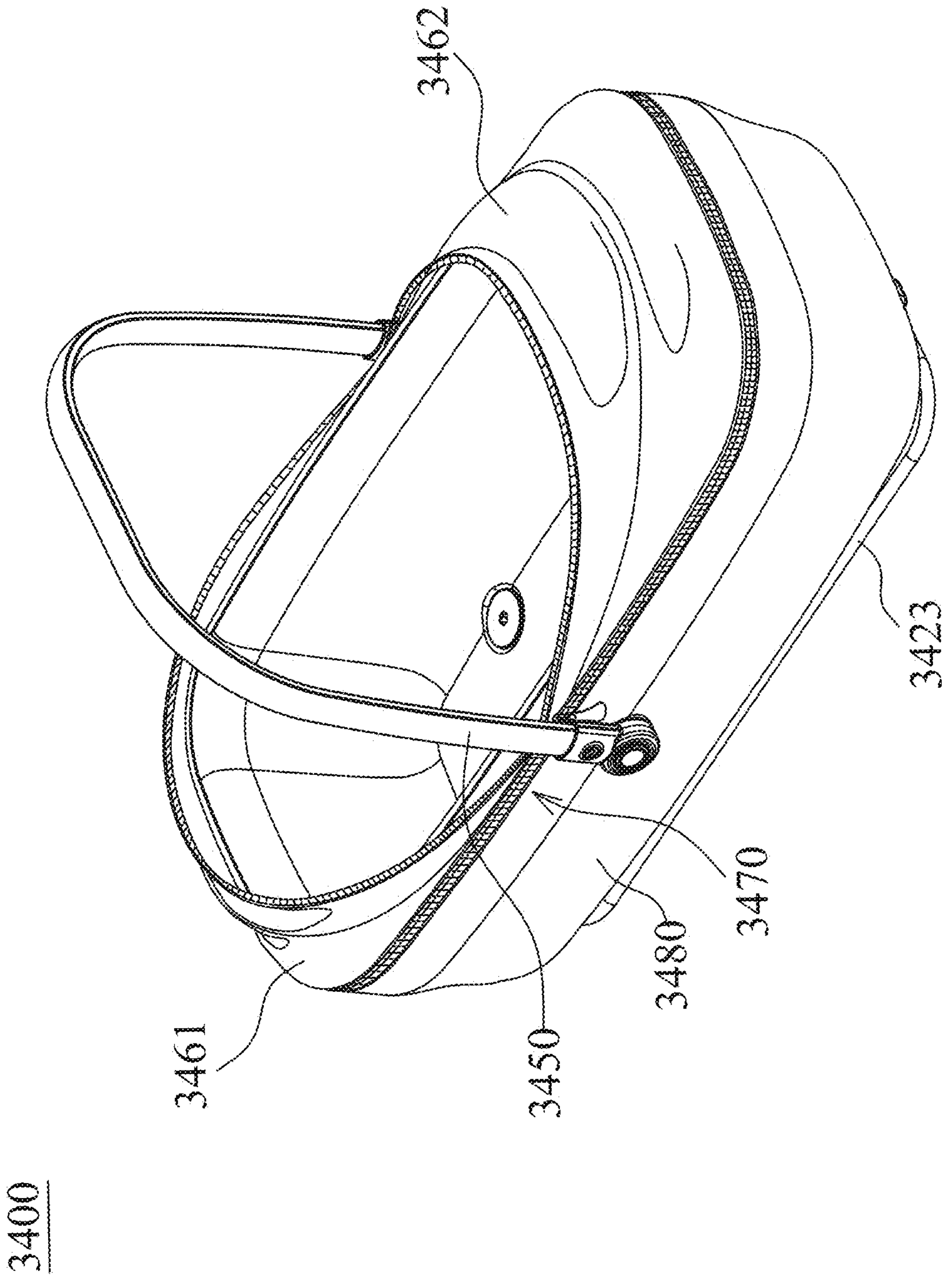
Figure 35C:
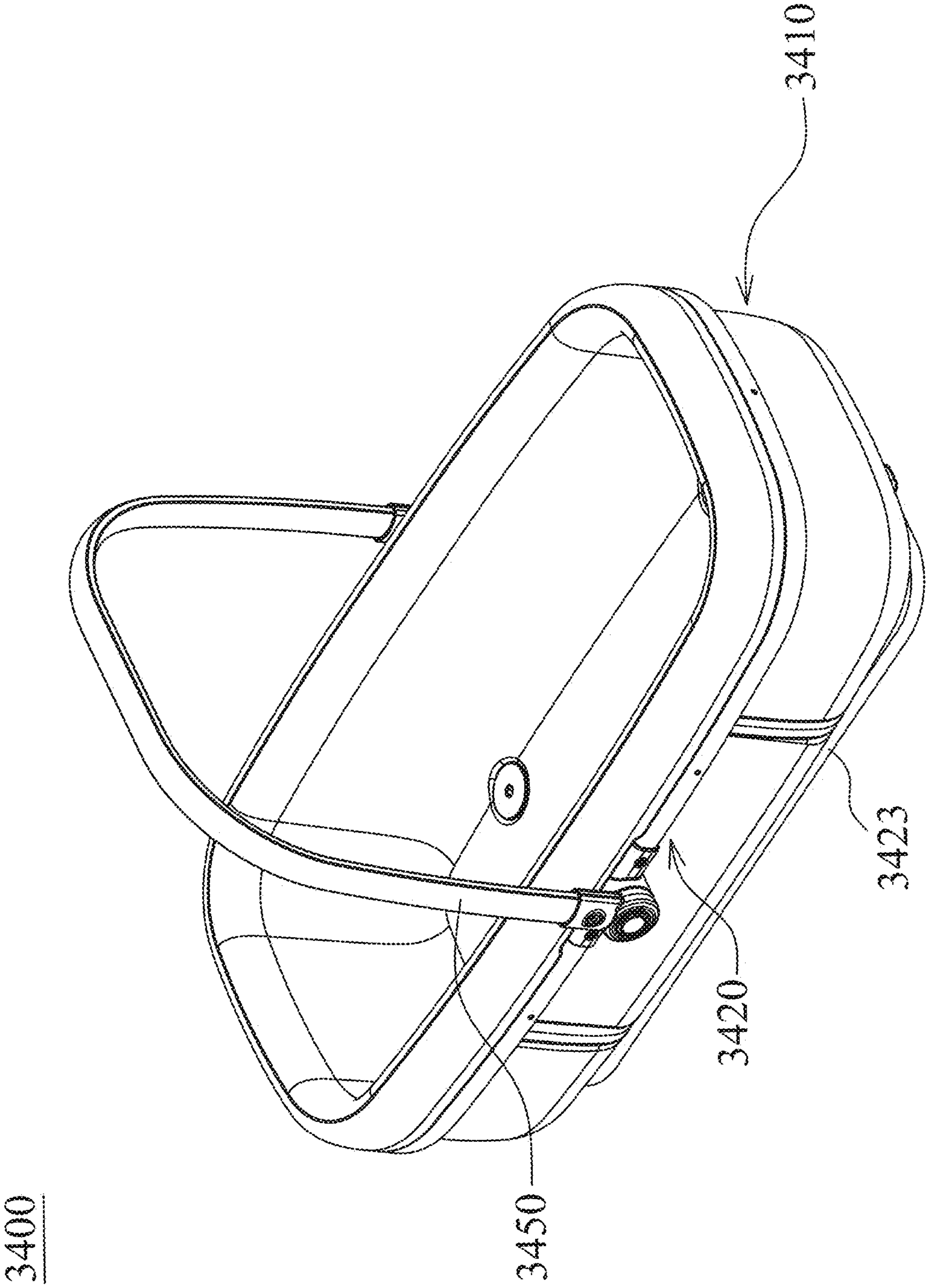
FIG. 35C is a partial structural view of the carrier according to the fourth embodiment of the third aspect of the present disclosure after a canopy and a cloth are removed.

For example, referring to FIGS. 35A to 35C, FIGS. 35A and 35B are schematic appearance views of the carrier 3400 according to a fourth embodiment of the third aspect of the present disclosure in different states, and FIG. 35C is a partial structural view of the carrier 3400 of the fourth embodiment of the third aspect of the present disclosure after a canopy 3460 and a cloth 3480 are removed. As shown in FIGS. 35A to 35C, it is different from the third embodiment that, the carrier 3400 includes a canopy 3460, a canopy connecting assembly 3470 and a cloth 3480 that at least partially covers the main body 3410 and the bracket device 3420. The grip 3450 is exposed to the cloth 3480 so as to facilitate to be held by the user, while the third bracket 3423 is also exposed to the cloth 3480 to facilitate the cooperation with the base. The canopy connecting assembly 3470 is disposed between the canopy 3460 and the cloth 3480 for detachably connecting the canopy 3460 and the cloth 3480 with each other. The canopy 3460 includes a first cover 3461, a second cover 3462 and a cover connecting assembly 3463. The cover connecting assembly 3463 is disposed between the first cover 3461 and the second cover 3462 for detachably connecting the first cover 3461 and the second cover 3462 with each other. Specifically, the canopy connecting assembly 3470 and the cover connecting assembly 3463 may be zipper assemblies. It should be understood that, in another embodiment, the canopy connecting assembly may be disposed between the canopy and the main body, the canopy connecting assembly may include a male buckle and a female buckle or two hook-and-loop fasteners (which may also referred to as "Velcro" or "Velcro tape") respectively disposed on the canopy and the main body, and the cover connecting assembly may include a male buckle and a female buckle or two hook-and-loop fasteners respectively disposed on the first cover and the second cover. Other structures of this embodiment are similar to those of the third embodiment, and also have similar diverse changes as those of the second embodiment, which will not be repeated herein for the sake of brevity.

Figure 36A:
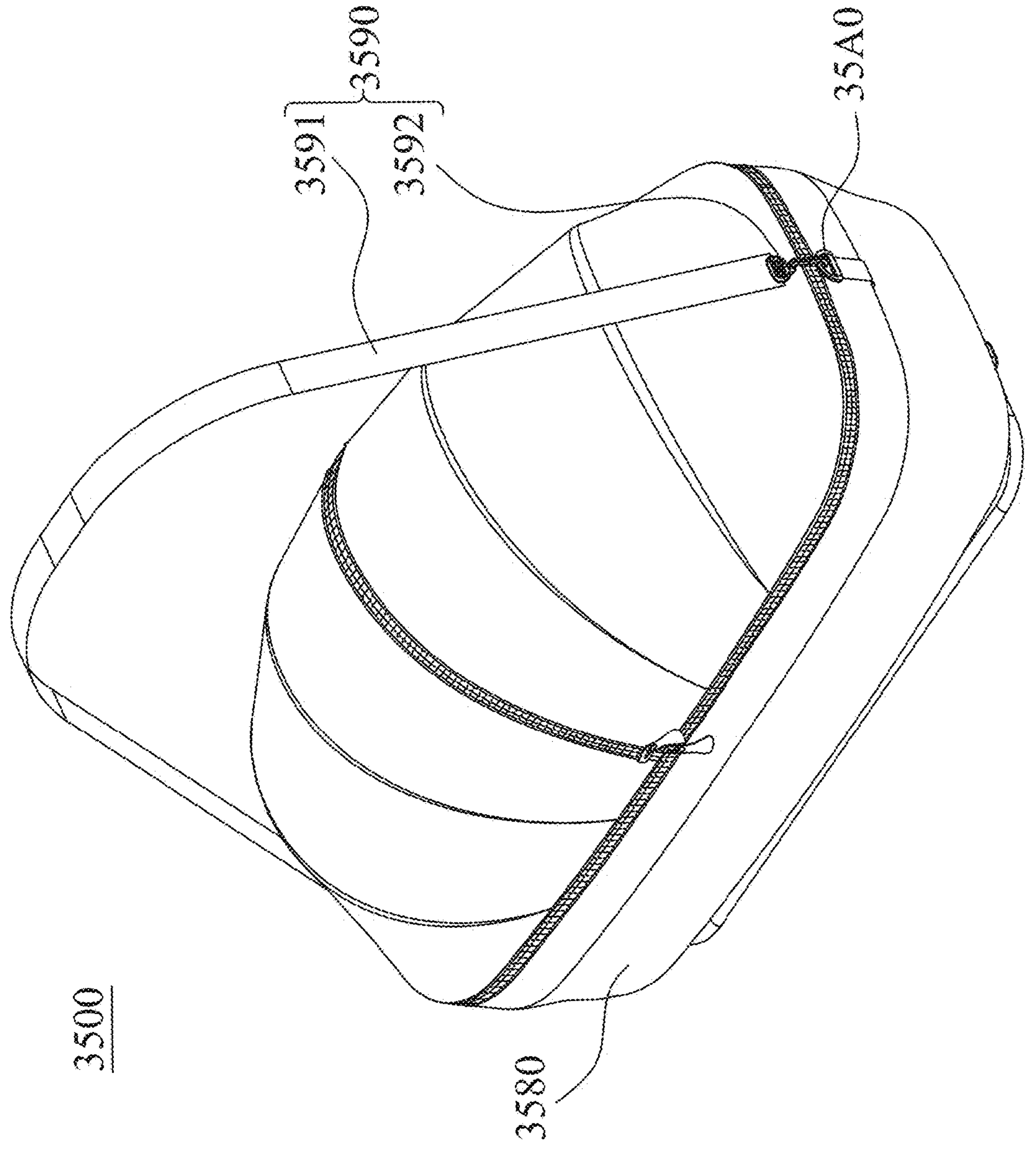
FIG. 36A is a schematic appearance view of a carrier according to a fifth embodiment of the third aspect of the present disclosure.
Figure 36B:
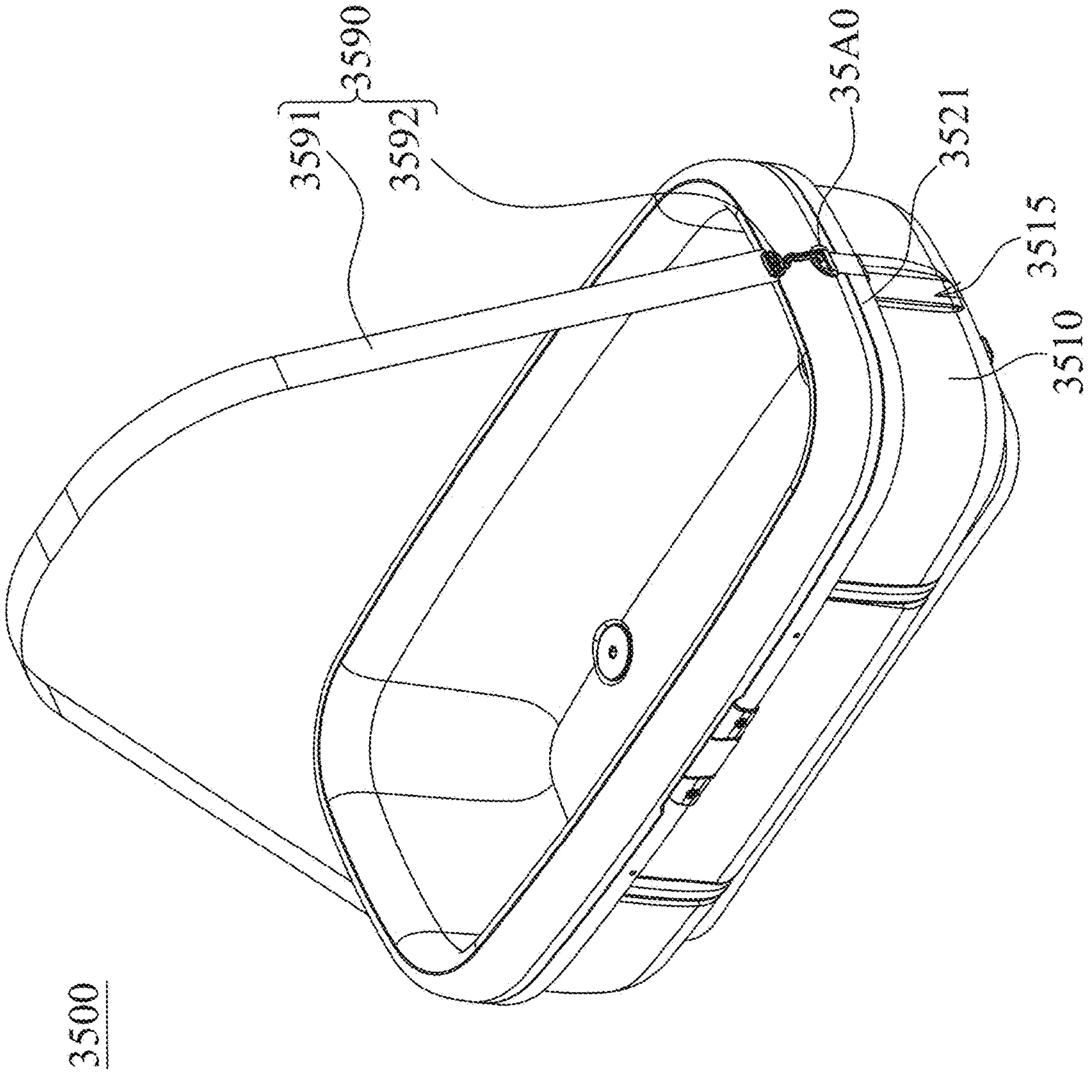
FIG. 36B is a partial structural schematic view of the carrier according to the fifth embodiment of the third aspect of the present disclosure after a canopy and a cloth are removed.

Further referring to FIGS. 36A and 36B, FIG. 36A is a schematic appearance view of a carrier 3500 according to the fifth embodiment of the third aspect of the present disclosure, and FIG. 36B is a partial structural schematic view of the carrier 3500 according to the fifth embodiment of the third aspect of the present disclosure after a canopy and a cloth are removed. As shown in FIGS. 36A and 36B, it is different from the fourth embodiment that, the carrier 3500 includes a strap 3590 for the user to wear and two first strap connecting elements 35A0, but does not include a grip. The two first strap connecting elements 35A0 are disposed on the first bracket 3521. The strap 3590 includes a strap body 3591 and two second strap connecting elements 3592 disposed on the strap body 3591 for detachably connecting the first strap connecting elements 35A0 respectively. Specifically, the two first strap connecting elements 35A0 may be two engaging rings which are disposed at two opposite short sides of the first bracket 3521 and exposed from the cloth 3580 respectively, and the two second strap connecting elements 3592 may be two engaging hooks which are disposed at two ends of the strap body 3591 respectively. In addition, in this embodiment, an outer side of a short side of a peripheral wall of the main body 3510 may be formed with a first positioning slot 3515 for accommodating and positioning the first strap connecting element 35A0 to prevent the first strap connecting element 35A0 from moving arbitrarily. In another embodiment, the short side of the first bracket may also be provided with a positioning protrusion for positioning the first strap connecting element and preventing the first strap connecting element from moving excessively. It should be understood that, in another embodiment, the first strap connecting element and the second strap connecting element may be omitted, and the strap may be connected to the first bracket in a winding manner. Other structures of this embodiment are similar to those of the fourth embodiment, and also have similar diverse changes as those of the second embodiment, which will not be repeated herein for the sake of brevity.

Figure 37A:
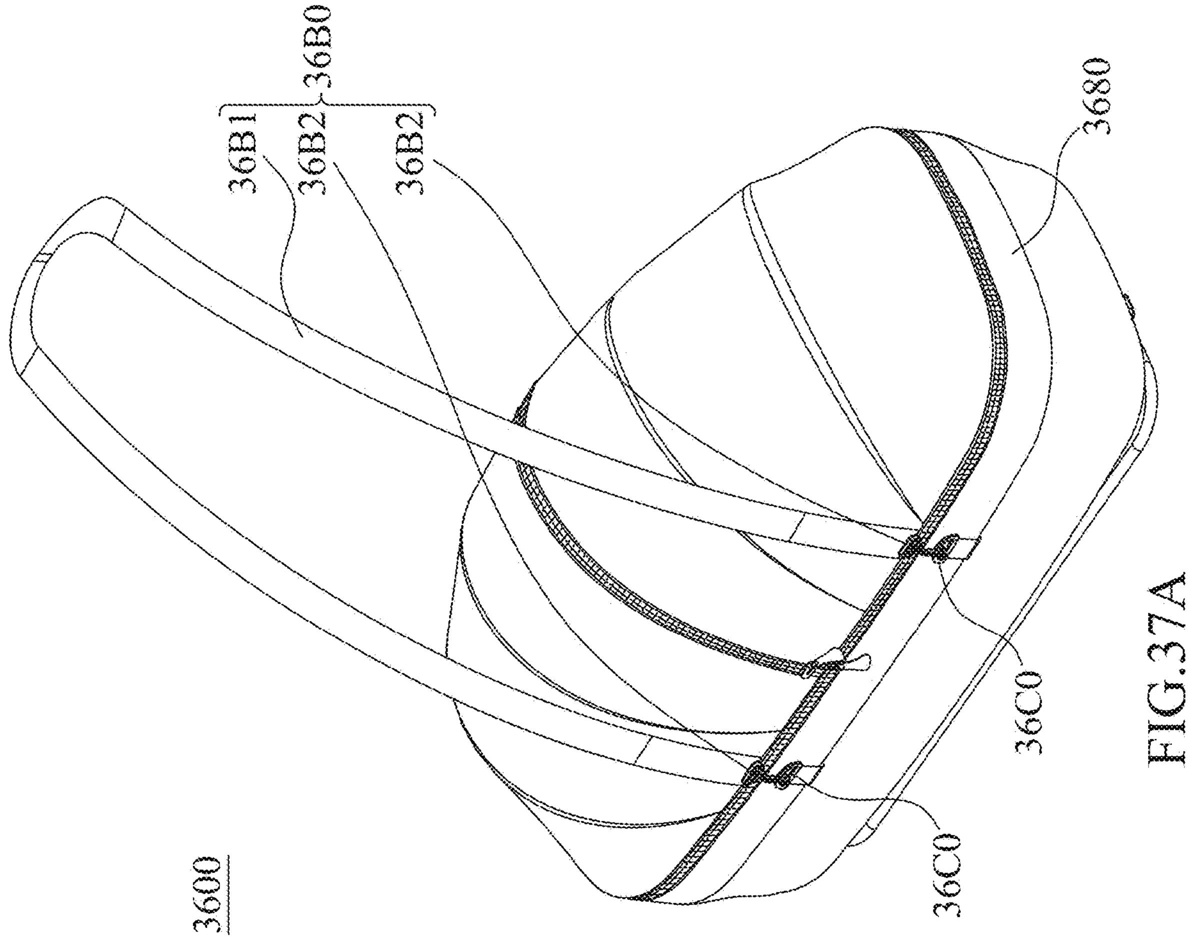
FIG. 37A is a schematic appearance view of a carrier according to a sixth embodiment of the third aspect of the present disclosure.
Figure 37B:
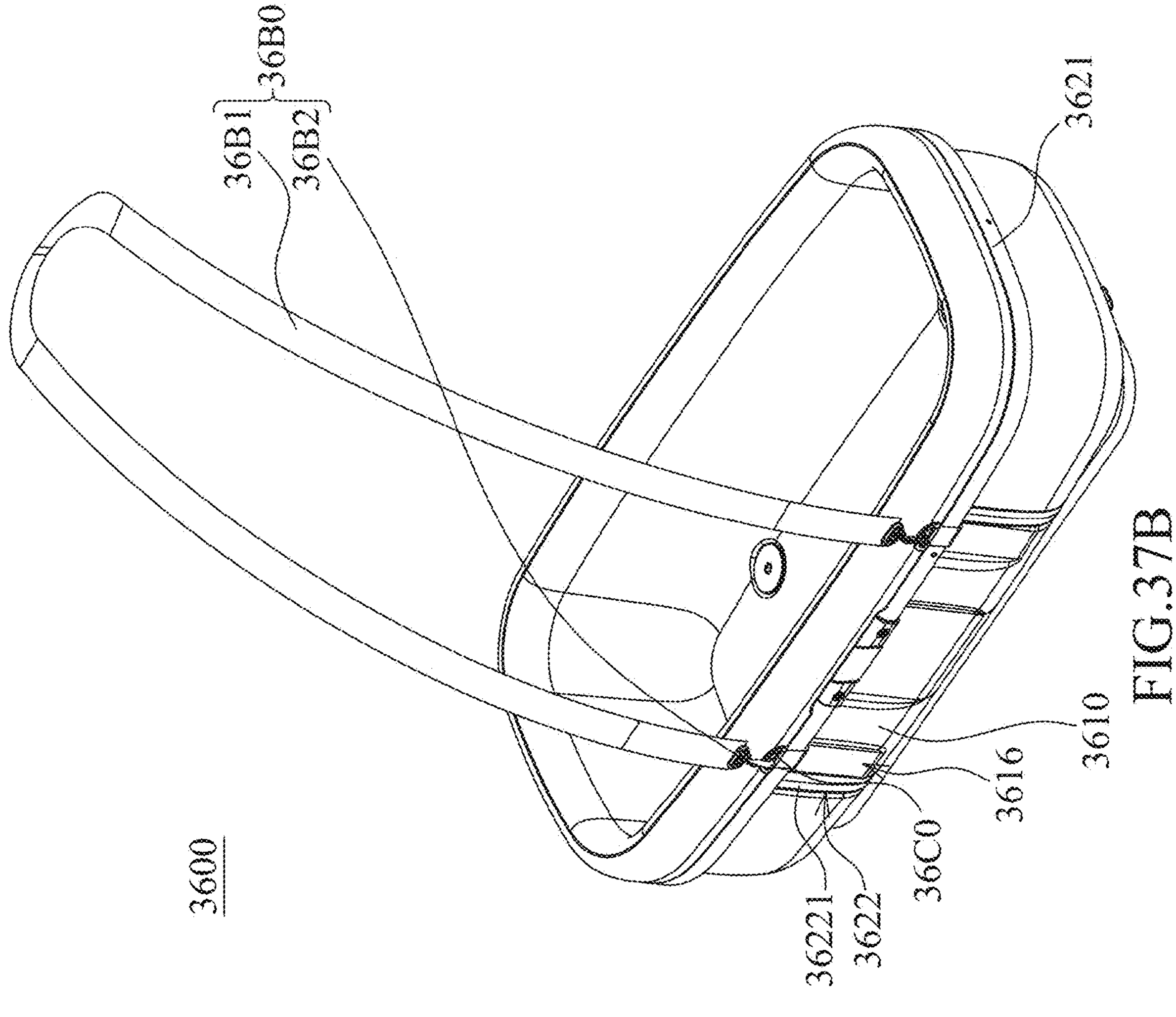
FIG. 37B is a partial structural schematic view of the carrier according to the sixth embodiment of the third aspect of the present disclosure after a canopy and a cloth are removed.

Further referring to FIGS. 37A and 37B, FIG. 37A is schematic appearance view of a carrier 3600 according to a sixth embodiment of the third aspect of the present disclosure, and FIG. 37B is a partial structural schematic view of the carrier 3600 according to the sixth embodiment of the third aspect of the present disclosure after a canopy and a cloth are removed. As shown in FIGS. 37A and 37B, it is different from the fifth embodiment that, the carrier 3600 includes a fixing rope 36B0 for cooperating with a vehicle seat and two first fixing rope connectors 36C0, but does not include a strap. The two first fixing rope connectors 36C0 are disposed on the first bracket 3621. The fixing rope 36B0 includes a rope body 36B1 and two second fixing rope connectors 36B2 disposed on the rope body 36B1. The cooperation between the fixing rope 36B0 and the vehicle seat is realized by winding the rope body 36B1 around a headrest supporting rod of the vehicle seat, and the two second fixing rope connectors 36B2 are used for detachably connecting the two first fixing rope connectors 36C0 respectively. Specifically, the two first fixing rope connectors 36C0 may be two engaging rings which are respectively disposed at a long side of the first bracket 3621 and exposed from the cloth 3680, and the two second fixing rope connectors 36B2 may be two engaging hooks respectively disposed at both ends of the rope body 36B1. Further, the two first fixing rope connectors 36C0 may be located adjacent to one ends of the vertical parts 36221 of the two second brackets 3622, respectively. Compared with other arrangement positions on the first bracket 3621, the first bracket 3621 may not be deformed when bearing the tensile force of the rope body 36B1, so that the carrier 3600 has higher impact resistance. In addition, in this embodiment, an outer side of a long side of a peripheral wall of the main body 3610 is formed with a second positioning slot 3616 for accommodating and positioning the first fixing rope connector 36C0, so as to prevent the first fixing rope connector 36C0 from moving excessively. In another embodiment, a long side of the first bracket may also be provided with a positioning protrusion for positioning the first fixing rope connector and preventing the first fixing rope connector from moving excessively. It should be understood that, in another embodiment, the first fixing rope connector and the second fixing rope connector may be omitted, and the fixing rope may be connected to the first bracket in a winding way. In another embodiment, the carrier 3600 may also include a first positioning slot and two first strap connecting elements to cooperate with the strap, thus having various application modes. Other structures of this embodiment are similar to those of the fifth embodiment, and also have similar diverse changes as those of the second embodiment, which will not be repeated herein for the sake of brevity.

Figure 38A:
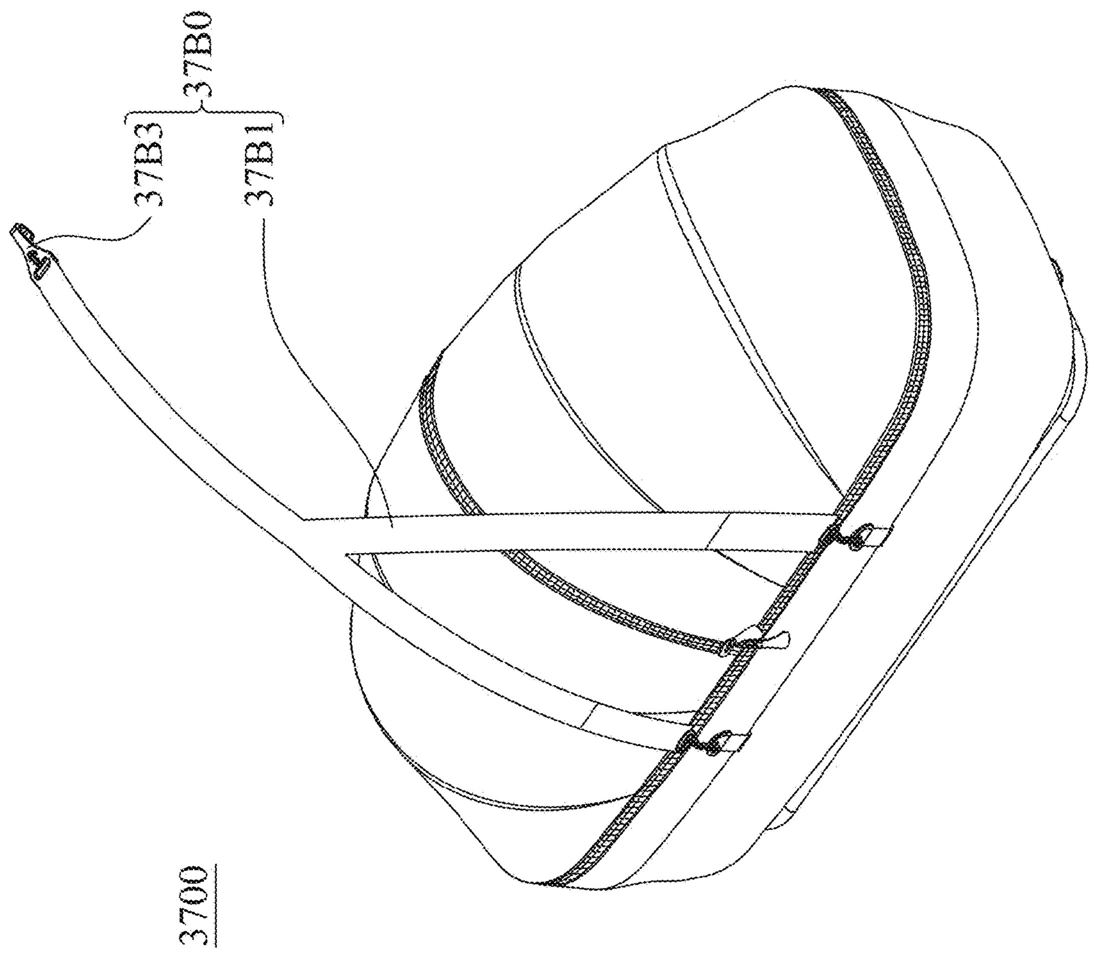
FIG. 38A is a schematic appearance view of a carrier according to a seventh embodiment of the third aspect of the present disclosure.

Further referring to FIG. 38A, FIG. 38A is a schematic appearance view of a carrier 3700 according to a seventh embodiment of the third aspect of the present disclosure. As shown in FIG. 38A, it is different from the sixth embodiment that, the rope body 37B1 of the fixing rope 37B0 is Y-shaped, and the cooperation between the fixing rope 37B0 and the vehicle seat is realized by fastening the engaging hook 37B3 disposed at an end of the rope body 37B1 away from the first bracket onto a headrest supporting rod or a backrest engaging rod of the vehicle seat.

Compared with the prior art, in the present disclosure, the first bracket is combined to the main body and disposed around the peripheral wall of the main body, and the second bracket is combined to the main body and extends from one side of the peripheral wall of the main body to the other side of the peripheral wall of the main body through the bottom portion of the main body. With the above arrangement, the carrier of the present disclosure has not only light weight, but also high structural strength, and can give consideration to carrying convenience and riding safety.

It should be noted that, the main body of any of the above-mentioned embodiments according to the third aspect of the present disclosure may also be mounted on the wheeled carrying apparatus described in any of the first and second aspects of the present disclosure, for example, through the third bracket of the respective bracket device, and the specific mounting method may refer to the first aspect and will not be described herein.

In addition to the carriers 3100 to 3700 described in the third aspect of the present disclosure, a fourth aspect of the present disclosure also provides other embodiments of carriers, for example, a detachable canopy assembly and a carrier including the same may be provided. For convenience of description, the carriers in the fourth aspect of the present disclosure are denoted by "4100" to "4800", respectively.

Figure 39:
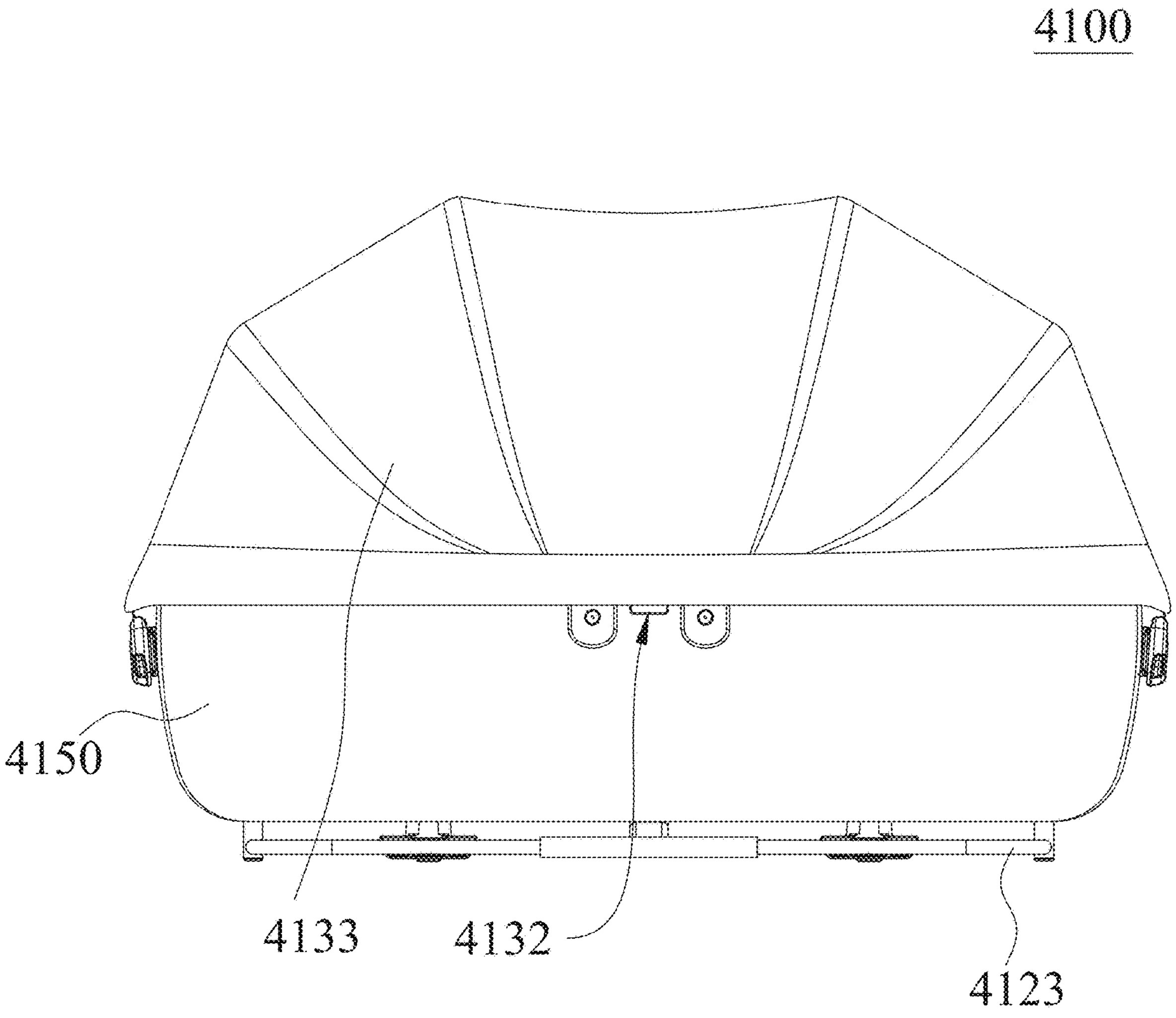
FIG. 39 shows a schematic front view of a carrier according to an embodiment of the fourth aspect of the present disclosure.
Figure 40:
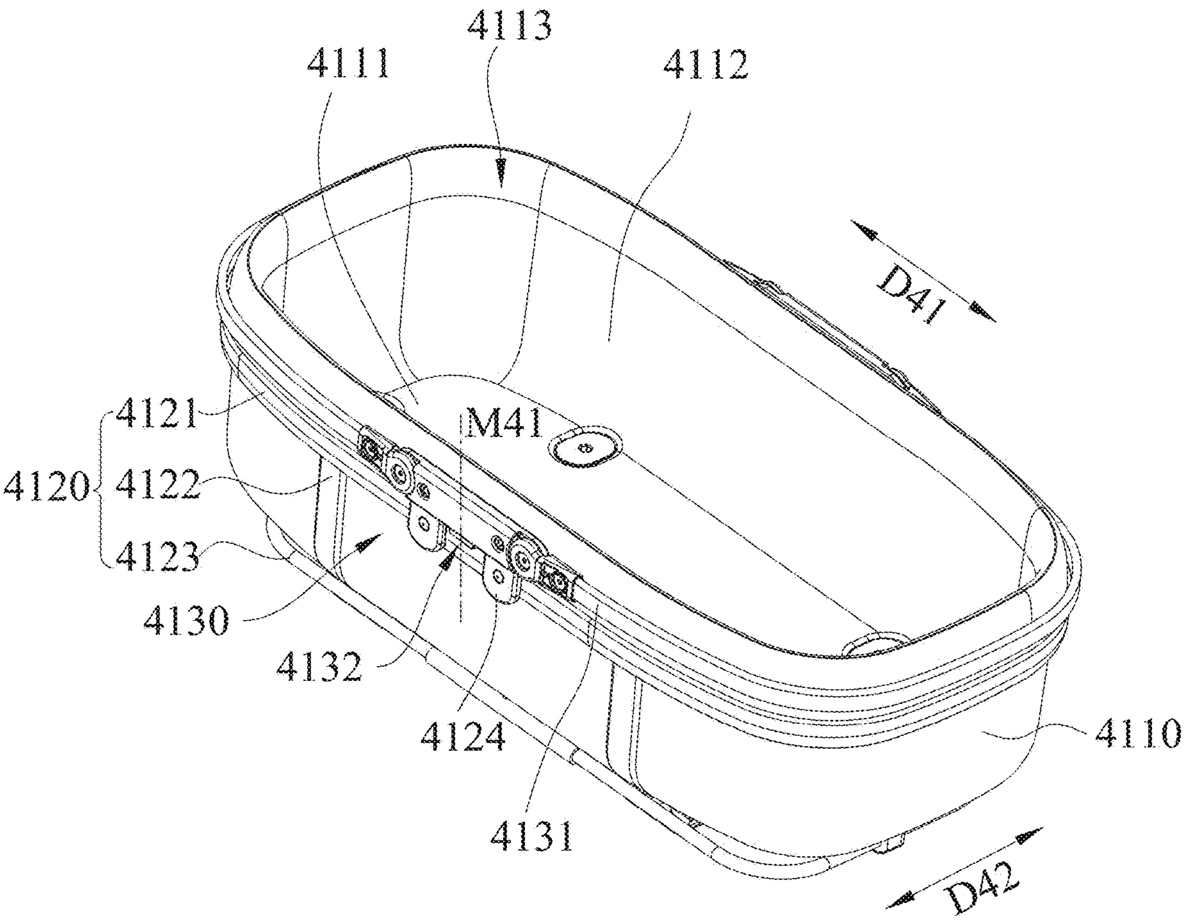
FIG. 40 shows a structural schematic view of the carrier shown in FIG. 39 after a canopy and a cloth are removed.

Referring to FIGS. 39 and 40, FIGS. 39 and 40 respectively show a carrier 4100 according to an embodiment of the fourth aspect of the present disclosure in different states. FIG. 39 shows a schematic front view of the carrier 4100, and FIG. 40 shows a structural schematic view of the carrier 4100 shown in FIG. 39 after a canopy and a cloth are removed.

Referring to FIGS. 39 and 40, the carrier 4100 may include a main body 4110, a bracket device 4120 and a canopy assembly 4130. The canopy assembly includes a canopy frame 4131, a canopy locking device 4132 and a canopy 4133, which will be described in detail below. It should be noted that, a cloth 4150 is at least partially sleeved around the carrier 4100 shown in FIG. 39, and the cloth 4150 at least partially covers the main body 4110, the bracket device 4120 and the canopy assembly 4130. For convenience of explanation, FIG. 40 is a perspective structural schematic view of the carrier 4100 after a canopy 4133 and the cloth 4150 shown in FIG. 39 are removed.

As shown in FIG. 40, the main body 4110 (which may also be referred to as "carrying portion") includes a bottom portion 4111 and a peripheral wall 4112 connected around the bottom portion 4111, and the bottom portion 4111 and the peripheral wall 4112 form an accommodation space 4113 (i.e., a carrying space). The accommodation space 4113 has an opening that is opened upward for children or pets to ride in the accommodation space.

In an example, the bracket device 4120 is at least partially disposed around the main body 4110, for example, sleeved outside the main body 4110 from below the main body 4110, for supporting the main body 4110. The bracket device 4120 includes a first bracket 4121, a second bracket 4122 and a third bracket 4123. The first bracket 4121 is disposed substantially horizontally, surrounding the peripheral wall 4112 of the main body 4110 and being close to the opening of the main body 4110. Two ends of the second bracket 4122 are respectively connected to the first bracket 4121, and extend from one side of the peripheral wall 4112 of the main body 4110 to the other side of the peripheral wall 4112 of the main body 4110 along a transverse direction D42 of the main body 4110 via the bottom portion 4111 of the main body 4110. Further, in an example, two or more second brackets 4122 may be provided, and these second brackets 4122 are respectively connected to the first bracket 4121 and disposed in parallel with each other at intervals along a longitudinal direction D41. The third bracket 4123 is disposed substantially horizontally and connected with the second bracket 4122, and is located at a bottom side of the bottom portion 4111 of the main body 4110 with a certain distance therebetween. As can be seen from FIG. 39, when the cloth 4150 is covered on the carrier 4100, the third bracket 4123 of the bracket device 4120 is exposed outside. By providing the bracket device 4120, the carrier 4100 may be supported and fixed on a trolley or a vehicle seat, for example.

Referring to FIGS. 39 and 40, the canopy 4133 is covered on the opening of the main body 4110 to shield the accommodation space 4113 of the main body 4110. The canopy frame 4131 is fixed at the periphery of the canopy 4133 for supporting the canopy 4133 above the main body 4110, and is detachably disposed at the periphery of the opening of the main body 4110. In an example, the canopy frame 4131 is disposed around the opening of the main body 4110 (as shown in FIG. 40) and the canopy 4133 is unfolded, and the unfolded canopy 4133 covers the canopy frame 4131 so as to be invisible from the outside (as shown in FIG. 39). The canopy locking device 4132 is disposed on the canopy frame 4131 to detachably cooperate with the canopy locking part 4124 correspondingly disposed on the carrier 4100, so that the canopy assembly 4130 may be locked above the main body 4110. Specifically, when the canopy assembly 4130 is mounted around the main body 4110, the canopy locking device 4132 may cooperate with the corresponding canopy locking part 4124 on the first bracket 4131 of the bracket device 4130, so that the canopy frame 4131 of the canopy assembly 4130 may be detachably connected to the bracket device 4120 of the carrier 4100 (i.e., detachably mounted above the main body 4110). In an example, two canopy locking devices 4132 (only one canopy locking device is shown) may be disposed symmetrically on the canopy frame 4131 at both sides of the main body 4110 in the transverse direction D42. In an embodiment, the canopy locking device 4132 may be centrally disposed on the canopy frame 4131 at a side thereof along the longitudinal direction D41, that is, a centerline of the canopy locking device 4132 coincides with a centerline M41 of an edge of the canopy frame 4131 at a side thereof. It can be understood that, the canopy frame and the canopy locking device may also be uniformly referred to as a "canopy connecting assembly".

Figure 41:
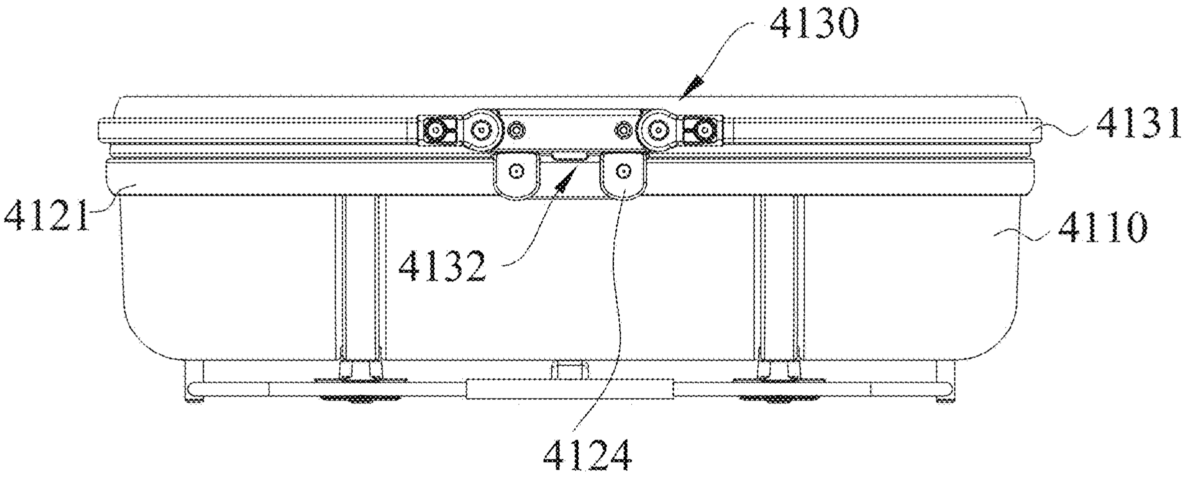
FIG. 41 shows a structural schematic view of the carrier shown in FIG. 40 from another view.
Figure 42:
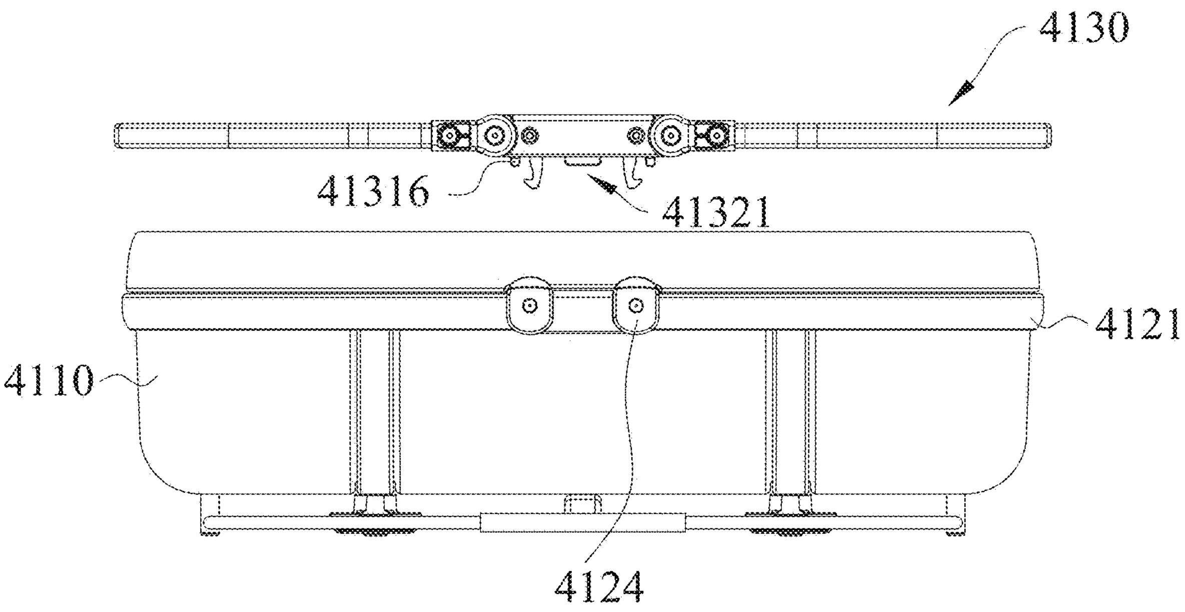
FIG. 42 shows a structural schematic view of the carrier shown in FIG. 41 in another state, in which a canopy assembly is separated from a main body.
Figure 43:
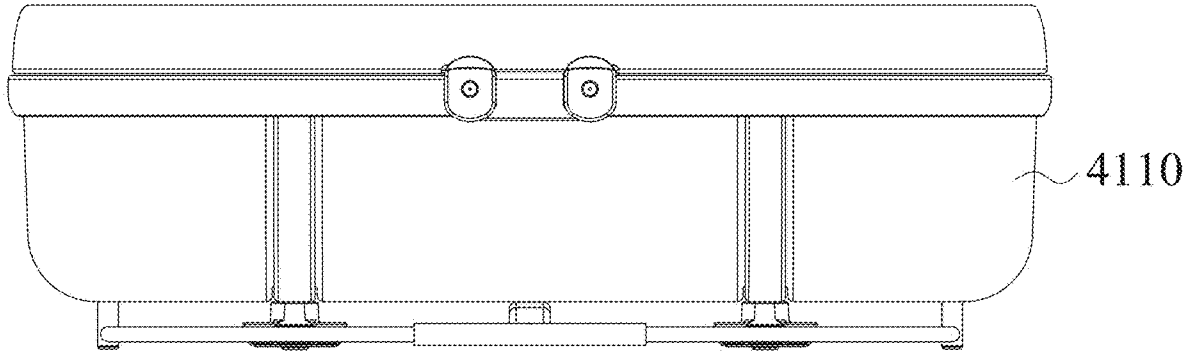
FIG. 43 shows a structural schematic view of the carrier shown in FIG. 41 with the canopy assembly removed.

Referring to FIGS. 41 to 43, a process of disassembling the canopy assembly 4130 from the main body 4110 according to an embodiment of the fourth aspect of the present disclosure is schematically shown. The canopy and the cloth are omitted from FIGS. 41 to 43 to make the structure clearer. Specifically, FIG. 41 shows the carrier shown in FIG. 40 from another view, in which the canopy assembly 4130 is mounted to the main body 4110; FIG. 42 shows a state in which the canopy assembly 4130 is being removed from the main body 4110; and FIG. 43 shows a state in which the canopy assembly 4130 has been removed.

In an example, as shown in FIG. 41, when it is necessary to use the canopy, the canopy frame 4131 is connected to the first bracket 4121 through the cooperation of the canopy locking device 4132 of the canopy assembly 4130 and the canopy locking part 4124, and the canopy frame 4131 is substantially parallelly disposed above the first bracket 412. At this time, the canopy frame 4131 is sleeved outside the main body 4110, so that the canopy disposed on the canopy frame 4131 (not shown in FIG. 41, referring to FIG. 39) can cover the entire opening of the main body 4110. As shown in FIGS. 42 and 43, when the canopy is not needed, the canopy locking device 4132 may be separated from the canopy locking part 4124 disposed on the first bracket 4121, so that the canopy assembly 4130 (including the canopy provided thereon) may be separated from the main body 4110, while the canopy assembly 4130 may be stored by the user. The specific cooperating mode of the canopy locking device 4132 and the canopy locking part 4124 will be described below.

Figure 44:
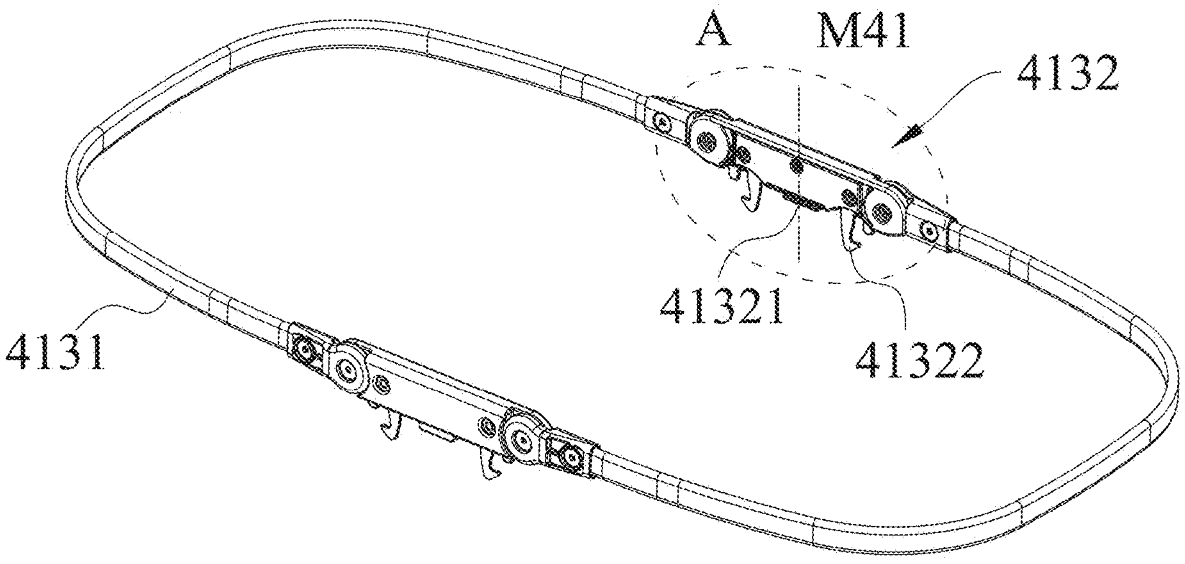
FIG. 44 shows a schematic structural view of a canopy frame and a canopy locking device provided thereon according to an embodiment of the fourth aspect of the present disclosure.

Referring to FIG. 44, the canopy frame 4131 and the canopy locking device 4132 provided thereon according to an embodiment of the fourth aspect of the present disclosure are shown.

In an example, the canopy locking device 4132 includes a releasing operation element 41321. The releasing operation element 41321 is disposed on the canopy frame 4131 and is capable of being operated to move from a locking position to an unlocking position, so as to unlock the canopy assembly 4130 with respect to the main body 4110. In addition, the canopy locking device 4132 also includes a locking element 41322. The locking element 41322 is mounted on the canopy frame 4131, and the releasing operation element 41321 is disposed on the canopy frame 4131 and operatively acts on the locking element 41322. As shown in FIG. 44, the locking element 41322 may be at least partially disposed in a housing of the canopy frame 4131, and the rest portion of the locking element 41322 extends downward out of the housing, so as to cooperate with the aforementioned canopy locking part. In addition, the releasing operation element 41321 may be at least partially disposed in the housing of the canopy frame 4131, and the rest portion thereof may extend downward out of the housing for the user to contact and operate, so as to unlock the locking element 41322.

The specific structure and operation principle of the canopy locking device 4132 will be further described in the following description of FIGS. 45 to 48. It should be noted that FIGS. 45 and 46 respectively show the canopy locking device 4132 in which the releasing operation element 41321 is in the locking position and the unlocking position, and FIGS. 47 and 48 respectively show locking and unlocking of the releasing operation element 41321 with respect to the canopy locking part 4124.

Figure 45:
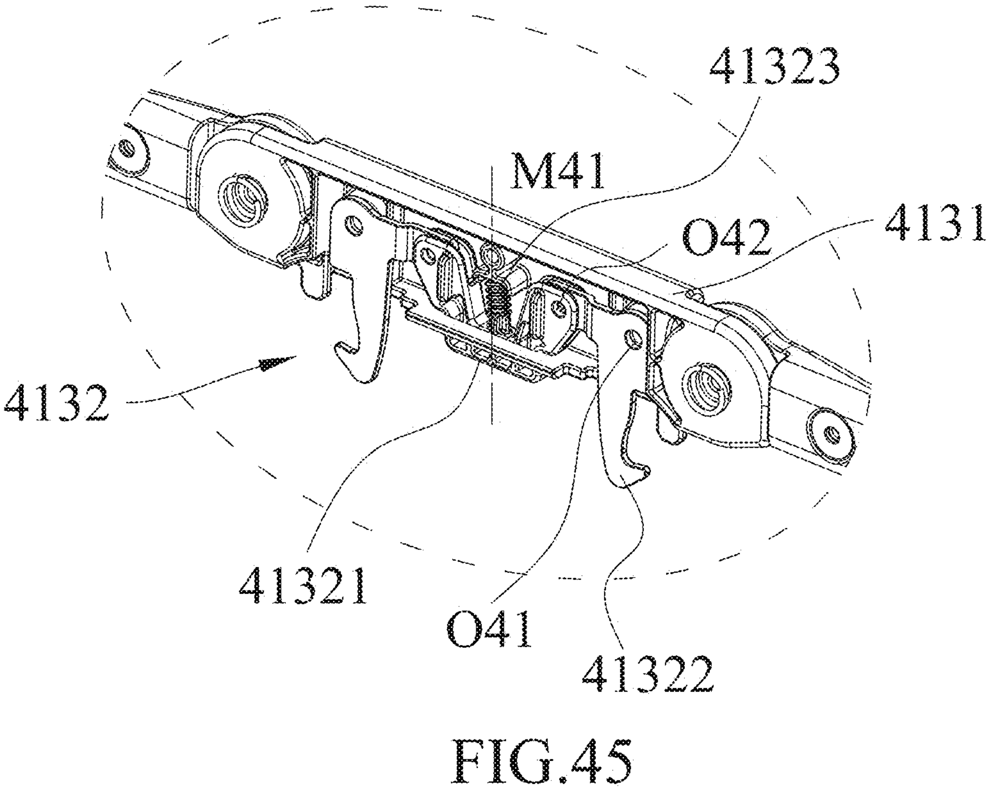
FIG. 45 shows a schematic structural view of the canopy locking device at a part A in FIG. 44.
Figure 46:
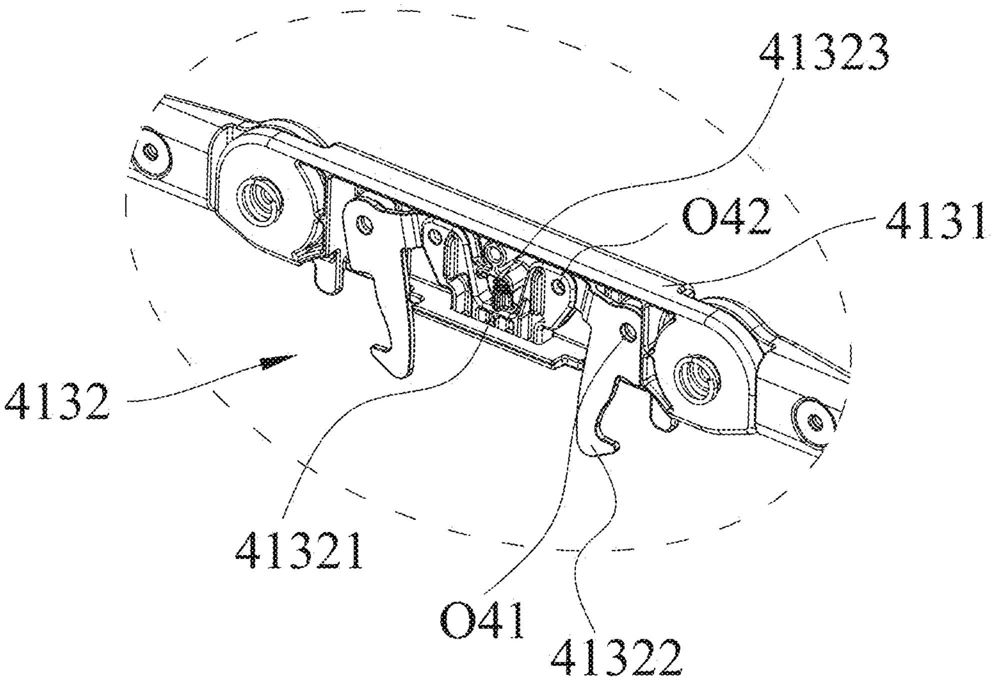
FIG. 46 shows a schematic structural view of the canopy locking device shown in FIG. 45 in another state.

Referring to FIGS. 45 and 46, FIG. 45 shows a structural schematic view of the canopy locking device 4132 at a part A in FIG. 44, in which a part of the housing at the part A shown in FIG. 44 is removed to show the specific structure of the canopy locking device 4132 in a locked state; and FIG. 46 shows the specific structure of the canopy locking device 4132 shown in FIG. 45 in an unlocked state.

As shown in FIGS. 45 and 46, in an example, the locking element 41322 is pivotably mounted to the canopy frame 4131, and the locking operation element 41321 is connected to the locking element 41322 and is movable between the locking position (FIG. 45) and the unlocking position (FIG. 46). In an embodiment, the locking element 41322 may be pivotally connected to the canopy frame 4131 around a pivot point O41 and pivotally connected to the releasing operation element 41321 around another pivot point O42 that is different from the pivot point O41. The releasing operation element 41321 may move between the locking position and the unlocking position with respect to the canopy frame 4131 in a vertical direction, and drives the locking element 41322 to be pivoted with respect to the canopy frame 41321 around the pivot point O41.

Further, two locking elements 41322 may be provided. The two locking elements 41322 are disposed in mirror symmetry in the canopy locking device 4132 and are respectively pivotally connected to both sides of the same releasing operation element 41321. For example, the two locking elements 41322 are respectively pivotally connected to the canopy frame 4131 at two pivot points O41 symmetrically provided along the centerline M41, and are respectively pivotally connected to the pivot points O42 with two ends of the releasing operation element 41321.

As shown in FIGS. 45 and 46, in an example, the canopy locking device 4132 may further include an elastic restoring element 41323. The elastic restoring element 41323 is connected between the releasing operation element 41321 and the canopy frame 4131, and constantly provides a force to enable the releasing operation element 41321 to be in or restored to the locking position. That is, as shown in FIG. 45, the elastic restoring element 41323 constantly exerts a vertical downward force on the releasing operation element 41321, so that the releasing operation element 41321 always tends to protrude from the housing of the canopy frame 4131.

Figure 47:
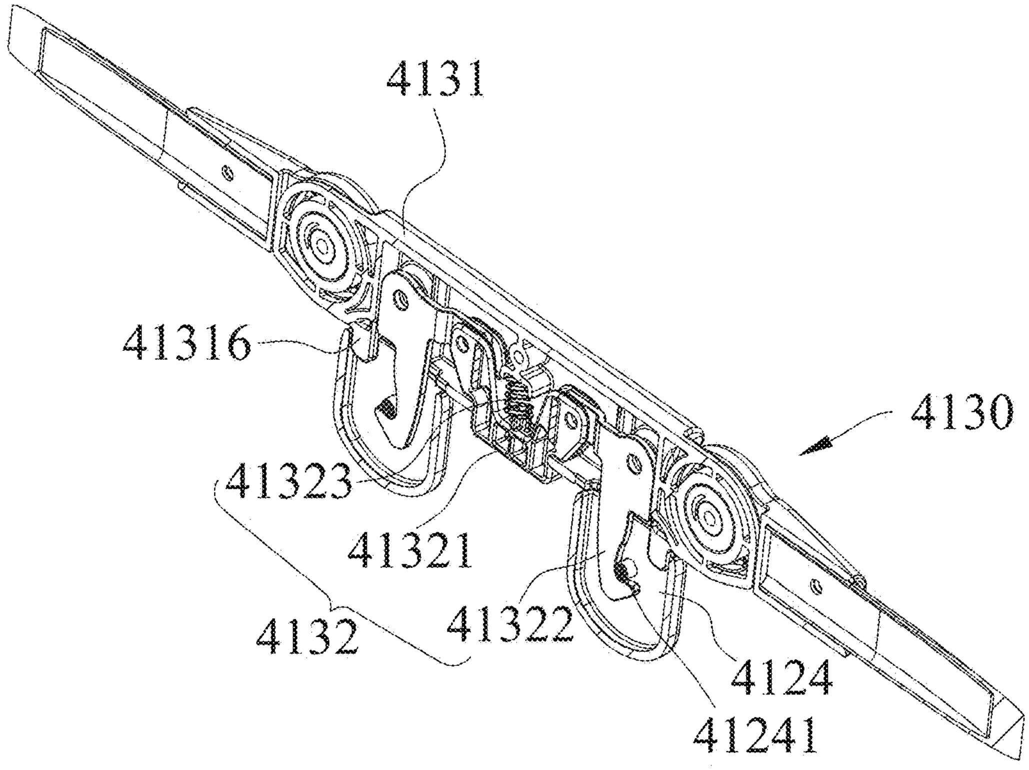
FIG. 47 shows a schematic structural view of the canopy locking device shown in FIG. 45 when it is cooperated with a canopy locking part.
Figure 48:
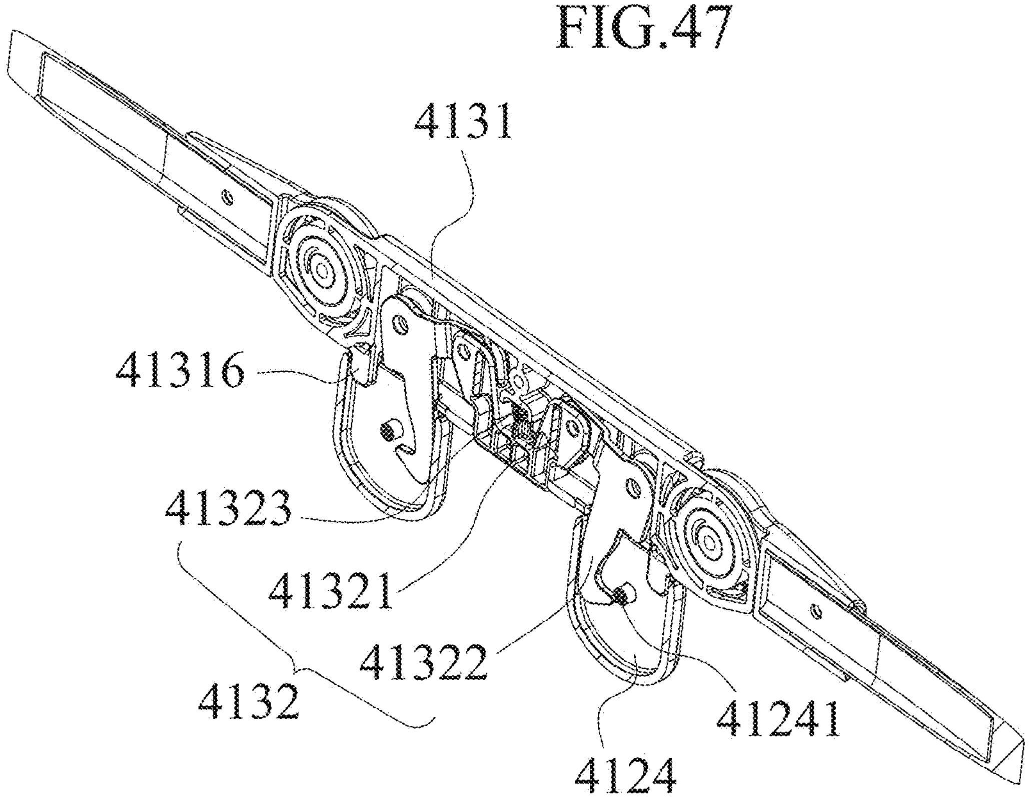
FIG. 48 shows a schematic structural view of the canopy locking device shown in FIG. 47 when it is unlocked with the canopy locking part.

Referring to FIGS. 47 and 48, FIG. 47 shows a schematic view of the canopy locking device 4132 that is locked with the canopy locking part 4124, and FIG. 48 shows a schematic view of the canopy locking device 4132 that is unlocked with the canopy locking part 4124.

Referring to FIGS. 47 and 48, the locking element 41322 is pivotably mounted to the canopy frame 4131, and is engaged with or disengaged from the canopy locking part 4124 by moving with respect to the canopy frame 4131, thereby locking or unlocking the canopy frame 4131 to a main body (not shown). Specifically, when the releasing operation element 41321 is in the locking position (see FIG. 47), the locking element 41322 is engaged with the canopy locking part 4124; and when the releasing operation element 41321 is operated to the unlocking position (see FIG. 48), the locking element 41322 is disengaged from the canopy locking part 4124.

In an example, as shown in FIGS. 47 and 48, the locking element 41322 has an engaging hook protruding towards the canopy locking part 4124, and the canopy locking part 4124 includes an engaging pin 41241 disposed corresponding to the engaging hook. When the releasing operation element 41321 is in the locking position, the engaging hook is engaged with the engaging pin 41241. When the releasing operation element 41321 is operated to push the locking element 41322 to be pivoted to be in the unlocking position, the engaging hook is disengaged from the engaging pin 41241. More specifically, further in combination with FIGS. 42, 47 and 48, when it is necessary to disassemble the canopy assembly 4130 from above the main body 4110, the user may operate (for example, press) the releasing operation element 41321, and the locking element 41322 pivoted with the releasing operation element 41321 is driven to be pivoted from the locking position to the unlocking position through the movement of the releasing operation element 41321 in the vertical direction, so that the engaging hook of the locking element 41322 is disengaged from the engaging pin 41241 of the canopy locking part 4124 provided on the first bracket 4121, so as to realize the unlocking and enable the canopy assembly 4130 to be removed.

In addition, as shown in FIG. 47, the canopy frame 4131 is also provided with a locking guide 41316. The locking guide 41316 is disposed on a side of the locking element 41322, and may guide the positioning of the canopy locking device 4132 with respect to the canopy locking part 4124 to assist the locking of the locking element 41322 and the canopy locking part 4124. For example, when the canopy assembly 4130 is mounted to the first bracket 4121 (not shown in FIG. 47, see FIG. 42) provided with the canopy locking part 4124, the locking guide 41316 may be disposed to abut against an inner edge of the canopy locking part 4124, so as to guide the canopy locking device 4132 and enable the canopy locking device 4132 to be disposed corresponding to the canopy locking part 4124, thereby locking and releasing the engaging hook of the locking part 41322 with the engaging pin 41241 of the corresponding canopy locking part 4124.

Figure 49:
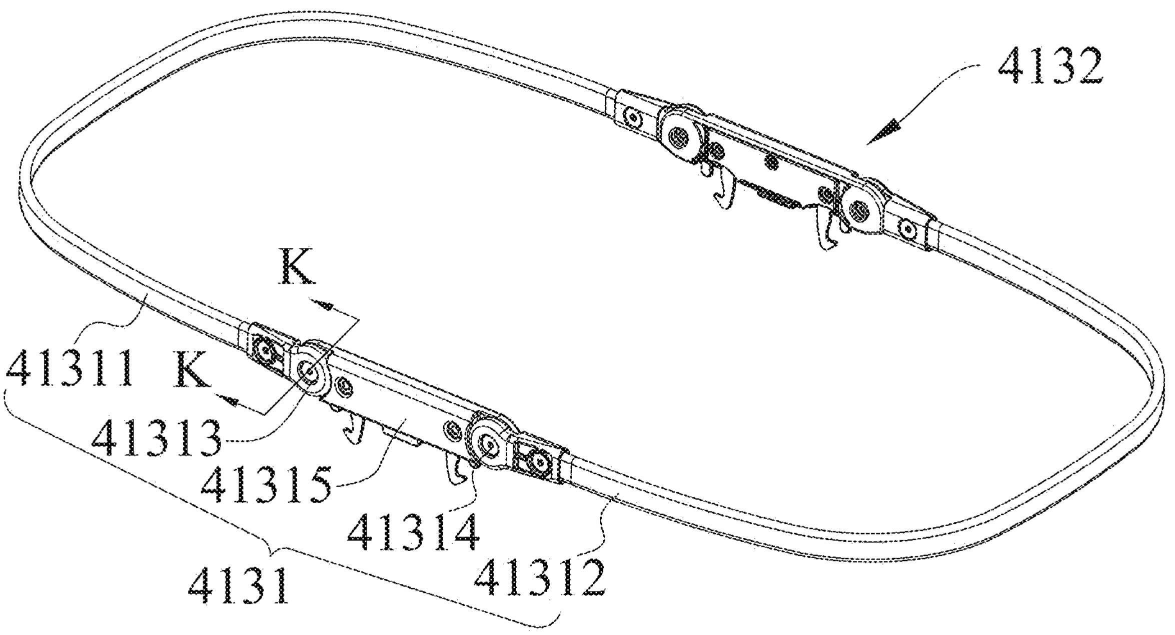
FIG. 49 shows a structural schematic view of the canopy frame according to an embodiment of the fourth aspect of the present disclosure in an unfolded state.
Figure 50:
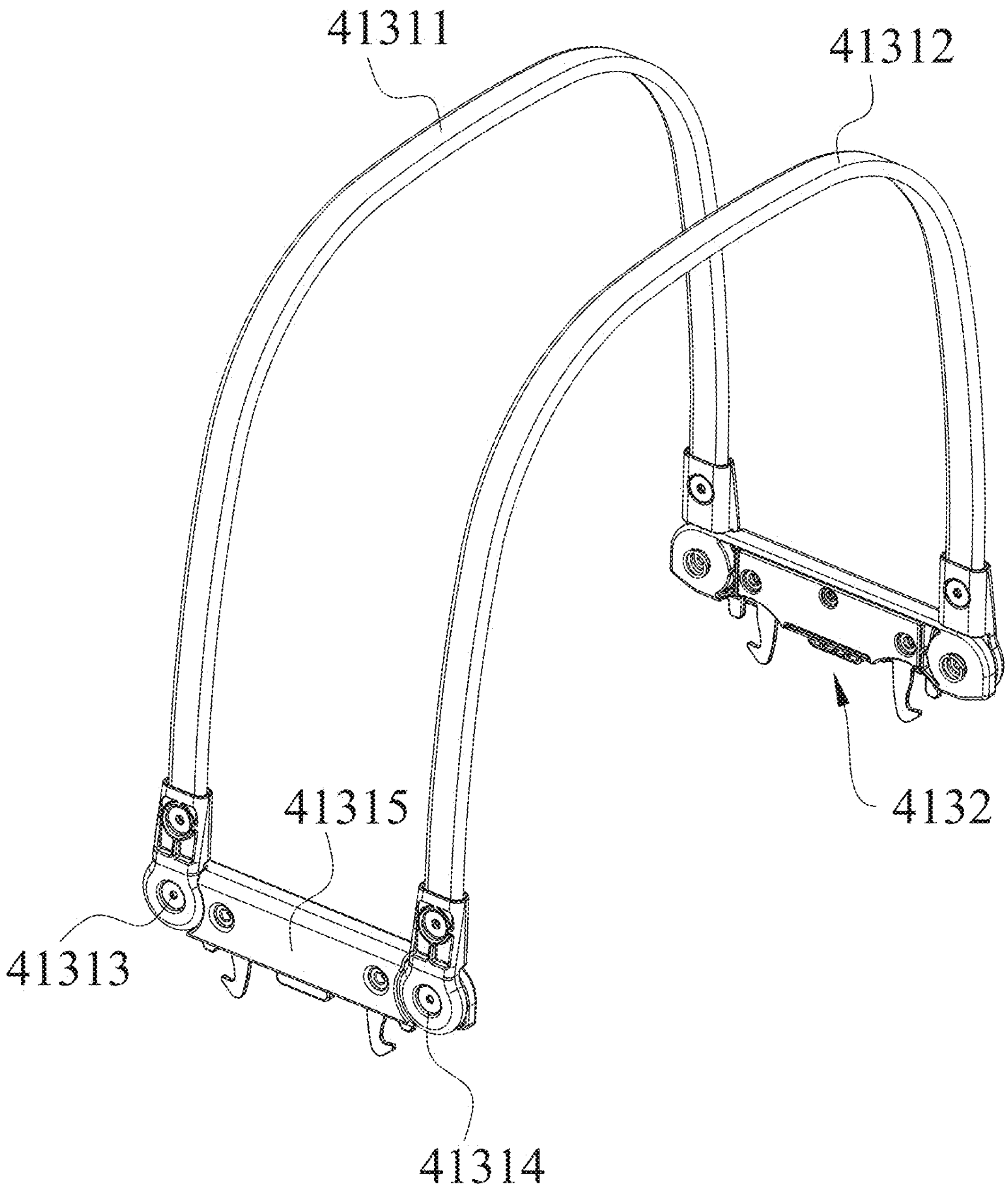
FIG. 50 is a schematic structural view of the canopy frame shown in FIG. 49 in a folded state.

Referring to FIGS. 49 and 50, different states of the canopy frame 4131 according to an embodiment of the fourth aspect of the present disclosure are shown. FIG. 49 shows the canopy frame 4131 in the unfolded state, and FIG. 50 shows the canopy frame 4131 in the folded state.

In an example, the canopy frame 4131 has a triple-section folding structure. As shown in FIGS. 49 and 50, the canopy frame 4131 may include a first pivoting section 41311, a second pivoting section 41312 and two locking sections 41315. Two ends of the first pivoting section 41311 are respectively pivotably connected to one ends of two locking sections 41315 through a first pivoting part 41313, and two ends of the second pivoting section 41312 are respectively pivotally connected to the other ends of the two locking sections 41315 through a second pivoting part 41314. Each of the two locking sections 41315 is provided with a canopy locking device 4132. In an example, a size of the locking section 41315 provided with the canopy locking device 4132 according to the present disclosure may be between 160 mm and 180 mm, optionally 173 mm.

Figure 51A:
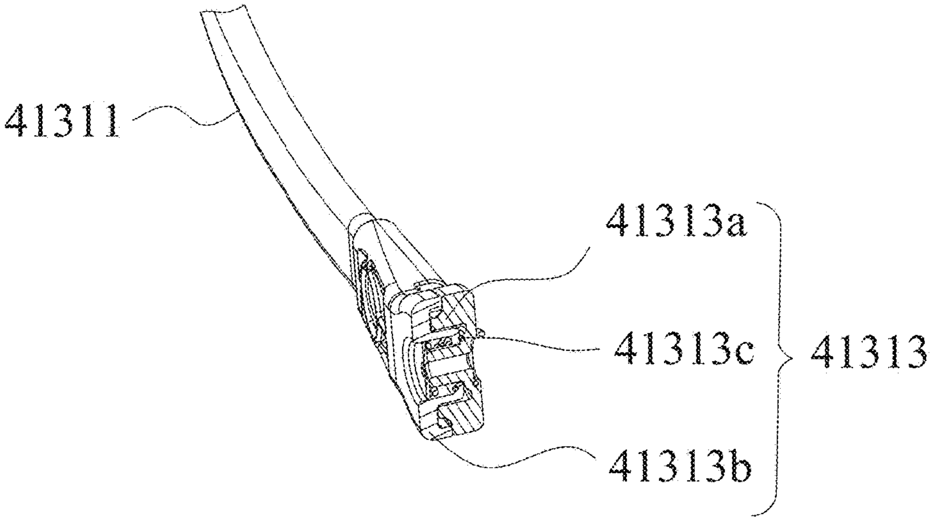
FIGS. 51A to 51C are schematic structural views of a first pivoting part of the canopy frame.
Figure 51B:
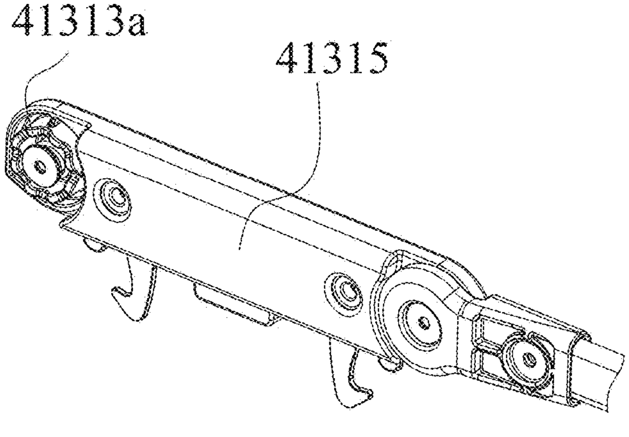
Figure 51C:
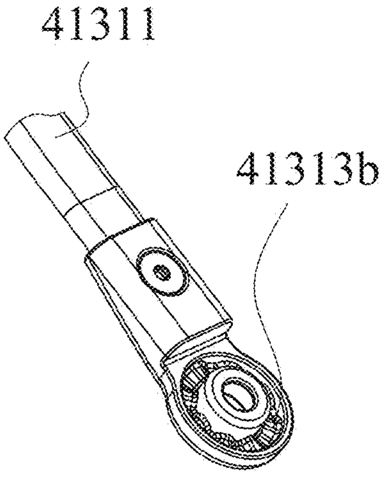

Referring to FIGS. 51A to 51C, FIG. 51A shows a cross-sectional perspective view of the first pivoting part 41313 taken along a line K-K shown in FIG. 49, FIG. 51B shows a structure of the first pivoting part 41313 at a side of the locking section 41315, and FIG. 51C shows a structure of the first pivoting part 41313 at a side the first pivoting section 41311.

As shown in FIGS. 51A to 51C, the first pivoting part 41313 is provided with a section position adjusting structure, such as gear teeth, so that the first pivoting section 41311 may be kept at different angles with respect to the locking section 41315. Specifically, the first pivoting part 41313 is formed by the mutual pivotal connection of the first pivoting section 41311 and the locking section 41315. As shown in FIG. 51B, an end of the locking section 41315 is provided with first gear teeth 41313*a*, and as shown in FIG. 51C, an end of the first pivoting section 41311 is provided with second gear teeth 41313*b*. Similarly, the second pivoting part 41314 may also be provided with the same structure as the first pivoting part 41313, that is, provided with gear teeth, so that the second pivoting section 41312 may be kept at different angles with respect to the locking section 41315. The present disclosure is not limited thereto, and the canopy frame 4131 may also be provided with other section position adjusting structures, so that the pivoting section of the canopy frame 4131 is at different angles with respect to the opening of the main body.

Further, as shown in FIG. 51A, the first pivoting part 41313 is also provided with a return spring 41313*c* to constantly bias the first pivoting part 41313 towards a direction of unfolding the canopy frame 4131, so as to provide assistance in the process of unfolding the canopy frame. Similarly, the second pivoting part 41314 may also be provided with a return spring to assist in unfolding the canopy frame.

Figure 52:
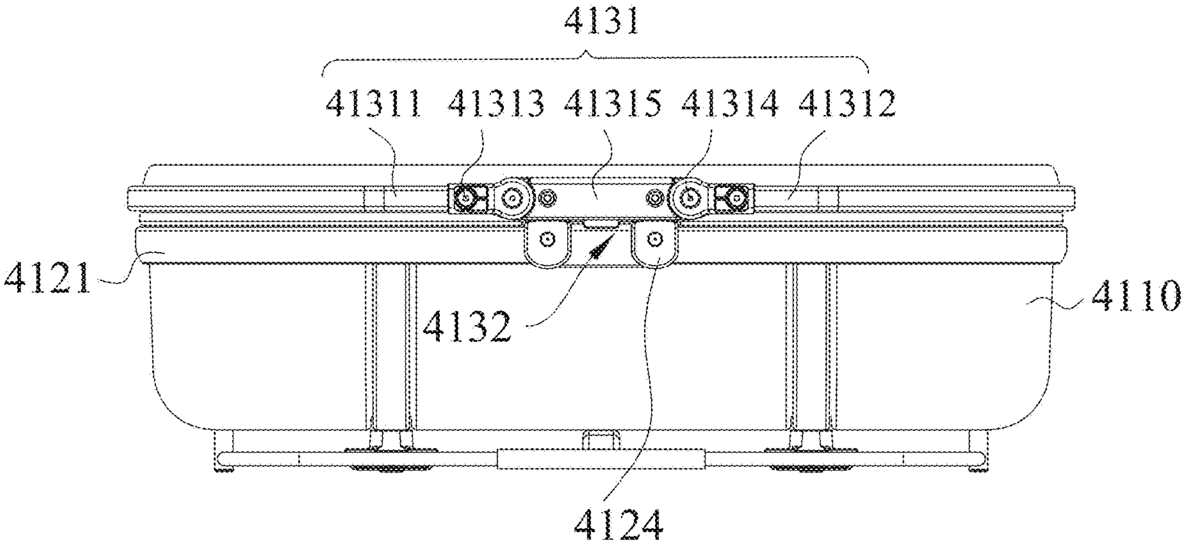
FIG. 52 shows a schematic structural view of a main body mounted with the canopy frame in the unfolded state.
Figure 53:
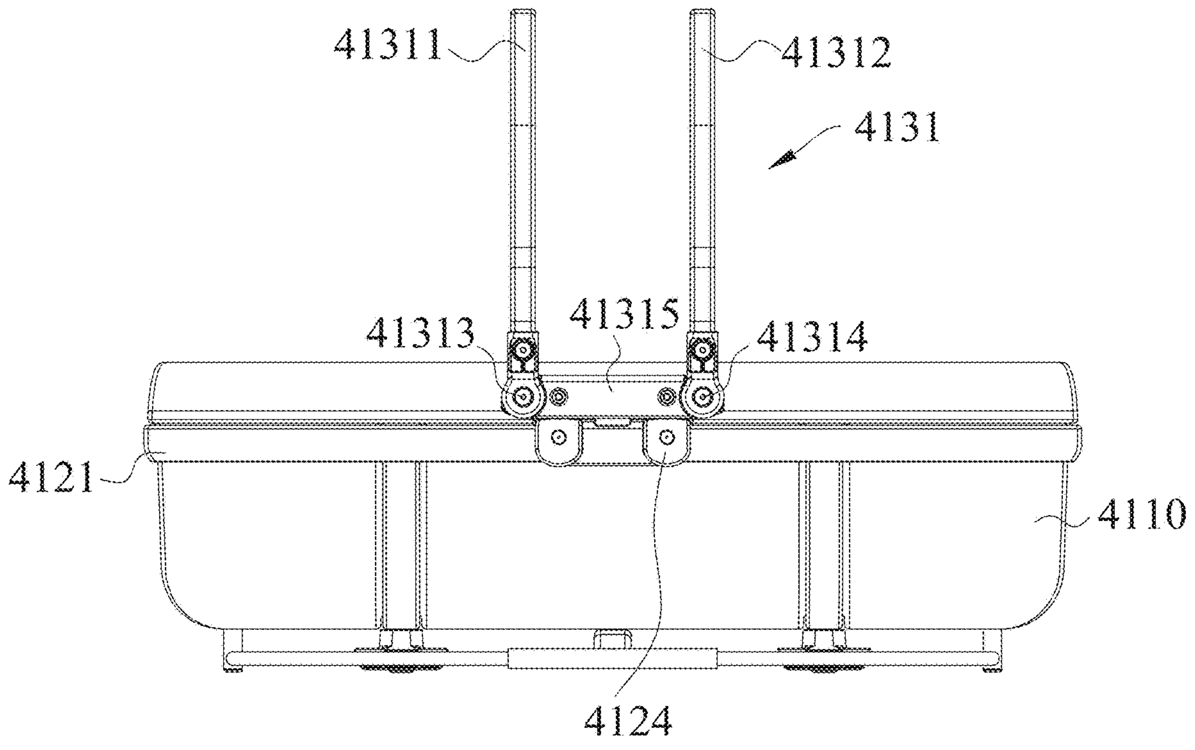
FIG. 53 shows a schematic structural view of the main body mounted with the canopy frame in the folded state.
Figure 54A:
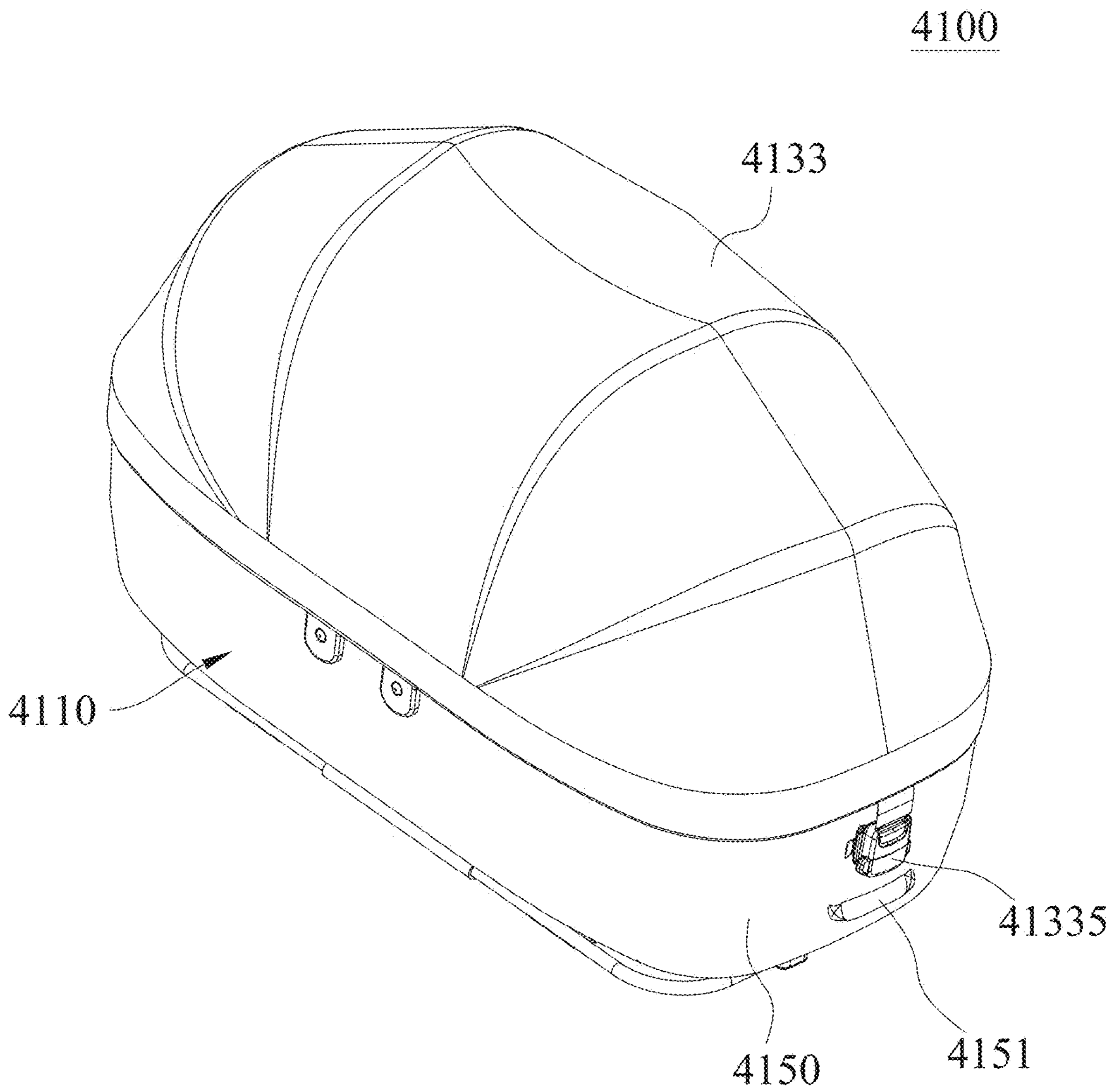
FIG. 54A shows a schematic perspective view of a carrier with a canopy being in the unfolded state.
Figure 54B:
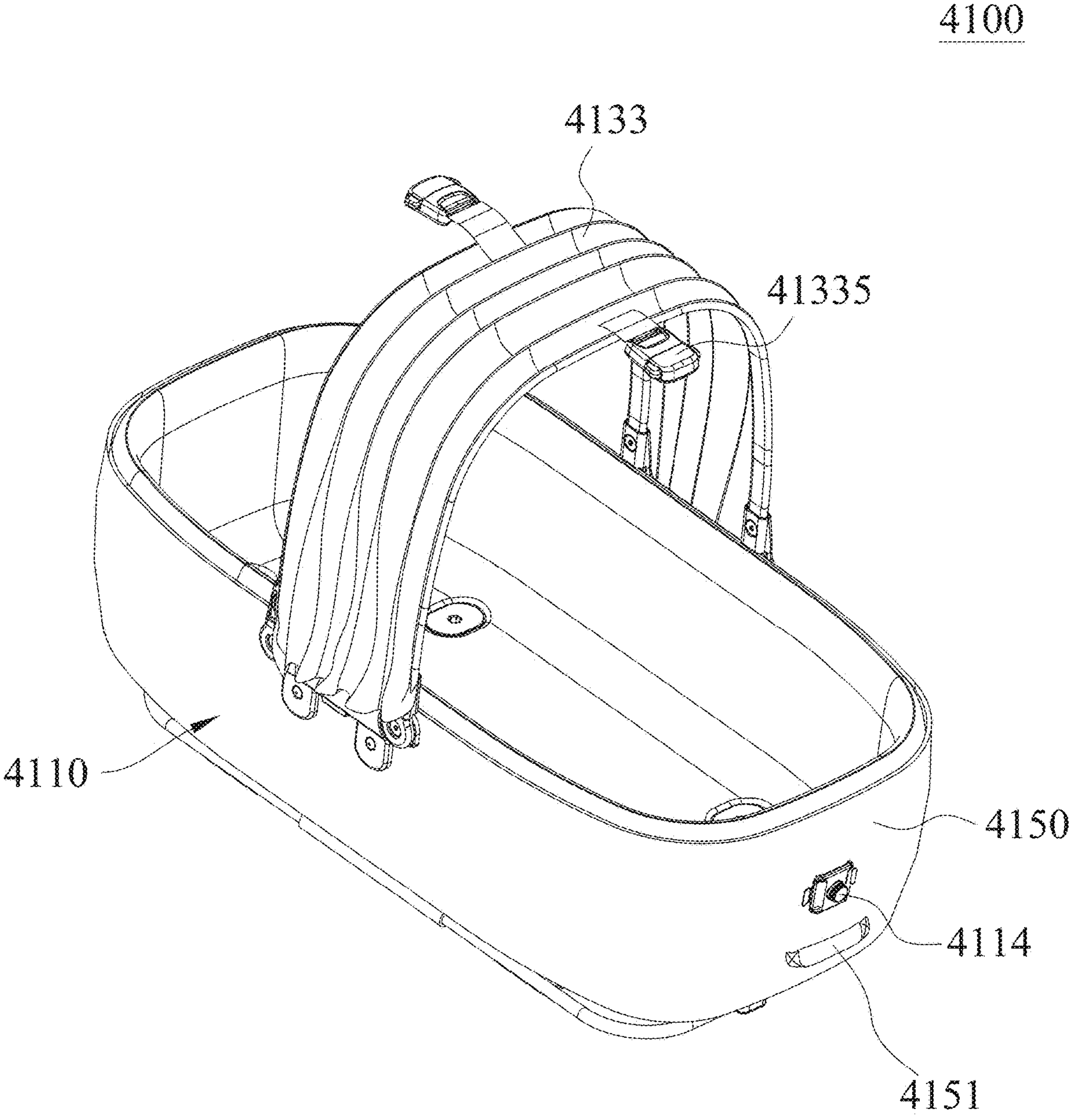
FIG. 54B shows a schematic perspective view of the carrier with the canopy being in the folded state.

Referring to FIGS. 52 to 54B, FIGS. 52 to 54B respectively show the main body 4110 mounted with the canopy frame 4131 in different states. The canopy frame 4131 in FIG. 52 and the canopy 4133 in FIG. 54A are in the unfolded state, and the canopy frame 4131 in FIG. 53 and the canopy 4133 in FIG. 54B are in the folded state.

Referring to FIGS. 52 and 54A, when the canopy 4133 is mounted above the main body 4110, the canopy locking device 4132 disposed in the locking section 41315 may be locked with the canopy locking part 4124 disposed on the first bracket 4121, so that at least a part of the canopy frame 4131 (i.e., the locking section 41315) is locked to the first bracket 4121 sleeved outside the main body 4110. When the canopy frame 4131 is in the unfolded state as shown in FIG. 52 and is disposed around the opening of the main body 4110, that is, the first pivoting section 41311, the locking section 41315 and the second pivoting section 41312 are substantially at the same horizontal line, the canopy 4133 is in the unfolded state (as shown in FIG. 54A) and is covered above the opening of the main body 4110. At this time, the canopy frame 4131 is shielded by the canopy 4133 and is invisible from the outside.

Referring to FIGS. 53 and 54B, when the canopy 4133 needs to be folded, the first pivoting section 41311 and/or the second pivoting section 41312 of the canopy frame 4131 may be pulled to pivot around the first pivoting part 41313 and/or the second pivoting part 41314 with respect to the locking section 41315, so as to partially or fully fold the canopy frame 4131 and the canopy 4131 fixedly connected therewith, for example, the completely folded canopy 4133 as shown in FIG. 54B. Meanwhile, through the gear teeth disposed in the first pivoting part 41313 and/or the second pivoting part 41314, the canopy frame and the canopy 4133 may be in at least one folding position, so that an opening size of the canopy 4133 with respect to the main body 4110 may be adjusted correspondingly, facilitating the user to perform related operations and improving the safety and convenience of use. In an example, as shown in FIGS. 53 and 54B, the canopy frame 4131 (and its canopy 4133) may stand upright in the middle above the main body 4110 when it is completely folded, that is, the first pivoting section 41311 and the second pivoting section 41312 may be perpendicular or substantially perpendicular to the locking section 41315.

In addition, as shown in FIGS. 54A and 54B, a connecting structure is provided between the canopy 4133 and the main body 4110 of the carrier 4100 for keeping the canopy 4133 closed with respect to the main body 4110.

In an example, the connecting structure includes a connecting element and a mating connecting element. The connecting element is disposed at each of two opposite sides of the main body 4110, while the mating connecting element is disposed at each of corresponding two sides of the canopy 4133 and engaged with the connecting element. One of the connecting element and the mating connecting element is a male connecting element (for example, "4114" in FIG. 54B) and the other thereof is a female connecting element (for example, "41335" in FIGS. 54A and 54B), and the canopy 4135 is kept to be closed by the engagement of the male connecting element 4114 and the female connecting element 41335. It should be noted that, only one example of the male connecting element and the female connecting element is shown in FIGS. 54A and 54B (i.e., the male connecting element 4114 is disposed on the main body 4110, and the female connecting element 41335 is disposed on the canopy 4133), but their arrangement positions may also be interchanged. That is, the male connecting element may be disposed on the canopy, and the female connecting element may be disposed on the main body. As an example, the male connecting element 4114 and the female connecting element 41335 are magnetic buckle assemblies that are mutually cooperated with each other.

In addition, as shown in FIGS. 54A and 54B, a flexible grip 4151 may be disposed on each of two sides of the main body 4110 (only one flexible grip is shown). When it is necessary to move the carrier 4100, the carrier 4100 may be dragged or lifted by grasping the flexible grips 4151 on both sides of the main body 4110. In an example, the flexible grip 4151 may be sewn on the cloth 4150 sleeved outside the main body 4110 and located below the male connecting element 4114. However, the present disclosure is not limited thereto, that is, the flexible grip 4151 may also be fixed or detachably disposed on both sides of the main body 4110 in other ways.

Referring to FIG. 55, the carrier 4100 according to an embodiment of the fourth aspect of the present disclosure is shown, in which the canopy is removed. As shown in FIG. 55, any side of the carrier 4100 may also be provided with a storage bag 4152, for example, stuck or sewn on the cloth 4150 sleeved outside the main body 4110, for placing smaller objects such as a strap. In addition, the storage bag 4152 may at least partially shield connecting element(s) provided on the main body 4100, such as the male connecting element 4114, so as to prevent the male connecting element 4114 from affecting the appearance or being damaged due to collision, and an edge of an opening of the storage bag 4152 is provided with an elastic structure that may be elastically extended, which is convenient for better placing objects.

In an example, as shown in FIG. 55, the carrier 4100 may also be provided with a grip 4160. For example, two ends of the grip 4160 may be respectively disposed at both sides of the carrier 4100 and are symmetrical to the canopy locking part 4124, for the user to lift the carrier 4100. A position of the grip 4160 in an upright state is higher than a height of the canopy when it is folded (not shown in FIG. 55), and a width of the grip 4160 is greater than that of the canopy to avoid interference with the folding of the canopy. Specifically, referring to FIGS. 55 and 54B (showing the folded canopy 4133) and FIG. 53 (showing the canopy frame 4131 supporting the canopy), the position of the grip 4160 in the upright state is higher than that of the first pivoting section 41311 and the second pivoting section 41312 in the upright state (i.e., being completely folded) and the canopy 4133 provided thereon, and a width of the grip 4160 in the transverse direction D42 is greater than that of the first pivoting section 41311 and the second pivoting section 41312 as well as the canopy 4133.

Figure 56:
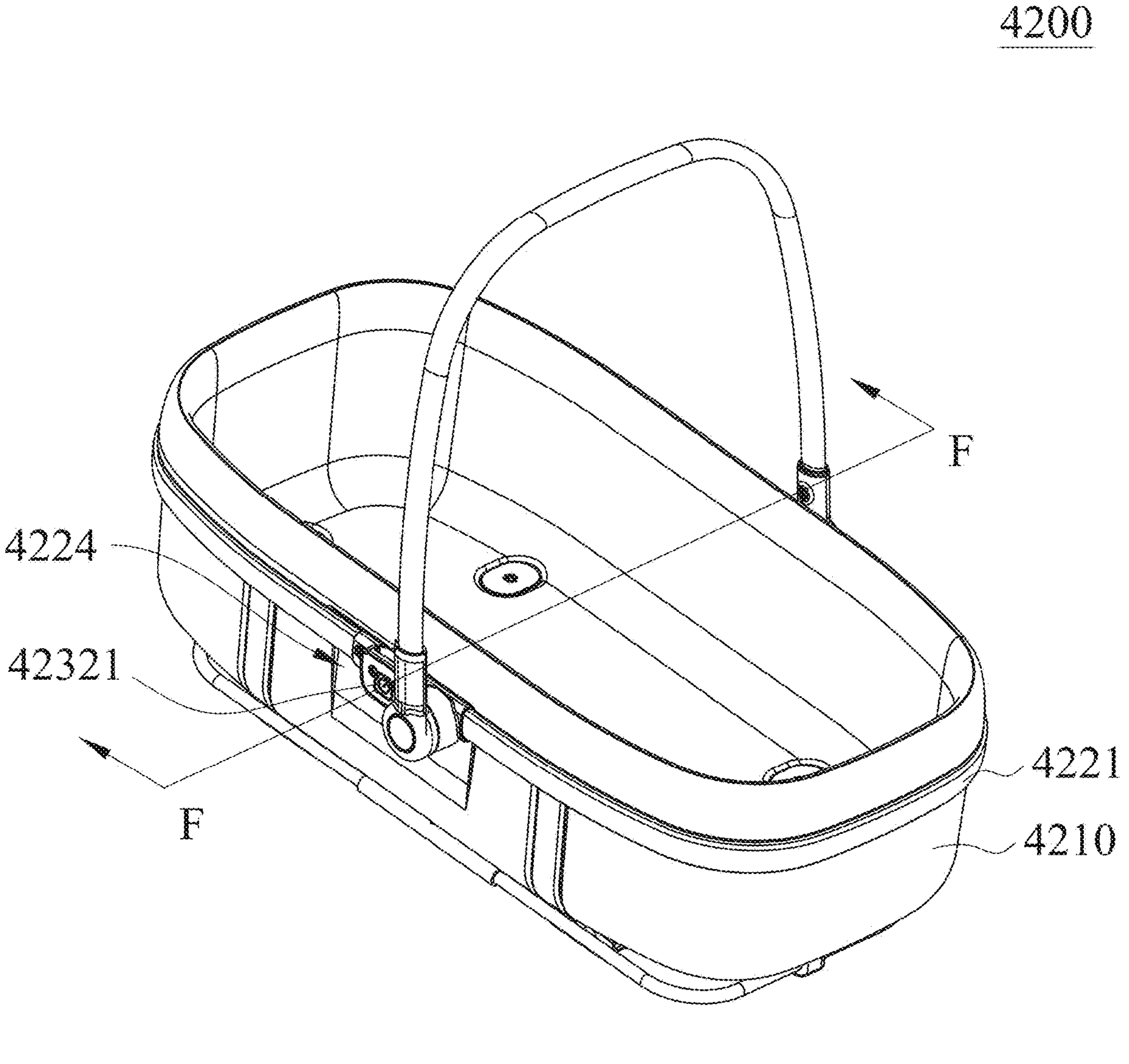
FIG. 56 shows a perspective schematic view of a carrier according to another embodiment of the fourth aspect of the present disclosure.
Figure 57A:
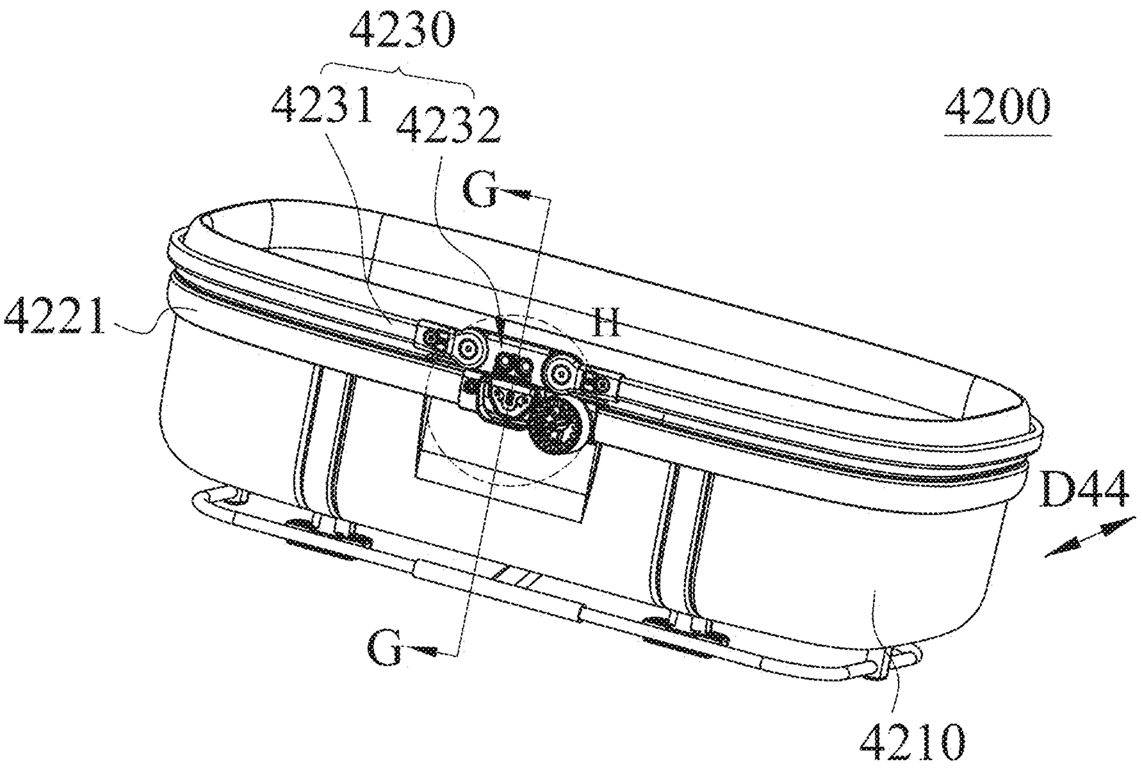
FIG. 57A shows a perspective schematic view of the carrier according to another embodiment of the fourth aspect of the present disclosure, in which a releasing operation element is removed.
Figure 57B:
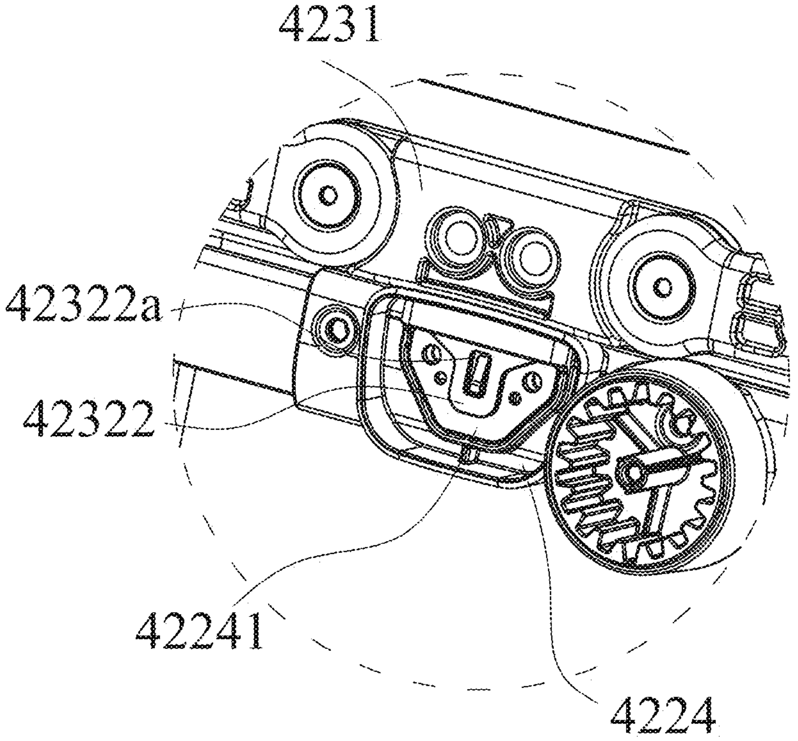
FIG. 57B shows a partial enlarged view at a part H in FIG. 57A.
Figure 57C:
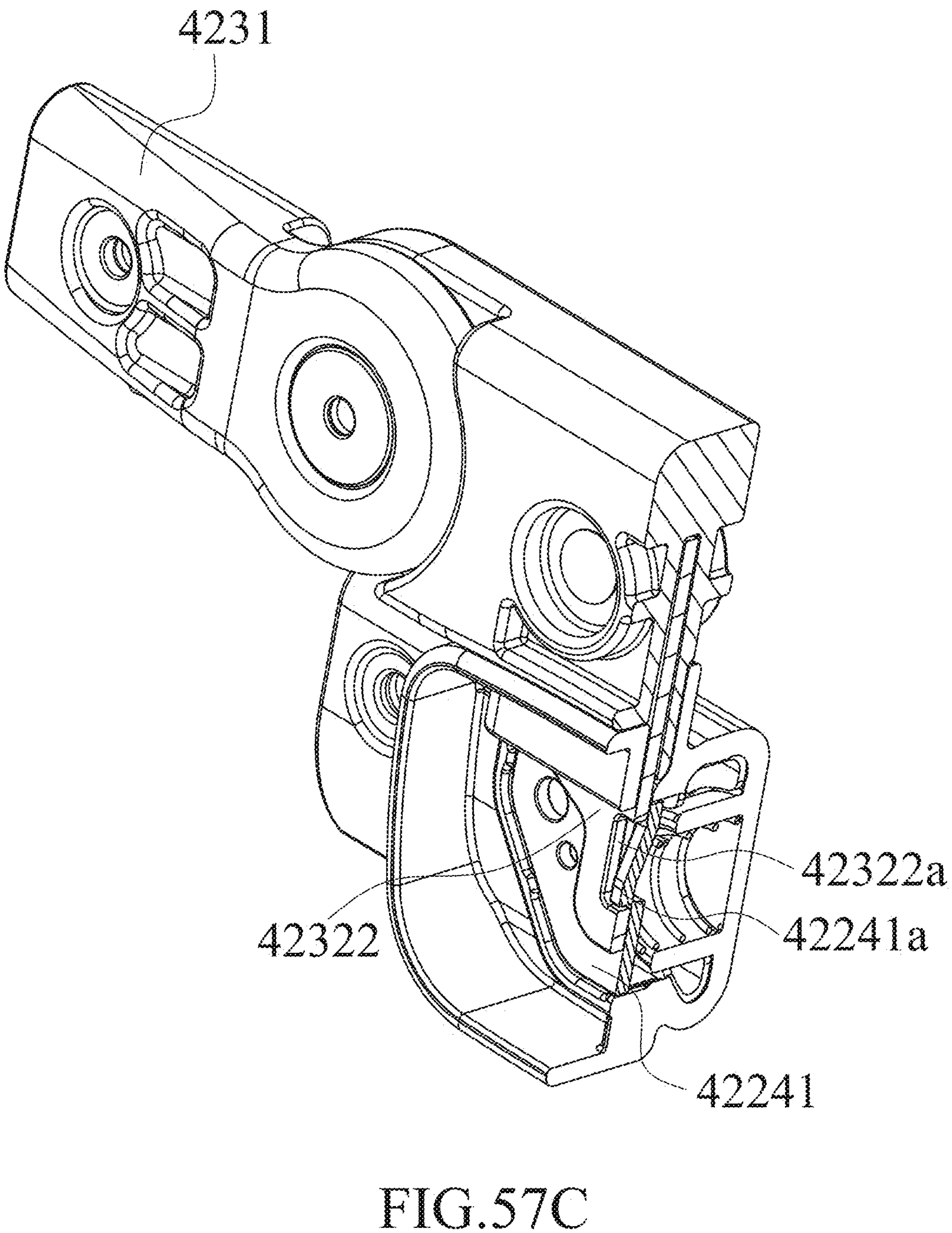
FIG. 57C shows a cross-sectional perspective view taken along a line G-G in FIG. 57A.

Referring to FIGS. 56, 57A and 57B, FIG. 56 shows a perspective schematic view of a carrier 4200 according to another embodiment of the fourth aspect of the present disclosure, in which the canopy covering above the main body 4210 and the cloth covering outside the main body 4210 are removed; FIG. 57A shows another perspective view of the carrier 4200, in which the releasing operation element shown in FIG. 56 is also removed; FIG. 57B shows a partial enlarged view at a part H in FIG. 57A; and FIG. 57C shows a partial cross-sectional perspective view of the canopy locking device taken along a line G-G in FIG. 57A.

In this embodiment, the carrier 4200 is different from the carrier 4100 shown in FIG. 39 mainly in that, the carrier 4200 has a canopy locking device 4232 with a different structure.

Referring to FIGS. 56, 57A to 57C, the canopy assembly 4230 of the carrier 4200 includes a canopy frame 4231, a canopy locking device 4232 and a canopy (the canopy is not shown for convenience of observation, and the canopy of this embodiment has the same structure as the canopy 4133). The canopy frame 4231 surrounds the opening of the main body 4210, and the canopy locking device 4232 is at least partially disposed on the canopy frame 4231 to cooperate with the canopy locking part 4224 correspondingly disposed on the carrier 4200, so as to lock the canopy assembly 4230 above the main body 4210. In an example, the carrier 4200 has two canopy locking devices 4232 (only one is shown), which are symmetrically disposed on the canopy frames 4231 on both sides of the main body 4210 in a transverse direction D44, and which are detachably cooperated with the canopy locking parts 4224 disposed on the first bracket 4221.

In an example, the canopy locking device 4232 may include a releasing operation element 42321 (see FIG. 56) and a locking element 42322 (see FIG. 57B). The releasing operation element 42321 may be operated to move from the locking position to the unlocking position, so that the canopy assembly 4230 is unlocked with respect to the main body 4210. The releasing operation element 42321 is disposed on a bracket device sleeved outside the main body 4210, such as the first bracket 4221. As shown in FIG. 56, the releasing operation element 42321 may be disposed outside the canopy locking part 4224, and its specific arrangement and operating principle will be described below. FIGS. 57A to 57C show the structure for removing the releasing operation element 42321, so as to show perspective views of the canopy locking device 4232 and the canopy locking part 4224 in a state that they are cooperated with each other.

As shown in FIGS. 57A and 57B, the locking element 42322 may be provided as a first sheet, which is fixedly connected to the canopy frame 4231, for example, by rivets, and extends from the canopy frame 4231 towards the bracket device (the first bracket 4221 as shown) of the carrier 4200.

Figure 58A:
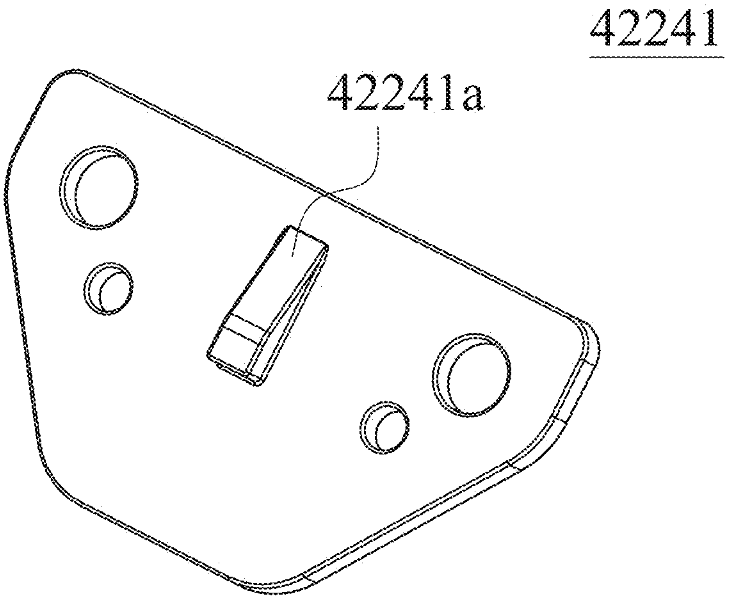
FIGS. 58A and 58B respectively show perspective schematic views of a canopy locking part according to another embodiment of the fourth aspect of the present disclosure.
Figure 58B:
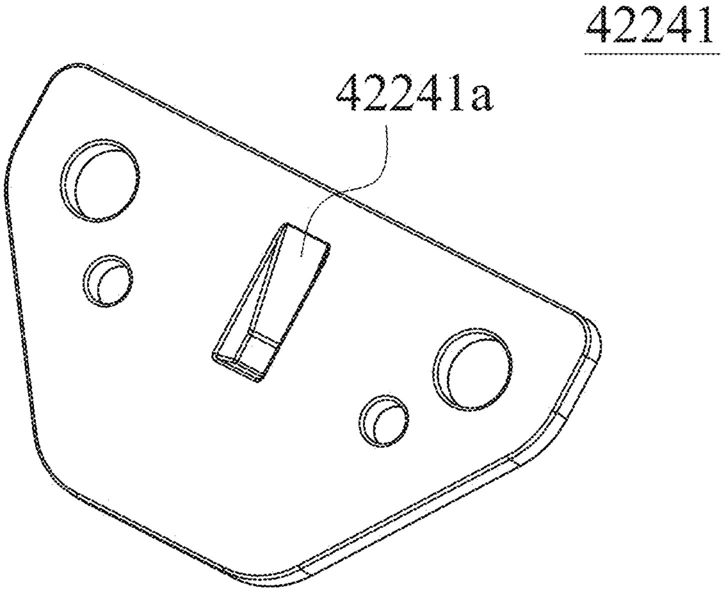

In addition, the canopy locking part 4224 may include a second sheet 42241. Referring to FIGS. 58A and 58B, the second sheet 42241 are respectively shown from different views. In an example, the second sheet 42241 may be disposed in an inverted trapezoidal shape.

As can be seen from FIGS. 57A to 58B, the locking element 42322 (i.e., the first sheet) and the second sheet 42241 of the canopy locking part 4224 may be provided with structures that are cooperated and locked with each other. In an example, one of the first sheet 42322 and the second sheet 42241 is provided with an engaging hole, and the other of the first sheet 42322 and the second sheet 42241 is provided with an engaging protrusion that is cooperated with the engaging hole. For example, as shown in FIGS. 57B, 57C and 58A, the first sheet 42322 is provided with an engaging hole 42322*a*, and the second sheet 42241 of the canopy locking part 4224 is correspondingly provided with an engaging protrusion 42241*a*. When it is in the locked state, the engaging hole 42322*a* and the engaging protrusion 42241*a* are engaged with each other. However, the present disclosure is not limited thereto, and the locking element 42322 and the canopy locking part 4224 may also have other corresponding structures.

Figure 59C:
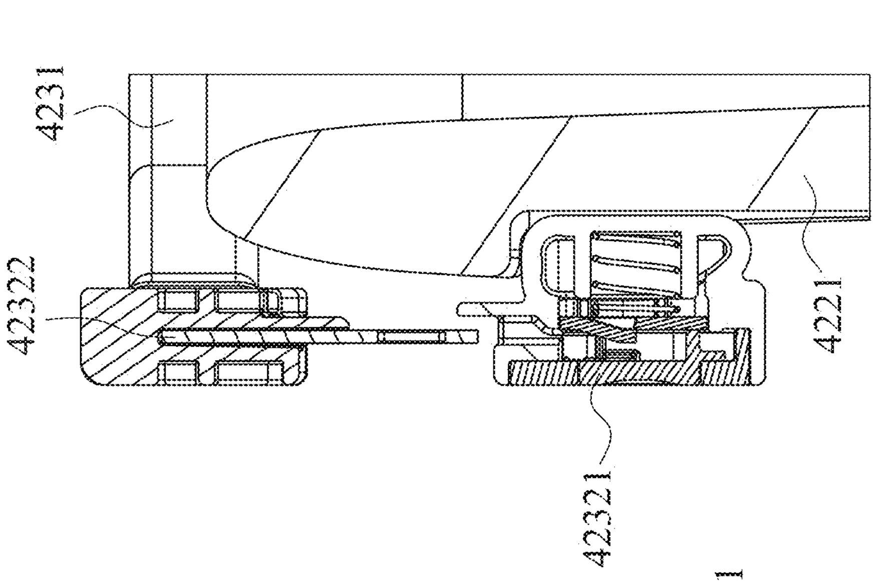
FIG. 59C shows a cross-sectional perspective view of the canopy locking device in a disassembled state.
Figure 59B:
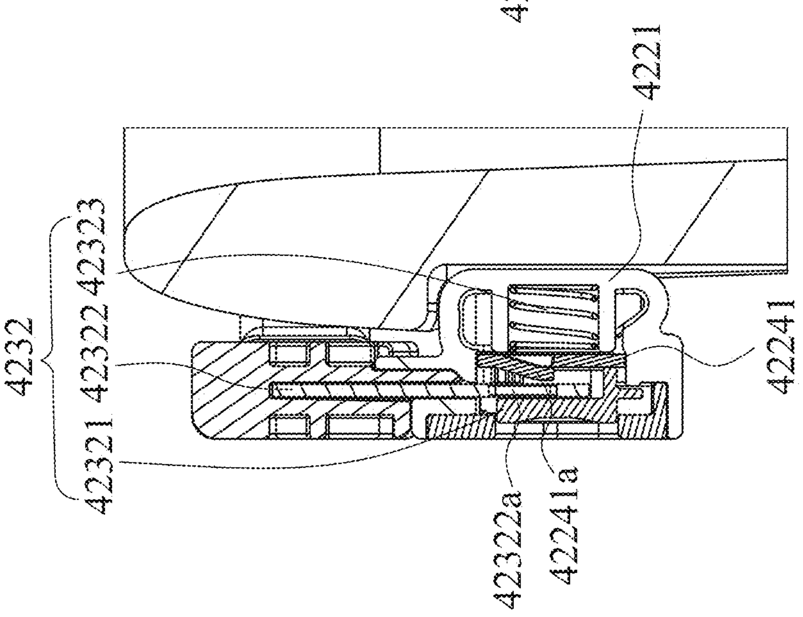
FIG. 59B shows a cross-sectional perspective view of the canopy locking device in an unlocked state.
Figure 59A:
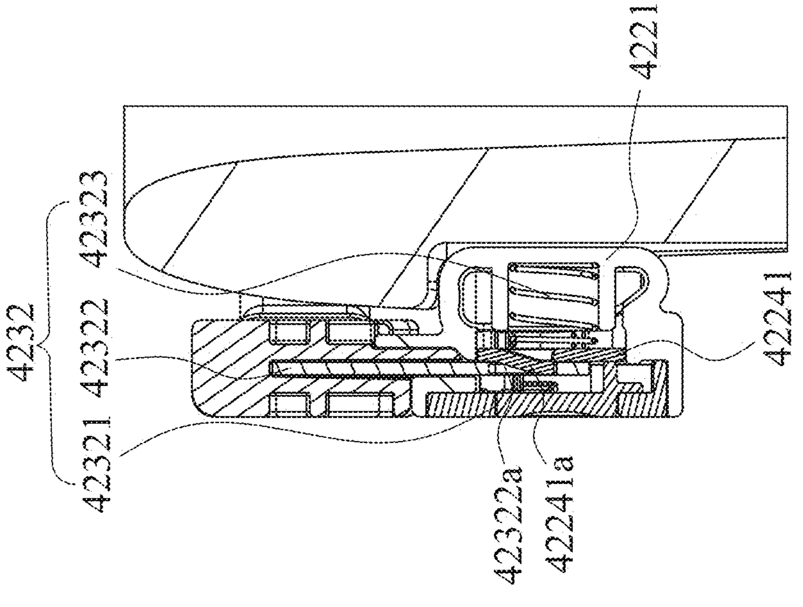
FIG. 59A shows a cross-sectional perspective view of a canopy locking device taken along a line F-F in FIG. 56, in which the canopy locking device is in a locked state.

Referring to FIGS. 59A to 59C, FIGS. 59A to 59C respectively show cross-sectional perspective views of the canopy locking device in different states.

Further referring to FIGS. 59A and 59B, as an example of the locking element 42322 acting as the first sheet and the canopy locking part 4224 including the second sheet 42241, the releasing operation element 42321 is disposed to the canopy locking part 4224 and may move between the locking position (see FIG. 59A) and the unlocking position (see FIG. 59B) in a front-rear direction with respect to the canopy locking part 4224. The second sheet 42241 of the canopy locking part 4224 is connected with the releasing operation part 42321 so as to be movable along with the operation of the releasing operation part 42321. An insertion space for accommodating the first sheet (i.e., the locking part 42322) is formed between the second sheet 42241 and the releasing operation part 42321.

In an example, the canopy locking device 4232 further includes an elastic restoring element 42323, which is connected between one of the releasing operation element 42321 and the second sheet 42241 and the bracket device of the carrier (for example, the first bracket 4221 shown in FIG. 59A), and constantly provides a force to enable the releasing operation element 42321 to be in or restored to the locking position.

The structure and operation principle of the canopy locking device 4232 will be further described with reference to FIGS. 59A to 59C.

When the canopy is mounted, as shown in FIG. 59A, the elastic restoring element 42323 pushes the second sheet 42241 and the releasing operation element 42321 to keep the releasing operation element 42321 in the locking position, and the engaging hole 42322*a* of the first sheet 42322 is engaged with the engaging protrusion 42241*a* of the second sheet 42241. When it is necessary to be unlocked, as shown in FIG. 59B, the releasing operation element 42321 may be pressed to the unlocking position, so that the releasing operation element 42321 pushes the second sheet 42241 away from the first sheet 42322 against an action force of the elastic restoring element 42323, and the engaging hole 42322*a* is disengaged from the engaging protrusion 42241*a*. At this time, as shown in FIG. 59C, the canopy frame 4231 may be moved upward to remove the first sheet 42322 from the insertion space between the second sheet 42241 and the releasing operation element 42321, thereby detaching the canopy from the main body.

Figure 60:
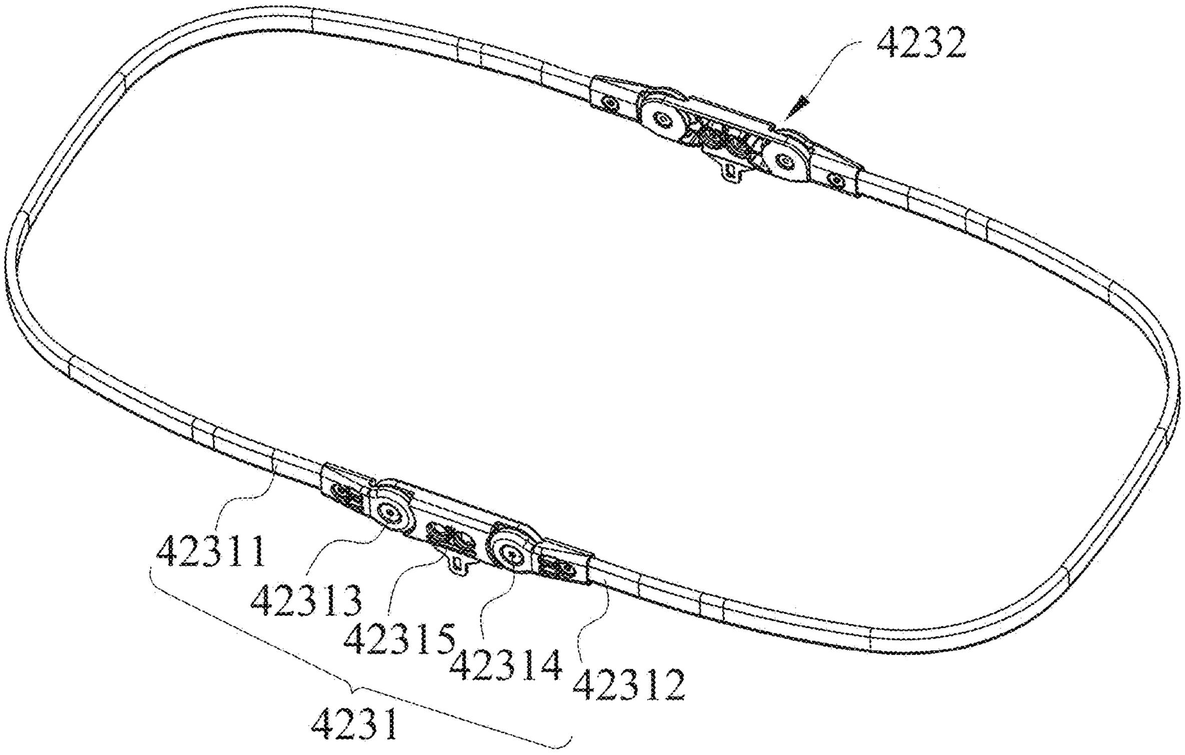
FIG. 60 shows a structural schematic view of a canopy frame according to another embodiment of the fourth aspect of the present disclosure, in which the canopy frame is in an unfolded state.
Figure 61:
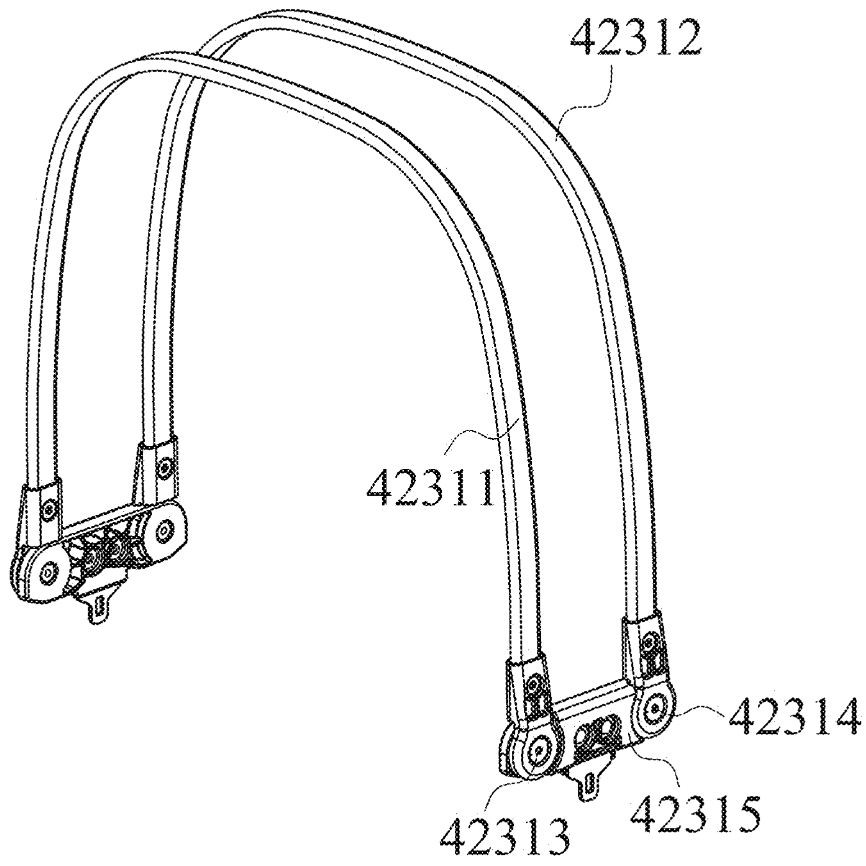
FIG. 61 is a schematic structural view of the canopy frame shown in FIG. 60 in a folded state.

Referring to FIGS. 60 and 61, FIGS. 60 and 61 respectively show the canopy frame 4231 according to another embodiment of the present disclosure in the unfolded state and in the folded state.

Similar to the structure of the canopy frame 4131 in the previous embodiment, the canopy frame 4231 of this embodiment includes a first pivoting section 42311, a second pivoting section 42312 and two locking sections 42315. Two ends of the first pivoting section 42311 are respectively pivotably connected to one ends of the two locking sections 42315 through a first pivoting part 42313, and two ends of the second pivoting section 42312 are respectively pivotably connected to the other ends of the two locking sections 42315 through a second pivoting part 42314, and each of the two locking section 42315 is provided with a canopy locking device 4232. The difference is that the locking section 42315 provided with the canopy locking device 4232 of this embodiment may have a smaller size, for example, between 110 mm and 135 mm, optionally 125 mm, thereby further improving the adaptability of the canopy assembly for carriers with different sizes.

For example, referring to FIGS. 62A to 63D, FIGS. 62A to 62F, and FIGS. 63A and 63D respectively show cases in which the main bodies with different sizes use canopy locking devices.

Figure 62B:
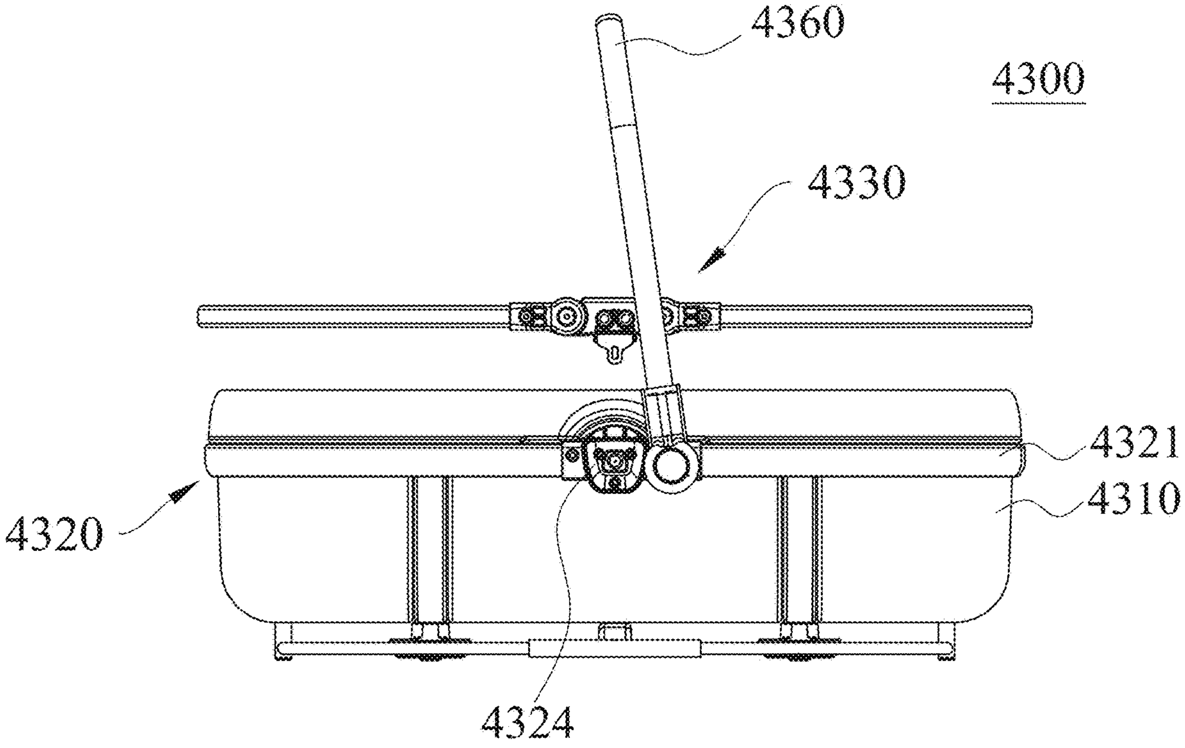
Figure 62C:
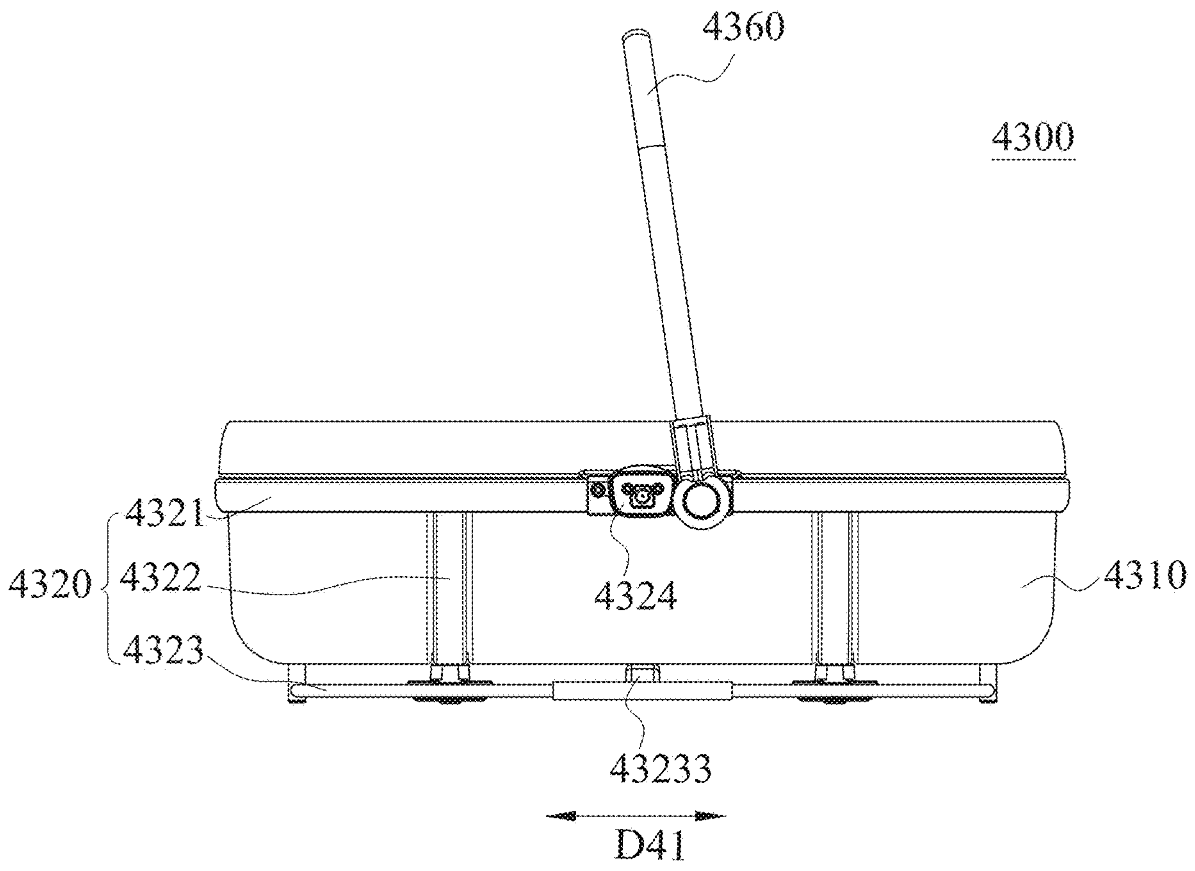

FIGS. 62A to 62C show a carrier 4300 having a longer size. The carrier 4300 includes a main body 4310, a bracket device 4320 and a canopy assembly 4330. The bracket device 4320 is sleeved outside the main body 4310 and includes a first bracket 4321, a second bracket 4322 and a third bracket 4323. Specifically, FIG. 62A shows the carrier 4300 after a canopy of a canopy assembly 4330 is removed, FIG. 62B shows a state in which the canopy assembly 4330 is separated from the main body 4310 and the bracket device 4320, and FIG. 62C shows the carrier 4300 after the canopy assembly 4330 is removed. As shown in FIGS. 62A to 62C, the carrier 4300 may have two canopy locking parts 4324, which respectively correspond to the canopy locking devices 4332 disposed on the canopy frame 4331. The two canopy locking parts 4324 may be symmetrically disposed on both sides of the first bracket 4321 of the bracket device 4320 with respect to the main body 4310, and may be respectively located in the middle at a side of the main body 4310, that is, a middle portion of one side of the first bracket 4321. As shown in FIG. 62C, a structural reinforcement element 43233 may be disposed below the longer-sized carrier 4300, for example, in the middle of the third bracket 4323 in the longitudinal direction D41, so as to further enhance the structural strength of the bracket device 4320. It should be noted that, although this embodiment shows a structure similar to that of the canopy locking device shown in FIG. 56, it should be apparent for those skilled in the art that this embodiment is also suitable for the canopy locking device shown in FIG. 40.

In addition, for the convenience of carrying, the carrier 4300 may also be provided with a grip 4360. In a specific example, as shown in FIGS. 62A to 62C, two ends of the grip 4360 may be symmetrically disposed on the bracket device 4320. For example, two ends of the grip 4360 may be respectively disposed on the first brackets 4321 located at both sides of the main body 4310, and may be disposed to avoid the canopy locking part 4324, more specifically, disposed adjacent to the canopy locking part 4324, so as not to interfere with the canopy locking part 4324 when the carrier 4300 is lifted by the grip 4360, and at the same time, to ensure that the carrier 4300 is not inclined excessively. Similar to the grip 4160 in the previous embodiment, a position of the grip 4360 in an upright state is higher than a height of the canopy (not shown in FIGS. 62A to 62C) when it is folded, and a width of the grip 4360 is greater than that of the canopy.

Figure 62D:
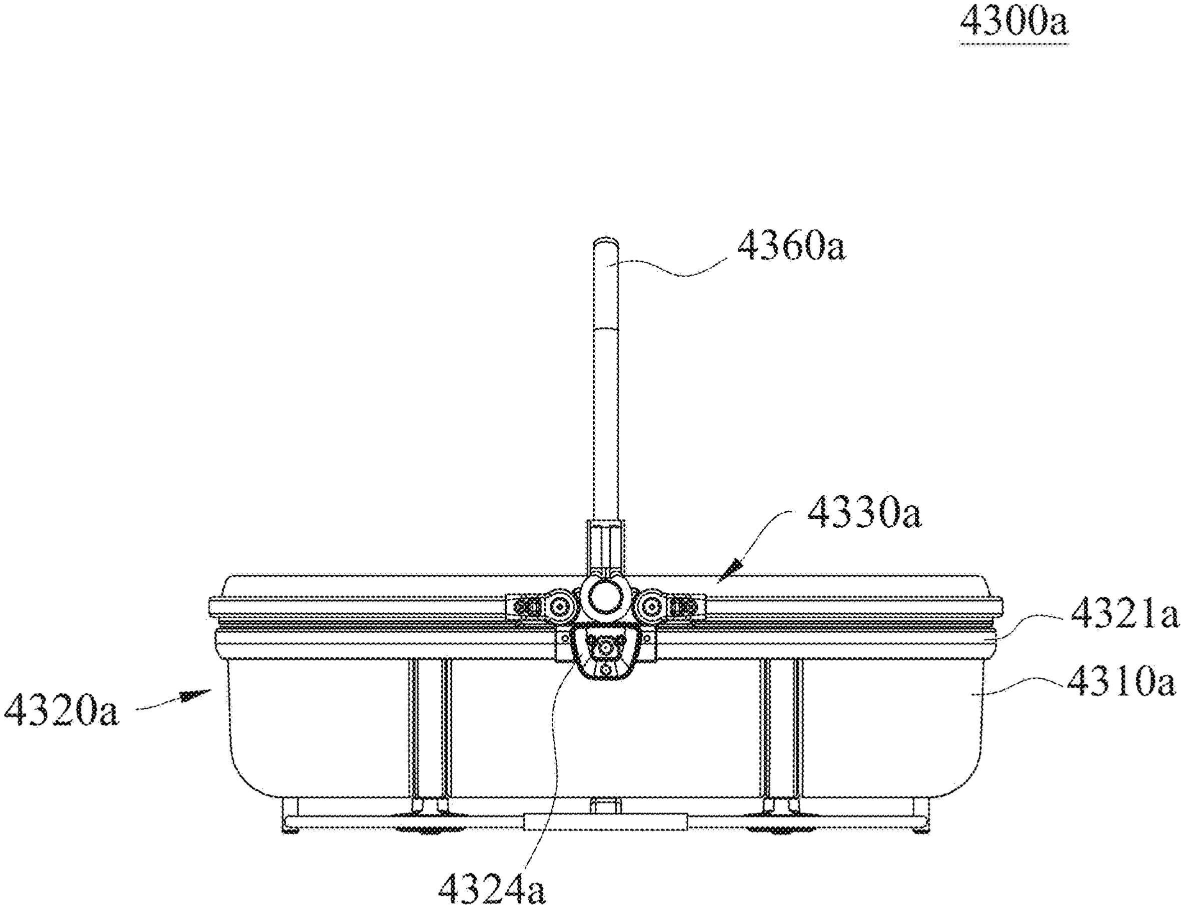
Figure 62E:
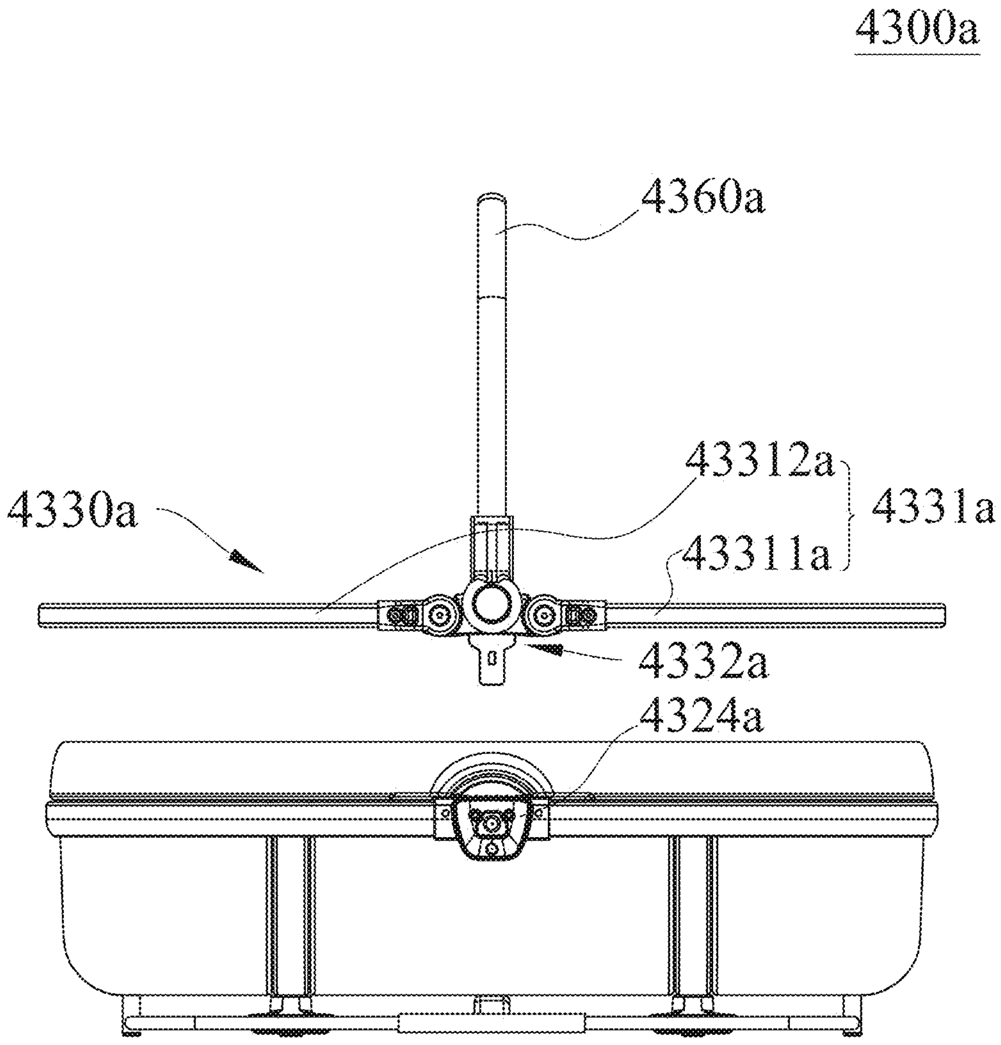
Figure 62F:
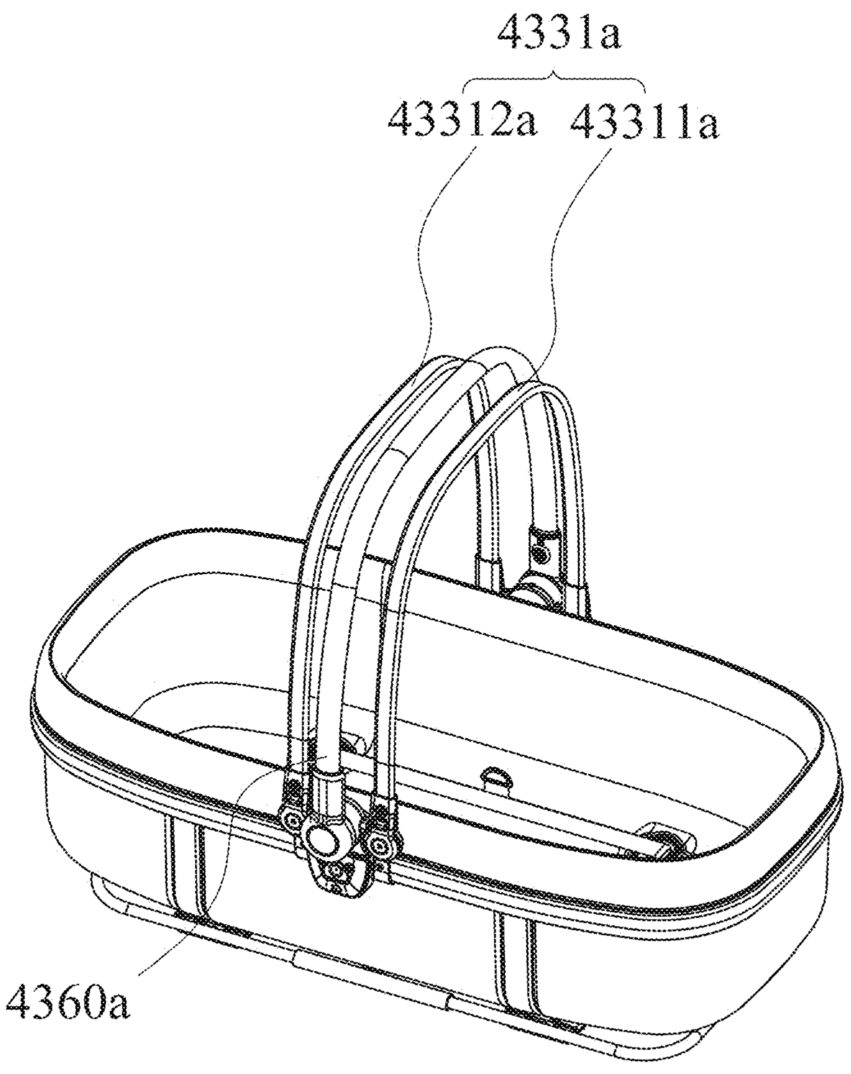

In another specific example, as shown in FIGS. 62D to 62F, the carrier 4300*a* may have a structure similar to that of the carrier 4300 in the previous examples. Specifically, the carrier 4300*a* includes a main body 4310*a*, a bracket device 4320*a* and a canopy assembly 4330*a*, and the bracket device 4320*a* is sleeved outside the main body 4310*a*. Two canopy locking parts 4324*a* of the carrier 4300*a* may be symmetrically disposed on both sides of the first bracket 4321*a* of the bracket device 4320*a* with respect to the main body 4310*a*, and may be respectively located in the middle at a side of the main body 4310*a*. The two canopy locking parts 4324*a* respectively correspond to the canopy locking devices 4332*a* disposed on the canopy frame 4331*a*. It is different from the carrier 4300 that, a grip 4360*a* may be disposed on the canopy assembly 4330*a* of the carrier 4300*a*, for example, at the canopy locking device 4332*a* (i.e., in the middle of the canopy assembly 4330*a*, without interference with the structure of the canopy locking device 4332*a*), so that the grip 4360*a* may be removed from the main body 4310*a* together with the canopy assembly 4330*a*. Specifically, two ends of the grip 4360*a* may be respectively disposed on the canopy frame 4331*a* at positions corresponding to the canopy locking parts 4324*a*. As shown in FIG. 62F, when the canopy frame 4331*a* is folded, the grip 4360*a* is in an upright state and between the first pivoting section 43311*a* and the second pivoting section 43312*a* after being folded. Similar to the grips 4160 and 4360 in the previous embodiments, a position of the grip 4360*a* in an upright state is higher than a height of the canopy (see FIG. 62F, which shows the canopy frame 4331*a* after the canopy is removed) when it is folded, and a width of the grip 4360*a* is greater than that of the canopy.

Figure 63A:
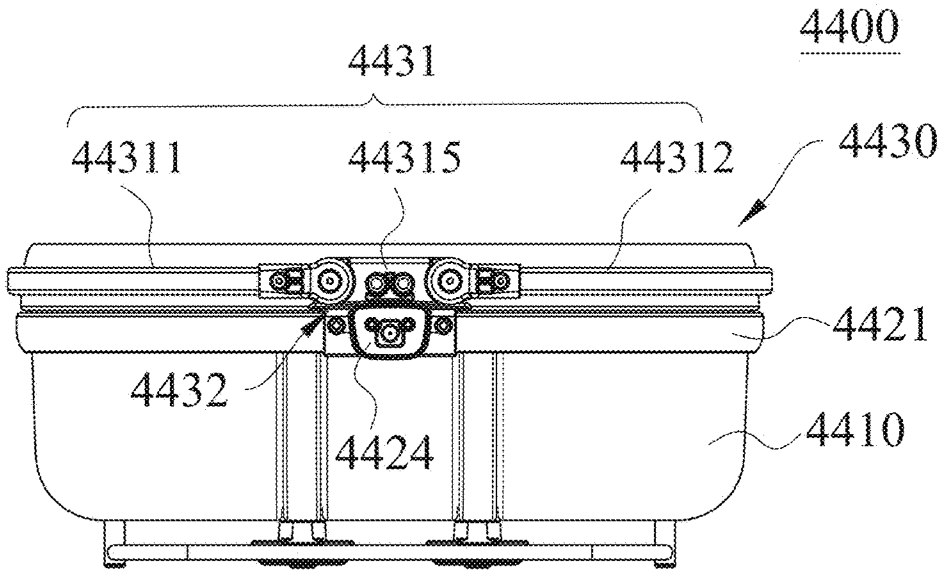
Figure 63B:
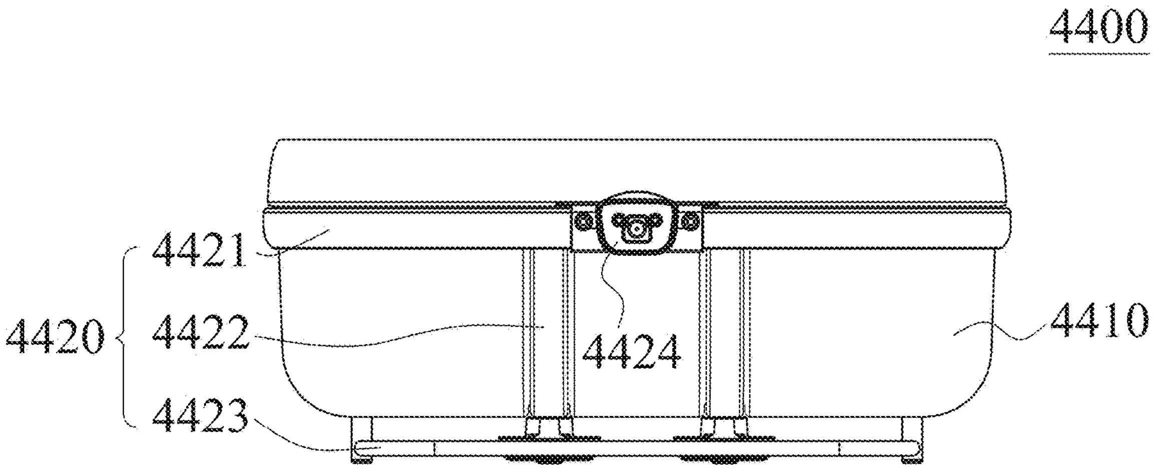
Figure 63C:
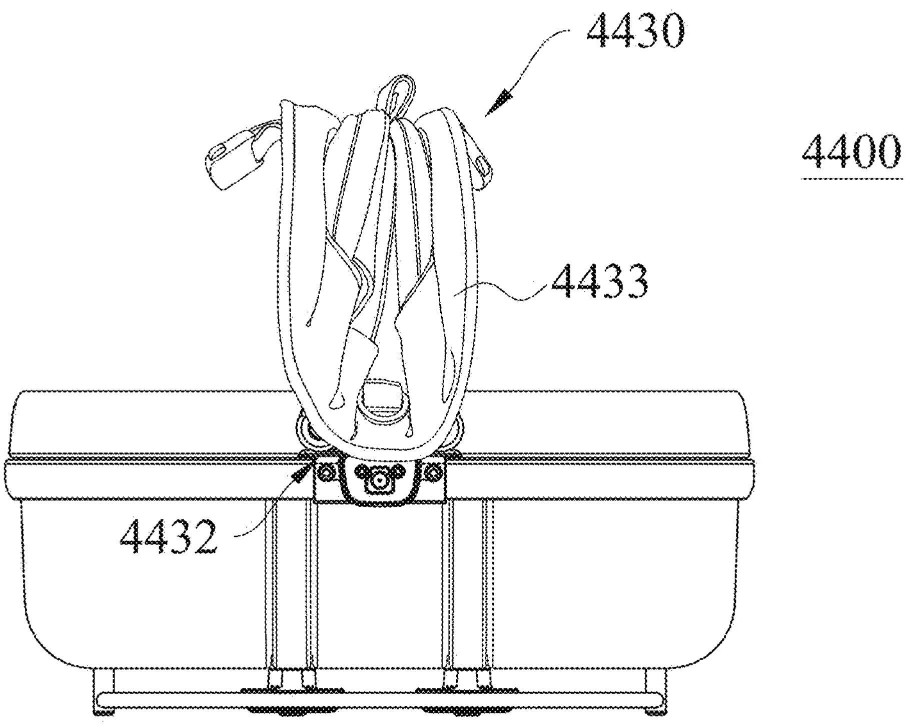
Figure 63D:
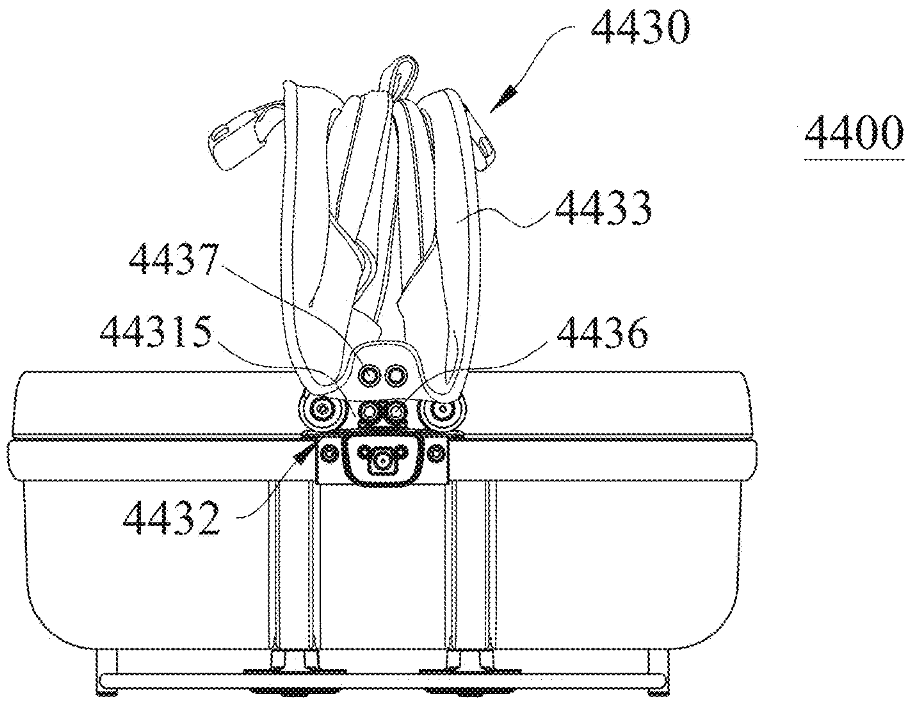

FIGS. 63A to 63D show a carrier 4400 having a shorter size. The carrier 4400 includes a main body 4410, a bracket device 4420 and a canopy assembly 4430. The bracket device 4420 is sleeved outside the main body 4410, and includes a first bracket 4421, a second bracket 4422 and a third bracket 4423. Specifically, a canopy of the canopy assembly 4430 is removed in FIG. 63A, and the canopy assembly 4430 is removed in FIG. 63B, and FIGS. 63C and 63D show the carrier 4400 with the canopy assembly 4430 in a folded state. As shown in FIGS. 63A and 63B, the carrier 4400 may have two canopy locking parts 4424, which respectively correspond to the canopy locking devices 4432 disposed on the canopy frame 4431. The specific arrangement of the canopy locking part 4424 is similar to that of the canopy locking part 4324 of the carrier 4300 having a longer size, and will not be described in detail herein. The difference is that, a size of the carrier 4400 is shorter, and a grip and a structural reinforcement element connected to the third bracket 4423 may not be provided, but the present disclosure is not limited thereto. The carrier 4400 having a shorter size may also be provided with a grip similar to those shown in FIGS. 62D and 62E as long as there is no structural conflict, which are not described in detail herein.

In addition, it can be seen from FIGS. 63A and 63C that, when the canopy 4433 is mounted on the canopy frame 4431, the canopy 4433 shields the canopy frame 4431 and the canopy locking device 4432 to increase the aesthetics of the carrier 4400. Specifically, with further reference to FIGS. 63A and 63D, a lower edge of the canopy 4433 may be sleeved on the first pivoting section 44311 and the second pivoting section 44312 of the canopy frame 4431 respectively, and may be detachably connected to the locking section 44315. For example, as shown in FIG. 63D, the locking section 44315 may be provided with a first fastening element 4436, the first fastening element 4436 may be detachably connected with a second fastening element 4437 correspondingly disposed to the canopy 4433, so as to increase the connection stability between the canopy 4433 and the canopy frame 4431, thereby substantially reducing the possibility of separation between the canopy 4433 and the canopy frame 4431. Optionally, the first fastening element 4436 and the second fastening element 4437 may be snap-type connecting devices that are cooperated with each other, that is, the first fastening element 4436 may be a female fastener of the snap-type connecting device, and the second fastening element 4437 may be a male fastener cooperated with the female fastener, but the present disclosure is not limited thereto, and positions and/or structures of the first fastening element 4436 and the second fastening element 4437 may be interchanged. In addition, the first fastening element 4436 and the second fastening element 4437 may also be in other structures or ways, such as Velcro fasteners, sliding fastener structures, hook-and-loop structures, button structures, or the like.

Referring to FIGS. 64A to 64D, a carrier 4500 provided with a strap 4540 according to another embodiment of the fourth aspect of the present disclosure is shown.

Figure 64A:
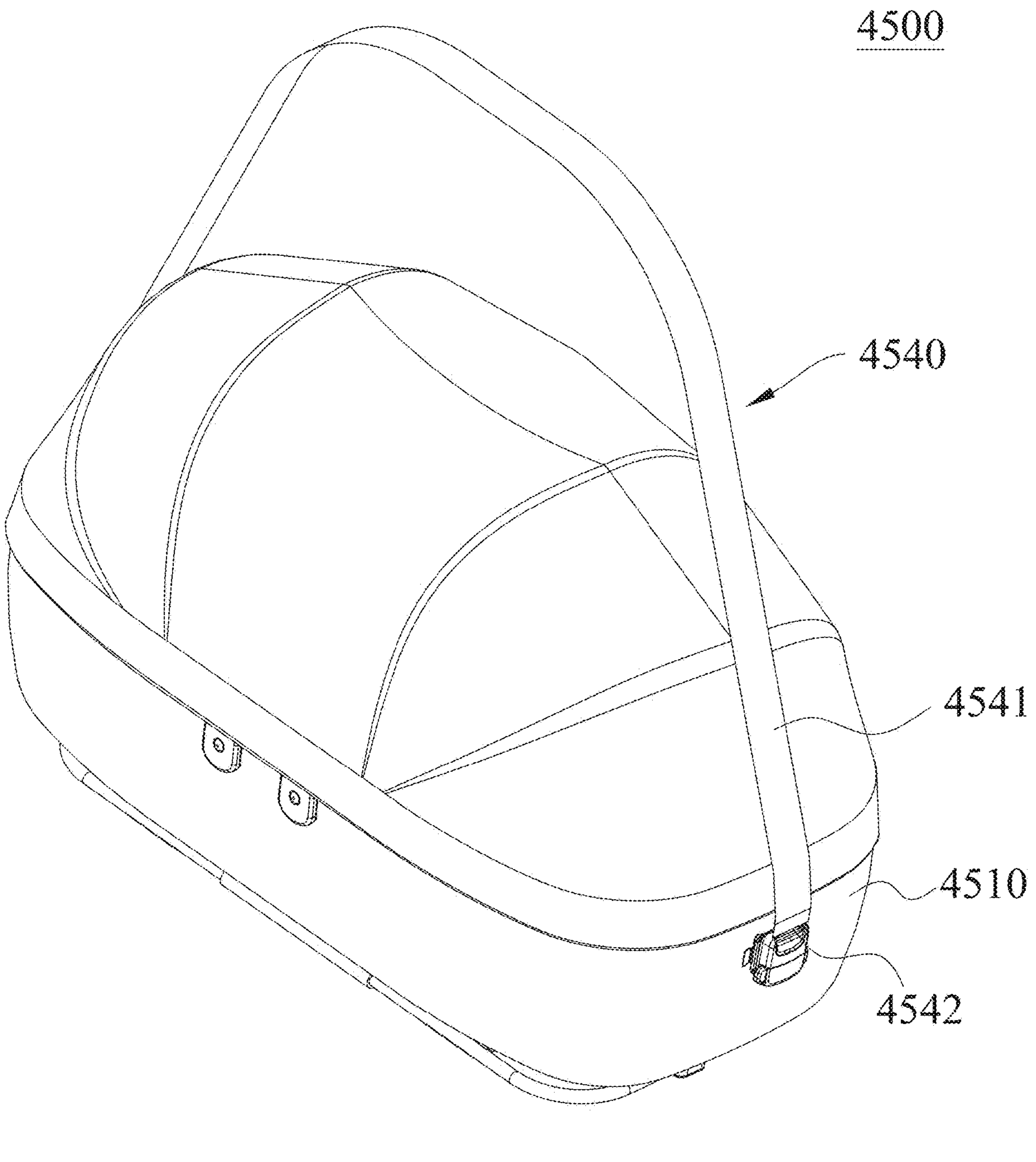
FIGS. 64A to 64D show schematic views of a carrier according to a yet another embodiment of the fourth aspect of the present disclosure.
Figure 64B:
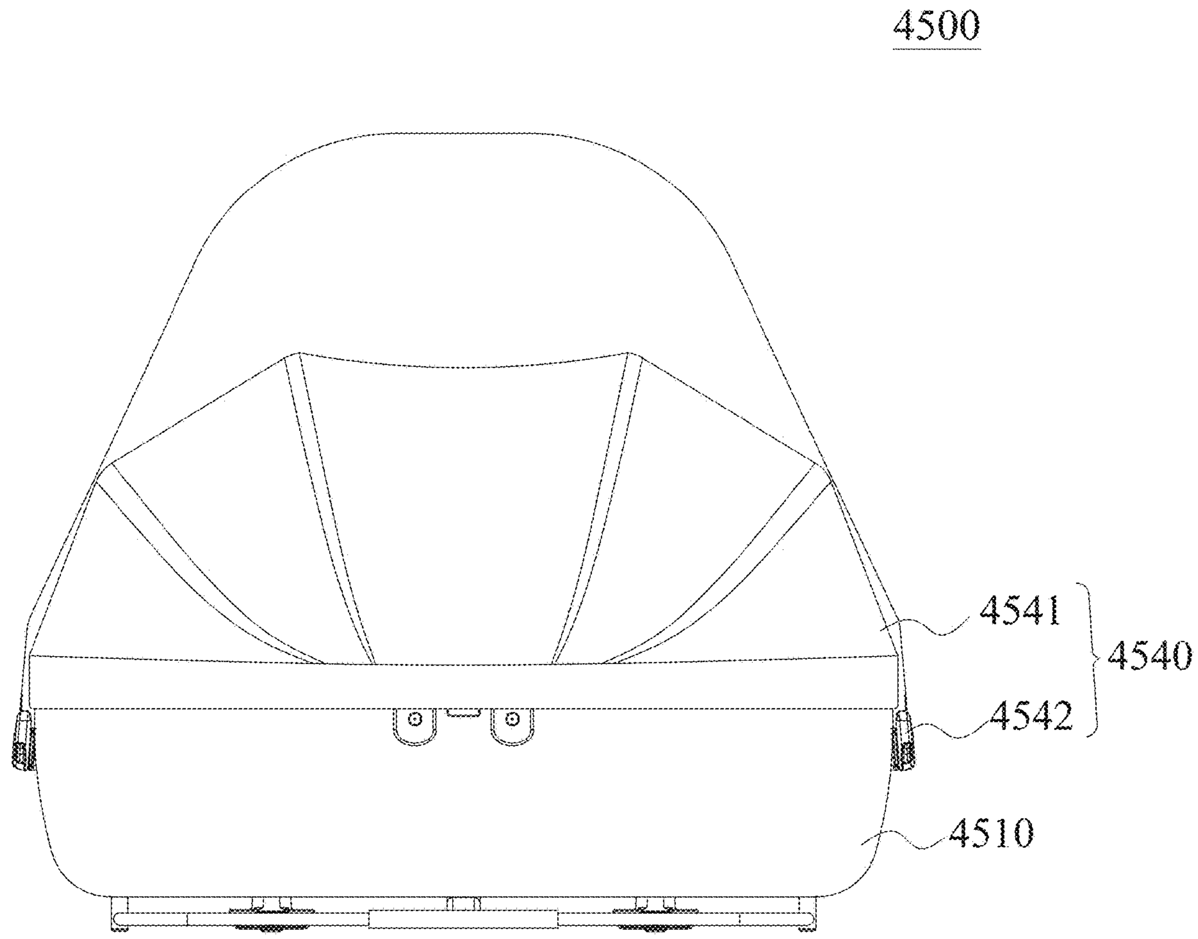
Figure 64C:
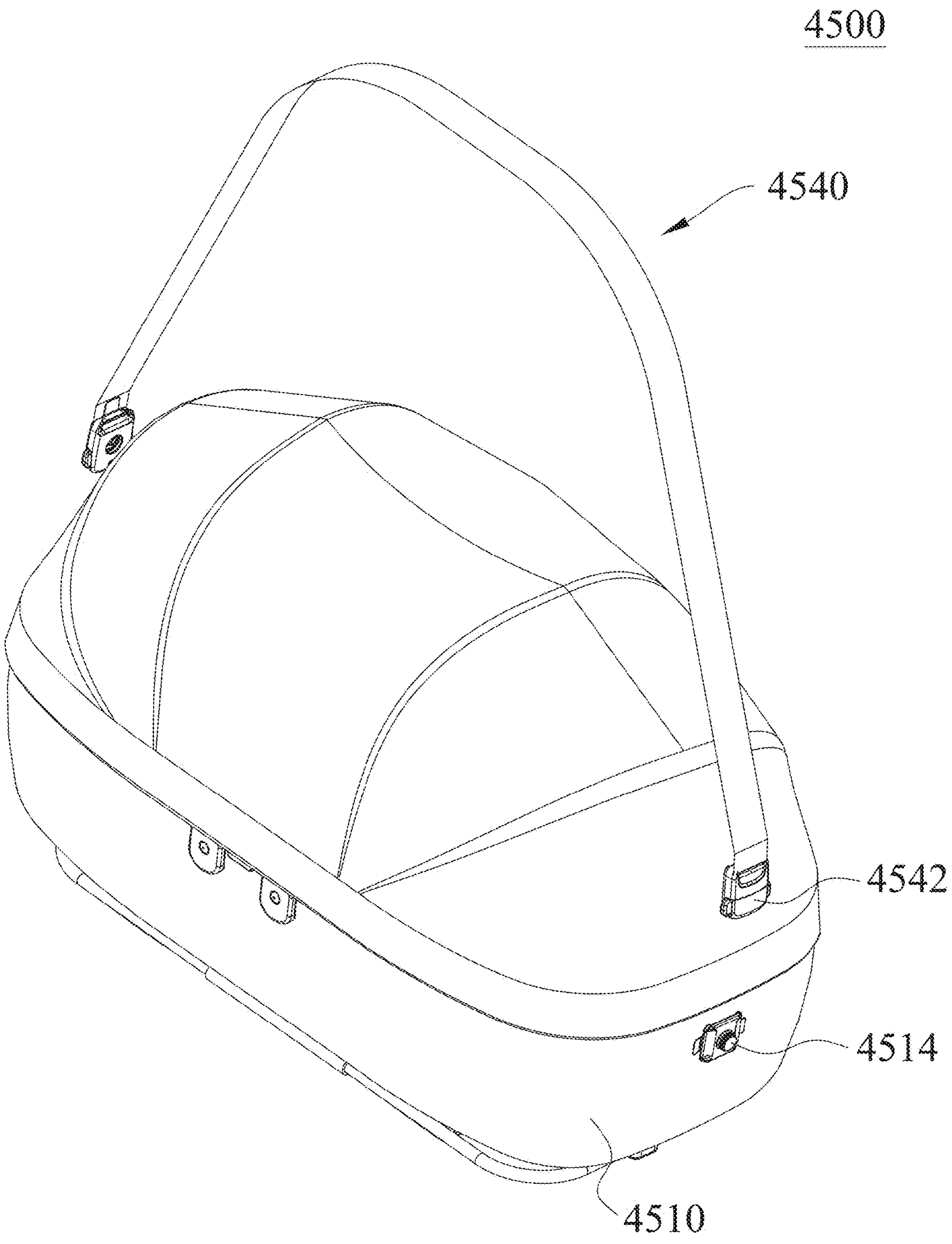
Figure 64D:
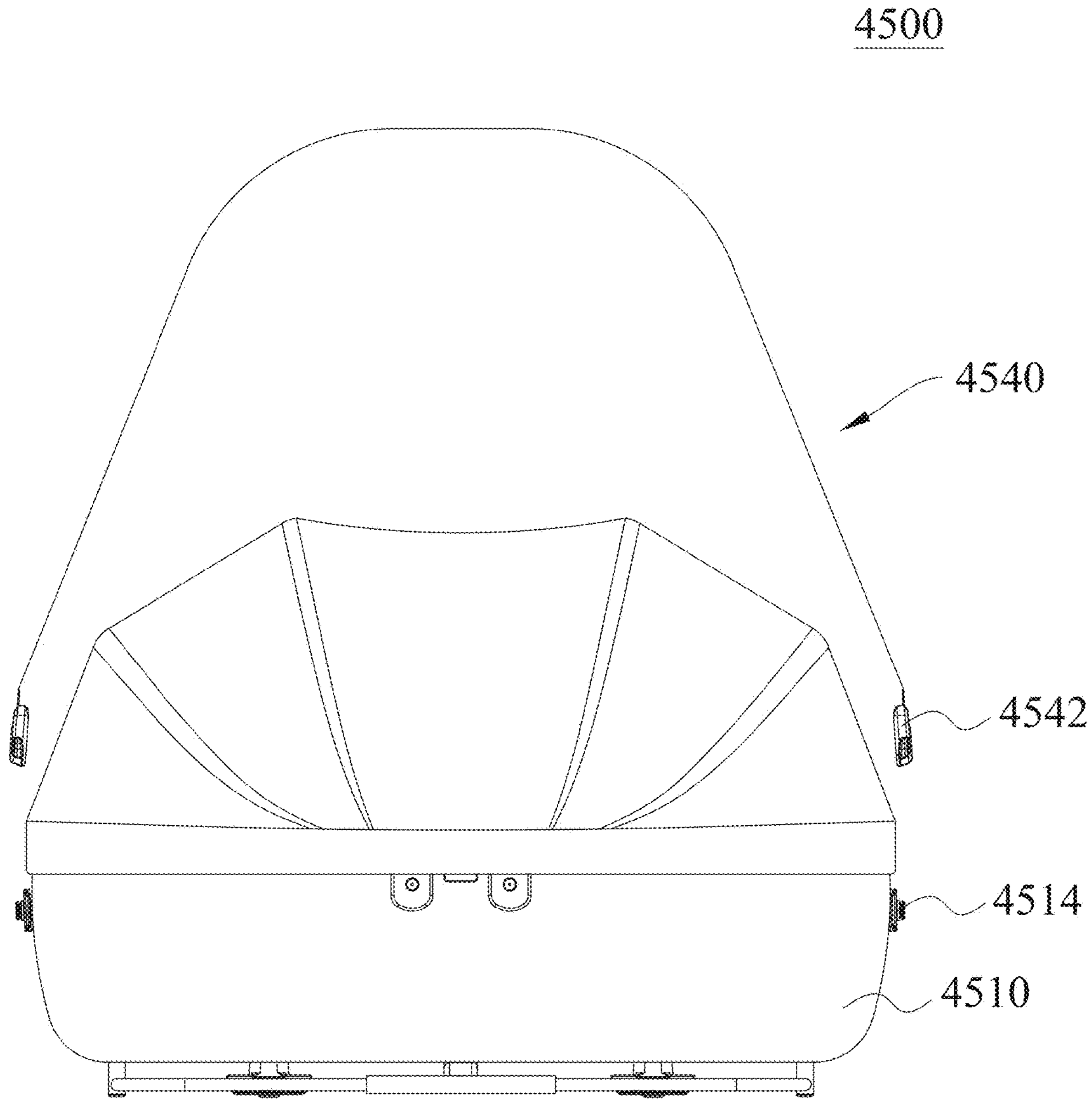

As shown in FIGS. 64A to 64D, the strap 4540 includes a strap body 4541 and strap connecting parts 4542 respectively disposed at both ends of the strap body 4541, and the strap connecting parts 4542 are connected with connecting elements 4514 disposed at opposite two sides of the main body 4510. In an example, as shown in FIGS. 64C and 64D, the strap connecting part 4542 of the strap 4540 and the connecting part 4514 disposed on the main body 4510 may be magnetic buckle assemblies that are cooperated with each other, but the present disclosure is not limited thereto. For example, the strap connecting part 4542 may be a hook and used together with the corresponding D-shaped buckle ring on the main body 4510. That is, the strap connecting part 4542 and the connecting part 4514 may also be any components that may be cooperatively connected, such as buckle structures, concave-convex structures, hook-and-loop structures, or the like. In addition, in another embodiment, at least one connecting element 4514 on the main body 4510 may also be disposed on the opposite long sides of the main body 4510 (diagonally), and the present disclosure is not limited to the arrangement position of at least one connecting element 4514.

Figure 65:
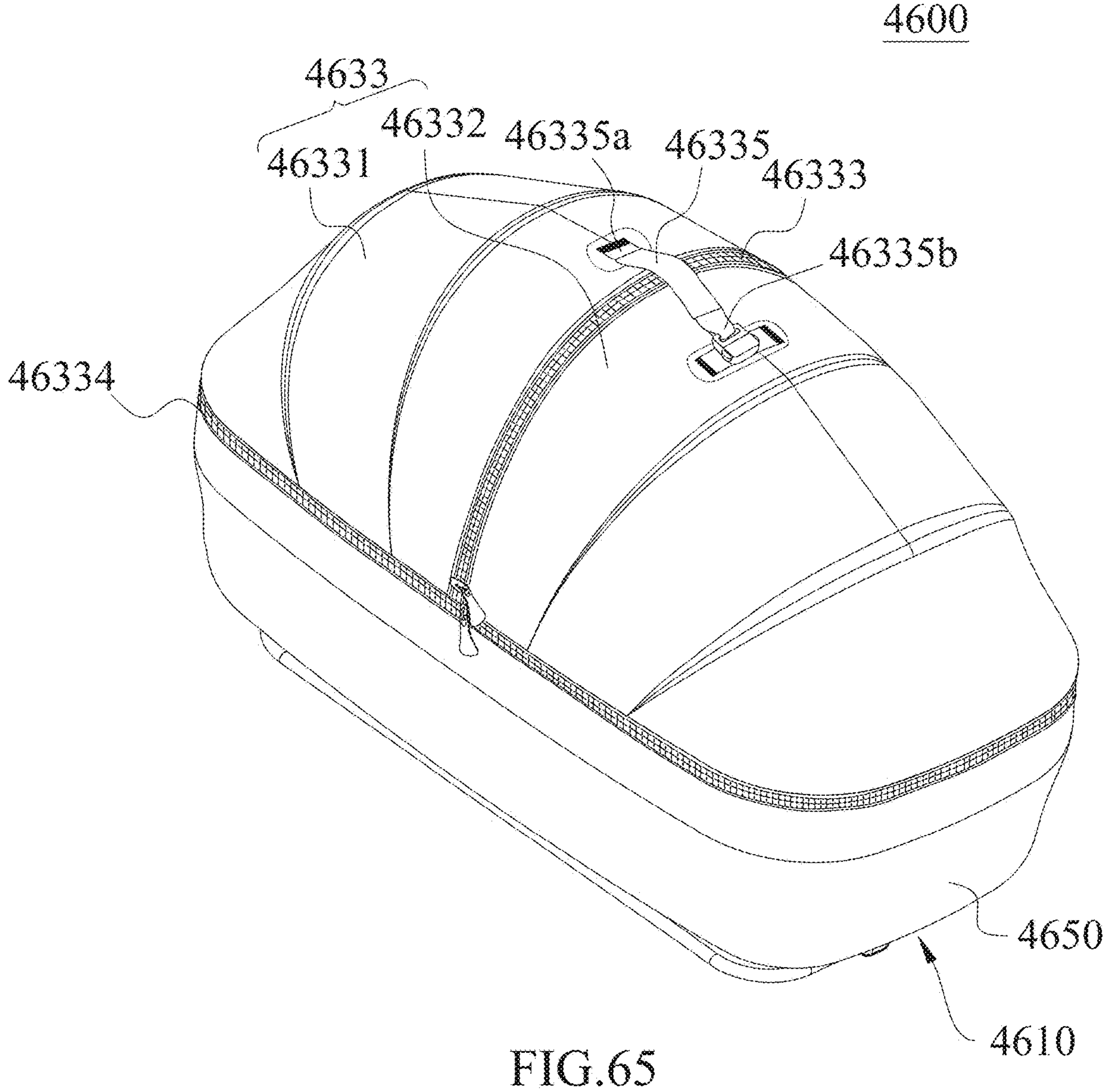
FIG. 65 shows a perspective schematic view of a carrier according to a still another embodiment of the fourth aspect of the present disclosure.

Referring to FIG. 65, a carrier 4600 according to still another embodiment of the fourth aspect of the present disclosure is shown.

As shown in FIG. 65, a canopy 4633 of the carrier 4600 includes a first cover 46331, a second cover 46332 and a cover connecting assembly 46333. The cover connecting assembly 46333 is disposed between the first cover 46331 and the second cover 46332 for detachably connecting the first cover 46331 and the second cover 46332 with each other. Optionally, the first cover 46331 and the second cover 46332 have the same area. In addition, in an example, a connecting structure is provided between the canopy 4633 of the carrier 4600 and the main body 4610 for keeping the canopy 4633 closed with respect to the main body 4610. For example, the connecting structure includes a canopy connecting assembly 46334, which is disposed between the canopy 4633 and the cloth 4650 sleeved outside the main body 4610, and is respectively disposed around a periphery of the canopy 4633 and a periphery of the cloth 4650, so that the canopy 4633 and the cloth 4650 sleeved outside the main body 4610 may be connected separately with each other. In an example, the canopy connecting assembly 46334 is a zipper assembly.

In addition, as shown in FIG. 65, the canopy 4633 may also be provided with a fixing belt 46335, which is connected between the first cover 46331 and the second cover 46332. More specifically, an end (i.e., a fixed end 46335*a*) of the fixing belt 46335 is fixedly connected to the first cover 46331, and the other end (i.e., a detachable end) thereof is detachably connected to the second cover 46332, for example, by snap-fitting, so that the carrier 4600 may be grasped and lifted by the user, and the connection between the first cover 46331 and the second cover 46332 is prevented from being accidentally detached to cause the canopy fully opened. In an example, a piece of cloth may also be sewn on an inner surface of the first cover 46331 at a position corresponding to the fixed end 46335*a* of the fixing belt 46335, so as to increase the structural strength at this position, thereby avoiding the tearing of the first cover 46331 due to the long-term use of the fixing belt 46335 (for example, repeated pulling). Similarly, a piece of cloth may be sewn on an inner surface of the second cover 46332 at a position corresponding to the connection with the detachable end 46335*b* of the fixing belt 46335, so as to increase the structural strength.

Figure 66:
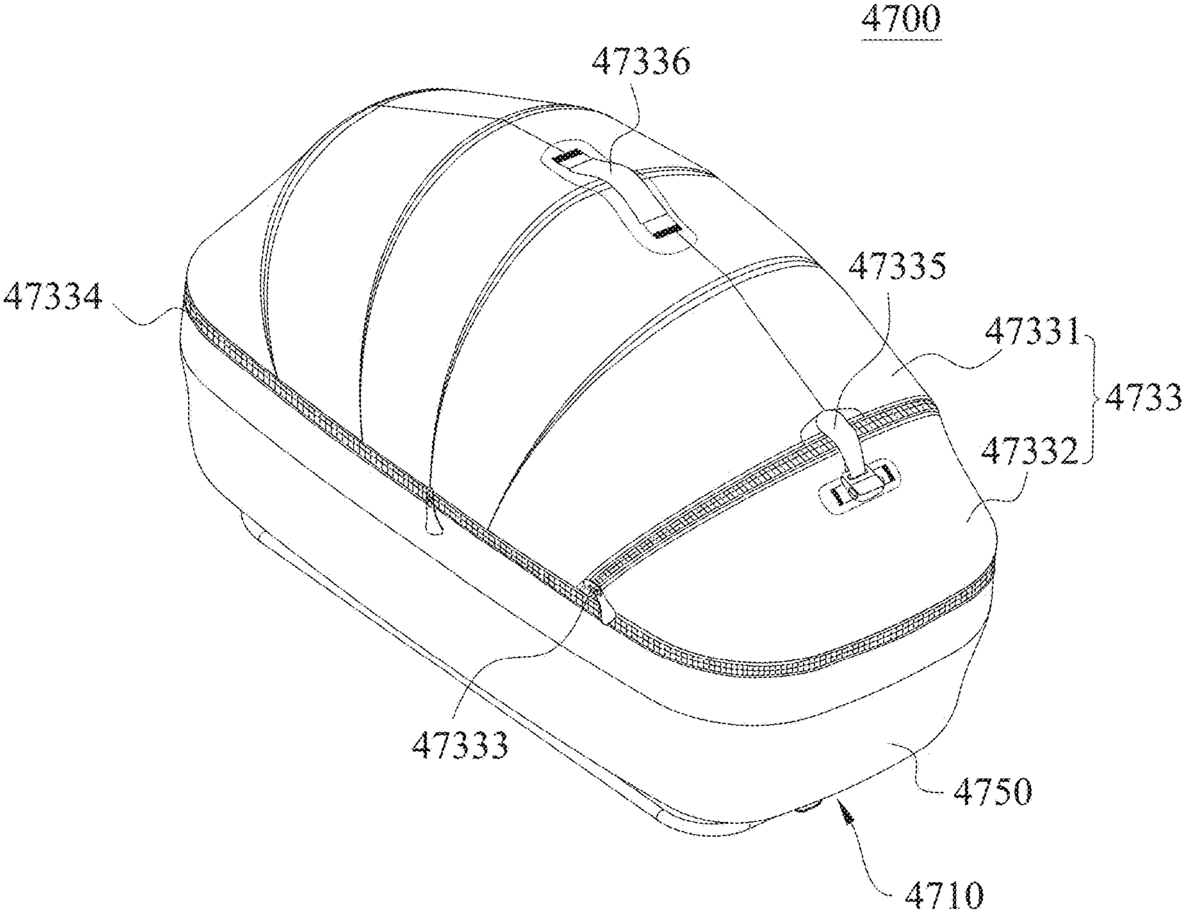
FIG. 66 shows a perspective schematic view of a carrier according to a further still another embodiment of the fourth aspect of the present disclosure.
Figure 67A:
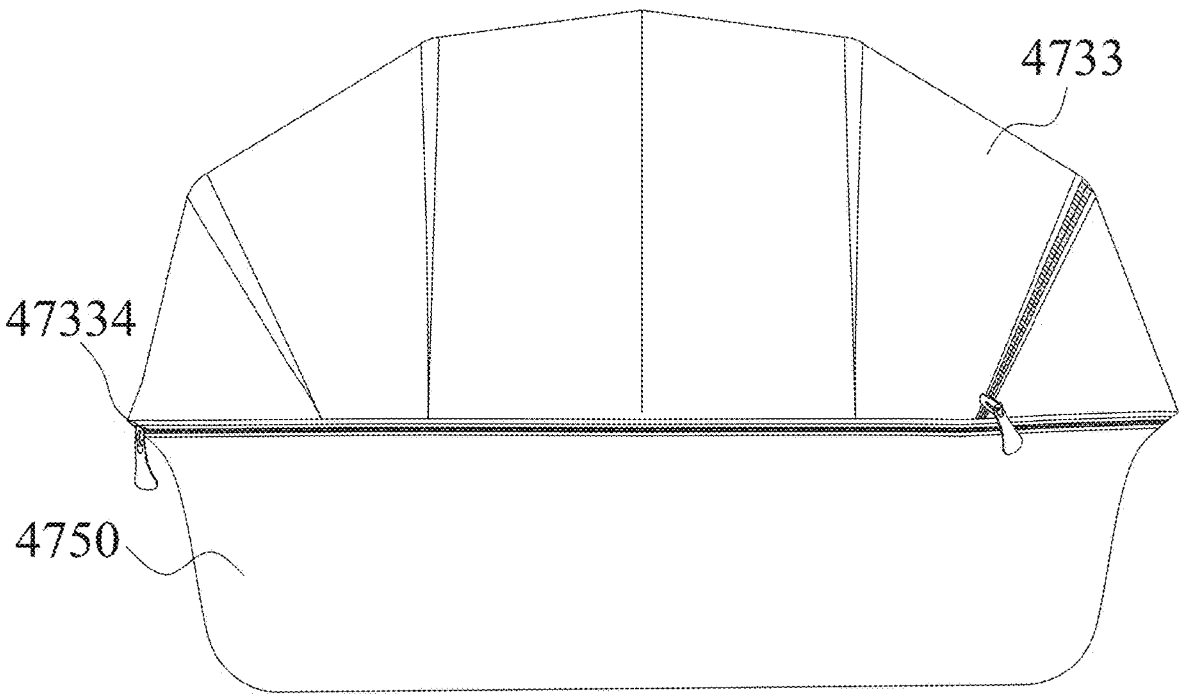
FIGS. 67A and 67B show schematic views of a canopy and a cloth to which the canopy is connected according to an embodiment of the fourth aspect of the present disclosure.
Figure 67B:
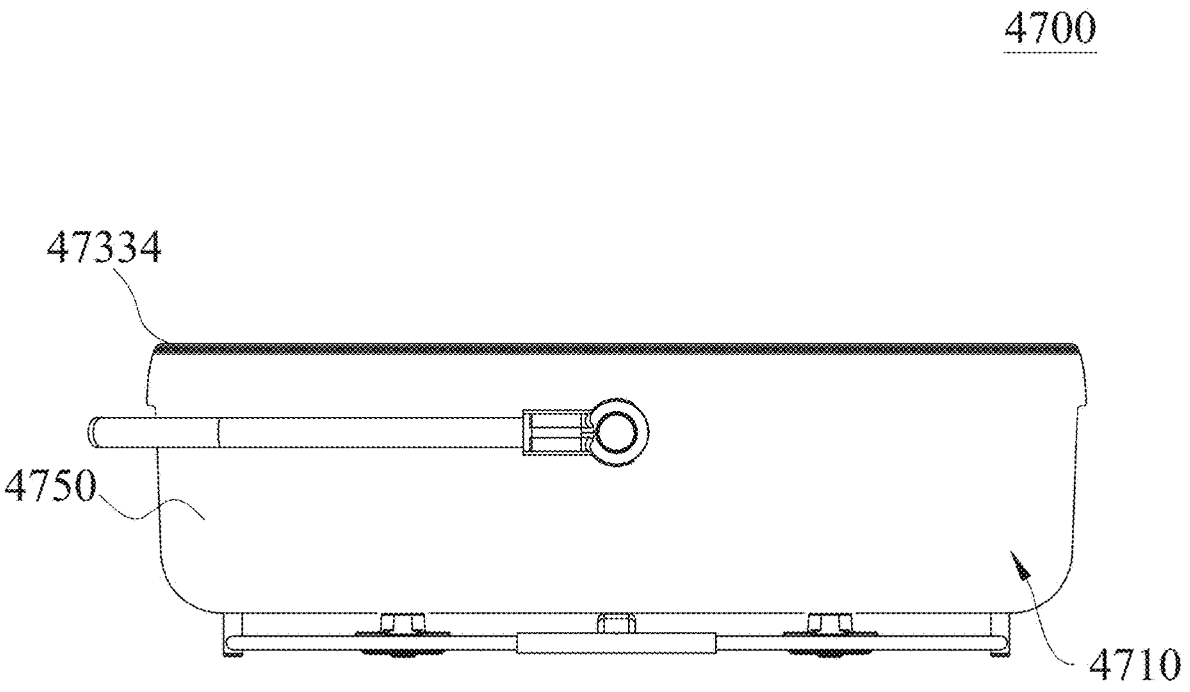

Referring to FIGS. 66, 67A and 67B, FIG. 66 shows a carrier 4700 according to a further embodiment of the fourth aspect of the present disclosure, FIG. 67A shows a schematic view of a canopy 4733 and a cloth 4750 connected therewith, and FIG. 67B shows a schematic view of the carrier 4700 after the canopy and the cloth connected therewith are removed.

As shown in FIG. 66, similar to the carrier 4600 in the above-mentioned embodiment, the canopy 4733 of the carrier 4700 includes a first cover 47331, a second cover 47332 and a cover connecting assembly 47333. An area of the first cover 47331 is larger than that of the second cover 47332, and the cover connecting assembly 47333 is disposed between the first cover 47331 and the second cover 47332 for detachably connecting the first cover 47331 and the second cover 47332 with each other, so that an opening defined by the cover connecting assembly 47333 is offset with respect to the centerline. In another embodiment, two or more cover connecting assemblies 47333 may be provided to open the canopy 4733 by different angles. In addition, similar to the canopy connecting assembly 46334 of the above embodiment, a canopy connecting assembly 47334 may also be provided in this embodiment, which is not repeated herein. In an example, both the cover connecting assembly 47333 and the canopy connecting assembly 47334 may be zipper assemblies.

In addition, the canopy 4733 may also be provided with a fixing belt 47335 and a lifting belt 47336. The fixing belt 47335 is similar to the fixing belt 46335 in the previous embodiment, with one end fixedly connected to the first cover 47331 and the other end detachably connected to the second cover 47332, for example by snap fitting, so as to prevent the canopy 4733 from being accidentally opened. Both ends of the lifting belt 47336 are fixed to the first cover 47331 with a large area. In an example, the lifting belt 47336 is fixed right above the canopy 4733 for the user to grasp and lift the carrier 4700. Similarly, a piece of cloth may be sewn on an inner surface of the first cover 47331 at the connection with both ends of the lifting belt 47336 to increase the structural strength.

In this embodiment, as shown in FIG. 67A, the canopy 4733 may be integrally formed with the cloth (i.e., a lined cloth) inside the main body 4710. When the carrier 4700 needs to be cleaned or maintained, the canopy 4733 may be detached together with the lined cloth 4750, and the carrier 4700 after the canopy and the cloth are detached is shown in FIG. 67B. In an example, as shown in FIGS. 67A and 67B, after the canopy 4733 is detached, the cloth 4750 connected to the canopy 4733 and the cloth 4750 outside the main body 4710 are respectively provided with mutually cooperating parts of the canopy connecting assembly 47334, such as two cooperating parts of a zipper assembly. In an example, the cloth 4750 outside the main body 4710 is undetachable, but the present disclosure is not limited thereto. In another example, a connecting assembly (such as a zipper assembly, not shown) may be added between the canopy 4733 and the cloth 4750 connected thereto, so that the canopy 4733 and the cloth 4750 connected thereto may be separated from each other, and the detached cloth 4750 and the cloth 4750 outside the main body 4710 may be connected through the canopy connecting assembly 47334, corresponding structures of which cooperate with each other, thereby increasing the diversity of use.

Figure 68A:
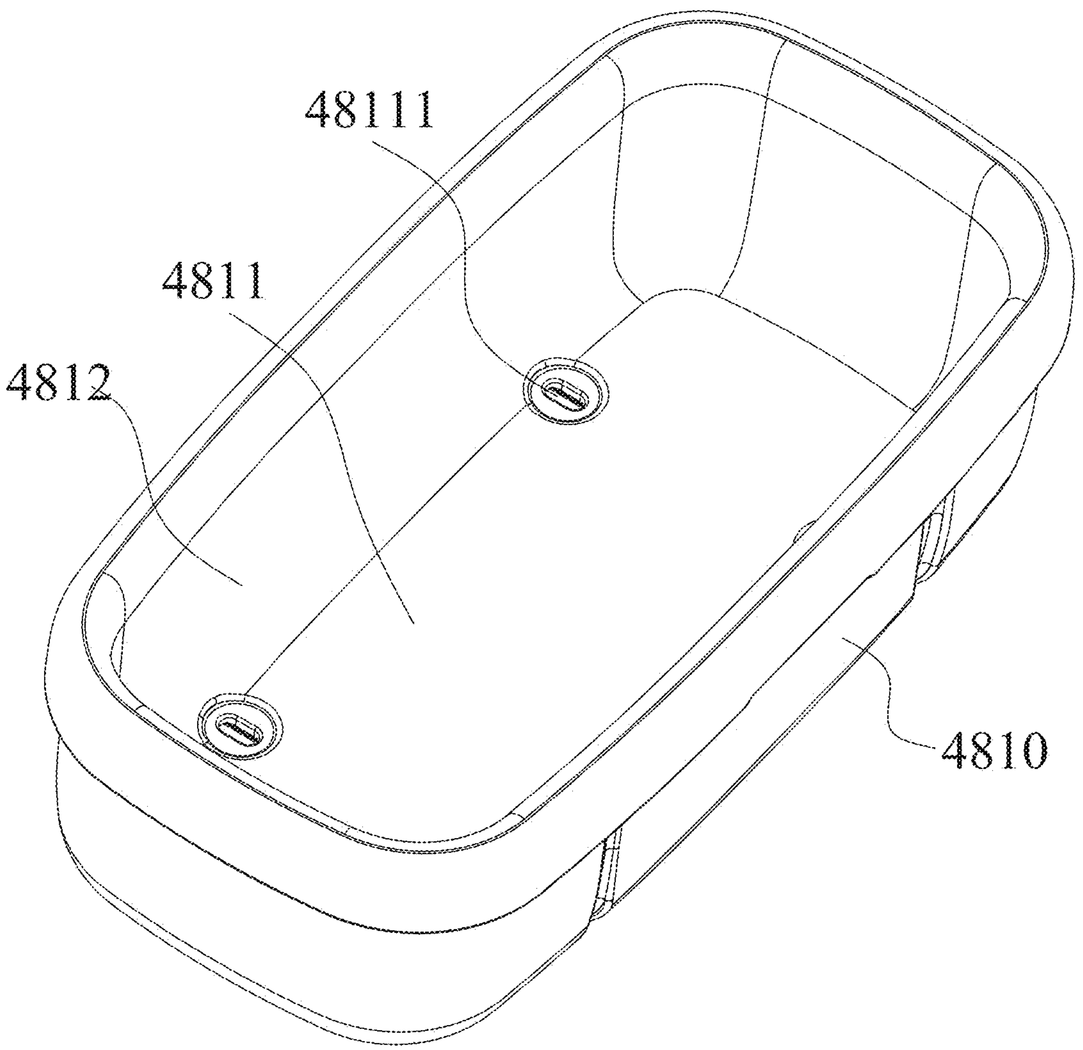
FIGS. 68A to 68D show perspective schematic views of a bracket device, a main body and a combination thereof according to an embodiment of the fourth aspect of the present disclosure.
Figure 68B:
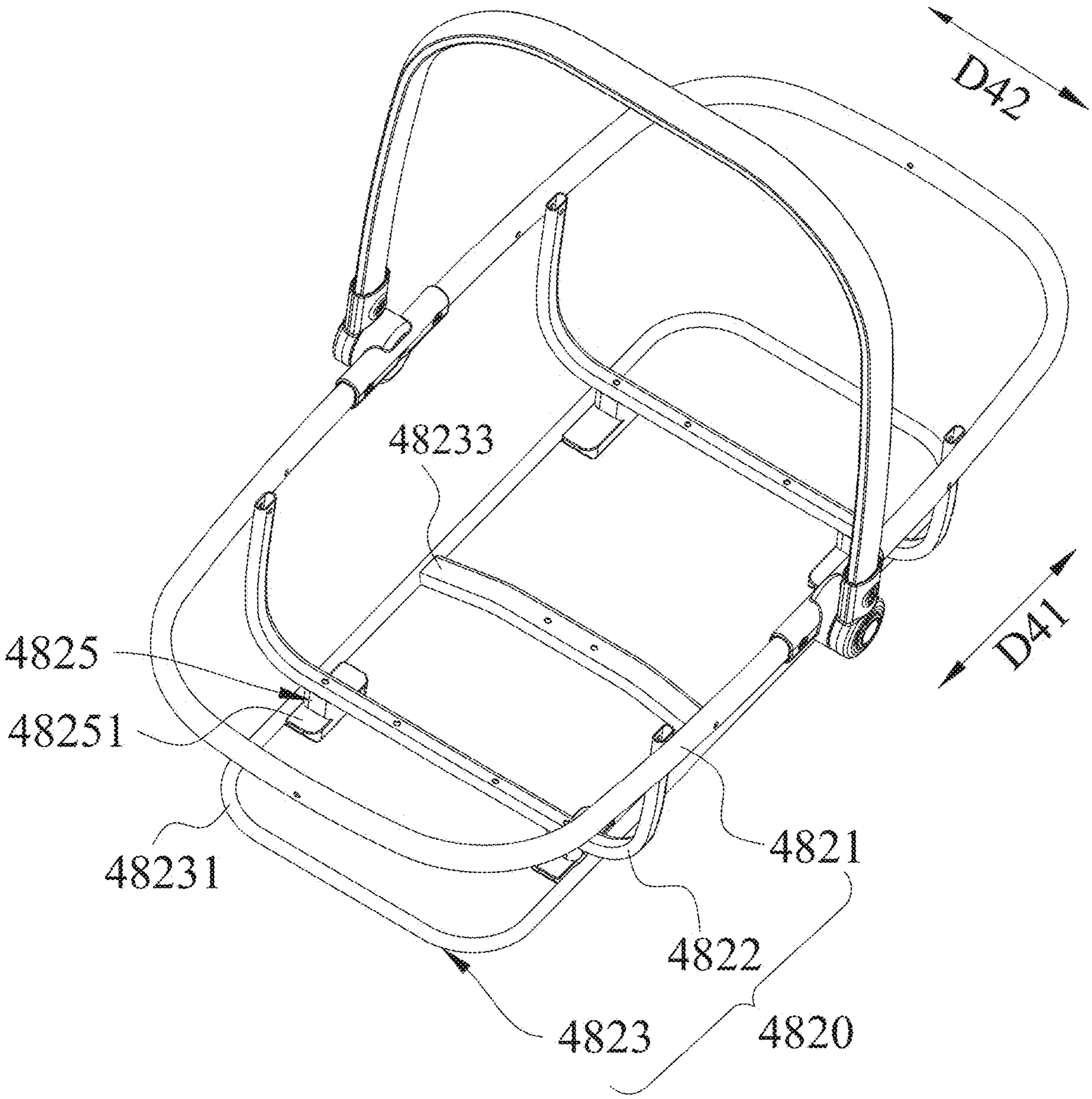
Figure 68C:
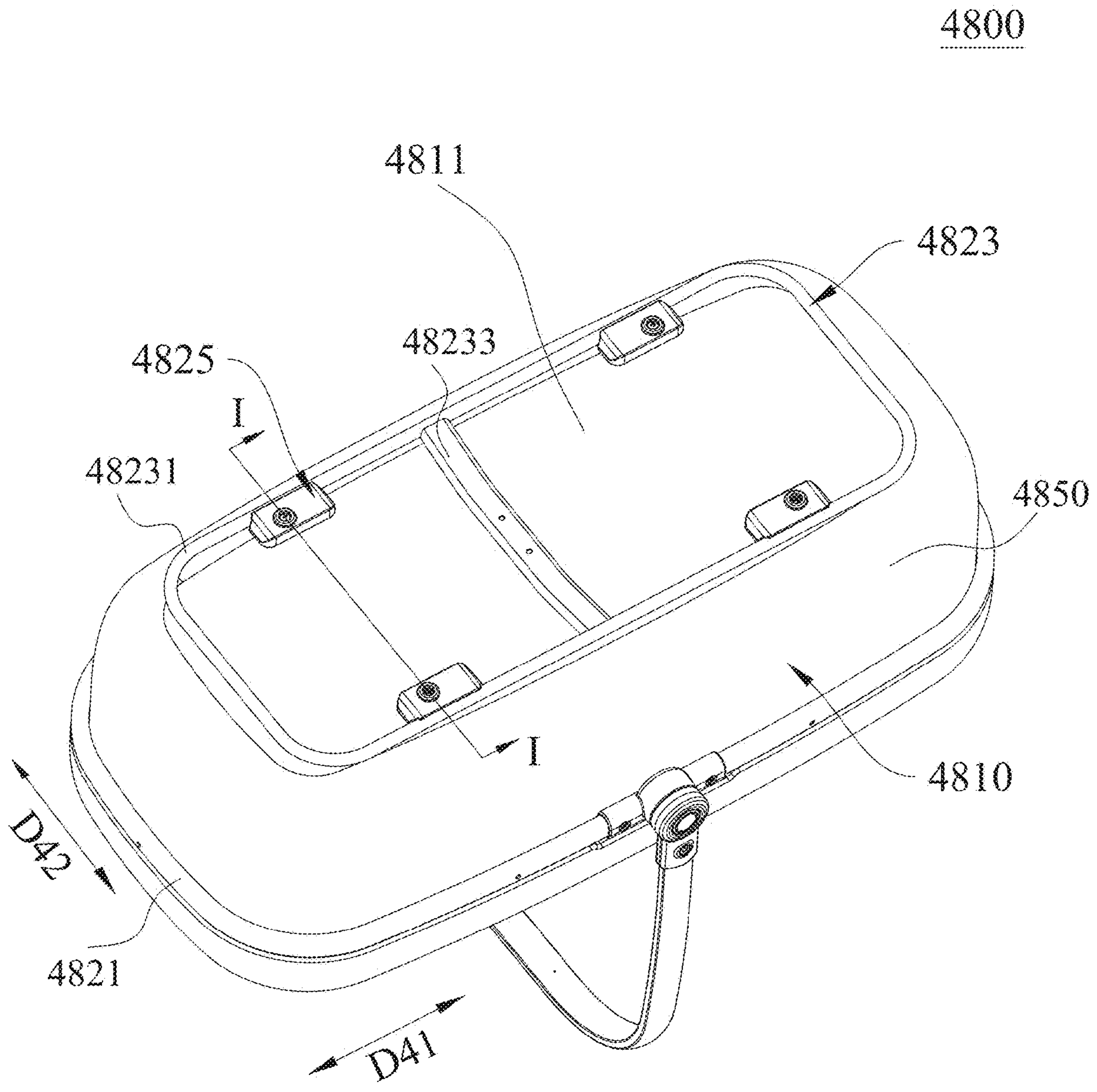
Figure 68D:
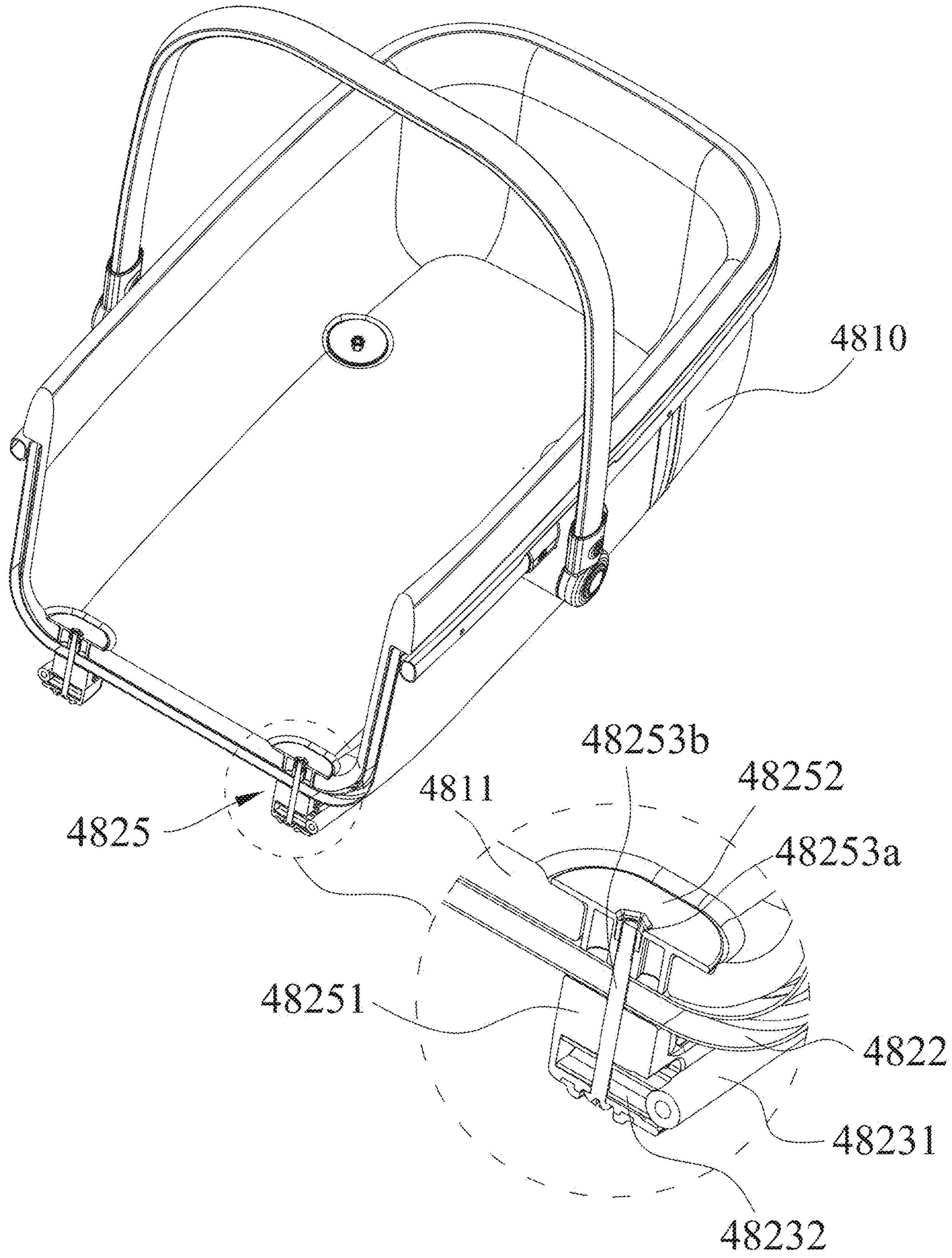

Referring to FIGS. 68A to 68D, a bracket device, a main body and a combination thereof according to an embodiment of the fourth aspect of the present disclosure are respectively shown. Specifically, FIG. 68A shows a main body 4810, FIG. 68B shows a bracket device 4820, FIG. 68C shows a bottom perspective view of the bracket device 4820 assembled with the main body 4810, and FIG. 68D shows a cross-sectional view taken along a line I-I of FIG. 68C and its partial enlarged view.

The carrier 4800 of this embodiment includes the main body 4810 and the bracket device 4820. As shown in FIG. 68A, the main body 4810 (which may also be used as a "carrying portion") includes a bottom portion 4811 and a peripheral wall 4812 connected around the bottom portion 4811, and an accommodation space (i.e., a carrying space) formed by the bottom portion 4811 and the peripheral wall 4812 has an opening that is opened upwards. As shown in FIG. 68B, the bracket device 4820 includes a first bracket 4821, two second brackets 4822, a third bracket 4823, and a fixing assembly 4825 connecting the main body 4810, the second bracket 4822 and the third bracket 4823.

Further referring to FIG. 68C, FIG. 68C shows a perspective schematic view of the carrier 4800 which is assembled by the main body 4810 shown in FIG. 68A and the bracket device 4820 shown in FIG. 68B. It should be noted that, a sidewall of the main body 4810 shown in FIG. 68C is covered with a cloth 4850, so that the second bracket 4822 is shielded and is invisible.

Referring to FIGS. 68A to 68C, the first bracket 4821 is combined to the main body 4810, and is substantially horizontally disposed around the peripheral wall 4812 of the main body 4810 and close to the opening of the main body 4810. Two second brackets 4822 are respectively connected to the first bracket 4821 and disposed apart from each other along the longitudinal direction D41 of the main body 4810. Each of the second brackets 4122 is combined to the main body 4810 and extends from one side of the peripheral wall 4812 of the main body 4810 to the other side of the peripheral wall 4812 of the main body 4810 along the transverse direction D42 of the main body 4810 via the bottom portion 4811 of the main body 4810. The third bracket 4823 is located at the bottom portion 4811 of the main body 4810 and is spaced apart from the bottom portion 4811 of the main body 4810 (especially a lower surface of the bottom portion 4811 of the main body 4810, that is, a bottom surface of the main body 4810) through the fixing assembly 4825. The first bracket 4821 and the third bracket 4823 are disposed on the upper and lower sides of the bottom portion 4811 of the main body 4810 in a vertical direction. Further, the second bracket 4822 may be a U-shaped structural element. The second bracket 4122 is disposed between the first bracket 4821 and the third bracket 4823, and includes two vertical parts and a transverse part. The two vertical parts are substantially vertically connected to the first bracket 4821, and the transverse part is substantially vertically connected to the fixing assembly 4825.

In addition, the third bracket 4823 includes an engaging element 48231, a connecting rod (see "48232" in FIG. 68D, which will be described below) and a structural reinforcement element 48233. Specifically, the engaging element 48231 may be an annular structural element, and the fixing assemblies 4825 are symmetrically connected to the engaging element 48231 in pairs, and are separated from each other in the longitudinal direction D41 and the transverse direction D42. The structural reinforcement element 48233 is disposed between the two fixing assemblies 4825 in the longitudinal direction D41, and the structural reinforcement element 48233 is at approximately equal distances from each of the two fixing assemblies 4825, so as to further enhance the structural support strength of the third bracket 4823.

Further referring to FIG. 68D, the fixing assembly 4825 includes a guide 48251. The guide 48251 may be disposed in a plane surrounded by the engaging element 48231, and the fixing assembly 4825 is connected with the third bracket 4823 through a connecting rod 48232 connected with the engaging element 48231. Optionally, the guide 48251 is connected substantially vertically and the connecting rod 48232 is sleeved therein. The guide 48251 may be plastic, metal or other materials with certain rigidity. For example, the guide 48251 may be T-shaped (see FIG. 68B).

Figure 68E:
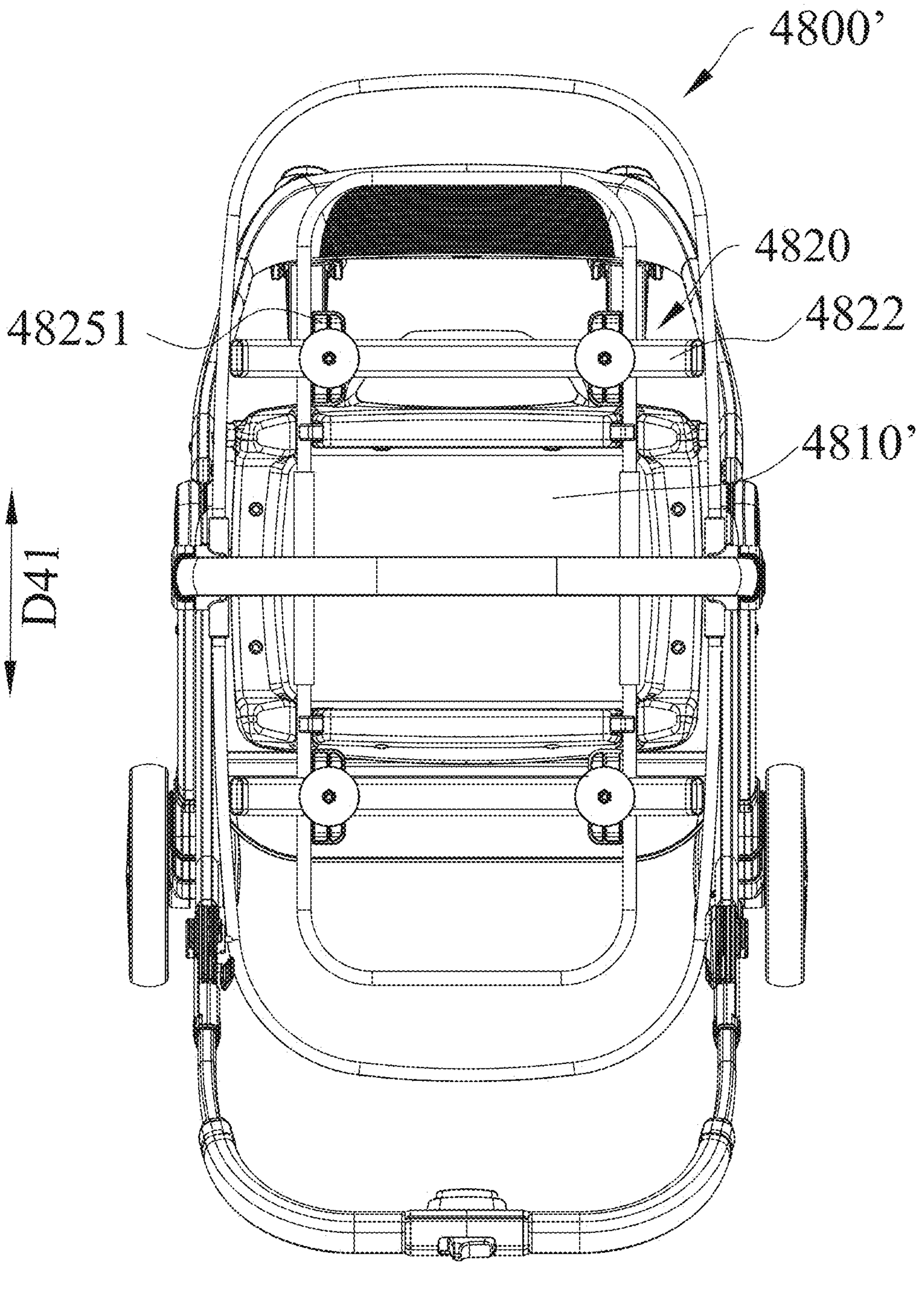
FIG. 68E shows a schematic top view of the combination of the bracket device and a carrying frame, which are applicable to the carrier according to an embodiment of the fourth aspect of the present disclosure.

More specifically, as shown in FIGS. 68A and 68D, the fixing assembly 4825 further includes a bracket connecting element 48252 and a securing combination. The bottom portion 4811 of the main body 4810 is provided with a plurality of through slots 48111 (see FIG. 68A) penetrating through the bottom portion 4811 of the main body 4810, which are respectively disposed corresponding to the fixing assemblies 4825. The securing combination includes a matching element 48253*a* disposed on the bracket connecting element 48252 and a securing element 48253*b* for locking with the matching element 48253*a*. The securing element 48253*b* sequentially passes through the bracket connecting element 48252, the second bracket 4822, the guide 48251 and the connecting rod 48232 in the vertical direction, so as to stably and firmly combine the main body 4810 with the bracket device 4820. Referring to FIG. 68E, FIG. 68E shows a schematic top view of the combination of the bracket device 4820 and a carrying frame 4800', which are applicable to the carrier 4800 of an embodiment of the fourth aspect of the present disclosure.

With reference to FIGS. 68A to 68D and 68E, it can be seen that when the carrier 4800 having a longer size (also referred to as "long-sized carrier") is mounted to the carrying frame 4800', the second brackets 4822 are located on the carrying frame 4800' at both sides of the base plate 4810' in the longitudinal direction D41. In detail, as shown in FIG. 68E, when the carrier 4800 is mounted on the base plate 4810' of the carrying frame 4800', it has a plurality of engaging points, such as four engaging points. The engagement points are located between the two second brackets 4822, and further, between the guide 48251 and the structural reinforcement element 48233 (shielded by the base plate 4810', see FIG. 68C).

In addition, the structure of the bracket device 4820 in this embodiment and its combination with the main body 4810 or 4810' may also refer to the bracket device 3120 and its combination with the main body 3110 according to the third aspect of the present disclosure.

Figure 69A:
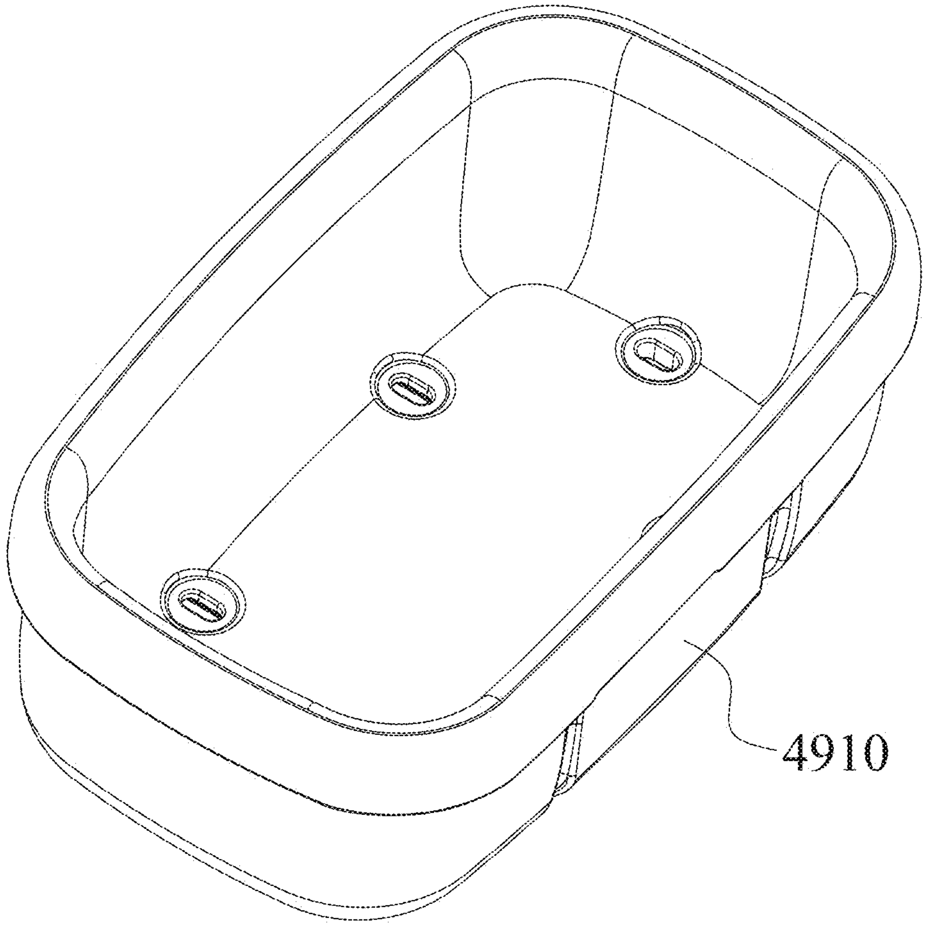
FIGS. 69A to 69C show perspective schematic views of a bracket device, a main body and a combination thereof according to another embodiment of the fourth aspect of the present disclosure.
Figure 69B:
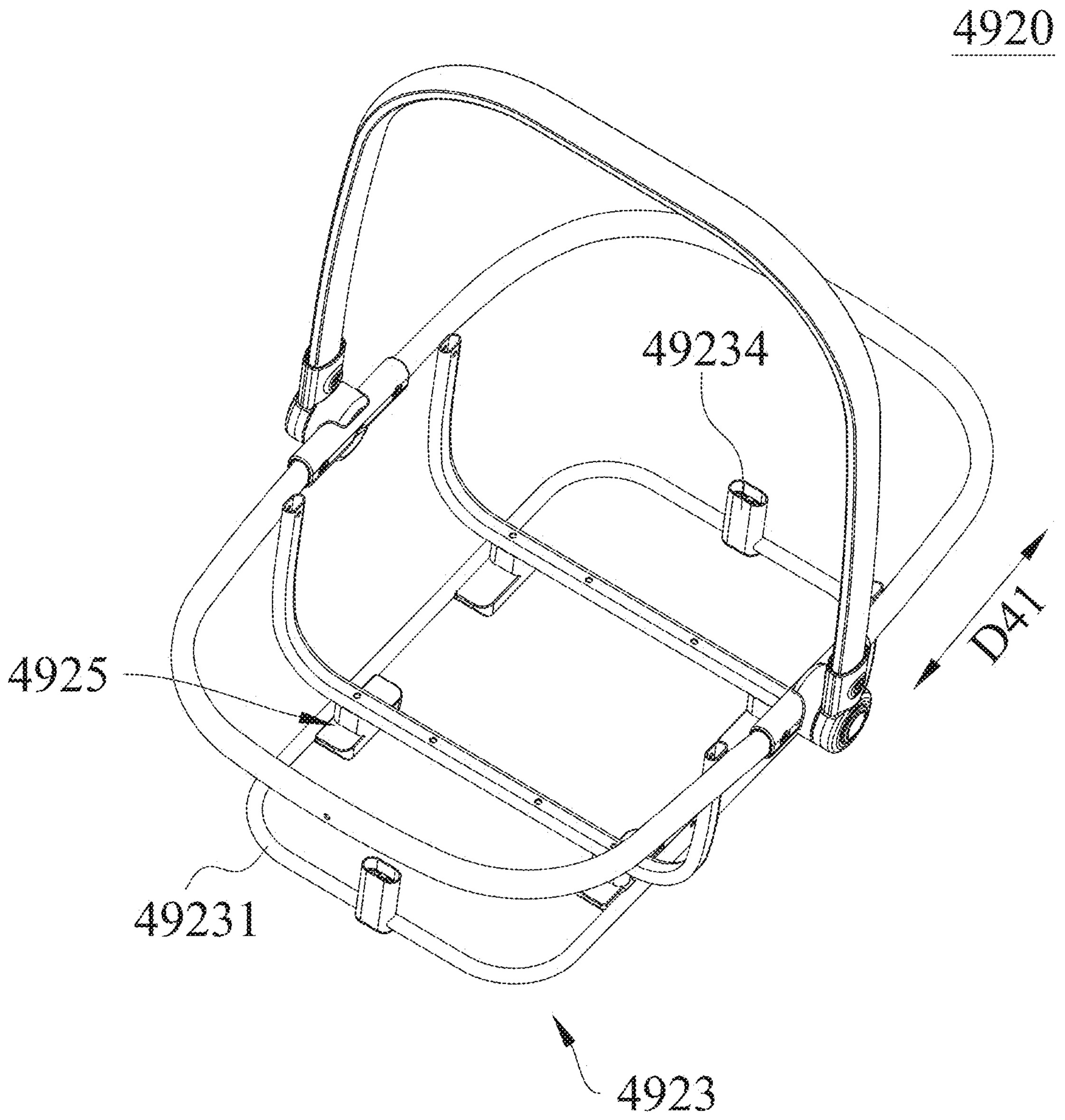
Figure 69C:
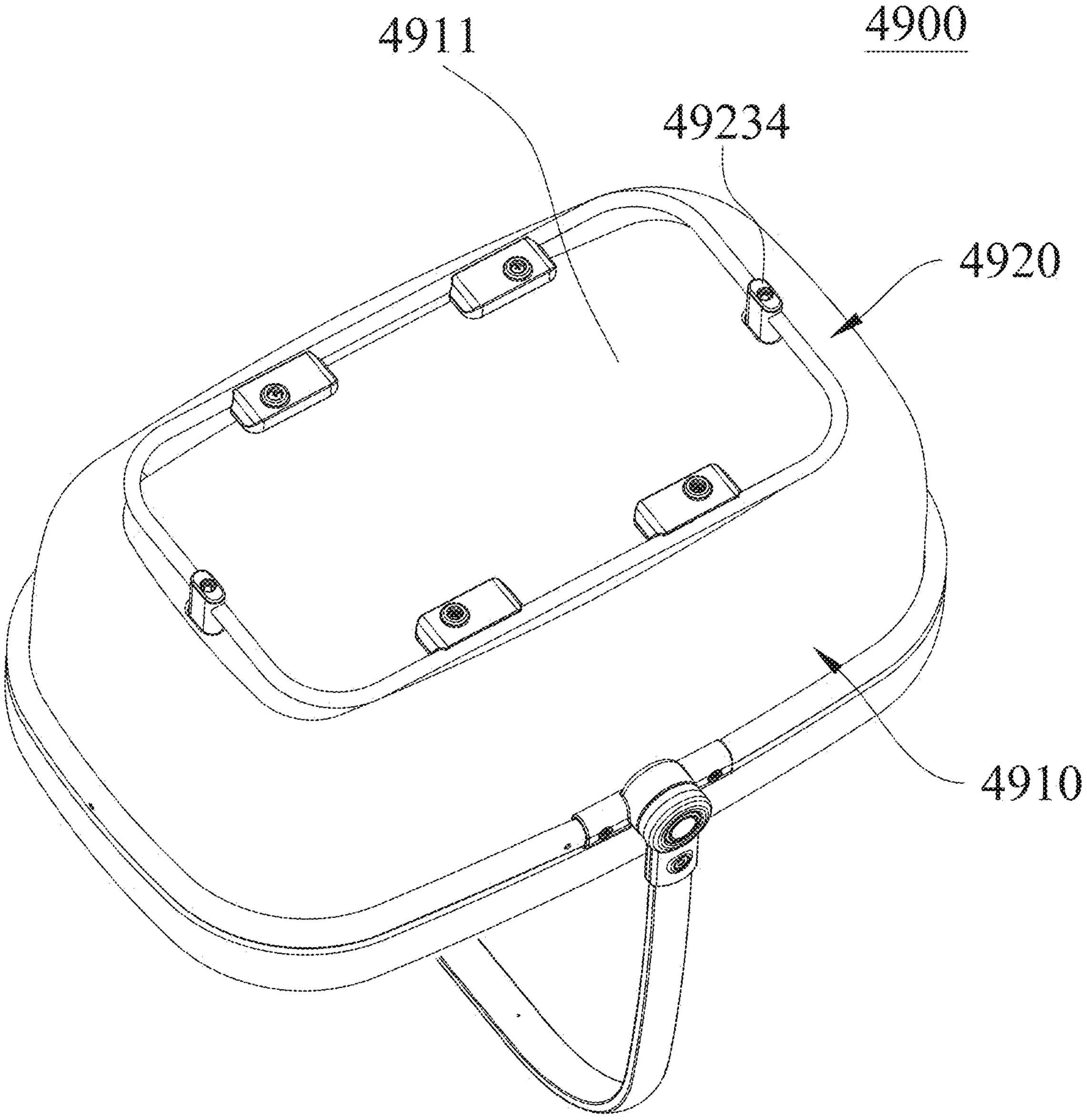

Referring to FIGS. 69A to 69C, a bracket device, a main body and a combination thereof according to an embodiment of the fourth aspect of the present disclosure are respectively shown. Specifically, FIG. 69A shows the main body 4910, FIG. 69B shows the bracket device 4920, and FIG. 69C shows a bottom perspective view of the bracket device 4920 assembled with the main body 4910.

As shown in FIGS. 69A to 69C, the carrier 4900 has a shorter size than the carrier 4800 in the previous embodiment, but the main body 4910 (see FIG. 69A) and bracket device 4920 (see FIG. 69B) thereof are similar to those of the carrier 4800 in the previous embodiment, which will not be described in detail herein, and only the differences between the carrier 4900 and the carrier 4800 having a longer size in the previous embodiment of the present disclosure will be described.

Specifically, since a size of the carrier 4900 in the longitudinal direction D41 is relatively small, there may be no structural reinforcement element on the engaging element 49231 of the third bracket 4923, that is, there is no structural reinforcement element between the fixing assemblies 4925. Alternatively, connecting brackets 49234 may be respectively disposed at opposite two ends of the engaging element 49231 in the longitudinal direction D41, so that the main body 4910 and the bracket device 4920 are combined more stably. In an example, the connecting bracket 49234 is disposed in the middle of the opposite two sides (or ends) of the engaging element 49231. In another example, each of the sides may be provided with a plurality of connecting brackets 49234.

Figure 69D:
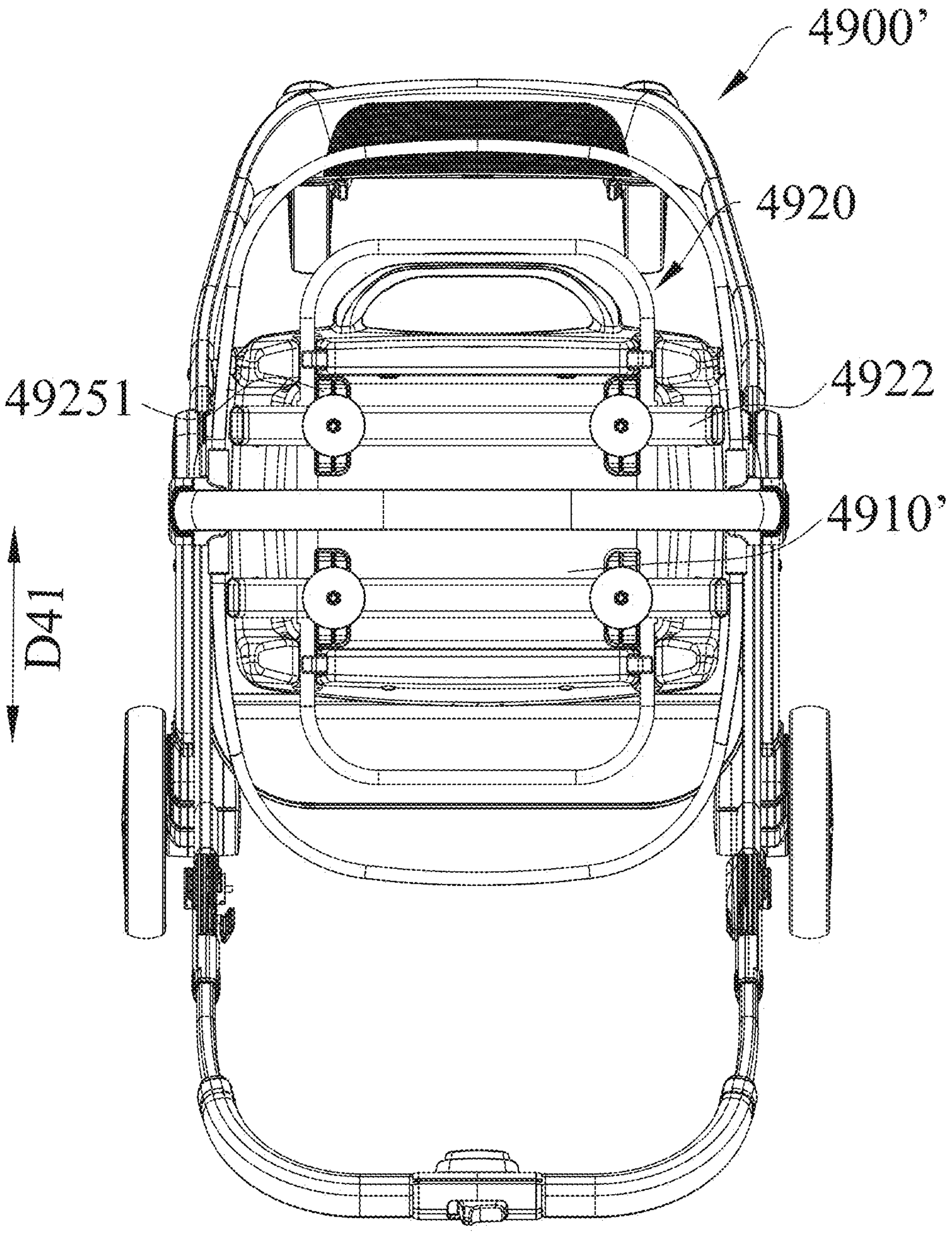
FIG. 69D shows a schematic plan view of the combination of the bracket device and a carrying frame, which are applicable to the carrier according to another embodiment of the fourth aspect of the present disclosure.

Referring to FIG. 69D, FIG. 69D shows a schematic plan view of the combination of the bracket device 4920 and a carrying frame 4900', which are applicable to the carrier 4900 of another embodiment of the fourth aspect of the present disclosure. It can be seen from FIGS. 69A to 69C and FIG. 69D that, when the carrier 4900 having a shorter size (also referred to as "short-sized carrier") is mounted on the carrying frame 4900', the second bracket 4922 is located above the base plate 4910' of the carrying frame 4900', that is, the second bracket 4922 is located within edges of the base plate 4910' at two sides thereof in the longitudinal direction D41. In detail, as shown in FIG. 69D, when the carrier 4900 is mounted on the base plate 4910' of the frame 4900', it has a plurality of engaging points, such as four engaging points. Each of the engagement points is located outside the two second brackets 4922, and further, outside the guide 49251.

Figure 70A:
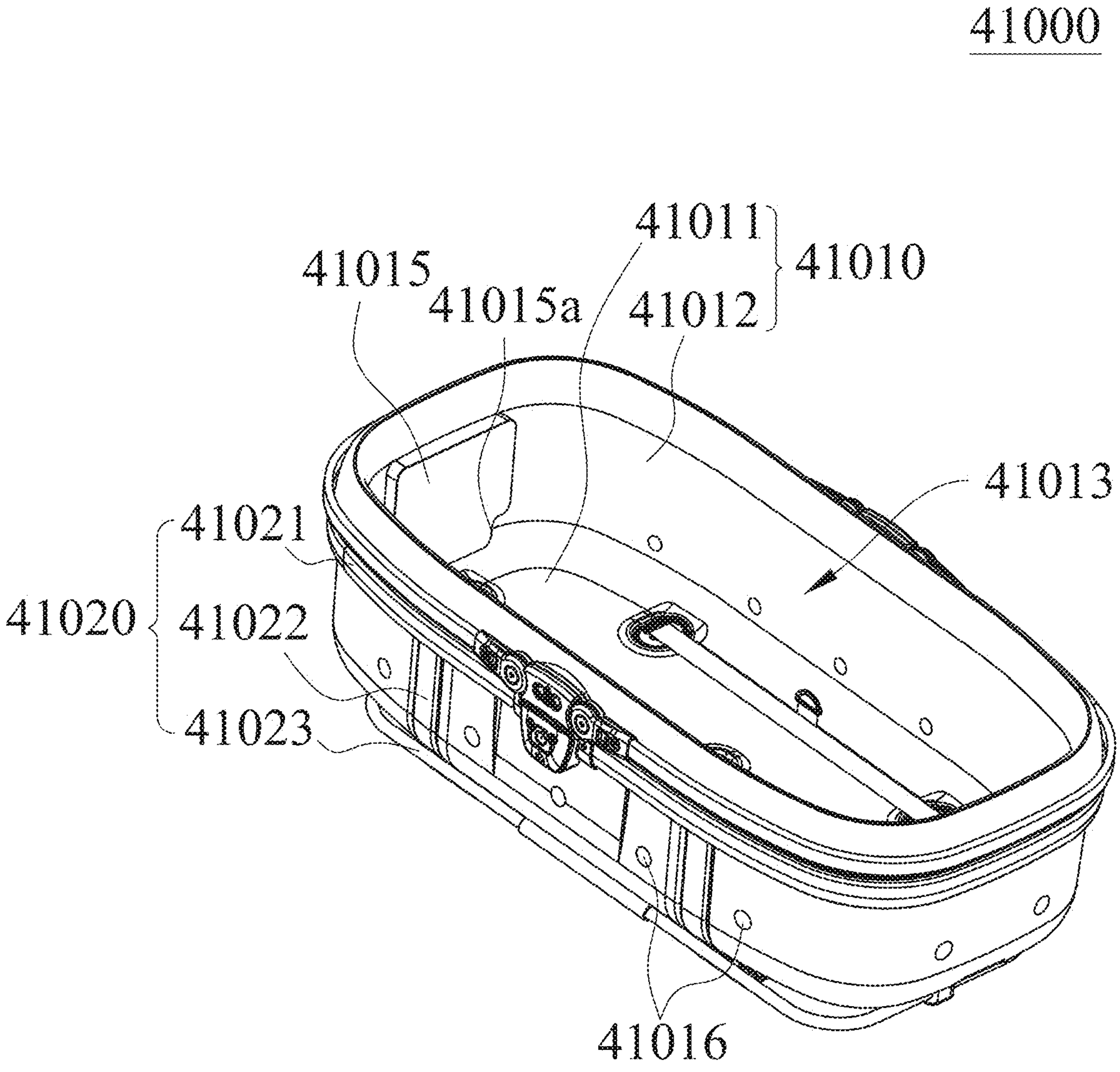
FIGS. 70A to 70G show a carrier and a bracket device thereof according to an embodiment of the fourth aspect of the present disclosure.
Figure 70B:
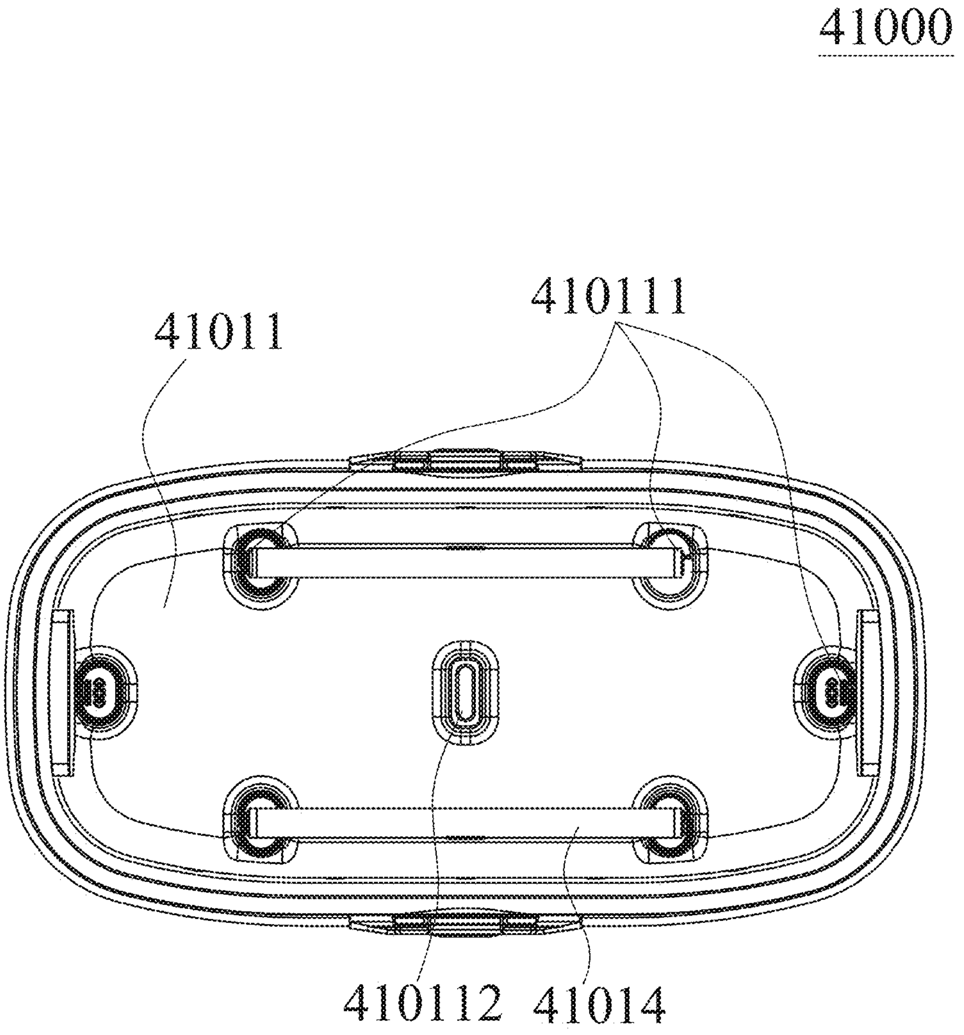
Figure 70C:
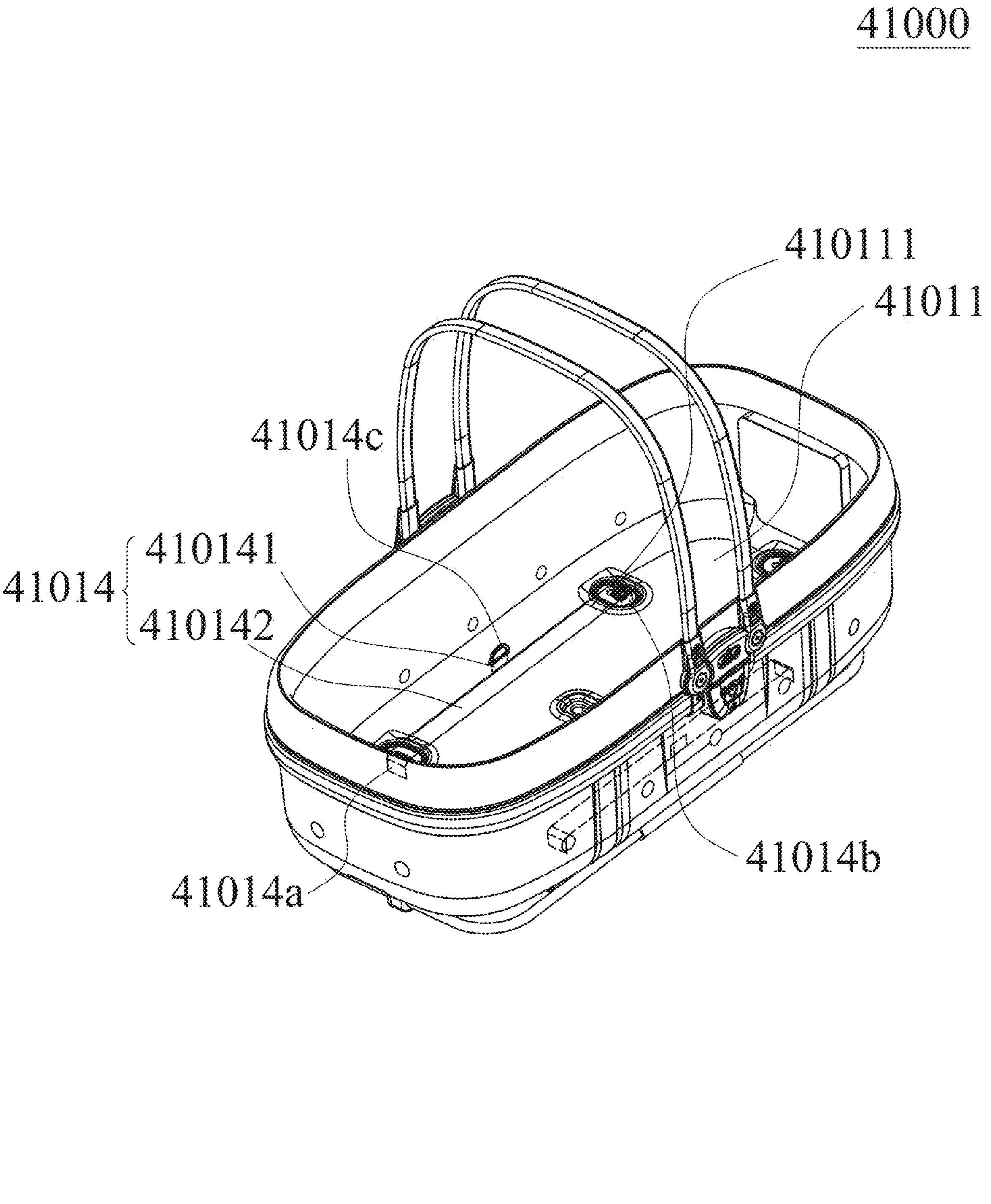
Figure 70D:
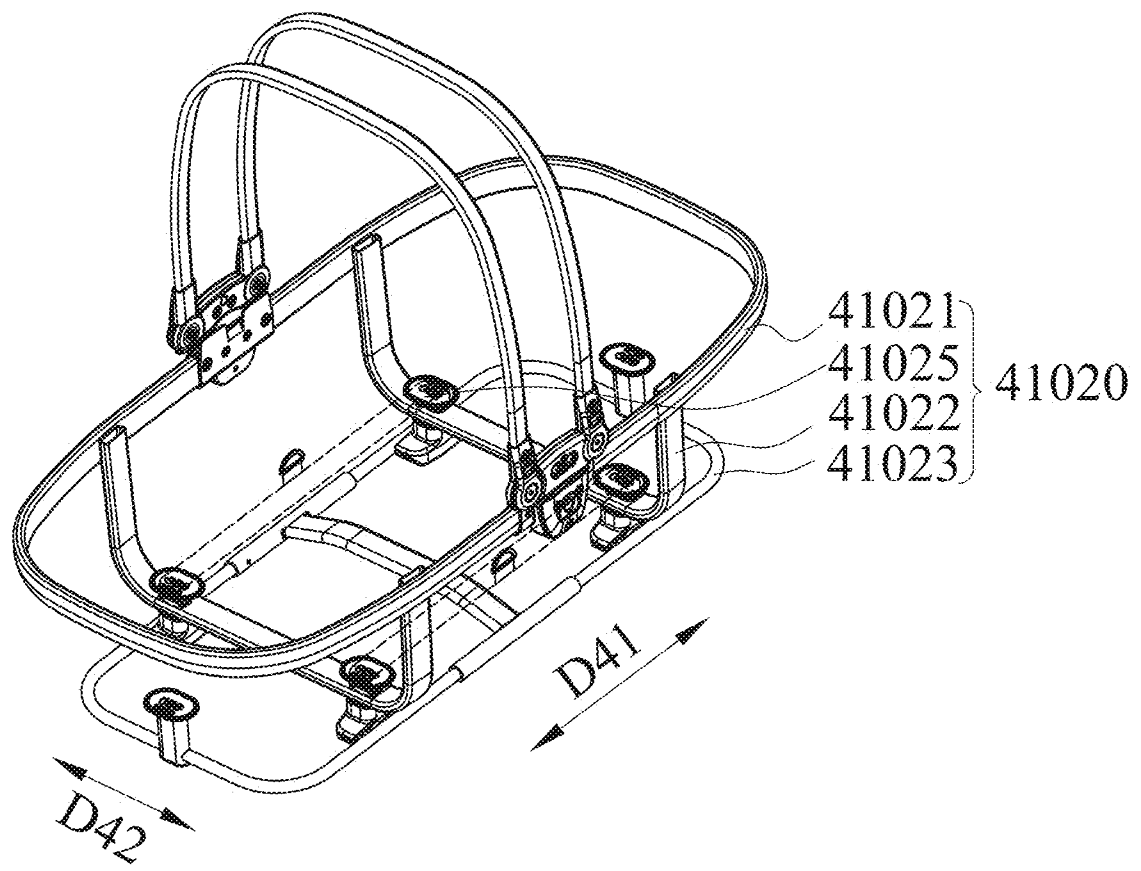
Figure 70E:
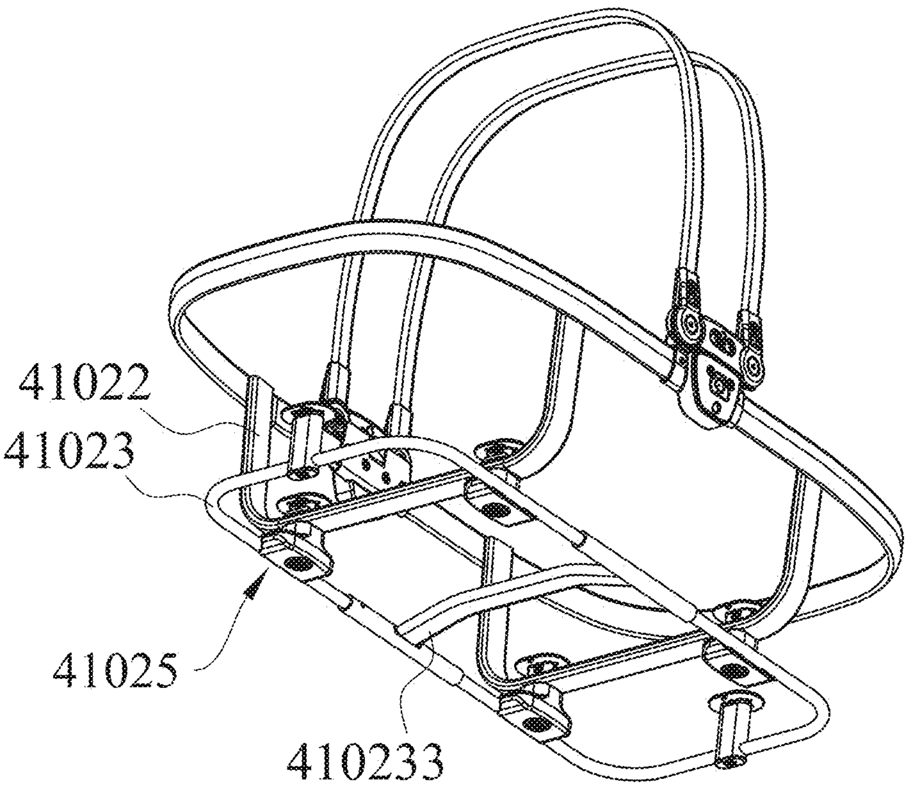
Figure 70F:
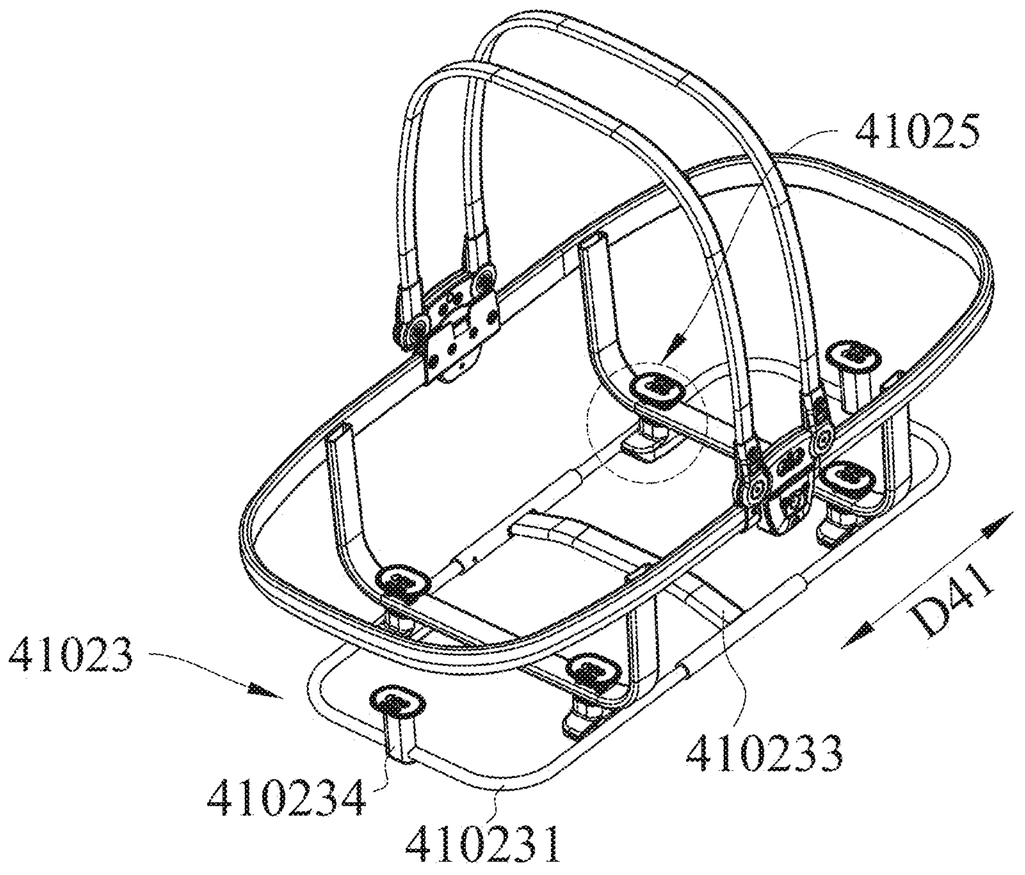
Figure 70G:
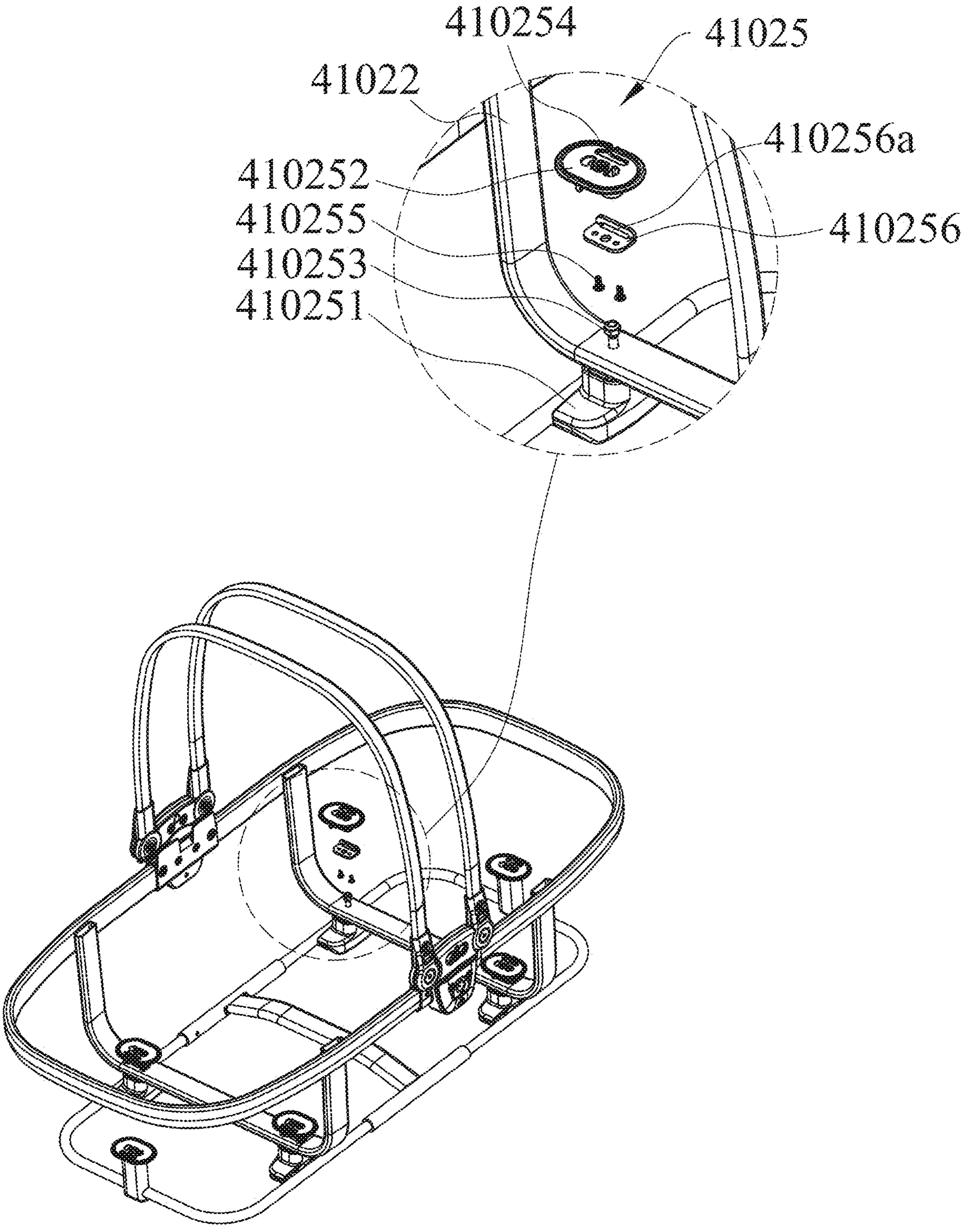
Figure 71A:
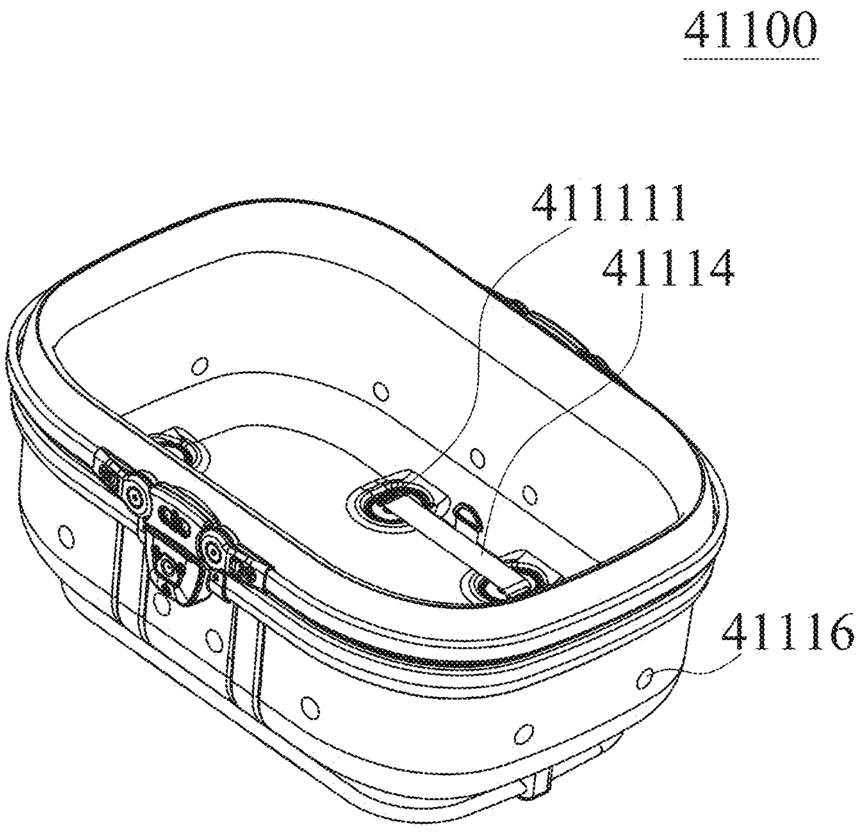
FIGS. 71A and 71D show a carrier according to an embodiment of the fourth aspect of the present disclosure.
Figure 71B:
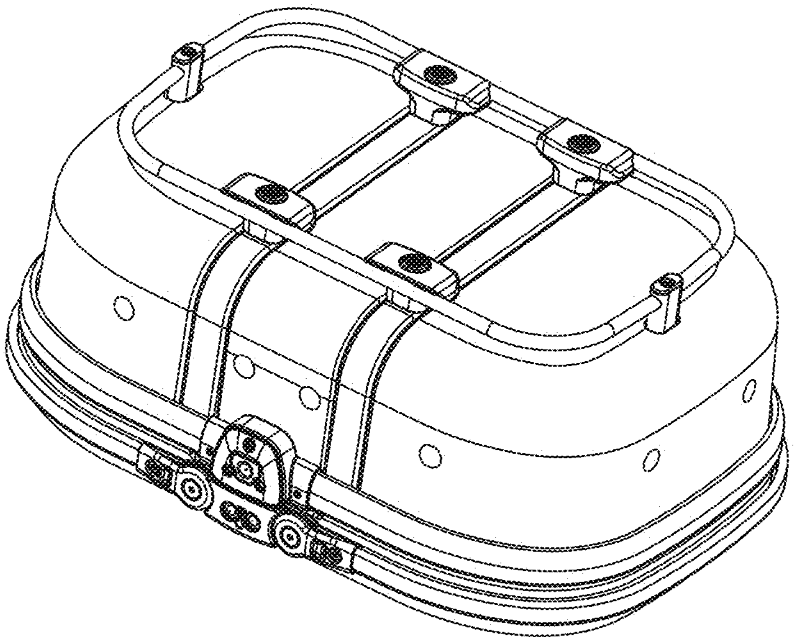

FIGS. 70A to 71B show other embodiments according to the fourth aspect of the present disclosure. FIGS. 70A to 70G shows a carrier 41000 according to an embodiment, and FIGS. 71A and 71B show a carrier 41100 according to an embodiment.

Referring to FIGS. 70A to 70C, the carrier 41000 includes a main body 41010 and a bracket device 41020. The main body 41010 (i.e., a carrying portion) has a bottom portion 41011 and a peripheral wall 41012 connecting the bottom portion 41011, and the bottom portion 41011 and the peripheral wall 41012 surround and define an accommodation space 41013 (i.e., a carrying space). The main body 41010 is also provided with a plurality of through slots 410111 penetrating through the bottom portion 41011 of the main body 41010 for a carrier belt 41014 to pass through and be fixed. In an example, as shown in FIG. 70C, the carrier belt 41014 is disposed on the bottom portion 41011 of the main body 41010, and the carrier belt 41014 has a T-shaped structure. The T-shaped structure has a longitudinal section 410141 and a transverse section 410142. Two ends of the transverse section 410142 (constituting a first end 41014*a* and a second end 41014*b* of the carrier belt 41014) respectively pass through and are fixed to the corresponding through slot 410111. One end of the longitudinal section 410141 is connected to the middle of the transverse section 410142, and the other end thereof is a free end and constitutes a third end 41014*c* of the carrier belt 41014. Optionally, the free end of the longitudinal section 410141 may be provided with a ring or other connecting structure for connecting a pet harness (vest) or the like. In an example, two carrier belts 41014 are symmetrically disposed at the bottom portion 41011 of the main body 41010. For example, the user may connect the pet harness (such as a vest) to the main body 41000 through a webbing (not shown) cooperated with the carrier belt 41014. Specifically, two ends of the webbing may be respectively provided with a joint (such as a hook), wherein one end of the webbing is connected to the third end 41014*c* of any T-shaped carrier belt 41014 through a corresponding joint, and the other end thereof is connected to a fixing ring of the pet harness through a corresponding joint, such as a webbing ring or a D-shaped ring on a vest. Optionally or alternatively, one end of the webbing may be connected to the third end 41014*c* of one of the T-shaped carrier belts 41014 through a corresponding joint, and the other end thereof passes through the fixing ring of the pet harness and is connected to the third end 41014*c* of the other of the T-shaped carrier belts 41014 through a corresponding joint. However, the present disclosure is not limited thereto, and the webbing or other similar devices may be connected between the carrier belt 41014 and the pet harness in other ways. With such a T-shaped structure, two-point fixing may be provided at the first end 41014*a* and the second end 41014*b*, so that the carrier belt 41014 may provide more stable force to connect and fix the pet harness or the like, thereby improving the safety of the pet in the main body 41010.

As shown in FIG. 70A, an inner side of the peripheral wall 41012 of the main body 41010 may also be provided with an impact protection device 41015, which may be a single-layer structure or a multi-layer structure. When the impact protection device 41015 has a single-layer structure, it may be made of, for example, inert memory cotton or other materials with certain contractibility. When the impact protection device 41015 has a multi-layer structure, it may be a combination of EPP (Expanded Polypropylene) layer, EPS (Expanded Polystyrene) layer and EPE (Pearl Cotton) layer, or a combination of inert memory cotton and PE (Polyethylene) layer, or other suitable materials, for example. Optionally, the impact protection device 41015 may be disposed at least one side of the main body 41010, for example, at least disposed at a side close to a vehicle door when the main body 41010 is placed on a vehicle seat. In addition, as shown in FIG. 70A, a plurality of air holes 41016 may be provided around the peripheral wall 41012 of the main body 41010. Specifically, the air holes 41016 may be provided on the peripheral wall 41012 of the main body 41010 at a long side and/or a short side thereof. That is, the air holes 41016 may be only provided on the peripheral wall 41012 of the main body 41010 at the long side thereof, or only provided on the peripheral wall 41012 of the main body 41010 at the short side thereof, or provided on the peripheral wall 41012 of the main body 41010 at both the long side and the short side thereof. In an example, the impact protection device 41015 may be provided with an avoidance part 41015*a* to avoid the air hole 41016. For example, as shown in FIG. 70A, the impact protection device 41015 and the air hole 41016 may be simultaneously disposed on the peripheral wall 41012 of the main body 41010 at the short side thereof (for example, at least provided at a side close to the vehicle door), wherein a part of the impact protection device 41015 (i.e., a position corresponding to the air hole 41016) may have a smaller width than other parts to form the avoidance part 41015*a*. In addition, the avoidance part 41015*a* is not limited to the above-mentioned structure, but may also be a hole structure, a hollow structure, or the like. It should be noted that the air holes may also be disposed in the main body in any of aforementioned first to third aspects, or in various main bodies to be described below, and the present disclosure is not limited herein.

Furthermore, as shown in FIG. 70B, the bottom portion 41011 of the main body 41010 may also be provided with a reserved hole 410112, and a single-point fixing may be realized through the reserved hole 410112 without fixing the carrier belt 41014 with the through slots 410111 on both sides.

In order to explain the fixing method of the carrier belt 41014 more clearly, FIGS. 70D to 70G are further referred to. Specifically, FIG. 70D shows a bracket device 41020, in which the carrier belt 41014 disposed thereon is also schematically shown; FIGS. 70E and 70F show the bracket device 41020 from different views; and FIG. 70G shows the bracket device 41020, in which a partial exploded view of the fixing assembly 41025 of the bracket device 41020 is also shown.

As shown in FIG. 70D, the bracket device 41020 includes a first bracket 41021, a second bracket 41022, and a third bracket 41023. The first bracket 41021, the second bracket 41022, and the third bracket 41023 have structures similar to those of the previous embodiment (for example, the carrier 4800), which will not be described in detail herein.

The bracket device 41020 may further include a plurality of fixing assemblies 41025 for connecting the main body 41010, the second bracket 41022 and the third bracket 41023, and the third bracket 41023 is connected with the bottom portion 41011 of the main body 41010 (especially the lower surface of the bottom portion 41011 of the main body 41010, that is, the bottom surface of the main body 41010) or also spaced apart from the second bracket 41023 through the fixing assemblies 41025. Referring to FIG. 70A and FIGS. 70D to 70G, the fixing assemblies 41025 may be disposed symmetrically and separated from each other in the longitudinal direction D41 and the transverse direction D42, and may be disposed corresponding to the through slots 410111 in the main body 41010.

Specifically, as shown in FIGS. 70E to 70G, the fixing assembly 41025 includes a guide 410251, and the guide 410251 is located at the bottom of the fixing assembly 41025. In this example, the guide 410251 may be disposed in the plane surrounded by the engaging element 410231 of the third bracket 41023 and connected with the third bracket 41023. Optionally, the guide 410251 may be plastic, metal or other materials with certain rigidity. In addition, as shown in FIG. 70G, the fixing assembly 41025 further includes a bracket connecting element 410252 and a securing combination 410253. The bracket connecting element 410252 passes through the through slot 410111 of the bottom portion 41011 of the main body 41010, and a diameter of an upper end of the bracket connecting element 410252 is larger than that of the through slot 410111. The securing combination 410253 sequentially passes through the bracket connecting element 410252, the second bracket 41022 and the guide 410251 and enables them to be fixed to each other, thereby stably combining the main body 41010 with the bracket device 41020.

In this embodiment, as shown in FIGS. 70F and 70G, the fixing assembly 41025 may further include a carrier belt engaging part 410254. The carrier belt engaging part 410254 is disposed on the bracket connecting element 410252, for example, at an edge of the bracket connecting element 410252. Specifically, a notch may be provided at the edge of the bracket connecting element 410252, and the carrier belt engaging part 410254 having an annular structure is formed, so that the carrier belt 41014 may enter the annular structure of the carrier belt engaging part 410254 through the notch, thereby being engaged with the carrier belt engaging part 410254 and preventing the carrier belt 41014 from swinging back and forth. In an example, the carrier belt engaging part 410254 may be integrally formed with the bracket connecting element 410252. In addition, the fixing assembly 41025 may further include a carrier belt fixing part 410256, and the carrier belt fixing part 410256 is connected to the bracket connecting element 410252 by screws 410255 and is disposed between the bracket connecting element 410252 and the second bracket 41022. Optionally, the carrier belt fixing part 410256 has a corner, that is, one edge of the carrier belt fixing part 410256 is bent upward (for example, the carrier belt fixing part 410256 has an L-shaped structure), and the corner has an elongated hole 410256*a*. One end of the carrier belt 41014 may pass through the elongated hole 410256*a* and be fixed around the corner of the carrier belt fixing part 410256 (for example, by sewing), and the other end of the carrier belt 41014 may pass through the carrier belt engaging part 410254 and continues to extend upward.

In addition, as shown in FIGS. 70D to 70G, the carrier 41000 having a longer size may further have a structural reinforcement element 410233. The structural reinforcement element 410233 is disposed on the third bracket 41023, and between the two fixing assemblies 41025 in the longitudinal direction D41, and the structural reinforcement element 410233 is at approximately equal distances from each of the two fixing assemblies 41025, so as to further enhance the structural support strength of the third bracket 41023.

Optionally, each of opposite two ends of the engaging element 410231 of the third bracket 41023 in the longitudinal direction D41 may be provided with a connecting bracket 410234, and the connecting bracket 410234 may also pass through the main body 41010, and the upper end thereof may also be provided with a bracket connecting element 410252 and a carrier belt engaging part 410254 as desired.

Referring to FIGS. 71A and 71B, a carrier 41100 having a shorter size may also be provided with a through slot 411111, and a carrier belt 41114, and/or an air hole 41116, and/or an impact protection device, etc., and has a structure similar to that in the previous embodiment, which will not be described in detail herein.

Figure 71C:
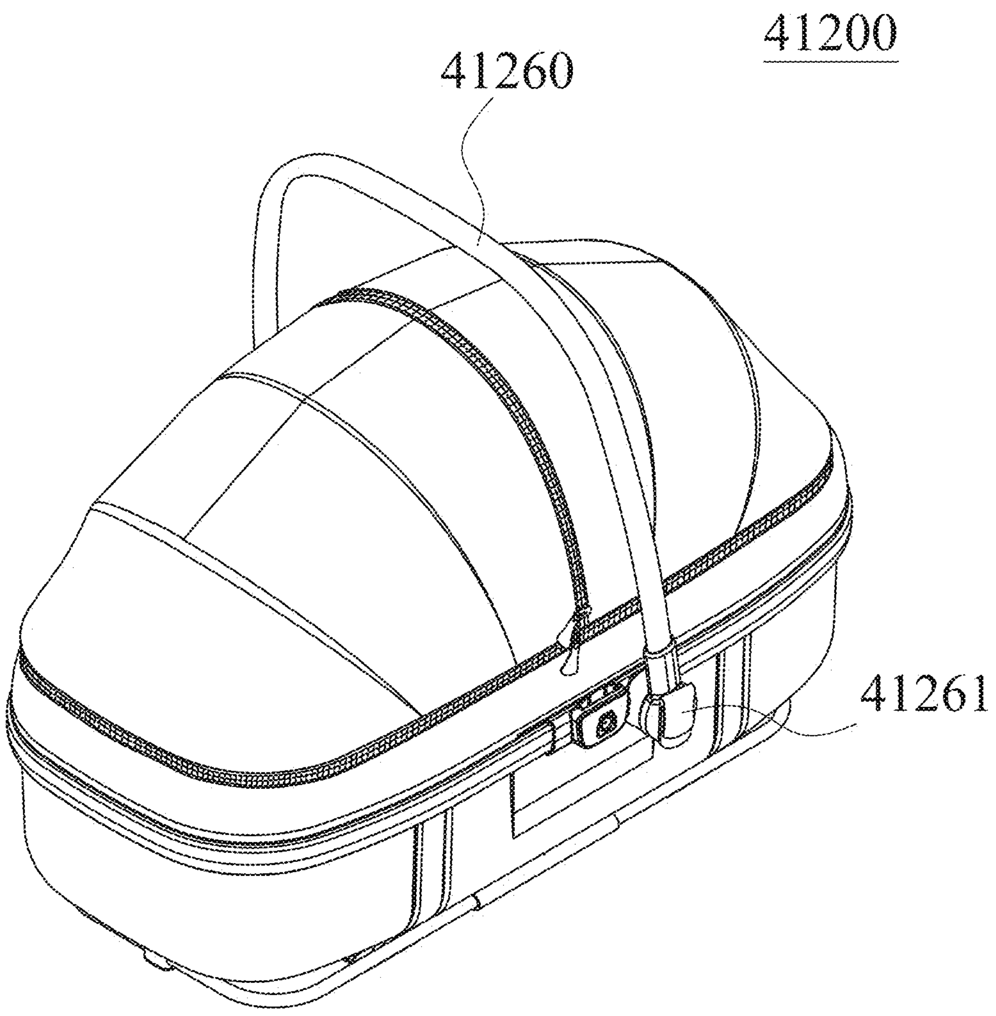
Figure 71D:
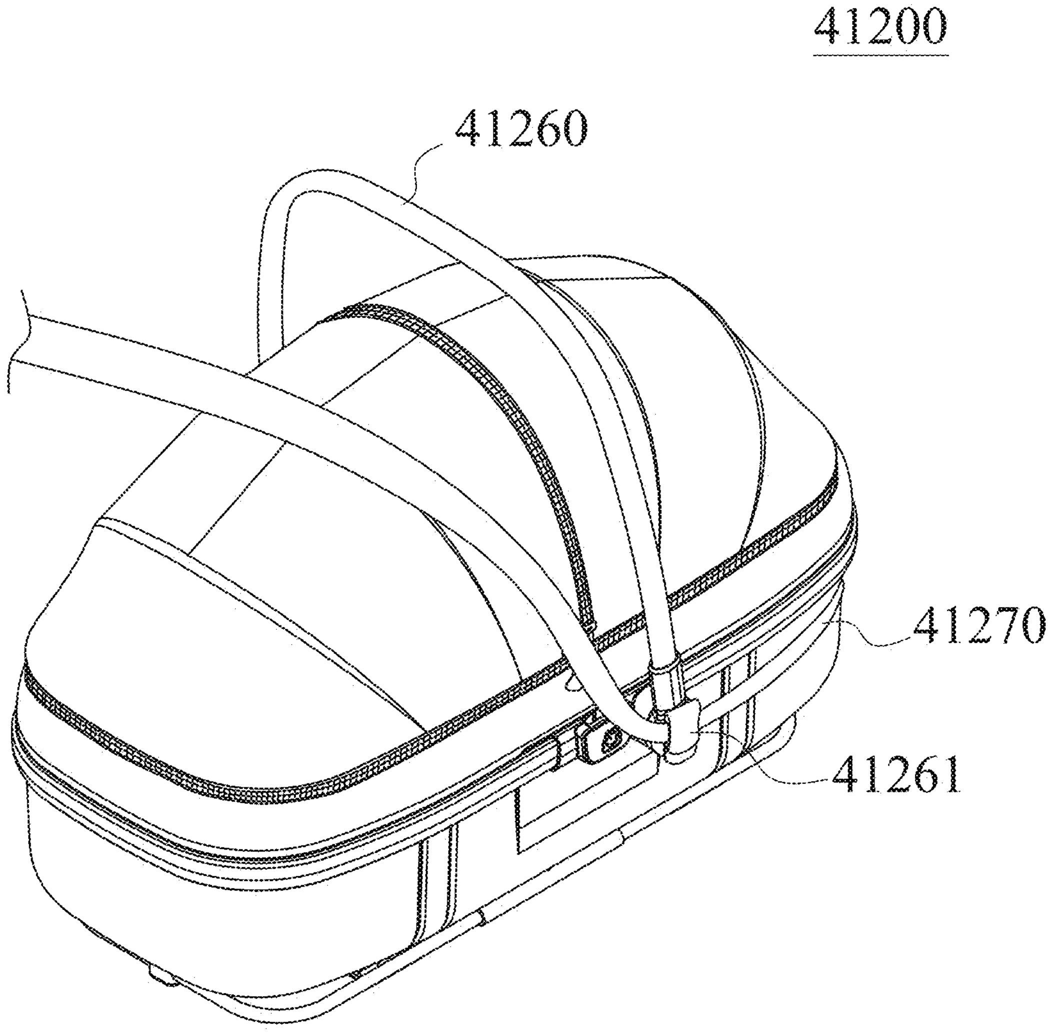

FIGS. 71C and 71D shows a carrier 41200 according to an embodiment of the present disclosure. Referring to FIGS. 71C and 71D, either end or both ends of the grip 41260 of the carrier 41200 may also be provided with a clip 41261 for clamping a belt body 41270, so that the belt body 41270 may better fix the carrier 41200 on the vehicle seat.

It should be noted that, the above-mentioned embodiments of the present disclosure and various components in the embodiments may also be used in combination. For example, the strap of the embodiment shown in FIG. 64A may be used in combination with the main body and/or the connecting structure and/or the fixing belt of the embodiment shown in FIG. 65 in the case that there is no structural interference.

A fifth aspect of the present disclosure also provides a carrier. The carrier may be stably fixed to a vehicle or a carrying apparatus when in use, and may be folded when not in use to reduce the space occupied when it is stored in the vehicle.

Figure 72:
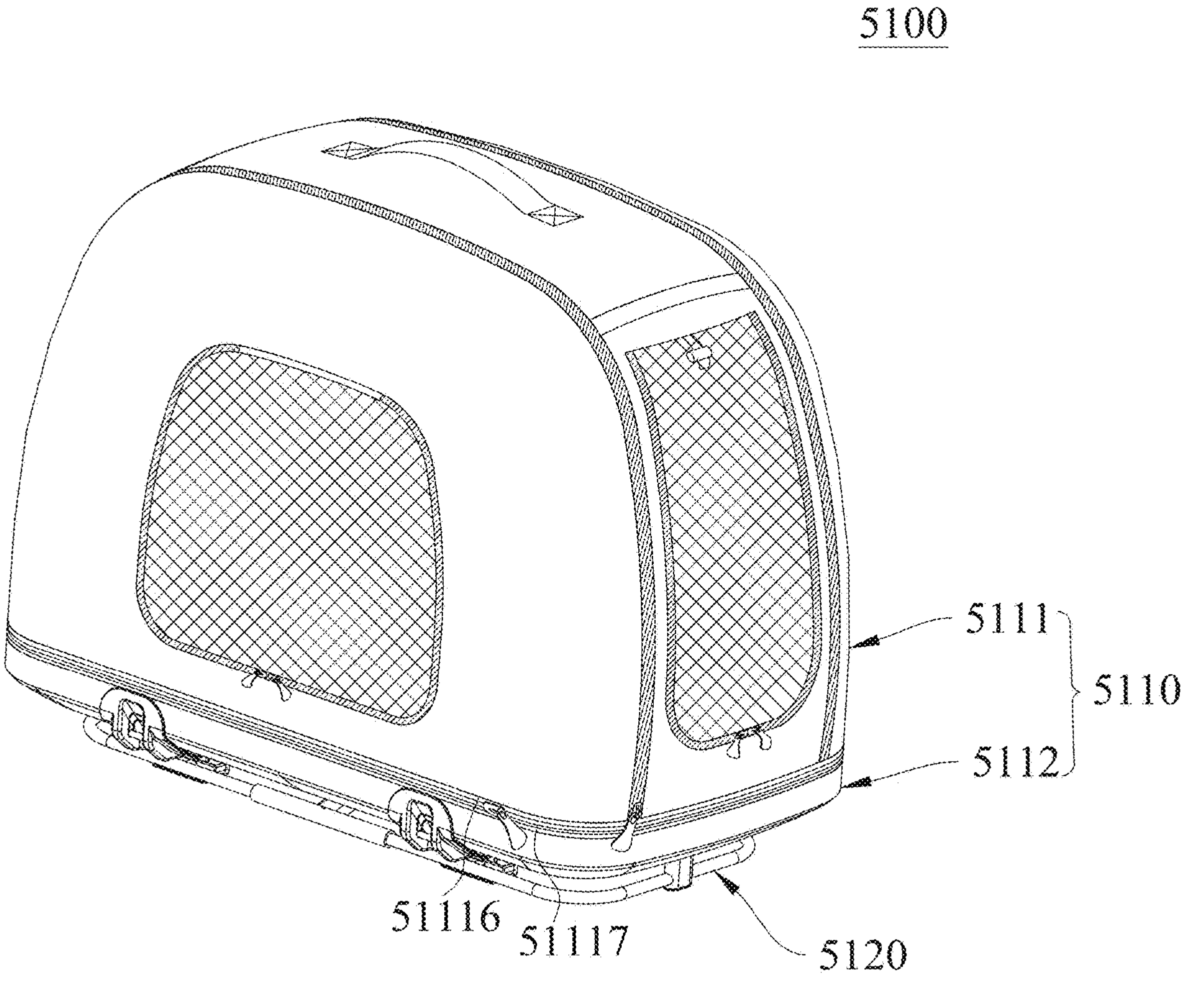
FIG. 72 shows a perspective view of a carrier according to an embodiment of a fifth aspect of the present disclosure.
Figure 73:
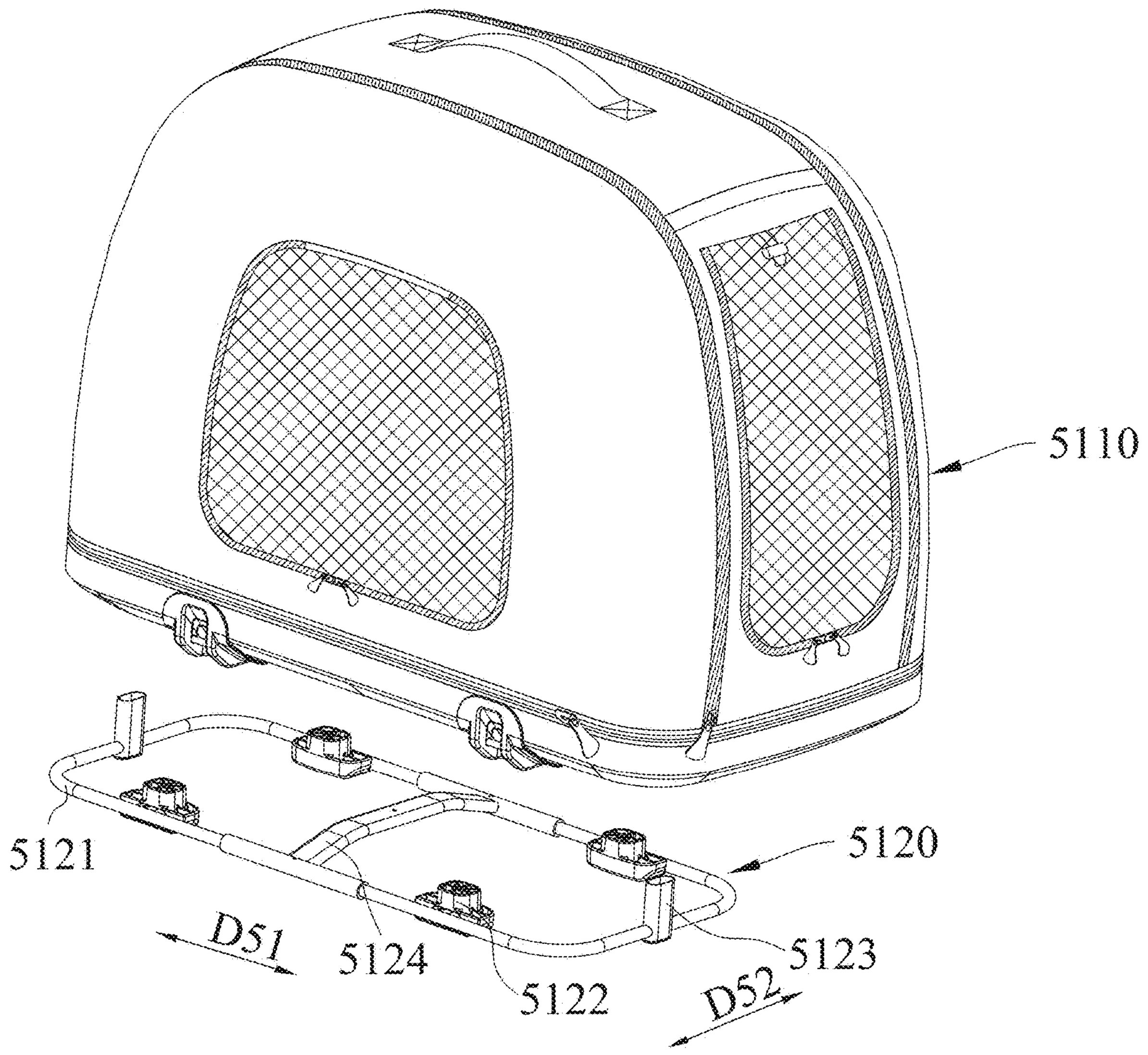
FIG. 73 shows a partially exploded perspective view of the carrier shown in FIG. 72, in which a main body of the carrier is separated from a bracket assembly.

Referring to FIGS. 72 and 73, FIG. 72 shows a perspective view of a carrier 5100 according to an embodiment of the fifth aspect of the present disclosure; and FIG. 73 shows a partially exploded perspective view of the carrier shown in FIG. 72, in which a main body of the carrier 5100 is separated from a bracket assembly.

As shown in FIG. 72, the carrier 5100 (for example, a pet carrier) of the present disclosure includes a main body 5110 and a bracket assembly 5120. The main body 5110 (i.e., a carrying portion) includes a body 5111 and a bottom support 5112, and the body 5111 may be detachably covered on the bottom support 5112 (i.e., as a peripheral wall of the main body 5110) to form an accommodation space (i.e., a carrying space) with the bottom support 5112 for pets to ride in. The bottom support 5112 constitutes a bottom portion of the main body 5110. An upper surface of the bottom support 5112 (i.e., an upper surface of the bottom portion of the main body 5110) is located in the accommodation space, and a lower surface of the bottom support 5112 (i.e., a lower surface of the bottom portion) constitutes a bottom surface of the main body 5110. The body 5111 constitutes four side surfaces and a top surface of the main body 5110. The body 5111 is detachably connected to the bottom support 5112 through at least one connecting assembly. Specifically, in an example, the at least one connecting assembly includes a first connecting element 51116 and a second connecting element 51117 that may be detachably connected to each other. The first connecting element 51116 is disposed on the body 5111, and the second connecting element 51117 is disposed on the bottom support 5112. In a specific example, the first connecting element 51116 and the second connecting element 51117 are zippers that are cooperated with each other, but the present disclosure is not limited thereto, for example, they may also be snap structures, sliding fastener structures, Velcro fasteners, hook-and-loop fasteners, or the like, and optionally, a soft connection mode may be adopted. Alternatively, in another example, the body 5111 and the bottom support 5112 may be fixedly connected (e.g., sewn together) or integrally formed.

Referring to FIGS. 72 and 73, the bracket assembly 5120 is configured to fix the carrier 5100 to a carrying apparatus, such as a vehicle or a trolley. The main body 5110 is placed on the bracket assembly 5120 via the bottom support 5112. As shown in FIG. 73, the bracket assembly 5120 includes an engaging element 5121, which cooperates with an engaging structure correspondingly disposed on the carrying apparatus. The specific engaging mode will be described in detail in the following description of FIGS. 81 to 86. In an example, the engaging element 5121 may be a ring-shaped structural element, which is spaced apart from the bottom portion of the bottom support 5112. A center of the engaging element 5121 substantially corresponds to a center of the main body 5110 in the vertical direction. The bracket assembly 5120 (also referred to as "bracket device") may have a structure similar to the third bracket 3123 (see FIGS. 32B and 32C) according to the third aspect of the present disclosure. For example, the engaging element 5121 of this embodiment may correspond to the engaging element 31231 shown in FIGS. 32B and 32C, the structural reinforcement element 5124 may correspond to the second structural reinforcement element 31234 shown in FIG. 32C, and the engaging element 5121 and the structural reinforcement element 5124 may be uniformly referred to as the "third bracket" of this embodiment.

In addition, the bracket assembly 5120 may also include four first connecting brackets 5122, which are disposed on the engaging element 5121 to connect with the bottom portion of the main body 5110, and are spaced apart from each other at a certain distance, for example, close to four corners of the bottom portion of the main body 5110 respectively, so as to provide balanced and stable support for the main body 5110. Further, the four first connecting brackets 5122 may be symmetrically disposed on two opposite sides of the engaging element 5121 in a transverse direction with respect to a longitudinal direction D51 and a transverse direction D52 of the carrier 5100. For example, as shown in FIG. 73, the four first connecting brackets 5122 are symmetrically disposed on two long sides of the annular structural element of the engaging element 5121. However, it should be understood that the engaging element of the present disclosure are not limited to the above shape, and the number of the first connecting bracket 5122 are not limited thereto. Optionally, in another example, only two first connecting brackets 5122 may be provided, and the two first connecting brackets 5122 are diagonally disposed. In other examples, the number of the first connecting brackets 5122 may also be three, five, or the like.

Further, the bracket assembly 5120 may further include a plurality of second connecting brackets 5123, which are respectively installed at opposite two sides of the engaging element 5121 in the longitudinal direction D51 and connected to the bottom portion of the main body 5110, so as to further stabilize the combination of the main body 5110 and the bracket assembly 5120. It should be noted that, although only two second connecting brackets 5123 are shown in FIG. 2, the present disclosure is not limited thereto, and four, six second connecting brackets, or other number of second connecting brackets may be provided. In addition, it should be noted that, in other examples, the first connecting bracket 5122 and the second connecting bracket 5123 may be disposed alternatively, as long as the main body 5110 and the bracket assembly 5120 can be firmly and stably combined, and the present disclosure is not limited thereto.

In addition, the bracket assembly 5120 may further include a structural reinforcement element 5124, which is substantially located at a middle position of the engaging element 5121 in the longitudinal direction D51. A central part of the structural reinforcement element 5124 is in a curved shape towards the bottom portion of the main body 5110, that is, a height of the central part thereof is higher than a height of ends thereof on both sides, so that the bracket device 5120 has higher impact resistance and is not easily deformed by stress.

The first connecting bracket 5122 and the second connecting bracket 5123 may also be uniformly referred to as "fixing assembly", that is, they are disposed between the main body and the third bracket (including the engaging element 1521), so that the third bracket is spaced apart from the bottom portion of the main body. However, it should be noted that, the structure of the bracket assembly of the present disclosure is not limited to this embodiment.

Figure 74:
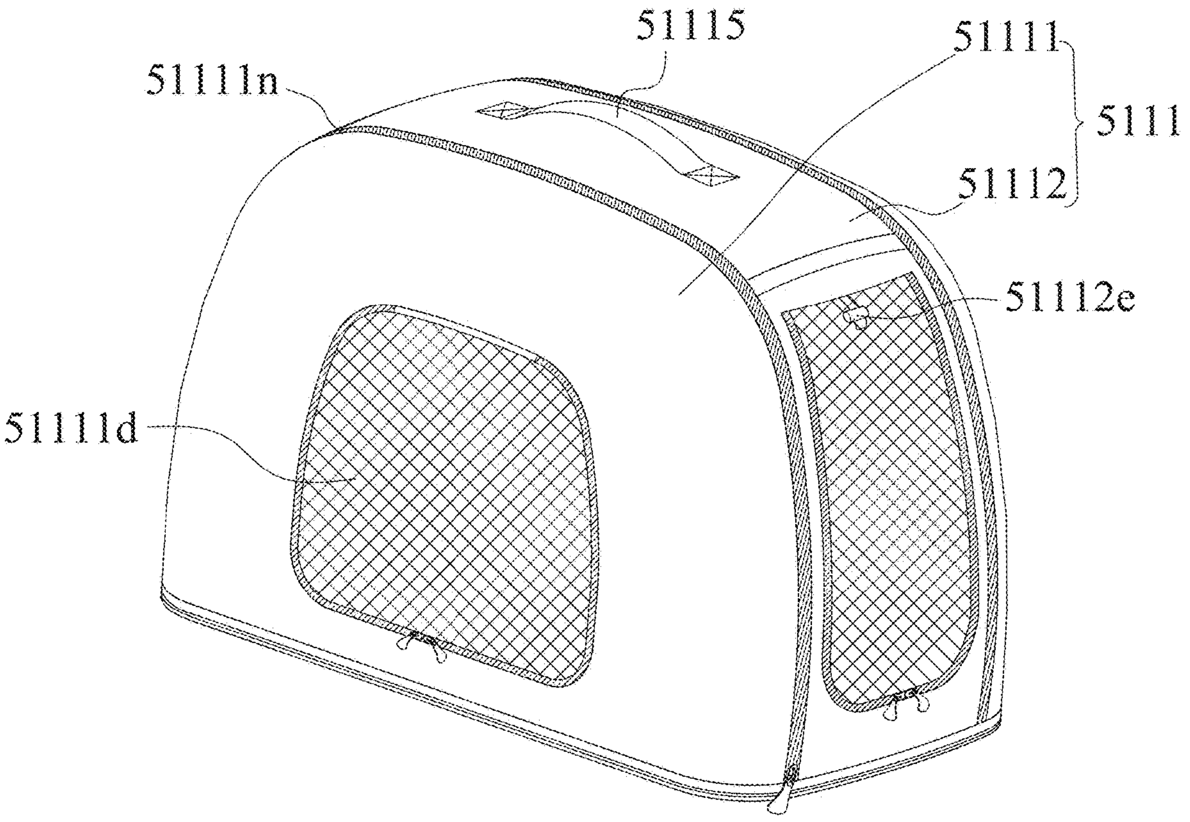
FIG. 74 shows a perspective view of a body of the main body of the carrier shown in FIG. 72.
Figure 75:
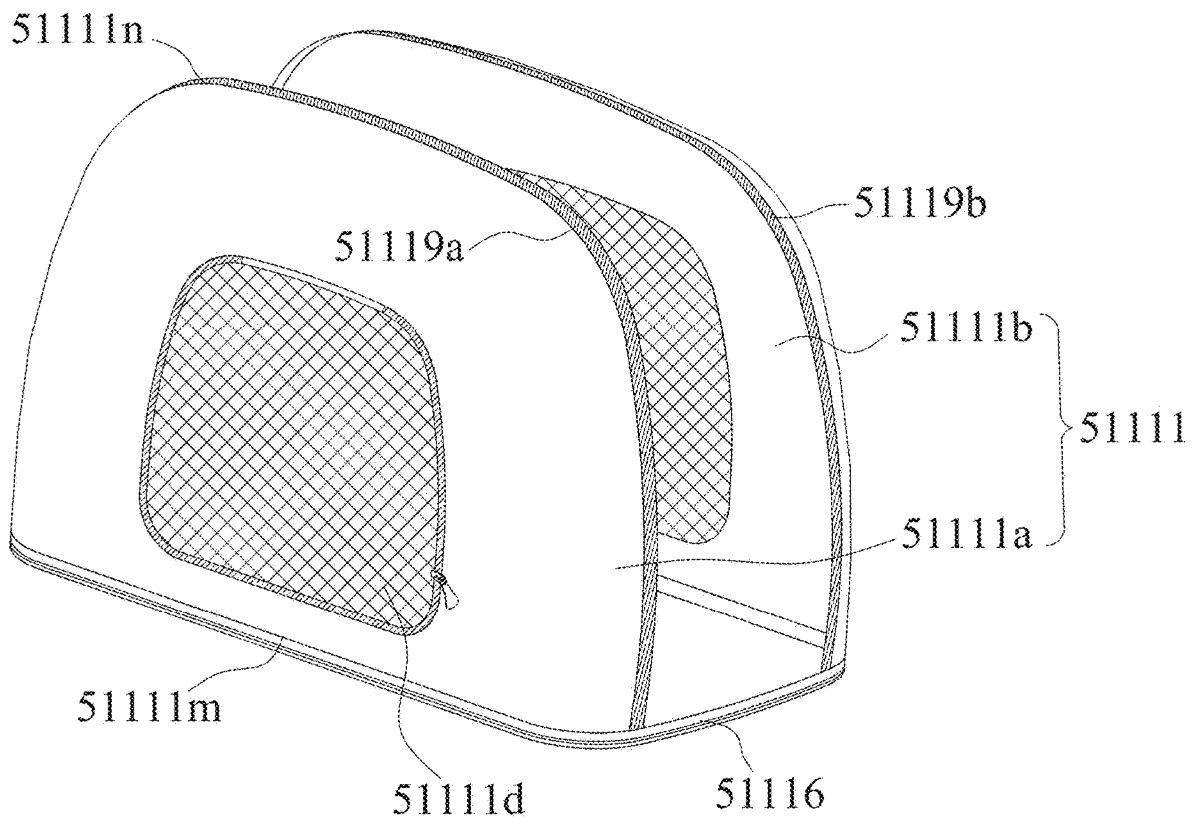
FIG. 75 shows a perspective view of a side support of the body shown in FIG. 74.
Figure 76:
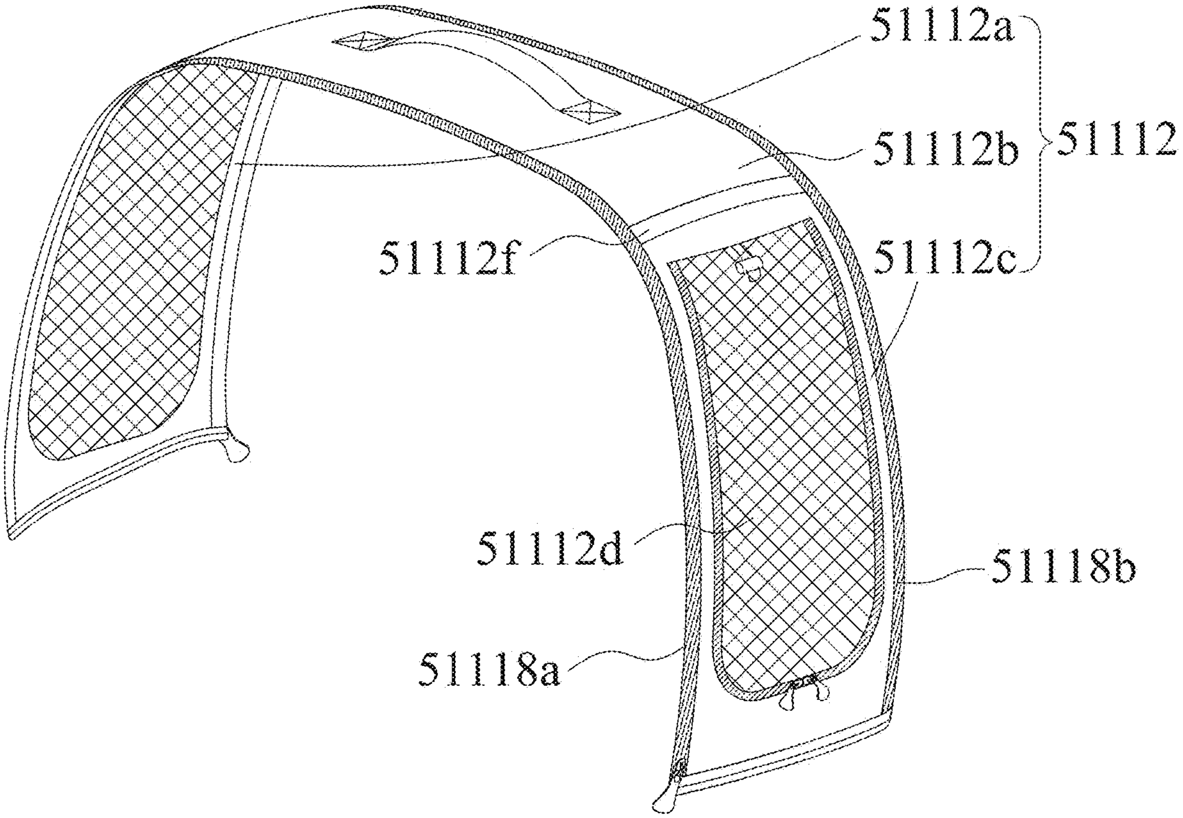
FIG. 76 shows a perspective view of an upper support of the body shown in FIG. 74.

Referring to FIGS. 74 to 76, FIG. 74 shows a perspective view of the body 5111 shown in FIG. 72, FIG. 75 shows a perspective view of a side support of the body 5111 shown in FIG. 74, and FIG. 76 shows a perspective view of an upper support of the body 5111 shown in FIG. 74.

As shown in FIG. 74, the body 5111 includes a first support and a second support. For example, in this embodiment, the first support is a side support 51111, and the second support is an upper support 51112. The side support 51111 and the upper support 51112 are detachably connected to each other, for example, by zipper connection or by other connection methods such as hook-and-loop fasteners. However, it can be understood that the first support and the second support may also be disposed into other structures according to the configuration of the body 5111. For example, each of the first support and the second support may also be disposed as a half of the body 5111, that is, the first support and the second support have mirror symmetrical shapes.

Further, in an example, in combination with FIGS. 74 and 75, the side support 51111 may include a first sub-support 51111*a* and a second sub-support 51111*b*, which are detachably connected to both sides of the upper support 51112 (i.e., the upper support 51112 is between the first sub-support 51111*a* and the second sub-support 51111*b*) to form the body 5111. The first sub-support 51111*a* and the second sub-support 51111*b* form two side surfaces of the body 5111. More specifically, the first sub-support 51111*a* and the second sub-support 51111*b* are independent of each other, and each of the sub-support 51111*a* and the second sub-support 51111*b* has a bottom edge 51111*m* extending approximately horizontally and an arched top edge 51111*n*. The bottom edge 51111*m* of each of the first sub-support 51111*a* and the second sub-support 51111*b* is detachably connected to the corresponding edge of the bottom support 5112, and the top edges 51111*n* of the first sub-support 51111*a* and the second sub-support 51111*b* are detachably connected to both sides of the arched upper support 51112, respectively.

In an example, as shown in FIG. 75, the first sub-support 51111*a* and the second sub-support 51111*b* may be connected to each other through a connecting structure (such as the first connecting element 51116) to be connected to the bottom support 5112 (see FIG. 2) together. Specifically, the first connecting element 51116 is connected to the bottom edges 51111*m* of the first sub-support 51111*a* and the second sub-support 51111*b*. Optionally, the first connecting element 51116 is a soft material (i.e., which is foldable, deformable, etc.), such as a zipper structure, cloth or the like, so that after the side support 51111 is detached from the bottom support 5112 (see FIG. 2) and separated from the upper support 51112, the first sub-support 51111*a* and the second sub-support 51111*b* may be folded with respect to each other.

Optionally, the side support 51111 may be made of a material with a certain carrying capacity to prevent deformation during transportation, such as paperboard, plastic board, metal board or the like, but the present disclosure is not limited thereto.

As shown in FIGS. 74 and 76, the upper support 51112 is composed of three sheets 51112*a*, 51112*b*, and 51112*c* which are connected with each other, and has an arch shape. The three sheets 51112*a*, 51112*b*, and 51112*c* may respectively form a top surface and the other two side surfaces of the body 5111. For example, the first sheet 51112*a* and the third sheet 51112*c* respectively form the other two side surfaces of the body 5111 (i.e., between the side surfaces formed by the first sub-support 51111*a* and the second sub-support 51111*b*), and the second sheet 51112*b* forms the top surface of the body 5111. Optionally, each of the three sheets 51112*a*, 51112*b*, and 51112*c* may be made of a material with certain carrying capacity to prevent deformation during transportation, such as paperboard, plastic board, metal board or the like, but the present disclosure is not limited thereto.

In an example, the first sheet 51112*a* and the second sheet 51112*b* may be connected to each other through a connecting structure (not shown due to being shielded) and may be folded with respect to each other, and the second sheet 51112*b* and the third sheet 51112*c* may be connected to each other through another connecting structure (see "51112*f*" shown in FIG. 76) and may be folded with respect to each other, so that the first sheet 51112*a* and the third sheet 51112*c* may be folded inward with respect to the second sheet 51112*a*. That is, the sheets on both sides may be folded inward, that is, with respect to the sheet in the middle, so that the detached upper support 51112 may be folded to reduce its volume, further reducing the space required for storage and reducing the transportation cost. The connecting structure and the another connecting structure may be flexible connecting structures, such as sewing cloth, or rigid connecting structures. In a specific example, the upper support 51112 may be formed as an integral part through the above-mentioned connecting structure (for example, by sewing, etc.), that is, the three sheets 51112*a*, 51112*b*, 51112*c* are integrally formed. In addition, as shown in FIG. 74, a top side of the upper support 51112 (i.e., the second sheet 51112*b*) may be provided with a handle 51115, for example, at a central position of the top side, for pulling up the carrier.

In an example, as shown in FIG. 76, two side edges of the upper support 51112 are provided with third connecting elements 51118*a* and 51118*b* respectively, which may be respectively cooperated with fourth connecting elements 51119*a* and 51119*b* (see FIG. 75) disposed corresponding to the top edges 51111*n* of the first sub-support 51111*a* and the second sub-support 51111*b*. The third connecting elements 51118*a* and 51118*b* are detachably connected with the fourth connecting elements 51119*a* and 51119*b*, respectively, so that the upper support 51112 may be detachably connected with the first sub-support 51111*a* and the second sub-support 51111*b*, respectively. The third connecting elements 51118*a* and 51118*b* and the fourth connecting elements 51119*a* and 51119*b* may be flexible connecting elements, such as zipper structures, but the present disclosure is not limited thereto.

In other examples, the third connecting elements 51118*a*, 51118*b* and the fourth connecting elements 51119*a*, 51119*b* may also be snap structures, sliding fastener structures, hook-and-loop structures, or the like. Specifically, as shown in FIG. 75, the fourth connecting element 51119*a* (such as a zipper structure) provided on the first sub-support 51111*a* extends over the entire top edge 51111*n* of the first sub-support 51111*a*. Additionally or alternatively, the fourth connecting element 51119*b* (such as a zipper structure) provided on the second sub-support 51111*b* extends over the entire top edge of the second sub-support 51111*b*. Accordingly, as shown in FIG. 76, the third connecting elements 51118*a* and 51118*b* (e.g., zipper structures) on two sides of the upper support 51112 may extend over the entire side edges of the upper support 51112, and optionally, the third connecting elements 51118*a* and 51118*b* are respectively disposed on the two long side edges of the upper support 51112. With this design, the upper support 51112 and the side support 51111 may be completely closed, thereby making the connection between the upper support 51112 and the side support 51111 more reliable. Furthermore, the upper support 51112 may be completely separated from the side supports 51111 on both sides along its long side edges, so that the main body 5110 may be completely disassembled when the carrier is not used, or the upper support 51112 may be partially separated from the side support 51111 on either side as required, that is, a degree of separation between the upper support 51112 and the side support 51111 can be controlled, which is convenient for the user to take out or put articles from or into the main body 5110.

With the above structure, when the upper support 51112 is connected with the side support 51111 (i.e., partially or completely connected along the side edge of the upper support 51112 and the top edge of the side support 51111), the body 5111 (or the main body 5110) is in an unfolded state. When the carrier is not used, the upper support 51112 may be separated from the side support 51111, and through the connecting structure (especially the soft connecting structure) between the sheets 51112*a*, 51112*b* and 51112*c* of the upper support 51112 and/or through the connecting structure between the first sub-support 51111*a* and the second sub-support 51111*b* of the side support 51111 (especially the soft connecting structure, such as the first connecting element 51116), the side support 51111 and/or the upper support 51112 may be in a stored state (i.e., folded state), thereby reducing the space required for storage. When it is necessary to use the carrier again, the side support 51111 and/or the upper support 51112 may be unfolded and connected together. This design has the advantages of simple operation, low cost, small storage space and convenient transportation.

In addition, in combination with FIGS. 74 to 76, any side surface of the body 5111 may be provided with a window cloth that may be opened and closed to provide a window for pets to go into or out of the main body. Specifically, any side support 51111 of the body 5111 may be provided with a window cloth 51111*d*. Additionally or alternatively, the upper support 51112 of the body 5111 may be provided with a window cloth 51112*d*. For example, as shown in FIG. 75, each of two side supports 51111 is provided with a window cloth 51111*d*. For another example, as shown in FIG. 74, window cloths 51112*d* may be respectively provided on a surface of the upper support 51112 close to two ends thereof. These window cloths may be closed and opened by a zipper structure, which may be composed of a zipper (the structure as shown on the side support 51111 in FIG. 75) or two zippers pulled in opposite directions (as shown in FIG. 74).

In addition, as shown in FIG. 74, the window cloths 51111*d* and 51112*d* may be soft cloth, such as mesh cloth. However, it should be understood that the present disclosure is not limited thereto, and the window cloths 51111*d* and 51112*d* may also be other forms of cloth or soft materials. A holding element 51112*e* for keeping the window cloth opened may be provided at an upper part of the window cloth.

The body of the present disclosure is not limited to the above-mentioned structure, and for example, the side supports of the body may also be integrally connected or integrally molded, which will be described below.

Figure 77:
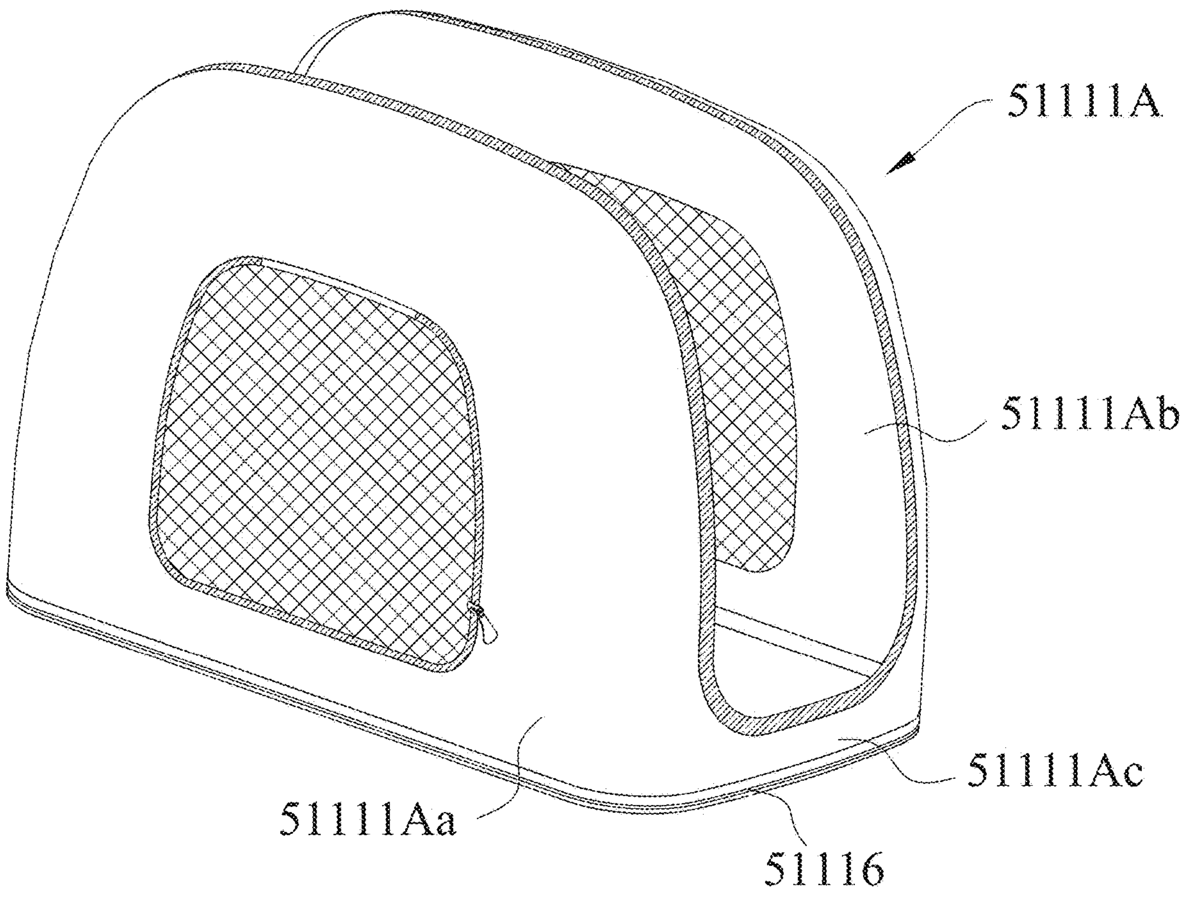
FIG. 77 shows a perspective view of a side support of a carrier according to another embodiment of the fifth aspect of the present disclosure.
Figure 78:
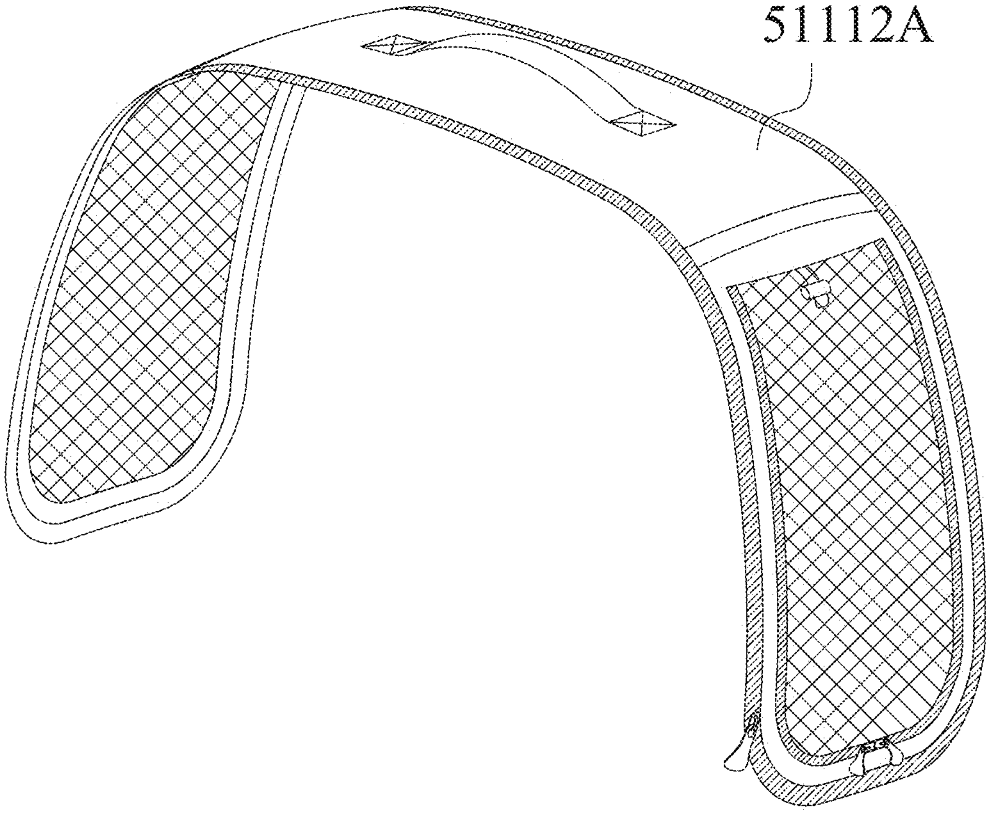
FIG. 78 shows a perspective view of an upper support cooperated with the side support shown in FIG. 77.

Referring to FIGS. 77 and 78, FIG. 77 shows a perspective view of a side support according to another embodiment of the fifth aspect of the present disclosure, and FIG. 78 shows a perspective view of an upper support cooperated with the side support shown in FIG. 77.

As shown in FIGS. 77 and 78, in another embodiment, the body (the body after being assembled is not shown in this embodiment) includes a side support 51111A and an upper support 51112A. The side support 51111A includes a first sub-support 51111Aa and a second sub-support 51111Ab integrally connected by connecting pieces 51111Ac (which may be also referred to as "connecting structure"), that is, the connecting piece 51111Ac is integrally formed with the first sub-support 51111Aa and the second sub-support 51111Ab. The connecting pieces 51111Ac are respectively connected to both ends of the first sub-support 51111Aa and the second sub-support 51111Ab. More specifically, as shown in FIG. 77, the bottom edges of the first sub-support 51111Aa and the second sub-support 5111Ab and the bottom edge of the connecting element 5111Ac are integrally connected in a circumferential direction. The top edge of each of the first sub-support 51111Aa and the second sub-support 51111 Ab is formed in an arch shape and the top edges of the first sub-support 51111Aa and the second sub-support 51111Ab are integrally connected through the top edge of the connecting piece 51111Ac, so that the side support 51111A is detachably connected between the upper support 51112A (see FIG. 78) and the bottom support (not shown in this embodiment). For example, the connecting piece 51111Ac of this embodiment may be a sewing part. Optionally, the connecting piece 51111Ac may be made of soft material, so that the two sub-supports of the side support 51111A may be pressed against each other during storage, thereby reducing the volume of the main body after being folded. In this embodiment, the first connecting element 51116 may be connected at the bottom edges of the first sub-support 51111Aa and the second sub-support 5111Ab and the bottom edge of the connecting piece 5111Ac so as to cooperate with the second connecting element (not shown) provided on the bottom support (not shown) to realize the detachable connection.

In addition, the upper support 51112A in this embodiment may also be detachably connected with the side support 51111A through a soft connecting element (such as a zipper structure). For example, the soft connecting element may be disposed on an edge of the upper support 51112 and disposed on a top edge formed by the top edges of the first sub-support 51111Aa and the second sub-support 51111Ab and the top edge of the connecting piece 51111Ac (more specifically, extending over the entire edge), so that the upper support 51112A may be completely closed and completely separated with respect to the side support 51111A. Similarly, a soft connecting element may be provided at a bottom edge formed by the bottom edges of the first sub-support 51111Aa and the second sub-support 5111Ab and the bottom edge of the connecting piece 5111Ac to cooperate with the soft connecting element provided on the bottom support.

In this embodiment, it is also possible to provide a window cloth on the side support and/or the upper support, which is similar to the embodiment shown in FIGS. 74 to 76, and will be not repeated herein.

Figure 79:
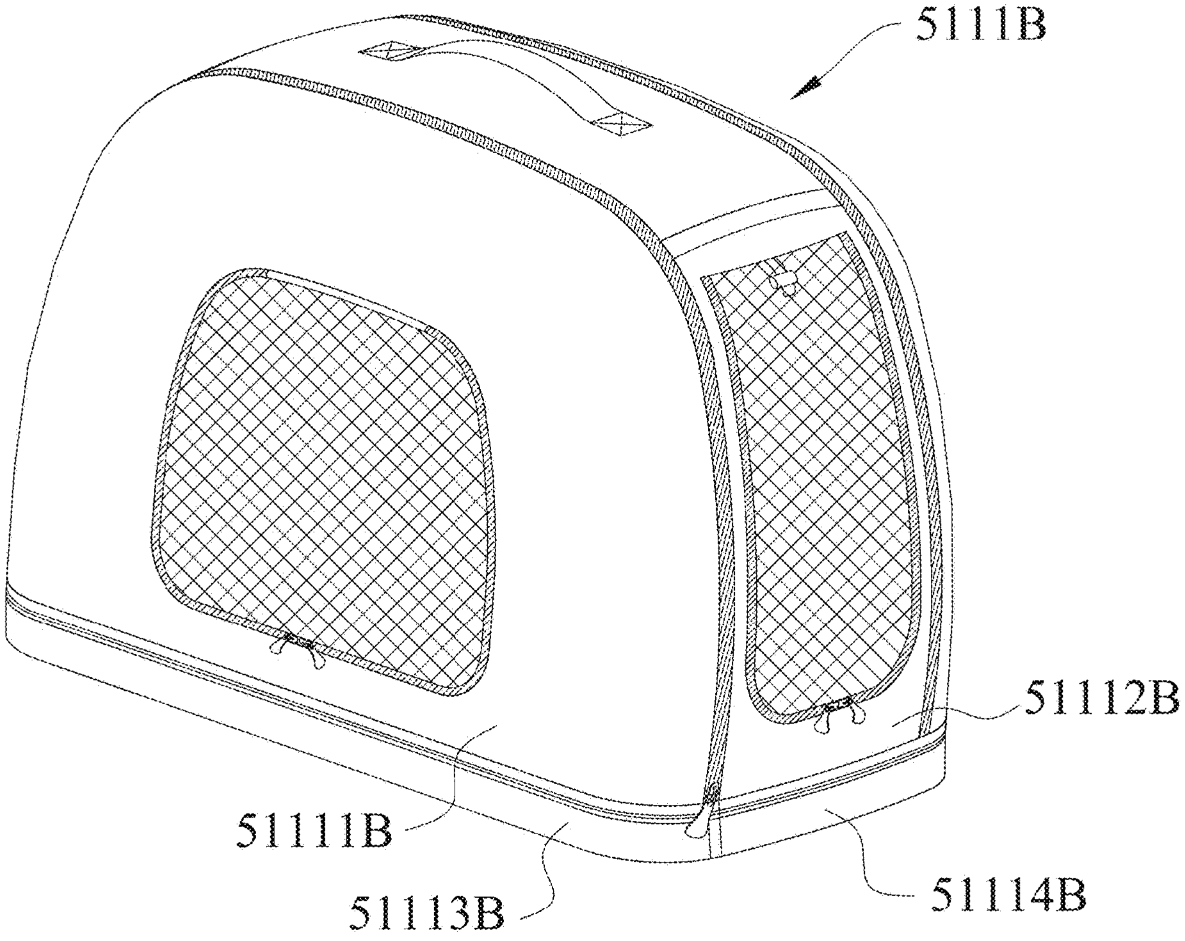
FIG. 79 shows a perspective view of a body of a carrier according to a yet another embodiment of the fifth aspect of the present disclosure.
Figure 80:
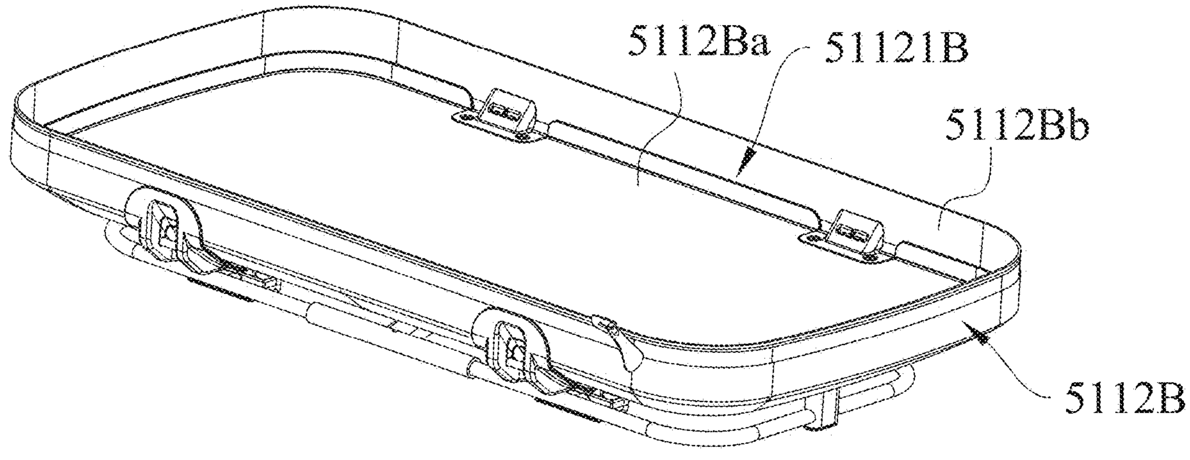
FIG. 80 shows a perspective view of a bottom support of the carrier shown in FIG. 79.

Referring to FIGS. 79 and 80, FIG. 79 shows a perspective view of a body of a carrier according to yet another embodiment of the fifth aspect of the present disclosure, and FIG. 80 shows a perspective view of a bottom support of the carrier shown in FIG. 79.

As shown in FIGS. 79 and 80, a bottom edge of the body 5111B of the carrier according to yet another embodiment of the fifth aspect of the present disclosure may be further provided with extensions 51113B and 51114B extending downward to be inserted into insertion grooves 51121B correspondingly disposed in the bottom support 5112B. In an example, the insertion groove 51121B may be formed by a tab disposed on a bottom portion 5112Ba of the bottom support 5112B close to a peripheral wall 5112Bb and the peripheral wall 5112Bb. Optionally, the insertion groove 51121B is disposed to extend along the peripheral wall 5112Bb of the bottom support 5112B. It should be noted that FIG. 79 shows a side support 51111B and an upper support 51112B similar to the embodiment shown in FIGS. 74 to 76, with an extension 51113B extending downward from the bottom edge of the side support 51111B of the body 5111B, and optionally or alternatively, an extension 51114B extending downward from the bottom edge of the upper support 51112B. However, it should be understood that the extension may also be provided at the bottom edge of the body of the embodiment shown in FIG. 77.

By providing the insertion groove in combination with the zipper connection between the body and the bottom support, the body of the main body may be more firmly connected to the bottom support, avoiding the sliding or inclination between the body and the bottom support.

FIGS. 80A to 80F also show carriers according to other embodiments of the fifth aspect of the present disclosure.

Figure 80A:
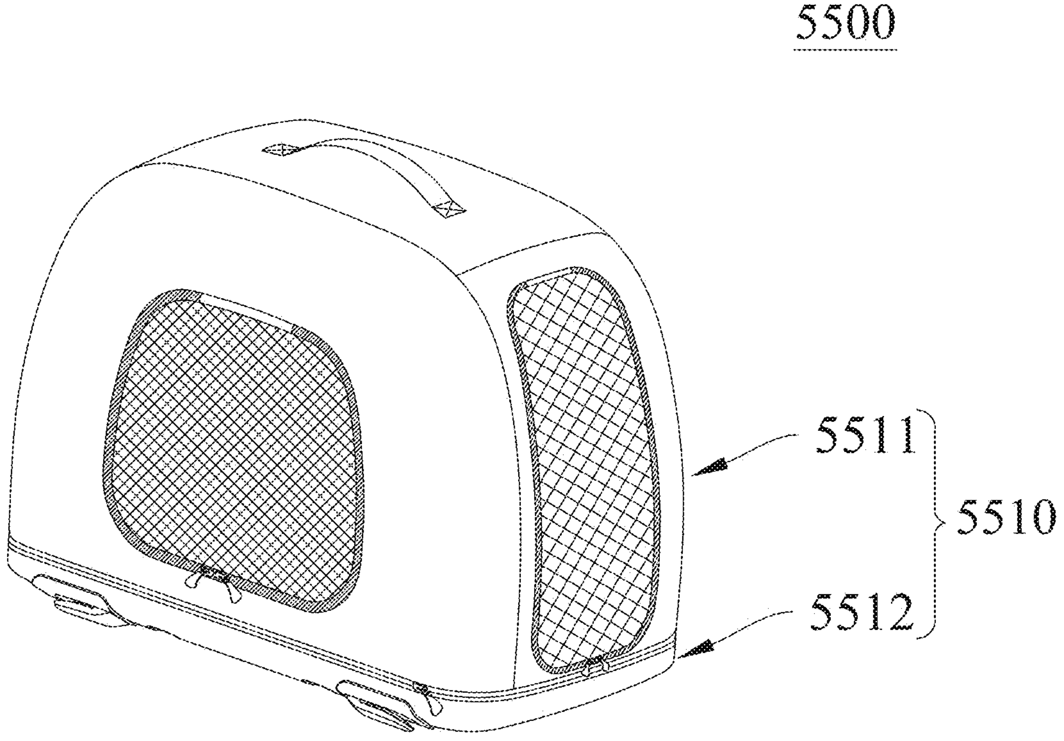
FIGS. 80A to 80C show perspective views of a body of a carrier according to a still another embodiment of the fifth aspect of the present disclosure.
Figure 80B:
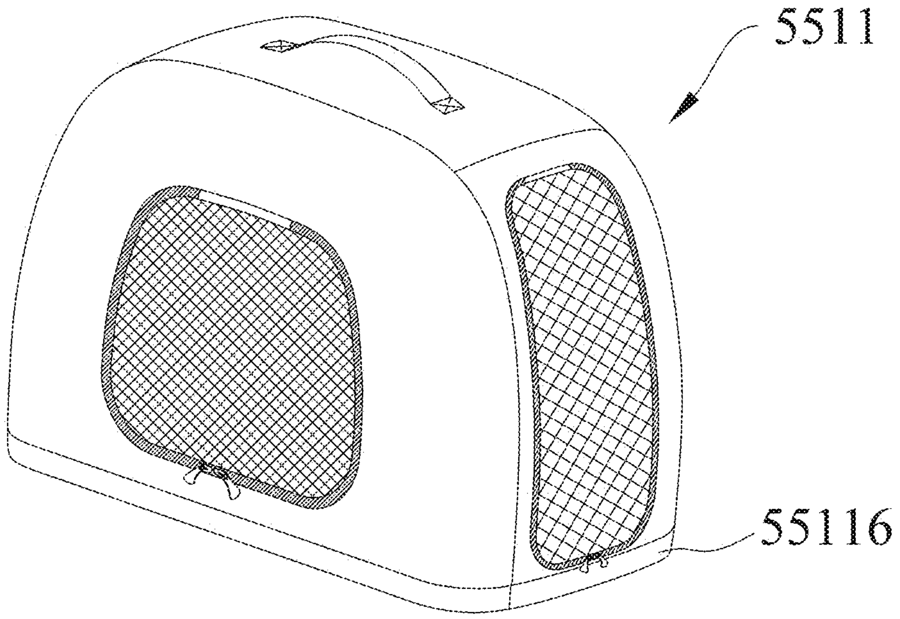
Figure 80C:
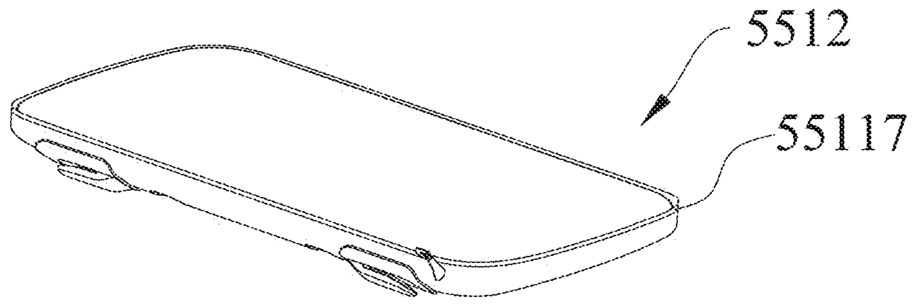

Referring to FIGS. 80A to 80C, FIG. 80A shows a carrier 5500 according to an embodiment of the fifth aspect of the present disclosure, and FIGS. 80B and 80C respectively show two parts after the carrier 5500 is disassembled. Specifically, a main body 5510 of the carrier 5500 may include a body 5511 and a bottom support 5512, and the body 5511 is detachably covered on the bottom support 5512 to form an accommodation space with the bottom support 5512 for pets to ride in. Specifically, the body 5511 has an integral structure and cannot be folded. The body 5511 is detachably connected to the bottom support 5512 by at least one connecting assembly. In an example, the at least one connecting assembly includes a first connecting element 55116 and a second connecting element 55117 which may be detachably connected with each other. The first connecting element 55116 is disposed on the body 5511, and the second connecting element 55117 is disposed on the bottom support 5512. In a specific example, the first connecting element 55116 and the second connecting element 55117 are zippers that are cooperated with each other, but the present disclosure is not limited thereto. For example, they may also be snap structures, sliding fastener structures, Velcro fasteners, hook-and-loop fasteners, or the like, and optionally, a soft connection mode may be adopted. It should be noted that the carrier 5500 may also be provided with a window of the carrier (e.g., 5100) as in the previous embodiment, which will not be described in detail herein.

Figure 80D:
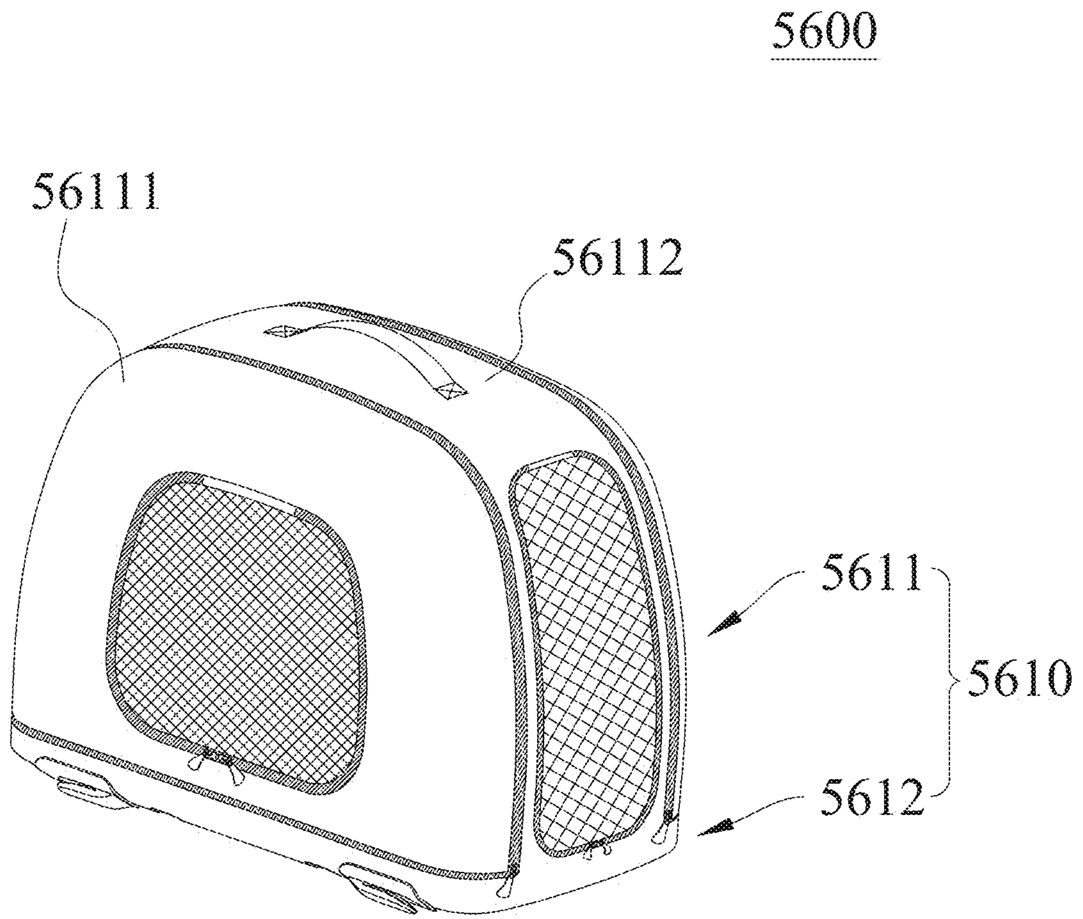
FIGS. 80D to 80F show perspective views of a body of a carrier according to a further still another embodiment of the fifth aspect of the present disclosure.
Figure 80E:
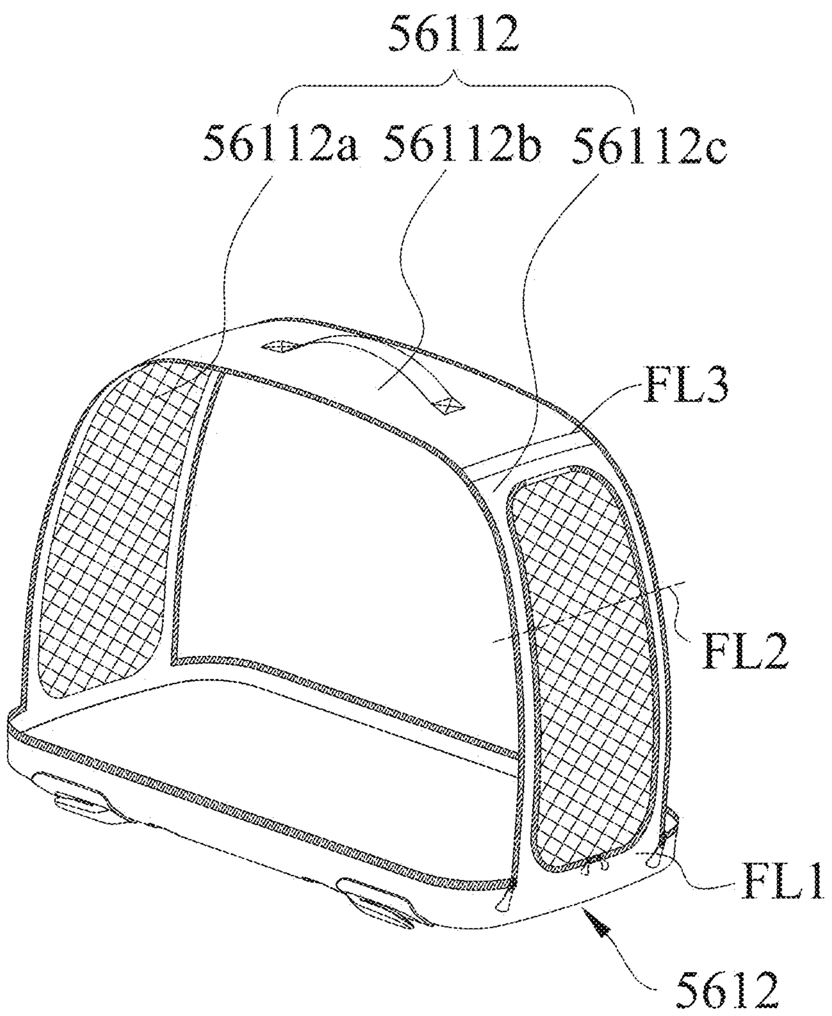
Figure 80F:
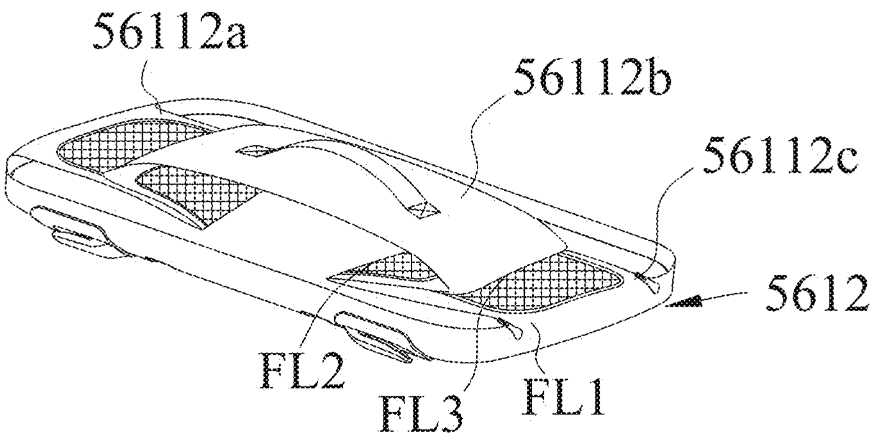

Referring to FIGS. 80D to 80F, FIG. 80D shows a carrier 5600 according to an embodiment of the fifth aspect of the present disclosure, and FIGS. 80E and 80F respectively show a main body 5611 in different states after a side support 56111 is removed.

Specifically, the main body 5610 of the carrier 5600 may include a body 5611 and a bottom support 5612. The body 5611 is at least partially detachably covered on the bottom support 5612 to form an accommodation space with the bottom support 5612 for pets to ride in. The body 5611 includes a first support and a second support which are detachably connected to each other, such as a side support 56111 as the first support and an upper support 56112 as the second support shown in FIG. 80D. In an example, referring to FIGS. 80D and 80E, two ends of the upper support 56112 are respectively connected to the bottom support 5612, and the side support 56111 is detachably connected between the upper support 56112 and the bottom support 5612. In a specific example, as shown in FIG. 80D, the side support 56111 may include two sub-supports, which are located on both sides of the upper support 56112 and constitute two side surfaces of the body 5611.

As shown in FIGS. 80E and 80F, the upper support 56112 has three sheets that are connected with each other (i.e., a first sheet 56112*a*, a second sheet 56112*b* and a third sheet 56112*c*). The second sheet 56112*b* constitutes a top surface of the body 5611 (in which the second sheet 56112*b* may also be referred to as “upper sheet”). The first sheet 56112*a* and the third sheet 56112*c* may be folded and constitute the other two side surfaces of the body 5611 (i.e., the first sheet 56112*a* and the third sheet 56112*c* may also be referred to as “side sheet” and are located between the side surfaces formed by the two sub-supports).

Referring to FIGS. 80D to 80F, when the main body 5610 needs to be folded, the user only needs to remove the two side supports 56111, and both ends of the upper support 56112 are still connected to the bottom support 5612. Then, the user may fold the side sheets 56112*a* and 56112*c* downward onto the bottom support 5612 by pressing the upper sheet 56112*b* of the upper support 56112, thereby reducing the volume of the main body 5610 when it is folded. Specifically, as shown in FIGS. 80E and 80F, the upper support 56112 may be folded over the bottom support 5612 through a plurality of folding parts on each of the side sheets 56112*a* and 56112*c*. In this example, each of two side sheets 56112*a* and 56112*c* of the upper support 56112 have three folding parts FL1, FL2 and FL3, so that both sides of the upper support 56112 may be folded on the bottom support 5612 in a zigzag shape. Specifically, the folding part FL1 may be located at or close to a connection (i.e. the edge) of the upper support 56112 (specifically, its side sheets 56112*a* and 56112*c*) with the bottom support 5612, the folding part FL2 may be located on the side sheets 56112*a* and 56112*c*, and the folding part FL3 may be located at a connection (i.e., the edge) of the upper sheet 56112*b* with the side sheet 56112*a*, 56112*c* of the upper support 56112. In an example, the upper support 56112 and the bottom support 5612, and/or the sheets of the upper support 56112 may be connected in a soft connecting mode, for example, integrally connected by a flexible material such as a cloth or the like.

Figure 81:
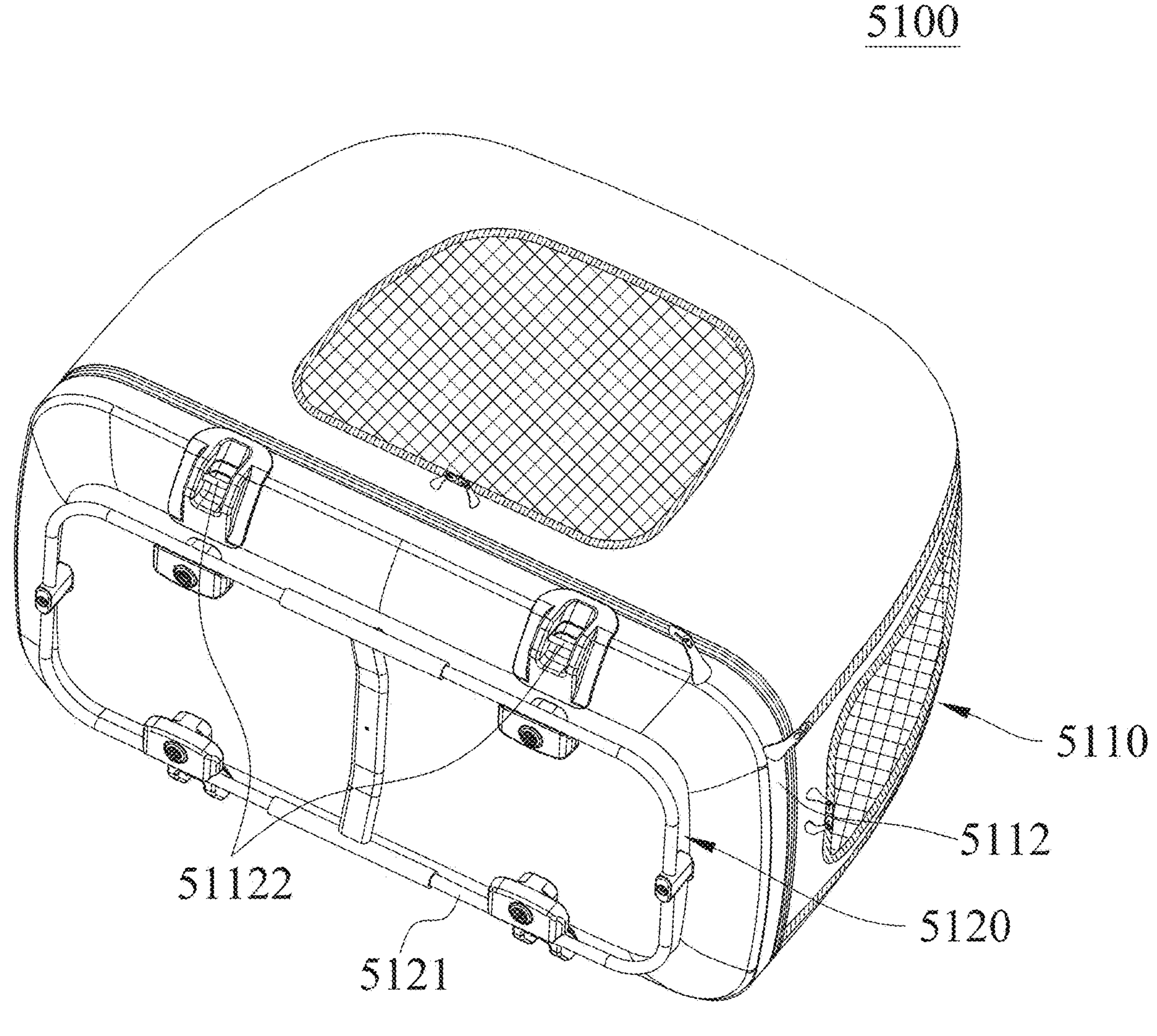
FIG. 81 shows a bottom perspective view of a carrier according to an embodiment of the fifth aspect of the present disclosure.
Figure 82:
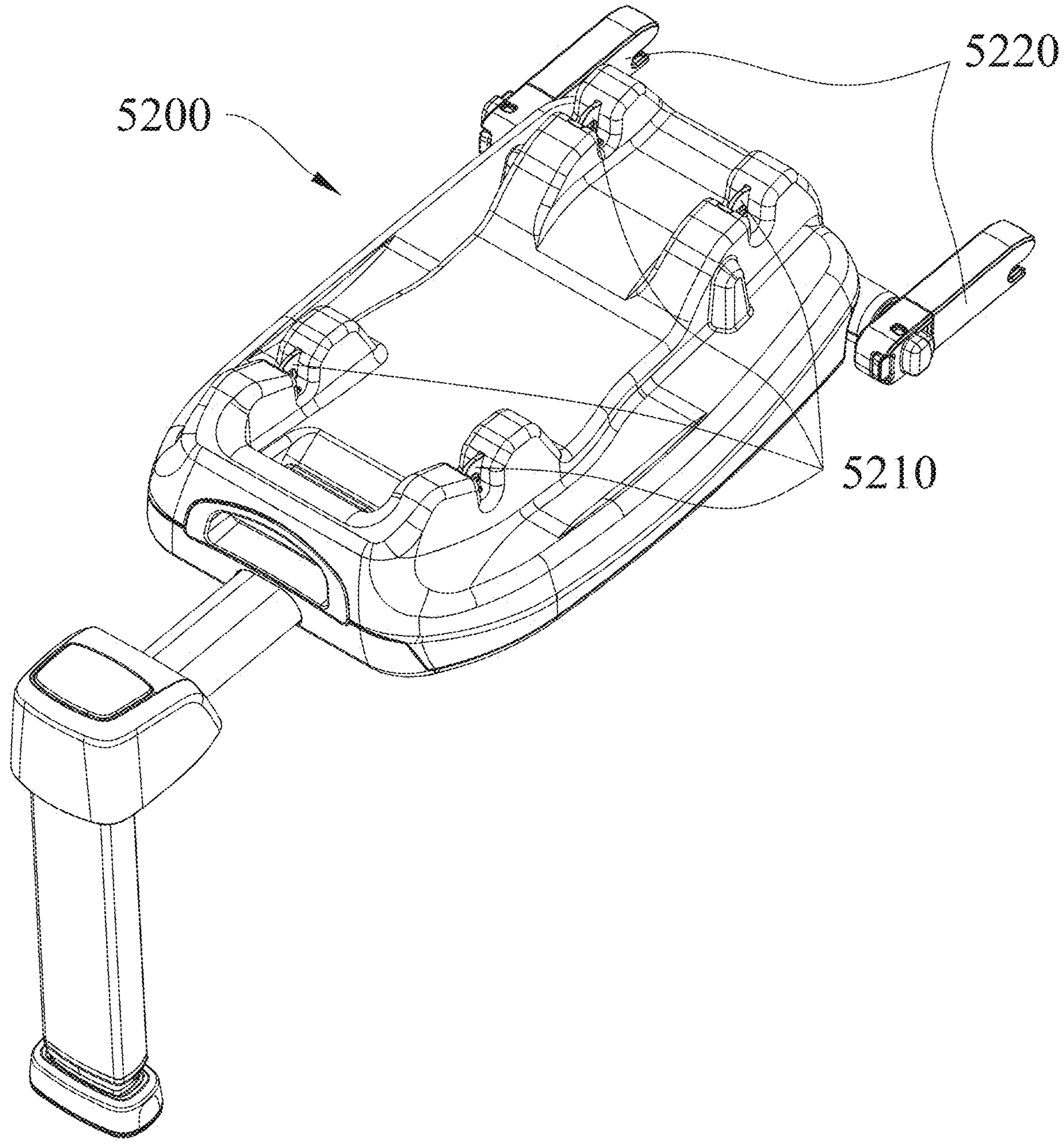
FIG. 82 shows a perspective view of a fixing seat assembly cooperated with the carrier shown in FIG. 81.
Figure 83A:
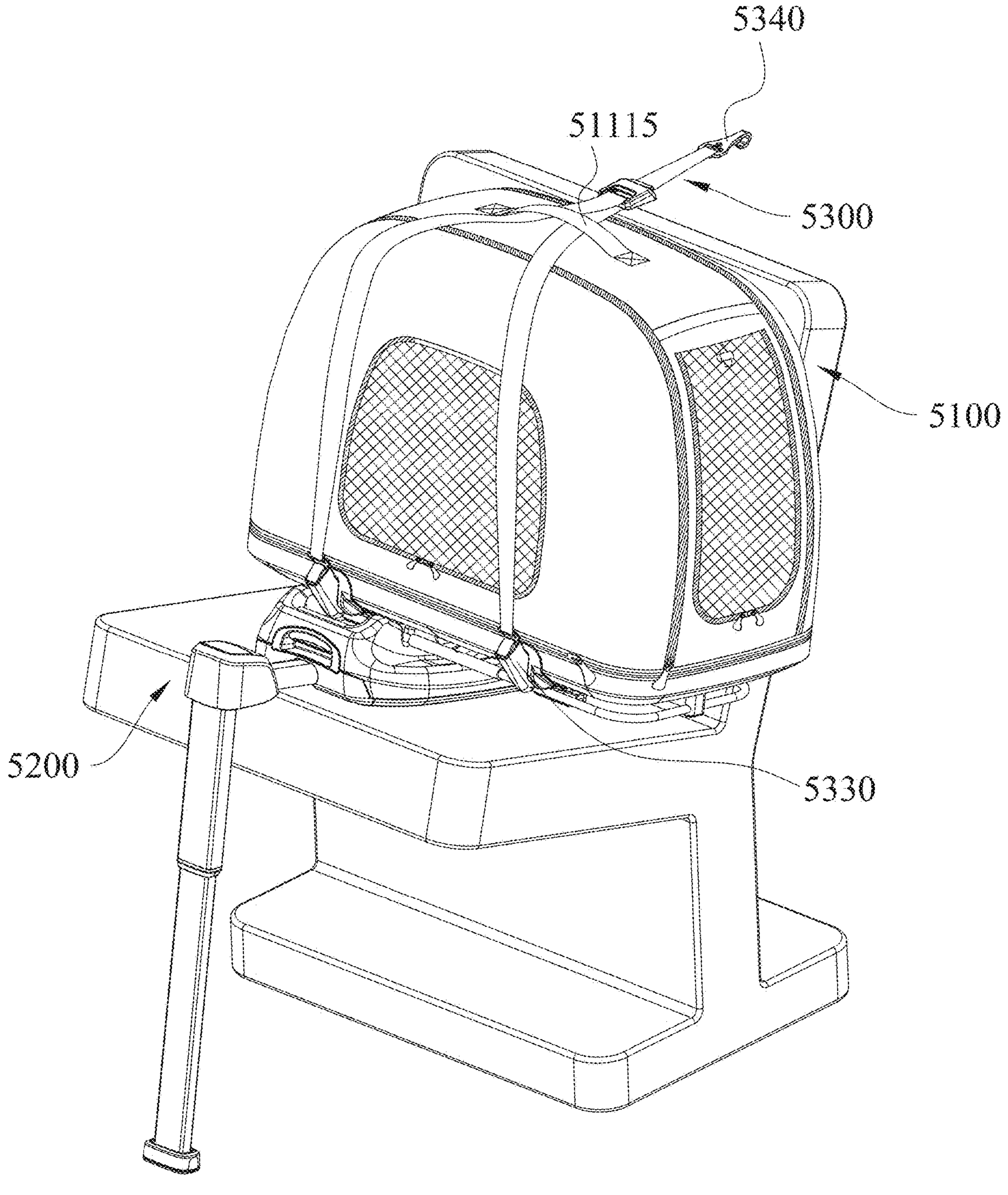
FIG. 83A shows a perspective view of the carrier which is mounted to a vehicle through the fixing seat assembly.
Figure 83B:
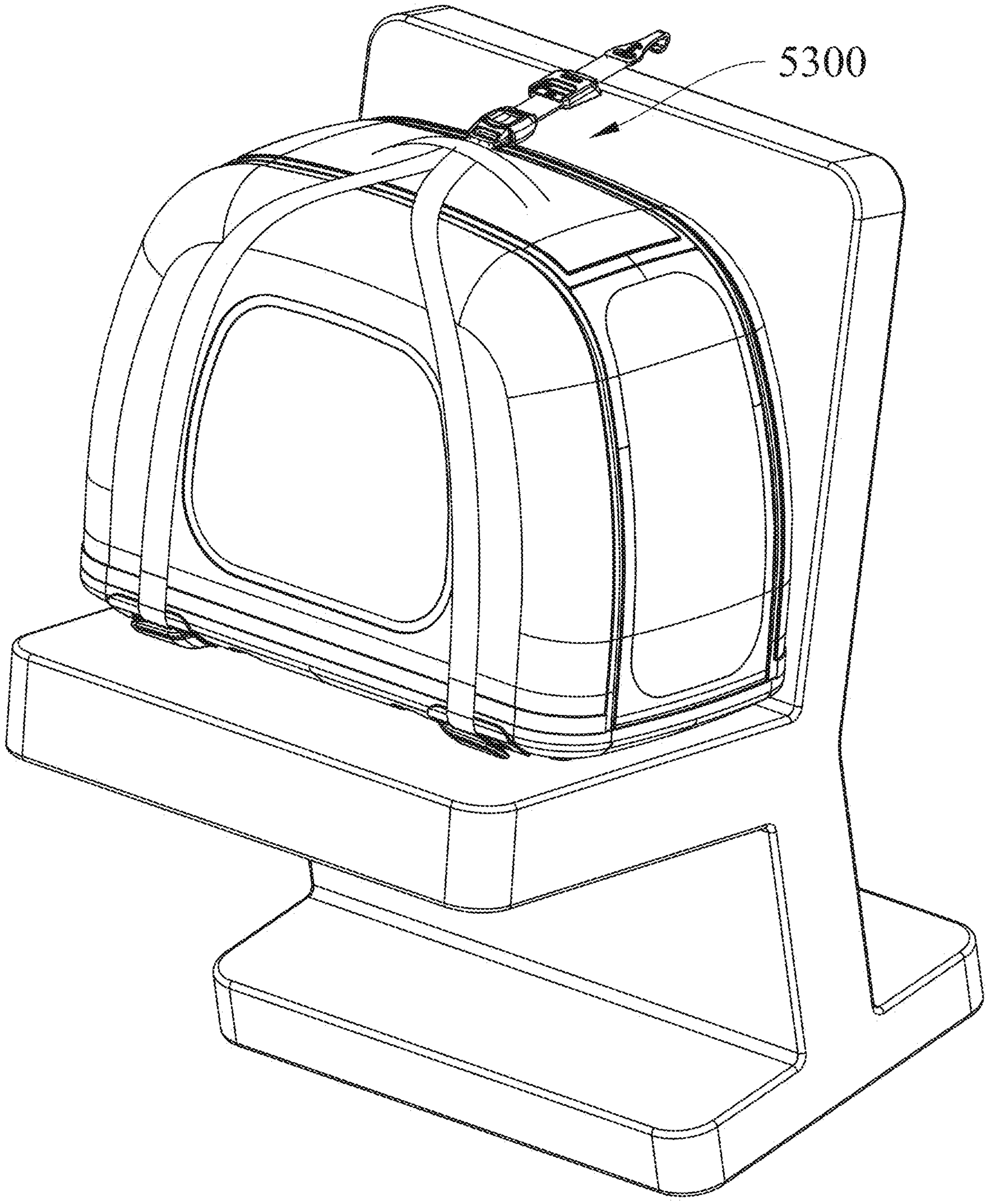
FIG. 83B shows a perspective view of the carrier which is fixed to the vehicle through a fixing belt assembly.
Figure 84:
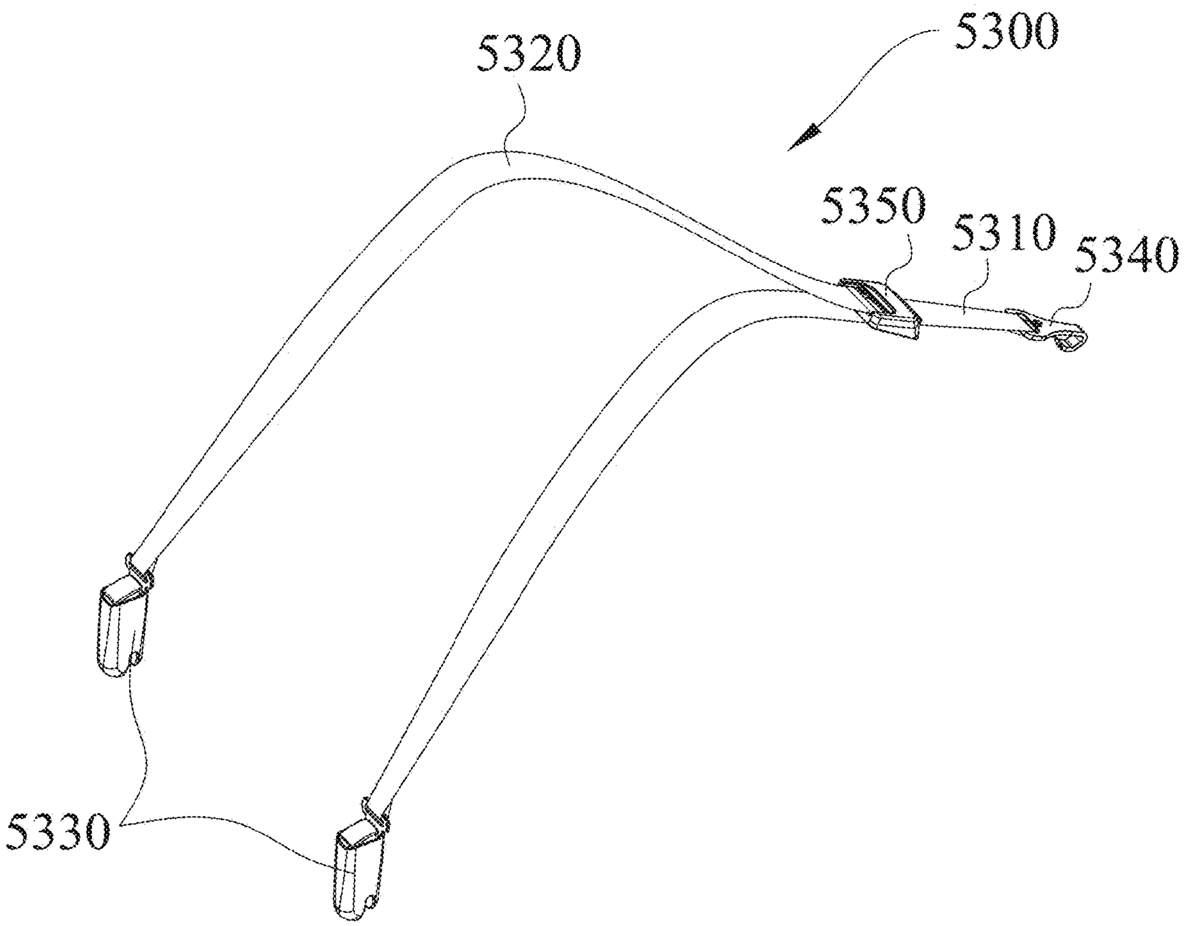
FIG. 84 shows a perspective view of the fixing belt assembly shown in FIG. 83A.

Referring to FIGS. 81 to 84, FIG. 81 shows a bottom perspective view of a carrier according to an embodiment of the fifth aspect of the present disclosure, FIG. 82 shows a perspective view of a fixing seat assembly cooperated with the carrier shown in FIG. 81, FIG. 83A shows a perspective view of the carrier being mounted to a vehicle through a fixing seat assembly, and FIG. 83B shows a perspective view of the carrier being mounted to the carrier through a fixing belt assembly; and FIG. 84 shows a perspective view of the fixing belt assembly shown in FIGS. 83A and 83B. It should be noted that the "fixing seat assembly" in this aspect is similar to the "base" in other aspects of the present disclosure (see the third or sixth aspect of the present disclosure), that is, the fixing seat assembly in this aspect may also be referred to as "base".

As shown in FIGS. 81 to 82, the bracket assembly 5120 of the carrier 5100 of the present disclosure is disposed below the bottom support 5112 of the main body 5110, and may be fixed with a fixing seat assembly 5200 mounted on the vehicle, for example, by engaging the engaging element 5121 of the bracket assembly 5120 at an engaging part 5210 of the fixing seat assembly 5200. Thus, the carrier 5100 is fixed to a seat of the vehicle by the cooperation of a connecting device 5220 (e.g., ISOFIX fastener) of the fixing seat assembly 5200 with a socket disposed on the vehicle. Optionally, as shown in FIG. 82, the fixing seat assembly 5200 may be symmetrically provided with four engaging parts 5210, so that the bracket assembly 5120 is fixed with the fixing seat assembly 5200 at the four engaging points, thereby making the positioning therebetween more stable.

In addition, the carrier 5100 may be further fixed by a connecting mode including a Top Tether. As shown in FIGS. 83A and 84, a fixing belt assembly 5300 may also be used to fix the carrier 5100 on the vehicle. Specifically, the fixing belt assembly 5300 includes a first belt 5310 and a second belt 5320. One end of the first belt 5310 may be provided with a connecting device 5340 (for example, a Top Tether fastener), and the other end of the first belt 5310 is provided with a connecting device 5330 (for example, a latch fastener). One end of the second belt 5320 may be movably disposed on the first belt 5310 through an adjuster 5350 (for adjusting a length of the second belt 5320), and the other end of the second belt 5320 is provided with another connecting device 5330. Correspondingly, as shown in FIG. 81, two connecting parts 51122 for connecting with the connecting devices 5330 are respectively disposed on an outer periphery of the bottom support 5112 at two sides of the bottom support 5112.

When the carrier 5100 needs to be fixed to a vehicle seat, as shown in an assembly view of FIG. 83A, after the carrier 5100 is fixed to the vehicle seat through the fixing seat assembly 5200, two connecting devices 5330 of the fixing belt assembly 5300 may be respectively connected to two connecting parts 51122 on one side of the bottom support 5112, and the other end of the fixing belt assembly 5300 (i.e., the connecting device 5340 of the first belt 5310) passes through the handle 51115 disposed on a top side of the carrier 5100 to connect with an interface (such as a Top Tether interface) correspondingly disposed on the vehicle, thereby further limiting the lateral sliding, tilting, etc. of the carrier 5100, and fixing the carrier 5100 more stably.

In another embodiment, as shown in FIG. 83A, the carrier (which is shown herein as the carrier 5100) may also be directly fixed to the vehicle seat through the fixing belt assembly 5300, that is, fixing seat assembly is not provided.

Figure 85:
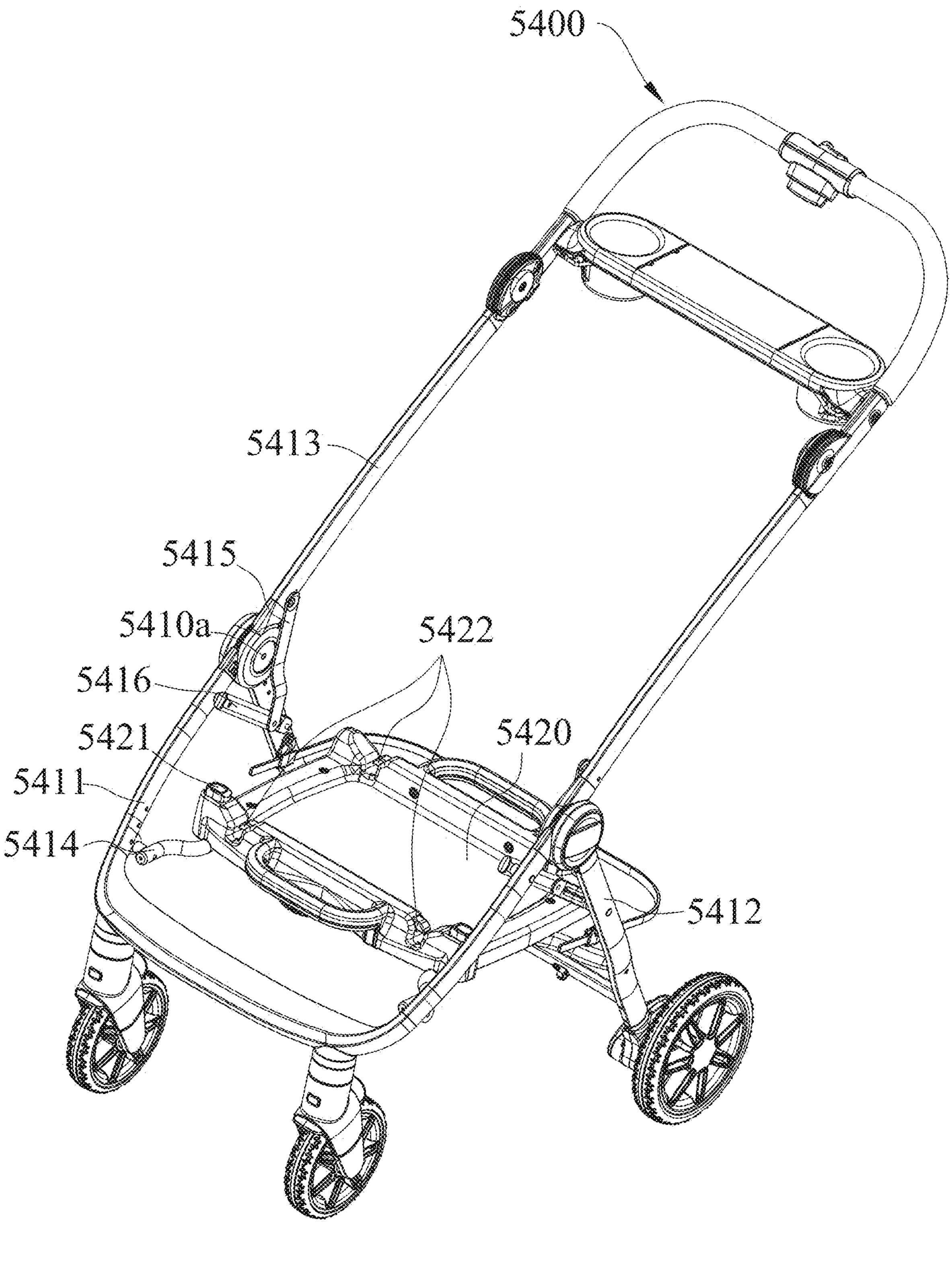
FIG. 85 shows a perspective view of a wheeled carrying apparatus cooperated with the carrier shown in FIG. 81.
Figure 86:
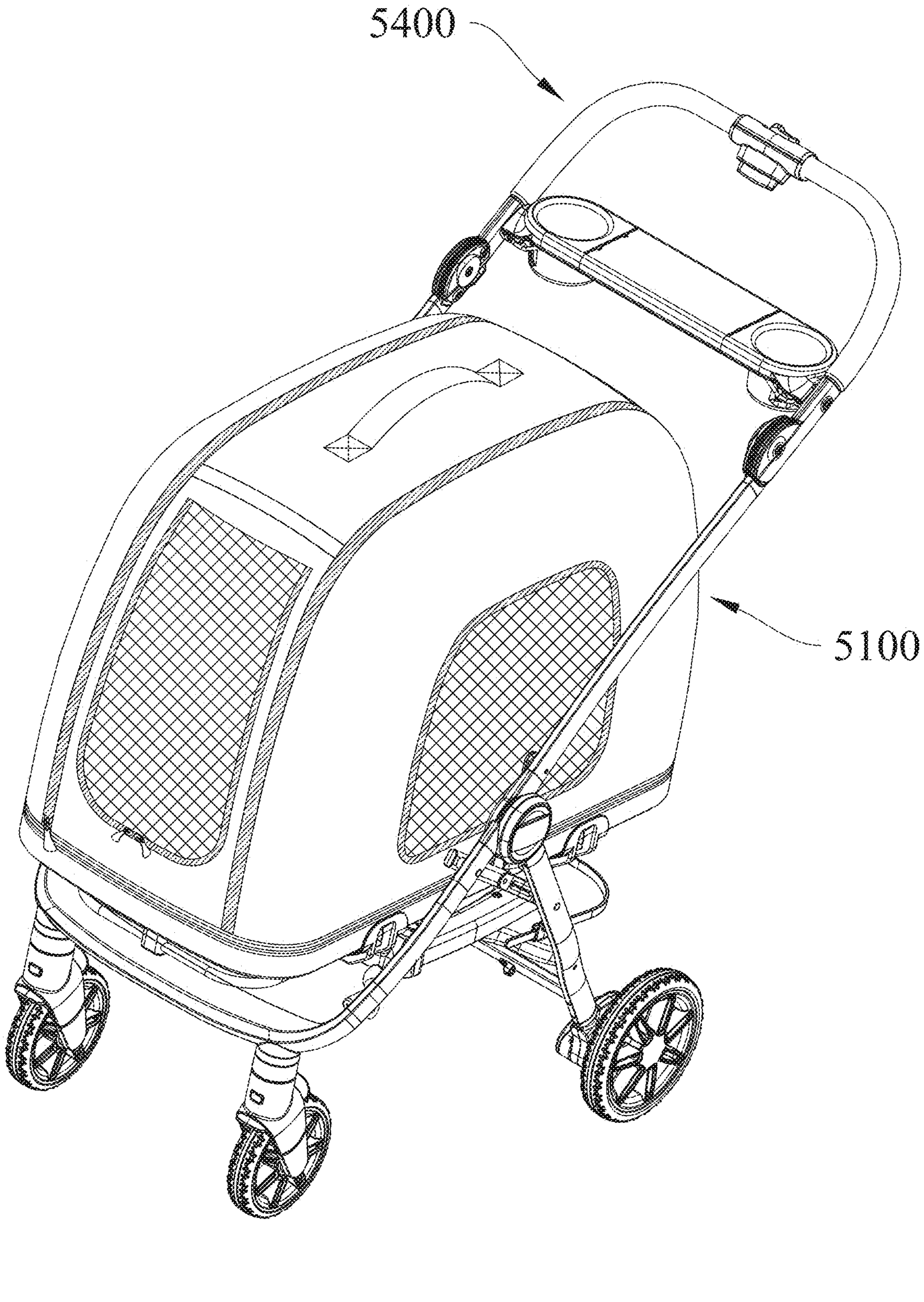
FIG. 86 shows a perspective view of the carrier which is mounted to the wheeled carrying apparatus.

In addition, referring to FIGS. 85 and 86, FIG. 85 shows a perspective view of a wheeled carrying apparatus cooperated with the carrier shown in FIG. 81, and FIG. 86 shows a perspective view of the carrier mounted to the wheeled carrying apparatus.

Further referring to FIGS. 81, 85 and 86, the carrier 5100 may also be locked to a wheeled carrying apparatus 5400, such as a trolley, with a bracket assembly 5120 disposed therebelow. As shown in FIG. 85, a carrying frame 5410 of the wheeled carrying apparatus 5400 includes a front supporting rod 5411, a rear supporting rod 5412 and an upper supporting rod 5413 that are pivotally connected to each other at a pivot point 5410*a*. A lower end of the front supporting rod 5411 and a lower end of the rear supporting rod 5412 are respectively connected with a wheel set. In an example, the front supporting rod 5411 may have a U-shaped structure, and the rear supporting rod 5412 may be formed by two parallel rod elements fixedly connected through a cross rod, and both ends of the front supporting rod 5411 are pivotally connected with one ends of the two rod elements of the rear supporting rod 5412, respectively. In addition, the carrying frame 5410 is also provided with a base plate 5420 for fixing the carrier 5100. In an example, the base plate 5420 may be substantially horizontally disposed at a position below the pivot point 5410*a* through the supporting frame 5414 and close to the wheel set disposed at the lower end of the front supporting rod 5411, thereby providing a larger space above the base plate 5420, and adapting to carriers with different sizes (for example, different heights) of the main body.

Specifically, when the carrier 5100 needs to be fixed to the wheeled carrying apparatus 5400, the engaging element 5121 (see FIG. 81) of the bracket assembly 5120 may be engaged into a locking element 5422 of a locking structure of the base plate 5420 to fix the carrier 5100 onto the base plate 5420 of the wheeled carrying apparatus 5400. When the carrier 5100 is not used, the locking element 5422 may release the engaging element 5121 (see FIG. 81) by pressing the releasing operation element 5421 disposed on the base plate 5420 (for example, exposed from an upper side of the base plate 5420 as shown in FIG. 85), so that the carrier 5100 may be detached and the carrying frame 5410 may be folded to store the carrier 5100 and the carrying frame 5410. Optionally, four locking structures may be symmetrically disposed on the base plate 5420 to make the positioning between the carrier 5100 and the wheeled carrying apparatus 5400 more stable.

It should be noted that the base plate 5420 may also be disposed at other positions (such as different heights) of the carrying frame 5410, for example, disposed close to the pivot point 5410*a* or at a higher position by the first connecting component 5415 (one end of which is connected to the upper supporting rod 5413) and the second connecting component 5416 (one end of which is connected to the front supporting rod 5411) as shown in FIG. 85, but the present disclosure is not limited thereto.

In addition, it should be noted that, in addition to the carrier 5100, the methods of fixing the bracket assembly (e.g., bracket assembly 5120), either through the fixing seat assembly (e.g., fixing seat assembly 5200) and/or through the fixing belt assembly (e.g., fixing belt assembly 5300) to the vehicle seat, or by fixing the bracket assembly to a wheeled carrying apparatus (e.g., wheeled carrying apparatus 5400), are equally applicable to the carrier 5500, 5600 in any of the previous embodiments.

A sixth aspect of the present disclosure provides a carrier (for example, an animal or pet carrier, such as a pet transport cage or box, a pet stretcher, or the like), and in particular, a carrier having a fixing system, which can stably fix the carrier in a vehicle and increase the safety of animals or pets carried by the carrier in the travelling vehicle.

Figure 87A:
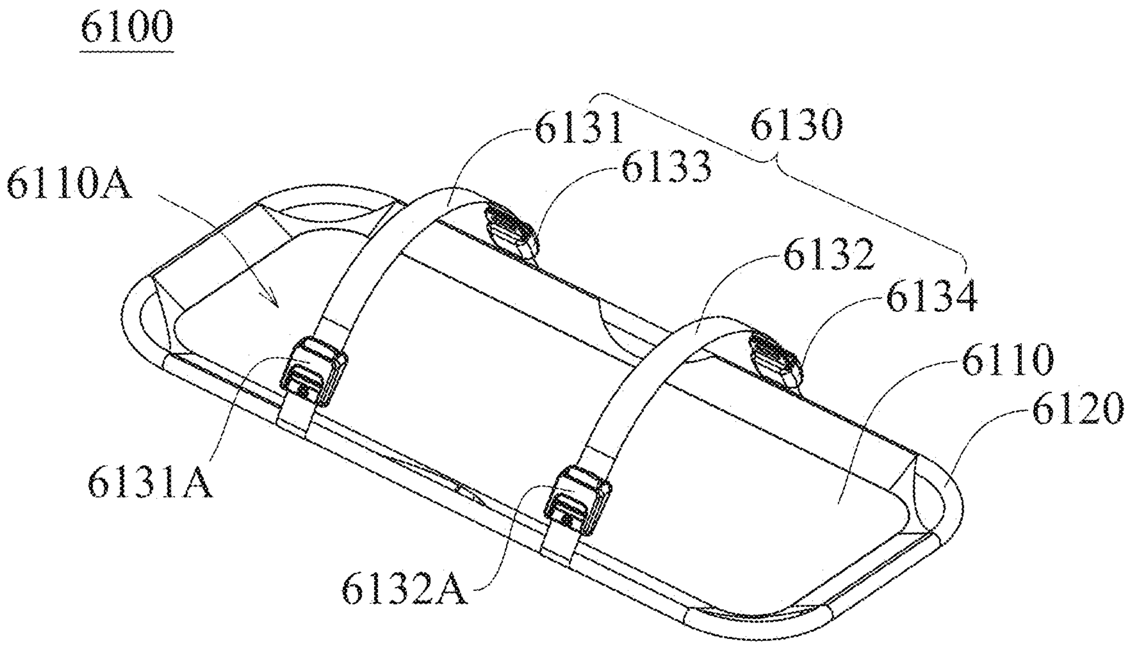
FIGS. 87A to 87C are schematic appearance views of a carrier according to an embodiment of a sixth aspect of the present disclosure from different views.
Figure 87B:
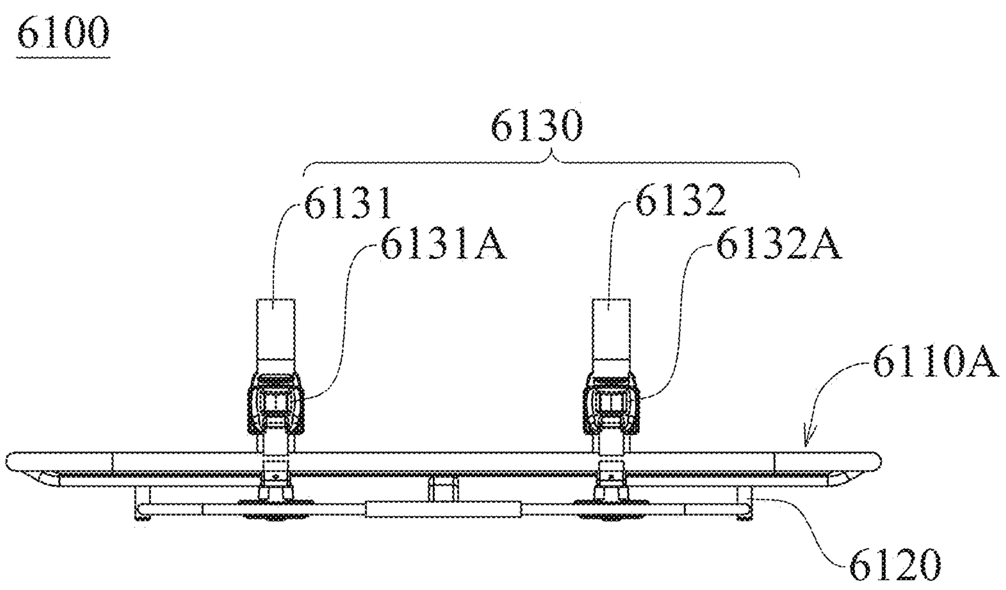

Referring to FIGS. 87A and 87B, FIGS. 87A and 87B show schematic appearance views of a carrier 6100 according to an embodiment of the sixth aspect of the present disclosure from different views. The carrier 6100 includes a carrying portion 6110, a bracket device 6120 and a binding device 6130. The carrying portion 6110 may be rectangular or square-annular, which defines a carrying space for carrying and supporting animals thereon. In this embodiment, the carrying space may be a carrying surface 6110A as shown in FIG. 87A. Specifically, the carrying portion 6110 may bear and support an animal, and is made of a rigid material (such as metal, plastic, wooden material, or the like) or a soft (i.e., flexible) material (such as woven fabric or the like) according to the practical application requirements. The bracket device 6120 may be made of metal or other materials with high rigidity, and each of components of the bracket device 6120 may be a hollow pipe or a solid rod element, but the present disclosure is not limited thereto. The binding device 6130 is disposed on the carrying surface 6110A to stably bind the animal on the carrying surface 6110A, and further provide support stability for the animal on the carrying surface 6110A (which will be further described below).

Figure 87C:
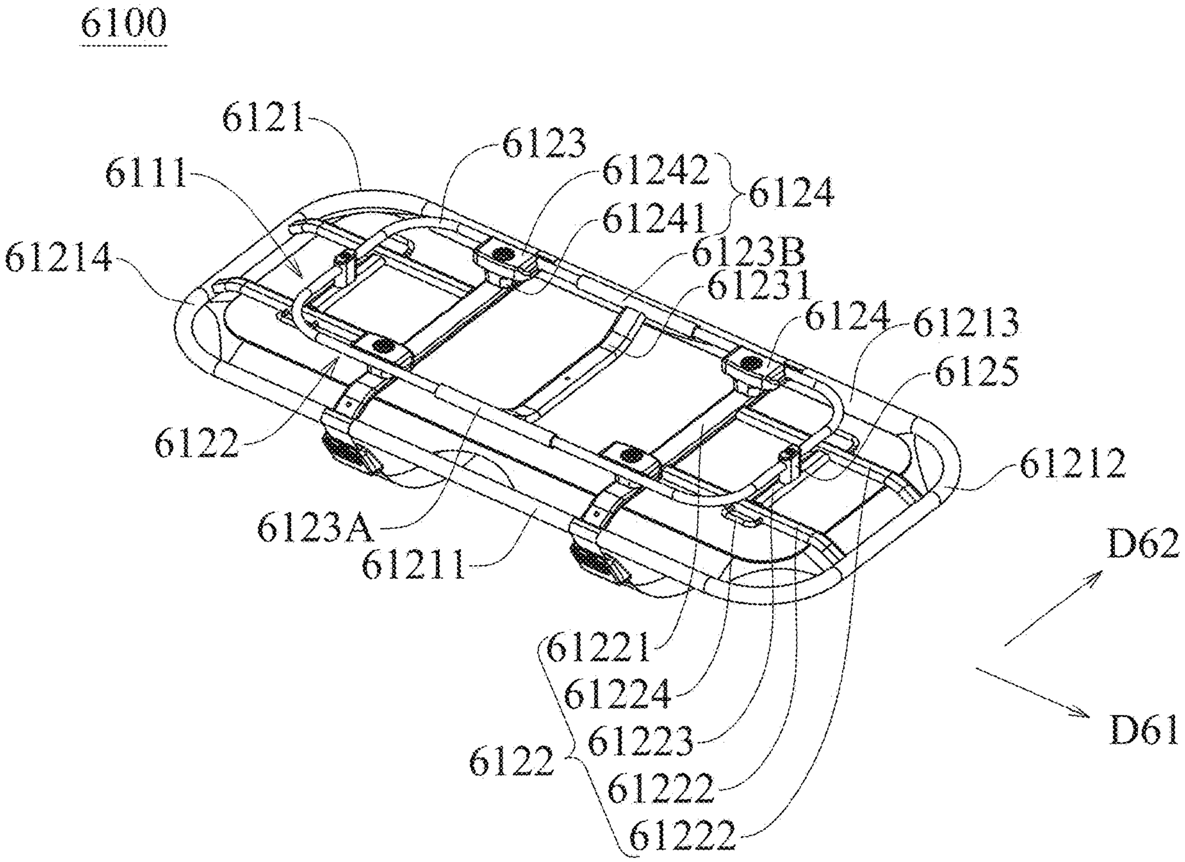

Referring to FIG. 87C, FIG. 87C shows a schematic appearance view of the carrier 6100 at another view to illustrate the bracket device 6120 of the carrier 6100. As shown, the bracket device 6120 includes a first bracket 6121, two second brackets 6122, a third bracket 6123, and first fixing assemblies 6124 connecting the second brackets 6122 and the third bracket 6123. The bracket device 6120 is disposed on a bottom surface 6111 of the carrying portion 6110 (i.e., an opposite surface of the carrying surface 6110A). In the present disclosure, the bracket device 6120 may not only provide necessary support strength for the carrying portion 6110 of the carrier 6100, but also allow the carrier 6100 to be fixed to a carrying apparatus (such as a vehicle or trolley).

As shown in FIG. 87C, the first bracket 6121 is mainly composed of two opposite long sides 61211 and 61213 and two opposite short sides 61212 and 61214, which are formed into a rectangular or square shape and correspond to a size and shape of the carrying portion 6110, but the present disclosure is not limited thereto. In other embodiments, the first bracket may also be formed by four sides of approximately equal length adjacent to each other in a substantially square shape. In this embodiment, the first bracket 6121 is combined to the carrying portion 6110 and disposed around a periphery of the carrying portion 6110. The carrying portion 6110 does not completely enclose the first bracket 6121, but exposes four corners of the rectangular or square annular carrying bracket 6121 and middle points of long sides 61211 and 61213, which is beneficial for a caregiver or a user to hold the carrier 6100 by hand, but the present disclosure is not limited thereto. Optionally, the carrying portion 6110 may be designed according to actual requirements to expose other parts of the carrying portion 6110 or completely enclose the first bracket 6121. In addition, the carrying portion 6110 may have a concave structure, that is, the bottom portion of the carrying portion 6110 may be slightly lower than a plane formed by the first bracket 6121, thereby forming an accommodation space with a certain depth to facilitate carrying and supporting animals therein.

The two second brackets 6122 are connected to the first bracket 6121, and are spaced apart from each other along a longitudinal direction D61 of the carrying portion 6110 (i.e., on both sides of a line for connecting centers of two long sides of the carrying portion 6110). Each of the second brackets 6122 is combined with the carrying portion 6110 and extends from one long side of the carrying portion 6110 to the other long side along a transverse direction D62 of the carrying portion 6110 (via the bottom surface of the carrying portion 6110). By providing the two second brackets 6122 separately in the longitudinal direction D61 of the carrying portion 6110, the load-bearing of the carrying portion 6110 may be dispersed and the carrying portion 6110 may be stably supported, thereby improving the weight resistance and impact resistance of the carrying portion 6110.

In this embodiment, each of the second brackets 6122 includes a first cross bar 61221, a pair of longitudinal bars 61222, a second cross bar 61223, and a pair of connecting parts 61224. As shown in FIG. 87C, the first cross bar 61221 is a bent bar, both ends of which are bent and have a contour corresponding to the concave structure of the carrying portion 6110, but the present disclosure is not limited thereto. Alternatively, the first cross bar 61221 may also be a straight bar, so that a fixed interval may be formed between the first cross bar 61221 and the carrying portion having the concave structure as an avoidance space. The first cross bar 61221 is connected to two long sides 61211 and 61213 of the first bracket 6121 (i.e., parallel to a transverse direction D62), and are spaced apart from each other along a longitudinal direction D61 of the carrying portion 6110 (i.e., located on both sides of a centerline of two long sides of the carrying portion 6110). A pair of longitudinal bars 61222 of the second bracket 6122 are disposed in parallel with each other, with one end thereof connected to the first cross bar 61221 and the other end thereof connected to a short side 61212 (or short side 61214) of the first bracket 6121. The second cross bar 61223 is shorter than the first cross bar 61221, and its two ends are connected to the pair of longitudinal bars 61222 respectively. That is, in this embodiment, as viewed in the longitudinal direction D61 of the carrier 6100, the pair of longitudinal bars 61222 and the second cross bar 61223 of each of the second brackets 6122 form an H-shaped structure, which is connected between the first cross bar 61221 of each second bracket 6122 and the short side 61212 or 61214 of the first bracket 6121 to further improve the weight resistance and impact resistance of the carrying portion 6110. In this embodiment, the longitudinal bar 61222 is in the form of a straight bar, but the present disclosure is not limited thereto. Optionally, the longitudinal bar 61222 may also be formed into a non-straight bar, and may be formed into a zigzag or tapered bar according to the contour height of the carrying portion or the bracket space.

A pair of connecting parts 61224 of each of the second brackets 6122 may be disposed at the connections of the second cross bar 61223 and the pair of longitudinal bars 61222, so as to facilitate to be connected with a belt fixing system (such as the fixing belt assemblies described below) of the carrying apparatus (such as a vehicle) through connectors (for example, by hooking), thereby fixing the carrier 6100 in the carrying apparatus (further described below). Alternatively, a pair of connecting parts of each second bracket may also be disposed at any position of each second cross rod, as long as it can assist the belt fixing system to fix the carrier in the carrying apparatus. In addition, in this embodiment, the connecting part 61224 extends away from the bottom surface 6111 on the corresponding second bracket 6122, thereby forming a fixed interval with the bottom surface 6111. When the carrier 6100 of this embodiment is connected with the belt fixing system of the vehicle, an avoidance space is provided to prevent the connector of the belt fixing system from pressing the bottom surface 6111 upward to cause interference when it is connected with the connecting part 61224. Alternatively, in other embodiments, the second bracket may not include a connecting part, and the connector of the belt fixing system may be directly connected or hooked to the first bracket. Alternatively, the connector may be directly connected or hooked to the third bracket, and cooperate with a limiting structure (not shown, which may be disposed on the connector itself or the third bracket) to limit the connection position in which the connector is hooked to the third bracket.

The third bracket 6123 is connected to the second bracket 6122 through the corresponding first fixing assembly 6124, which may be in a rectangular or square-ring shape, and is used for cooperating with the engaging device (which will be further described below) of the carrying apparatus, but the present disclosure is not limited thereto. In other embodiments, the third bracket may also be formed by four sides of approximately equal length adjacent to each other in a substantially square shape. As shown, the third bracket 6123 is smaller than the first bracket 6121 and is substantially parallel to the first bracket 6121. The third bracket 6123 and the first bracket 6121 are substantially horizontally disposed and arranged up and down in the vertical direction. In this embodiment, the third bracket 6123 further includes a pair of limiting parts 6123A and 6123B and a structural reinforcement element 61231. The limiting parts 6123A and 6123B are centrally disposed on the long sides of the third bracket 6123 respectively, and have a diameter that is slightly larger than a diameter of a bar body of the third bracket 6123. The reinforcement element 61231 connects two opposite long sides at the centers of the long sides of the third bracket 6123 so as to improve the strength of the third bracket 6123. In this embodiment, the reinforcing element 61231 may be a bent bar structure with both ends bent, and have a central part abutting against the bottom surface 6111 of the carrying portion 6110, thereby further enhancing the support for the carrying portion 6110. In this embodiment, the third bracket 6123 and the carrying portion 6110 are not in contact with each other, but the present disclosure is not limited thereto. In this embodiment, the third bracket 6123 is connected to the second bracket 6122 through four first fixing assemblies 6124, which are symmetrically disposed with respect to each other in the longitudinal direction D61 and the transverse direction D62 of the carrier 6100. In other words, the four first fixing assemblies 6124 are spaced apart from each other in pairs along the longitudinal direction D61 (i.e., on both sides of a long-side centerline of the carrying portion 6110) and along the transverse direction D62 (i.e., on both sides of a short-side centerline of the carrying portion 6110). Each of the first fixing assemblies 6124 includes a connecting bracket 61241 and a guide 61242, each connecting bracket 61241 is correspondingly connected to the first cross bar 61221 of the second bracket 6122, and the guide 61242 is engaged with the corresponding part of the third bracket 6123, thereby connecting each of the second brackets 6122 and the third bracket 6123. In this embodiment, through the symmetrical configuration of the first fixing assembly 6124, the overall stability of the bracket device 6120 of the carrier 6100 can be further improved, which is more conducive to stable cooperation with the carrying apparatus. For the specific structure of the first fixing assembly 6124 and its variation structure, referring to the detailed description in Chinese Patent Application No. 202211059588 (i.e., the third aspect of the present disclosure) owned by the applicant, which is incorporated herein by reference in its entirety, which will not be described in detail herein.

As shown in FIGS. 87B and 87C, the bracket device 6120 of the carrier 6100 of this embodiment may further include a second fixing assembly 6125, which connects the second cross bar 61223 in each second bracket 6122 and the third bracket 6123, so that the third bracket 6123 has further stability with respect to the second bracket 6122. Specifically, the second fixing assembly 6125 is connected to a midpoint of the second cross bar 61223 and a midpoint of the corresponding short side of the third bracket 6123, so as to provide uniform supporting force and better stability effect.

In this embodiment, the first bracket 6121, the second bracket 6122, the third bracket 6123, the first fixing assembly 6124 and the second fixing assembly 6125 are independent structural elements that are connected with each other, but the present disclosure is not limited thereto. In other embodiments, the first bracket 6121, the second bracket 6122, the third bracket 6123, the first fixing assembly 6124 and the second fixing assembly 6125 (or parts thereof) may also be integrated structural elements.

Referring back to FIGS. 87A and 87B, the binding device 6130 is disposed on the carrying surface 6110A of the carrying portion 6110 to stably bind the animal to the carrying portion 6110, so as to prevent the animal from arbitrarily moving and falling out of the carrier. In this embodiment, the binding device 6130 is mainly composed of two fixing clamping belts 6131, 6132, which are disposed in parallel, and their corresponding clamping members 6131A, 6132A. Through the interaction between the two fixing clamping belts 6131, 6132 and the two corresponding clamping members 6131A, 6132A, the animal on the carrying surface 6110A may be restrained in a parallel binding mode (i.e., two fixing clamping belts 6131 and 6132 extend across the animal's body in parallel and then are connected to the clamping members 6131A and 6132A respectively) or in a cross binding mode (i.e., two fixing clamping belts 6131 and 6132 are crossed and extend across the animal's body, and then are connected to the buckles 6132A and 6131A respectively), or may be further cooperated with the design of various ring pieces on animal wearing appliances (such as pet vests) to provide several different binding modes. In this embodiment, the fixing clamping belts 6131, 6132 of the binding device 6130 are also provided with adjusters 6133 and 6134, respectively, for adjusting lengths of the fixing clamping belts 6131 and 6132 respectively, so as to adapt to the body shape, posture and binding mode of the animal and provide a comfortable and stable binding environment for the animal. The specific structure of the adjuster and the length adjustment mode of the fixing clamping belt with the adjuster are common knowledge understood by those skilled in the art, which will not be described in detail herein.

Figure 88A:
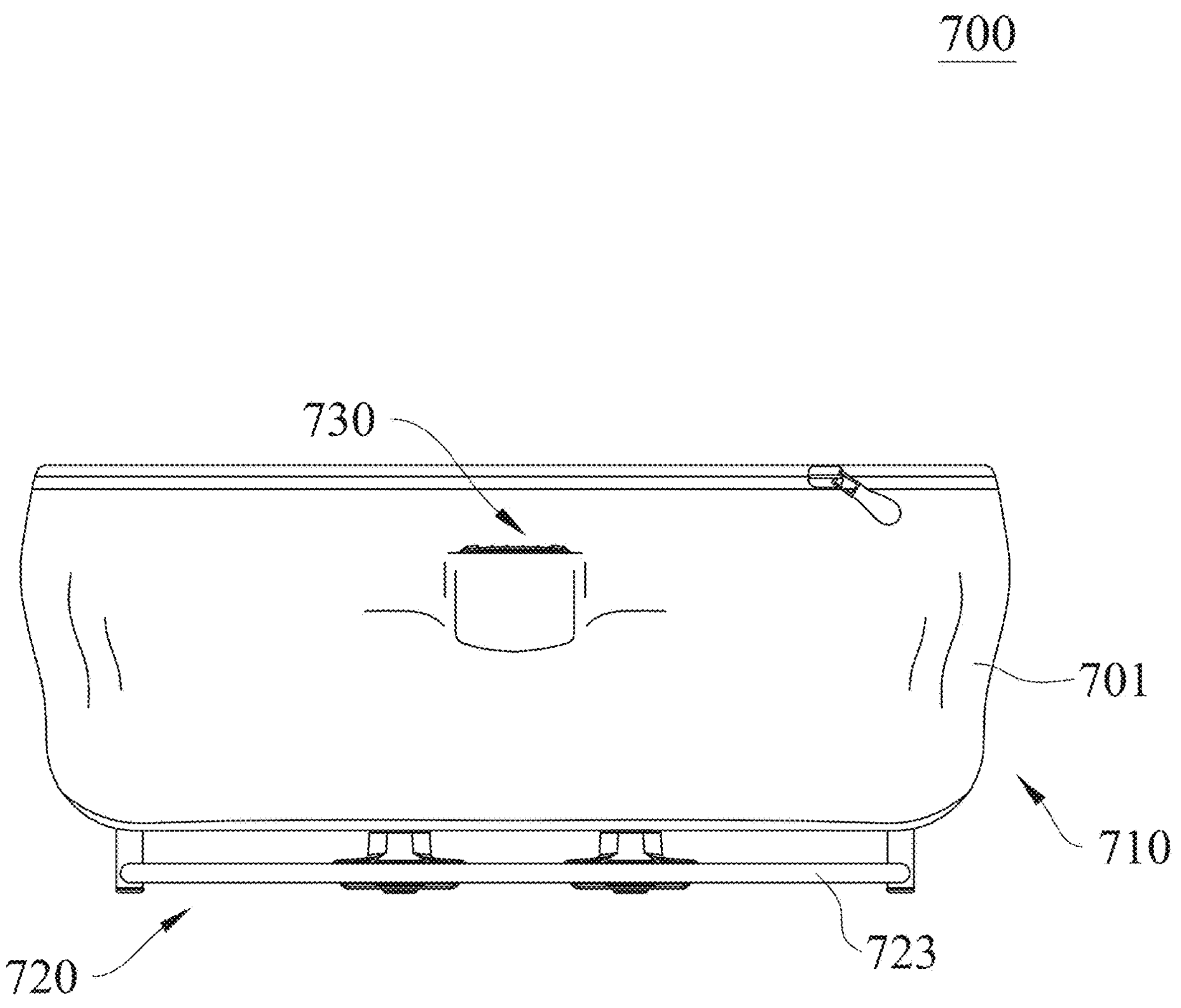
FIGS. 88A to 88C show perspective views of a carrier according to an embodiment of the present disclosure.
Figure 88B:
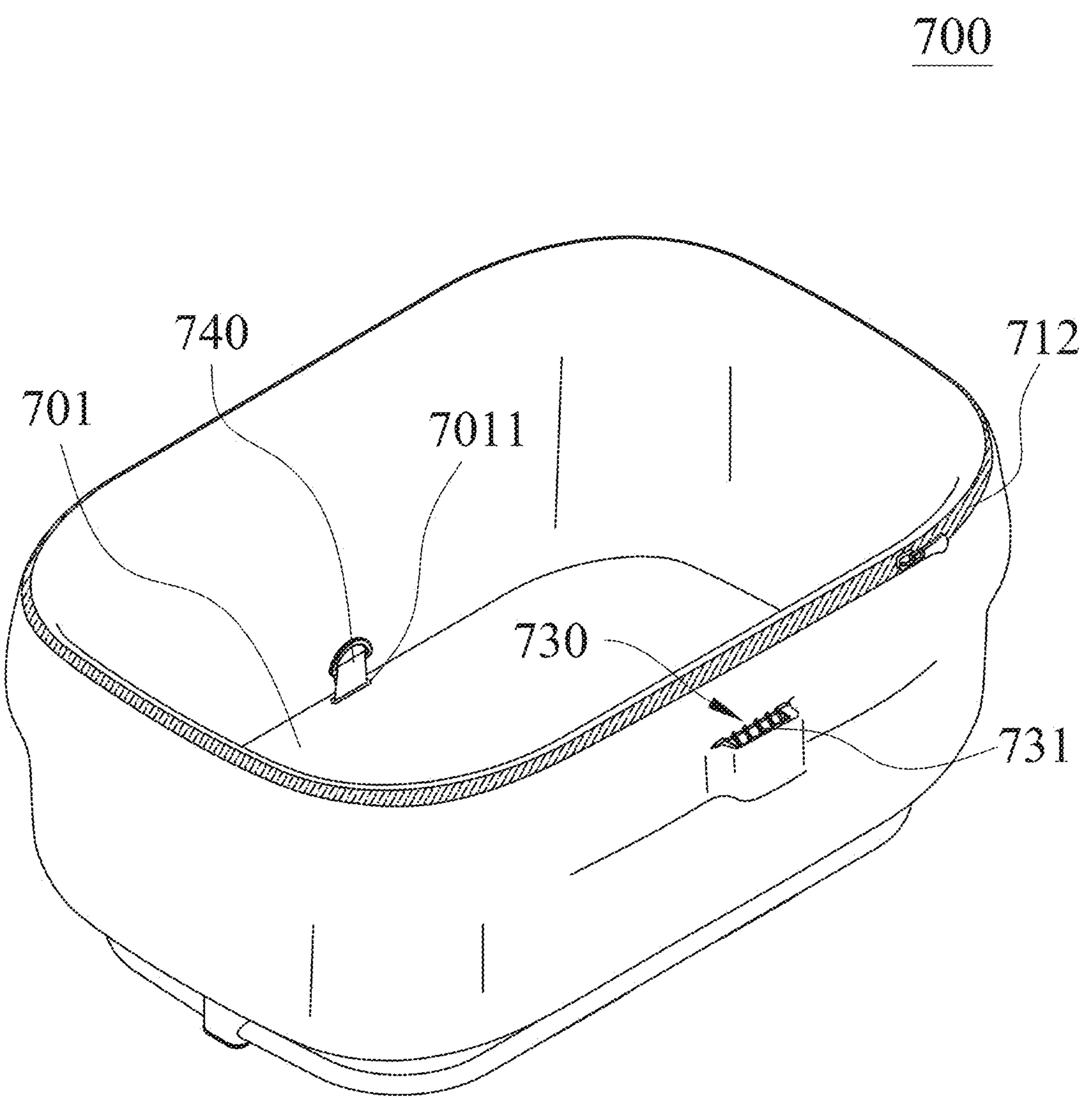
Figure 88C:
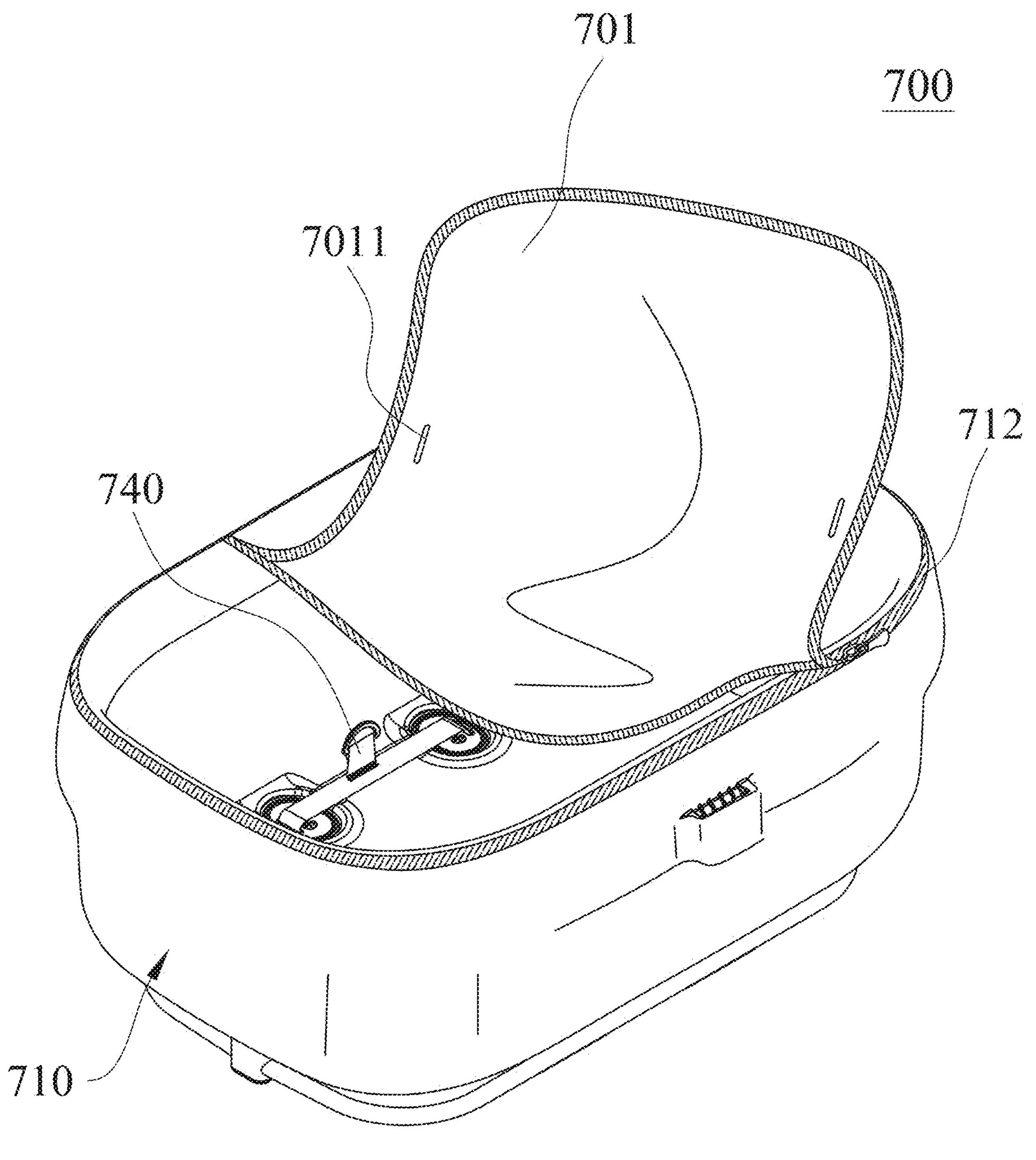

FIGS. 88A to 88C show a carrier 700 sleeved with a cloth 701 (such as a lining cloth) according to an embodiment of the present disclosure. In this embodiment, as shown in FIGS. 88B and 88C, the cloth 701 may be detachably sleeved on a main body 710 (i.e., a carrying portion) of the carrier 700 through a connecting assembly 712. In an example, the connecting assembly 712 may have a zipper structure (which may also be considered as a kind of closure 712), for example, but the present disclosure is not limited thereto. As shown in FIGS. 88A and 88B, when the cloth 701 is sleeved on the main body 710, at least a part of the bracket device 720 of the carrier 700 (for example, a third bracket 723 disposed below the main body 710 for fixing the carrying apparatus) and a part of the canopy locking part 730 connected with the canopy assembly (not shown) are exposed. In addition, as shown in FIGS. 88B and 88C, the cloth 701 is also provided with a slit 7011 at the bottom portion of the main body 710, so that at least a part of the carrier belt 740 provided at the bottom portion of the main body 710 passes through the slit 7011, thereby being connected with a pet harness, a binding webbing or the like.

Furthermore, as shown in FIG. 88B, a rib structure 731 may also be provided inside the canopy locking part 730 to abut against the locking element (not shown, the structure of which can be seen in the locking element 42322 in the embodiment shown in FIG. 57B) of the canopy assembly that is cooperated with the canopy locking part 730, thereby increasing the friction force applied to the locking element and saving the material cost. In another embodiment, the canopy locking part 730 may not have the rib structure 731 or have other structures, as long as the locking element of the canopy assembly and the canopy locking part 730 can firmly abut against each other.

It should be noted that the structure and/or arrangement of the cloth 701 described in this embodiment can be applied to the main body in any of the aforementioned embodiments, and the present disclosure will not be described in detail herein.

Figure 89A:
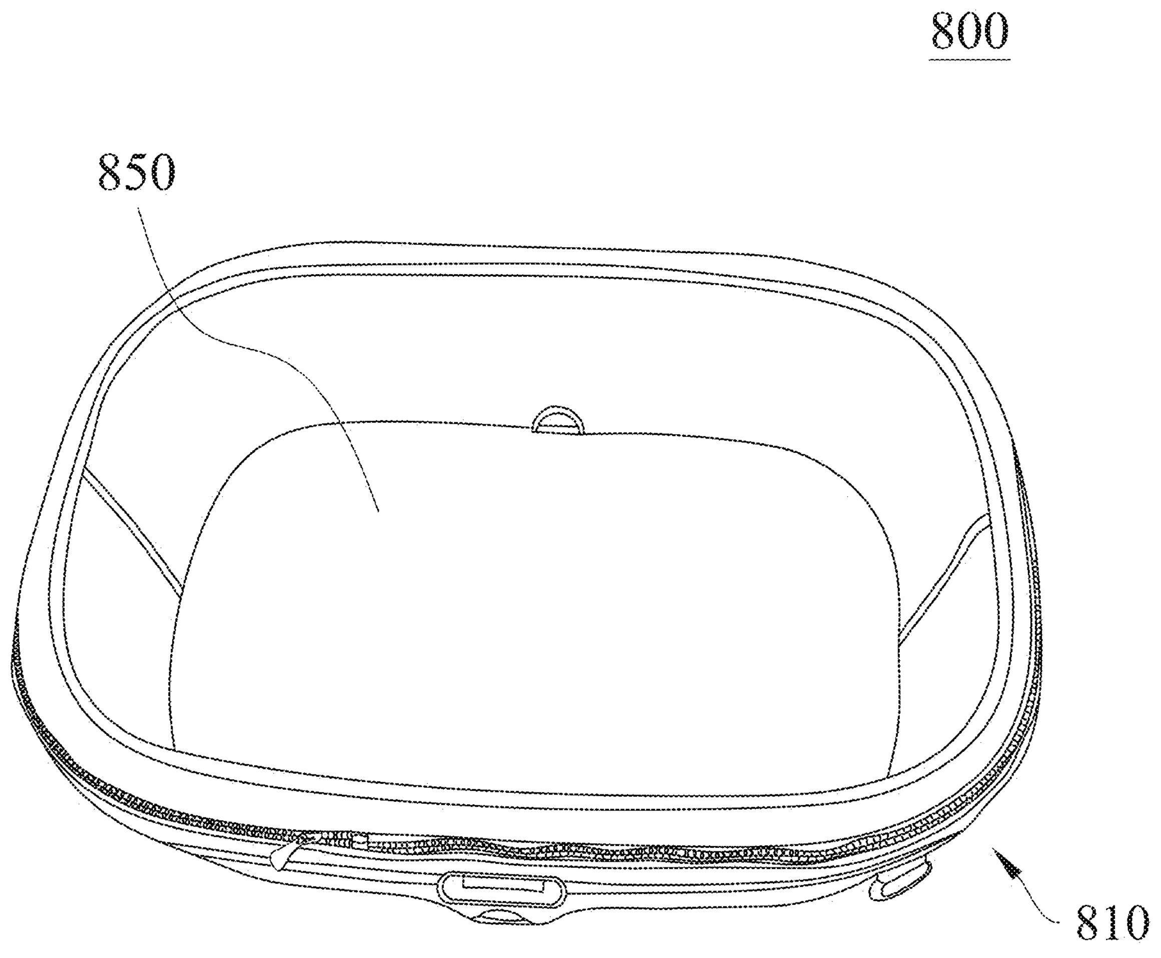
FIGS. 89A and 89B show perspective views of a carrier according to an embodiment of the present disclosure.
Figure 89B:
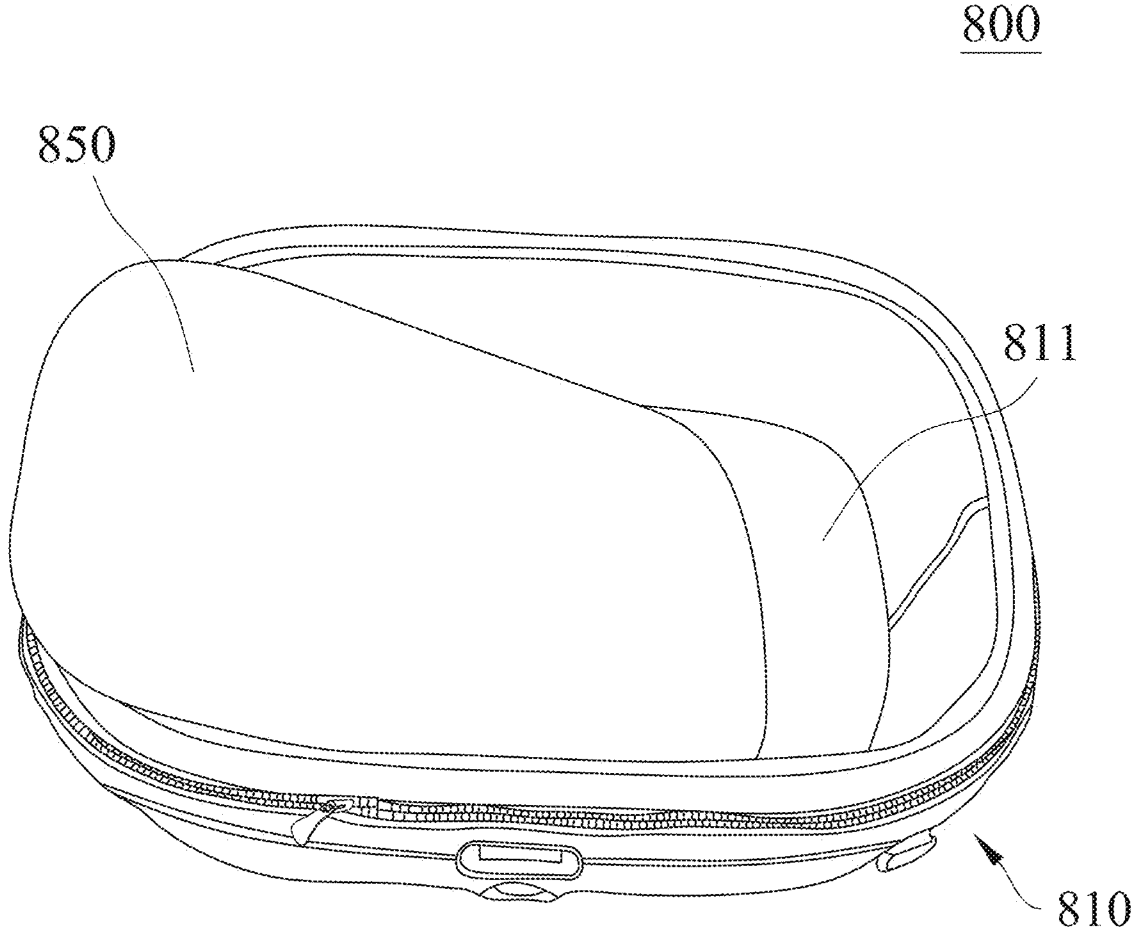
Figure 90A:
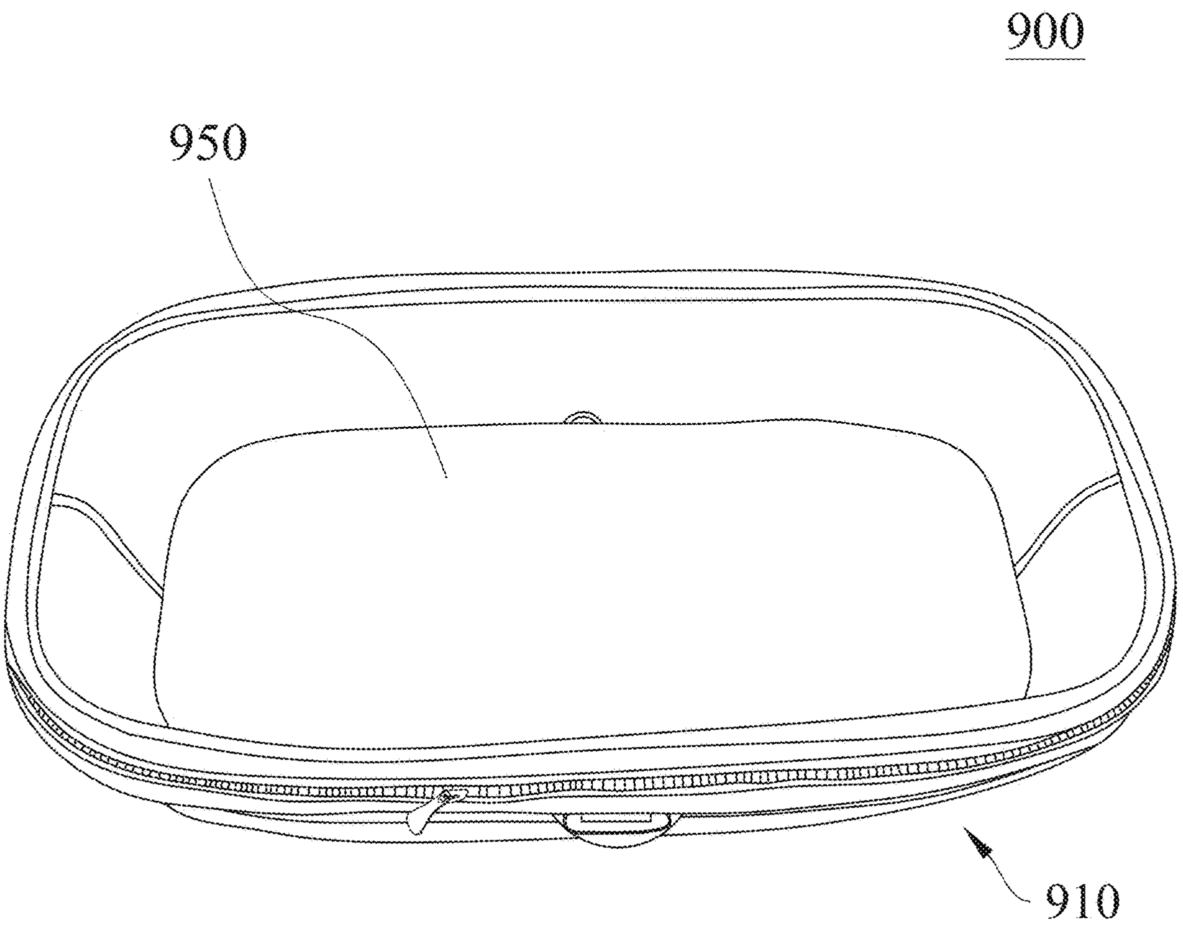
Figure 90B:
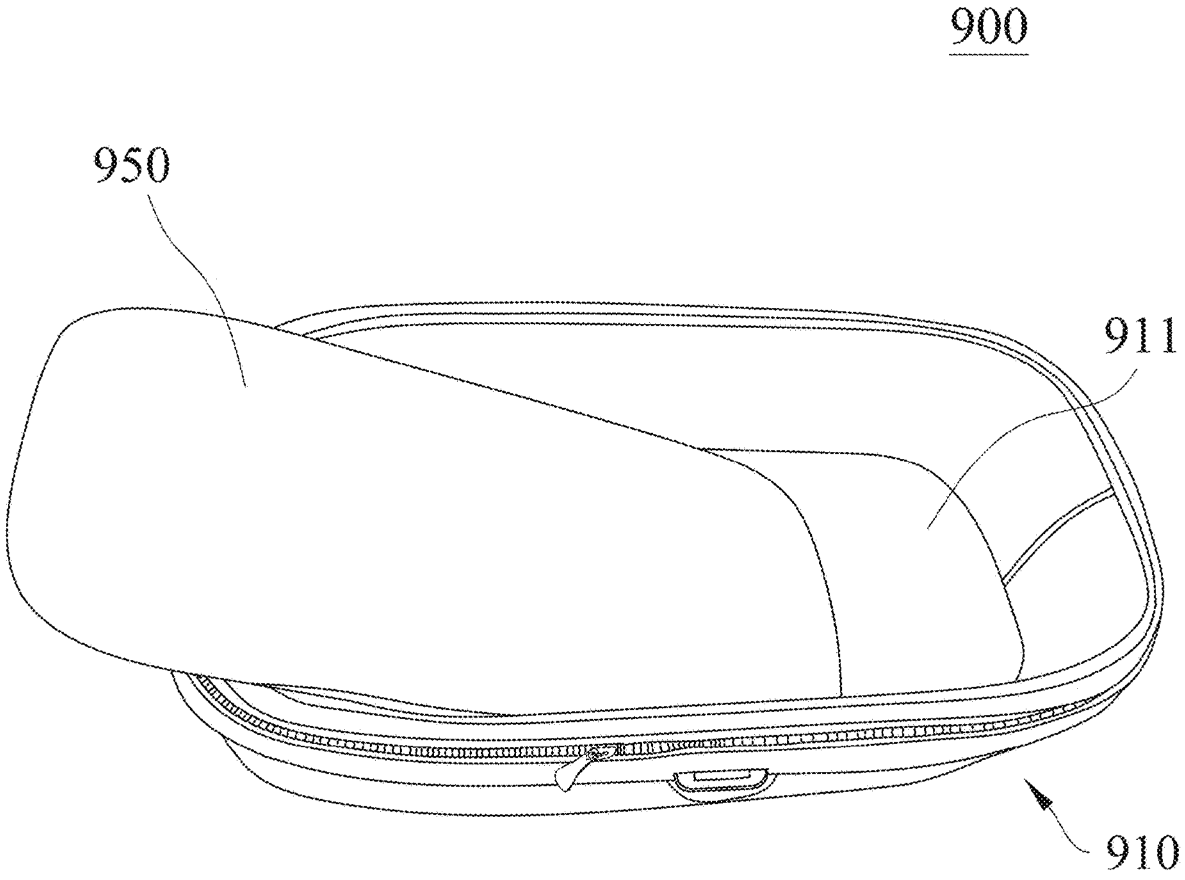

FIGS. 89A to 90B show perspective views of carriers according to different embodiments of the present disclosure, wherein FIGS. 89A and 89B show a carrier 800 having a shorter size, and FIGS. 90A and 90B show a carrier 900 having a longer size.

Referring to FIGS. 89A and 89B, a cushion 850 may be placed in the carrier 800 having a shorter size. Specifically, the cushion 850 is removably installed in the main body 810 of the carrier 800 and is in contact with an inner bottom surface 811 of the main body 810. Similarly, as shown in FIGS. 90A and 90B, the carrier 900 with a longer size may also be provided with a cushion 950, which may be removably placed on an inner bottom surface 911 of the main body 910. Hereinafter, taking the cushion 950 shown in FIG. 90B as an example, the specific structure of the cushion 950 will be described with reference to FIGS. 91A to 91C.

Figure 91A:
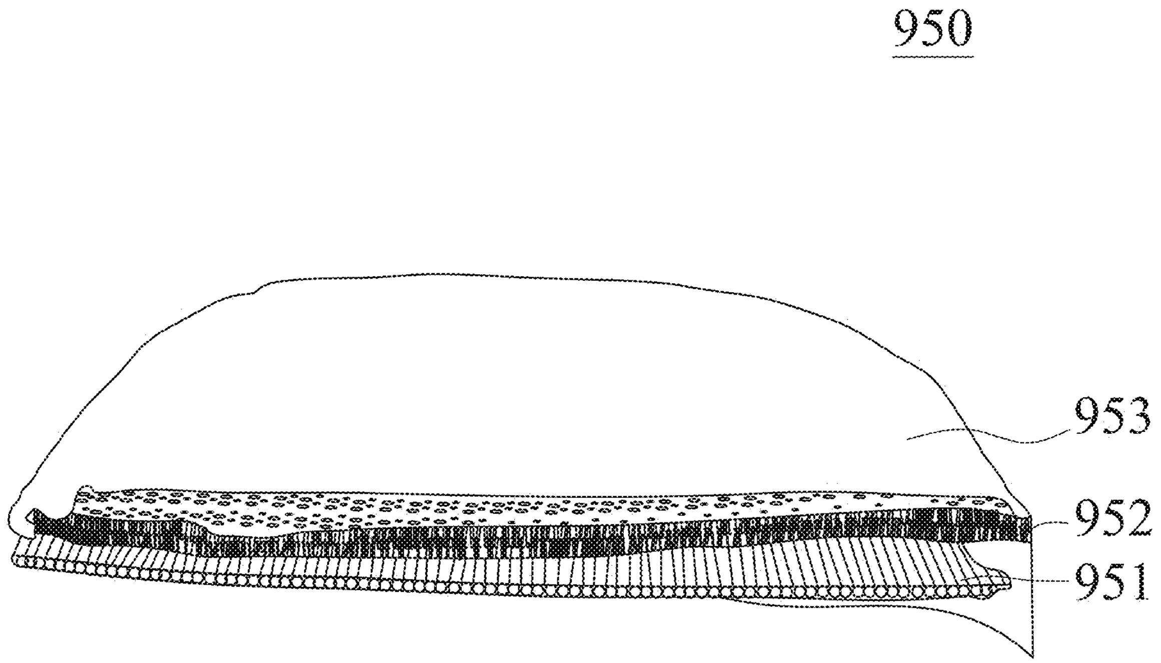
Figure 91B:
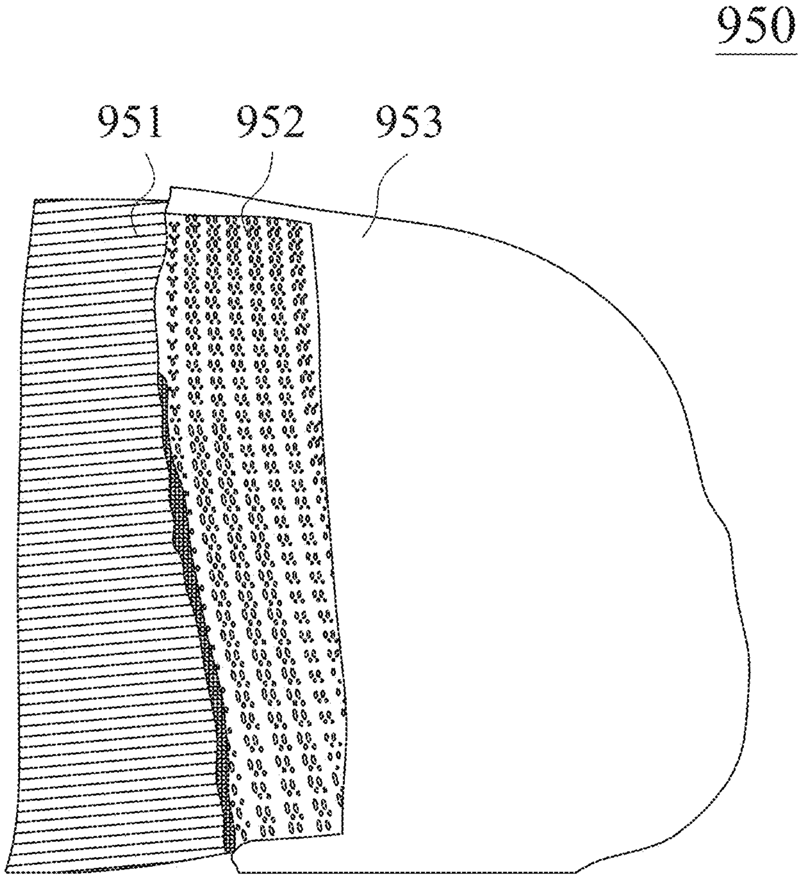
Figure 91C:
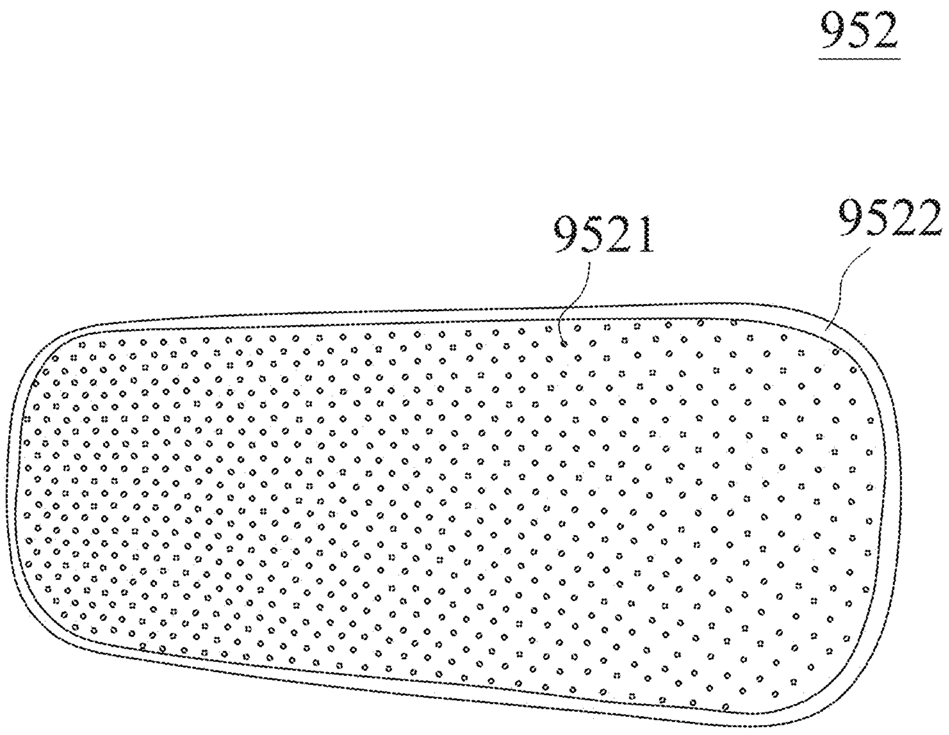

FIGS. 91A to 91C show cross-sectional views of the cushion 950 shown in FIG. 90B.

Referring to FIGS. 91A and 91B, the cushion 950 of this embodiment may include a supporting layer 951, a soft layer 952 and a coating layer 953. The supporting layer 951 and the soft layer 952 are laminated. Specifically, when the cushion 950 is placed in the main body 910 (in combination with FIG. 90B), the supporting layer 951 is disposed below the soft layer 952, that is, the supporting layer 951 is located at the lower layer and the soft layer 952 is located at the upper layer. The coating layer 953 encloses outside the supporting layer 951 and the soft layer 952.

In an example, the supporting layer 951 may be corrugated board. In other examples, the supporting layer 951 may also be a PE board, a paperboard or a wooden board, but the present disclosure is not limited thereto. In addition, the supporting layer 951 is made of various materials, such as formed by laminating the aforementioned or any other materials.

As shown in FIG. 91A, the soft layer 952 may be made of polyester. In an example, the soft layer 952 may have a "sandwich" structure, that is, it is made of sandwich fabric. Specifically, the upper layer (i.e., the upper surface) of the soft layer 952 may adopt a mesh structure to ensure air permeability; the lower layer of the soft layer 952 (i.e., the lower surface thereof) may adopt a tightly woven plain cloth; and a middle layer of the soft layer 952 may adopt MOLO yarn. In addition, the soft layer 952 may also have wrapped edges (e.g., woven fabric), and an outer edge of the soft layer 952 may be wrapped by sewing, so as to improve the aesthetics.

The coating layer 953 may encapsulate the supporting layer 951 and the soft layer 952 therein, for example, by a fixing connection mode such as sewing, but the present disclosure is not limited thereto. Optionally or alternatively, the coating layer 953 may also have a detachable structure such as a zipper, so as to realize disassembly, washing and replacement of the coating layer 953. Optionally, the coating layer 953 may be made of cloth, such as knitted cloth, woven cloth, etc.

As shown in FIG. 91C, in another example, the soft layer 952 may have a different structure. Specifically, the soft layer 952 of this example may be made of foam, such as PU foam, so as to ensure its breathability and comfort. A plurality of air holes 9521 penetrating through the foam are disposed on the foam, and the air holes 9521 are provided all over the entire foam. Further, tricot is attached to both sides of the foam. In addition, the edge of the soft layer 952 may also be wrapped 9522, wherein the edge wrapping 9522 may be woven fabric. However, the soft layer 952 of the present disclosure is not limited to the above materials and/or structures.

In addition, it should be noted that embodiments of various aspects of the present disclosure can be arbitrarily or selectively combined without structural interference (i.e., maintaining the structural integrity).

In addition, the present disclosure provides a method of loading and unloading a carrier onto and from a carrying frame. The method includes: locking the carrier to a locking base assembly on the carrying frame; and unloading the carrier from the locking base assembly.

In an embodiment, locking the carrier to the locking base assembly includes: placing the carrier on the locking base assembly, so that an engaging element of the carrier is locked on a base plate. Furthermore, locking parts of locking elements protruding from the base plate are pushed by the engaging element of the carrier, and the locking parts are retracted inward to the base plate, so that the carrier may continue to move downward into a recess of the base plate, and then the locking parts extend outward from the base plate again under the action of an elastic device, so that the carrier is locked to the locking base assembly.

In an embodiment, unloading the carrier includes: enabling a holding mechanism to be in a ready state by locking the carrier to the locking base assembly. Further, in the ready state, the carrier presses down a touch button of the holding mechanism, and at the same time drives a buckling part movably connected to the touch button to move downwards.

In an embodiment, unloading the carrier further includes: unlocking the carrier with a plurality of locking elements of the locking base assembly by operating the releasing operation element. Further, by moving the releasing operation element from a locking position to an unlocking position, the plurality of locking elements are driven to move to unlock the carrier. Furthermore, the locking parts of the plurality of locking elements retract inward to the base plate to release the engaging element of the carrier.

In an embodiment, unloading the carrier further includes: switching the holding mechanism from the ready state to a holding state to hold the releasing operation element in the unlocking position. Further, a holding hook of the locking element moves along with the movement of the releasing operation element from the locking position to the unlocking position, so as to be engaged with the buckling part of the holding mechanism, so that the holding mechanism is in the holding state, thereby holding the releasing operation element in the unlocking position.

The wheeled carrying apparatus of the present disclosure may lock and mount the carrier on the carrying frame so that it can be used in the form of a trolley; and detaching the carrier from the carrying frame so that it can be used in the form of a portable carrier, thereby avoiding the user from taking up a lot of space when going out with different carriers.

The present disclosure provides a wheeled carrying apparatus. The wheeled carrying apparatus includes a carrying frame and a locking base assembly. The carrying frame includes a front supporting rod connected with the front wheel, a rear supporting rod connected with the rear wheel, and an upper supporting rod connected with a handrail, one end of the front supporting rod, one end of the rear supporting rod and one end of the upper supporting rod are pivotally connected with each other at a pivoting part. The locking base assembly is mounted on the carrying frame. When the frame is unfolded, a center of gravity of the locking base assembly is offset to a rear wheel with respect to a pivoting part.

The present disclosure discloses a carrier. The carrier includes a main body and a bracket device. The main body includes a bottom portion and a peripheral wall connected with the bottom portion, and an accommodation space is surrounded and defined by the bottom portion and the peripheral wall. The bracket device includes a first bracket and a second bracket. The first bracket is combined to the main body and is disposed around the peripheral wall of the main body. The second bracket is connected to the first bracket. The second bracket is combined to the main body and extends from one side of the peripheral wall of the main body to the other side of the peripheral wall of the main body via the bottom portion of the main body.

In an embodiment, the bracket device further includes a third bracket and a fixing assembly. The third bracket is located at a side of the bottom portion of the main body. The third bracket is configured to cooperate with an engaging structure of a base. The fixing assembly connects the main body with the third bracket. The third bracket is disposed to be spaced apart from a bottom surface of the main body through the fixing assembly.

In an embodiment, the fixing assembly further includes a guide. The guide is connected to the third bracket and located at a position corresponding to the first connecting bracket for guiding the third bracket to cooperate with the engaging structure of the base.

In an embodiment, the fixing assembly further includes a bracket connecting element. The bottom portion of the main body includes a through slot. The through slot is located at a position corresponding to the first connecting bracket, and the bracket connecting element is at least partially located within the through slot and abuts against the second bracket.

In an embodiment, the fixing assembly further includes a securing combination. The securing combination includes a securing element and a matching element. The matching element is disposed on the bracket connecting element. The securing element passes through the guide, the third bracket, the first connecting bracket, the second bracket and the bracket connecting element and is mutually locked with the matching element.

In an embodiment, the fixing assembly further includes a bracket connecting element. The bottom portion of the main body includes a through slot. The through slot is located at a position corresponding to the first connecting bracket, and the bracket connecting element is at least partially located within the through slot and abuts against the second bracket.

In an embodiment, the fixing assembly further includes a securing combination. The securing combination includes a securing element and a matching element. The matching element is disposed on the bracket connecting element. The securing element passes through the third bracket, the first connecting bracket, the second bracket and the bracket connecting element and is mutually locked with the matching element.

In an embodiment, the fixing assembly further includes a second connecting bracket connecting the main body with the third bracket.

In an embodiment, the fixing assembly further includes a bracket connecting element. The bottom portion of the main body is provided with a through slot. The second connecting bracket is connected to the third bracket and at least partially located within the through slot. The bracket connecting element is at least partially located in the second connecting bracket, and abuts against the second connecting bracket.

In an embodiment, the fixing assembly further includes a securing combination including a securing element and a matching element. The matching element is disposed to the bracket connecting element, and the securing element passes through the third bracket, the second connecting bracket and the bracket connecting element and is mutually locked and fixed with the matching element.

In an embodiment, the third bracket includes a first structural reinforcement element and an engaging element for cooperated with the engaging structure of the base. The first structural reinforcement element is connected to the engaging element and disposed at a side of the engaging element to define an engaging area.

In an embodiment, the engaging element is an annular structural element, and a center of the engaging element is approximately coincident with a center of the first bracket. The first connecting bracket connects the second bracket with the first structural reinforcement element.

In an embodiment, the second bracket is a U-shaped structural element, and the second bracket has two vertical parts and a transverse part. The two vertical parts are substantially vertically connected to the first bracket, and the transverse part is substantially vertically connected to the fixing assembly.

In an embodiment, the third bracket includes two first structural reinforcement elements and an engaging element for cooperating with the engaging structure of the base, and the two first structural reinforcement elements are connected to the engaging element and are respectively disposed at two sides of the engaging element to define two engaging areas.

In an embodiment, the third bracket further includes a second structural reinforcement element positioned between the two first structural reinforcement elements. A distance between one of the two first structural reinforcement elements and the second structural reinforcement element is approximately equal to a distance between the other of the two first structural reinforcement elements and the second structural reinforcement element.

In an embodiment, the carrier further includes a binding webbing. The bottom portion of the main body is provided with a bottom opening. The bracket device further includes a positioning bracket connected to the second bracket. The positioning bracket includes a bracket opening at a position corresponding to the bottom opening. The binding webbing passes through the bracket opening and the bottom opening.

In an embodiment, the positioning bracket further includes a protruding structure at least partially inserted into the bottom opening.

In an embodiment, the carrier further includes an adjuster. The adjuster is disposed on the third bracket, the binding webbing passes through the adjuster, and the adjuster is configured to adjust and lock the binding webbing.

In an embodiment, the carrier further includes a canopy and a canopy connecting assembly. The canopy connecting assembly is disposed between the canopy and the main body or between the canopy and a cloth at least partially covering the main body for detachably connecting the canopy with the main body or the cloth.

In an embodiment, the canopy includes a first cover, a second cover and a cover connecting assembly. The cover connecting assembly is disposed between the first cover and the second cover for detachably connecting the first cover and the second cover with each other.

In an embodiment, the main body further includes an accommodation structure for partially accommodating the first bracket or the second bracket.

An aspect of the present disclosure provides a canopy assembly that is removably mounted to a main body of a carrier. The canopy assembly includes a canopy, a canopy frame and a canopy locking device. The canopy frame is connected to a periphery of the canopy for supporting the canopy. The canopy locking device is at least partially disposed on the canopy frame for cooperating with a canopy locking part correspondingly disposed on the carrier, so as to lock the canopy assembly above the main body. The canopy locking device includes a locking element. The locking element is mounted on the canopy frame, and is engaged with or disengaged from the canopy locking part by moving with respect to the canopy frame, so that the canopy frame is locked or unlocked to the main body.

In an embodiment, the movement of the locking element with respect to the canopy frame is that the locking element pivots about at least one pivot point on the canopy frame to be engaged with or disengaged from the canopy locking part.

In an embodiment, the canopy locking device further includes a releasing operation element. The releasing operation element is disposed on one of the canopy frame and the bracket device sleeved outside the main body, operatively acts on the locking element, and is movable between a locking position and an unlocking position.

In an embodiment, two locking elements are provided. The two locking elements are disposed in mirror symmetry in the canopy locking device, and are respectively pivotally connected to both sides of the same releasing operation element.

In an embodiment, a connecting structure is disposed between the canopy and the main body of the carrier for keeping the canopy closed with respect to the main body.

In an embodiment, the connecting structure includes a connecting element and a mating connecting element. The connecting element is disposed at each of two sides of the main body that are opposite to each other, and the mating connecting element is disposed at each of two sides of the canopy that correspond to the connecting element and is engaged with the connecting element. One of the connecting element and the mating connecting elements is a male connecting element, and the other thereof is a female connecting element, and the canopy is kept closed by engagement of the male connecting element and the female connecting element.

In an embodiment, the male connecting element and the female connecting element are magnetic buckle assemblies that are mutually cooperated with each other.

Another aspect of the present disclosure provides a carrier. The carrier includes a main body, a bracket device and the canopy assembly described in any of the previous embodiments. The main body forms an accommodation space. The bracket device is configured to support the main body and includes a first bracket disposed around an opening of the main body. The canopy assembly is detachably connected to the first bracket.

In an embodiment, the carrier further includes a strap. The strap includes a strap body and strap connecting parts respectively disposed at both ends of the strap body, and the strap connecting parts are connected with connecting elements disposed at opposite two sides of the main body.

In an embodiment, the bracket assembly disposed at a bottom portion of the bottom support may be fixed with an engaging part of the fixing seat assembly mounted on a vehicle or a locking mechanism of a base plate of a wheeled carrying apparatus.

In an embodiment, the bracket assembly is fixed with the fixing seat assembly or the base plate of the wheeled carrying apparatus at four engaging points.

In an embodiment, the bottom support is provided with at least one connecting part. The at least one connecting part is cooperated with a fixing belt assembly to fix the carrier onto a vehicle seat.

The present disclosure provides a carrier which may be stably mounted and fixed in a carrying apparatus. The carrier includes: a carrying portion defining a carrying surface for carrying an animal, a bracket device and a binding device. The bracket device includes: a first bracket combined to the carrying portion and disposed around a periphery of the carrying portion; a second bracket connected to the first bracket and combined with the first bracket to a bottom surface of the carrying portion, the bottom surface being an opposite surface of the carrying surface, and the second bracket extending from a side of the peripheral of the carrying portion to the other side of the peripheral of the carrying portion via the bottom surface; and a third bracket having a shape corresponding to the first bracket and connected to the second bracket for cooperating with a base. The binding device is used for binding the animal on the carrying surface.

In an embodiment, the binding device includes at least a pair of fixing clamping belts, each of which has an end fixedly disposed at a side of the peripheral of the carrying portion and the other end movably connected to the other side of the peripheral of the carrying portion.

In an embodiment, each of the fixing clamping belts includes an adjuster to adjust a length of the fixing clamping belt.

In an embodiment, the carrier further includes at least one first fixing assembly connecting the second bracket and the third bracket. The third bracket is disposed to be spaced apart from the second bracket through the first fixing assembly.

In an embodiment, the first bracket includes a first side, a second side, a third side and a fourth side which are sequentially adjacent to each other, the first side is opposite to the third side, and the second side is opposite to the fourth side. The second bracket includes: a first cross bar connected between the first side and the third side of the first bracket and extending from a side of the peripheral of the carrying portion to the other side of the peripheral of the carrying portion via the bottom surface; and a pair of longitudinal bars respectively connected between the first cross bar and the second side of the first bracket and between the first cross bar and the fourth side.

In an embodiment, the first bracket is rectangular or square-annular. The first side and the third side are long sides that are opposite to each other, and the second side and the fourth side are short sides that are opposite to each other.

In an embodiment, the second bracket further includes a second cross bar connected between the pair of longitudinal rods, and spaced apart from and parallel to the first cross bar.

In an embodiment, the second bracket further includes a connecting part located on the second cross bar.

For example, in an embodiment, the bracket device further includes a second fixing assembly connecting the second cross bar of the second bracket with the third bracket.

In an embodiment, the bottom surface is lower than a plane corresponding to the first bracket.

In an embodiment, the first cross bar is a bent bar, and its profile corresponds to the bottom surface.

The present disclosure relates to a carrier. The carrier includes: a carrying portion having a bottom portion, wherein a carrying space is formed on the bottom portion, and a lower surface of the bottom portion constitutes a bottom surface of the carrying portion; and a bracket device configured to support the carrying portion. The bracket device includes a third bracket located at a side of the bottom portion of the carrying portion for fixing the carrier to a carrying apparatus; and a fixing assembly connected between the carrying portion and the third bracket, so that the third bracket is spaced apart from the bottom surface of the carrying portion through the fixing assembly.

In an embodiment, the carrying portion is a main body including a body and a bottom support, and the body is detachably disposed on the bottom support. The main body is disposed on the bracket device via the bottom support.

In an embodiment, the body is detachably connected to the bottom support through at least one connecting assembly.

In an embodiment, the at least one connecting assembly includes a first connecting element and a second connecting element which are detachably connected with each other. The first connecting element is disposed on the body, and the second connecting element is disposed on the bottom support.

In an embodiment, the body is composed of a first support and a second support, and the first support and the second support are detachably connected with each other.

In an embodiment, the first support and the second support are connected to each other through a zipper.

In an embodiment, the first support and/or the second support is/are capable of being changed from an unfolded state to a folded state through at least one connecting structure after the first support and the second support are detached from each other.

In an embodiment, the first support is a side support and at least partially forms two side surfaces of the body. The second support is an upper support and forms at least a part of a top surface and other two side surfaces of the body.

In an embodiment, the upper support is composed of a first sheet, a second sheet and a third sheet, and the first sheet, the second sheet and the third sheet are connected by a connecting structure and are foldable with respect to each other.

In an embodiment, the upper support is formed as an integral part through the connecting structure.

In an embodiment, the upper support is capable of being changed from an unfolded state to a folded state through the connecting structure when the upper support is separated from the side support.

In an embodiment, the side support comprises a first sub-support and a second sub-support. The first sub-support and the second sub-support are independent of each other and have a bottom edge extending approximately horizontally and a top edge having an arched shape respectively, and the bottom edge of each of the first sub-support and the second sub-support is detachably connected to a corresponding edge of the bottom support, and the top edge of each of the first sub-support and the second sub-support is detachably connected to one of two sides of the upper support that is arched.

In an embodiment, the first sub-support and the second sub-support are connected to each other through a first connecting assembly and detachably connected to the bottom support. After the side support is separated from the upper support, the first sub-support and the second sub-support are foldable with respect to each other, and the side support is changed from an unfolded state to a folded state.

In an embodiment, the first sub-support, the second sub-support and a connecting piece connected between the first sub-support and the second sub-support are integrally formed to form the side support. The bottom edges of the first sub-support and the second sub-support are integrally connected with a bottom edge of the connecting piece in a circumferential direction, and the top edges of the first sub-support and the second sub-support are formed in an arched shape and are integrally connected via a top edge of the connecting piece, so that the side support is detachably connected between the upper support and the bottom support.

In an embodiment, after the side support is separated from the upper support, the first sub-support and the second sub-support are foldable with respect to each other, and the side support is changed from an unfolded state to a folded state.

In an embodiment, any side surface of the body is provided with a window cloth that is capable of being opened and closed.

In an embodiment, the window cloth is a soft cloth, and a holding element for keeping the window cloth opened is provided at an upper portion of the window cloth.

In an embodiment, the top surface of the body is provided with a handle.

In an embodiment, a bottom edge of the body is provided with an extension part extending downwards for being inserted into an insertion groove that is correspondingly disposed in the bottom support.

The present disclosure related to a carrier. The carrier includes: a main body forming a carrying space; and a canopy assembly disposed to the main body of the carrier or a cloth at least partially covering the main body. The canopy assembly includes: a canopy; and a canopy connecting assembly disposed between the canopy and the main body or between the canopy and the cloth, so that the canopy and the main body or the cloth are detachably connected with each other. The canopy connecting assembly includes: a canopy frame connected to a periphery of the canopy for supporting the canopy, and detachably disposed at a periphery of an opening of the main body; and a releasing operation element disposed on the canopy frame or the bracket device sleeved outside the main body, and capable of being operated to move from a locking position to an unlocking position, so that the canopy assembly is unlocked with respect to the main body.

In an embodiment, the main body further includes a bracket device configured to support the main body and including a first bracket. The first bracket is disposed around the opening of the main body. The canopy connecting assembly is detachably connected to the first bracket.

In an embodiment, the canopy connecting assembly includes: a canopy locking device at least partially disposed on the canopy frame for cooperating with a canopy locking part correspondingly disposed on the carrier to lock the canopy assembly above the main body. The canopy locking device includes: a locking element mounted on the canopy frame, and is engaged with or disengaged from the canopy locking part through movement with respect to the canopy frame, so as to lock or unlock the canopy frame to the main body.

In an embodiment, the movement of the locking element with respect to the canopy frame is that the locking element pivots about at least one pivot point on the canopy frame to be engaged with or disengaged from the canopy locking part.

In an embodiment, the canopy locking device further includes the releasing operation element, and the releasing operation element operatively acts on the locking element. When the releasing operation element is in the locking position, the locking element is engaged with the canopy locking part, and when the releasing operation element is operated to the unlocking position, the locking element is disengaged from the canopy locking part.

In an embodiment, the locking element is pivotably connected to the canopy frame about a pivot point and pivotably connected to the releasing operation element about another pivot point that is different from the pivot point. The releasing operation element is disposed on the canopy frame, is movable between the locking position and the unlocking position with respect to the canopy frame, and drives the locking element to pivot with respect to the canopy frame about the pivot point.

In an embodiment, the locking element has an engaging hook protruding towards the canopy locking part, and the canopy locking part comprises an engaging latch corresponding to the engaging hook. When the releasing operation element is in the locking position, the engaging hook is engaged with the engaging pin, and when the releasing operation element is operated to push the locking element to pivot and be in the unlocking position, the engaging hook is disengaged from the engaging pin.

In an embodiment, the canopy locking device further includes an elastic restoring element, the elastic restoring element is connected between the releasing operation element and the canopy frame, and constantly provides a force for enabling the releasing operation element to be in or restored to the locking position.

In an embodiment, the releasing operation element is disposed on the canopy locking part and is movable between the locking position and the unlocking position with respect to the canopy locking part. The locking element is connected to the canopy frame and protrudes from the canopy frame to the bracket device of the carrier. The canopy locking part is connected with the releasing operation element to be able to move along with operation of the releasing operation element, so as to engage with or disengage from the locking element.

In an embodiment, the locking element is disposed as a first sheet, and the canopy locking part comprises a second sheet. An insertion space for accommodating the first sheet is formed between the second sheet and the releasing operation element. One of the first sheet and the second sheet is provided with an engaging hole, and the other of the first sheet and the second sheet is provided with an engaging protrusion that is cooperated with the engaging hole. When the releasing operation element is in the locking position, the engaging hole is engaged with the engaging protrusion, and when the releasing operation element is operated to push the second sheet away from the first sheet to be in the unlocking position, the engaging hole is disengaged from the engaging protrusion.

In an embodiment, the canopy locking device further includes: an elastic restoring element connected between one of the releasing operation element and the second sheet and the carrier, and constantly providing a force for enabling the releasing operation element to be in or restored to the locking position.

In an embodiment, the canopy locking part is disposed on the bracket device of the carrier.

In an embodiment, the canopy frame includes at least one pivoting section and a section position adjusting structure. The section position adjusting structure is configured such that the at least one pivoting section is at different angles with respect to the main body.

In an embodiment, the canopy frame has a triple-section folding structure.

In an embodiment, the canopy frame includes a first pivoting section, a second pivoting section and two locking sections, two ends of the first pivoting section are respectively pivotably connected to one ends of the two locking sections through a first pivoting part, and two ends of the second pivoting section are respectively pivotably connected to the other ends of the two locking sections through a second pivoting part, and two canopy locking devices are respectively disposed in the two locking sections, so that the two locking sections are capable of being locked to the bracket device of the carrier.

In an embodiment, gear teeth are disposed in each of the first pivoting part and the second pivoting part, so that the first pivoting section and the second pivoting section are able to be at different angles with respect to the locking sections.

In an embodiment, the first pivoting part and the second pivoting part are respectively provided with a return spring to constantly bias the first pivoting part and the second pivoting part in a direction of unfolding the canopy, so as to provide assistance during unfolding of the canopy.

In an embodiment, a connecting structure is disposed between the canopy and the main body of the carrier. The connecting structure includes a connecting element and a mating connecting element. The connecting element is disposed at each of two sides of the main body that are opposite to each other, and the mating connecting element is disposed at each of two sides of the canopy that correspond to the connecting element and is engaged with the connecting element, so as to keep the canopy closed.

The present disclosure also provides a locking base assembly. The locking base assembly includes: a base plate for placing an object thereon; and a locking mechanism mounted on the base plate for locking and unlocking the object. The locking mechanism includes: at least one releasing operation element capable of sliding between a locking position and an unlocking position with respect to the base plate; and at least one locking element is slidably disposed on the base plate. The locking element is capable of locking the object when the releasing operation element is in the locking position. The locking element moves along with movement of the releasing operation element to unlock (i.e., release) the object when the releasing operation element is operated to move from the locking position to the unlocking position.

In an embodiment, the at least one locking element includes a first locking element and a second locking element. The first locking element and the second locking element are connected through a linkage device, so that the first locking element and the second locking element move synchronously in a same direction or in an opposite direction along with the releasing operation element to unlock the object.

In an embodiment, the first locking element and the second locking element are disposed on a same side of the base plate.

In an embodiment, in response to movement of the first locking element and the second locking element in a same direction, the first locking element and the second locking element are fixedly connected, and an elastic device is disposed between at least one of the first locking element and the second locking element and the base plate, so as to constantly provide a force for driving the releasing operation element to tend to be in the locking position.

In an embodiment, in response to movement of the first locking element and the second locking element in opposite directions, an elastic device is disposed between the first locking element and the second locking element, so as to constantly provide a force for driving the releasing operation element to tend to be in the locking position.

In an embodiment, corresponding to the movement of the first locking element and the second locking element in the opposite directions, the linkage device is connected between the first locking element and the second locking element, and a movement direction of a central connection point of the linkage device is perpendicular to a movement direction of the first locking element and the second locking element.

In an embodiment, the linkage device includes a first rod, a second rod, a third rod and a fourth rod. The first rod, the second rod, the third rod and the fourth rod are connected in pairs to form four connection points. One of the four connection points is a fixed connection point, and the fixed connection point is fixed to the base plate and is connected to the first locking element and the second locking element respectively through a rod connected with the central connection point opposite to the fixed connection point among the four connection points.

In an embodiment, the at least one locking element further includes a third locking element and a fourth locking element. The third locking element and the fourth locking element are disposed at the other same side of the base plate, and disposed corresponding to the first locking element and the second locking element.

In an embodiment, the first locking element and the second locking element are disposed on opposite sides of the base plate.

In an embodiment, the linkage device includes a linkage, and the linkage is a linking rod.

In an embodiment, in response to movement of the first locking element and the second locking element in a same direction, the first locking element and the second locking element are fixedly connected, and an elastic device is disposed between at least one of the first locking element and the second locking element and the base plate, so that the releasing operation element tends to be in the locking position.

In an embodiment, in response to movement of the first locking element and the second locking element in opposite directions, an elastic device is disposed between at least one of the first locking element and the second locking element and the base plate, so that the releasing operation element tends to be in the locking position.

In an embodiment, in response to movement of the first locking element and the second locking element in the same direction, two ends of the linkage are fixedly connected to the first locking element and the second locking element respectively.

In an embodiment, in response to movement of the first locking element and the second locking element in the opposite directions, two ends of the linkage are respectively connected to the first locking element and the second locking element.

In an embodiment, the linkage device includes a linkage, and the linkage is a traction element. The first locking element and the second locking element move in opposite directions.

In an embodiment, the at least one locking element further includes a third locking element and a fourth locking element. The third locking element and the fourth locking element are also disposed on the opposite sides of the base plate, and disposed corresponding to the first locking element and the second locking element respectively.

In an embodiment, the linkage device includes other linkage for coupling the third locking element and the fourth locking element.

In an embodiment, the linkage and the other linkage are disposed to be intersected with each other in a case that the first locking element and the second locking element move in opposite directions.

In an embodiment, the linkage and the other linkage are connected at their intersection.

In an embodiment, an angle between the linkage and the other linkage when the releasing operation element is in the locking position is greater than that when the releasing operation element is in the unlocking position.

In an embodiment, in a case that the first locking element and the second locking element move in opposite directions, an elastic device is disposed between two of the first locking element, the second locking element, the third locking element and the fourth locking element, that are located at a same side, so as to constantly provide a force for driving the releasing operation element to tend to be in the locking position.

In an embodiment, the releasing operation element is configured such that at least a part thereof protrudes from above the base plate when the releasing operation element is in the locking position, and a driving pin is fixedly disposed on the releasing operation element. The locking element is slidably connected with the releasing operation element, and an inclined hole is disposed at an end close to the releasing operation element. When the releasing operation element is operated, the driving pin is slidable with respect to the inclined hole along with movement of the releasing operation element, so as to drive the locking element to move from the locking position to the unlocking position.

In an embodiment, the locking base assembly further includes a holding mechanism for keeping the releasing operation element in the unlocking position.

In an embodiment, the holding mechanism includes: a touch button disposed in the base plate, wherein the touch button is capable of moving in a vertical direction with respect to the base plate, and at least partially protruding from above the base plate; a buckling part movably disposed below the touch button; and a restoring element disposed between the touch button and a lower housing of the base plate, and constantly providing a force to protrude the touch button upwards from the base plate. When the object is placed on the base plate and presses the touch button down, and the releasing operation element is operated, a holding hook of the locking element hooks the buckling part to keep the releasing operation element in the unlocking position.

In an embodiment, the holding mechanism further includes an elastic element, and the elastic element is disposed between the touch button and the buckling part for cooperating with movement of the buckling part with respect to the touch button, so that the holding hook is engaged with the buckling part.

The present disclosure also provides a supporting frame for supporting a base plate. The supporting frame is disposed at a longitudinal side of the base plate. The supporting frame includes a longitudinal rod, a connecting rod and a shock absorbing rod connected with one another in a triangular structure. The longitudinal rod is disposed below the base plate and fixedly connected with the base plate. A first end of the connecting rod is fixedly connected with a first end of the longitudinal rod, and a second end of the connecting rod is fixedly connected with a first end of the shock absorbing rod. A second end of the shock absorbing rod is connected to a second end of the longitudinal rod, and the shock absorbing rod has elasticity to provide buffering support for the base plate.

In an embodiment, two supporting frames are provided. The two supporting frames are respectively disposed on two sides of the seat plate in a longitudinal direction, and each of the supporting frames includes a longitudinal rod, a connecting rod and a shock absorbing rod which are connected into a triangular structure.

In an embodiment, the shock absorbing rod is a compression spring, a hydraulic rod, or a pneumatic rod.

In an embodiment, each of the supporting frames further includes a first connecting component and a second connecting component, one ends of the first connecting component and the second connecting component is pivotally connected to the second end of the connecting rod respectively, and the other ends of the first connecting component and the second connecting component and the first end of the connecting rod are pivotally connected to different positions of a carrying frame which is capable of being folded with respect to each other respectively.

In an embodiment, two supporting frames are provided, the two supporting frame are respectively disposed on two transverse sides of the base plate, and a cross rod is connected between longitudinal rods of the two supporting frames; and/or a cross rod is connected between connecting rods of the two supporting frames.

In an embodiment, the longitudinal rod includes a limiting finger, the limiting finger is disposed at the first end of the longitudinal rod and close to the connecting rod, and is configured to limit an angle at which the longitudinal rod pivots downwards with respect to the connecting rod.

In an embodiment, the longitudinal rod includes a limiting projection disposed at the first end of the longitudinal rod and configured to limit an upward pivoting of the longitudinal rod with respect to the connecting rod. In an example, the limiting projection is disposed at the first end of the longitudinal rod and at a side away from the connecting rod.

In an embodiment, the supporting frame further includes a limiting element, a first end of the limiting element is slidably connected to the longitudinal rod with respect to the longitudinal rod, and a second end of the limiting element is pivotably connected to the second end of the connecting rod.

The present disclosure also provides a wheeled carrying apparatus. The wheeled carrying apparatus includes: a carrying frame; a locking base assembly according to any of the above-mentioned embodiments mounted on the carrying frame; and a carrier capable of being fixed on the base plate through the locking mechanism, wherein the base plate is located at the bottom portion of the carrier.

The present disclosure also provides a wheeled carrying apparatus. The wheeled carrying apparatus includes: a carrying frame; a locking base assembly mounted on the carrying frame; and a carrier capable of being fixed on the base plate through the locking base assembly. The locking base assembly is located at a bottom portion of the carrier, and a plurality of engaging points are at least disposed on the locking base assembly.

In an embodiment, the plurality of engagement points are symmetrically disposed on the locking base assembly along a longitudinal centerline of the locking base assembly.

In an embodiment, the plurality of engaging points are four engaging points, and the four engaging points are centrally symmetrically disposed on the locking base assembly.

In an embodiment, the carrier includes: a main body having a bottom portion and a peripheral wall connected to the bottom portion; and a bracket device. The bracket device includes: a third bracket located at a side of the bottom portion of the main body and includes an engaging element cooperated with an engaging structure correspondingly disposed on the carrying apparatus to form the engaging point; and a fixing assembly connected with the third bracket and includes at least two guides disposed in a plane surrounded by the engaging element.

In an embodiment, the carrier is a long-sized carrier, and the plurality of engagement points are located between the at least two guides.

In an embodiment, the third bracket further includes: a structural reinforcement element disposed between the fixing assemblies, wherein the plurality of engaging points are located between the guide and the structural reinforcement element.

In an embodiment, the carrier is a short-sized carrier, and the plurality of engagement points are located outside the at least two guides.

In an embodiment, the locking base assembly includes a locking element for locking the carrier on the base plate. One end of the locking element is provided with a locking part, and the base plate is provided with an opening which is located at a position corresponding to the locking part, so that the locking part is capable of protruding from the opening of the base plate to form the engaging point.

In an embodiment, the base plate has an upper housing structure with a raised front side, a recess is disposed on the raised upper housing structure at a position of the locking part, and the opening of the base plate is disposed in the recess.

In an embodiment, the raised upper housing structure of the base plate is also provided with an inclined plane, and the inclined plane is located above the recess and on a side opposite to the opening of the recess, so as to guide locking of the carrier and the locking base assembly.

In an embodiment, the base plate is provided with: a first extension part extending from one end of the base plate close to a rear wheel of the carrying frame; and/or a second extension part extending from one end of the base plate close to a front wheel of the carrying frame.

In an embodiment, the locking base assembly includes: a supporting structure supporting the locking base assembly and pivotably connected to the carrying frame, the locking base assembly being capable of pivoting along with folding of the carrying frame through the supporting structure.

In an embodiment, the carrying frame includes a front supporting rod connected with the front wheel, a rear supporting rod connected with the rear wheel, and an upper supporting rod connected with a handrail, one end of the front supporting rod, one end of the rear supporting rod and one end of the upper supporting rod are pivotally connected with each other at a pivoting part.

In an embodiment, when the carrying frame is folded, the front supporting rod, the rear supporting rod and the upper supporting rod are close to each other, and the supporting structure drives one end of the locking base assembly close to the rear wheel to pivot towards the pivoting part.

In an embodiment, the supporting structure includes: a first coupling element, one end of which is pivotably connected to the front supporting rod at a first pivot point; a second coupling element pivotably connected to the other end of the first coupling element at a second pivot point and pivotably connected to the rear supporting rod at a third pivot point; and a linking element, one end of which is pivotably connected to the upper supporting rod at a fourth pivot point, and the other end of which is pivotably connected to the second coupling element at a fifth pivot point, so as to drive the second coupling element to pivot when the carrying frame is folded. The fifth pivot point is between the second pivot point and the third pivot point.

In an embodiment, when the carrying frame is unfolded, the first coupling element and the second coupling element are horizontally disposed, and the first pivot point, the second pivot point, the third pivot point and the fifth pivot point are substantially in a straight line.

In an embodiment, the locking base assembly is mounted on the second coupling element.

In an embodiment, the second coupling element includes: a base plate support having a U-shaped structure and configured to support and fix the locking base assembly; and an auxiliary support disposed outside the base plate support and connected with the base plate support, so that the base plate support is capable of moving synchronously with the auxiliary support. The other end of the first coupling element is inserted between the base plate support and the auxiliary support, and the other end of the linking element is inserted between the base plate support and the auxiliary support.

In an embodiment, the second coupling element is a base plate support, and the base plate support has a U-shaped structure and is configured to fix the locking base assembly.

In an embodiment, the linking element has an approximate S-shaped structure, and the approximate S-shaped structure has a first section, a second section and a third section in turn. When the carrying frame is unfolded, the first section is substantially overlapped with the upper supporting rod.

In an embodiment, the second section is substantially perpendicular to the first section, and the third section is substantially perpendicular to the second section.

It should be noted that the illustration and description of the examples and embodiments shown in the drawings are for illustrative purposes only and should not be construed as limiting the present disclosure. Those skilled in the art will understand that the present disclosure contemplates various embodiments. In addition, it should be understood that the concepts described above in connection with the above examples and embodiments can be used alone or in combination with any other examples and embodiments described above. It should be further understood that, unless otherwise specified, various alternative examples and embodiments described above with respect to one illustrated embodiment can be applied to all examples and embodiments described herein.

Unless explicitly stated otherwise, each numerical value and range should be interpreted as an approximation as if the words “about”, “approximately” or “substantially” preceded the value or range. Unless otherwise specified, the terms “about”, “approximately” and “substantially” can be understood to describe a range within 15% of the specified value.

Unless otherwise specified or otherwise understood in the context used, conditional languages used herein, such as “may”, “can”, “able to”, “possible”, “for example” and the like, are generally intended to convey that some embodiments include certain features, elements and/or steps while other embodiments do not. Therefore, this conditional language generally does not mean that features, elements and/or steps are required by one or more embodiments in any way, or that one or more embodiments must include logic for deciding whether these features, elements and/or steps are included or will be performed in any particular embodiment with or without author input or prompt. The terms “include”, “comprise”, “have” and the like are synonyms, which are used in an open way and do not exclude other elements, features, behaviors and operations. In addition, a term “or” is used in its inclusive sense (not in its exclusive sense), and thus, for example, when used to connect a list of elements, a term “or” refers to one, some or all elements in the list.

Although certain examples have been described, these examples are not intended to limit the scope of the present disclosure disclosed herein. Therefore, any contents in the above description does not mean that any particular feature, characteristic, step, module or block is necessary or indispensable. In fact, the novel method and system described herein may be embodied in various other forms. In addition, various omissions, substitutions and changes can be made to the forms of the methods and systems described herein without departing from the inventive concepts disclosed herein. The appended claims and their equivalents are intended to cover forms or modifications that fall within the scope and spirit of the present disclosure disclosed herein.

It should be understood that the steps of the exemplary method set forth herein do not necessarily need to be performed in the described order, and the order of the steps of such a method should be understood as merely exemplary. Also, in methods consistent with various embodiments of the present disclosure, additional steps may be included in these methods, and some steps may be omitted or combined.

Although the elements (if any) in the following method claims are recited in a specific sequence with corresponding labels, unless the claim recitation otherwise implies a specific sequence for realizing some or all of these elements, these elements are not necessarily limited to being realized in this specific sequence.

The words “inward”, “outward”, “up” and “down” refer to the direction towards or away from a geometric center of the component, respectively.

It should be understood that the reference to “a” or “an” herein to describe a feature such as a component or step does not exclude additional features or multiples of features. For example, referring to a device having, including, containing or defining “one” of a feature does not exclude that the device has, includes, contains or defines more than one feature, as long as the device has, includes, contains or defines at least one feature. Similarly, reference herein to “one” of a plurality of features does not prevent the present disclosure from including two or more features. For example, referring to a device having, including, containing or defining “one of a protrusion and a depression” does not prevent the device from having both the protrusion and the depression.

What is claimed is:

1. A carrier comprising:

a carrying portion comprising a bottom portion, a carrying space being formed on the bottom portion; and a bracket device comprising:
a first bracket combined to the carrying portion and disposed around a periphery of the carrying portion;
a second bracket connected to the first bracket and combined to the carrying portion, wherein the second bracket extends from one side of the periphery of the carrying portion to the other side of the periphery of the carrying portion through the bottom portion of the carrying portion;
a third bracket located at a side of the bottom portion of the carrying portion, for fixing the carrier to a carrying apparatus, wherein the third bracket has an annular structural element; and
a fixing assembly connecting the carrying portion with the third bracket.

2. The carrier according to claim 1,
wherein a lower surface of the bottom portion constitutes a bottom surface of the carrying portion, and the third bracket is disposed to be spaced apart from the bottom surface of the carrying portion through the fixing assembly.

3. The carrier according to claim 2, wherein the second bracket is a U-shaped structural element, and the second bracket has two vertical parts and a transverse part, wherein the two vertical parts are approximately vertically connected to the first bracket, and the transverse part is approximately vertically connected to the fixing assembly.

4. The carrier according to claim 2, wherein the carrying portion is a main body, the main body further comprises a peripheral wall connected with the bottom portion, and the bottom portion and the peripheral wall form the carrying space.

5. The carrier according to claim 4, wherein the fixing assembly comprises:
a first connecting bracket connecting the second bracket and the third bracket.

6. The carrier according to claim 5, wherein the fixing assembly further comprises:
a bracket connecting element, wherein a bottom portion of the main body is provided with a through slot which is located at a position corresponding to the first connecting bracket, and the bracket connecting element is at least partially located within the through slot and abuts against the second bracket.

7. The carrier according to claim 6, wherein the fixing assembly further comprises:
a securing combination comprising a securing element and a matching element, wherein the matching element is disposed to the bracket connecting element, and the securing element passes through the third bracket, the first connecting bracket, the second bracket and the bracket connecting element and is mutually locked with the matching element.

8. The carrier according to claim 6, wherein the fixing assembly further comprises:
a guide connected to the third bracket and located at a position corresponding to the first connecting bracket, for guiding the third bracket to cooperate with an engaging structure of the carrying apparatus.

9. The carrier according to claim 8, wherein the fixing assembly further comprises:
a securing combination comprising a securing element and a matching element, wherein the matching element is disposed to the bracket connecting element, and the securing element passes through the guide, the third bracket, the first connecting bracket, the second bracket and the bracket connecting element and is mutually locked with the matching element.

10. The carrier according to claim 5, wherein the fixing assembly further comprises:
a second connecting bracket connecting the main body with the third bracket.

11. The carrier according to claim 10, wherein the fixing assembly further comprises:
a bracket connecting element, wherein a bottom portion of the main body is provided with a through slot, the second connecting bracket is connected to the third bracket and at least partially located within the through slot, and the bracket connecting element is at least partially located within the second connecting bracket and abuts against the second connecting bracket.

12. The carrier according to claim 11, wherein the fixing assembly further comprises:
a securing combination comprising a securing element and a matching element, wherein the matching element is disposed to the bracket connecting element, and the securing element passes through the third bracket, the second connecting bracket and the bracket connecting element and is mutually locked with the matching element.

13. The carrier according to claim 6, wherein the bottom portion of the main body is provided with a groove, and the bracket connecting element is partially accommodated in the groove and does not protrude from the bottom portion of the main body.

14. The carrier according to claim 4, wherein the third bracket comprises:
an engaging element cooperating with an engaging structure correspondingly disposed on the carrying apparatus; and
a structural reinforcement element, two ends of which are respectively connected to the engaging element, and which is located at an approximate middle position of the engaging element in a longitudinal direction.

15. The carrier according to claim 14, wherein the third bracket further comprises:
other structural reinforcement element extending in a transverse direction of the main body and connected to the engaging element, and disposed on at least one side of the engaging element.

16. The carrier according to claim 14, wherein the engaging element is the annular structural element, and a center of the engaging element is approximately coincident with a center of the first bracket.

17. The carrier according to claim 14, wherein the third bracket comprises two other structural reinforcement elements, wherein the two other structural reinforcement elements are respectively disposed on both sides of the engaging element.

18. The carrier according to claim 14, wherein a central portion of the structural reinforcement element is bent towards the bottom portion of the carrying portion and configured to abut against the bottom portion of the carrying portion.

19. The carrier according to claim 4, wherein the main body is further provided with an impact protection device, and the impact protection device is disposed on at least one side of the main body and located at an inner side of the peripheral wall of the main body.

20. The carrier according to claim 4, wherein
a carrier belt having a T-shaped structure is disposed on the bottom portion of the main body, the carrier belt has a longitudinal section and a transverse section, wherein the transverse section forms a first end and a second end of the carrier belt, each of which passes through and is fixed to a corresponding through slot on the bottom portion of the main body, and wherein one end of the longitudinal section is connected to the transverse section, and the other end of the longitudinal section is a free end and forms a third end of the carrier belt.

* * * * *